US011609795B2

(12) United States Patent
Hwang

(10) Patent No.: US 11,609,795 B2
(45) Date of Patent: Mar. 21, 2023

(54) WORKGROUP HIERARCHICAL CORE STRUCTURES FOR BUILDING REAL-TIME WORKGROUP SYSTEMS

(71) Applicant: HT Research Inc., North Tustin, CA (US)

(72) Inventor: Ivan Chung-Shung Hwang, North Tustin, CA (US)

(73) Assignee: HT RESEARCH INC., North Tustin, CA (US)

( * ) Notice: Subject to any disclaimer, the term of this patent is extended or adjusted under 35 U.S.C. 154(b) by 0 days.

(21) Appl. No.: 17/484,230

(22) Filed: Sep. 24, 2021

(65) Prior Publication Data

US 2022/0019481 A1 Jan. 20, 2022

Related U.S. Application Data

(63) Continuation of application No. 16/270,097, filed on Feb. 7, 2019, now Pat. No. 11,132,236.

(60) Provisional application No. 62/627,664, filed on Feb. 7, 2018.

(51) Int. Cl.

*G06F 11/07* (2006.01)
*G06F 9/50* (2006.01)
*H04L 41/0668* (2022.01)
*H04L 41/0663* (2022.01)
*G06F 13/16* (2006.01)
*G06F 11/20* (2006.01)
*G06F 11/16* (2006.01)

(52) U.S. Cl.

CPC ........ *G06F 9/5072* (2013.01); *G06F 11/1666* (2013.01); *G06F 11/2007* (2013.01); *G06F 11/2041* (2013.01); *G06F 13/1663* (2013.01); *H04L 41/0663* (2013.01); *H04L 41/0668* (2013.01)

(58) Field of Classification Search

CPC ............. G06F 11/1633; G06F 11/1666; G06F 11/2007; G06F 11/2041

USPC .............................. 714/6, 4.11, 6.3; 709/205

See application file for complete search history.

(56) References Cited

U.S. PATENT DOCUMENTS 10,454,814 B2 * 10/2019 Brissette ................. H04L 45/22
2006/0029097 A1 * 2/2006 McGee ................... H04L 47/20 370/468
2007/0233455 A1 * 10/2007 Zimmer .................. G06F 9/546 703/27

(Continued)

*Primary Examiner* — Chae M Ko
(74) *Attorney, Agent, or Firm* — K&L Gates LLP

(57) ABSTRACT

A workgroup-computing-entity-based fail-safe/evolvable hardware core structure is disclosed which includes a 3-hierarchical-level 6-workgroup-Basic-Building-Block (6-wBBB) created to supplant the node-computing-entity-based non-fail-safe/limited evolvable von-Neumann core structure of 3-hierarchical-level 3-node-BBB, (i.e., base-level IO-devices/mid-level main memory/top-level CPU) and all the first-time fail-safe workgroup systems can be subsequently generated in the second period along the workgroup-computing evolutionary timeline. Furthermore, based on the first 6-wBBB evolvable architecture, the workgroup evolutionary processes can go up to 7 generations in creating all the necessary workgroup-computing entity-based hardware core structures, so that all the real-time intelligent workgroup-computing systems can be generated in the third period along the workgroup-computing evolutionary timeline.

23 Claims, 91 Drawing Sheets

(56) References Cited

U.S. PATENT DOCUMENTS

| | | | | |
|---|---|---|---|---|
| 2008/0175239 | A1* | 7/2008 | Sistanizadeh | H04L 45/16 370/390 |
| 2014/0310810 | A1* | 10/2014 | Brueckner | G06F 9/45533 726/23 |
| 2017/0034198 | A1* | 2/2017 | Powers | H04L 63/1441 |
| 2018/0203773 | A1* | 7/2018 | Kawada | G06F 11/2048 |
| 2019/0187934 | A1* | 6/2019 | Sicola | G06F 3/064 |

* cited by examiner

| 6-wBBB | | | |
|---|---|---|---|
| 6 | TFB | 5 | TCB |
| 4 | MFB | 3 | MMB |
| 2 | BFB | 1 | BAB |

| Workgroup Linkages | |
|---|---|
| WL1 | Workgroup comm. Linkage-1 |
| WL2 | Workgroup execution Linkage-2 |
| WL3 | Workgroup failover Linkage-3 |
| WL4 | Workgroup failover comm. Linkage-4 |
| | WL1:w1 Ethernet link |
| | WL2:Multiple w3 links |
| | WL2:Fractal Bonding |

| Workgroup Linkages | |
|---|---|
| WL1 | Workgroup comm. Linkage-1 |
| WL2 | Workgroup execution Linkage-2 |
| WL3 | Workgroup failover Linkage-3 |
| WL4 | Workgroup failover comm. Linkage-4 |
| | WL1: w1 Ethernet link |
| | WL2: Multiple w3 links |
| | WL2: Fractal Bonding |

| | Workgroup Linkages |
|---|---|
| WL1 | Workgroup comm. Linkage-1 |
| WL2 | Workgroup execution Linkage-2 |
| WL3 | Workgroup failover Linkage-3 |
| WL4 | Workgroup failover comm. Linkage-4 |
| | WL1: w1 Ethernet link |
| | WL2: Multiple w3 links |
| | WL2: Fractal Bonding |

| WL | Workgroup Linkages |
| --- | --- |
| WL1 | Workgroup comm. Linkage-1 |
| WL2 | Workgroup execution Linkage-2 |
| WL3 | Workgroup failover Linkage-3 |
| WL4 | Workgroup failover comm. Linkage-4 |
| | WL1: w1 Ethernet link |
| | WL2: Multiple w3 Link |
| | WL2: Fractal Bonding |

| Workgroup Linkages | |
|---|---|
| WL1 | Workgroup comm. Linkage-1 |
| WL2 | Workgroup execution Linkage-2 |
| WL3 | Workgroup failover Linkage-3 |
| WL4 | Workgroup failover comm. Linkage-4 |
| | WL1: w1 Ethernet link |
| | WL2: Multiple w3 Link |
| | WL2: Fractal Bonding |

| | | |
|---|---|---|
| realtimeAI | := | (strong) Artificial Intelligent |
| S | := | Supply Agent |
| D | := | Demand Agent |
| E | := | Expert |
| m-upa | := | miniature-User Portfolio Appliance |
| m-upd | := | miniature-User Project Device |
| m-upg | := | miniature-User Policy Gadget |
| m-usw | := | miniature-User Strategy Widget |
| m-xxx-1 | := | -type1 |
| m-xxx-2 | := | -type2 |
| 1-10 | := | Internal LAN1 to LAN10 |
| FS ▪ | := | Firewall Switch with wireless ports |

WORKGROUP HIERARCHICAL CORE STRUCTURES FOR BUILDING REAL-TIME WORKGROUP SYSTEMS

PRIORITY CLAIM

The present application is a continuation of application Ser. No. 16/270,097 filed on Feb. 7, 2019, which claims priority to and the benefit of U.S. Provisional Patent Application No. 62/627,664, filed on Feb. 7, 2018, the entirety of each of which is incorporated herein by reference.

BACKGROUND DISCUSSION

Field of the Invention

The present invention related to the field of "workgroup computing" (WC). More specifically, this invention is focused on workgroup computing "Evolutionary Principles (wEPs)" concerning workgroup computing-entities' evolvable structures/capabilities duality, and duality-derived "Theoretic Foundations (wTFs)". The wEPs include structure-creation-based Hardware Architecture Theories (HATs) and capability-creation-based Software Architecture Theorems (SATs)" along a workgroup computing evolutionary timeline over following 3 periods.

The first period covers the creation of "real-time fail-over" workgroup module-entities based on wEP1/wTF1. The second period covers the very first creation of "real-time fail-safe" workgroup core-entities based on wEP2/wTF2. The third period covers over 7 evolutionary generations in creating bigger and better fail-safe workgroup unitary-core, zone-core and cloud-core entities based on wEP3/wTF3. They are generation-1 real-time complex workgroup production unitary-core entities, generation-2 real-time diverse workgroup-assembly unitary-core entities, generation-3 real-time dynamic workgroup-fabrication unitary-core entities, generation-4 real-time cognitive-interactive workgroup-transaction unitary-core entities, generation-5 real-time intelligent organization standard unitary-core entities, generation-6 real-time intelligent apparatus compact unitary-core entities and generation-7 real-time intelligent PDA miniature unitary-core entities.

The first and foremost innovation about workgroup computing should be focused on workgroup Hardware Architecture Theory (wHAT) with its related methods, which solidify the concept that every bigger workgroup core entity's hardware structure must first be created by a workgroup evolutionary hardware architecture theory (HAT). Then, based on these created workgroup hardware structures, all the ensuing software operating system (OS) integration and software programs generation can be developed via workgroup core entity duality-dictated Software Architecture Theorems (SATs). Furthermore, real-time intelligent workgroup-computing systems can be generated via workgroup core entity-based system disciplines. This is similar to the von Neumann hardware architecture theory that creates the first node-based 3-level hierarchical core structures, (i.e., base-level IO-devices, mid-level main memory and top-level CPU), which can be based on in generating all the von Neumann-based node-computing systems accordingly.

CROSS-REFERENCE TO RELATED PATENT APPLICATIONS

The following United States patents and patent applications, including the present application, are related by subject matter. Each of such patents/applications is incorporated by reference herein in its entirety.

U.S. patent application Ser. No. 08/539,066, entitled "DIRECT-ACCESS TEAM/WORKGROUP SERVER SHARED BY TEAM/WORKGROUP COMPUTERS WITHOUT USING A NETWORK OPERATING SYSTEM", by Ivan Chung-Shung Hwang, filed on Oct. 4, 1995, and granted on Sep. 1, 1998 as U.S. Pat. No. 5,802,391.

U.S. patent application Ser. No. 09/744,194, entitled "SYSTEM AND METHOD FOR IMPLEMENTING WORKGROUP SERVER ARRAY", by Ivan Chung-Shung Hwang, filed on May 17, 2000, and granted on Mar. 30, 2004, as U.S. Pat. No. 6,715,100.

U.S. patent application Ser. No. 09/667,854, entitled "SYSTEM AND METHODS FOR IMPLEMENTING E-COMMERCE SERVICES", by Ivan Chung-Shung Hwang, filed in Sep. 20, 2000.

DESCRIPTION OF THE RELATED ART 1.0 the Limitations of the Current Node-Computing Application-Based Systems 1.1 Object-Oriented Application Systems for Innate Problem Solving are Flawed.

All the networkable object-oriented Operating-System (OS)-based parallel-processing application systems, such as Windows-/Linux-based as well as Android-/iOS-based node-application systems, are flawed in self-security protection. These object-oriented OSs installed on a multi-CPU with individual caches, one main-processing memory and multi-JO devices-based hardware structure, i.e., a multi-headed conjoints-like abnormal hardware structure, are mainly to provide the memory-facility traffic control mechanism on a shared main-memory for multiple CPUs in hopes of achieving better multi-input/multi-output (MIMO) through-puts.

However, in so doing on such an "open-end traffic-hub-like" structure, it creates "Meltdown" as well as "Spectre" security holes that are difficult to fix, because they need both hardware and software improvements just to alleviate the security problems, let alone resolving them.

Since they are object-oriented, they can only generate "open-end IO-pipe-cascade" application programs, which provide "cookie-cutting-molded" Coarse-Grained Reactive (CGR) problem solving services for all users with the same kind of pre-determined problem solving services. These application programs can never provide Fine-Grained Proactive (FGP) problem solving services to any individual user based on real-time dynamic personal requests. Therefore, these types of object-oriented application systems for individuals as the only operator/controller/user/stakeholder with limited CGR problem solving capability can be classified as single-node Application-Hub Systems (AHS) for innate problem solving.

1.2 Zone-Application Infrastructure Systems (AISs) for Collaborative Problem Solving Then, in order to tackle bigger problem domain based on multiple stakeholder's collaboration using these object-oriented node-application systems, it is only natural to network these systems into a multi-node networked-infrastructure-based application systems, dubbed "multi-node Application-Infrastructure Systems (AIS)", which can be found in the real-world collaborative-stakeholders' problem domains from the small solution-providing teams to the large service-oriented organizations.

One example is the multi-operator collaborative solution-team's problem domain. Well-defined team solutions have to be developed as distributed applications and installed on multi-node AISs, so that team members can collaboratively carry out applications to solve solution-team's problems and this type of AISs can be classified as Zone1-solution-AISs.

Another example is the multi-solution-team collaborative transaction-group's problem domain. Well-defined group transactions have to be developed as distributed applications and installed on multi-node AISs, so that all the teams in the transaction group can collaboratively carry out applications to solve transaction-group's problems and this type of AISs that enclose zone1-AISs can be classified as Zone2-transaction-AISs.

Still another example is the multi-transaction-group collaborative enterprise-service-group's problem domain. All the well-defined enterprise-service-group's internal and external services have to be developed into distributed applications and installed on multi-node AISs, so that all the members in the enterprise-service group can collaboratively carry out applications to solve enterprise-service group's problems and this type of AISs that enclose zone2-AISs can be classified as Zone3-service-AISs, ideal for vertical-operation-departments, horizontal-operation-divisions, divisional-management-offices and the central-management-office.

Still yet another example is all the enterprise-group collaborative enterprise's problem domain. All the well-defined enterprise's internal and external services have to be developed into distributed applications and installed on multi-node AISs, so that all the enterprise's groups can collaboratively carry out applications to solve enterprise's problems and this type of AISs that enclose zone3-AISs can be classified as Zone4-enterprise-AISs.

1.3 Cloud Application-Infrastructure Systems (AISs) for Internet Service-Oriented Cooperative Problem Solving In addition, in order to tackle Internet-service-oriented problem domain based on multiple enterprises' cooperation, it is only natural to use the Internet-protocol-based connection to network these symbiotic Zone-4 enterprise-AISs into cloud-infrastructure-based application systems, so that all the involved enterprises can cooperatively carry out applications to solve cloud-service-oriented problems and this type of AISs that enclose zone4-AISs can be classified as Cloud-service-AISs", ideal for Intranet/extranet/Internet service providers.

1.4 Common Drawbacks of AISs

However, by using the application infrastructure systems (AISs) for zone-1 to zone-4 problem domains, as well as for Internet cloud-service problem domains, there are at least 4 major drawbacks with limitations that cannot be overcome.

One drawback of AISs is that applications are only coarse-grained reactive (CGR), never fine-grained proactive (FGP). Solution-AISs can only deliver pre-defined/non-flexible/non-adaptive cookie-cutter coarse-grained applications. Consequently, transaction-AISs based on the results from solution-AISs can never deliver "fine-grained proactive" contracts. Moreover, transaction-based service-AISs, enterprise-AISs and cloud-AISs can never provide "fine-grained proactive" contractual services.

Another drawback of AISs is that it can only be lead-time developed, never real-time dynamically formed. Since the functional data-based software components are spread over multiple node-computers, the overall application programming is lead-time fabricated by focusing on the extended directional-data-flow pipe-line connection and interface among networked software components, which is impossible to be real-time handled. Usually, the application workflow logic is not the main coding effort. The majority of the effort is spent on how to assure whether the connection-timing is in sync and whether the rigid interface-format is followed.

Another drawback of AISs is that it is equipped with proprietary node-OS, never standardized. Zone-infrastructure-based application software should be run under the same node-OS to obtain efficiency and effectiveness. However, the networked nodes in each zone may have different OSs from various venders. Therefore, the best way to achieve standardization is to resort to "virtual container environment" that each OS has to comply with and use portable bytecode formats for generating application programs, instilling another unnecessary layer of overhead.

Yet another drawback of AISs is that updated versions keep on coming, never ending. All the above mentioned node-object-oriented OSs and virtual controllers are bound to be upgraded, if there is any new improvement in hardware components or software components that needs to be installed. Consequently, the existing working application software needs to be upgraded to utilize any of the improved features, such as security.

1.5 Unsolvable Dilemmas of AISs

Yet, the worst drawback is that AISs create two dilemmas, which cannot be resolved.

The first dilemma is about transaction-oriented security. The AISs are always hackable due to the fact that transaction-based application programs installed on node computers in the zones and in the clouds are all pre-developed and laden with object-oriented security holes. Hence, external "virus programs" can sneak in, take over the application processes and conduct illegal activities. Currently, all the security measures are hind-sight-based, making the total eradication of hacking impossible.

The second dilemma is about service-oriented user-privacy. User-privacy via cloud-service-AISs is always problematic because all the cloud-service applications are only company-centric, offering coarse-grained reactive services to the captive users that web-surf on various companies' enterprise-AISs. Therefore, captive users cannot control their own personal data on cloud-AISs and the cloud-service providers can mishandle users' data willfully internally or unwillingly due to hacking externally.

Currently, the best reactive plan to tackle user-privacy issue is focused on the non-technical based measures via ethics enhancement as well as law enforcement. These measures are passive and reactive, which may mitigate the severity and control the damage, but the issue will remain as before.

1.6 Reasons why the Flaws of AISs can Never be Resolved

But then why are all the current zone/cloud-AISs still in existence, providing coarse-grained-reactive (CGR) application-based services to all the PCs and smartphones? The reason is simple.

It is because node computing is no longer evolving and there are no new "evolutionary architecture theories" to create bigger "hardware unitary structure" with better software capability, i.e., bigger "node computers" with better problem solving capabilities.

Since no bigger node-computers can be created to accommodate collaborative zone-based problem domains as well as cooperative cloud-based problem domains, the less-capable multi-node-computer networked application infrastructure systems are put together to accommodate bigger zone-based/cloud-based problem domains and provide coarse-grained reactive (CGR) problem-solving services, thereby incurring the aforementioned drawbacks with limitations and with non-resolvable dilemmas.

1.7 Must have Endeavors

But, why has node-computing ceased evolving? One way to better understand is to review the "history of computing" from a hardware architecture point of view, so that the material of the node computing hardware evolution can be verified and the true facts about why node-computing has ceased evolving, can be discovered. Such facts can be the basis for establishing new and better "evolutionary architecture theories" to create more sophisticated computers with bigger "hardware unitary structures" with better software problem-solving capabilities to accommodate zone-based problem domains, replacing the current zone-based Application-Infrastructure Systems (AIS).

2.0 the History of Computing

Based on the timeline, the history of computing can be reviewed in three distinct periods.

2.1 the First Period (Functional-Computing Entities fm/FM with Duality)

The first period covers the very early stages. In 1836, the first computing machine should be attributed to the Babbage mechanical computing machine, which used mechanical parts to complete the calculation. However, the first workable mechanical computing machine is the Henry Babbage machine, which was built in 1910. This machine was based on an arithmetic function-embedded "hardware mechanical mill" that produced arithmetic "software analytical results".

In 1936, the Turing machine was invented. It was an electro-magnetic circuit-based computing machine, which demonstrated how a tape-memory unit could be added to a multi-function (i.e., move left/right, scan/read, write, as well as arithmetic, etc.) integrated "hardware core structure" and generated finite-state functional automation-based "software capabilities".

Then came a series of the electronic circuit-based Boolean functional machineries (fm), from the "atomic-core" logical gates, such as AND, OR functional gates to the multi-function-gate "integrated" switching logic circuits, such as combinational, sequential and pulse-control Functional Machines (FM), which are equipped with "bigger core-structures with better Multiple-input/Single-output (MISO) and Single-Input/Single-output (SISO) based "truth-table" functional capabilities.

In addition, various standard functional Computing Components (CC), such as adders, flip-flops, comparator, registers, multiplexers, demultiplexers, could be functionally integrated by using Functional Machines (FM) via switching-logic rules.

Furthermore, multiple standard functional computing components (CC) could be aggregated "purposely" via various communication linkages into various aspect-oriented Computing Modules (CM), such as various multiplexer/de-multiplexer-based input/output CMs, various flip-flop-based memory CMs and various control-register-adder aggregated central-process-unit CMs.

2.2 the Second Period (the First Evolutionary Node-Core Structure)

The second period began when the first electronic circuit-based "node computer" was invented. In 1945, von Neumann's computing machine was introduced by adding a CPU CM to aggregate with a memory CM and input/output CMs, yielding the first node computer "hardware architecture" based on these 3 node-based Basic Building Blocks (3-nBBB).

The first basic building block is the base-level Input/output-block, comprising an input and an output node-computing modules (nCM). The second basic building block is the mid-level memory block, comprising a memory-based nCM and the third basic building block is the top-level control block, comprising a CPU-based nCM. This 3-hierarchical-level-based 3-nBBB hardware architecture invented by von Neumann created the first "node-based Hierarchical Core structure (nHCS)" that was further equipped with "one overall Integration-control program. Subsequently, based on node-computing system's design-science, develop-technology and deploy-engineering disciplines, the first node-core generic computers were built for solving computing algorithm-based problems, such as sorting.

2.3 the Third Period (the Evolutionary Node-Core and Non-Evolutionary Node-Hub Entities)

The third period covers all the potential 3-nBBB architected node-based computing systems for solving real-world problems along the node-computing advancement timeline up to the present.

In early 1950s, by using different types of memory CMs for stored programs (ROM) and processing (RAM) to construct the memory-nBBB of the 3-nBBB architecture, the first "monolithic node-core structure was created. Subsequently, based on node-computing system's design-science, develop-technology and deploy-engineering disciplines, monolithic node-core computers were built in the first stage of the first generation along the node-computing advancement timeline, (i.e., nG1.1).

This type of nG1.1 monolithic node-core computers can be best illustrated by the IBM early-stage mainframes, using 3270 terminal, card-reader input devices, key-to-disc input devices and paper-printer output devices, and later in 1960s, array-PU vector Cray computers, which still were based on 3-nBBB-architected monolithic node-core structures.

In early 1980s, by using the existing node-core computers as the device nCMs to construct the base I/O-BBB, the improved main-master/slave DMA-based memory nCM to construct the mid-memory BBB and the high-performance CPU nCM to construct the top-control BBB, the second-stage (nG1.2) "singular high-performance (hp)-CPU" node-based "hierarchical (base-mid-top) core structure (nHCS)" was created.

This was the first time, an iterative progressive process, i.e., the evolutionary process had established. It is when the first improved nG1.1 node-cores readily became bigger integrable nCCs, which could be further aggregated into a bigger I/O device nCM to build the "base"-I/O BBB. Together with the improved Direct Memory Access (DMA)-based "mid"-memory-BBB, which can encapsulate all the attached I/O devices and the "top"-control-BBB equipped with high-performance CPU, which can run a top-level control program to manipulate a facility-control-based Disk Operating System (DOS)-enabled I/O device drivers, obeying the "functional-core-like" behavior and thereby creating a bigger hardware node core structure with better software problem-solving capabilities, i.e., the nG1.2 node-core structure. Subsequently, various "singular hp-CPU" node-core computers were built via node-computing system disciplines. This type of nG1.2 "singular hp-CPU" node-core computers can be best represented by DOS-based personal computers.

In 1990s, by adding "multiple hp-CPU nCMs" to construct the "top-BBB" instead of just using single hp-CPU, the third-stage (nG1.3) of node computing began. However, the 3-nBBB architected structure is not a node hierarchical-core structure, due to the fact that when multiple-CPU aggregated nCMs are added into the top-BBB, it will turn a MISO/SISO functional-compliant 3-nBBB "hierarchical core" structure into a Multiple-in/Multiple-out (MIMO)

non-functional compliant 3-nBBB "Aggregated-traffic spokes-based spokes-Hub" structure (AHS).

Then came the "main-memory-centric" facility-sharing traffic-control programs, dubbed the object-oriented Operating-Systems (OS) and object-oriented application programs, which are installed on this type of MIMO-cluster-structure, so that the object-oriented OS can control multiple application-processes to share a single master main memory without running into various parallel-processing dilemma, such as racing problems. Such "facility-sharing control based" object-oriented Operating Systems as WIN95, WinNT and the likes are prone to become bloated up with unnecessary complications due to the increments of hp-CPUs. Subsequently, various "multi hp-CPU" node-hub computers could be built via node-computing application system disciplines. This type of nG1.3 "multi hp-CPU" node-hub computers can be best illustrated by parallel-processing-based personal computers, super micros, minis and mainframe computers, each of which is equipped with a "non-standardized" facility-sharing control-based object-oriented Operating System to manage the processes of pre-developed object-oriented application programs.

There were no new 3-BBB-architected node-core structures evolved in the past 20 years, only a number of node-hub structure-based application computers fabricated to accommodate individual productivity problem domains.

Therefore, the only current way to accommodate those zone1 to zone4 collaborative problem domains is to use the most advanced nG1.4 multi-CPU-based node-hub computers as the zone-based application server systems. These disciplinary methods of building zone1 to zone4 client-server-based as well as peer-to-peer-based Application infrastructure systems (AISs) will unavoidably incur many drawbacks with limitations and especially unresolvable security and privacy dilemmas, as described earlier.

SUMMARY OF THE INVENTION

Based on the analyses on the limitations of node Evolutionary Principles (nEP) and node Theoretic-Foundations (nTF), particularly, nEP1-nTF1 and nEP2-nTF2 of the node-based Evolutionary Computing Paradigm (nECP) and the proposed ideal ECP, a workgroup-based Evolutionary Computing Paradigm (wECP) can be established to eliminate all the nECP limitations and weaknesses and continue the computing evolutionary pathway by using the node-core entities/systems as the integrable computing machineries to construct the workgroup Computing Components (wCC) in the first and earliest stage of wEP1-wTF1, starting the workgroup computing evolution.

1.0 wEP1/wTF1:

In view of the fail-over weakness of nEP1-nTF1, wEP1 is focused on a "workgroup fail-over architecture" and its derived wTF1 comprises the Hardware Architecture Theories (HAT) with Hardware Construction Methods (HCM) in creating early-stage "fail-over-capable" workgroup computing components (wCCs) and with Hardware Aggregation Methods (HAM) in aggregating these basic-few wCCs into standard fail-over workgroup-computing modules (wCMs).

2.0 wEP2/wTF2:

In view of the weak 3-nBBB evolutionary architecture of nEP2, wEP2 is focused on a "base/mid/top bottom-up hierarchical six workgroup Basic-Building-Block (6-wBBB) based evolutionary architecture". Its derived wTF2 comprises for the first-time Hardware Architecture Theory (HAT) with Hardware Construction Methods (HCM) for constructing these 6 wBBBs with wCCs & wCMs, and with Hardware Aggregation Methods (HAM) for aggregating them into a "fail-over" (base-mid-top) Hierarchical Core Structure (HCS) via various workgroup linkages.

Also, for the first-time "Generic "workgroup-core" Entity (wEntity)-oriented Software Architecture Theorem (SAT) with Generic wEntity-Integration Methods (Core-EIM) for creating Generic wEntity-oriented Operating Systems (OS), (including base-attribute aggregation/fail-over-OSs, mid-memory encapsulation/fail-over-OSs, top-control manipulation/fail-over-OSs), to bottom-up-integrate HCS into a "fail-safe" Generic w core" Entity, and with Generic wEntity-Programming Methods (Core-EPM) for generating Generic wEntity domain programs to equip the first-time Generic CE into a first-time generic core Entity Domain (CED) with all the potential integrated top-down core-control software capabilities.

Furthermore, the workgroup 6-wBBB-based evolutionary architecture can enable iterative progressive processes, meaning that any newly-created hardware core structures can readily become fail-over wCMs to construct the next 6 wBBBs for the next iteration, i.e., a new set of wHATs and wSATs to create even bigger and more sophisticated workgroup core entities. This iterative progressive process never needs to stop and can be dubbed as the "workgroup evolutionary process".

3.0 wEP3/wTF3:

The wEP3 is thus focused on the long-lasting workgroup evolutionary processes to accommodate all the real-world class-1 innate-unitary, class-2 collaborative-zone and class-3 cooperative-cloud problem-solving domains. The workgroup evolutionary processes will cover 7-generations to create a plurality of workgroup core entities to accommodate the following 7-level real-world problem-solving domains. They are 1) production domains, to the 2) multi-production assembly domains, to the 3) multi-assembly fabrication domains, to the 4) multi-fabrication transaction domains, to the 5) multi-transaction organization-centric unitary/zone/cloud domains, to the 6) multi-transaction workgroup apparatus-centric unitary/zone/cloud domains and to the 7) multi-transaction workgroup personal digital assistant (PDA)-centric unitary/zone/cloud domains.

Therefore, the first-generation evolution of wEP3 is to establish a workgroup-production Evolutionary Architecture (EA) with its derived wTF3.wG1.stages (HATs/SATs), creating a series of multi stage-evolved Task-wEntities, as illustrated in FIG. 8.

Moreover, when all the possible sophisticated Task-wEntity are created, it is only natural to use these first generation Task-wEntity cores as the basic "fail-over-3" wCMs, to create a new set of standard fail-over wCMs for constructing a new set of 6 wBBBs. Based on a new evolutionary process with a new set of HAT/SAT, multiple Task-wEntity cores can be bottom-up symbiotically integrated into the first-time second generation "Job" wEntity core.

Therefore, the wEP3-derived wTF3 comprises not only the multiple-stage evolutionary process involved HATs/SATs, but also up to the $7^{th}$ workgroup generation-based evolutionary process involved HATs/SATs. In general nomenclature description, the wTF3.G.s-(HAT/SAT) evolutionary processes can be used to describe the creation of all the workgroup core entities populated on the real-world workgroup evolutionary pathway along the workgroup evolutionary timeline.

4.0 the Must have New and Better wECP

Furthermore, based on workgroup-Core-Entity System Disciplines wCE-SD(1-3), all the 7-generation evolved workgroup core entities from the smallest to the largest, can be scientifically-designed, technologically-developed and engineering-deployed into 7-generation workgroup core entity systems for accommodating real-world Class-1 innate-problem solving, Class-2 collaborative-problem solving and Class-3 cooperative-Internet-service-oriented problem solving. They are the first generation real-time complex workgroup-production Task-core unitary systems, as illustrated by FIG. 8. The second generation real-time diverse workgroup assembly Job-core unitary systems, the third generation real-time dynamic workgroup-fabrication Case-core unitary systems, the fourth generation real-time intelligent workgroup-transaction Contract-core unitary systems, as illustrated by FIG. 9, the fifth generation real-time intelligent workgroup-organization-centric unitary/zone/cloud systems, the sixth generation real-time intelligent apparatus unitary/zone/cloud systems and the seventh generation real-time intelligent workgroup-PDA unitary/zone/cloud systems, as illustrated in FIG. 10, which also shows that the workgroup evolutionary processes can still potentially cultivate the eighth generation evolutionary pathway along the workgroup evolutionary timeline, if necessary.

Based on the illustrations by FIG. 8/9/10 and the rationale of generic computing nomenclature illustrated by FIG. 7, the nomenclature for workgroup Evolutionary Computing Paradigm (wECP) can be established with five (5) fundamentals, comprising principles, theories and system disciplines, which can be concluded as follows: 1) workgroup-entity evolutionary principles (wEPs), 2) workgroup-entity theoretic foundations (wTFs), 3) workgroup unitary system Science/Technology/Engineering Disciplines (wSTE-uSDs), 4) workgroup zone system Artificial-Intelligent Engineering Disciplines (wAI/E-zSDs) and 5) workgroup cloud system Swarm-intelligent engineering disciplines (wSI/E-cSDs).

In short-form expression, wECP=Period-1 {wEP1-wTF1 (wHAT1)-wSD1s}+Period-2 {wEP2-wTF2 (wHAT2+wSAT2)-wSD2s}+Period-3 {wEP3-nTF3.generation (1-7) .stages (wHAT3+wSAT3)-uSDs-zSDs-cSDs}.

Guided by wECP, the right course of action is to break down, enhance and upgrade non-evolvable node-application systems into integrable computing machineries, which can be used to construct the multi-node/multi-link-aggregated workgroup Computing Components (wCCs) and real-time fail-over workgroup Computing Modules (wCMs) in the first period along the workgroup computing evolutionary timeline.

Based on these fail-over wCMs, the first workgroup-computing-entity-based fail-safe/evolvable hardware core structure of 3-hierarchical-level 6-workgroup-Basic-Building-Block (6-wBBB), can be created to supplant the node-computing-entity-based non-fail-safe/limited evolvable von-Neumann core structure of 3-hierarchical-level 3-node-BBB, (i.e., base-level 10-devices/mid-level main memory/top-level CPU) and all the first-time fail-safe workgroup systems can be subsequently generated in the second period along the workgroup-computing evolutionary timeline.

Furthermore, based on the first 6-wBBB evolvable architecture, the workgroup evolutionary processes can go up to 7 generations in creating all the necessary workgroup-computing core entities. They are generation-1 real-time complex workgroup production unitary-core entities, generation-2 real-time diverse workgroup-assembly unitary-core entities, generation-3 real-time dynamic workgroup-fabrication unitary-core entities, generation-4 real-time cognitive-interactive workgroup-transaction unitary-core entities, generation-5 real-time intelligent organization standard unitary-core entities, generation-6 real-time intelligent apparatus compact unitary-core entities and generation-7 real-time intelligent PDA miniature unitary-core entities. Consequently, all the 7-generation real-time intelligent workgroup-computing systems can be generated via workgroup system disciplines in the third period along the workgroup-computing evolutionary timeline.

5.0 the Advantage of wECP

The nECP that generates all the application-based unitary/zone/cloud systems for providing Internet-oriented services with unresolvable weaknesses in security, reliability and proactivity is bound to shift to the wECP that can generate real-time "innate-intelligent" workgroup-unitary system, real-time "strong-AI" (artificial-intelligent) workgroup-zone systems and real-time "strong-SI" (swarm-intelligent) workgroup-cloud systems for providing Internet-oriented services for any individual, anytime and anywhere with real-time security, real-time reliability and real-time proactivity, fending off hacking, guaranteeing trustable integrity and protecting user's privacy.

6.0 the Overall Disclosure of wECP-wTF(1-3)

It will thus be seen that the new and better workgroup Evolutionary Computing Paradigm (wECP), comprising wEP(1-3)-EAs, wTF(1-3)-(HATs/SATs) and wCE-SD3-(STE-D) can be established to supplant the node Evolutionary Computing Paradigm, comprising nEP(1-3)-EAs, nTF (1-3)-(HAT/SAT), nCE-SD3-(STE-D) and non-evolutionary object-oriented Operating Systems and application programming methods, so that all the node-computing based AISs' drawbacks and unsolvable transactional security and privacy dilemmas can be resolved.

It can also be concluded that the most important part of wECP is the innovative second fundaments, i.e., wTF(1-3), which are derived from workgroup evolutionary principles wEP(1-3) that are embedded with rational evolutionary philosophy on the must-have fail-over and fail-safe evolutionary architectures.

The first and foremost innovation about workgroup computing should be focused on wTF(1-3)-based workgroup Hardware Architecture Theory (wHATs) with its related methods, which solidify the concept that every bigger workgroup core entity's hardware structure must first be created by a workgroup evolutionary hardware architecture theory. Then, based on these created workgroup hardware structures, all the ensuing software OS integration and software programs generation can be developed via workgroup core entity duality-dictated Software Architecture Theorems (wSATs). Furthermore, real-time intelligent workgroup-computing systems can be generated via workgroup core entity-based system disciplines. Just like the von Neumann hardware architecture theory creates the first node-based 3-level hierarchical core structures, (i.e., base-level IO-devices, mid-level main memory and top-level CPU), which can be based on in generating all the von Neumann-based node-computing systems accordingly.

Since disclosing all the second fundamental of wECP-2, i.e., wTF(1-3), will be too voluminous to be included in one disclosure. It is preferred to separate the overall wTF(1-3) disclosure into three phases. The first-phase which describes the fail-over hardware architecture theories (HATs) in wTF1 for creating the fail-over wCCs and wCMs, HATs in wTF2 for creating the first-time 6-wBBB-architected Hierarchical core-structures (HCS), and HATs in wTF3.G.s for creating up to the seven (7)-generation-based Hierarchical Core Structures (HCS).

The second-phase will describe the wTF3.G-SAT-EIMs for creating all the seven (7)-generation-based core Entity-oriented OSs, from the Task-core wEntity-OSs to PDA-core entity-OSs.

The third-phase will describe all the wTF3.G.s-SAT-EPMs for creating all the 7 generation-based real-time generated workgroup core entity-domain programs, from wGeneration-1.stages task-unitary-core entity domain programs to wGeneration-7.stages PDA unitary-core entity domain programs by using natural languages.

As for the third fundamental of wECP involving all the innovative workgroup unitary system disciplines, the fourth fundamental of wECP involving all the innovative workgroup zone system disciplines and the fifth fundamental of wECP involving all the workgroup cloud system disciplines will be disclosed in phases accordingly, after the second fundament wTF(1-3) disclosures are all applied, due to the fact that without completing wTF(1-3) to create all the real-time intelligent workgroup core entities, the workgroup unitary-core/zone-core/cloud-core systems cannot be realized anyway.

BRIEF DESCRIPTION OF THE DRAWINGS

So that the manner in which the above recited features, advantages and objects of the present invention are attained and can be understood n detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit other equally effective embodiments.

1.0 nECP: Node Evolutionary Computing Paradigm

Figure 1:
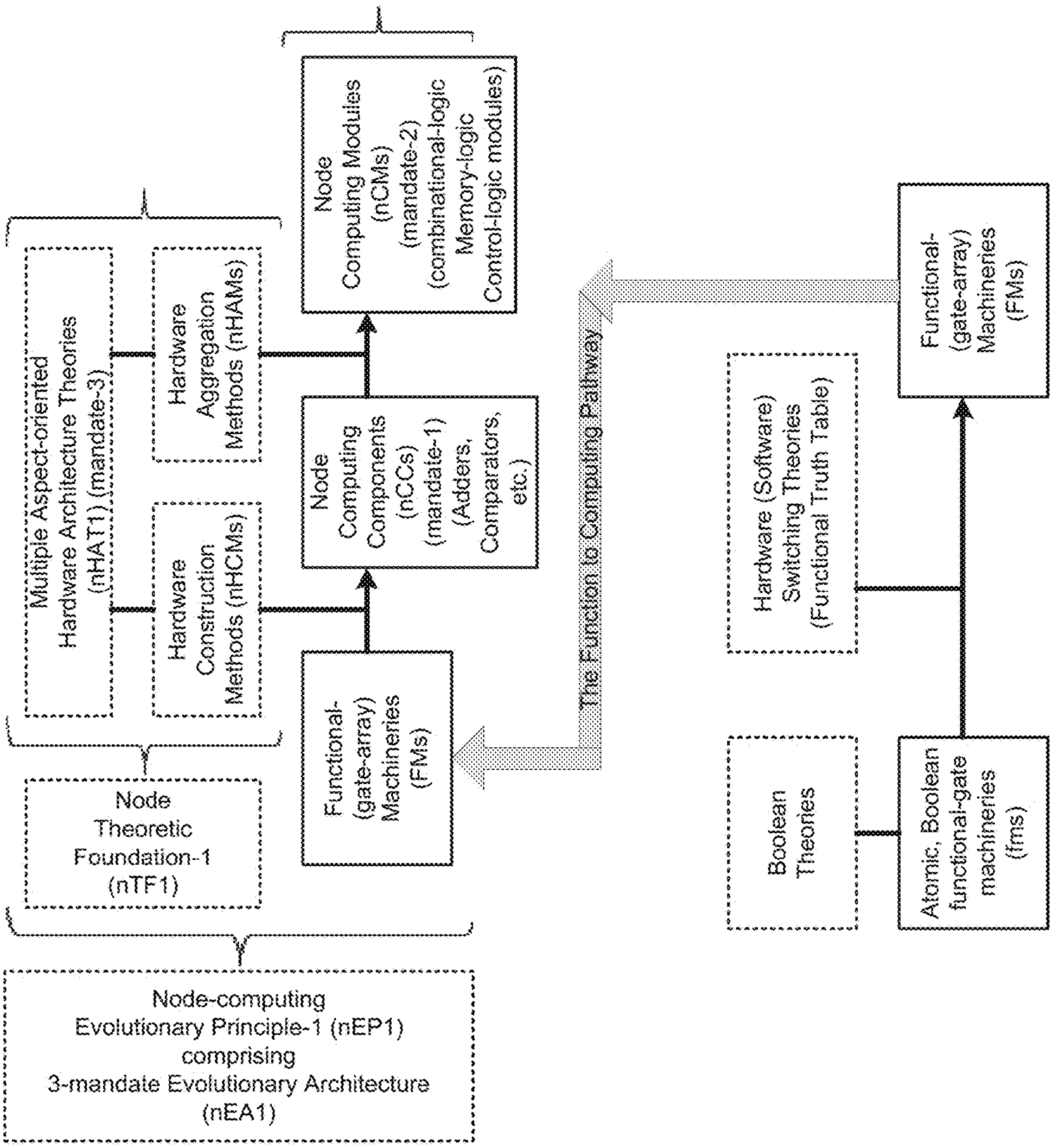

FIG. 1 is a block diagram depicting an exemplary embodiment of the current disclosure of a computer system with node computing components and node computing modules where nEP1: (3-mandate)-nEA1 and derived nTF1: (Mandate-3)-nHAT1, creating node-Computing Components (nCCs) and node-Computing Modules (nCMs).

Figure 2:
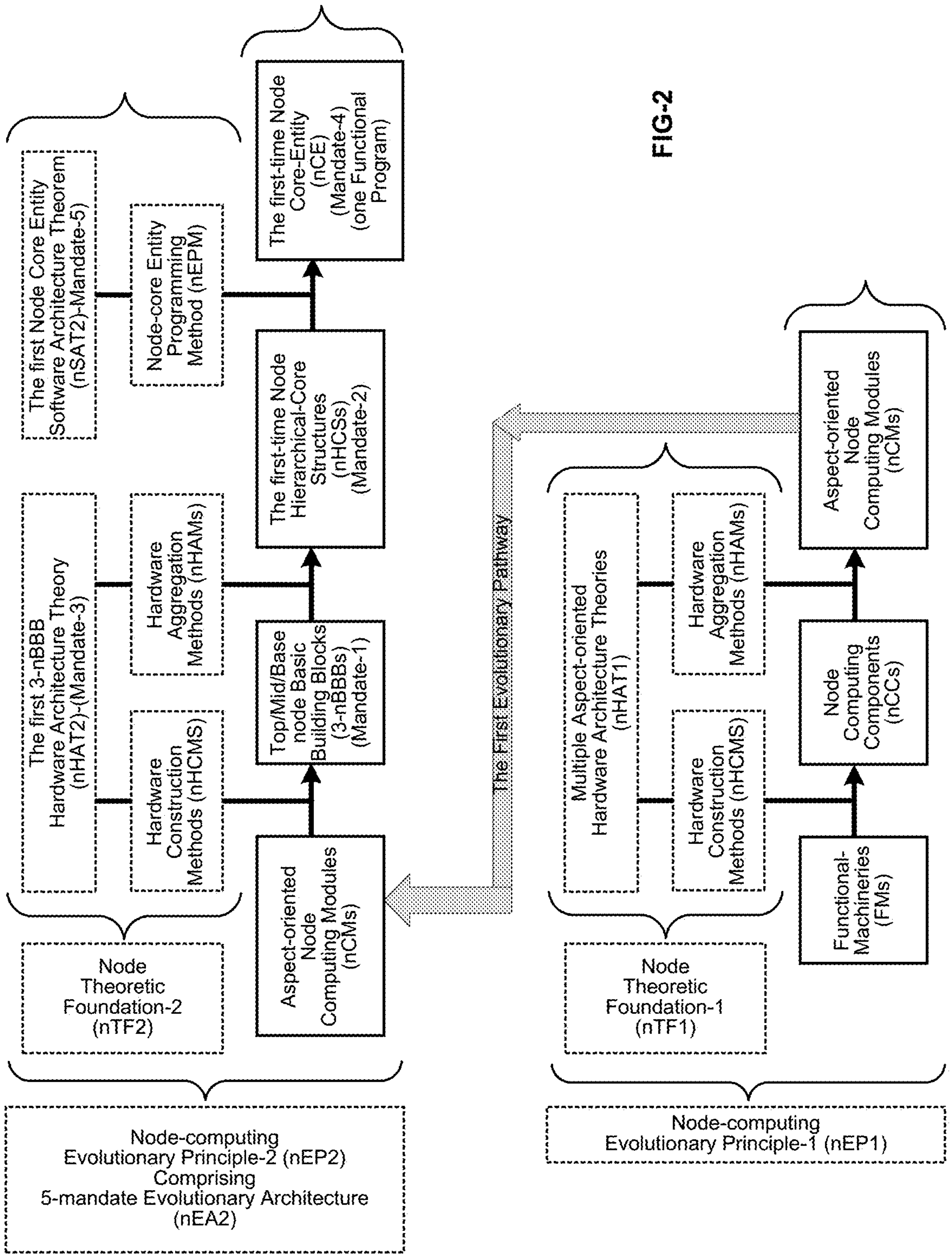

FIG. 2 is a block diagram showing an exemplary embodiment of the current disclosure of a computer system with node hierarchical core structure and node core entities where nEP2: (5-mandate)-nEA2 and derived nTF2: (Mandate-3)-nHAT2+(Mandate-6)-nSAT2, creating 3-nBBBs, node Hierarchical Core structure (nHCS) and node-Core Entities (nCEs).

Figure 3:
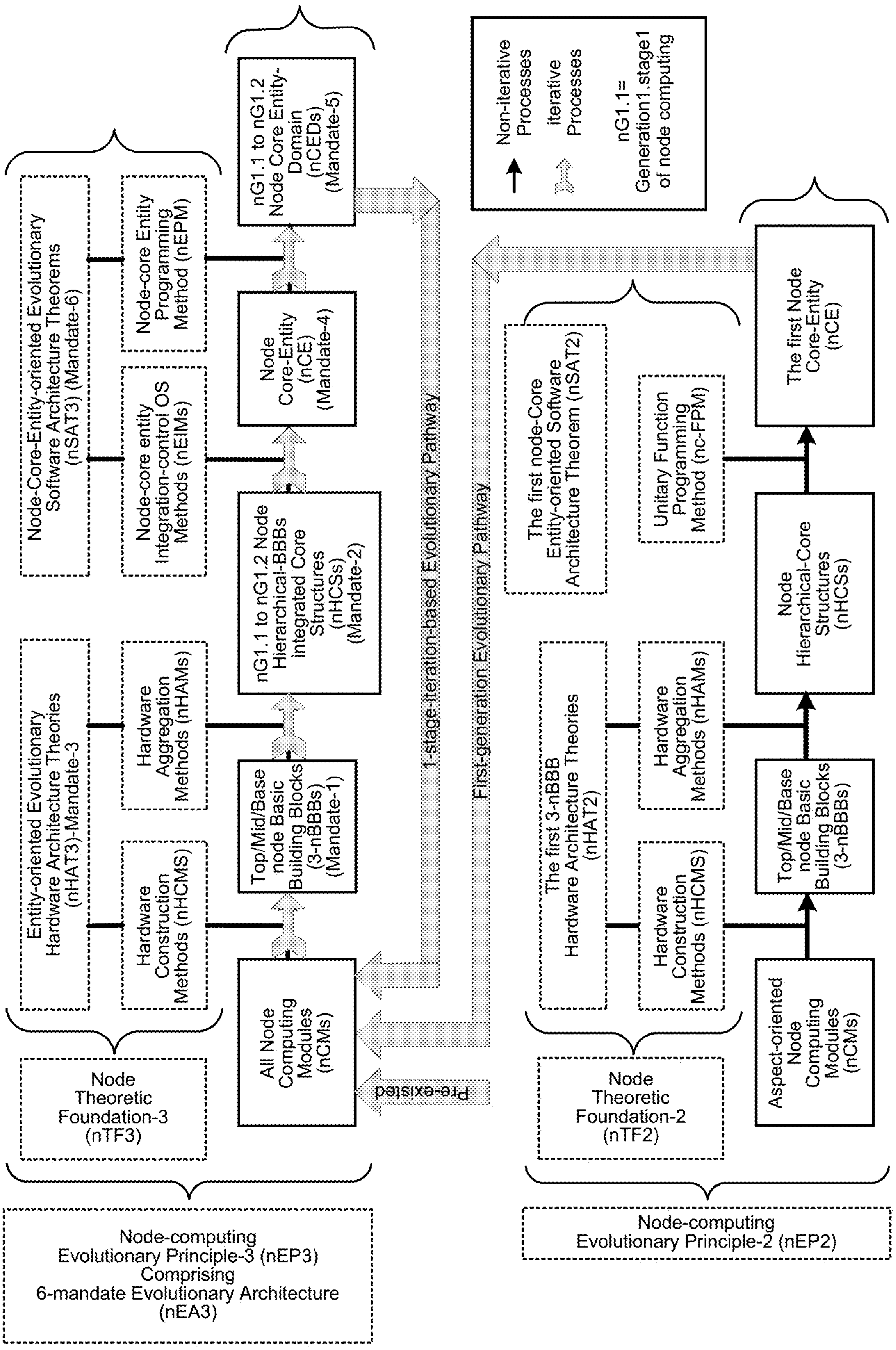

FIG. 3 is a block diagram illustrating an exemplary embodiment of the current disclosure of a computer system with node core entities and node core entities domains where nEP3: (6-mandate)-nEA3 and derived nTF3: (Mandate-3)-nHAT3+Mandate-6)-nSAT3, creating 3-nBBBs, nHCSs, node-Core Entities (nCEs) and node Core-Entity Domains (nCEDs).

Figure 4:
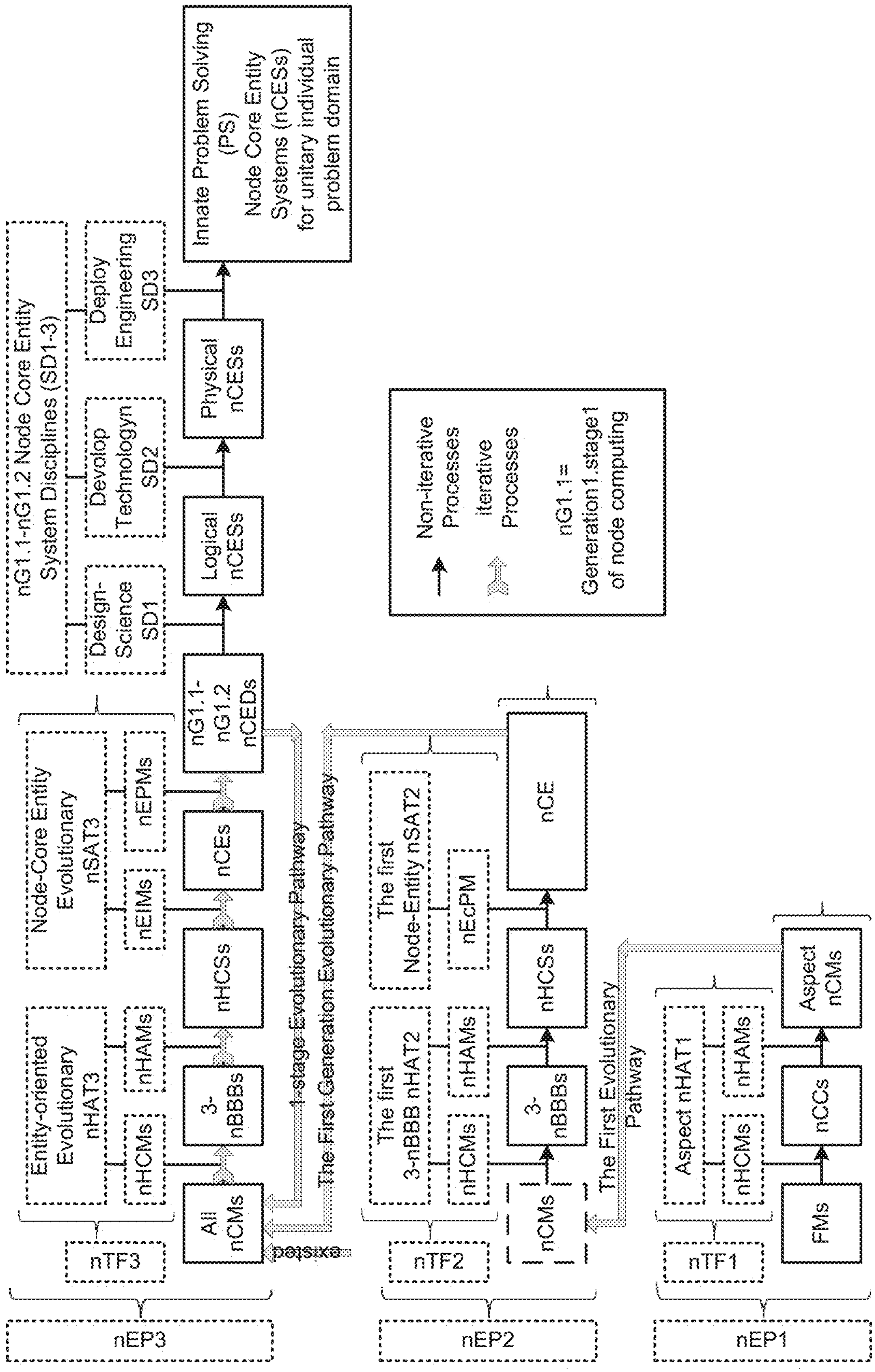
Figure 5:
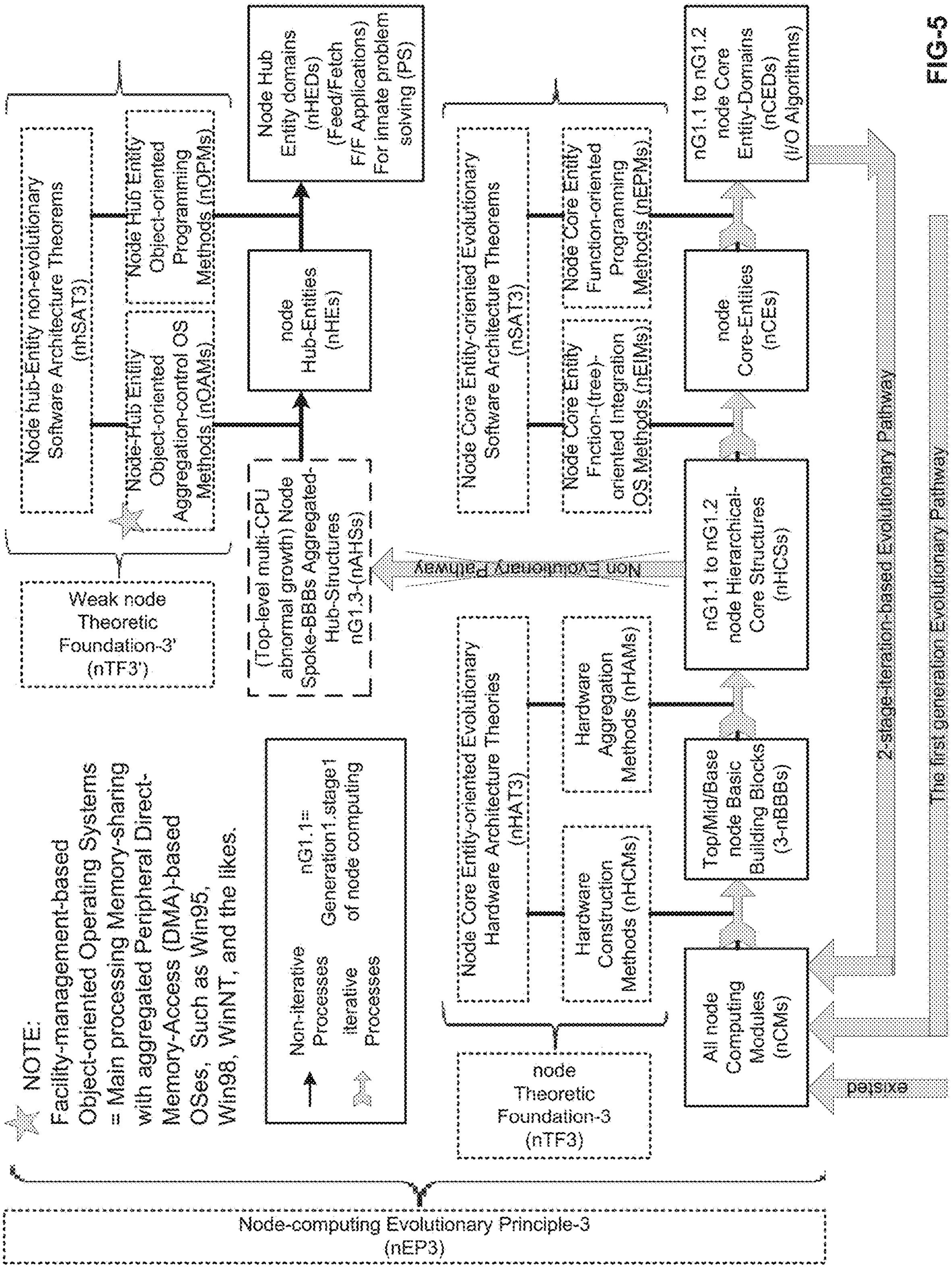

FIG. 4 is a block diagram showing an exemplary embodiment of the current disclosure of a computer system with node core entity systems for innate problem solving where nEP3:nTF3 and derived node-core Entity System Disciplines (nCE-SD), creating node-core Entity Systems (nCESs) for innate problem solving FIG. 5 is a block diagram depicting an exemplary embodiment of the current disclosure of a computer system of Non-evolutionary object-oriented methods using during node-Generation1.stage3 (nG1.3), creating node-Aggregated-Hub-Structures (nAHSs), node-Hub Entities (nHEs) and node-Hub Entity Domain (nHEDs) with (pre-developed/injected) application programs for pre-defined problem solving.

Figure 6:
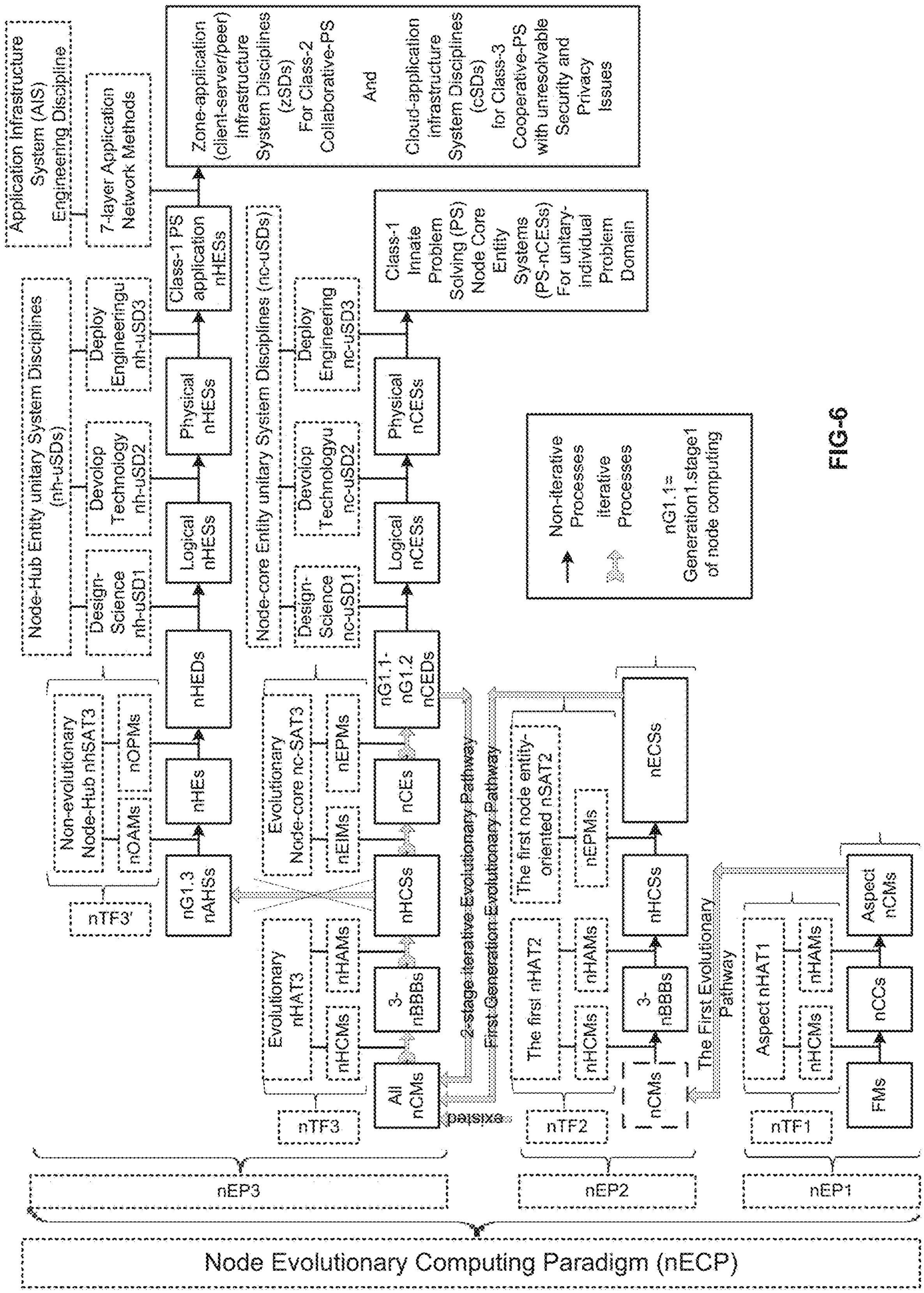

FIG. 6 is a block diagram of an exemplary embodiment of the current disclosure of a computer system where nECP and its cessation of evolution (no further evolutionary pathway), creating object-oriented Class-1 injected-Problem-solving-application unitary-Hub-entity Systems with applications, Class-2-collaborative-Problem solving application zone-infrastructure (entity) Systems, i.e., Zone-application infrastructure systems, and Class-3-cooperative-problem solving application cloud-infrastructure Systems, i.e., Cloud-Application infrastructure systems.

2.0 wECP: Workgroup Evolutionary Computing Paradigm

Figure 7:
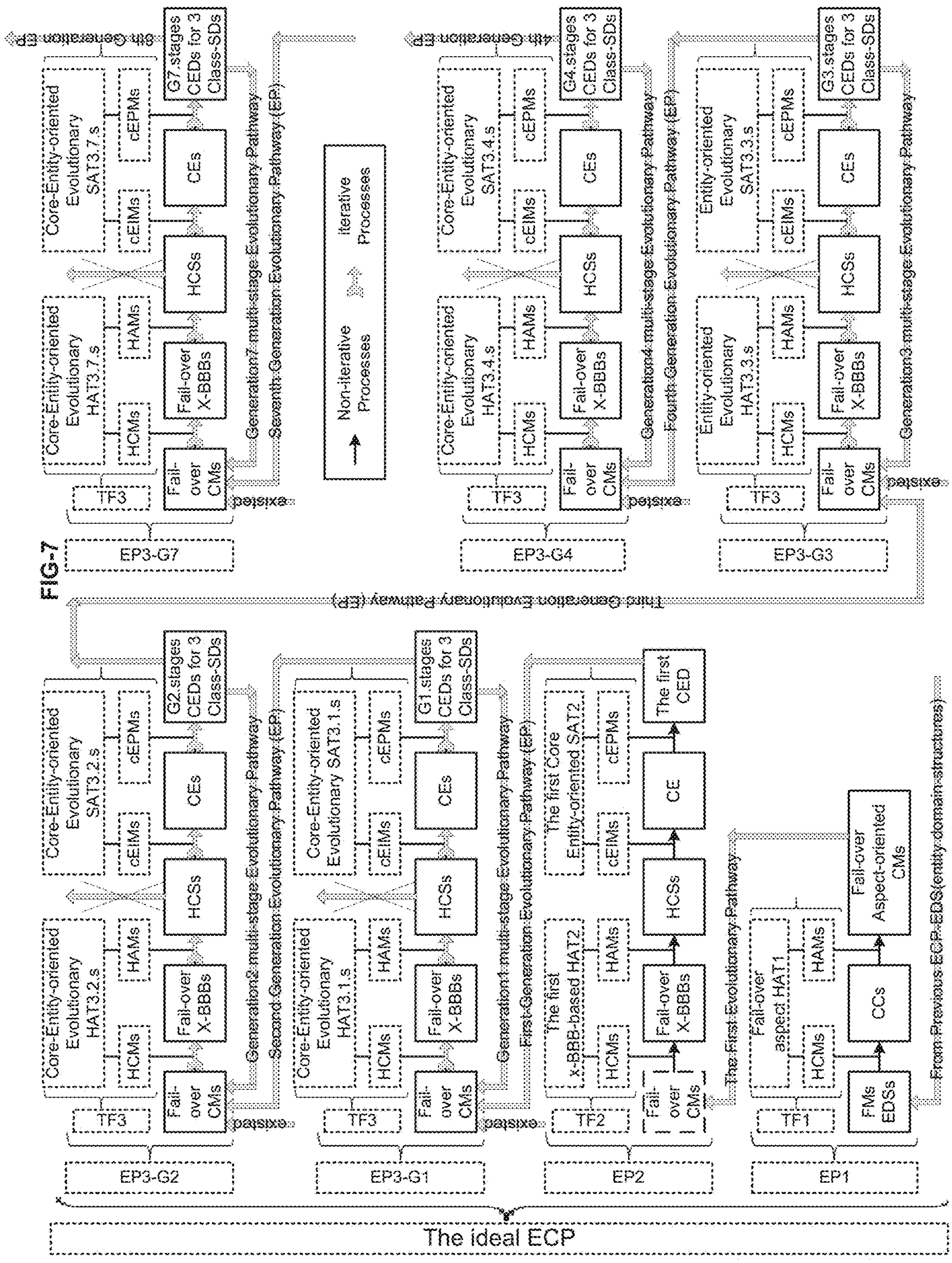

FIG. 7 is a block diagram illustrating an exemplary embodiment the current disclosure of ECP with long-lasting evolutionary processes, comprising EP1, EP2 and EP3-Generations.stages evolved Core-Entities and Core-Entity Domains (CEDs).

Figure 8:
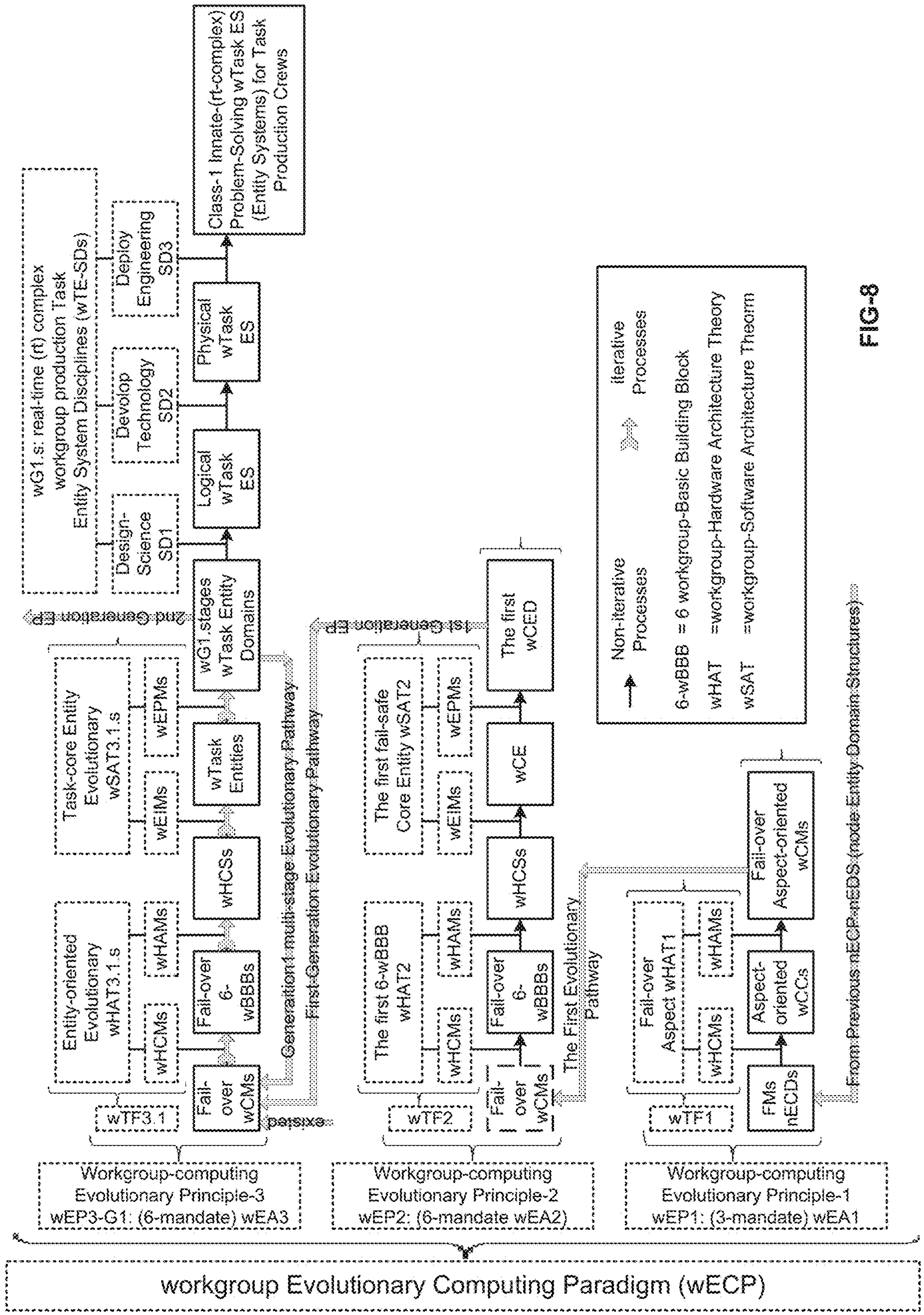

FIG. 8 is a block diagram depicting an exemplary embodiment of the current disclosure of workgroup ECP (wECP) up to workgroup-Generation1.stages (wG1.s) wEntities and Class-1 wEntity Systems.

Figure 9:
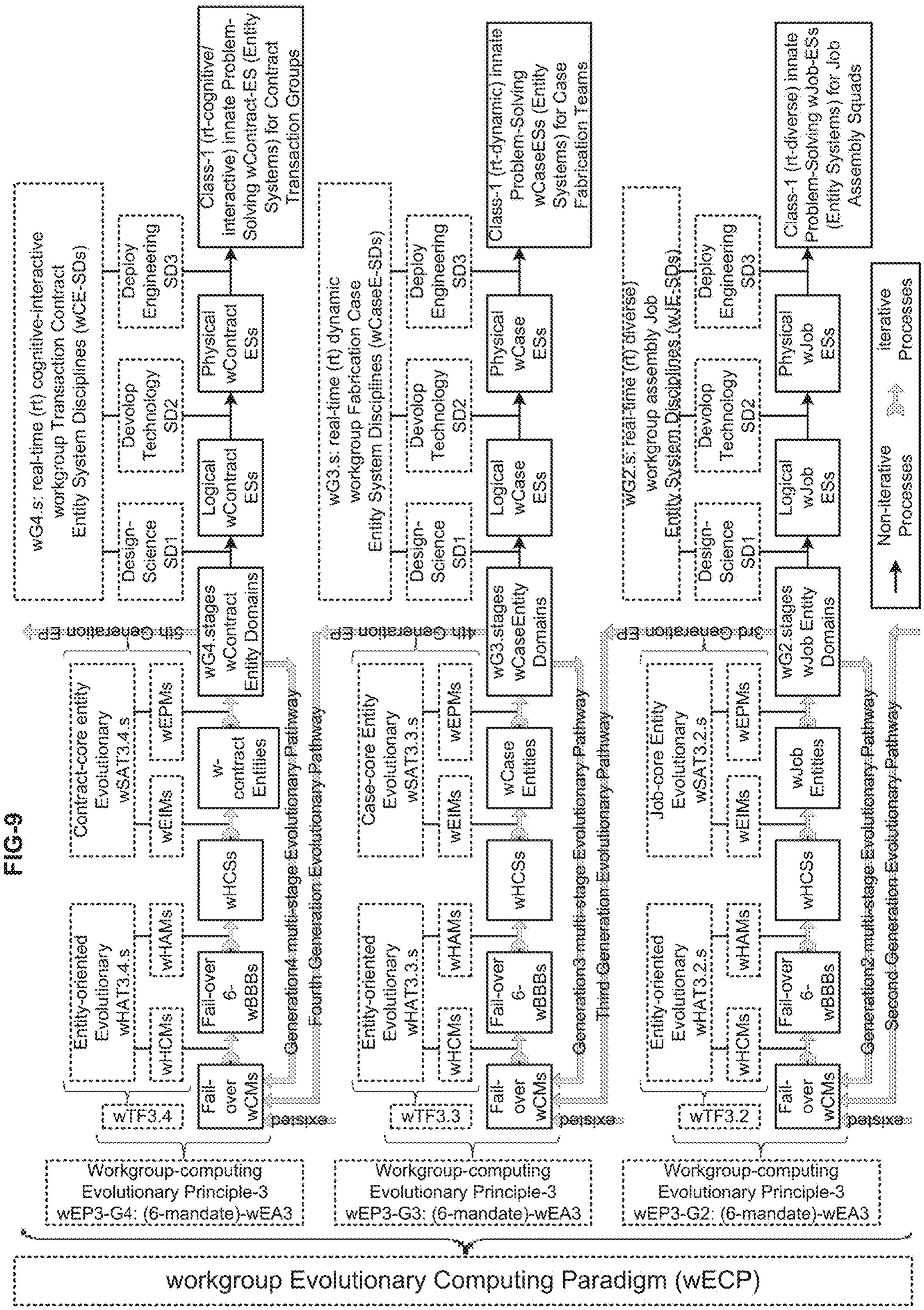

FIG. 9 is a block diagram showing an exemplary embodiment of the current disclosure of workgroup ECP (wECP) up to workgroup-Generation4.stages (wG4.s) wEntities and Class-1 wEntity Systems.

Figure 10:
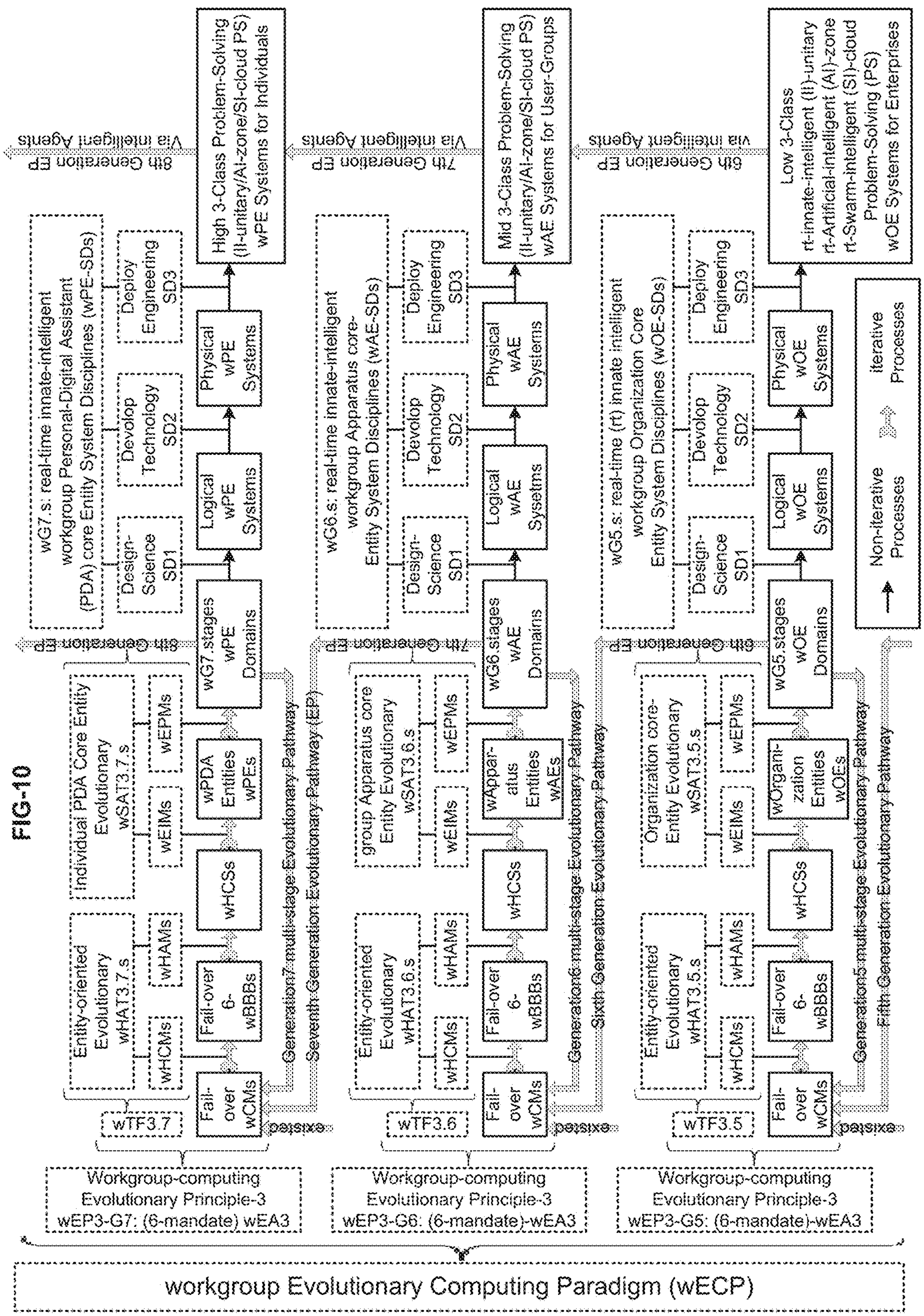

FIG. 10 is a block diagram illustrating an exemplary embodiment of the current disclosure of workgroup ECP (wECP) up to the future Generation7.stages (wG7.s) wEntities and Class-1, 2, 3 wEntity Systems.

3.0 wEP1-(wfo) EA1/TF1-HAT (HCM+HAM)

Figure 11:
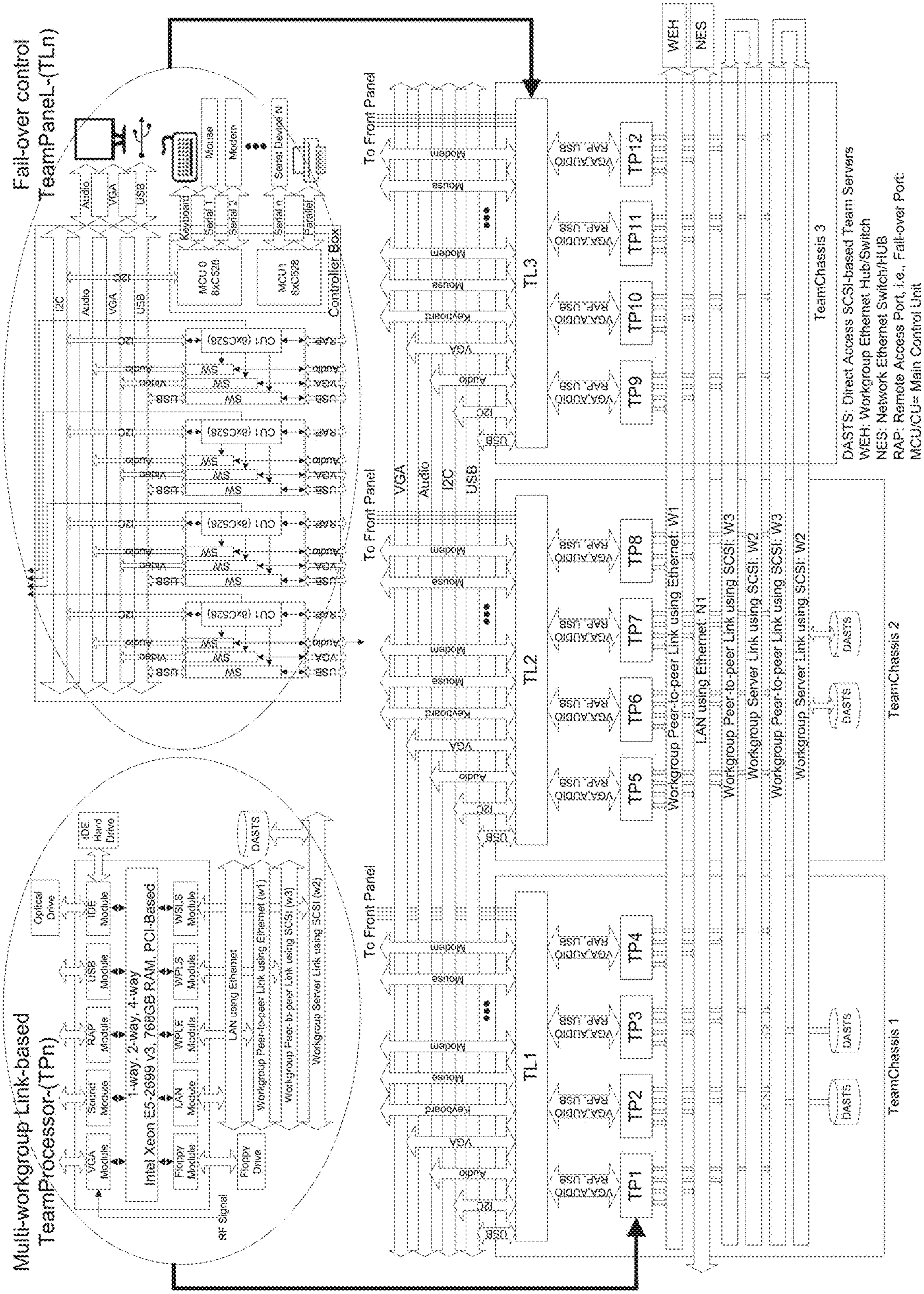

FIG. 11 is a block diagram illustrating an exemplary embodiment of the current disclosure of a Self-managing fail-over expandable Workgroup Server Array (WSA), defining workgroup-Ethernet-link (w1), workgroup-server-link (w2) and workgroup-peer-to-peer link (w3) and creating TeamProcessors, TeamPanels, TeamServers FIG. **12*a*** is a block diagram depicting an exemplary embodiment of the current disclosure of (w2)-aWSA1=(w2)-directional attribute-based Workgroup Server Array (i+2)-type1 with expandable i-parameter.

FIG. **12*b*** is a block diagram showing an exemplary embodiment of the current disclosure of (w2/w3-hybrid)-aWSA2=directional/bi-directional attribute-based Workgroup Server Array (i+2)-type2.

FIG. **13*a*** is a block diagram illustrating an exemplary embodiment of the current disclosure of (w2)-mWSA1=(w2)-directional 2 (multi-strand)-sided memory-based WSA (3)-type1-version1.

FIG. **13*b*** is a block diagram depicting an exemplary embodiment of the current disclosure of (w2)-mWSA2=(w2)-directional 2 (multi-strand)-sided memory-coupling WSA (3)-type1-version2.

FIG. **13*c*** is a block diagram showing an exemplary embodiment of the current disclosure of (w3)-mWSA3=(w3)-bi-directional 4 (single-strand)-sided memory-based WSA (3)-type2-version3.

FIG. **13*d*** is a block diagram showing an exemplary embodiment of the current disclosure of (w3)-mWSA4=(w3)-bi-directional 2-(multi-strand)-sided memory-based WSA (3)-type2-version4.

FIG. **13*e*** is a block diagram depicting an exemplary embodiment of the current disclosure of (w3)-mWSA5=(w3)-bi-directional 3-(multi-strand)-sided memory-based WSA (3)-type2-version5.

Figure 13A:
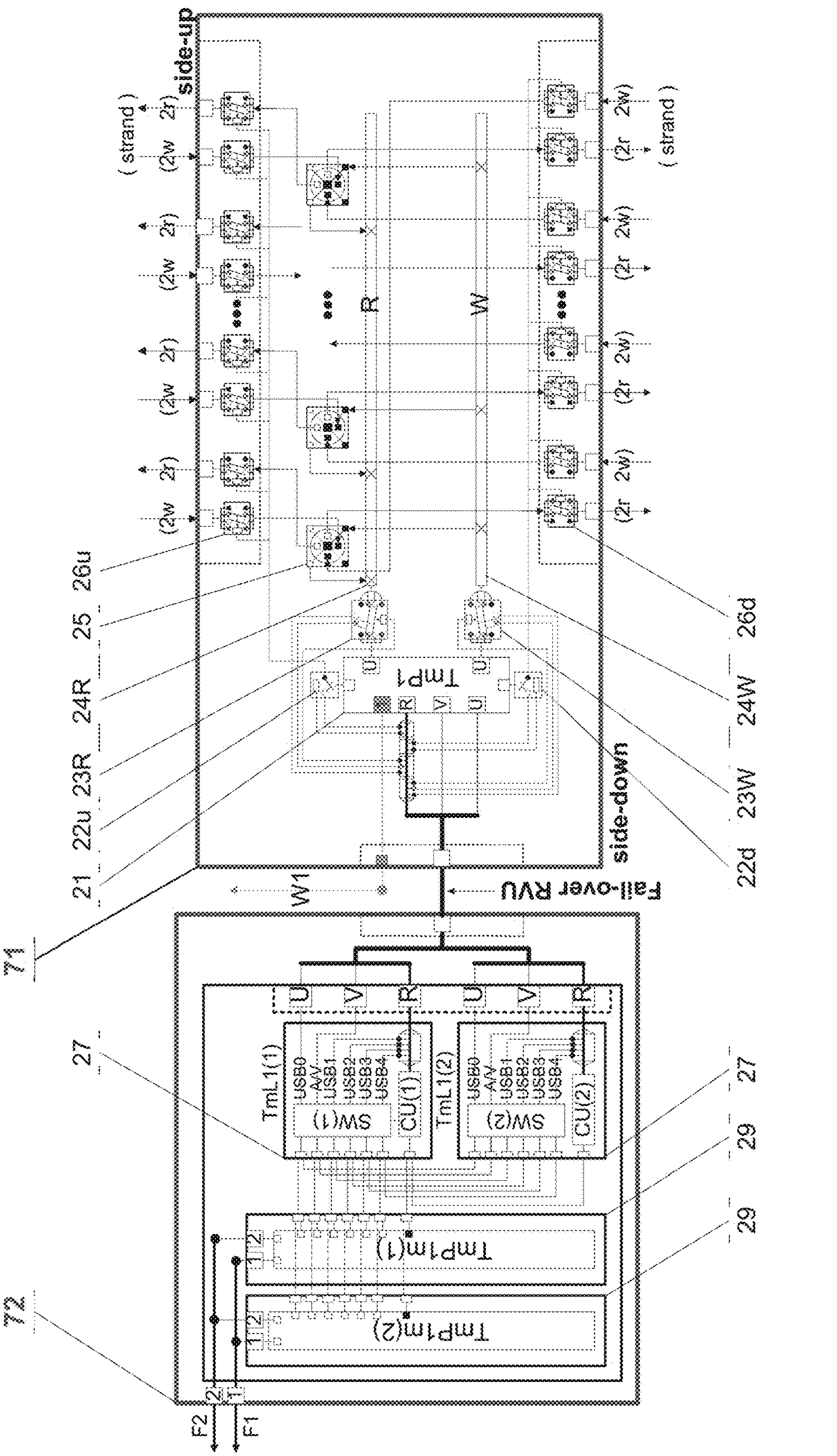
Figure 13B:
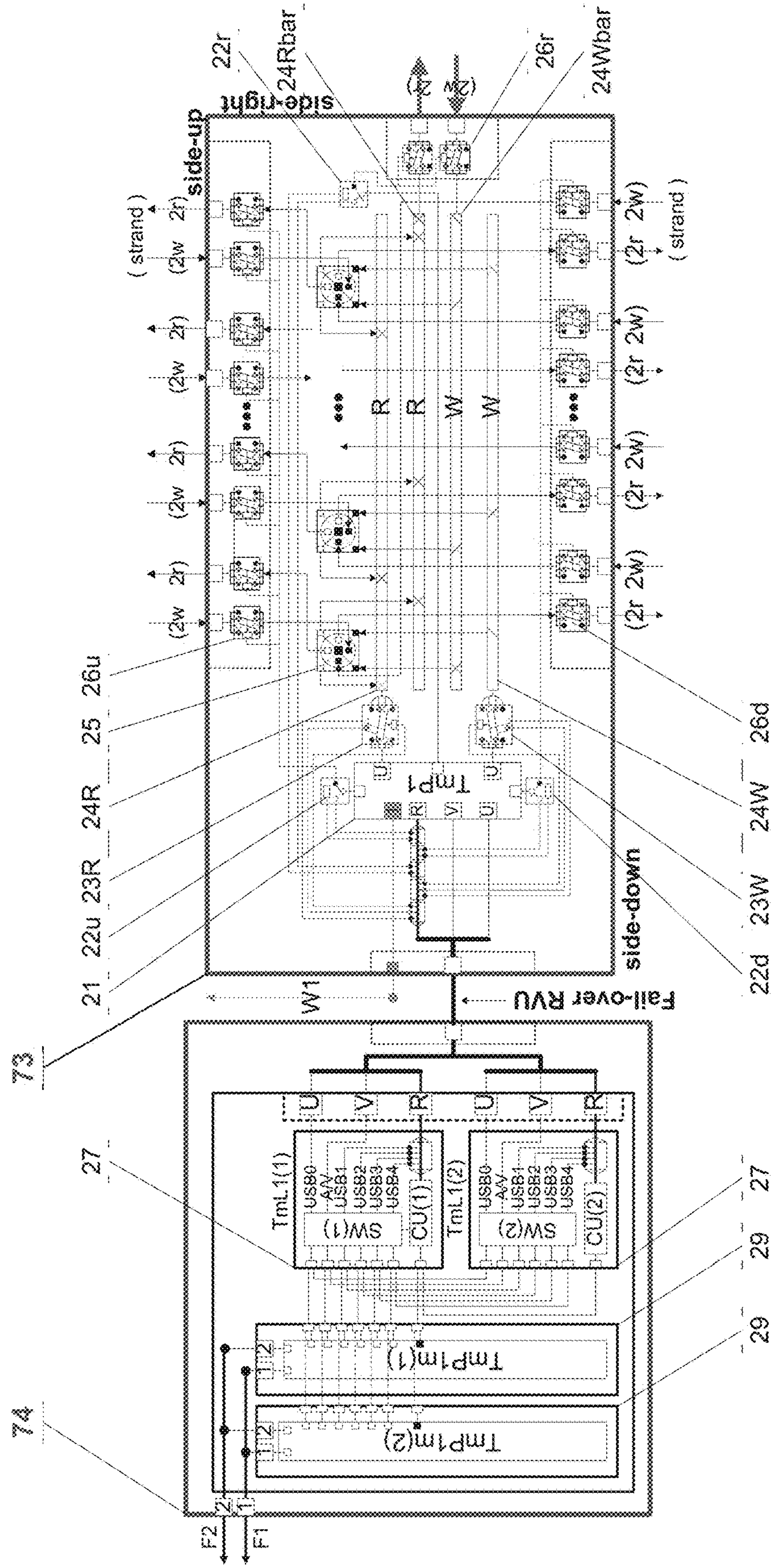
Figure 13C:
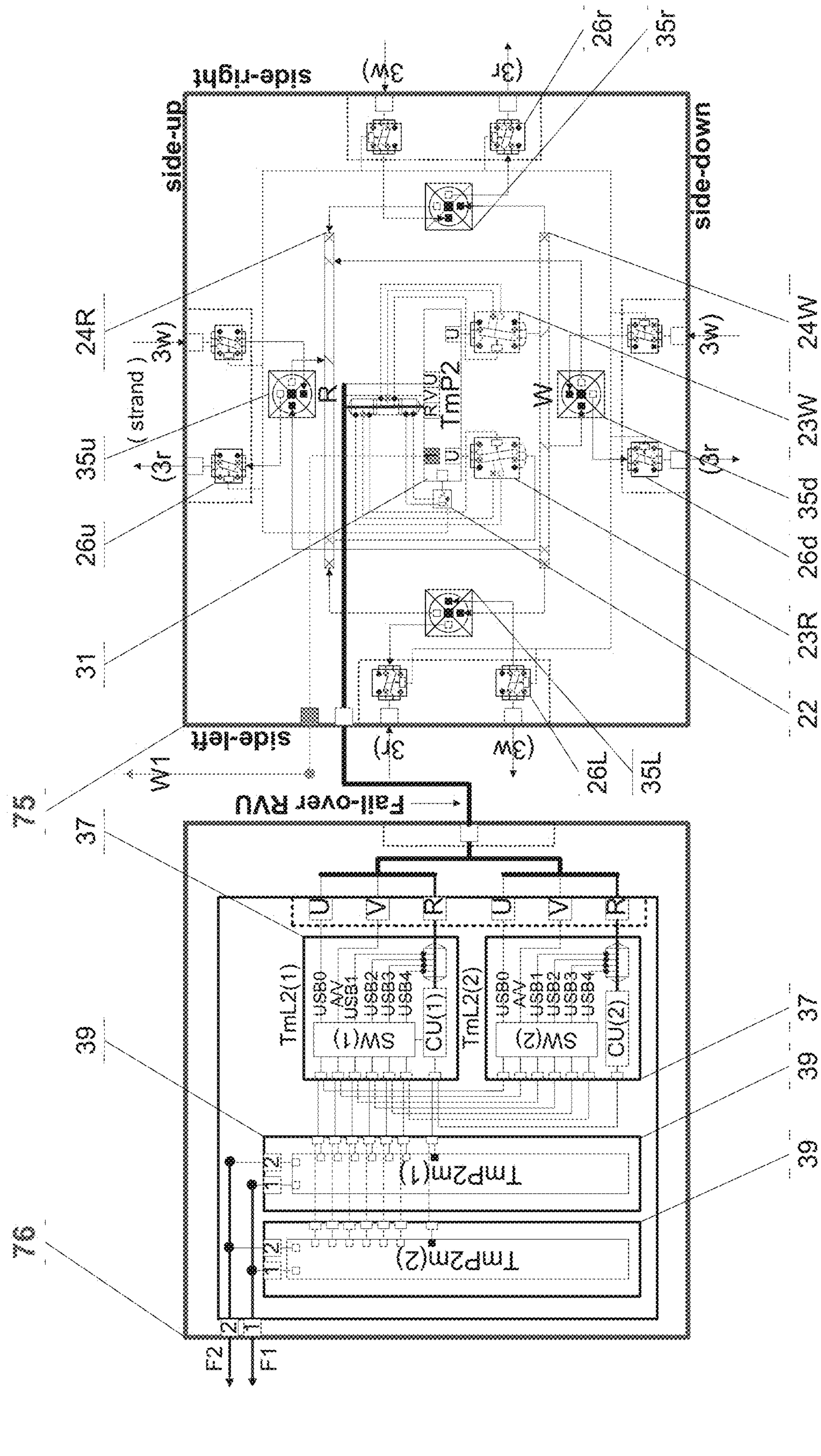
Figure 13D:
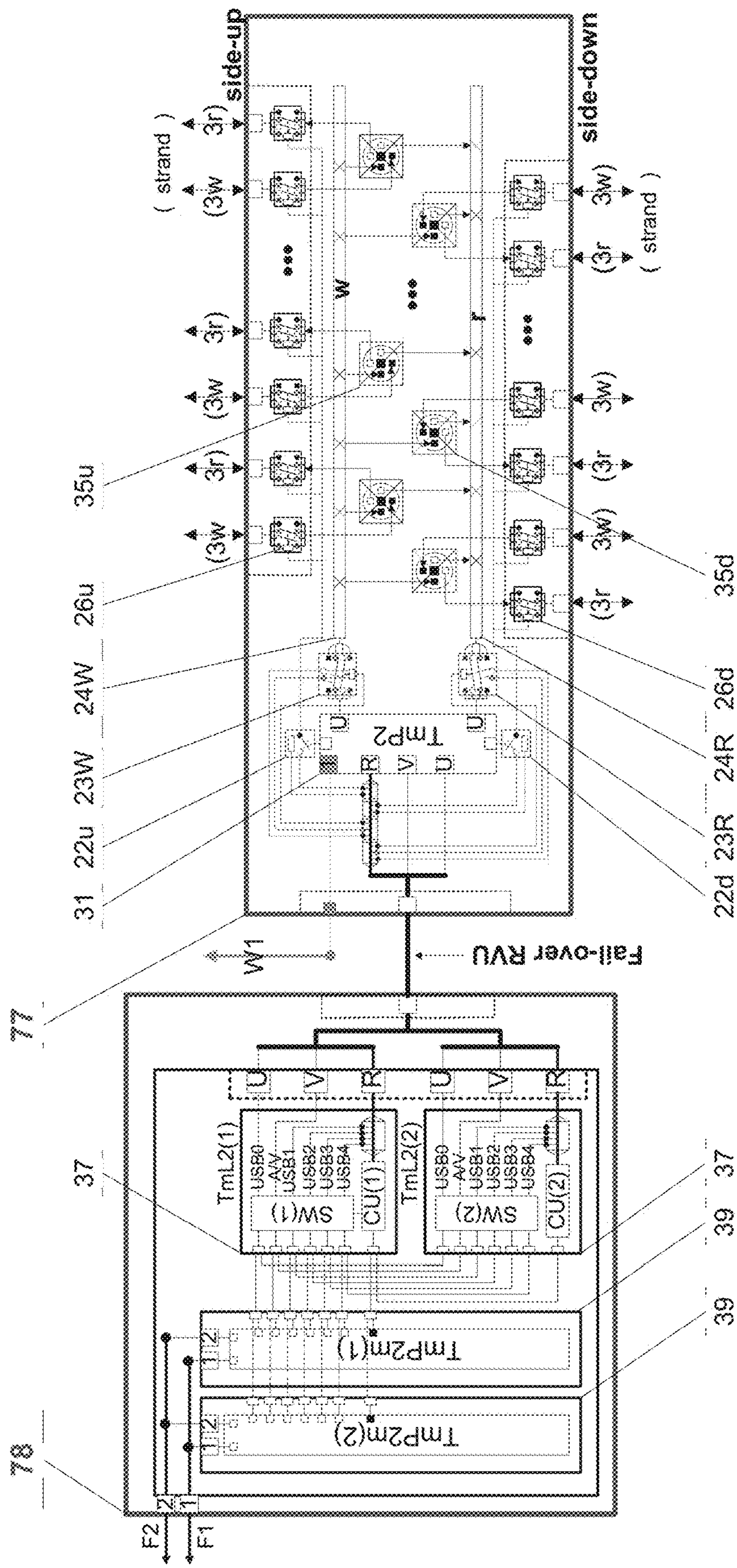
Figure 13E:
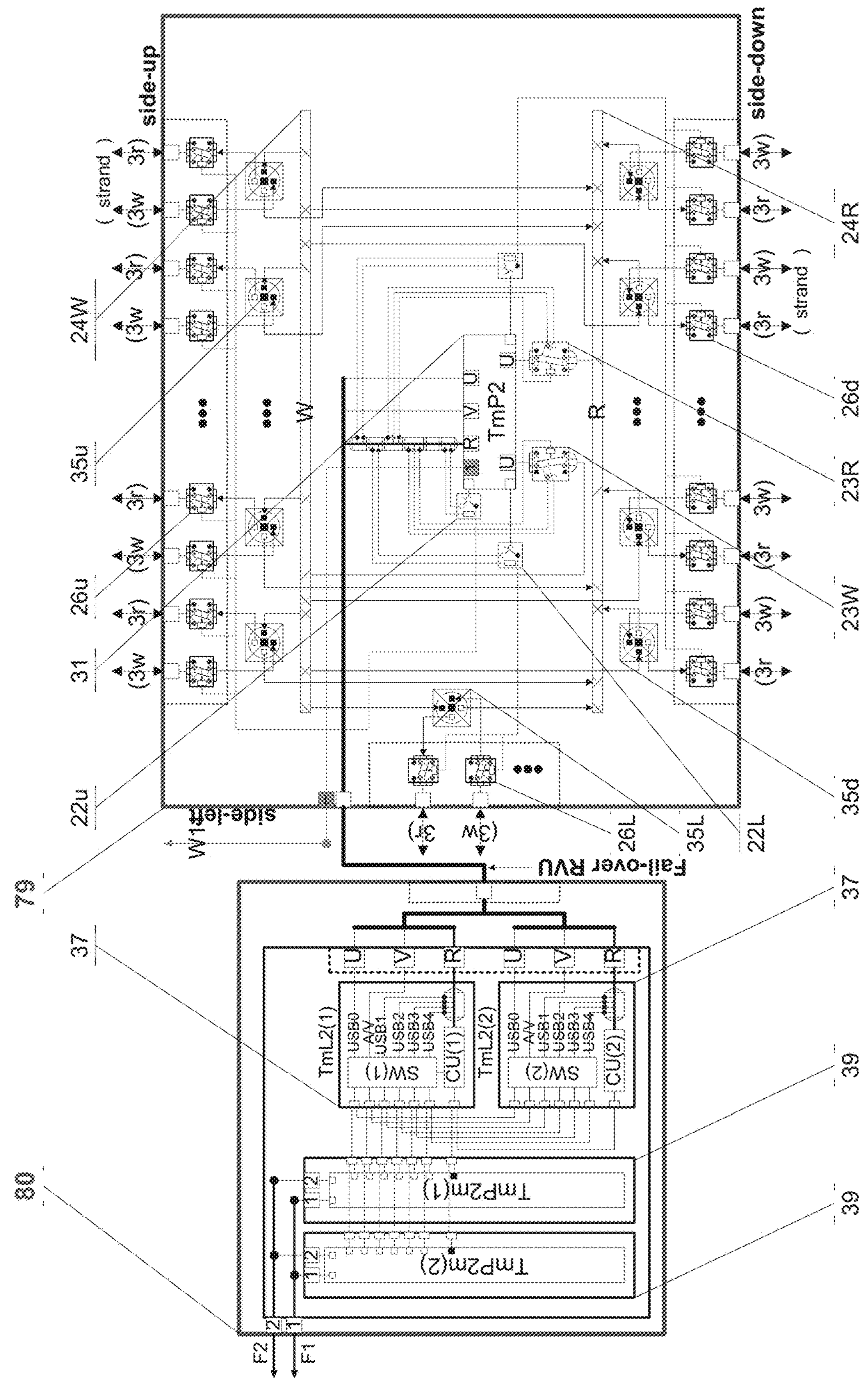
Figure 13F:
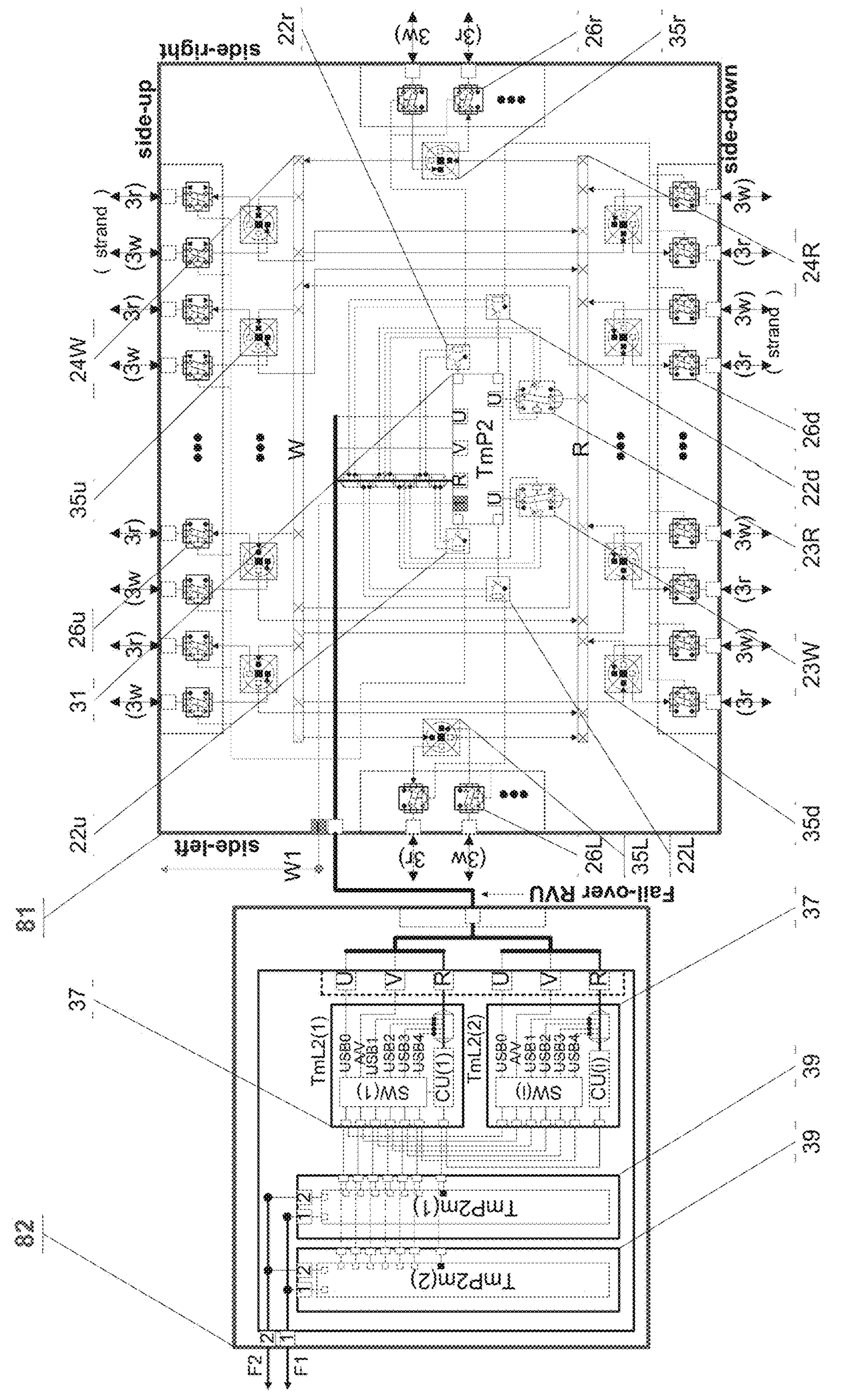

FIG. 13*f* is a block diagram illustrating an exemplary embodiment of the current disclosure of (w3)-mWSA6=(w3)-bi-directional 4 (multi-strand)-sided memory-based WSA (3)-type2-version6.

Figure 13G:
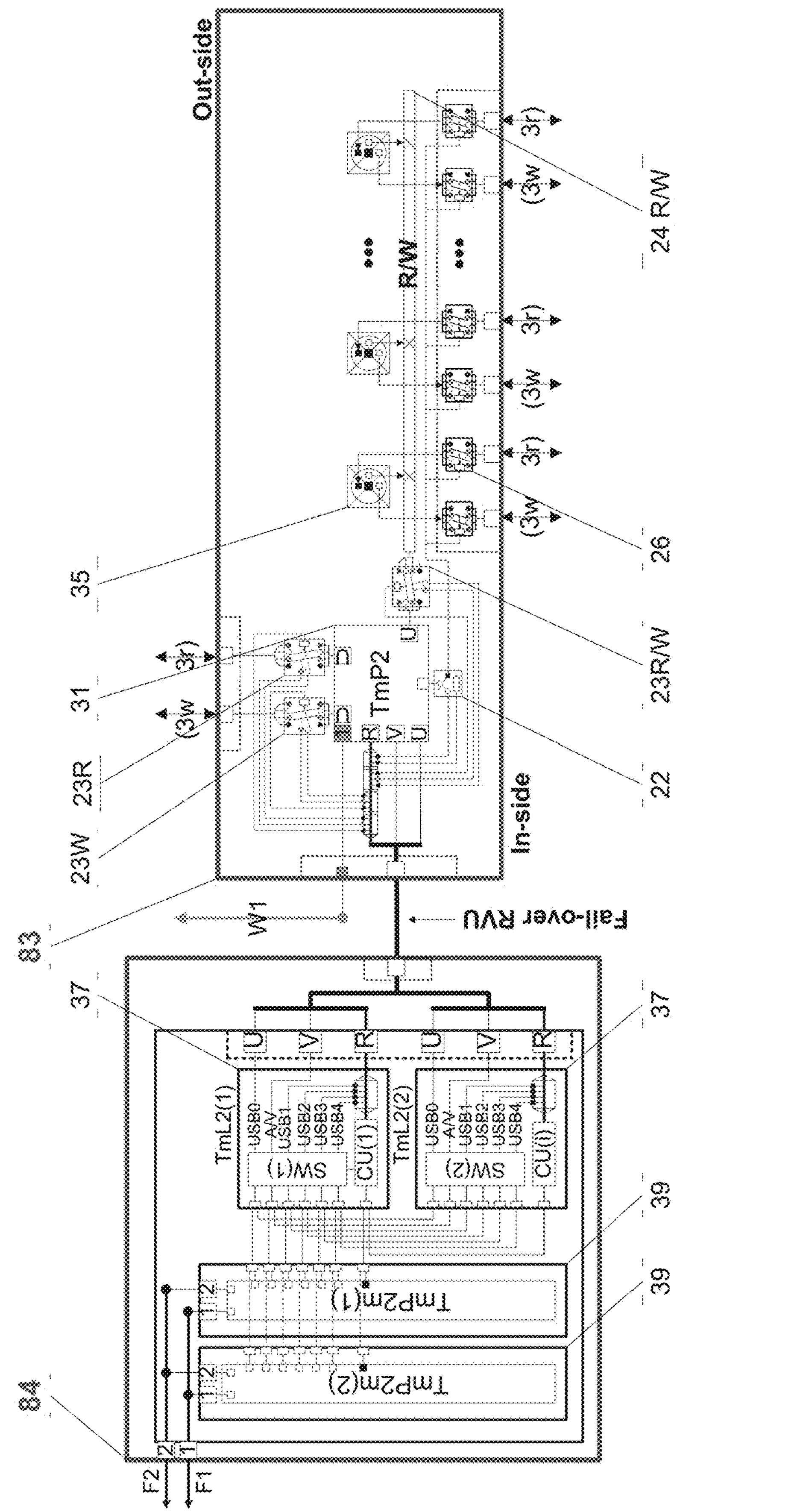

FIG. 13*g* is a block diagram showing an exemplary embodiment of the current disclosure of (w3)-mWSA7=(w3)-bi-directional memory-extending WSA (3)-type2-version7.

Figure 13H:
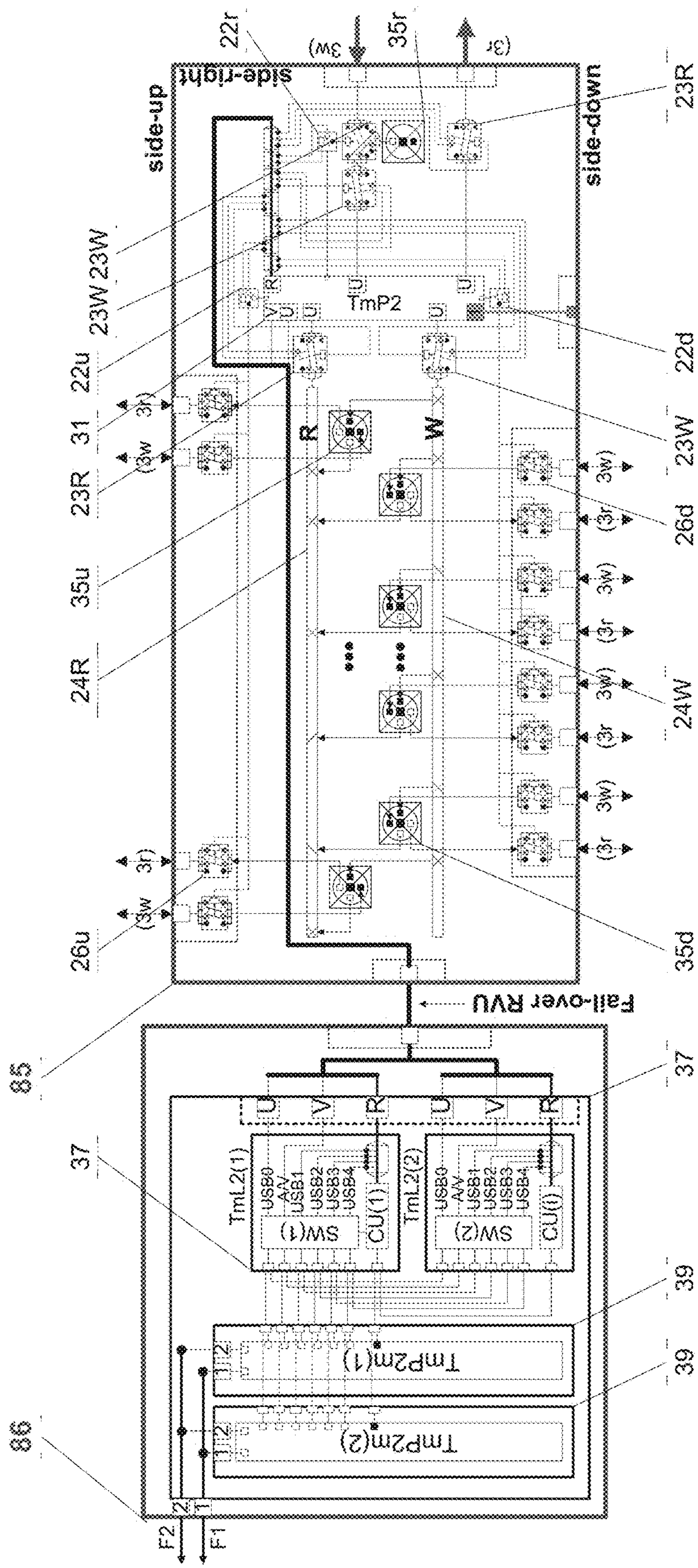

FIG. 13*h* is a block diagram illustrating an exemplary embodiment of the current disclosure of (w3)-mWSA8=(w3)-bi-directional 2 (multi-strand)-sided memory-bonding WSA (3)-type2-version8.

Figure 14A:
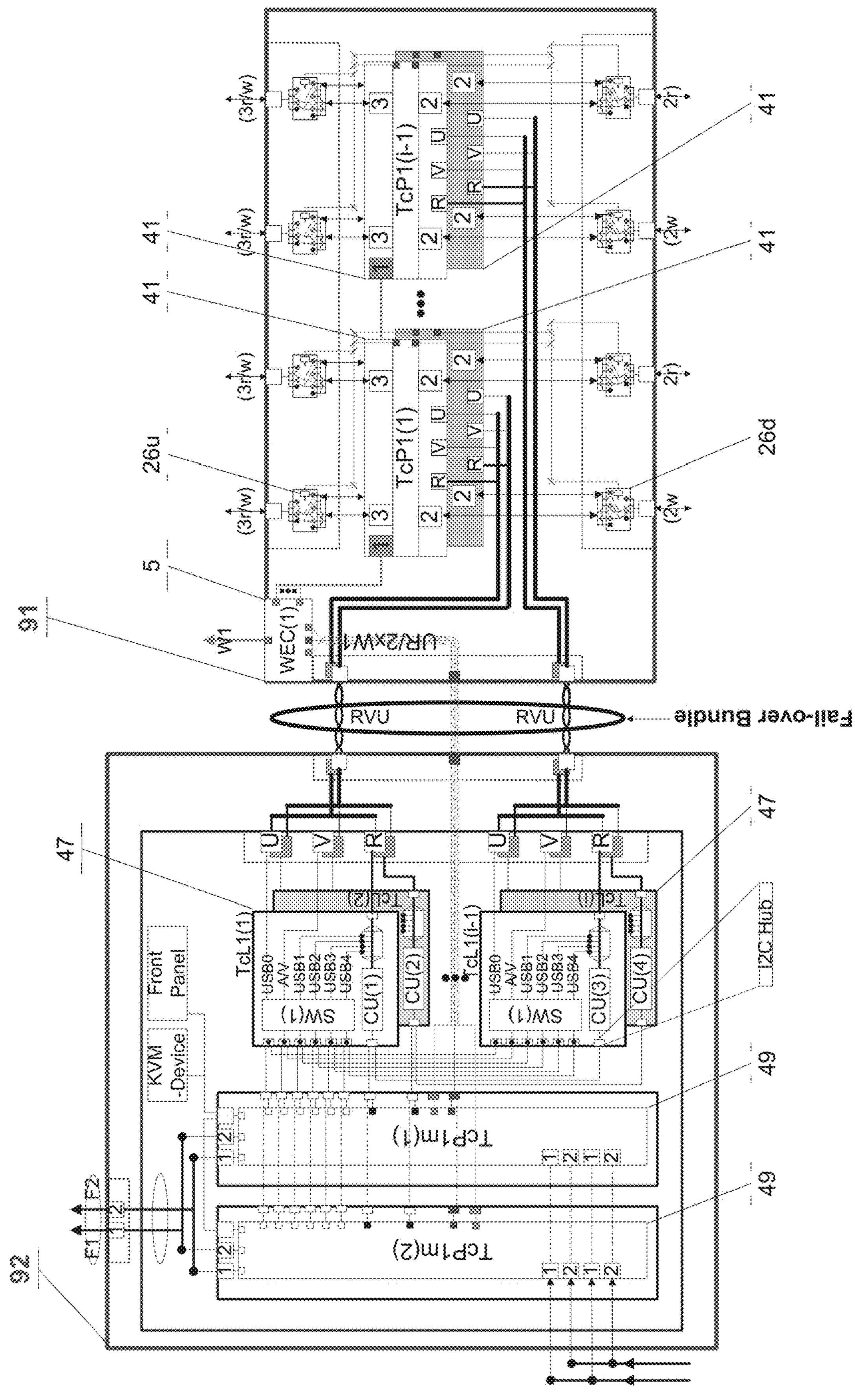

FIG. 14*a* is a block diagram depicting an exemplary embodiment of the current disclosure of (w2/w3-hybrid)-cWSA1=directional/bi-directional control-based WSA (i+2)-type1.

Figure 14B:
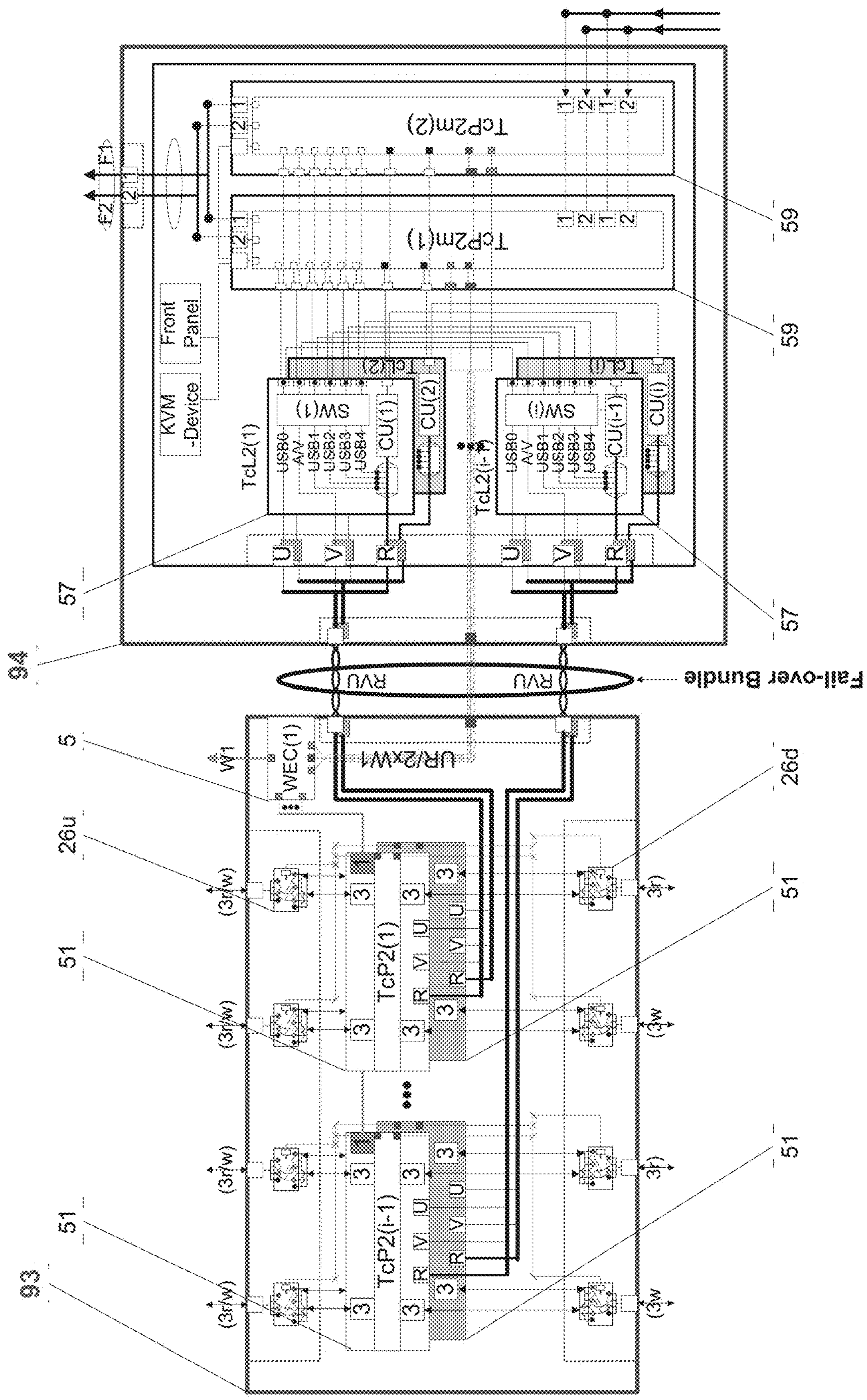

FIG. 14*b* is a block diagram showing an exemplary embodiment of the current disclosure of (w3)-cWSA2=(w3)-bi-directional control-based WSA (i+2)-type2.

4.0 wEP2-(w fail-safe) EA2/wTF2-HAT (HCM+HAM)

Figure 15:
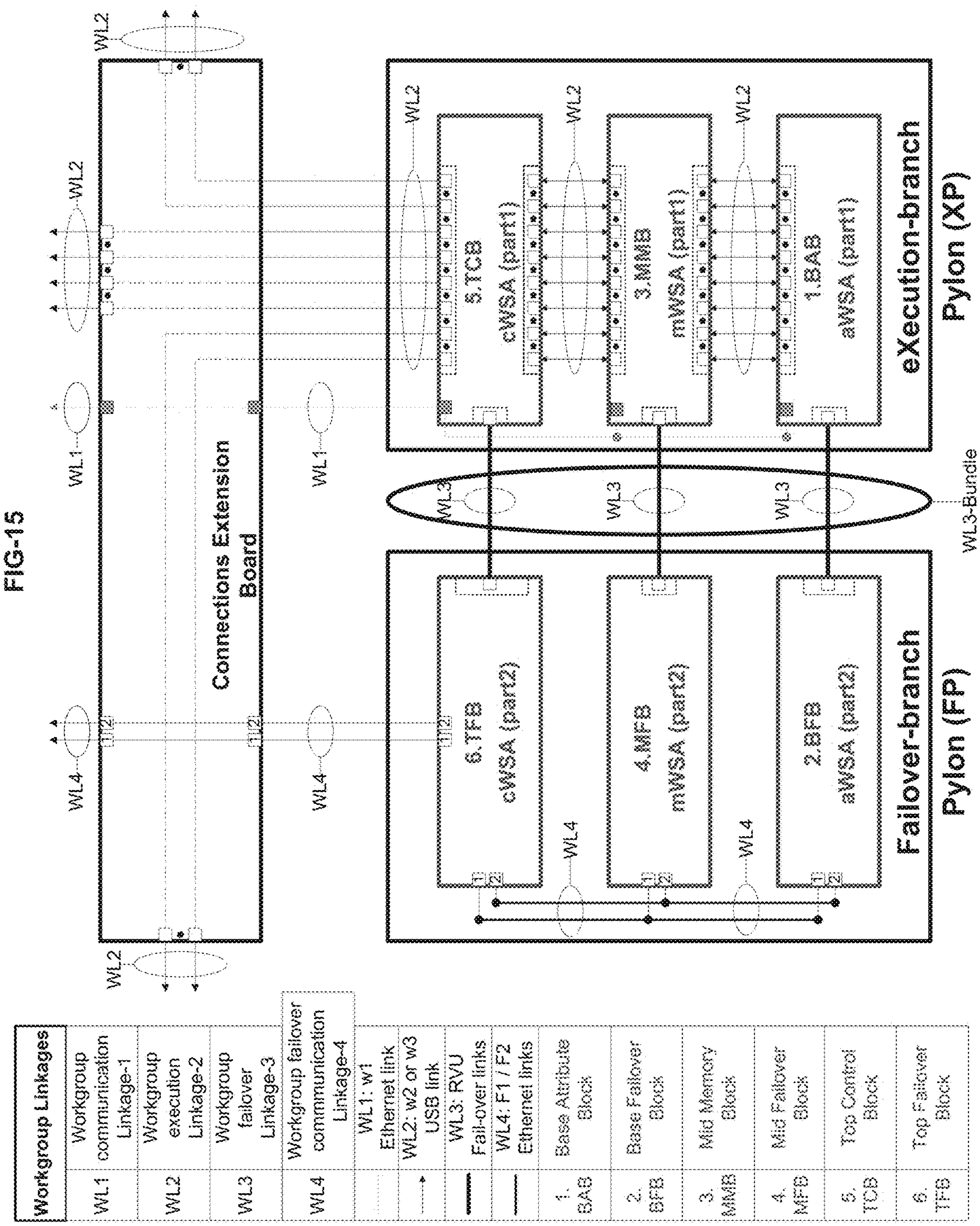

FIG. 15 is a block diagram depicting an exemplary embodiment of the current disclosure of the First 6 work-group Basic-Building-Block (wBBB)-based (fail-safe) workgroup-Entity (wEntity).

Figure 16:
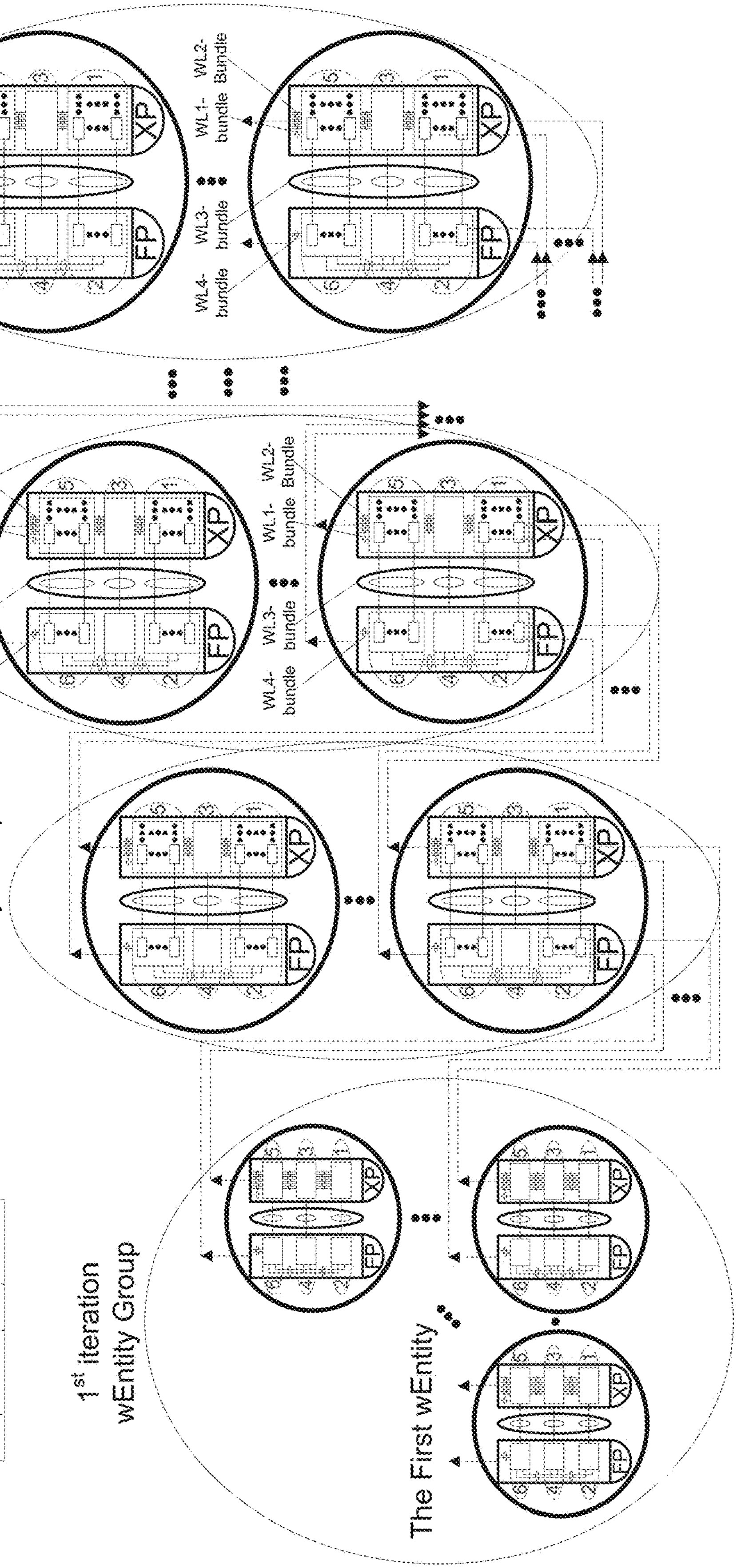

FIG. 16 is a block diagram showing an exemplary embodiment of the current disclosure of 6-wBBB-based Workgroup-computing Evolutionary Processes, creating bigger and better fail-safe wEntities.

5.0 wEP3-(wGn.s) EA3/TF3-HAT (HCM+HAM)

Figure 17:
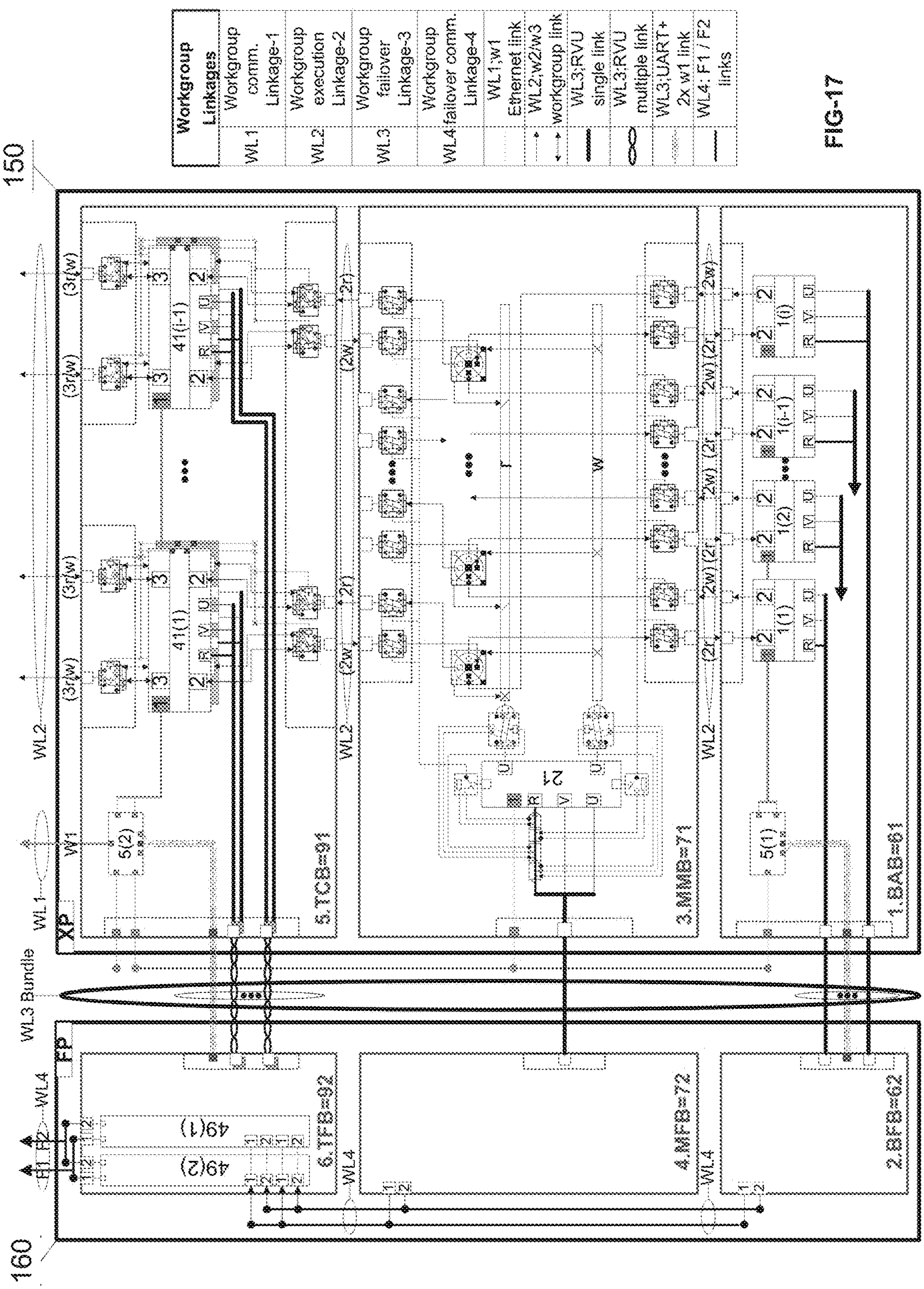

5.1 wGeneration-1 6-wBBB-Evolved HCSs for Building Rt-Complex Task wEntities/wSystems FIG. 17 is a block diagram showing an exemplary embodiment of the current disclosure of G1.1: Array(i) Task1-wEntity-based Hierarchical Core Structure (HCS) (Standard 1D Task1-Production Unit).

Figure 18:
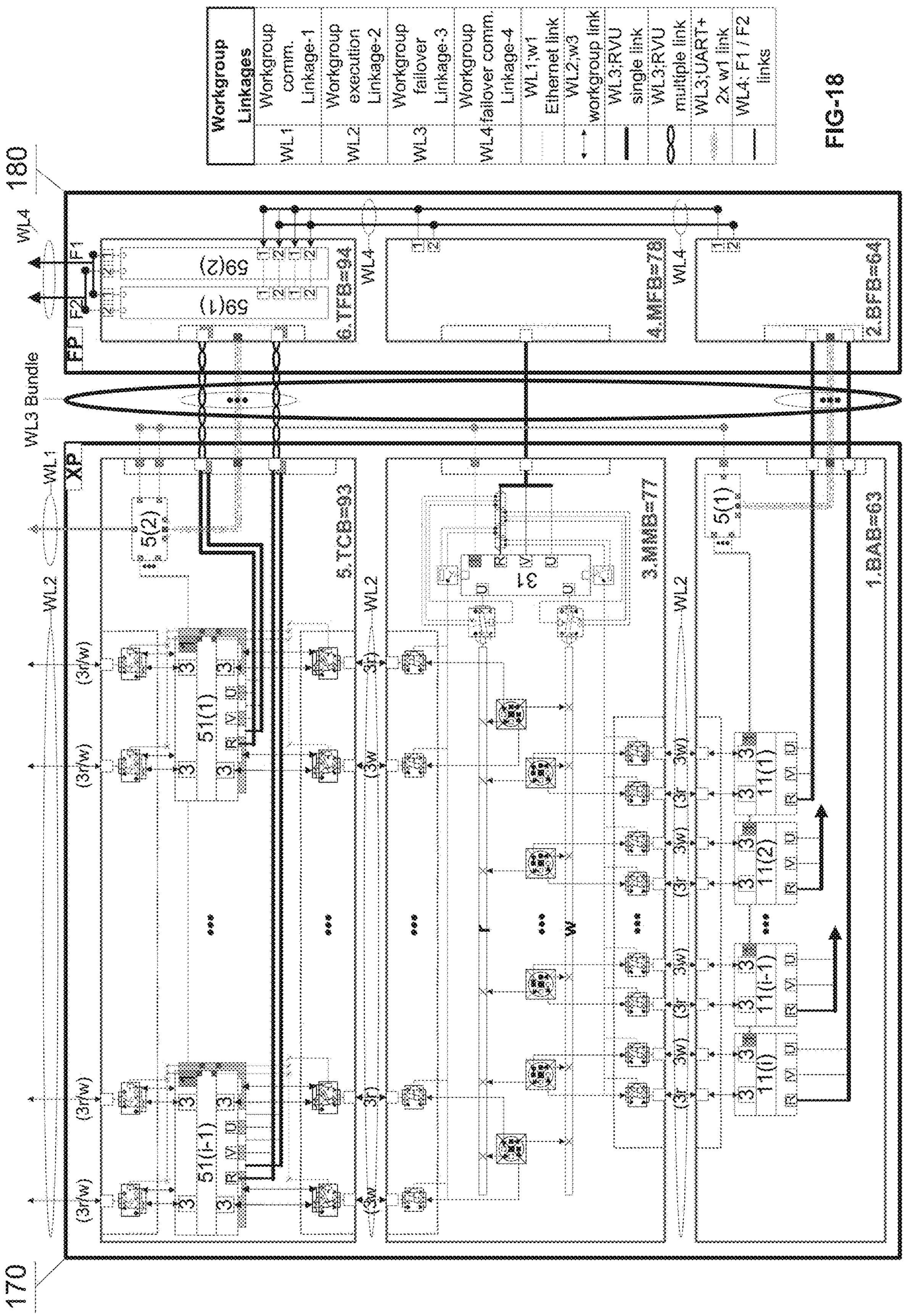

FIG. 18 is a block diagram illustrating an exemplary embodiment of the current disclosure of G1.2: Seg(i) Task2-wEntity-based Hierarchical Core Structure (HCS) (Standard 1D Task2-Production Unit).

Figure 19:
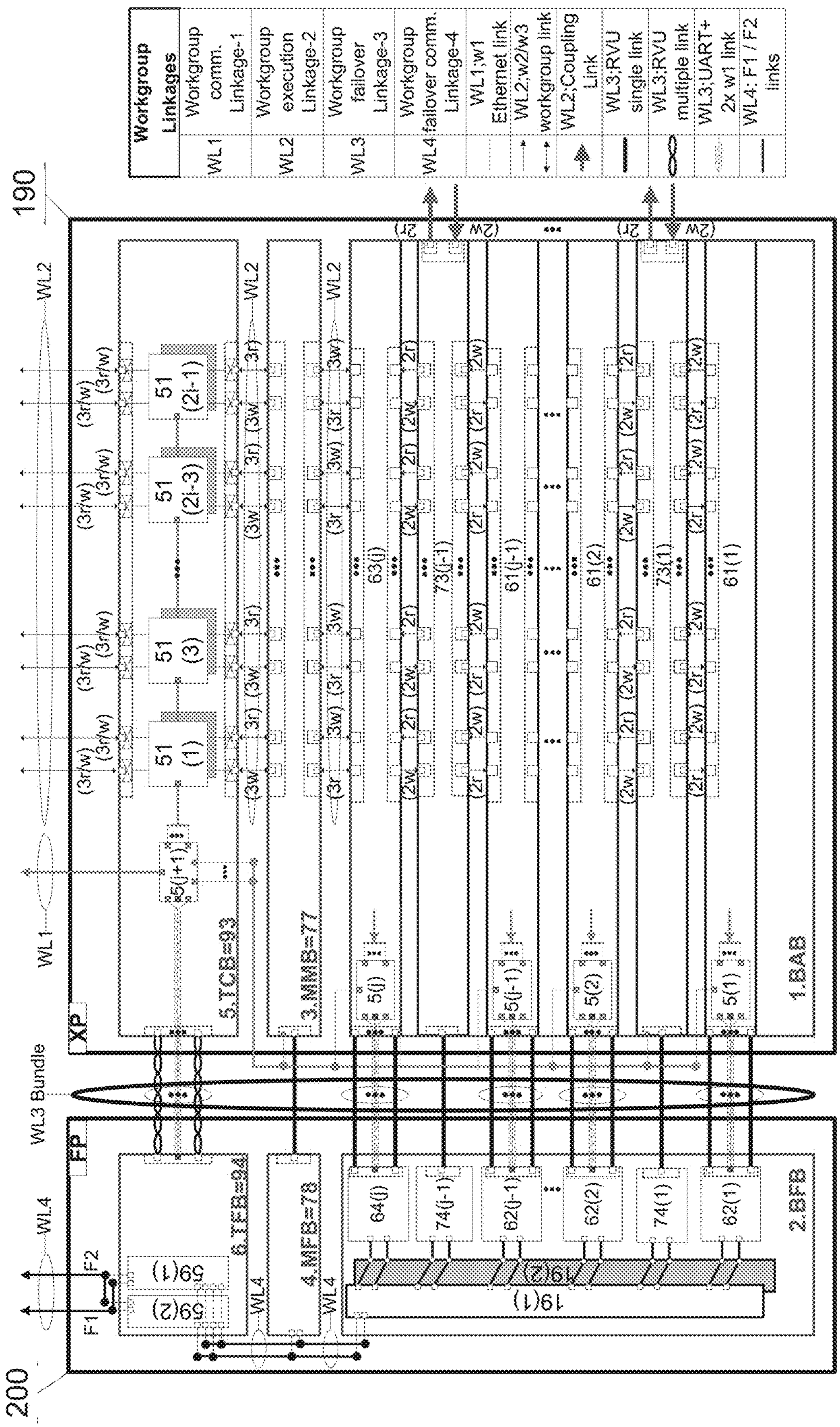

FIG. 19 is a block diagram depicting an exemplary embodiment of the current disclosure of G1.3: Matrix(i,j) Task1-wEntity-based Hierarchical Core Structure (HCS) (Standard 2D Task1-Production Unit).

Figure 20:
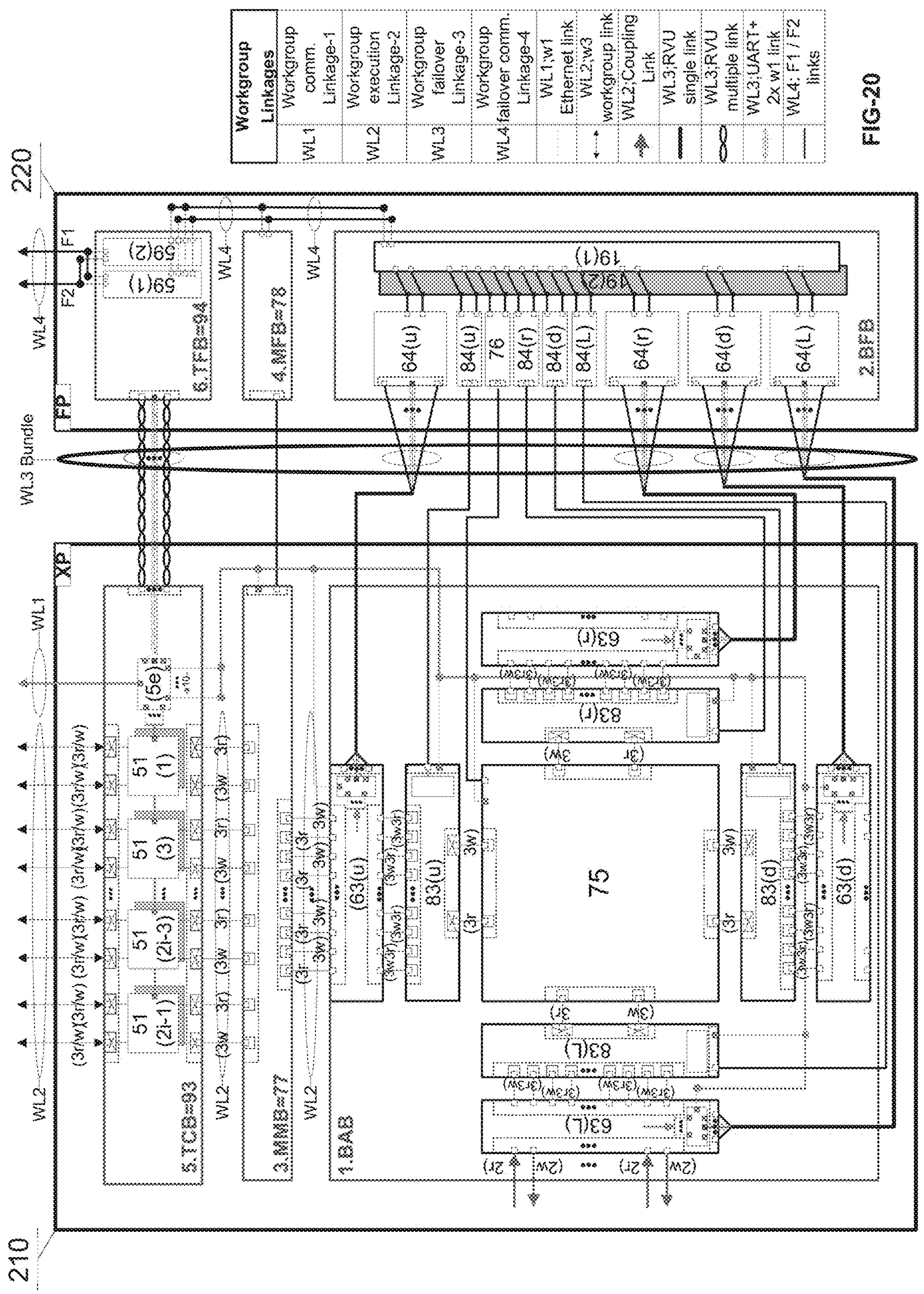

FIG. 20 is a block diagram showing an exemplary embodiment of the current disclosure of G1.4: Polygon(i,4) Task2-wEntity-based Hierarchical Core Structure (Standard 2D Task2-Production Unit).

Figure 21:
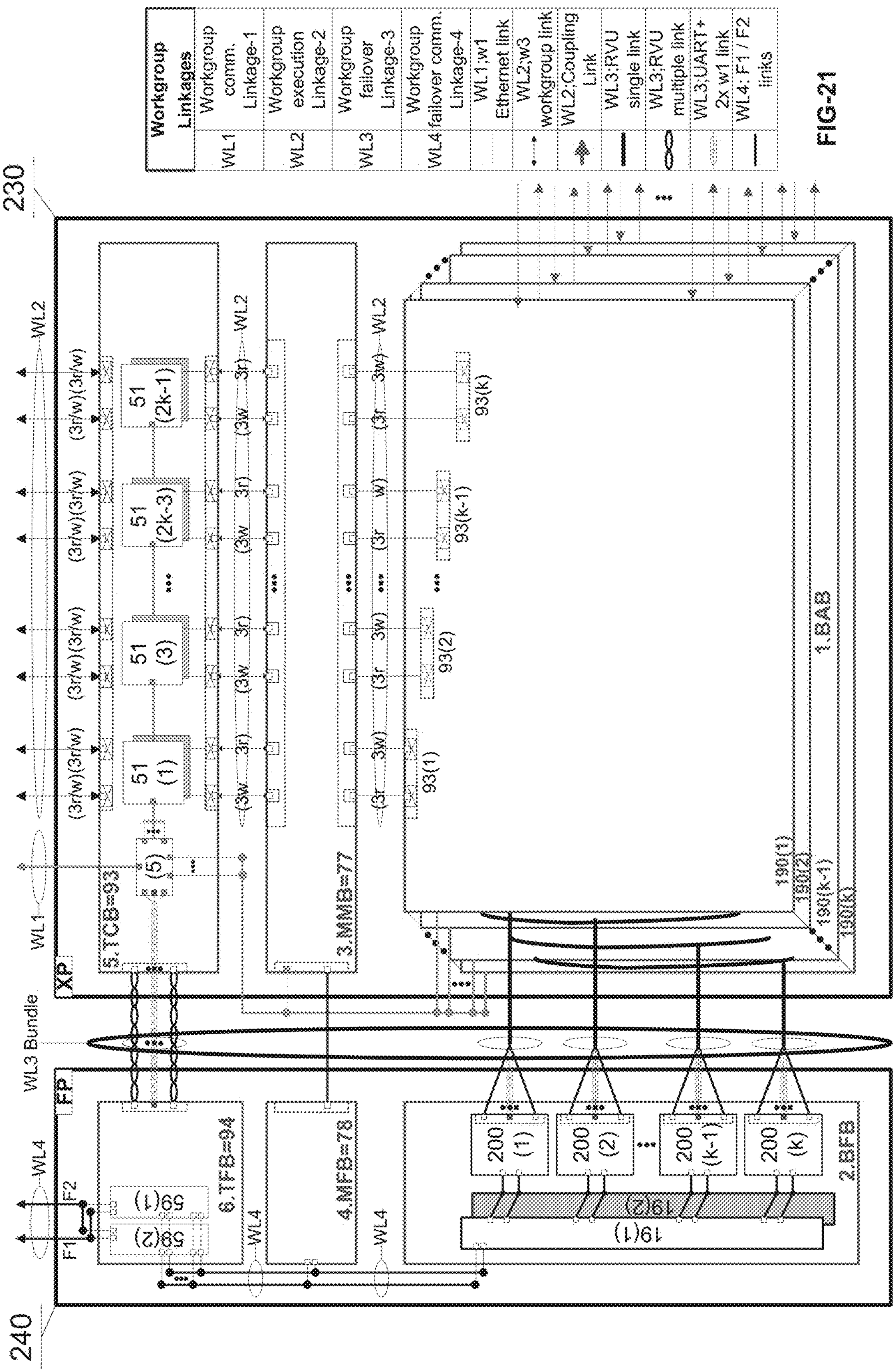

FIG. 21 is a block diagram illustrating an exemplary embodiment of the current disclosure of G1.5: Tie(i,j,k) Task1-wEntity-based Hierarchical Core Structure (HCS) (Standard 3D Task1-Production Unit).

Figure 22:
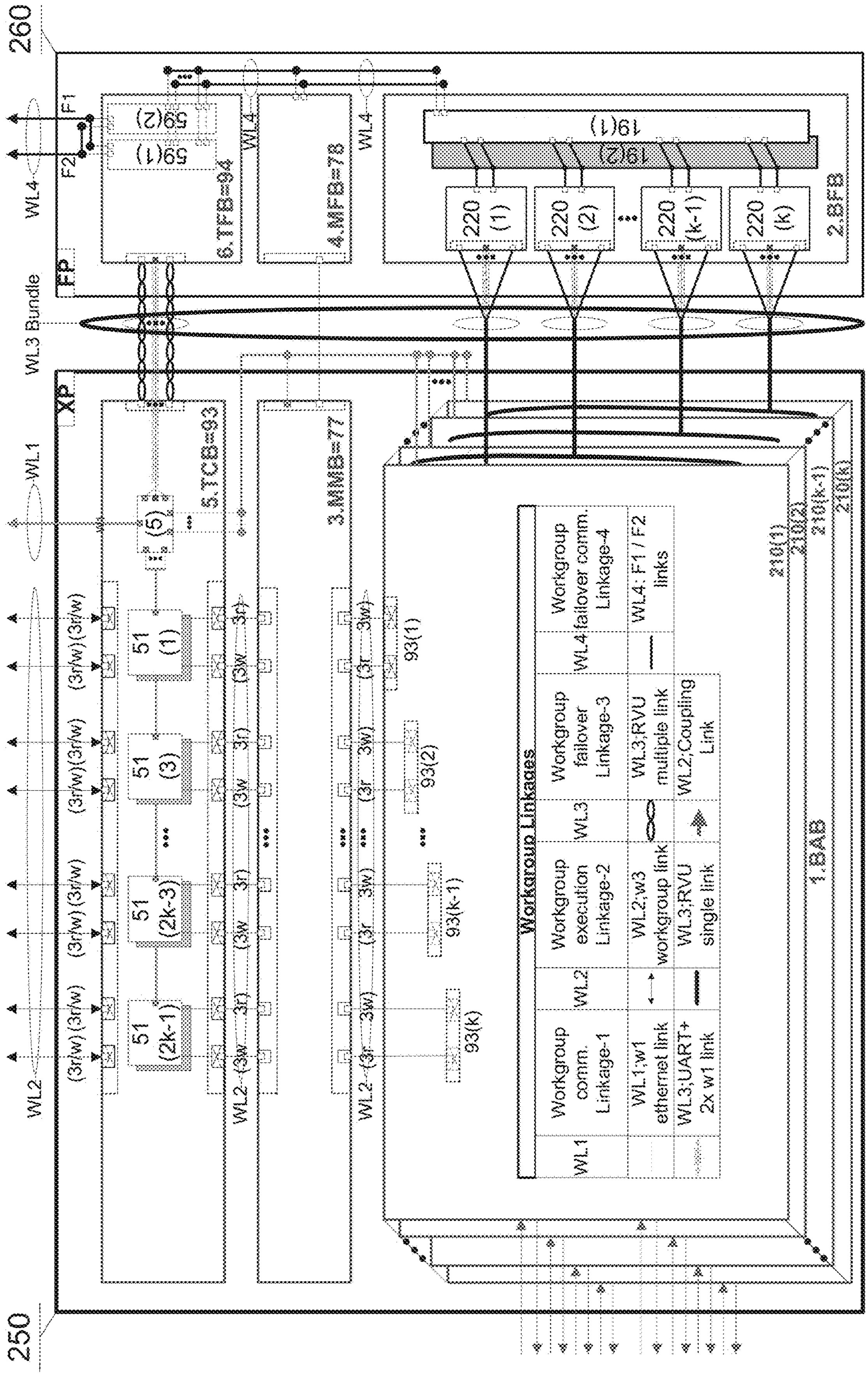

FIG. 22 is a block diagram depicting an exemplary embodiment of the current disclosure of G1.6: Align(i,4,k) Task2-wEntity-based Hierarchical Core Structure (HCS) (Standard 3D Task2-Production Unit).

Figure 23:
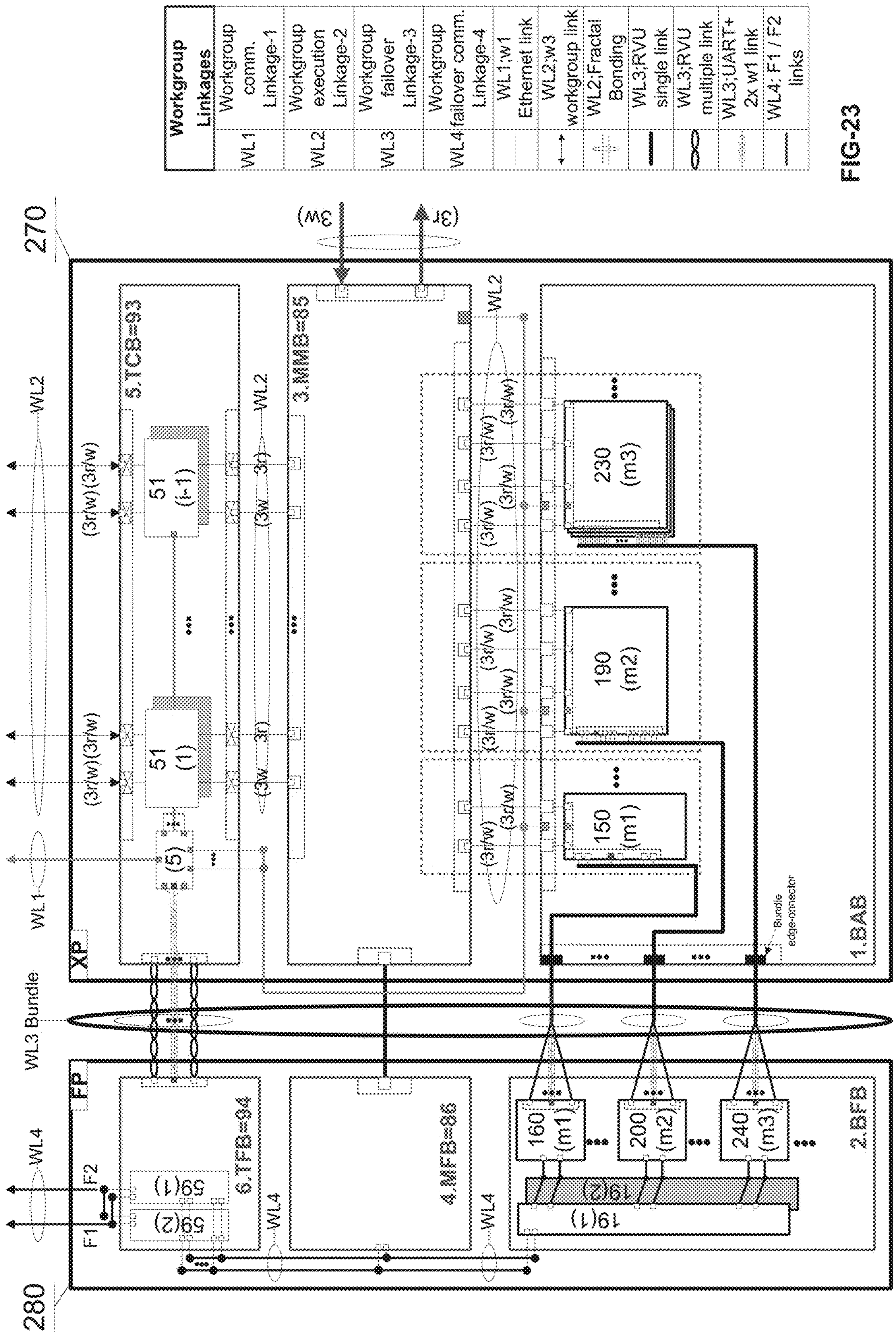

FIG. 23 is a block diagram illustrating an exemplary embodiment of the current disclosure of G1.7: Fractal1 Task1-wEntity-based Hierarchical Core Structure (Standard Poly3D Task1-Production Unit).

Figure 24:
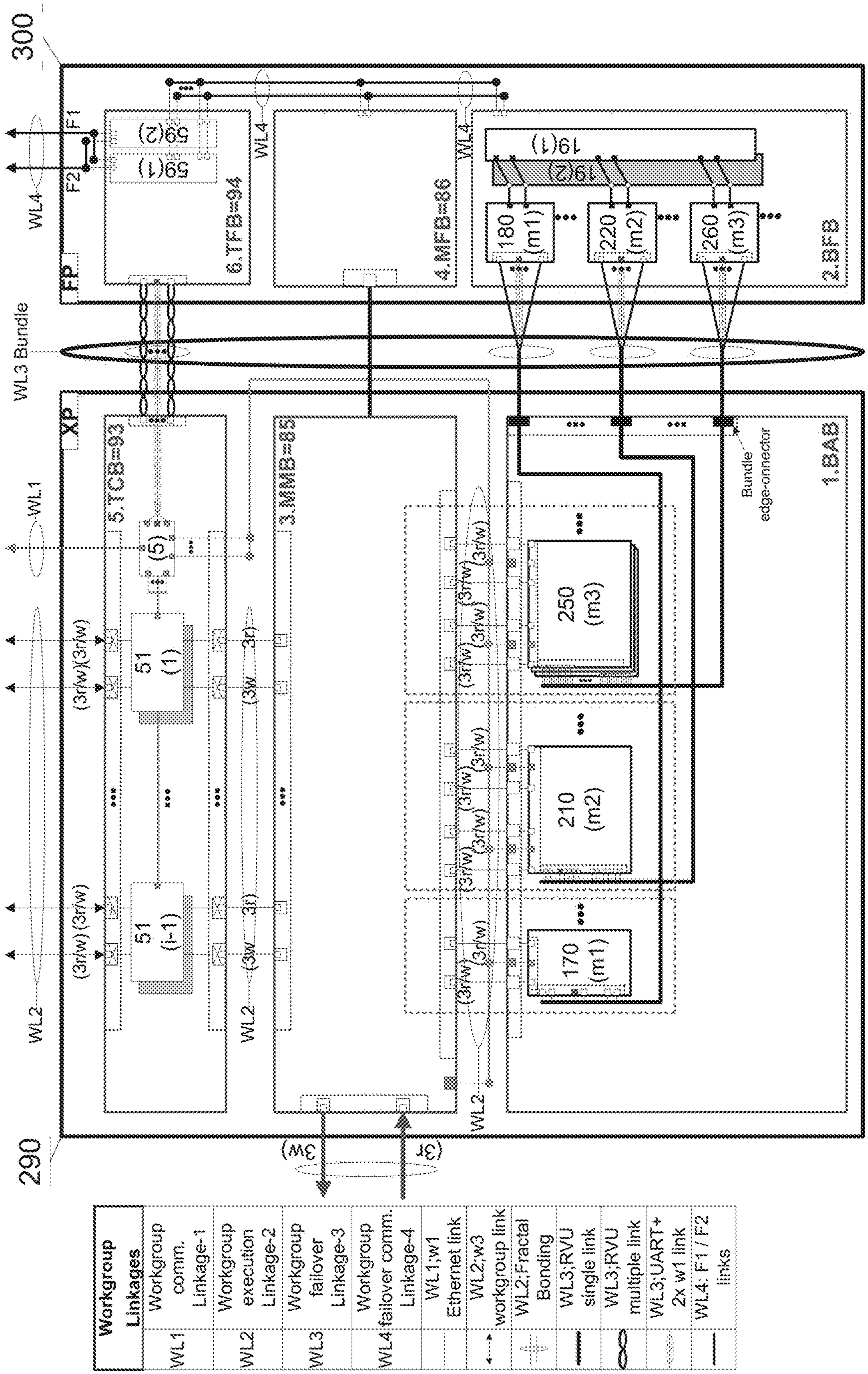

FIG. 24 is a block diagram showing an exemplary embodiment of the current disclosure of G1.8: Fractal2 Task2-wEntity-based Hierarchical Core Structure (Standard Poly3D Task2-Production Unit).

Figure 25:
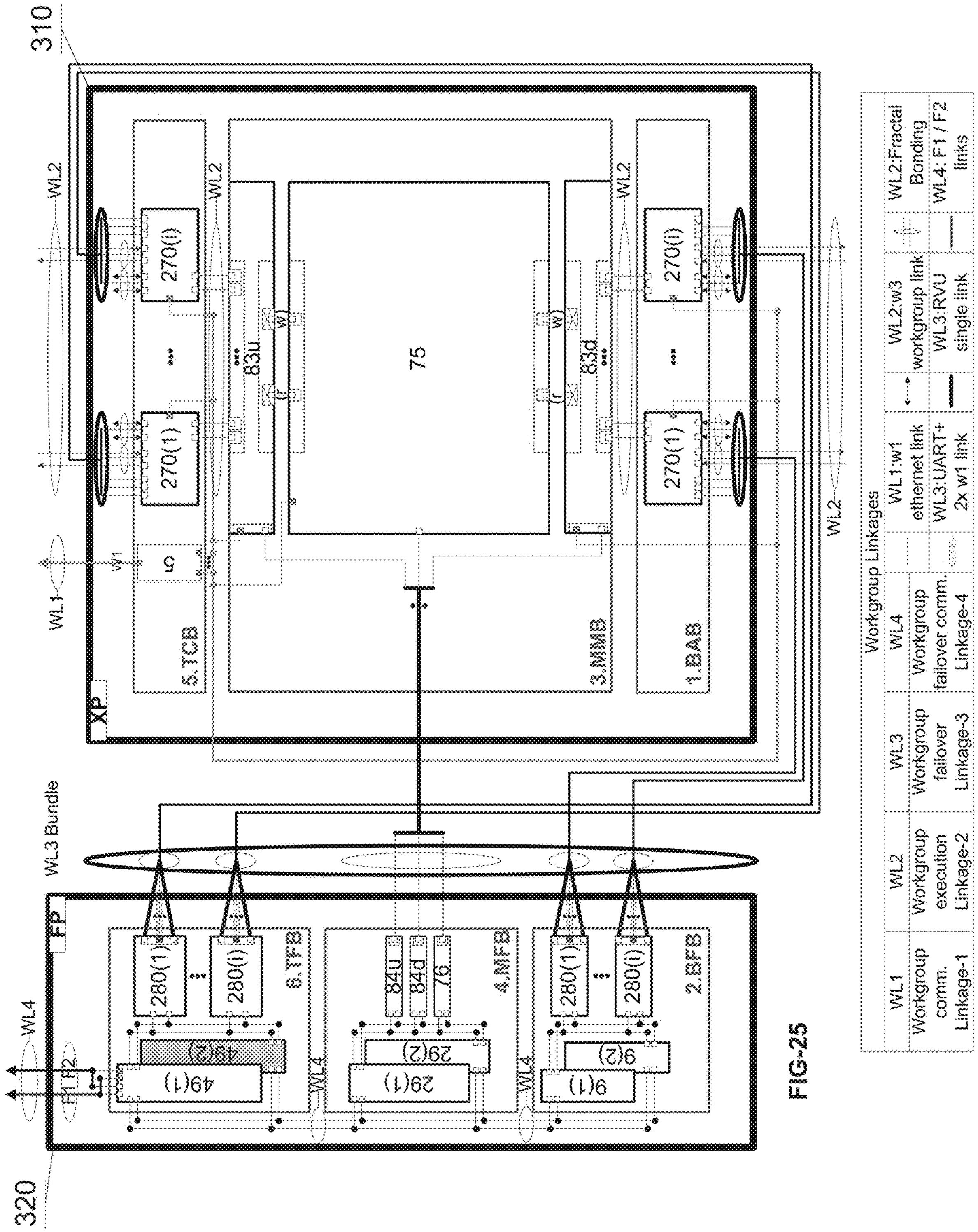

5.2 wGeneration-2 6-wBBB-evolved HCSs for building rt-diverse Job-wEntities/wSystems FIG. 25 is a block diagram depicting an exemplary embodiment of the current disclosure of G2.1: Chain2 Job1-wEntity-based Hierarchical Core Structure (2-sided Job1-assembly unit).

Figure 26:
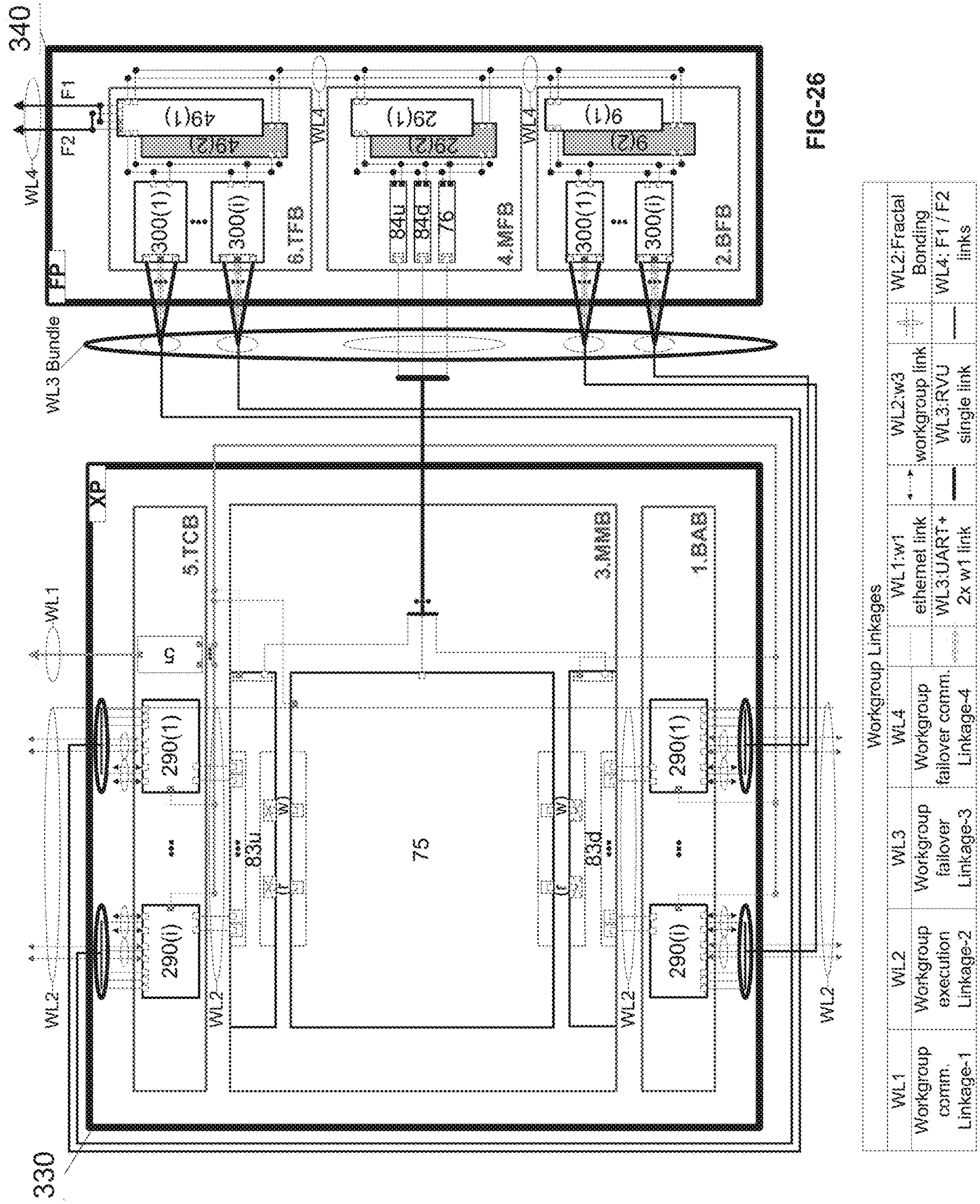

FIG. 26 is a block diagram showing an exemplary embodiment of the current disclosure of G2.2: Glue2 Job2-wEntity-based Hierarchical Core Structure (2-sided Job2-assembly unit).

Figure 27:
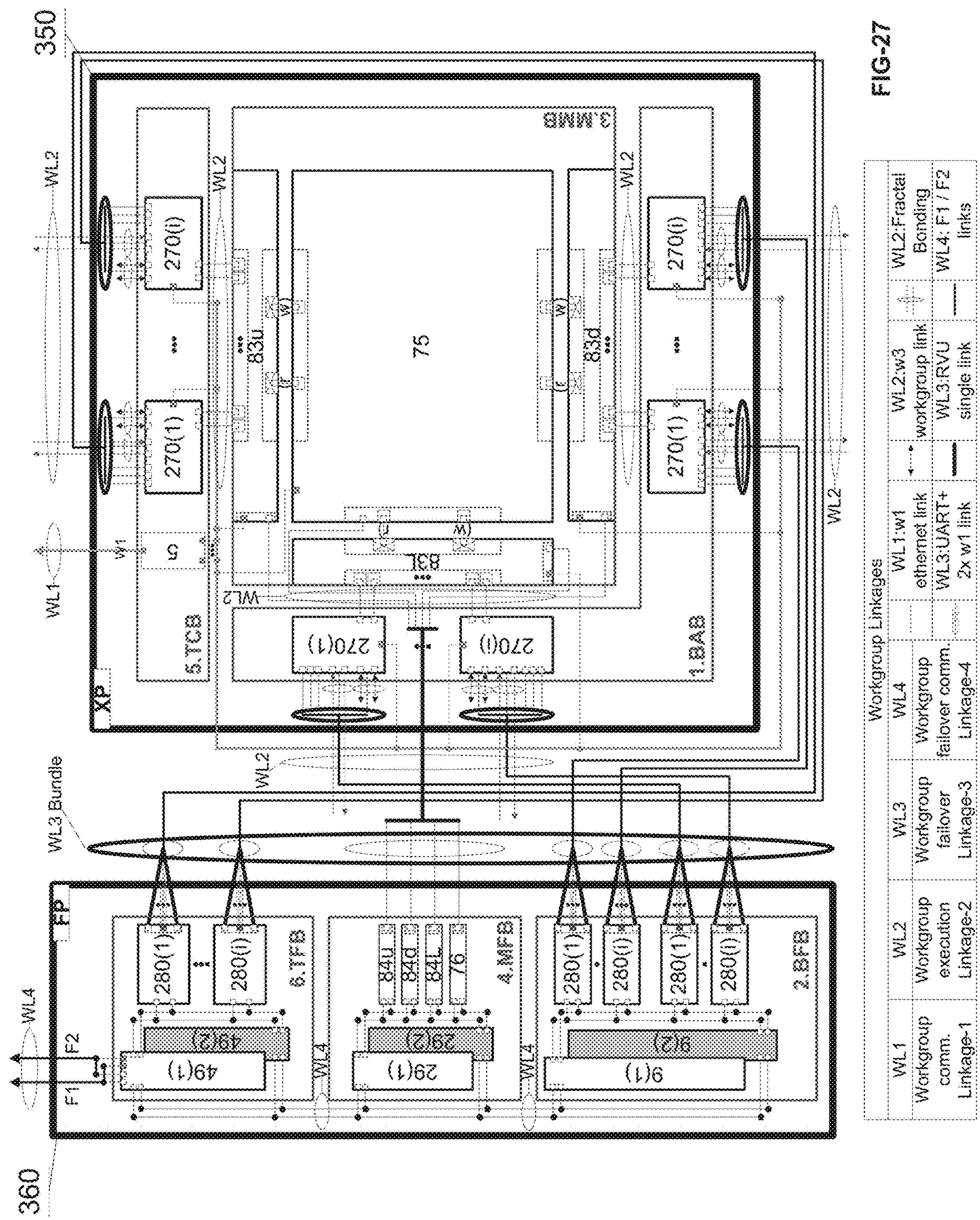

FIG. 27 is a block diagram depicting an exemplary embodiment of the current disclosure of G2.3: Chain3 Job1-wEntity-based Hierarchical Core Structure (3-sided Job1-assembly unit).

Figure 28:
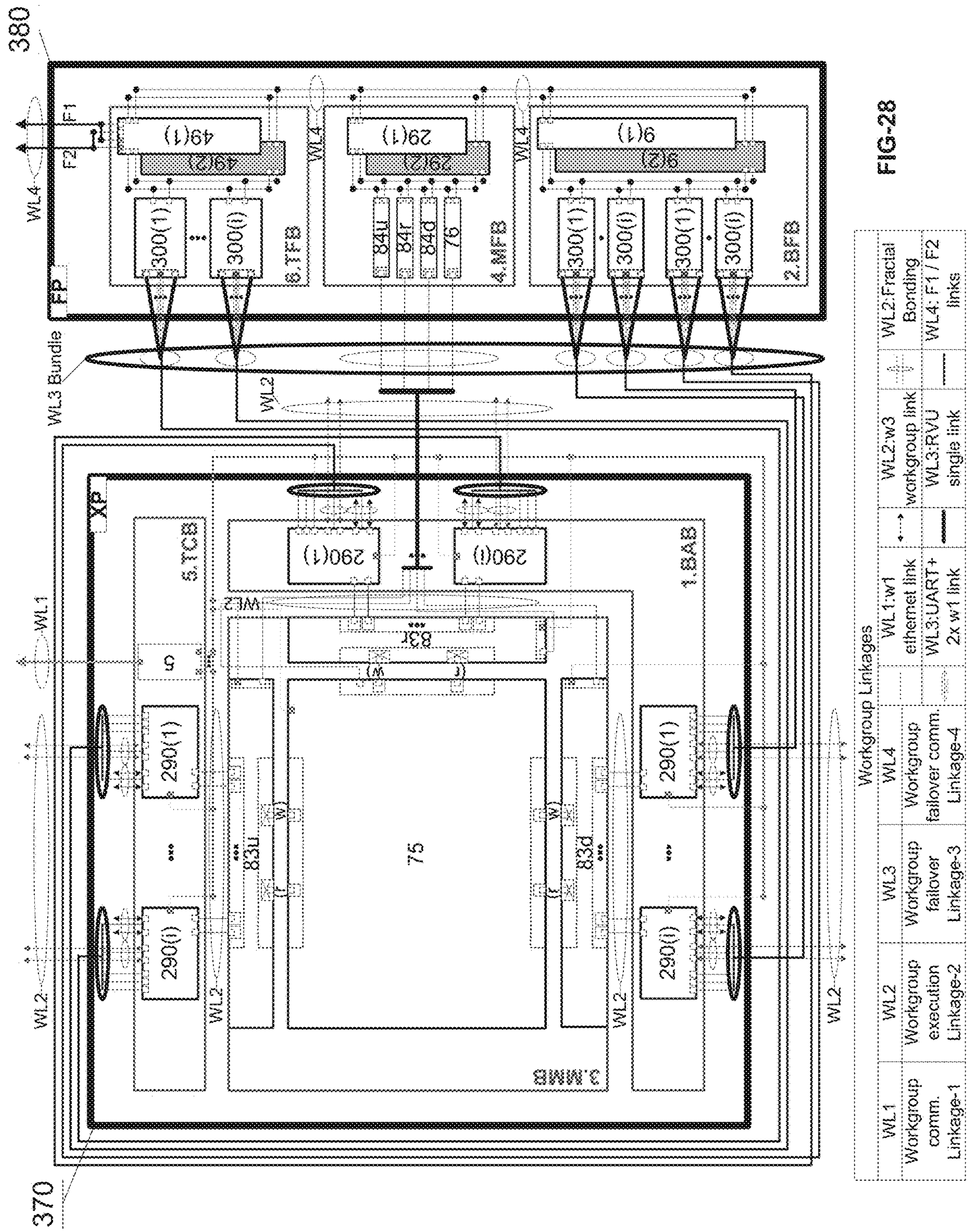

FIG. 28 is a block diagram illustrating an exemplary embodiment of the current disclosure of G2.4: Glue3 Job2-wEntity-based Hierarchical Core Structure (3-sided Job2-assembly unit).

Figure 29:
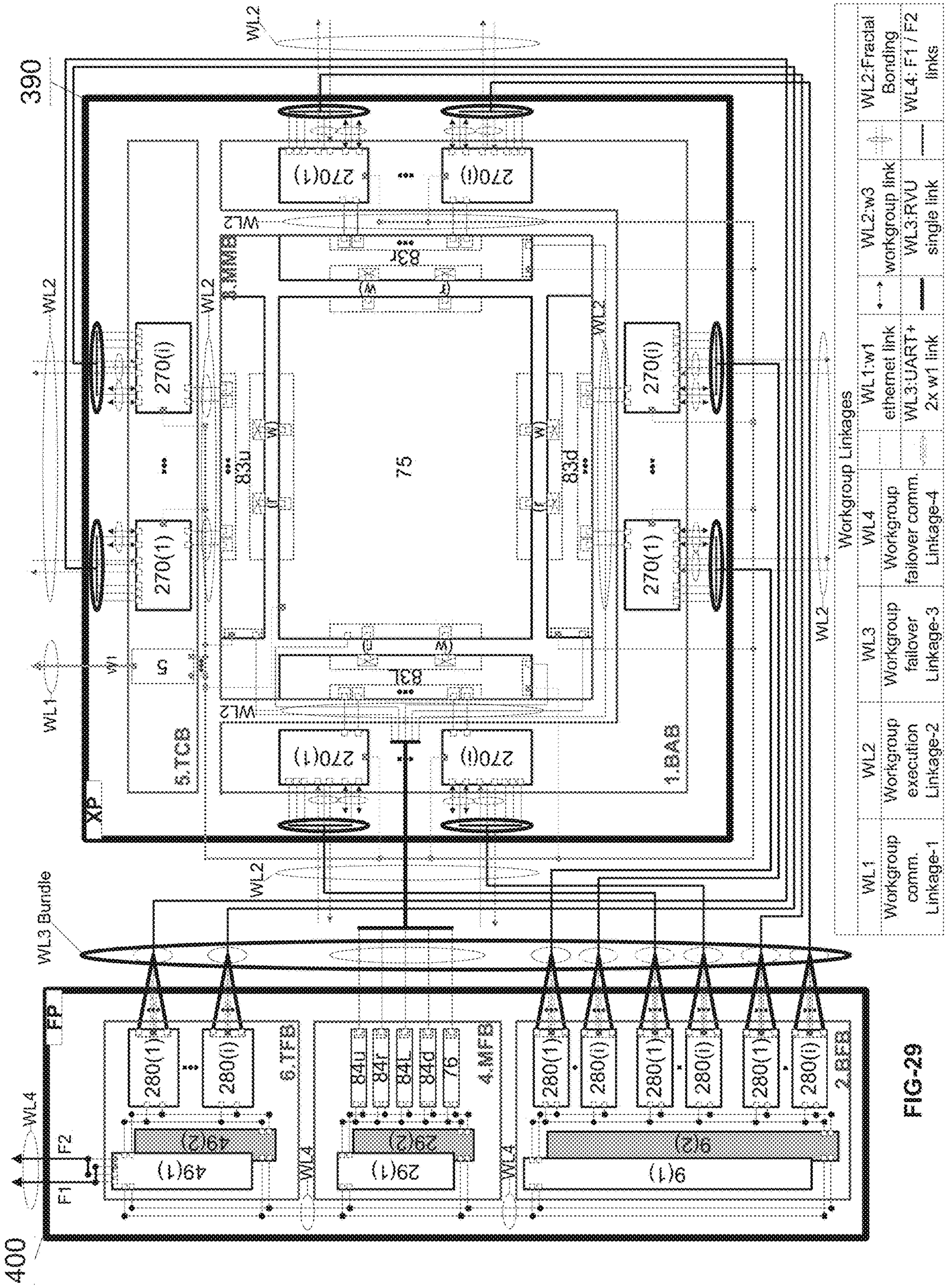

FIG. 29 is a block diagram showing an exemplary embodiment of the current disclosure of G2.5: Chain4 Job1-wEntity-based Hierarchical Core Structure (4-sided Job1-assembly unit).

Figure 30:
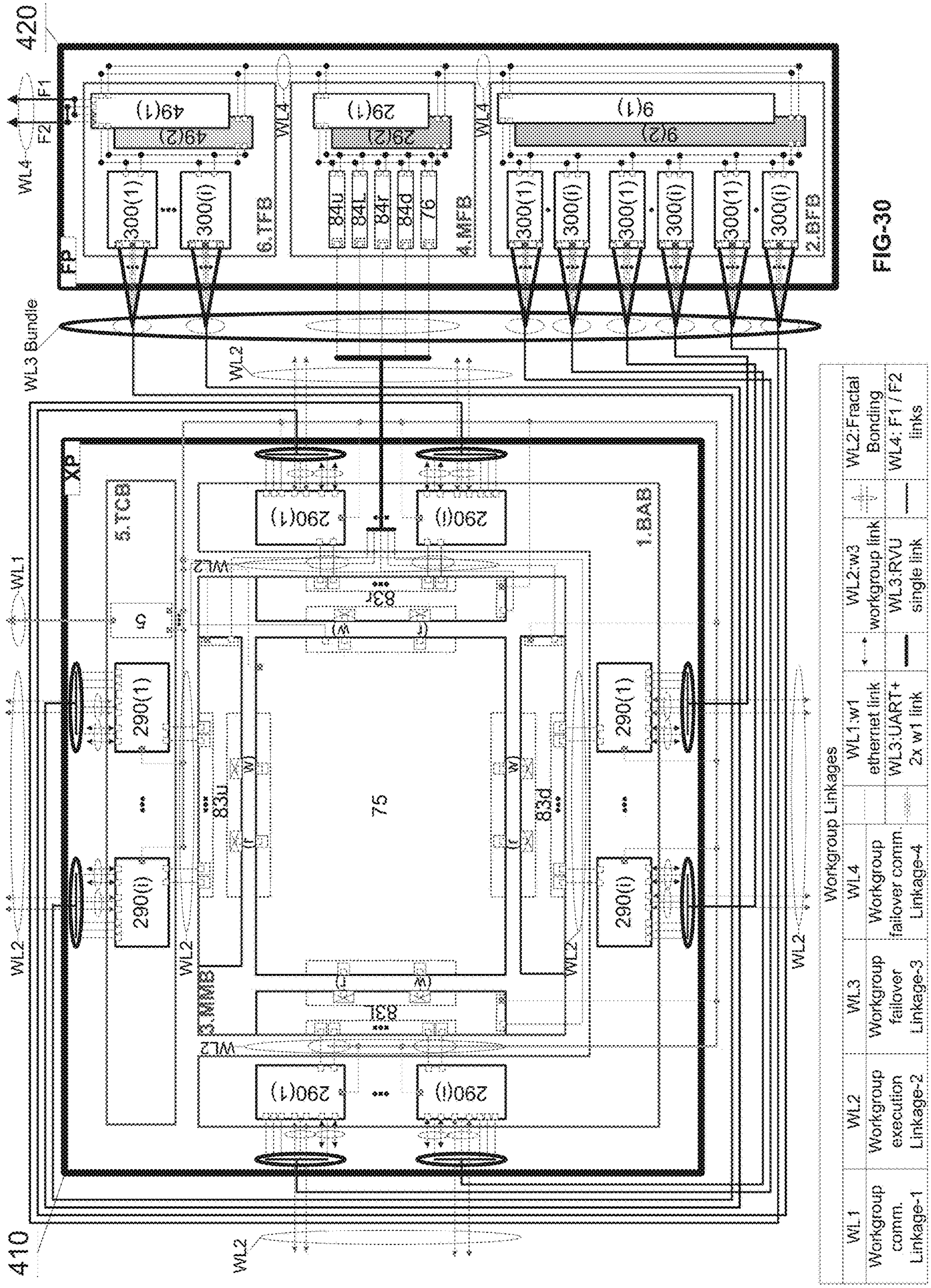

FIG. 30 is a block diagram illustrating an exemplary embodiment of the current disclosure of G2.6: Glue4 Job2-wEntity-based Hierarchical Core Structure (4-sided Job2 assembly unit).

Figure 31:
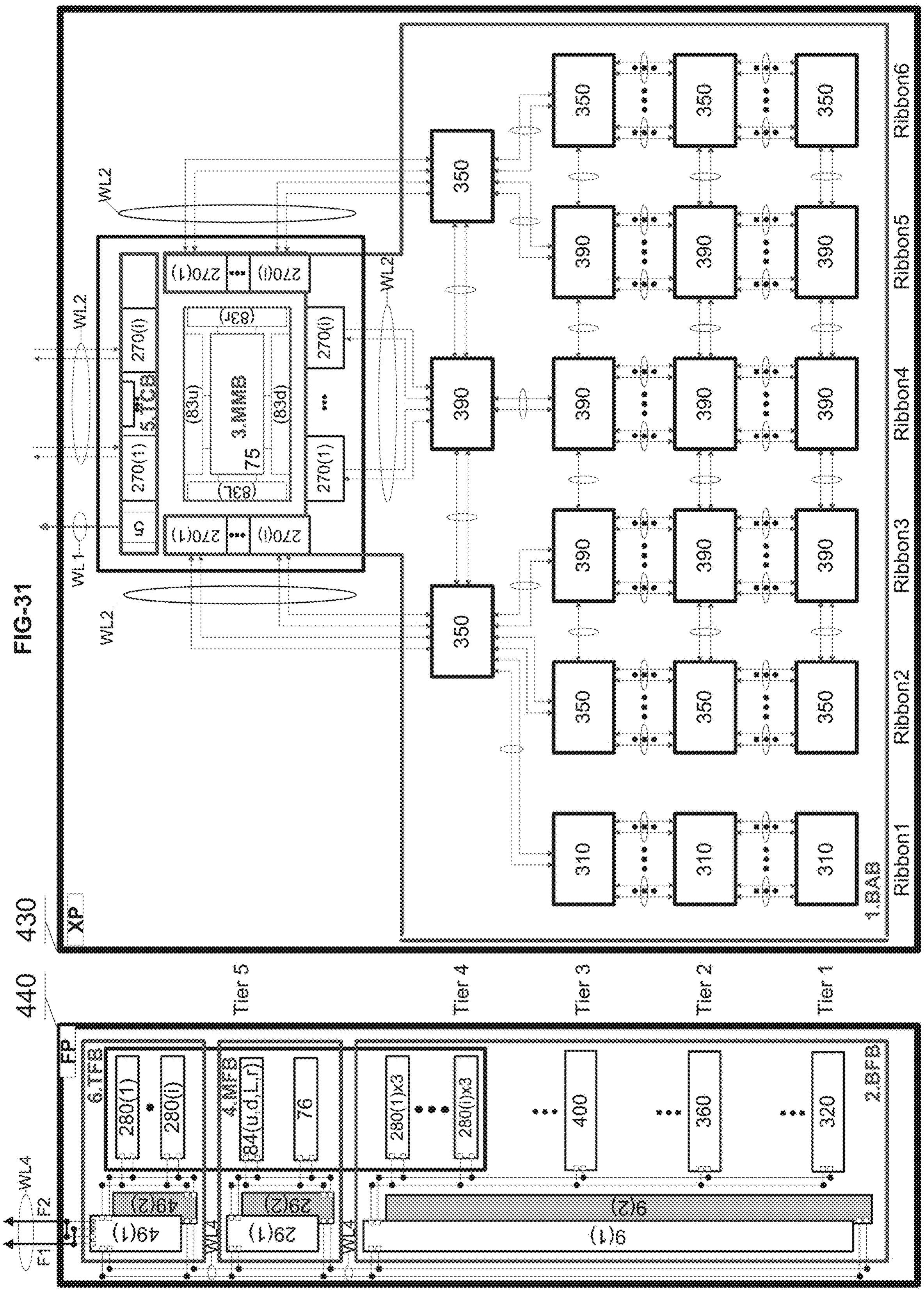

FIG. 31 is a block diagram showing an exemplary embodiment of the current disclosure of G2.7: Job1 Assembly-Line/Block/Tree-wEntity-based Hierarchical Core Structures (HCSs).

Figure 32:
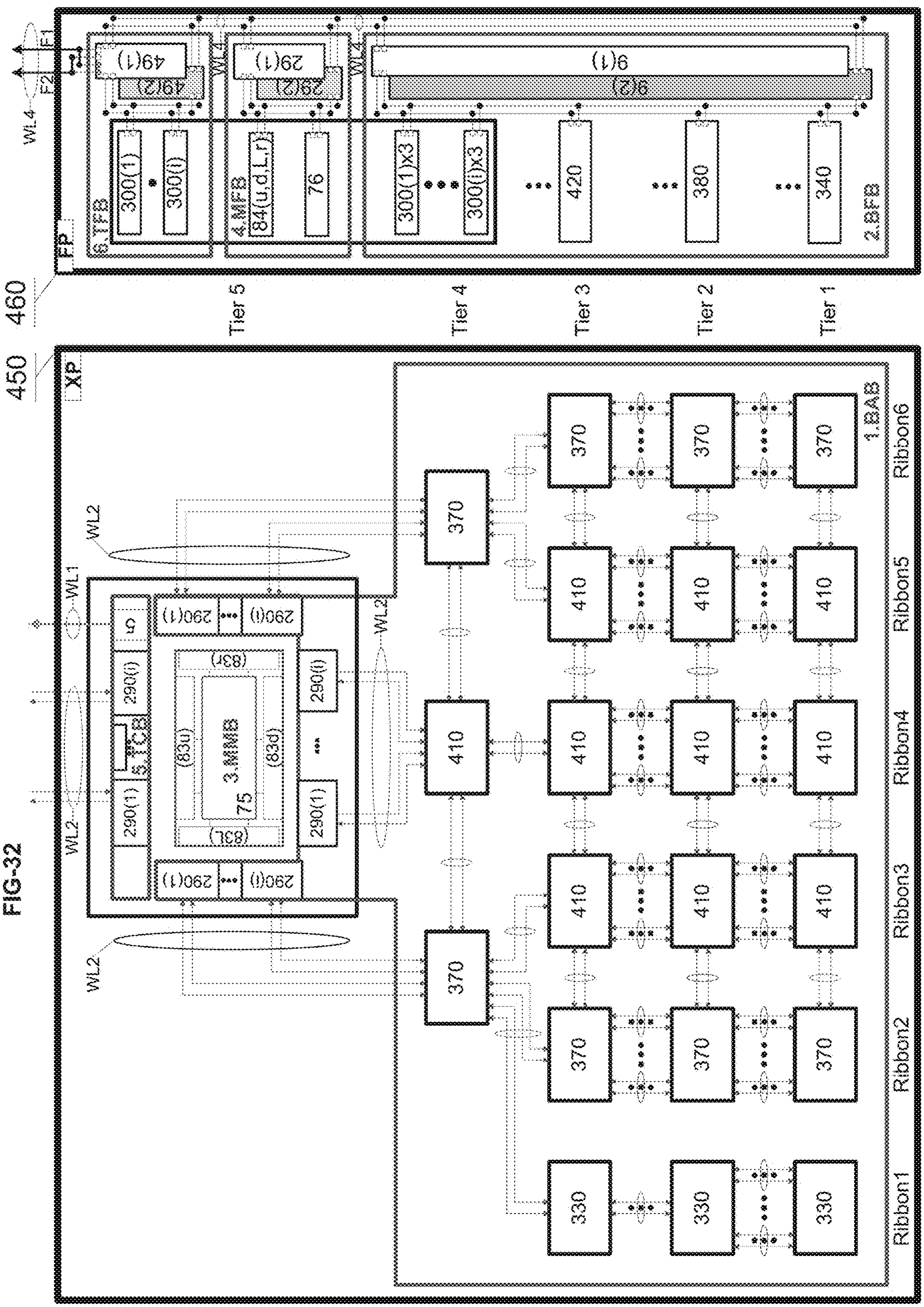

FIG. 32 is a block diagram depicting an exemplary embodiment of the current disclosure of G2.8: Job2 Assembly-Line/Block/Tree-wEntity-based Hierarchical Core Structures (HCSs).

Figure 33A:
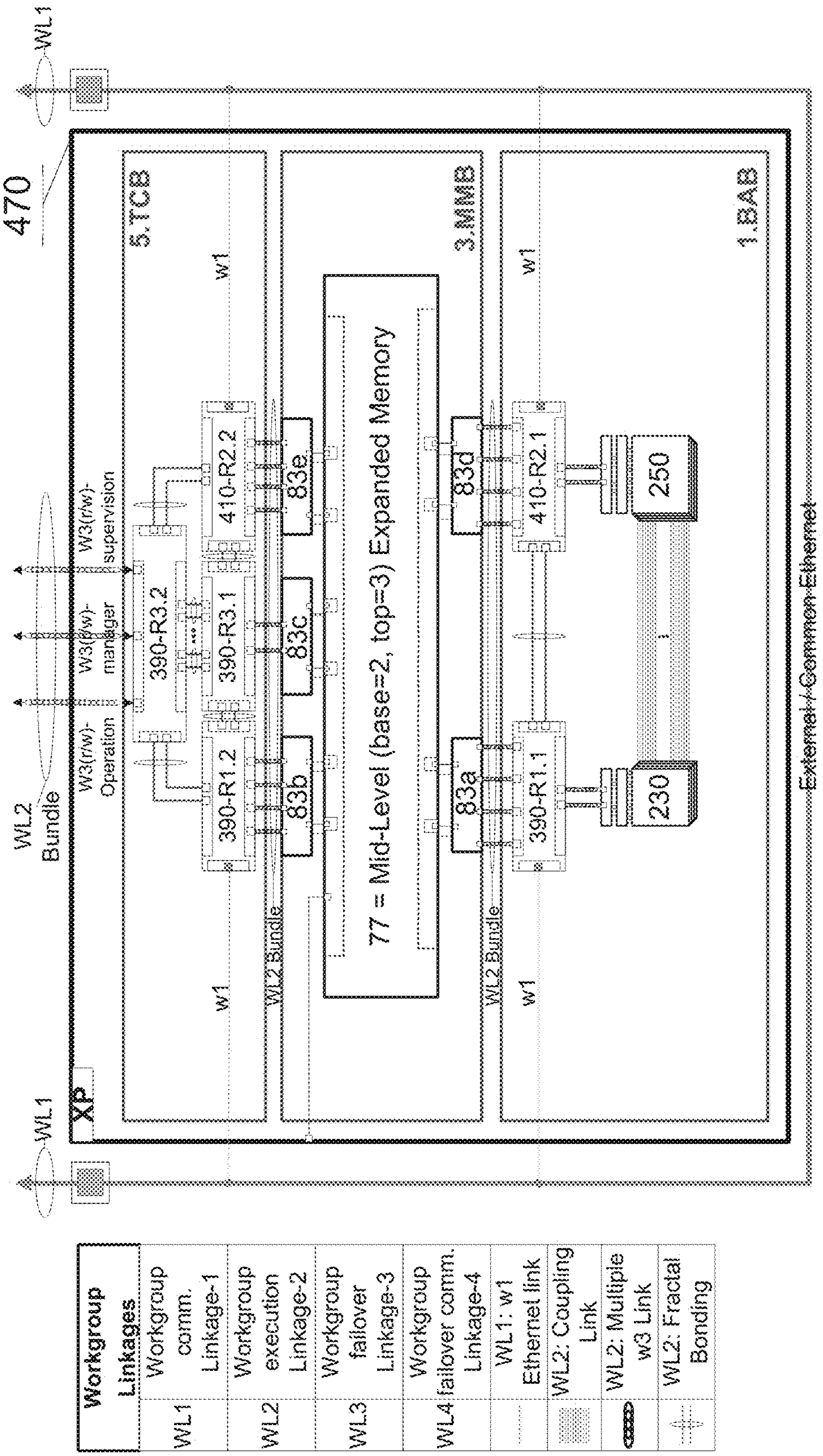

5.3 wGeneration-3 6-wBBB-Evolved HCSs for Building Rt-Dynamic Case-wEntities/wSystems FIG. 33*a* is a block diagram showing an exemplary embodiment of the current disclosure of G3.1: Layer1 Case-wEntity-based eXecution Pylon (XP).

Figure 33B:
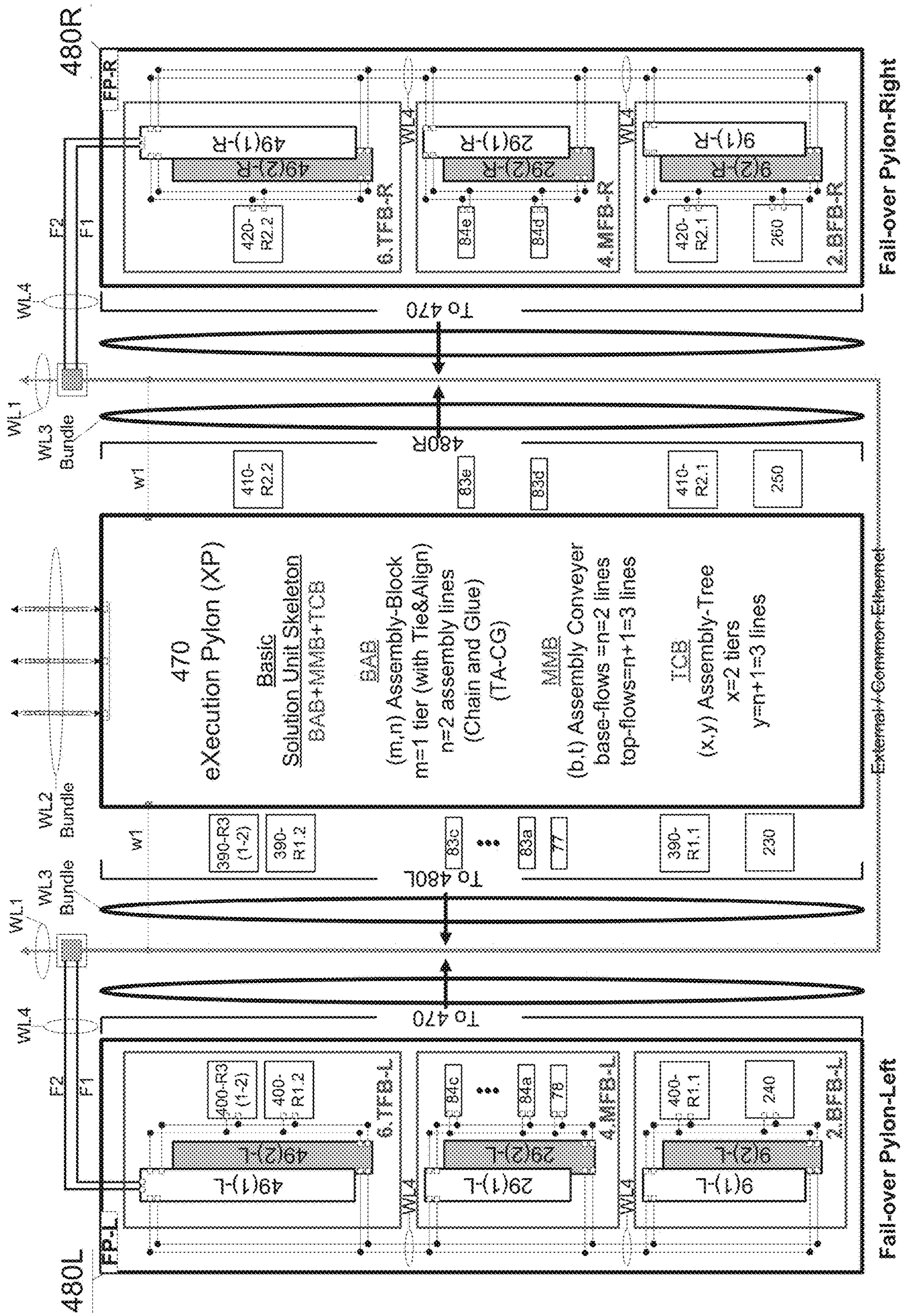

FIG. 33*b* is a block diagram illustrating an exemplary embodiment of the current disclosure of G3.1: Layer1-Case wEntity-based Hierarchical Core Structure (Basic Fabrication Unit).

Figure 34A:
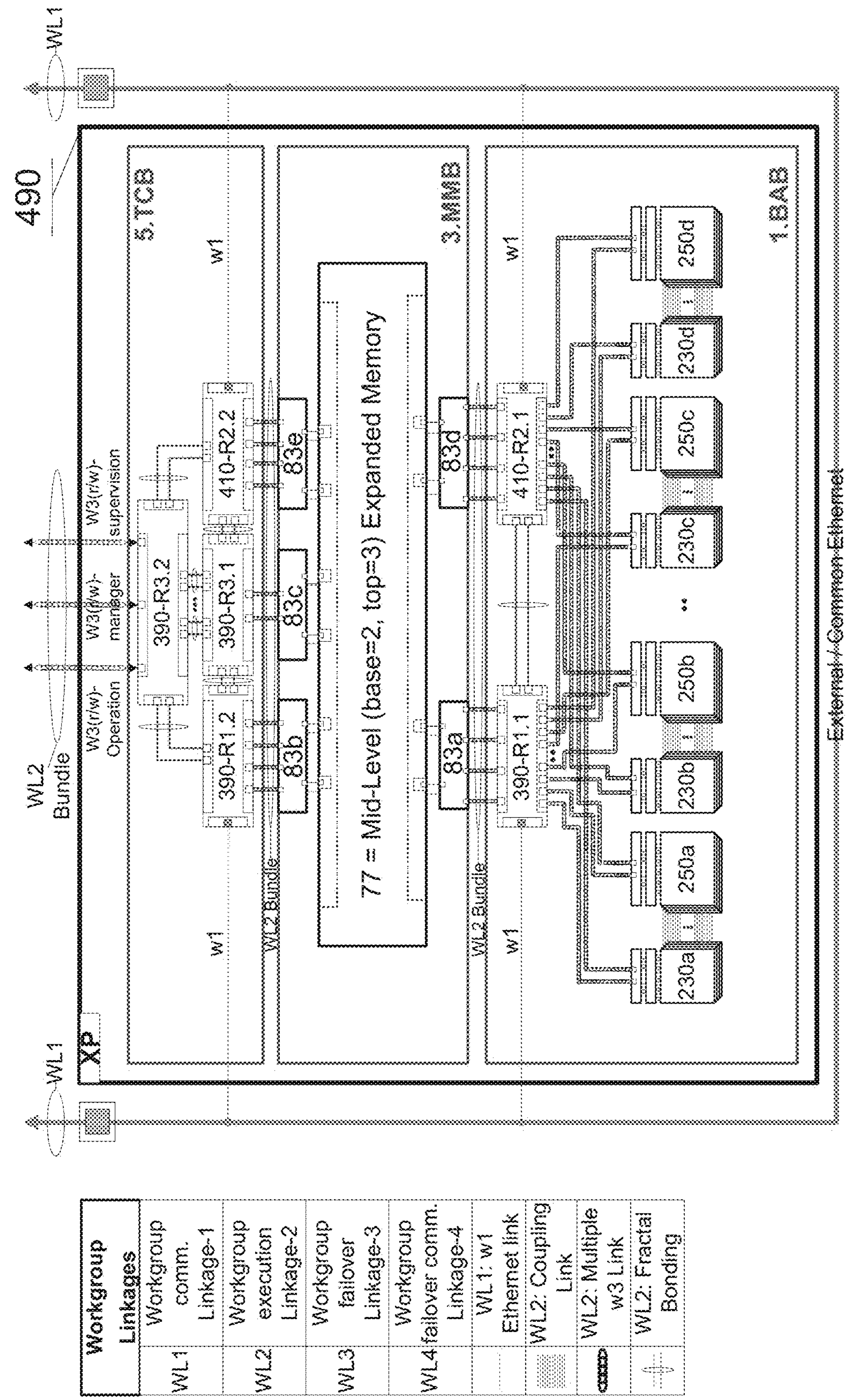

FIG. 34*a* is a block diagram showing an exemplary embodiment of the current disclosure of G3.2: LayerM Case-wEntity-based eXecution Pylon (XP).

Figure 34B:
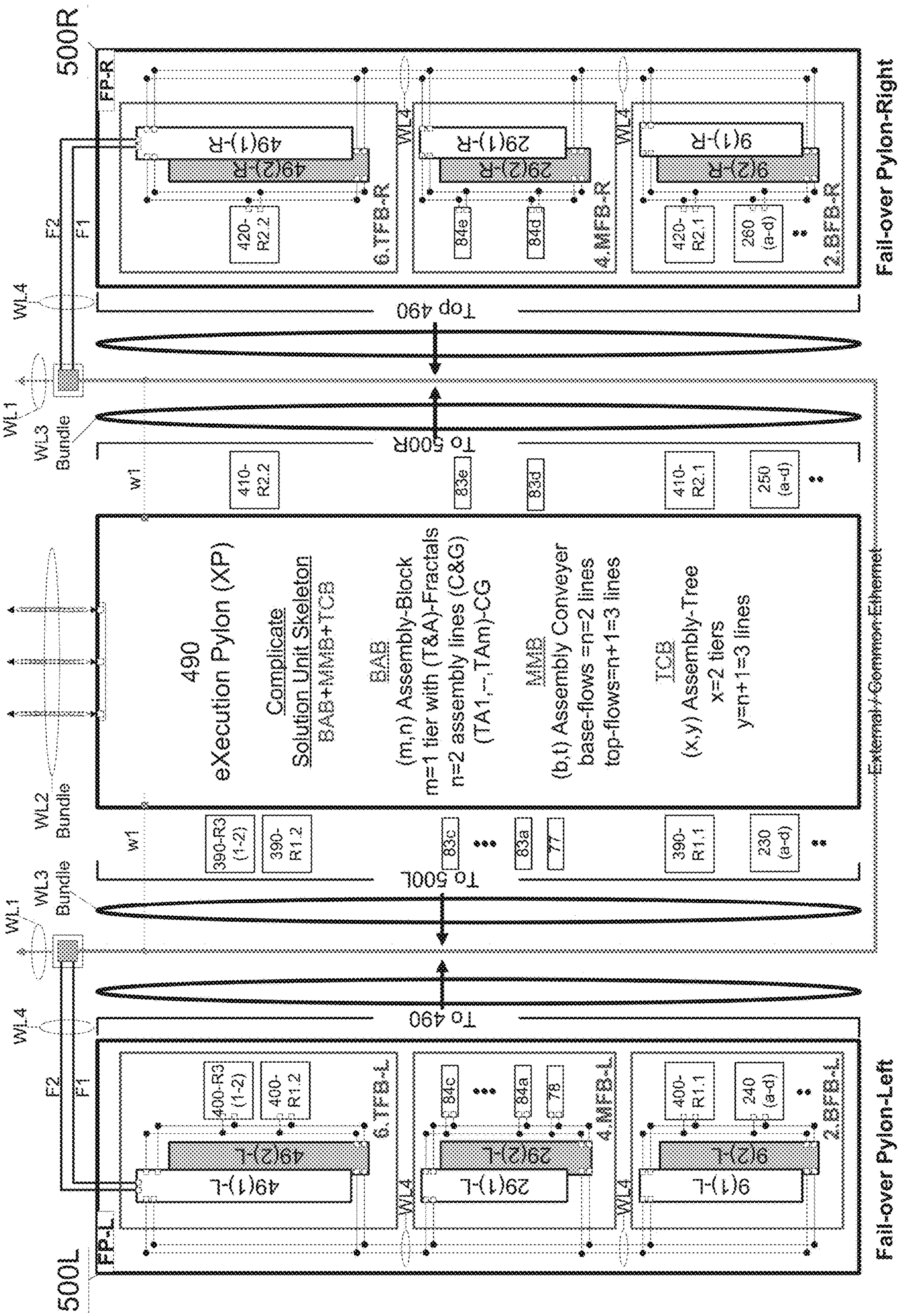

FIG. 34*b* is a block diagram depicting an exemplary embodiment of the current disclosure of G3.2: LayerM Case-wEntity-based Hierarchical Core Structure (Complicate Fabrication Unit).

Figure 35A:
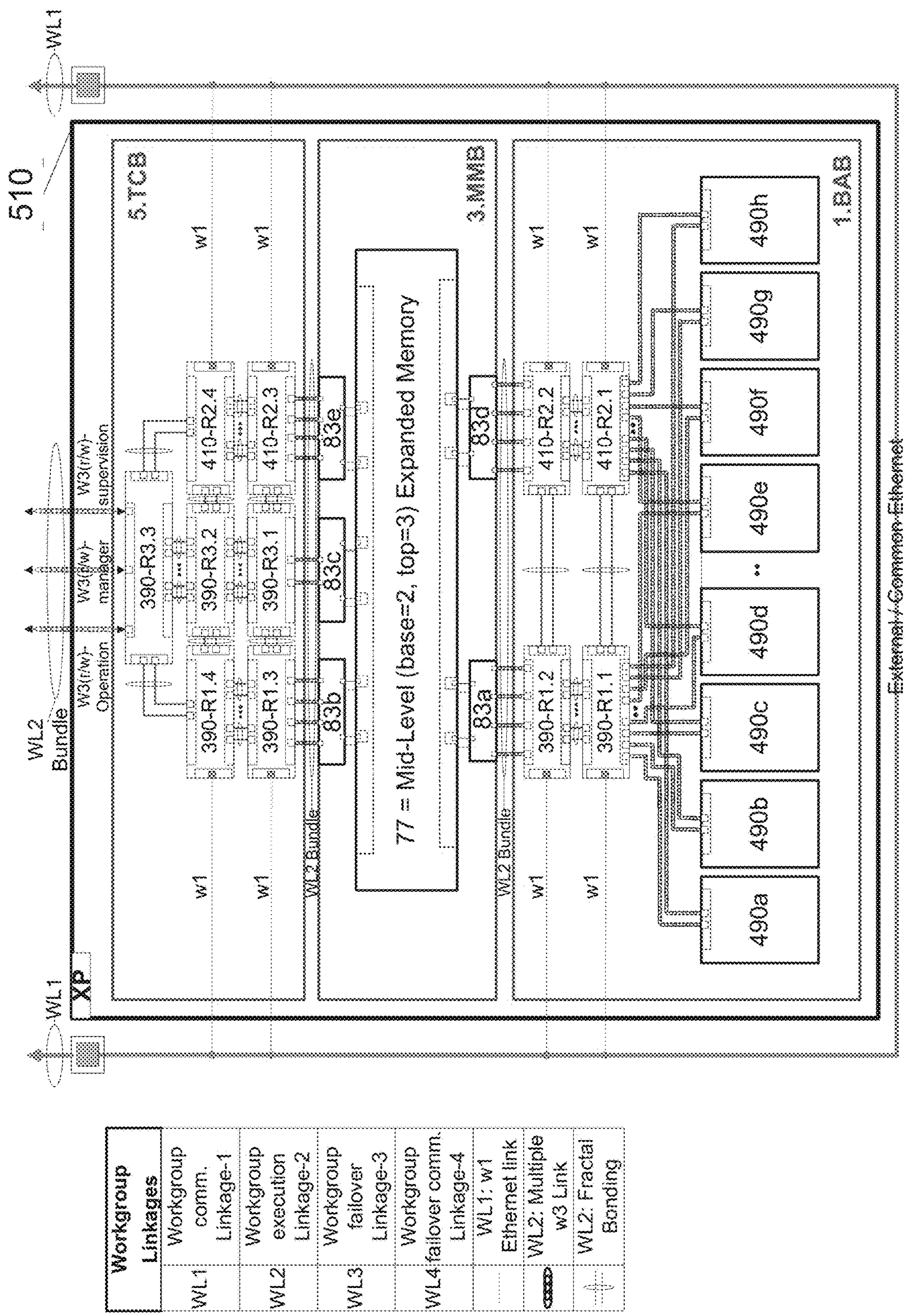

FIG. 35*a* is a block diagram illustrating an exemplary embodiment of the current disclosure of G3.3: Membrane1 Case-wEntity-based eXecution Pylon (XP).

Figure 35B:
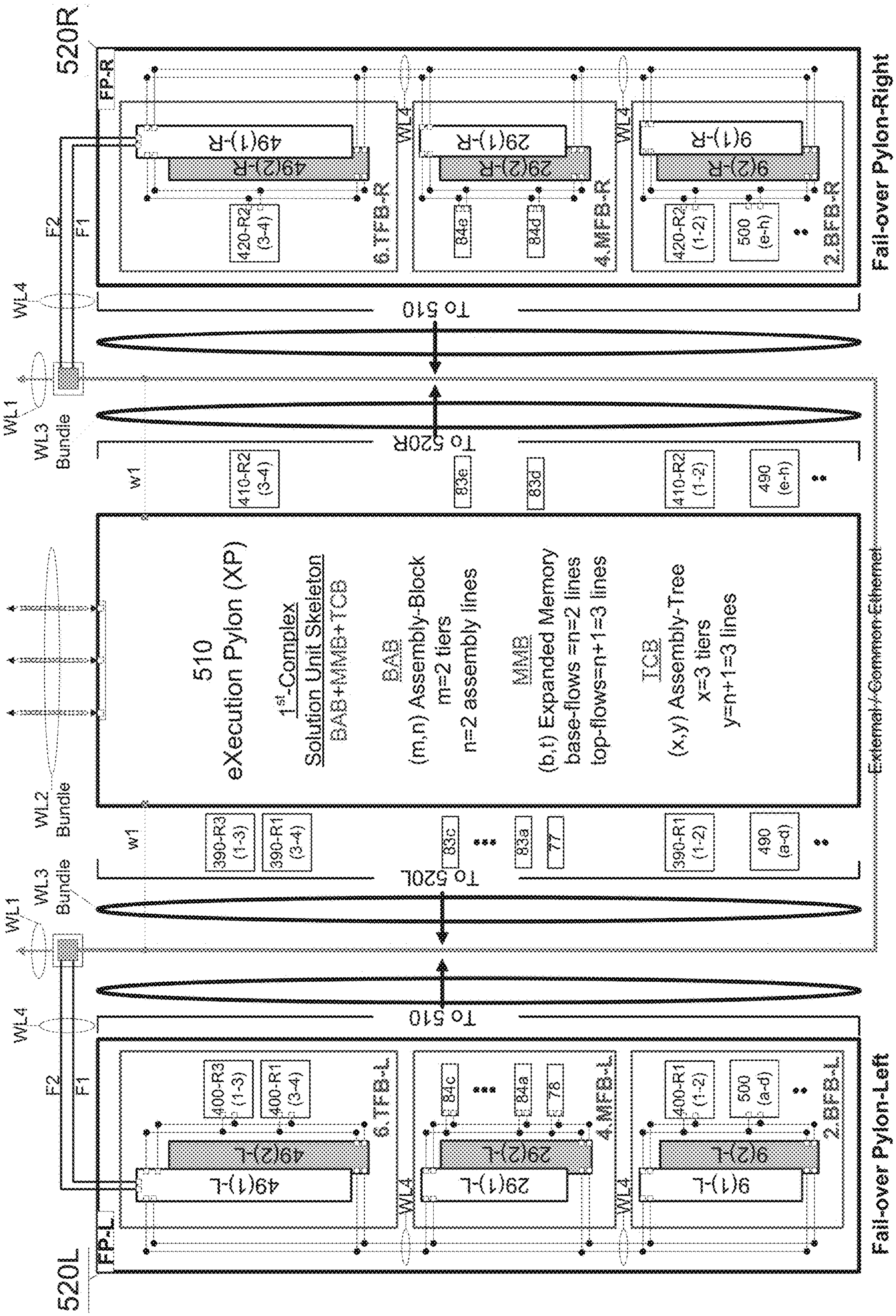

FIG. 35*b* is a block diagram showing an exemplary embodiment of the current disclosure of G3.3: Membrane1 Case-wEntity-based Hierarchical Core Structure (1st Complex Fabrication Unit).

Figure 36A:
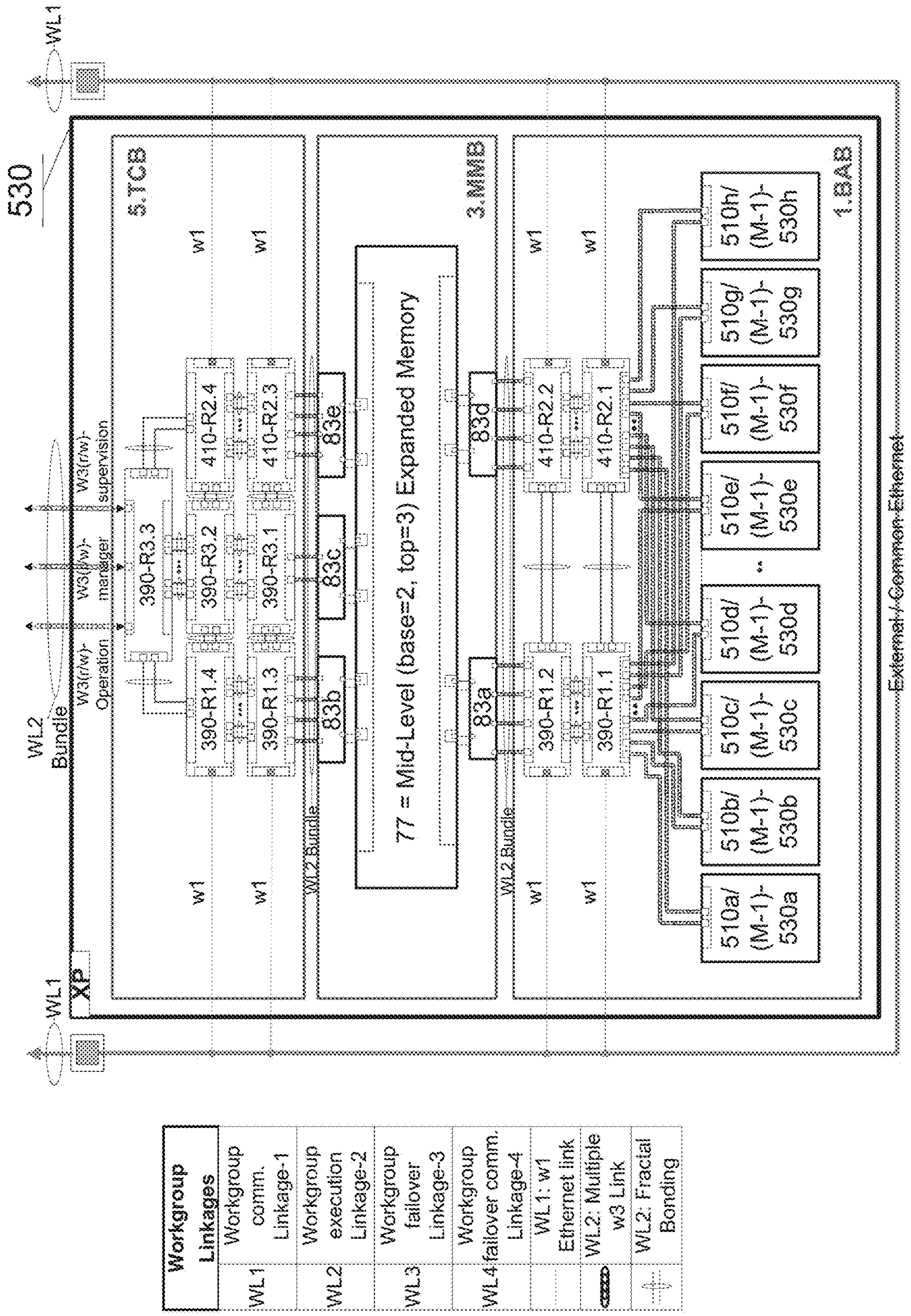

FIG. 36*a* is a block diagram depicting an exemplary embodiment of the current disclosure of G3.4: MembraneM Case-wEntity-based eXecution Pylon (XP).

Figure 36B:
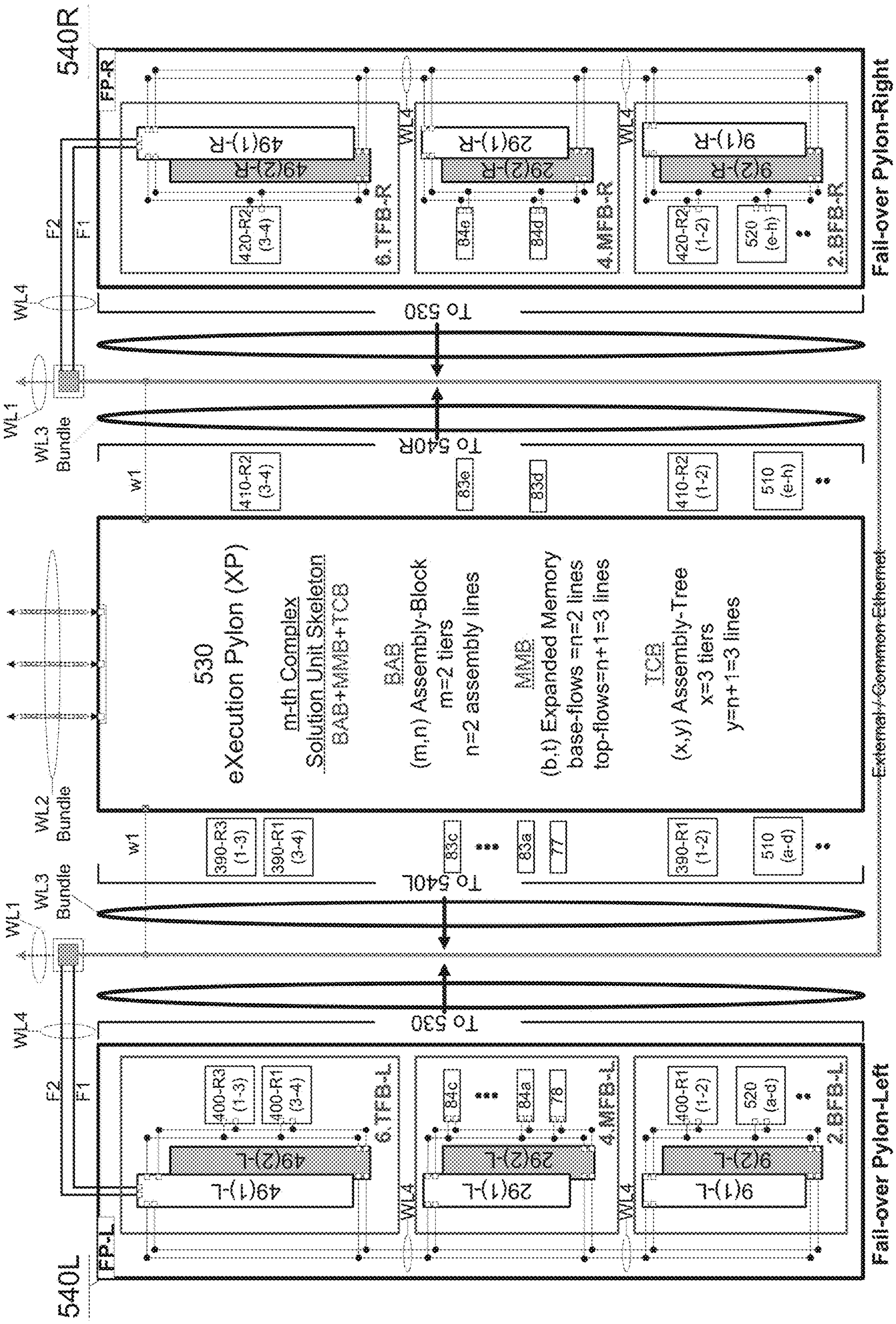

FIG. 36*b* is a block diagram illustrating an exemplary embodiment of the current disclosure of G3.4: MembraneM Case-wEntity-based Hierarchical Core Structure (m-th Complex Fabrication Unit).

Figure 37A:
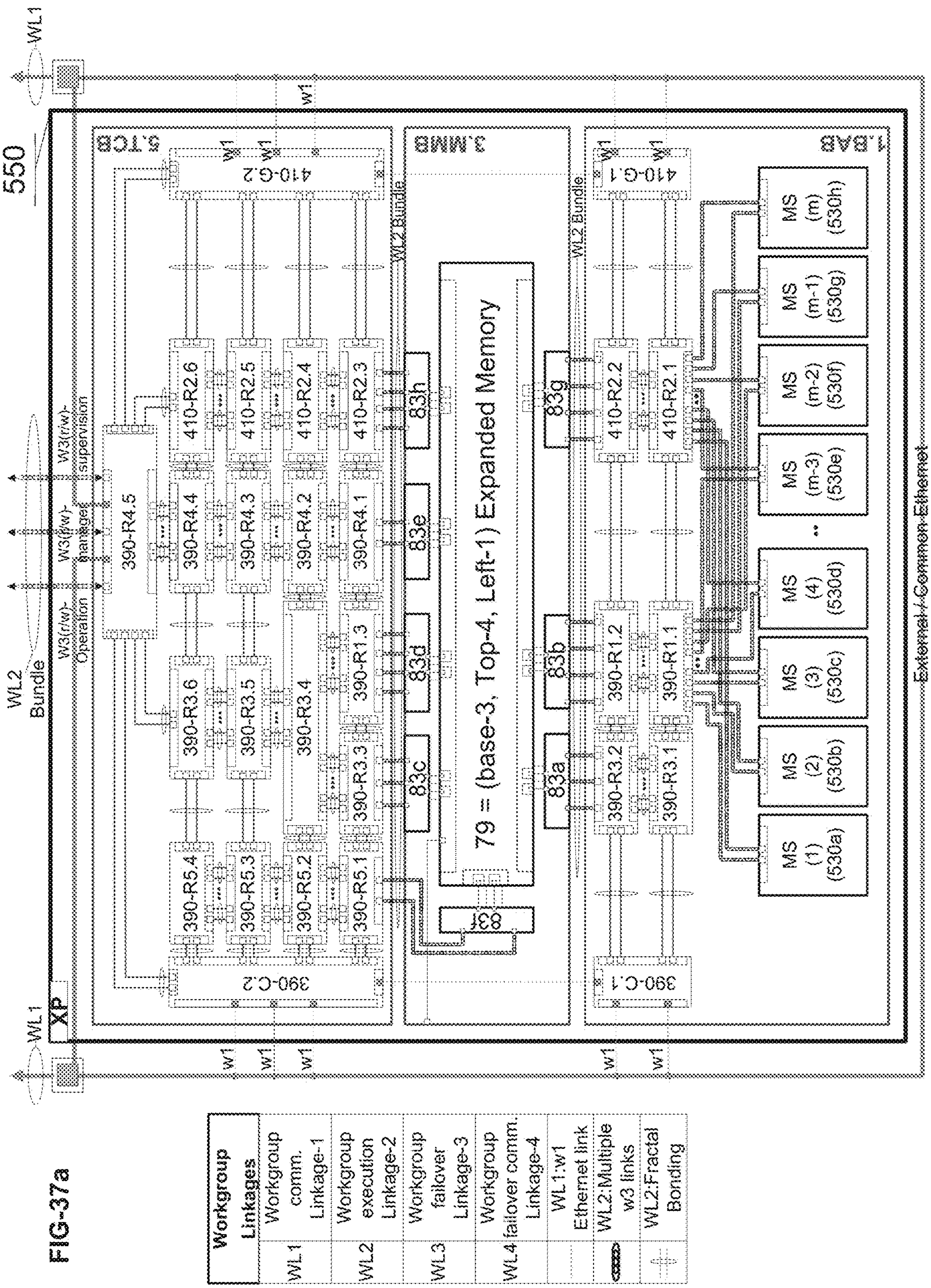

5.4 wGeneration-4 6-wBBB-evolved HCSs for building rt-interactive/cognitive Contract-wEntities/wSystems FIG. 37*a* is a block diagram showing an exemplary embodiment of the current disclosure of G4.1: 2-Channel-interactive Fine-Grained Reactive Expert Contract-wEntity-based eXecution Pylon (XP).

Figure 37B:
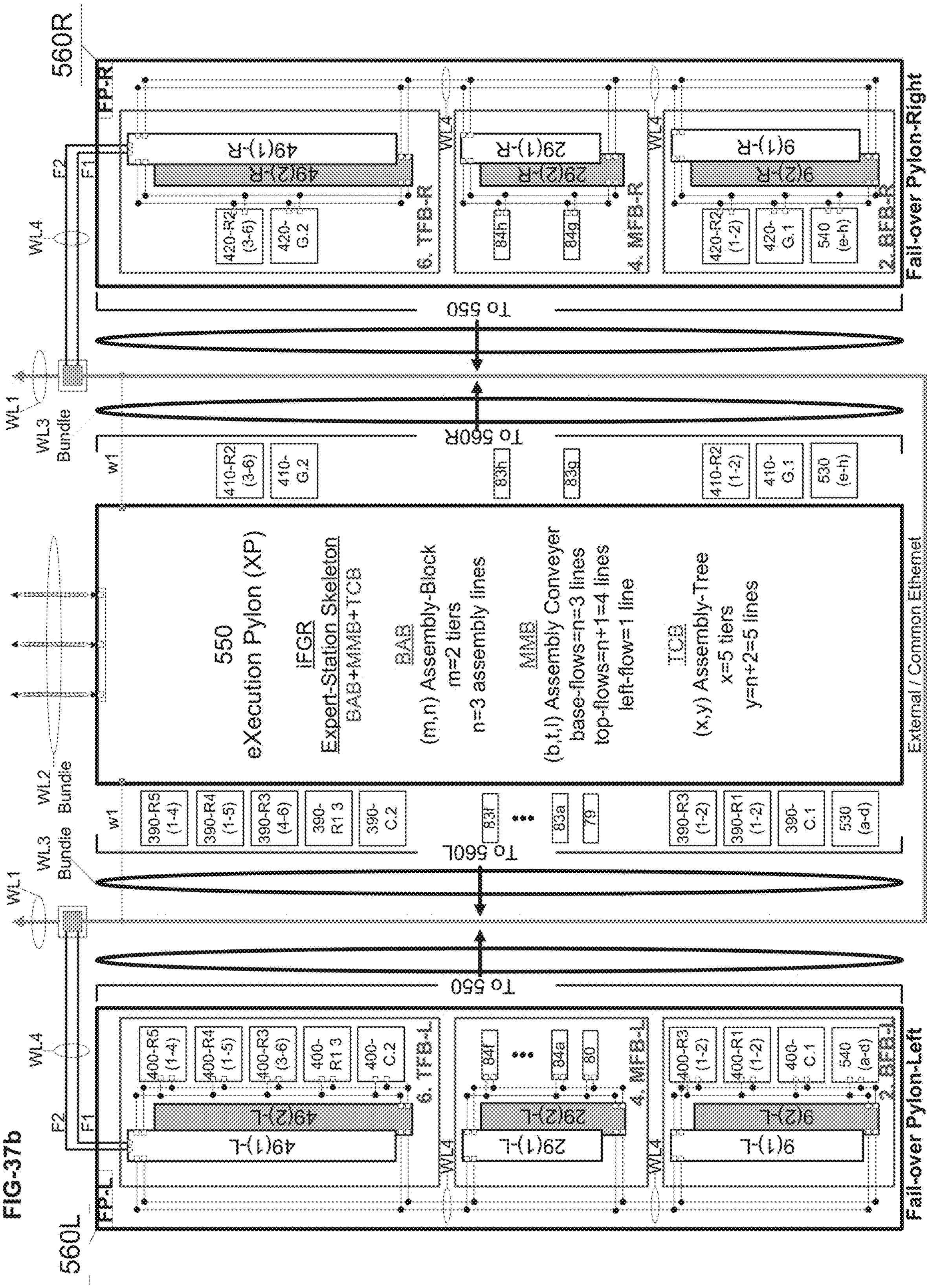

FIG. 37*b* is a block diagram depicting an exemplary embodiment of the current disclosure of G4.1: iFGR-Expert Contract-wEntity-based Hierarchical Core Structure (iFGR-Expert Station).

Figure 38A:
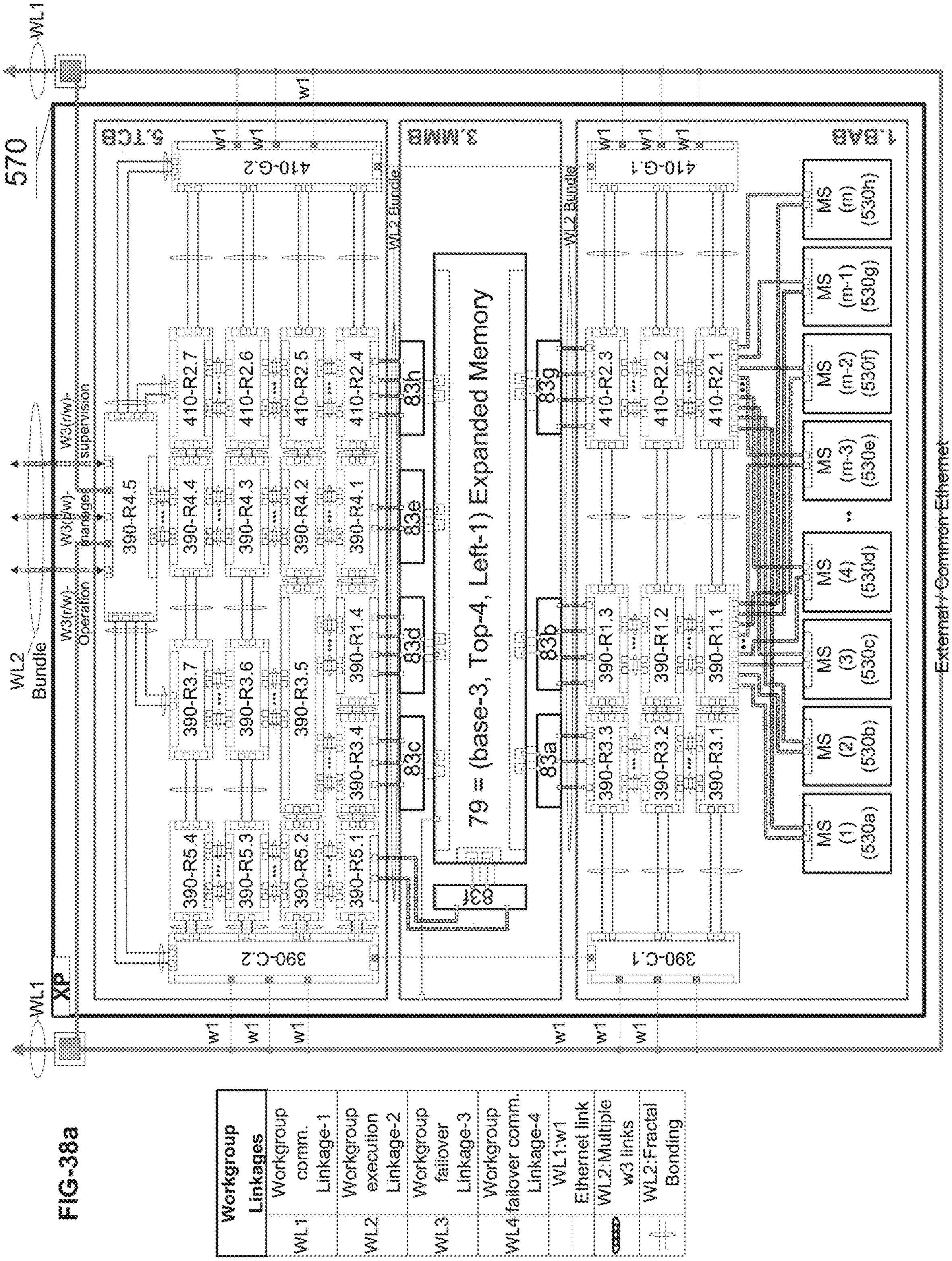

FIG. 38*a* is a block diagram illustrating an exemplary embodiment of the current disclosure of G4.2: 3-Channel-cognitive Fine-Grained-Reactive-Expert Contract-wEntity-based eXecution Pylon (XP).

Figure 38B:
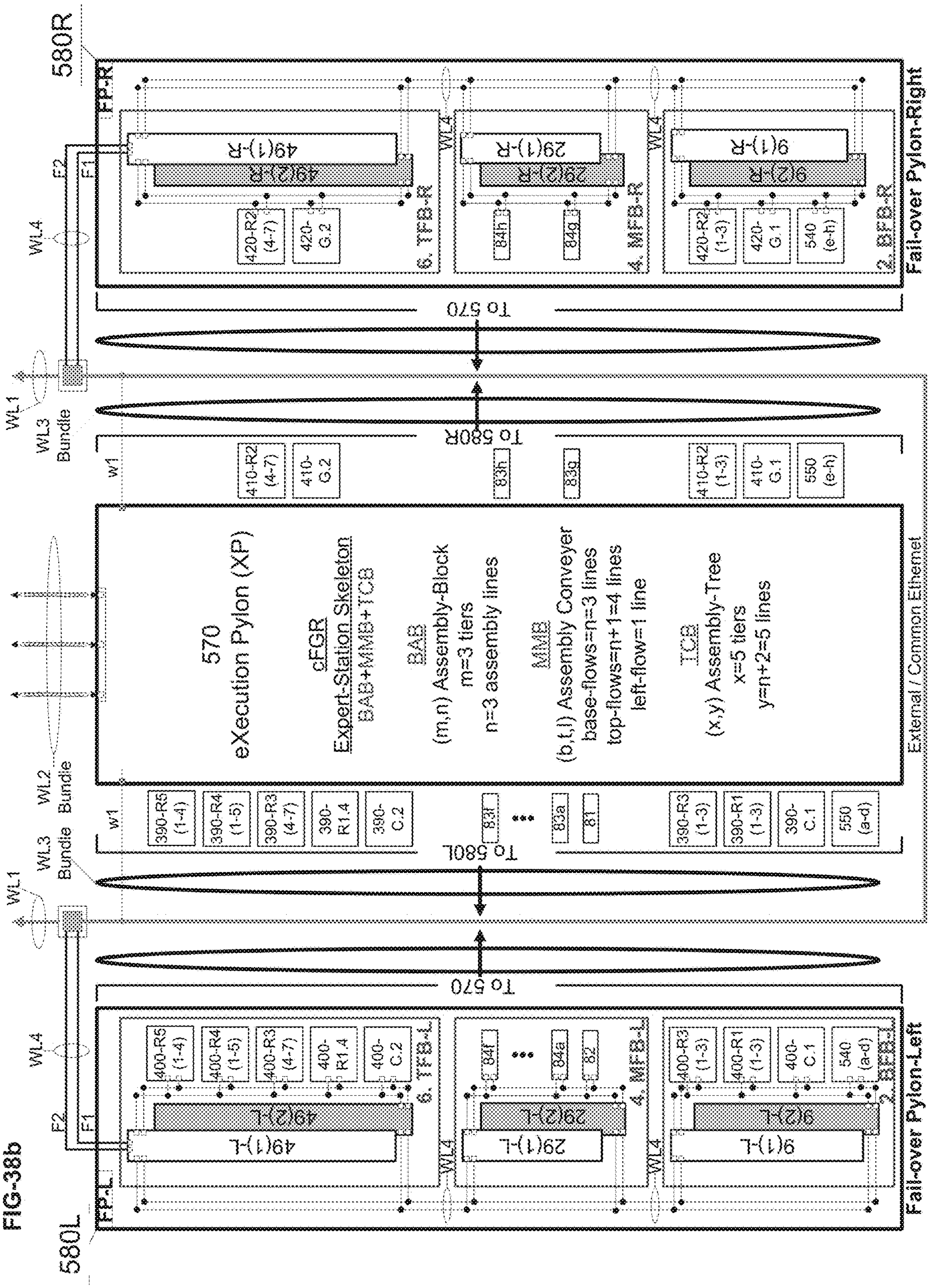

FIG. 38*b* is a block diagram depicting an exemplary embodiment of the current disclosure of G4.2: cFGR-Expert Contract-wEntity-based Hierarchical Core Structure (cFGR-Expert Station).

Figure 39A:
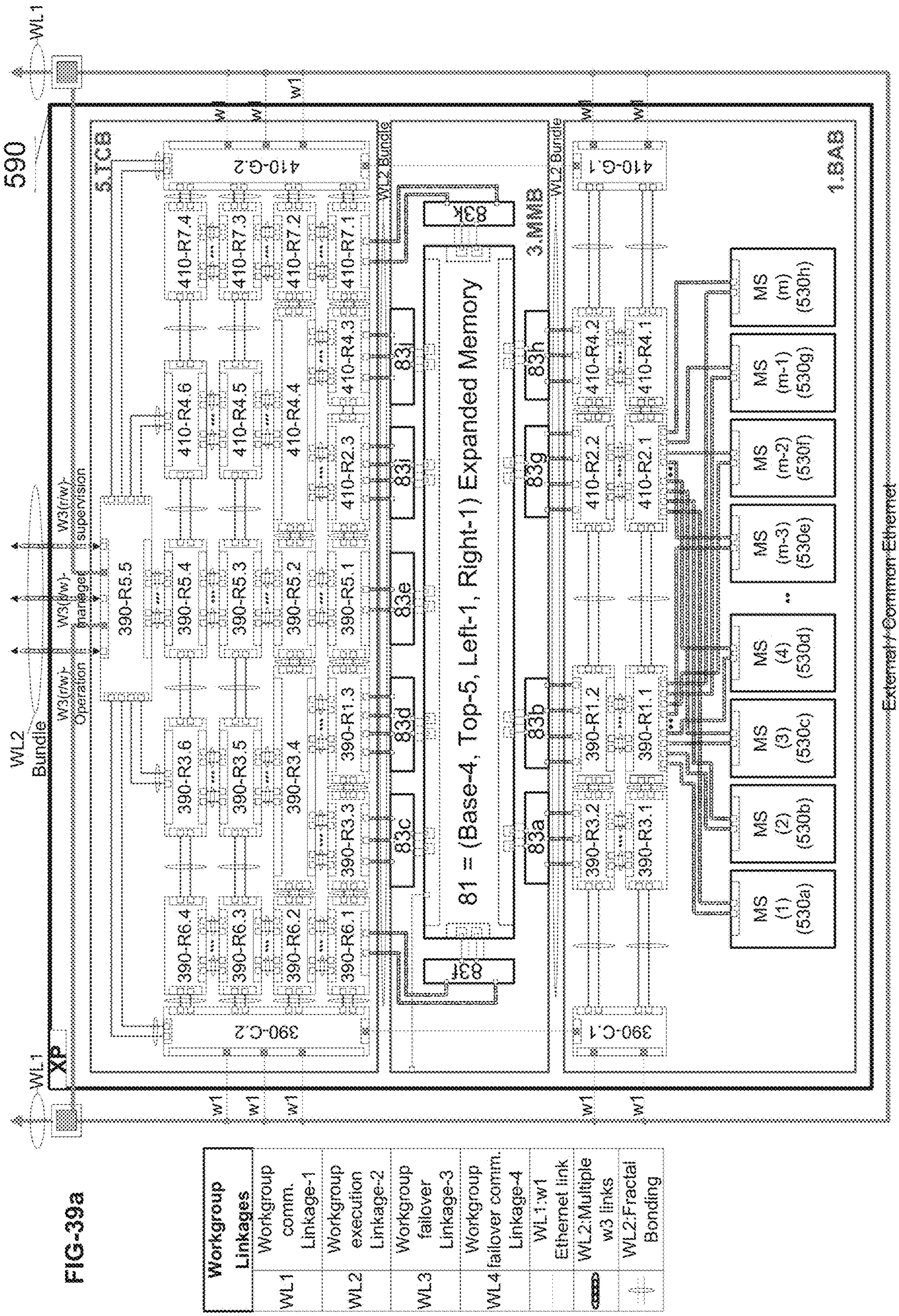

FIG. 39*a* is a block diagram showing an exemplary embodiment of the current disclosure of G4.3: 2-Channel-interactive Fine-Grained-Proactive Expert Contract-wEntity-based eXecution Pylon.

Figure 39B:
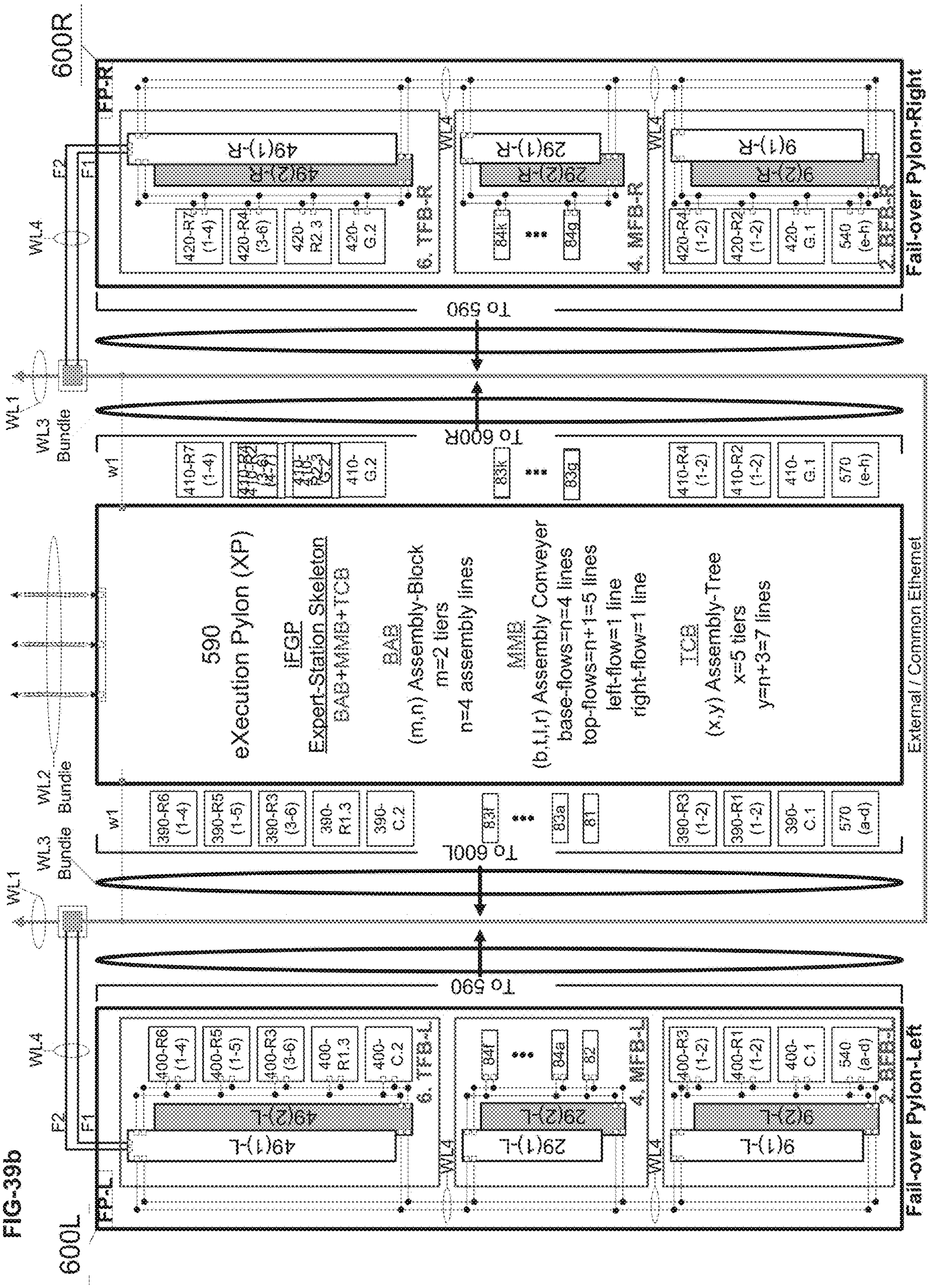

FIG. 39*b* is a block diagram depicting an exemplary embodiment of the current disclosure of G4.3: iFGP-Expert Contract-wEntity-based Hierarchical Core Structure (iFGP-Expert Station).

Figure 40A:
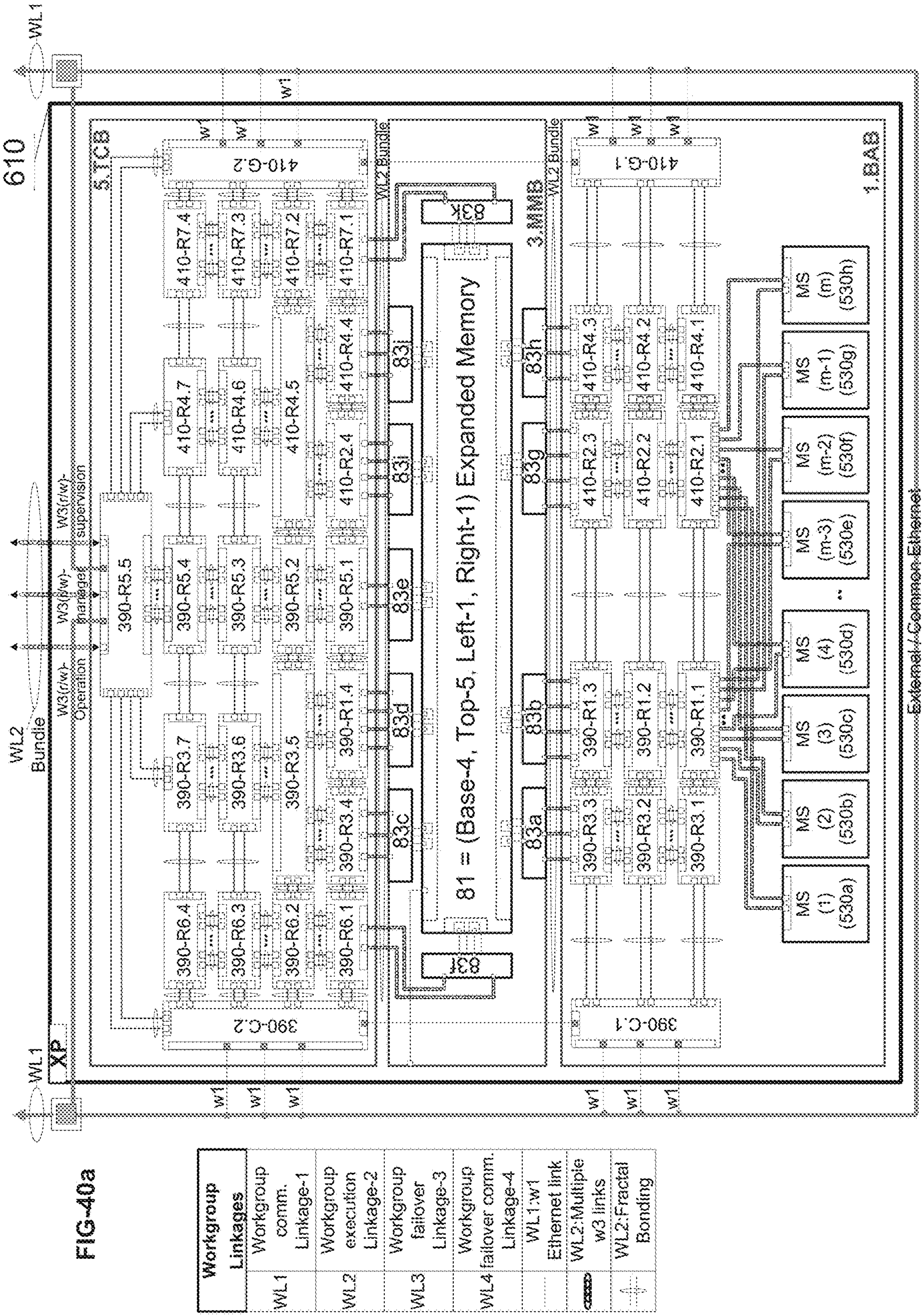

FIG. 40*a* is a block diagram illustrating an exemplary embodiment of the current disclosure of G4.4: 3-Channel-cognitive Fine-Grained-Proactive Expert Contract-wEntity-based eXecution Pylon.

Figure 40B:
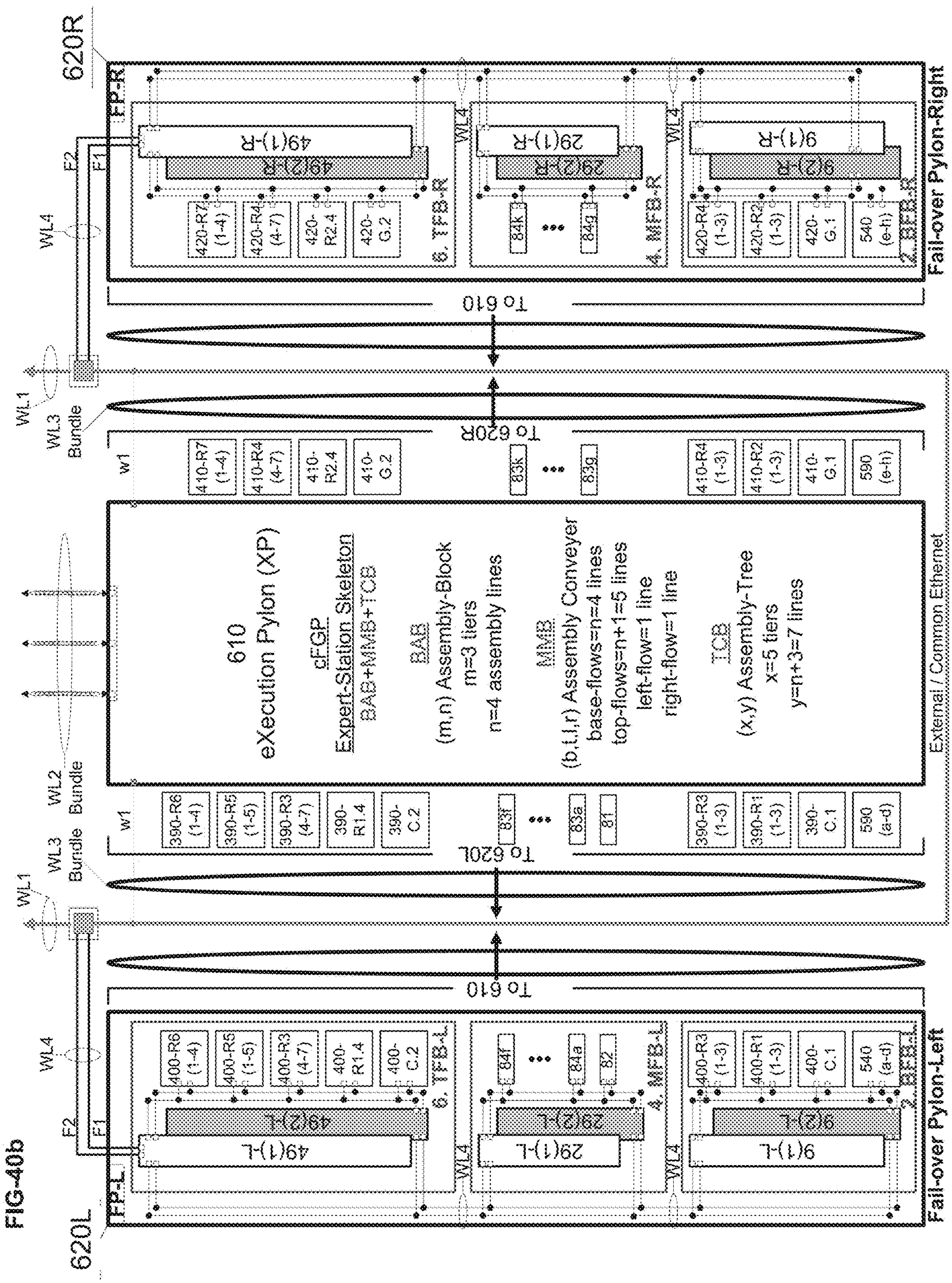

FIG. 40*b* is a block diagram showing an exemplary embodiment of the current disclosure of G4.4: cFGP-Expert Contract-wEntity-based Hierarchical Core Structure (cFGP-Expert Station).

Figure 41A:
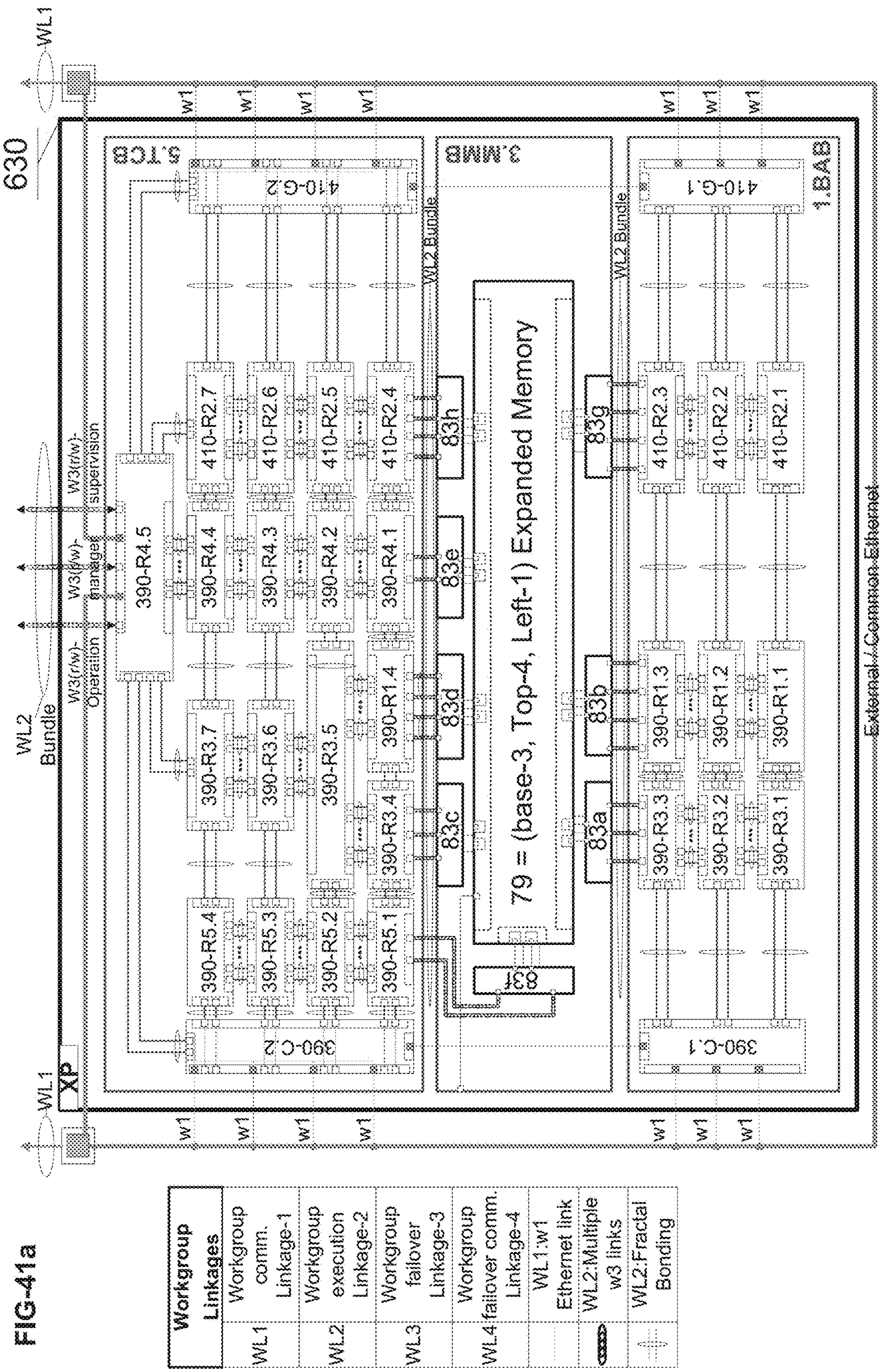

FIG. 41*a* is a block diagram depicting an exemplary embodiment of the current disclosure of G4.5: cFGR-Agent Contract-wEntity-based eXecution Pylon (XP).

Figure 41B:
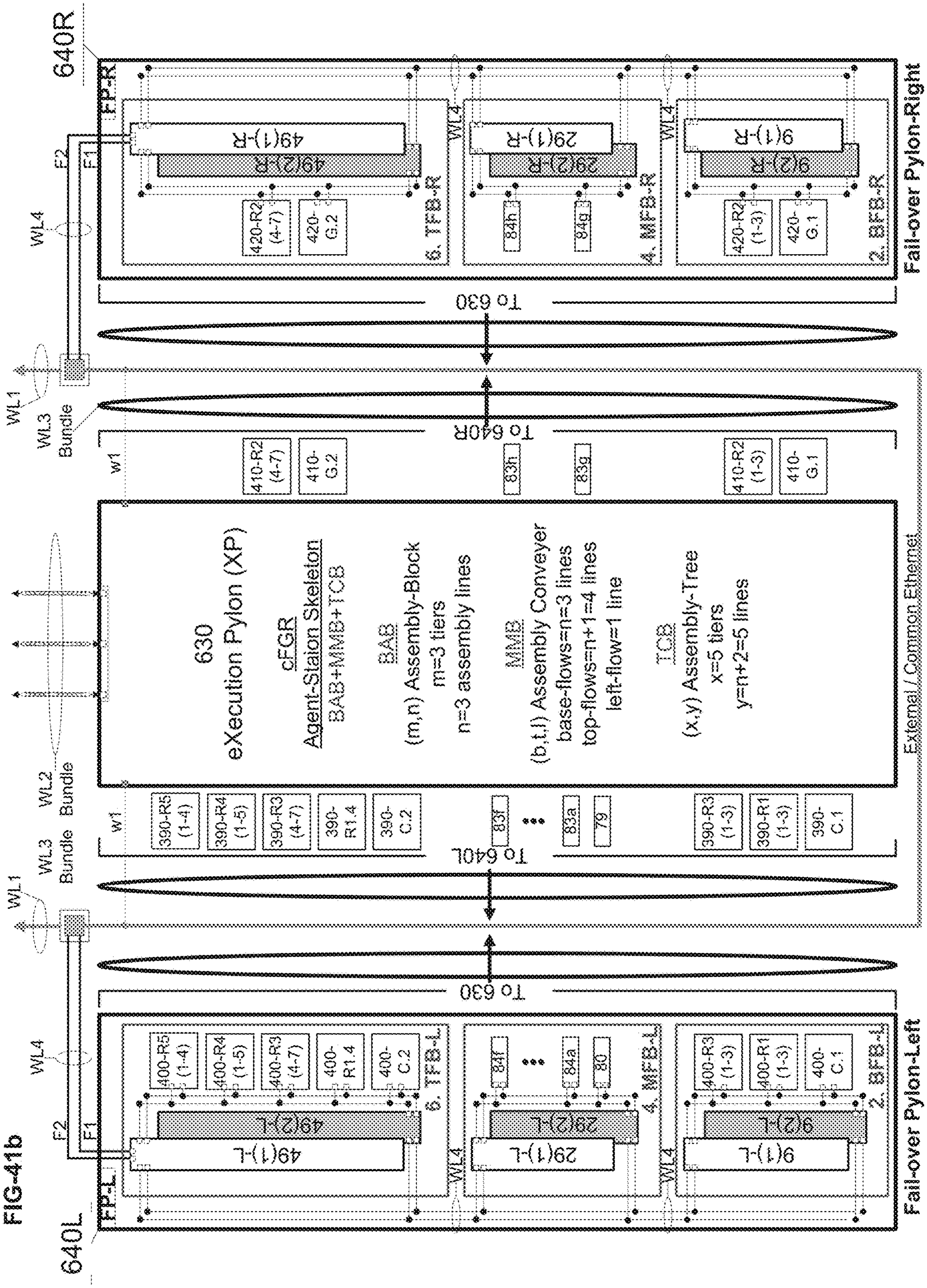

FIG. 41*b* is a block diagram showing an exemplary embodiment of the current disclosure of G4.5: cFGR-Agent Contract-wEntity-based Hierarchical Core Structure (cFGR-Agent-Station).

Figure 42A:
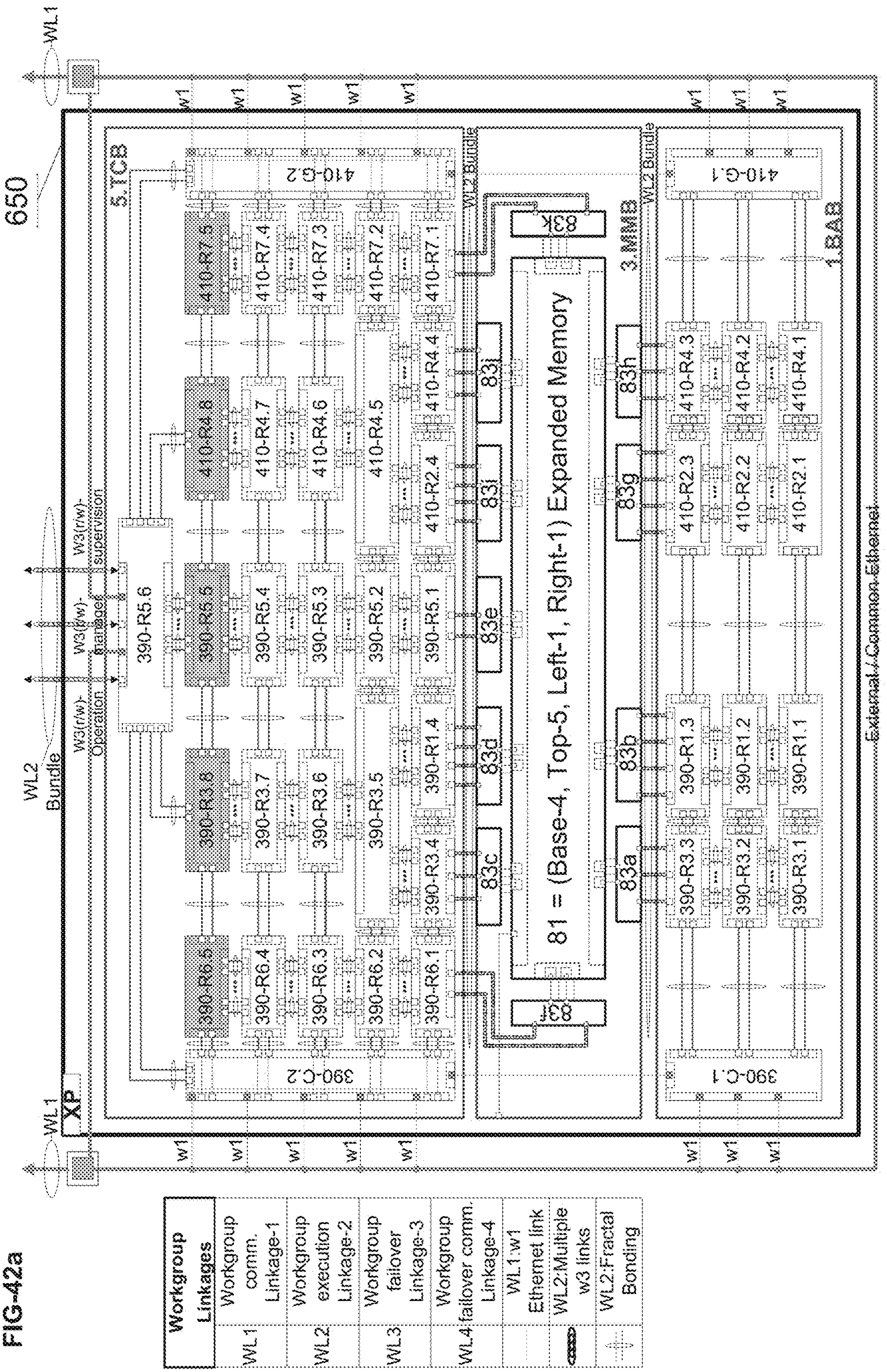

FIG. 42*a* is a block diagram illustrating an exemplary embodiment of the current disclosure of G4.6: cFGP-Agent Contract-wEntity-based eXecution Pylon (XP).

Figure 42B:
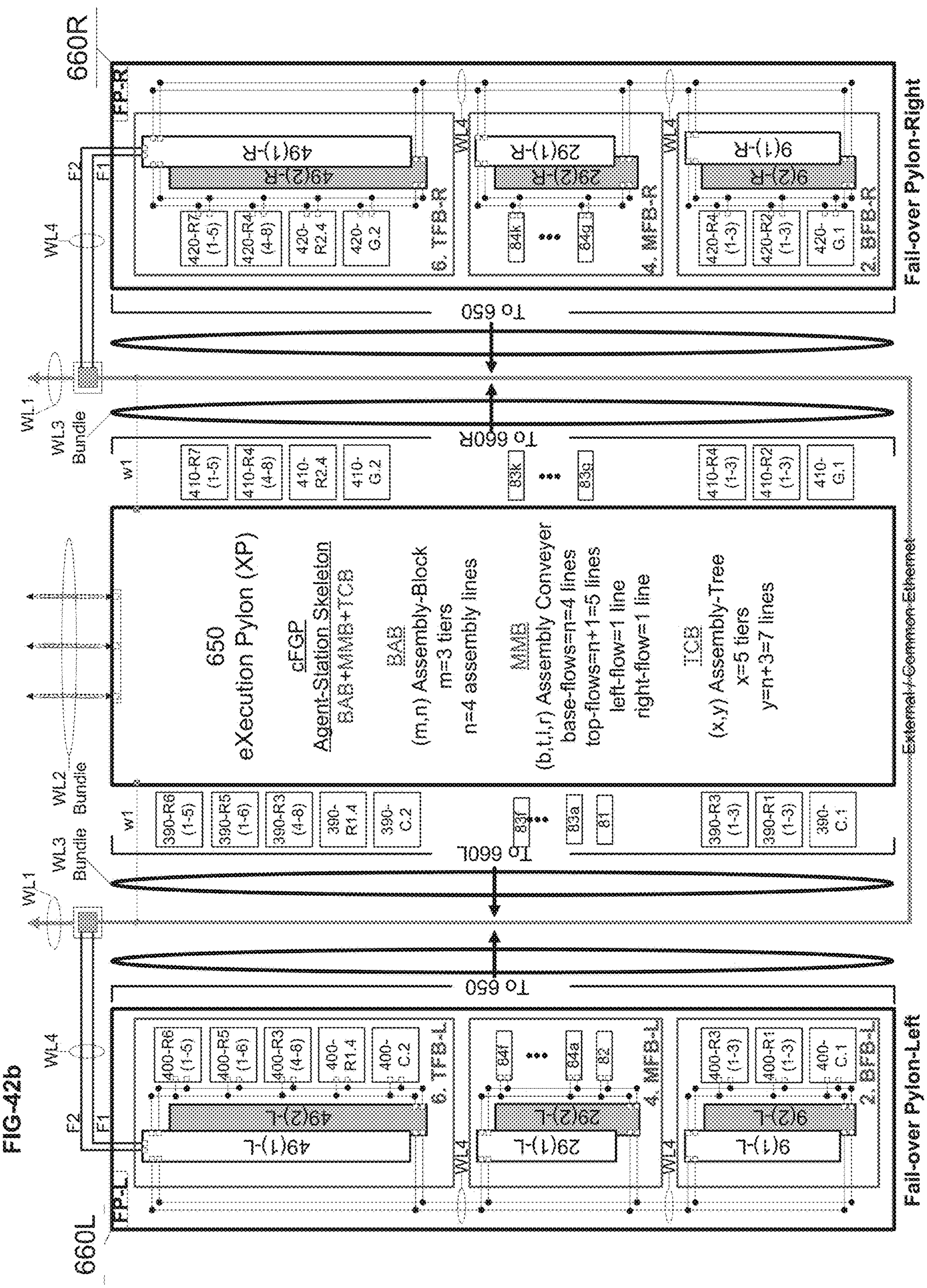

FIG. 42*b* is a block diagram showing an exemplary embodiment of the current disclosure of G4.6: cFGP-Agent Contract-wEntity-based Hierarchical Core Structure (cFGP-Agent Station).

5.5 wGeneration-5 6-wBBB-evolved standard HCSs for building rt-innate intelligent Organization-based unitary wEntities/wSystems, rt-AI Organization-zone wSystems, rt-SI Organization-cloud wSystems.

Figure 43A:
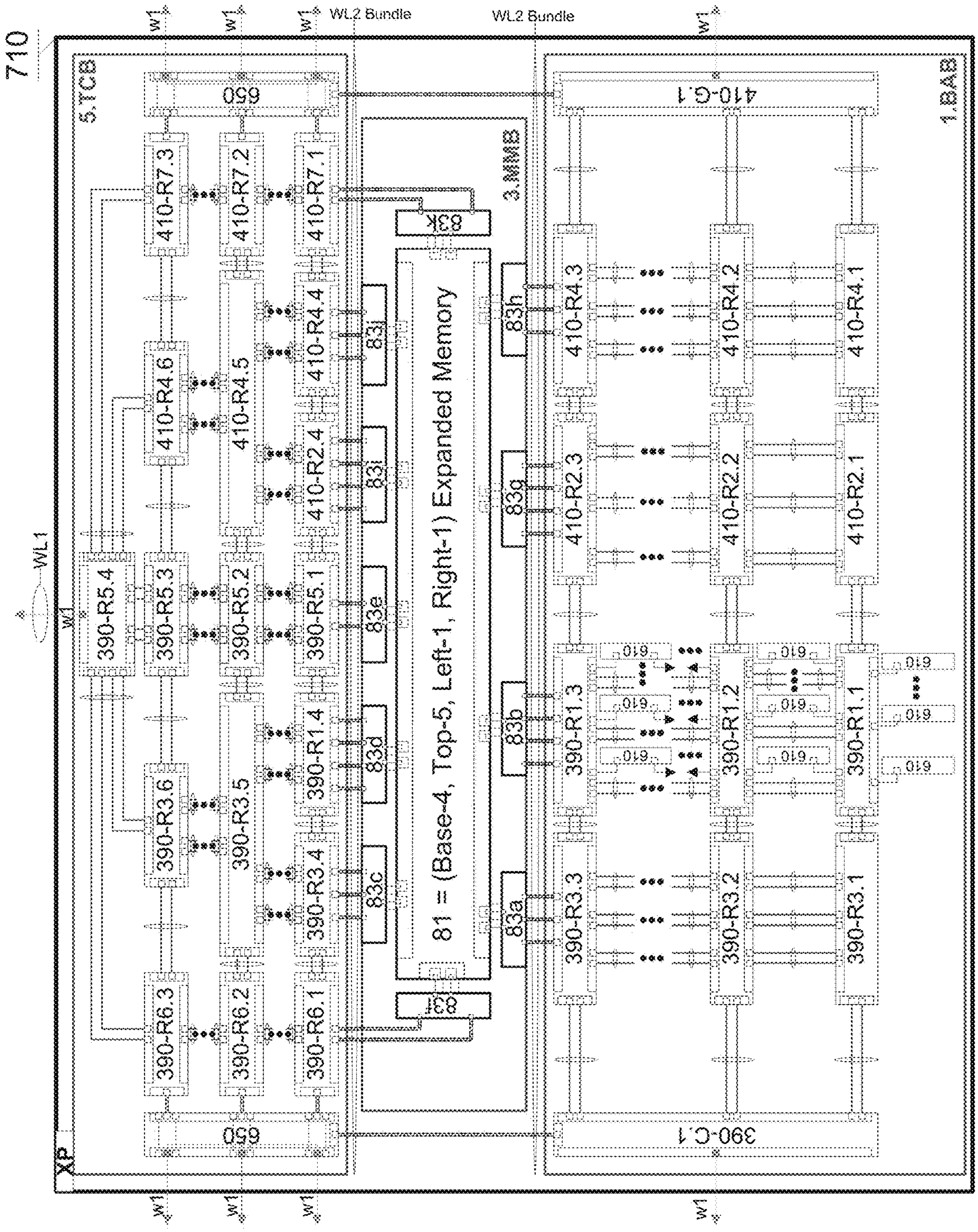

FIG. 43*a* is a block diagram showing an exemplary embodiment of the current disclosure of G5.1: Organization-based Portfolio-wEntity-based eXecution Pylon (XP).

Figure 43B:
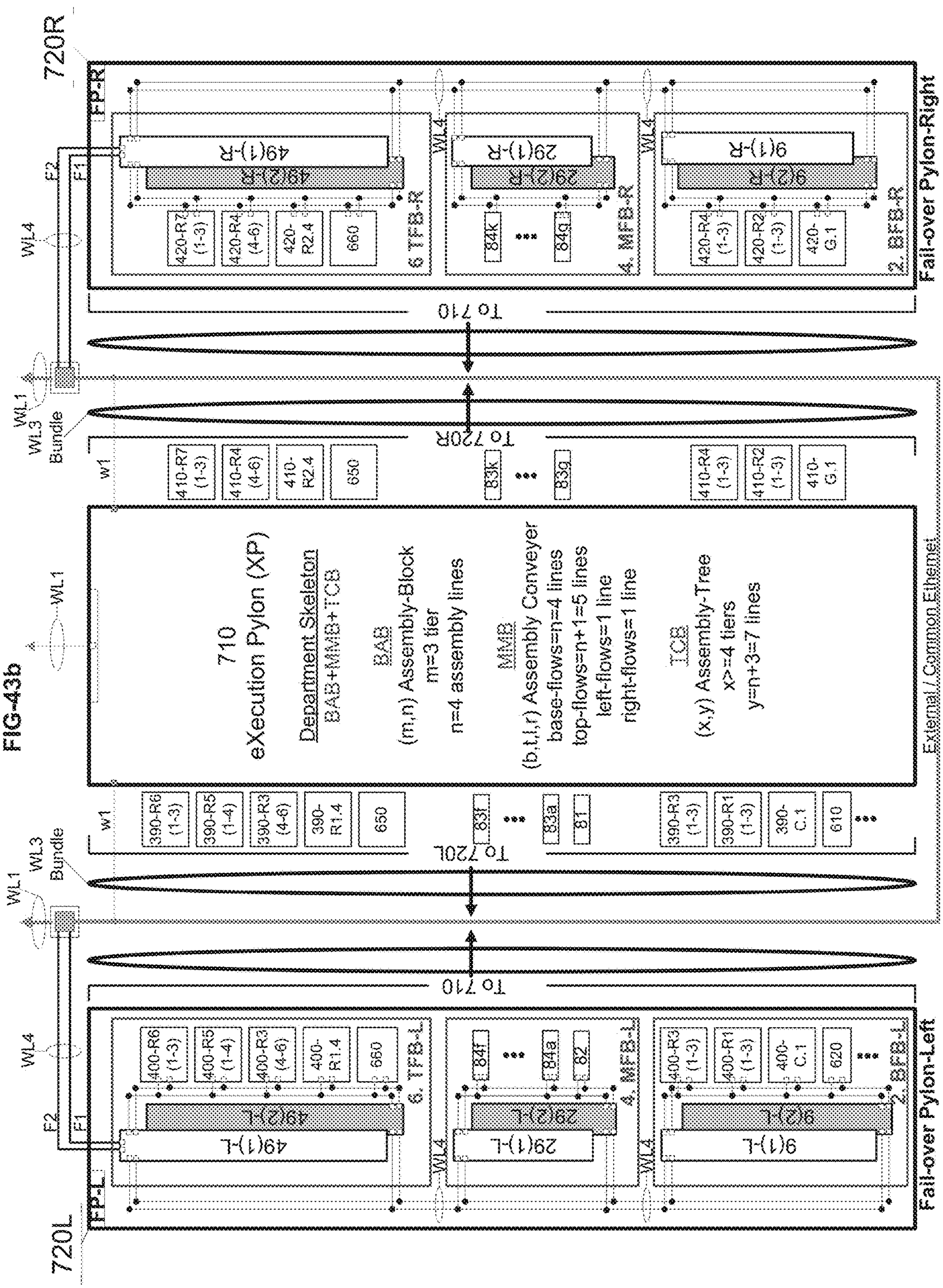

FIG. 43*b* is a block diagram illustrating an exemplary embodiment of the current disclosure of G5.1: Standard Portfolio-wEntity-based Hierarchical Core Structure (for rt-innate intelligent Organization-Department wEntities/wSystems).

Figure 44A:
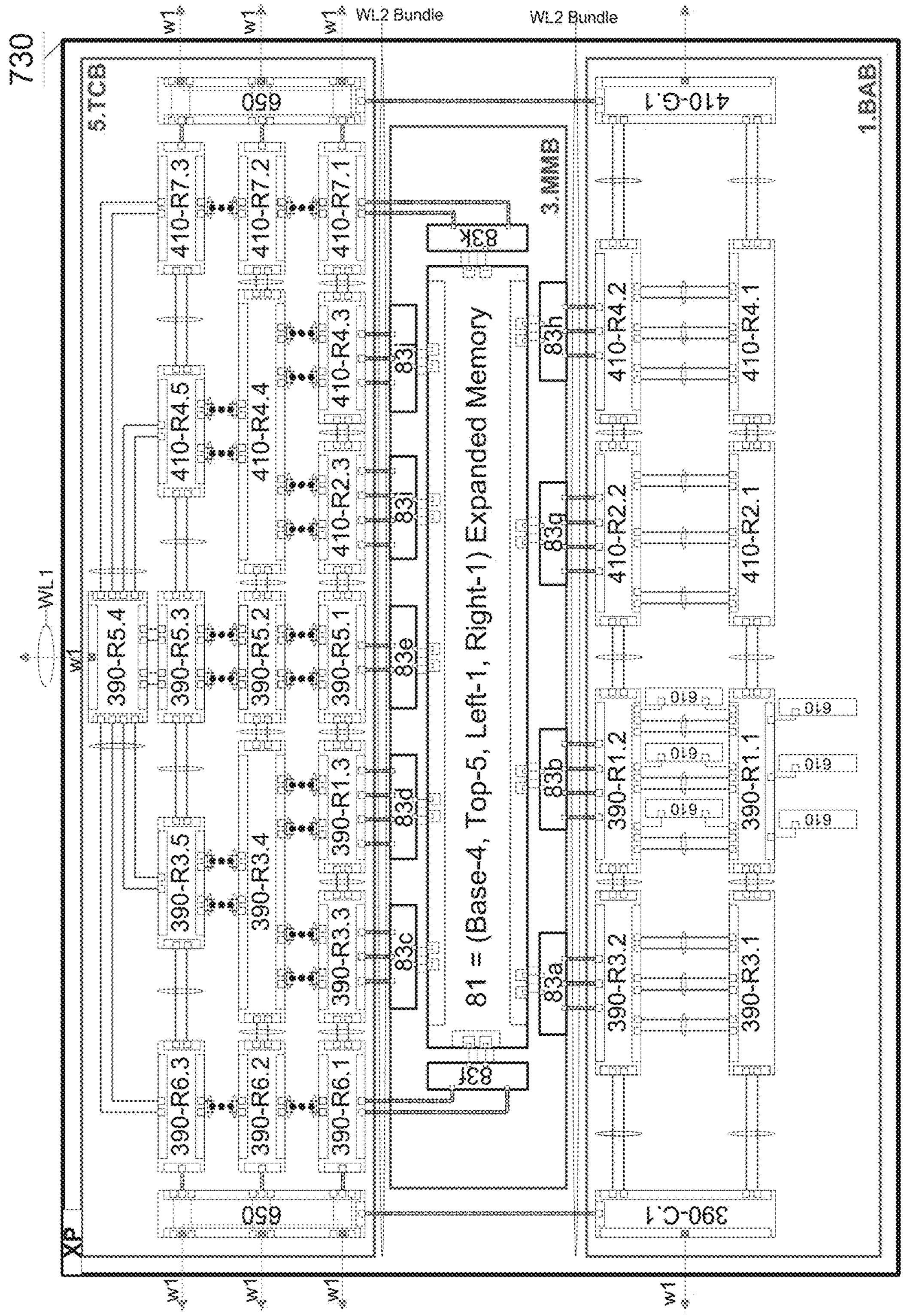

FIG. 44*a* is a block diagram showing an exemplary embodiment of the current disclosure of G5.2: Organization-based Project-wEntity-based eXecution Pylon (XP).

Figure 44B:
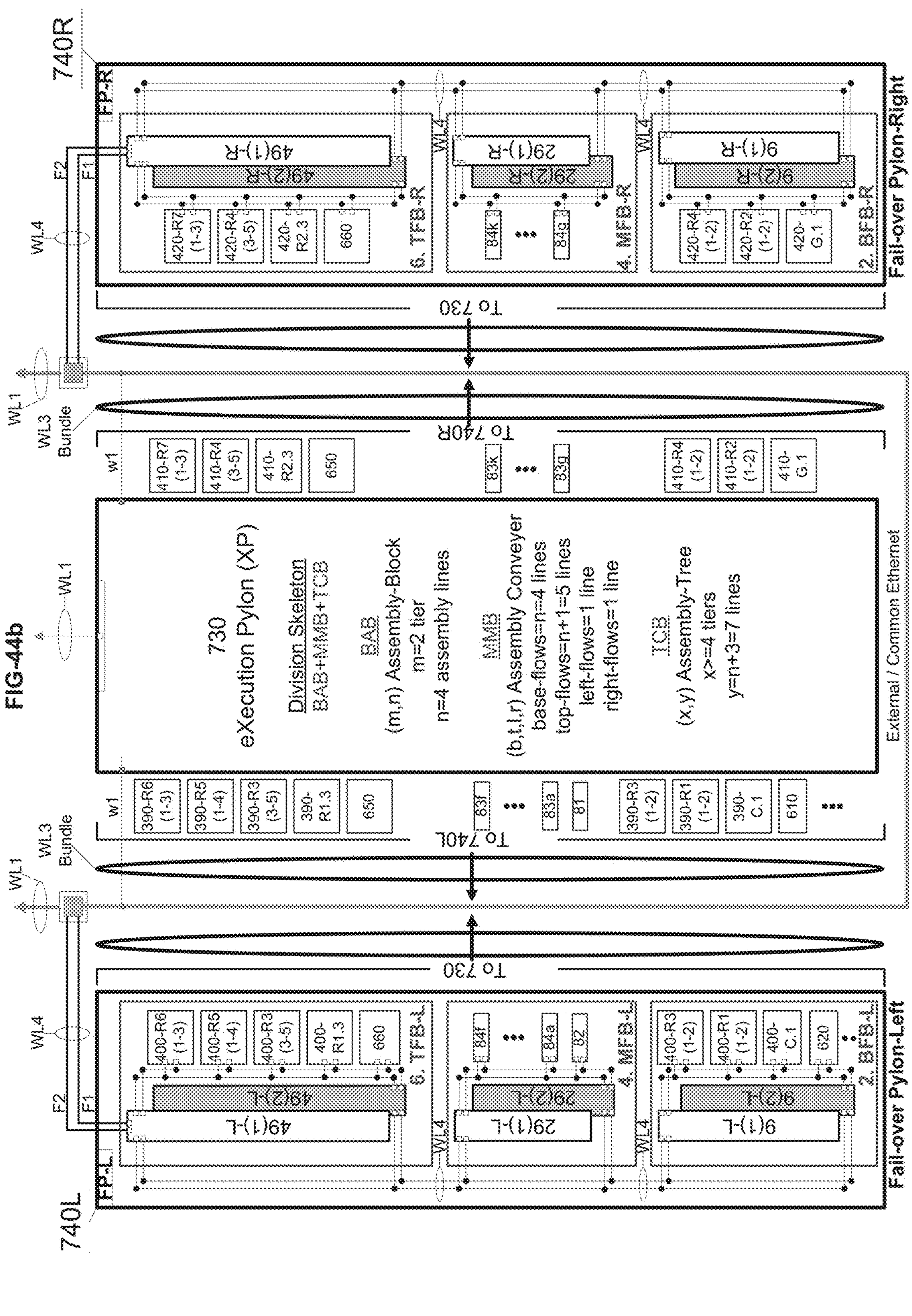

FIG. 44*b* is a block diagram depicting an exemplary embodiment of the current disclosure of G5.2: Standard Project-wEntity-based Hierarchical Core Structure (rt-innate intelligent Organization-Division wEntities/wSystems).

Figure 45A:
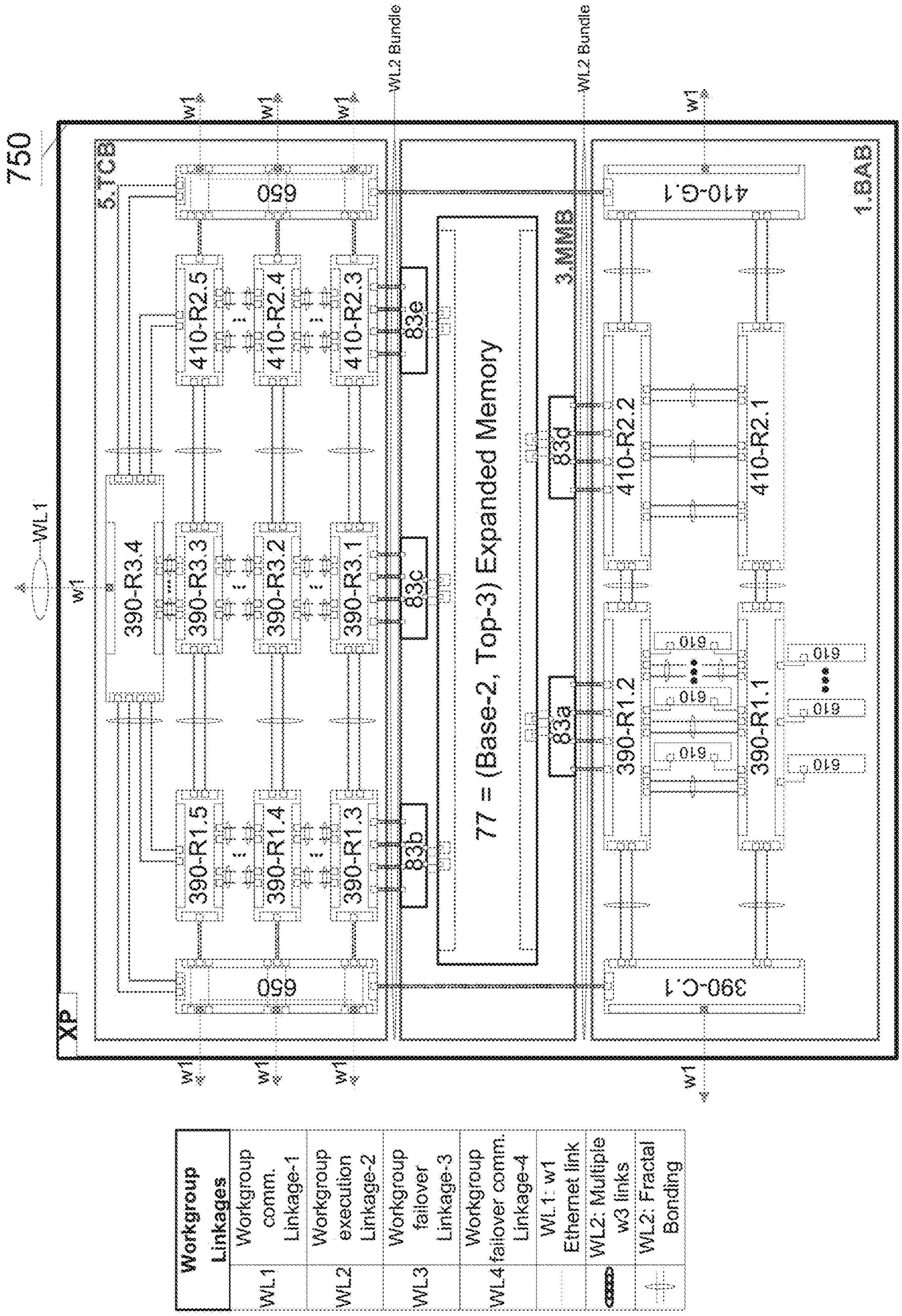

FIG. 45*a* is a block diagram showing an exemplary embodiment of the current disclosure of G5.3: Organization-based Policy-wEntity-based eXecution Pylon (XP).

Figure 45B:
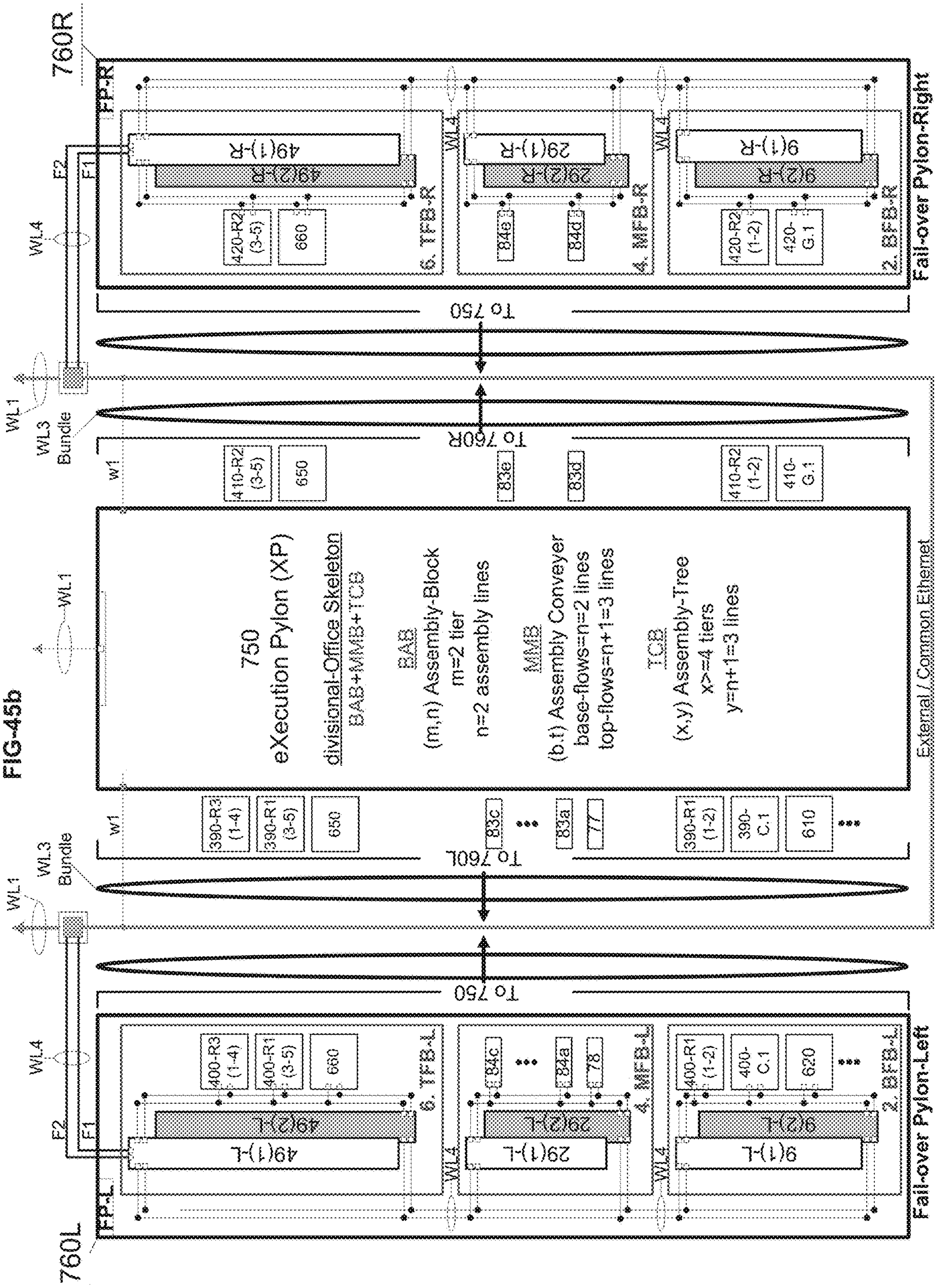

FIG. 45*b* is a block diagram illustrating an exemplary embodiment of the current disclosure of G5.3: Standard Policy-wEntity-based Hierarchical Core Structure (rt-innate intelligent Organization-divisional-Office wEntities/wSystems).

Figure 46A:
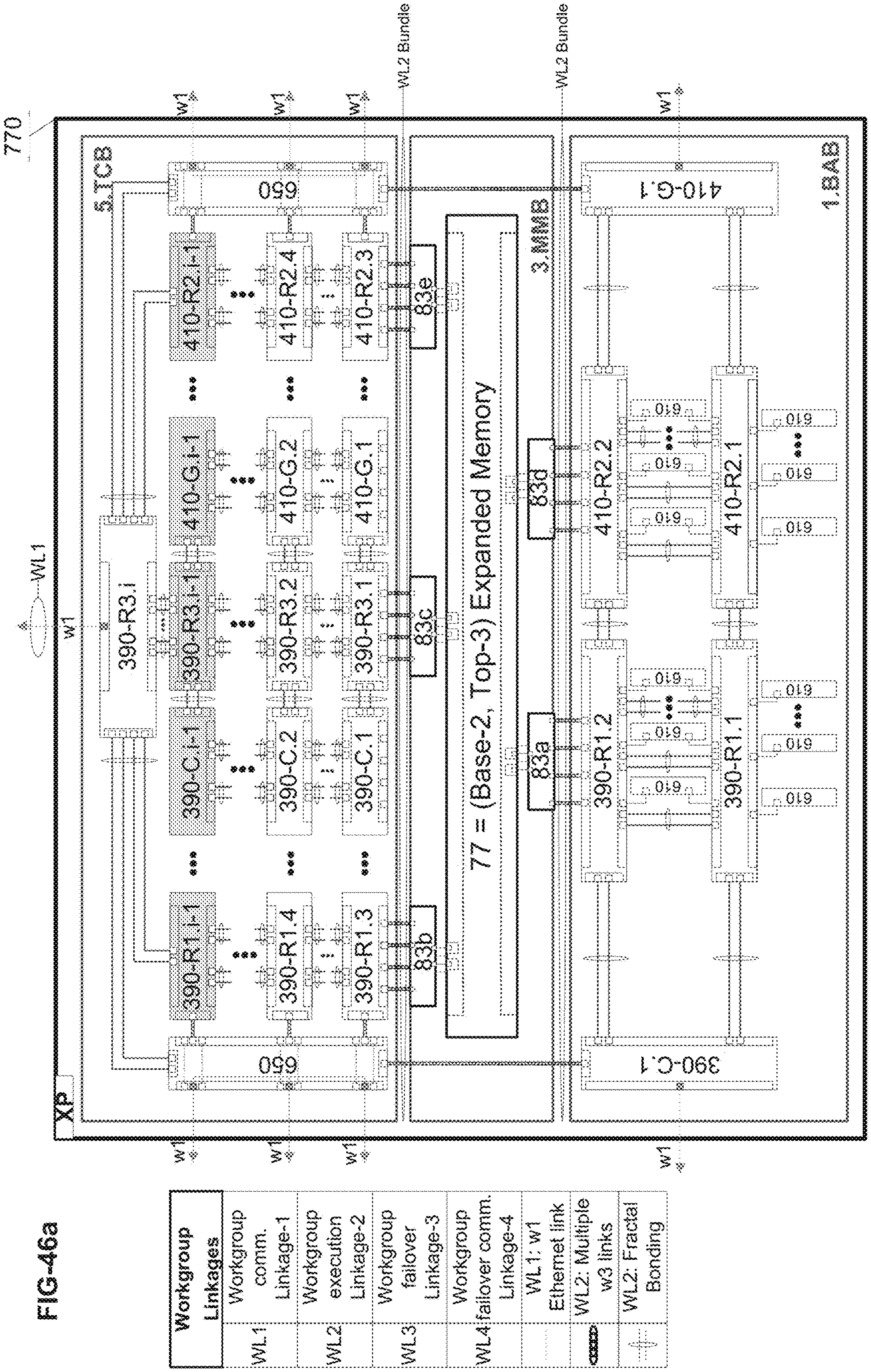

FIG. 46*a* is a block diagram showing an exemplary embodiment of the current disclosure of G5.4: Organization-based Strategy-wEntity-based eXecution Pylon (XP).

Figure 46B:
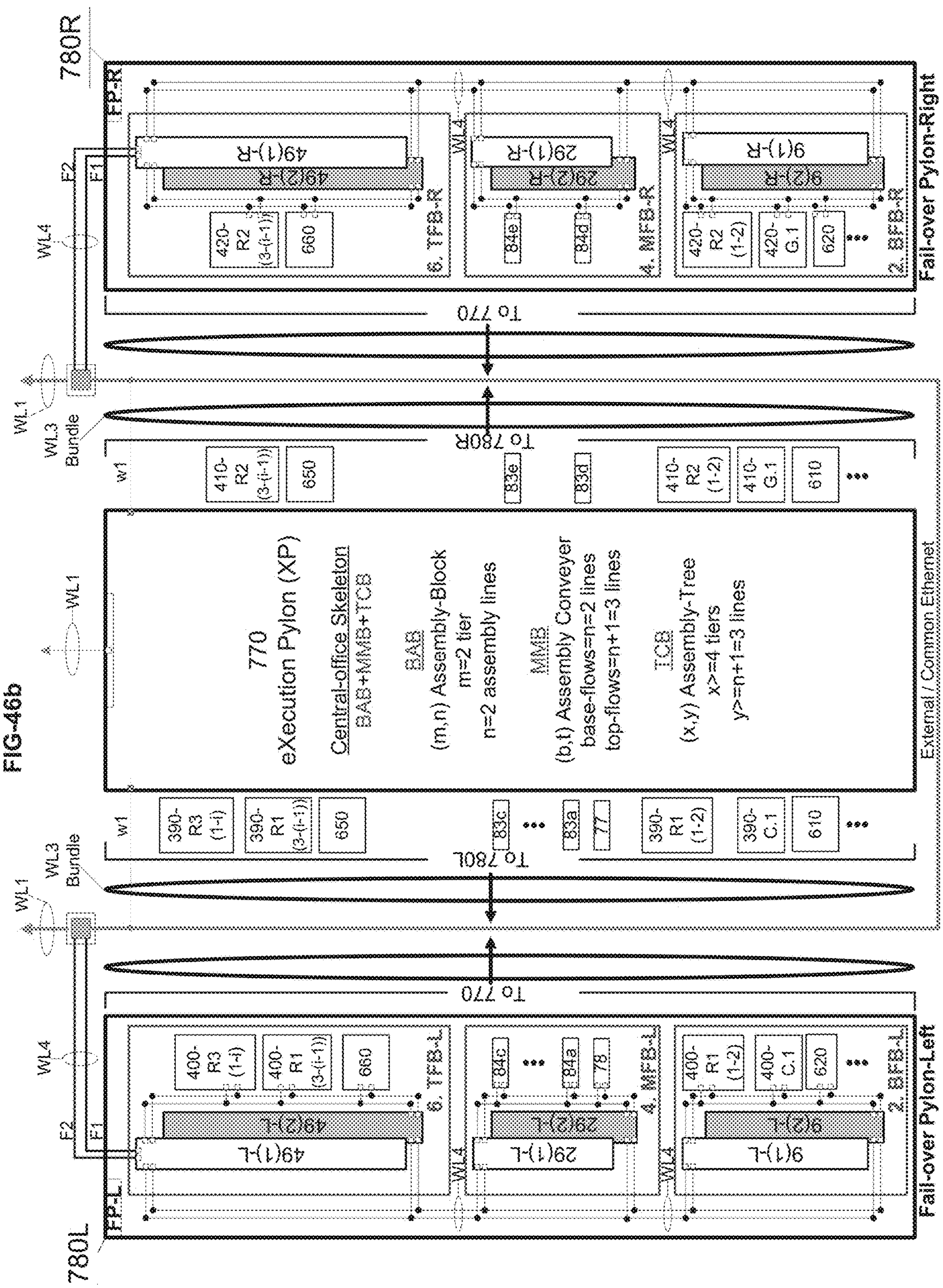

FIG. 46*b* is a block diagram depicting an exemplary embodiment of the current disclosure of G5.4: Standard Strategy-wEntity-based Hierarchical Core Structure (rt-innate intelligent Organization-Central-office wEntities/wSystems).

Figure 47:
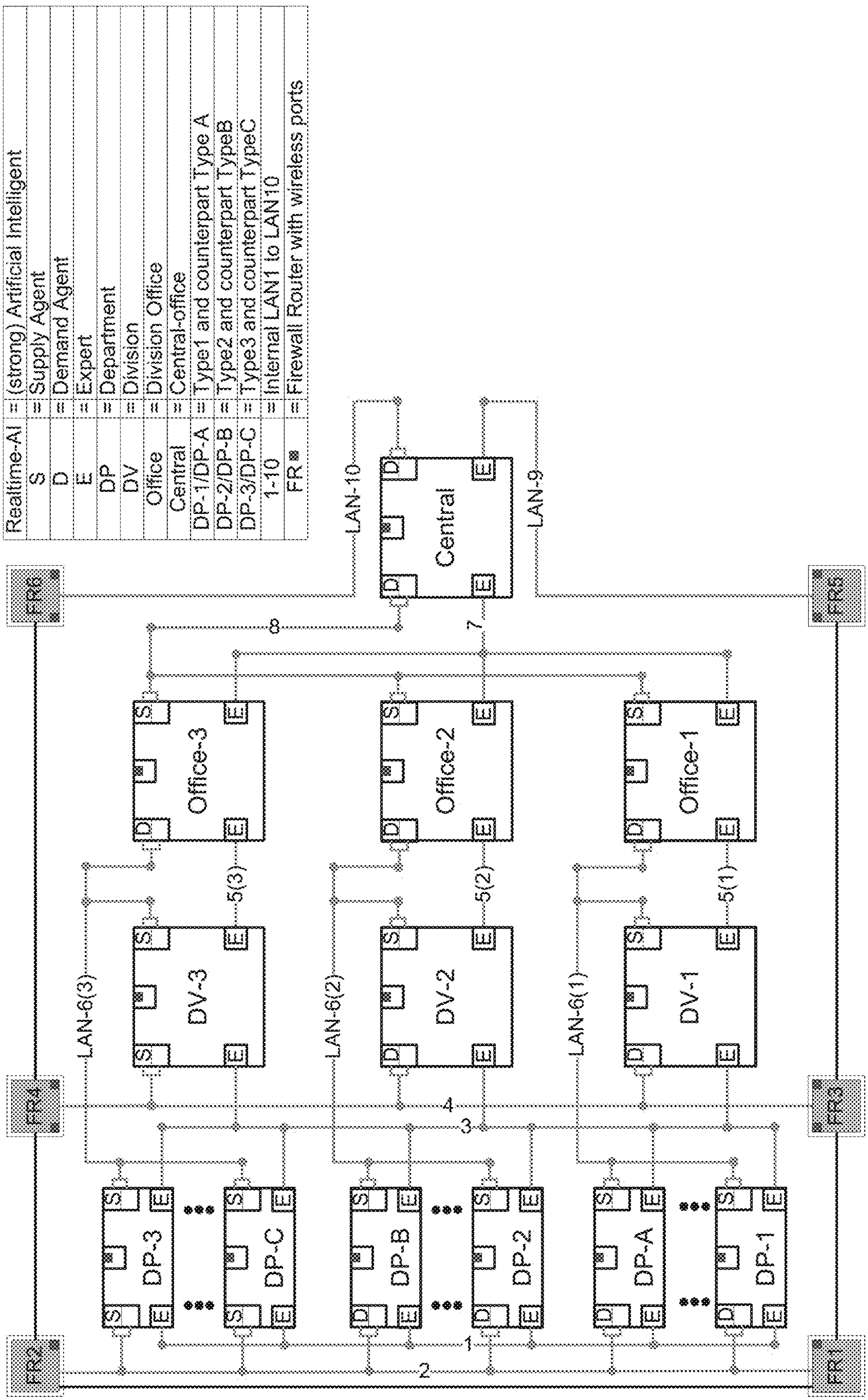

FIG. 47 is a block diagram illustrating an exemplary embodiment of the current disclosure of G5.5: Real-time-Artificial Intelligent (AI) agent-based e-business-Enterprise Organization-zone virtual Hierarchical Core Structure (vHCS).

Figure 48:
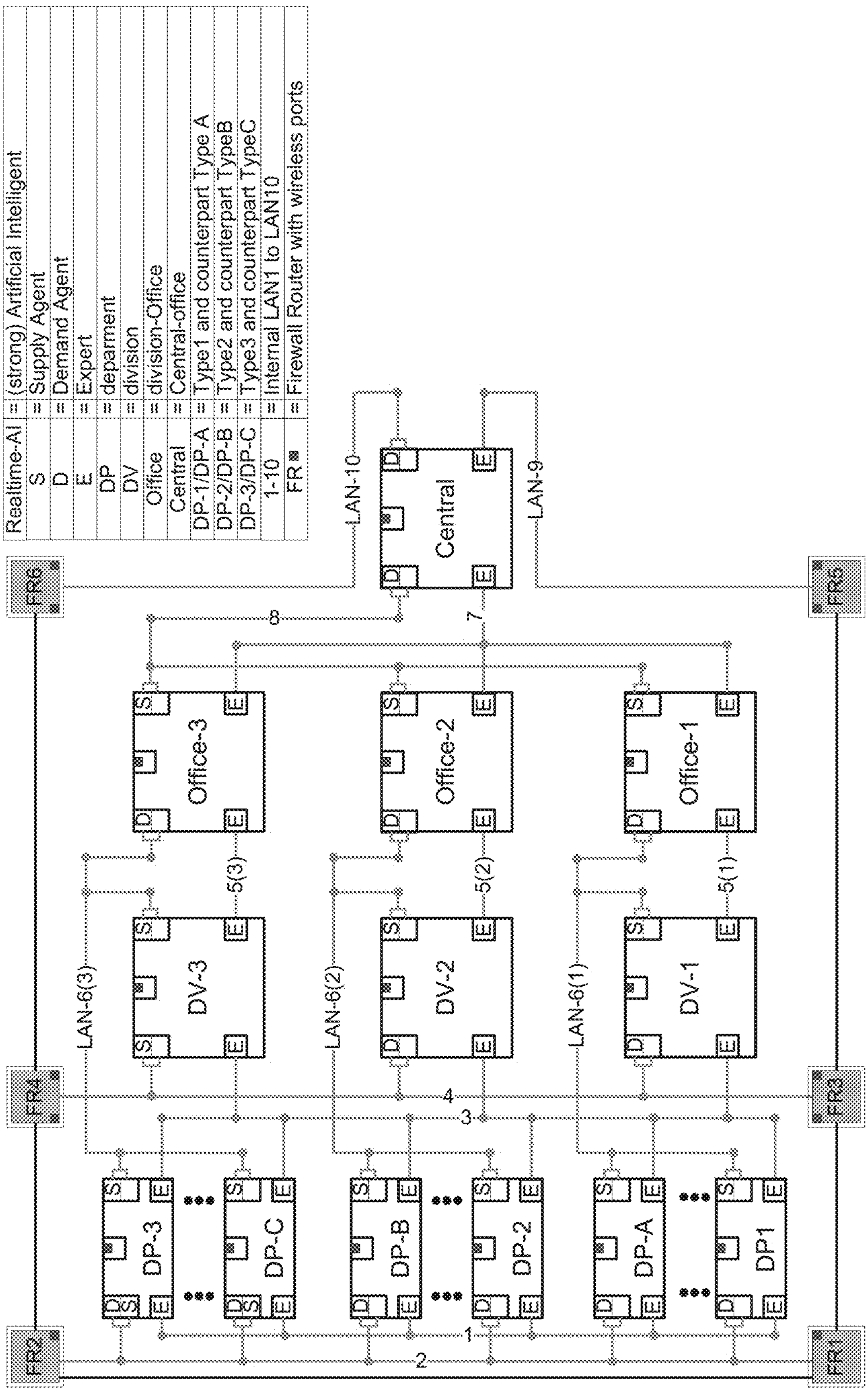

FIG. 48 is a block diagram showing an exemplary embodiment of the current disclosure of G5.5: Real-time-Artificial Intelligent (AI) agent-based Intranet-Enterprise Organization-zone virtual Hierarchical Core Structure (vHCS).

Figure 49:
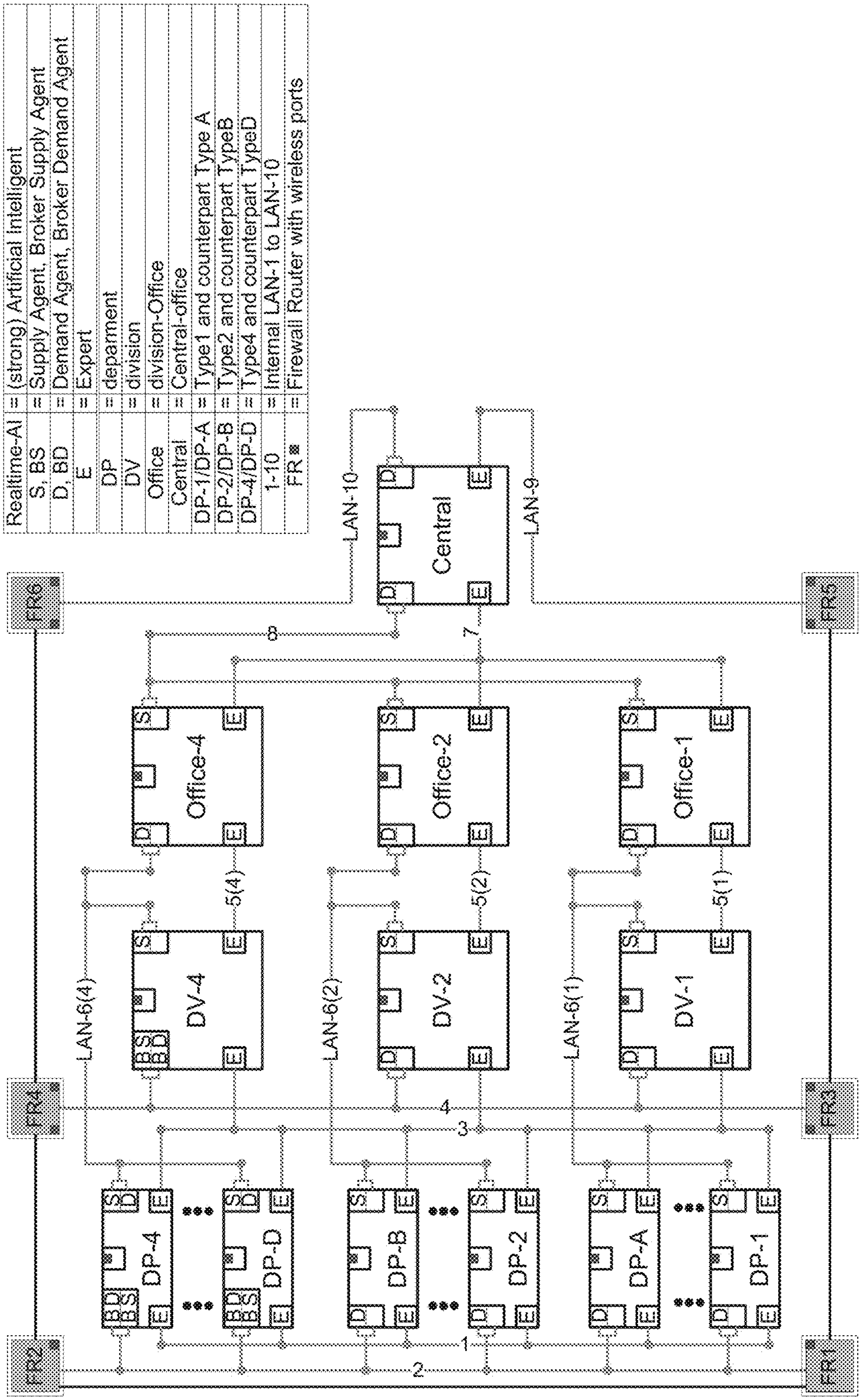

FIG. 49 is a block diagram illustrating an exemplary embodiment of the current disclosure of G5.5: Real-time-Artificial Intelligent (AIagent-based Extranet-Enterprise organization-zone virtual Hierarchical Core Structure (vHCS).

Figure 50:
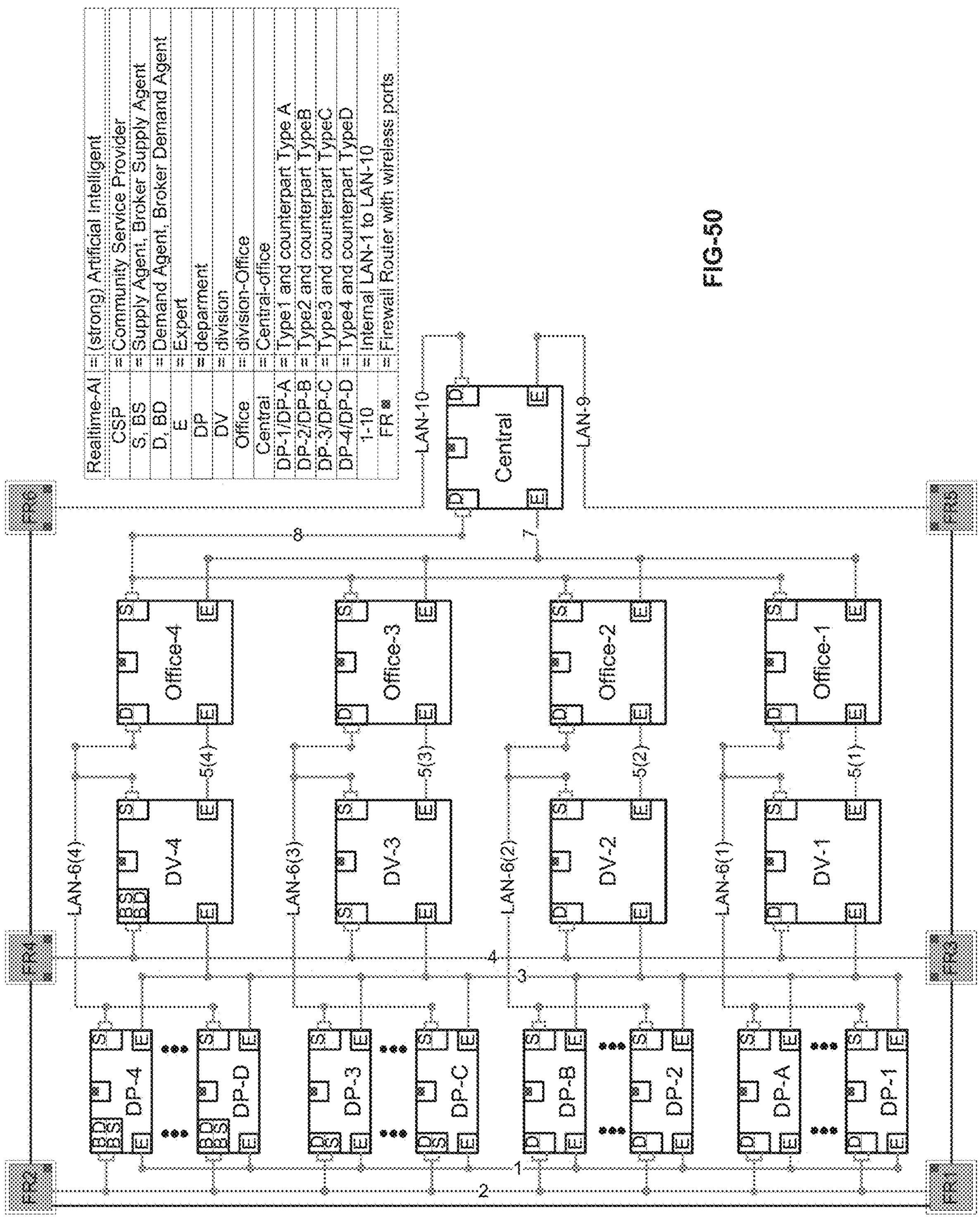

FIG. 50 is a block diagram depicting an exemplary embodiment of the current disclosure of G5.5: Real-time-Artificial intelligent (AI) agent-based Internet-(Community Service Provider, CSP)-Enterprise organization-zone virtual Hierarchical Core Structure (vHCS).

Figure 51:
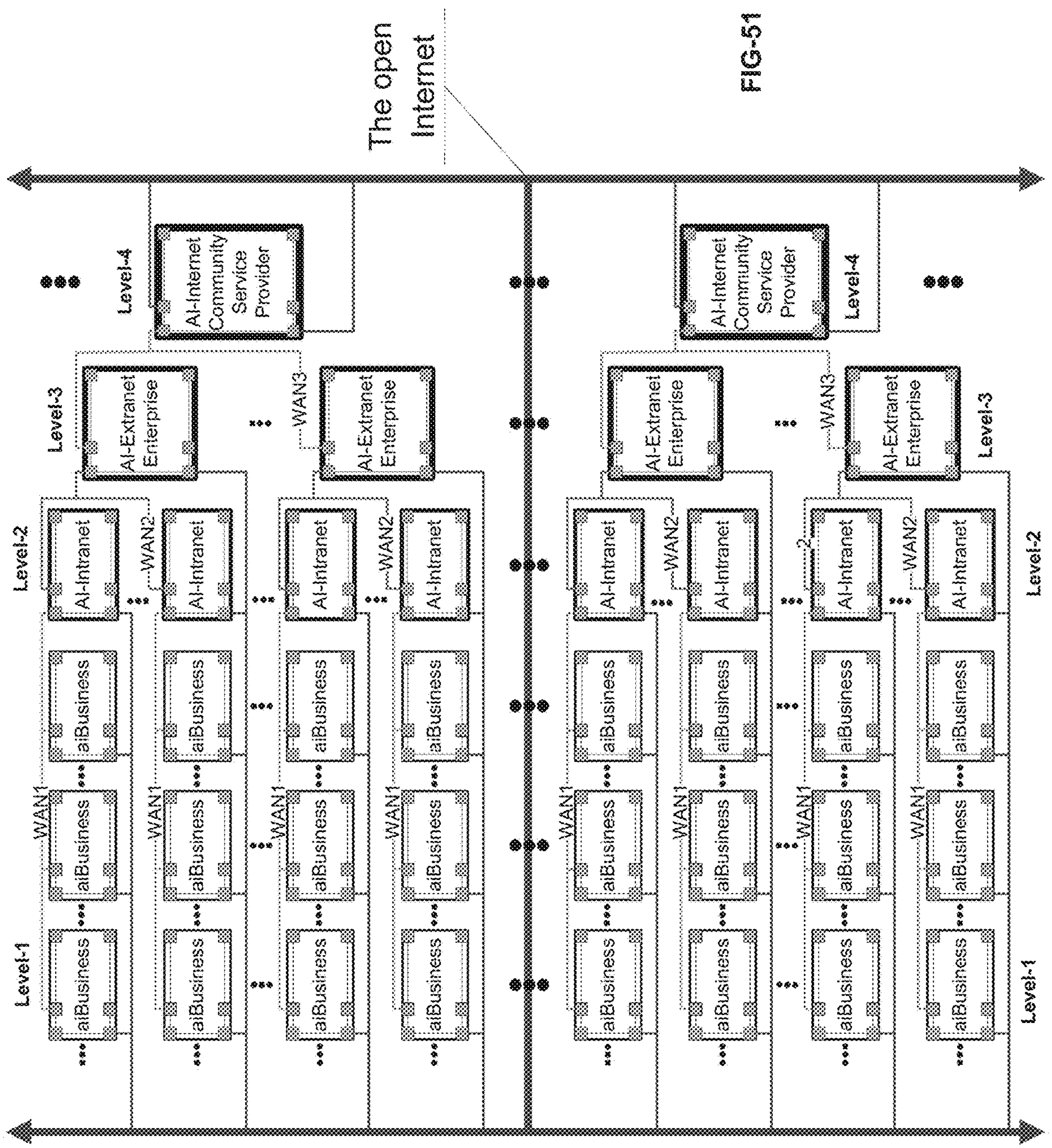

FIG. 51 is a block diagram showing an exemplary embodiment of the current disclosure of G5.6: real-time Swarm-Intelligent (SI) agent-based 4-level organization-cloud systems and 4-level lattice Open Business-Service-Platform (BSP).

Figure 52A:
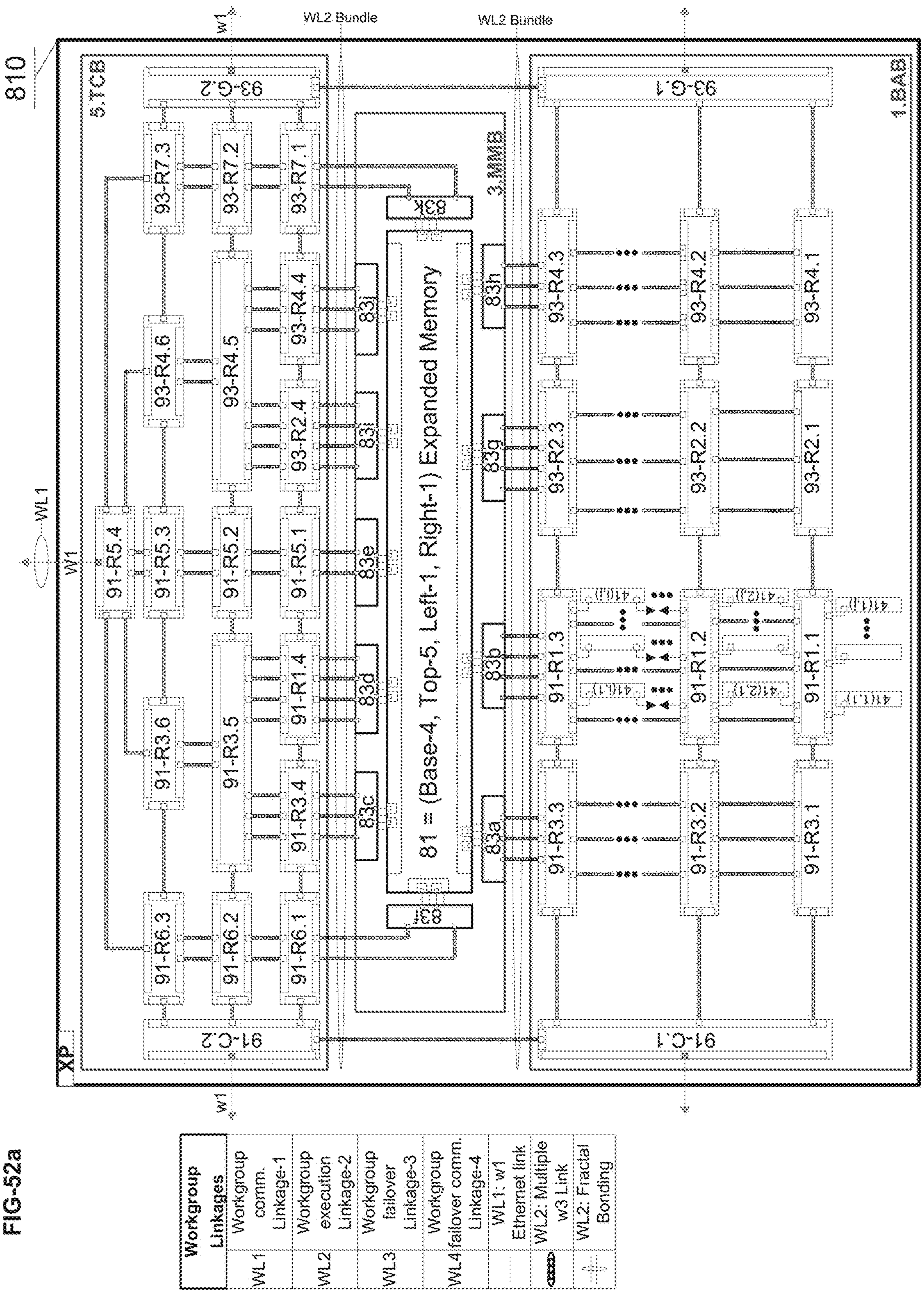

5.6 wGeneration-6 6-wBBB-Evolved Compact HCSs for Building Rt-Innate Intelligent Apparatus-Based Unitary wEntities/wSystems, Rt-AI-Apparatus-Zone wSystems FIG. 52*a* is a block diagram illustrating an exemplary embodiment of the current disclosure of G6.1: Apparatus-based Portfolio-wEntity-based eXecution Pylon (XP).

Figure 52B:
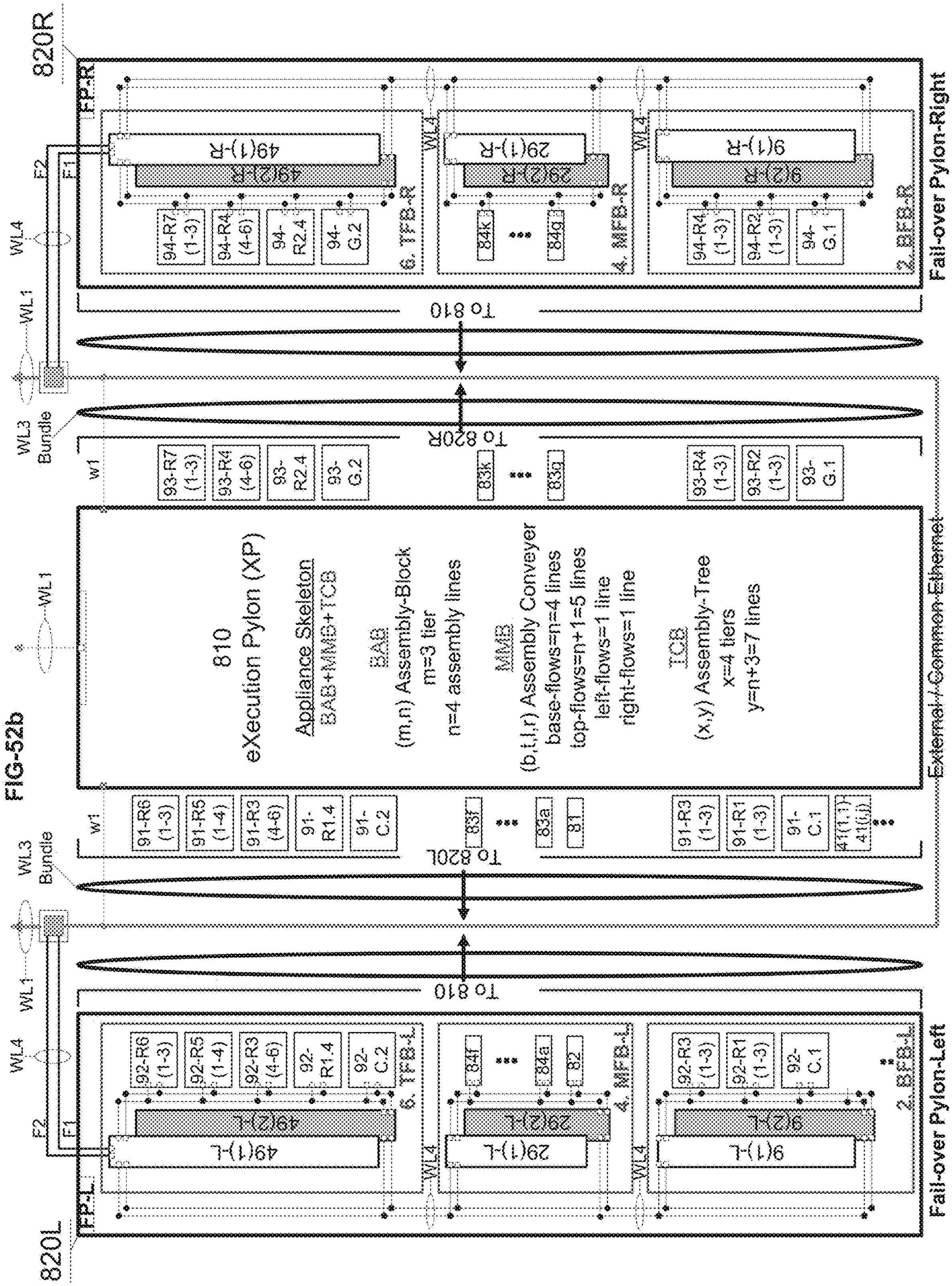

FIG. 52*b* is a block diagram showing an exemplary embodiment of the current disclosure of G6.1: Compact Portfolio-wEntity-based Hierarchical Core Structure (rt-innate intelligent Apparatus-Appliance).

Figure 53A:
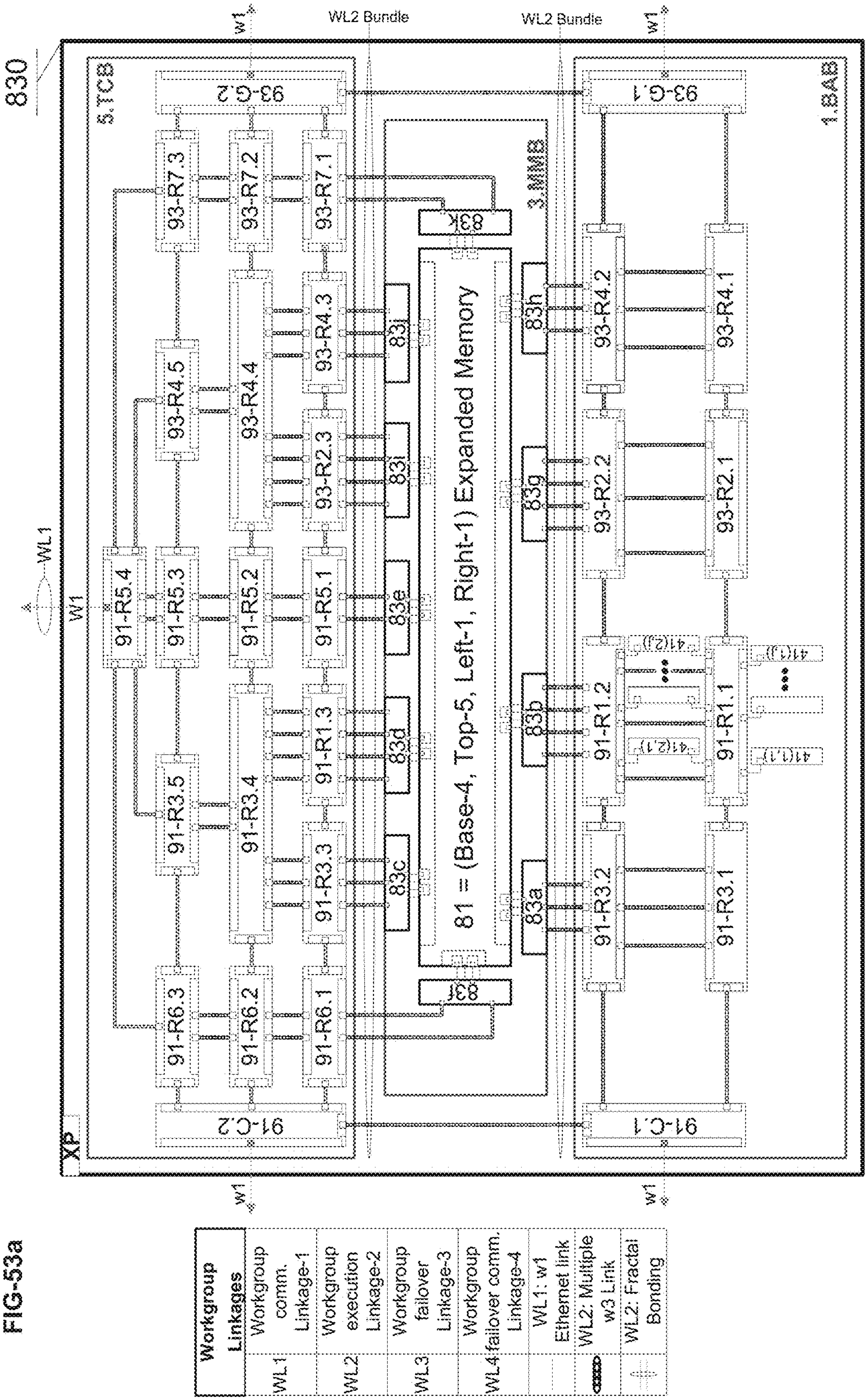

FIG. 53*a* is a block diagram showing an exemplary embodiment of the current disclosure of G6.2: Apparatus-based Project-wEntity-based eXecution Pylon (XP).

Figure 53B:
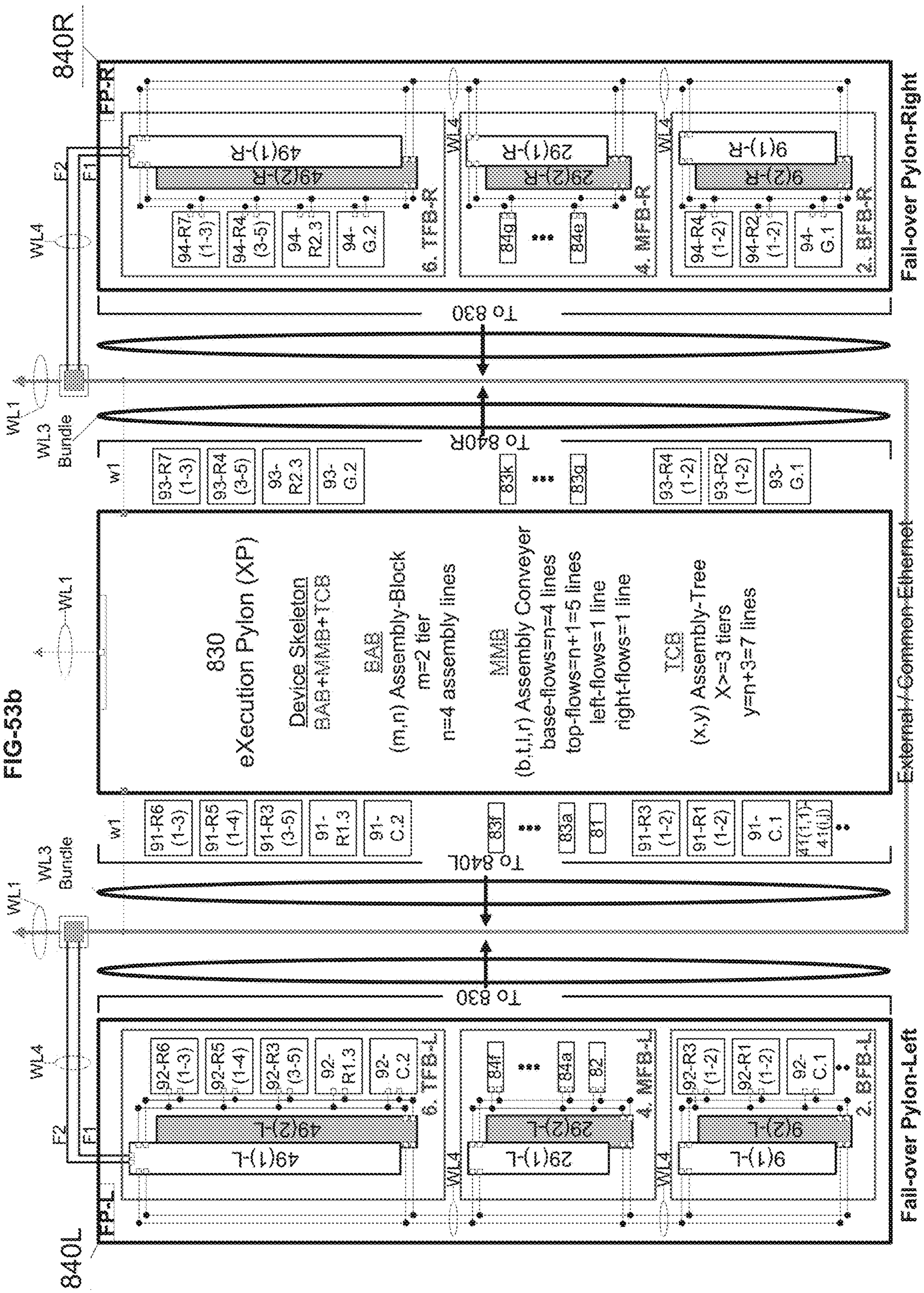

FIG. 53*b* is a block diagram illustrating an exemplary embodiment of the current disclosure of G6.2: Compact Project-wEntity-based Hierarchical Core Structure (rt-innate intelligent Apparatus-Device).

Figure 54A:
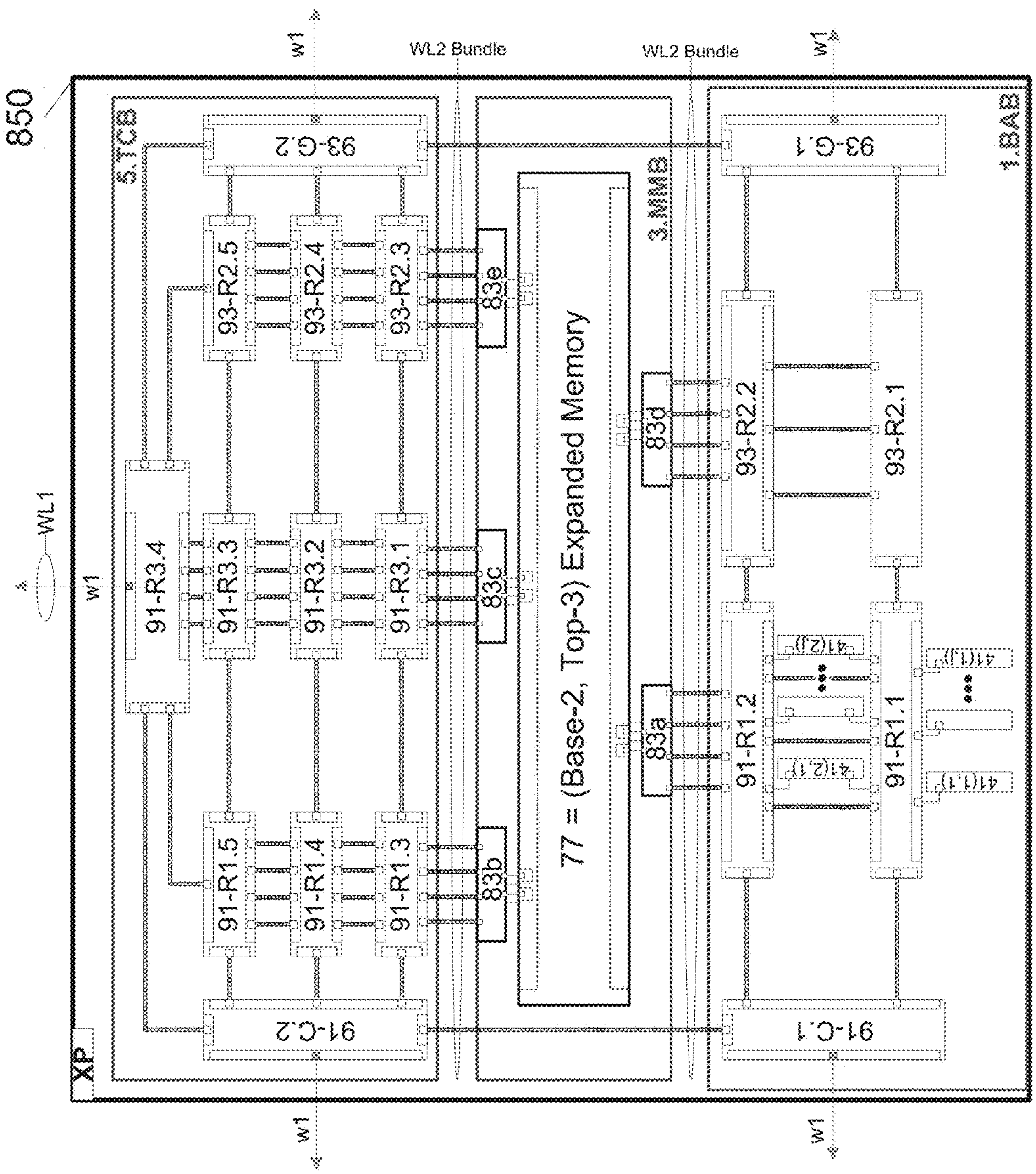

FIG. 54*a* is a block diagram depicting an exemplary embodiment of the current disclosure of G6.3: Apparatus-based Policy-wEntity-based eXecution Pylon (XP).

Figure 54B:
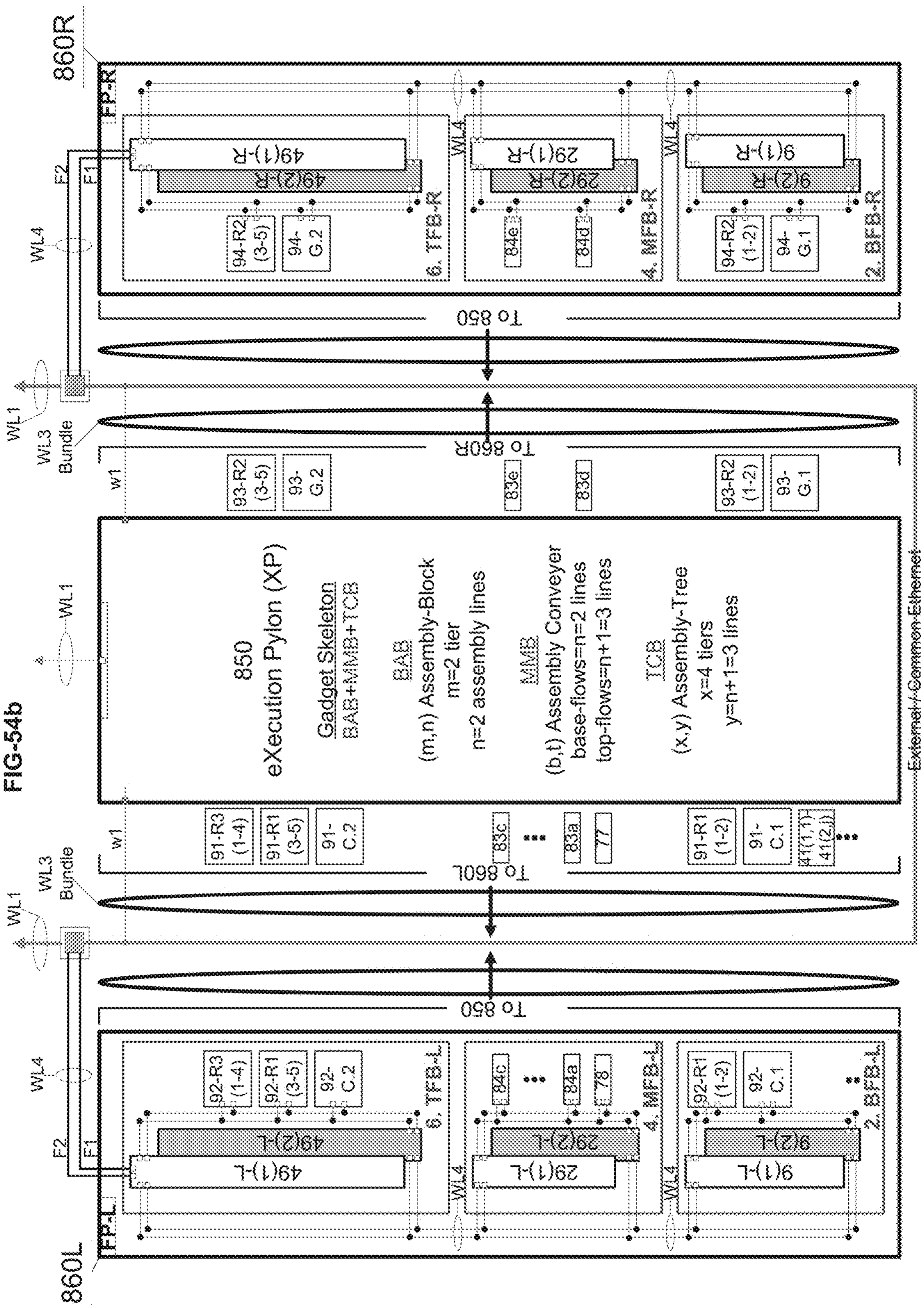

FIG. 54*b* is a block diagram illustrating an exemplary embodiment of the current disclosure of G6.3: Compact Policy-wEntity-based Hierarchical Core Structure (rt-innate intelligent Apparatus-Gadget).

Figure 55A:
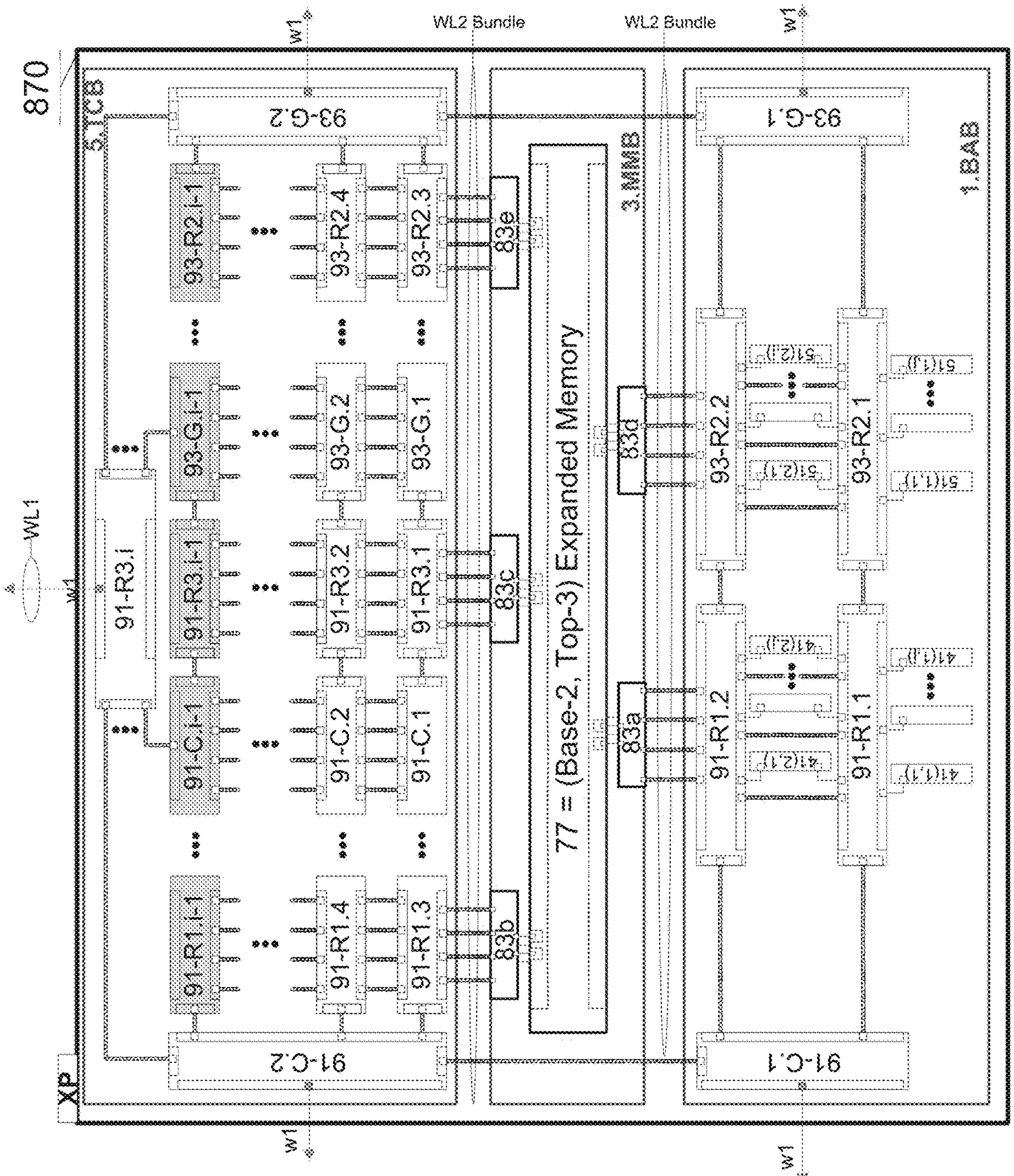

FIG. 55*a* is a block diagram showing an exemplary embodiment of the current disclosure of G6.4: Apparatus-based Strategy-wEntity-based eXecution Pylon (XP).

Figure 55B:
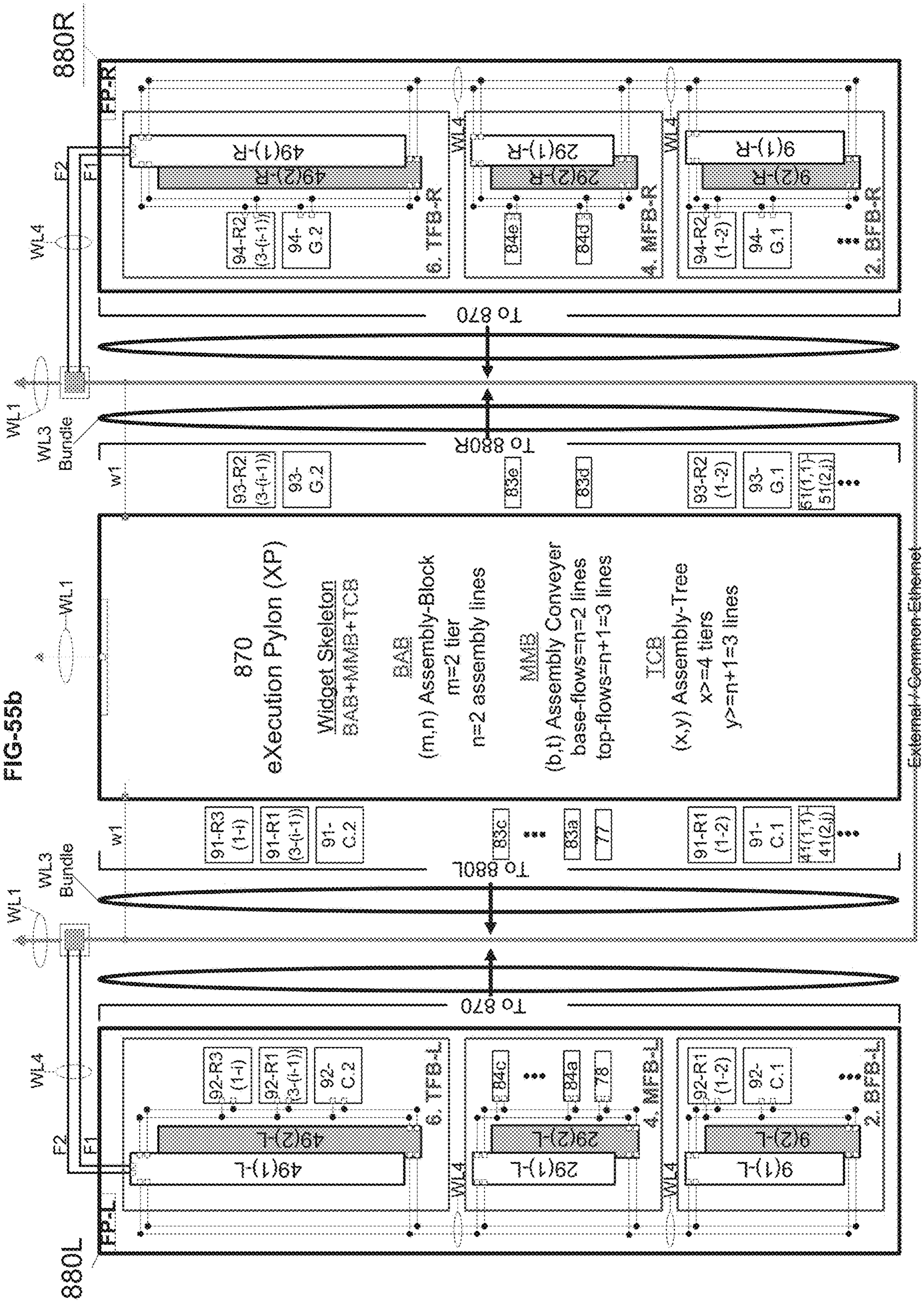

FIG. 55*b* is a block diagram depicting an exemplary embodiment of the current disclosure of G6.4: Compact Strategy-wEntity-based Hierarchical Core Structure (rt-innate intelligent Apparatus-Widget).

Figure 56:
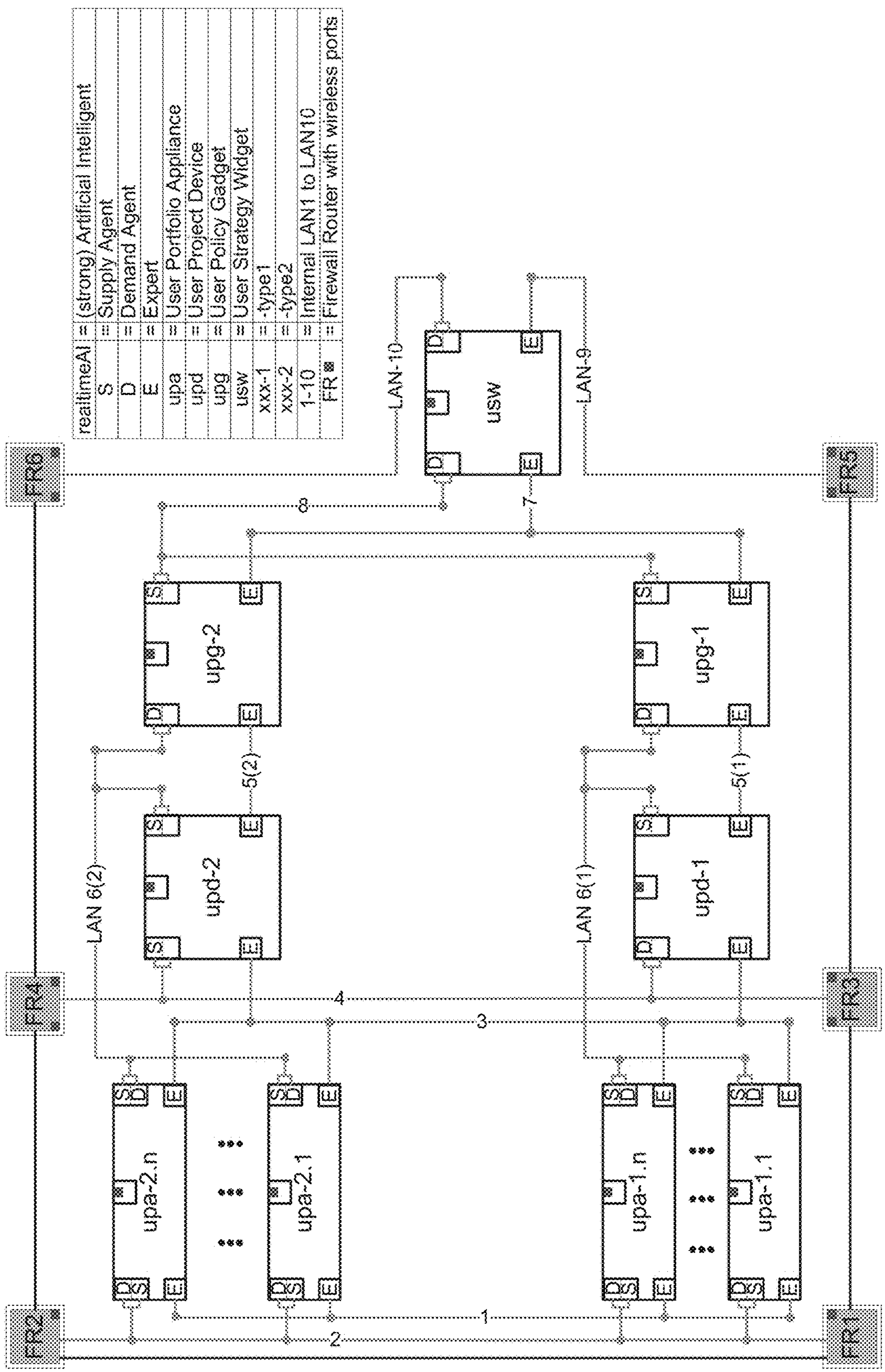

FIG. 56 is a block diagram showing an exemplary embodiment of the current disclosure of G6.5: Real-time-AI-agent-based Site-Apparatus zone virtual-Hierarchical Core Structures (vHCS).

Figure 57:
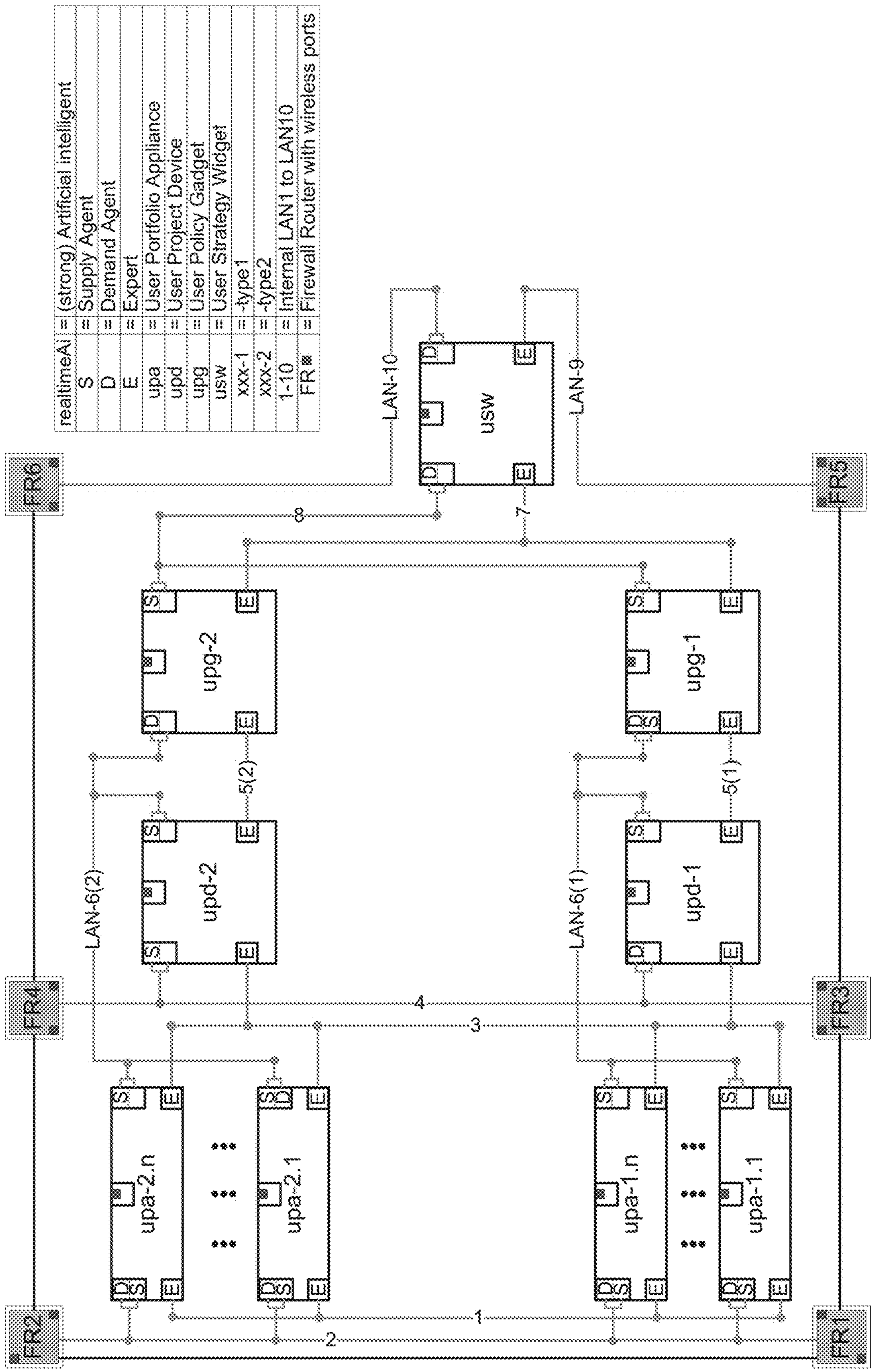

FIG. 57 is a block diagram depicting an exemplary embodiment of the current disclosure of G6.5: Real-time-AI-agent-based Mobile-Apparatus Zone virtual-Hierarchical Core Structures (vHCS) 5.7 wGeneration-7 6-wBBB-evolved miniature HCSs for building rt-innate intelligent Personal Digital Assistant (PDA) wEntities/wSystems, rt-AI PDA-zone wSystems and rt-SI PDA-cloud wSystems.

Figure 58:
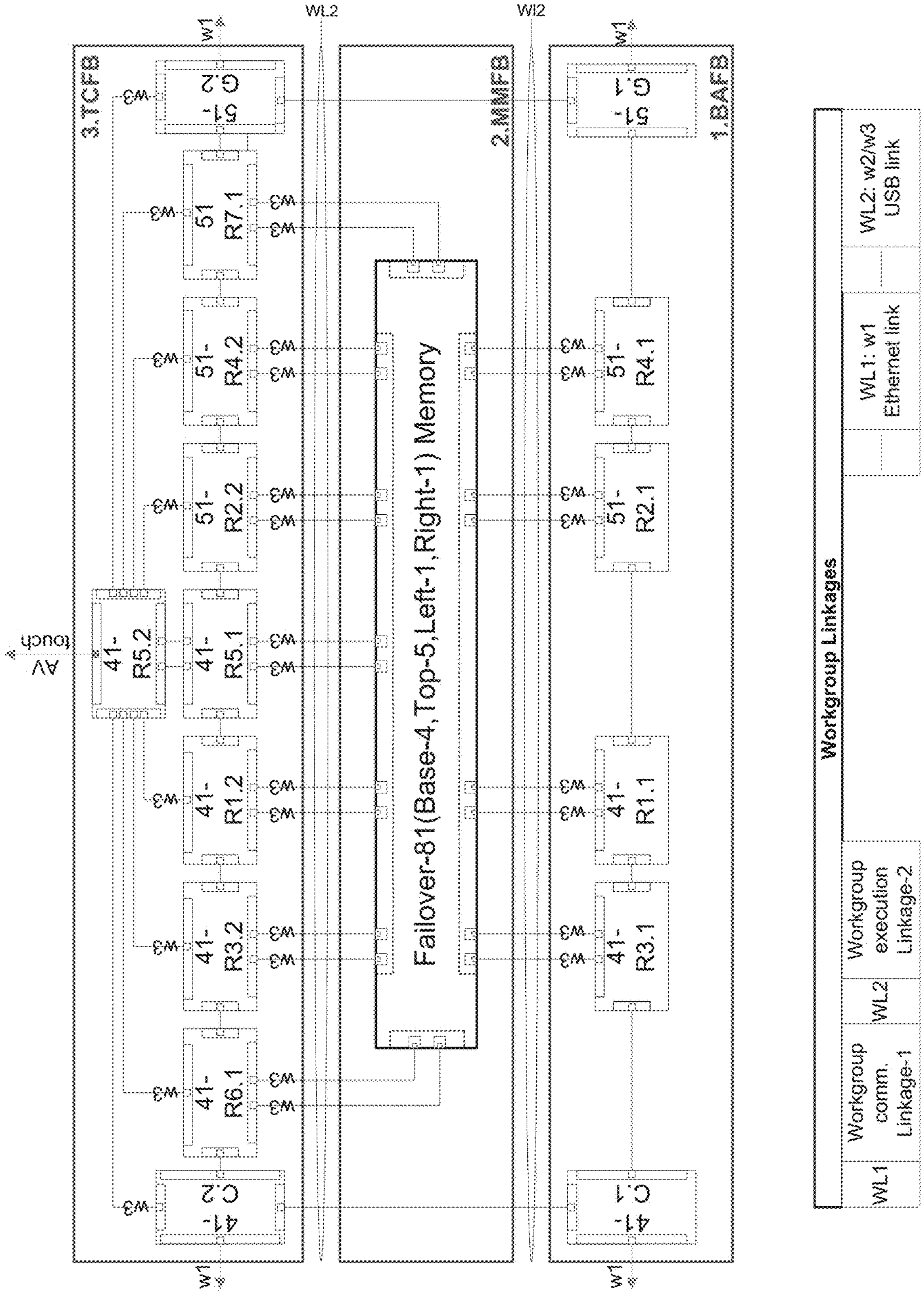

FIG. 58 is a block diagram depicting an exemplary embodiment of the current disclosure of G7.1: PDA-based Miniature Portfolio-wEntity-based Hierarchical Core Structure (rt-innate intelligent PDA-Appliance).

Figure 59:
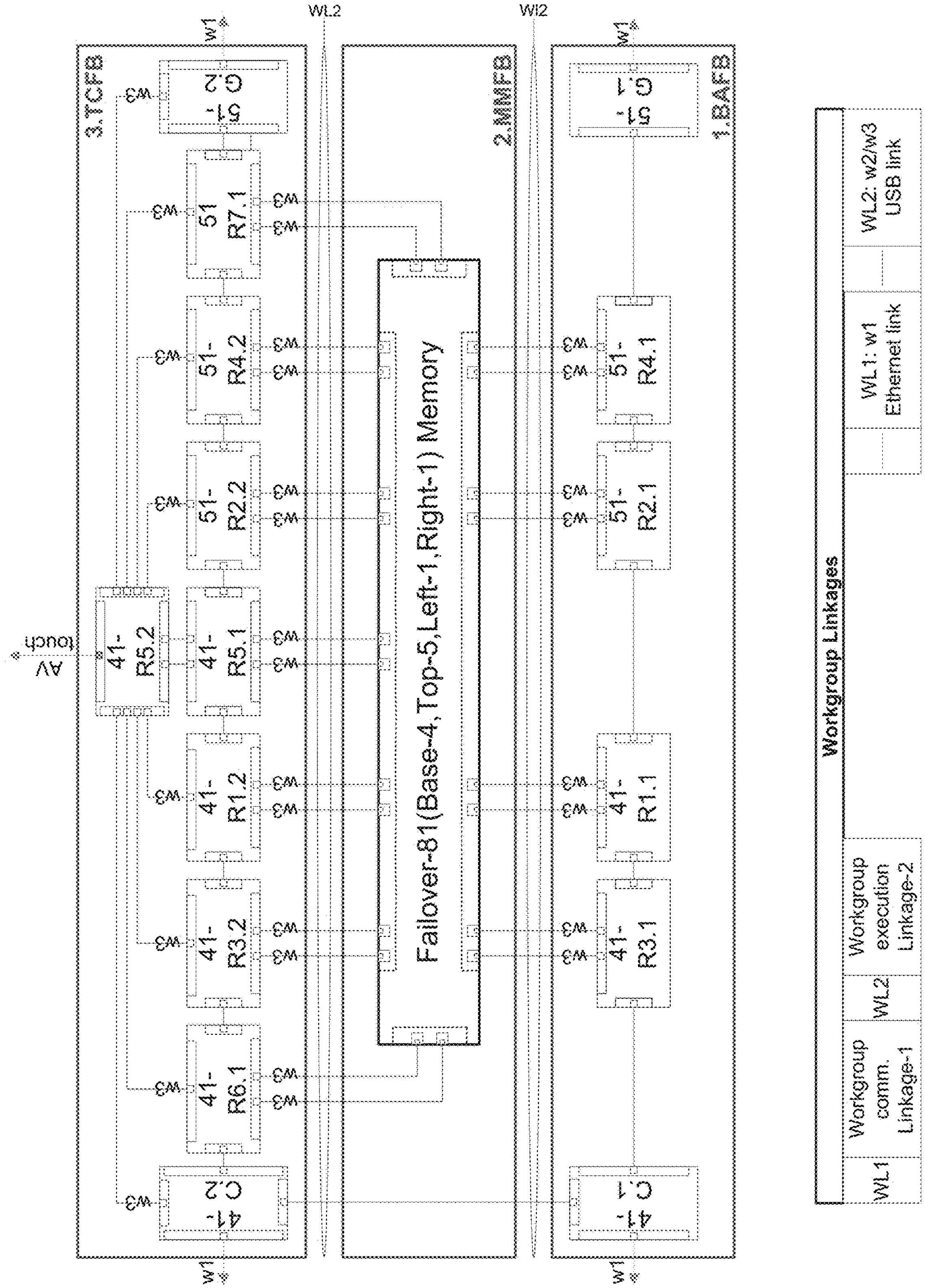

FIG. 59 is a block diagram showing an exemplary embodiment of the current disclosure of G7.2: PDA-based Miniature Project-wEntity-based Hierarchical Core Structure (rt-innate intelligent PDA-device).

Figure 60:
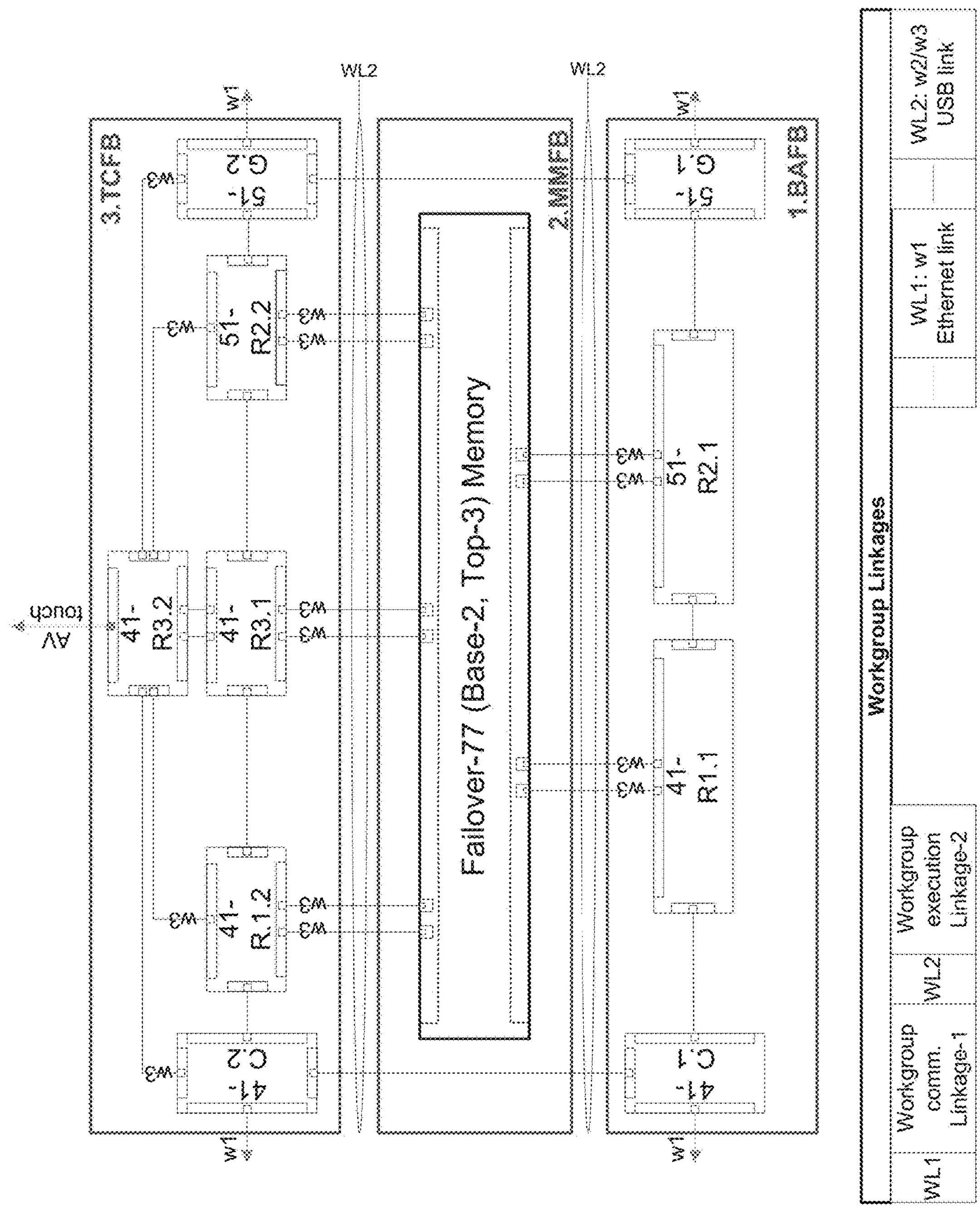

FIG. 60 is a block diagram showing an exemplary embodiment of the current disclosure of G7.3: PDA-based Miniature Policy-wEntity-based Hierarchical Core Structure (rt-innate intelligent PDA-Gadget).

Figure 61:
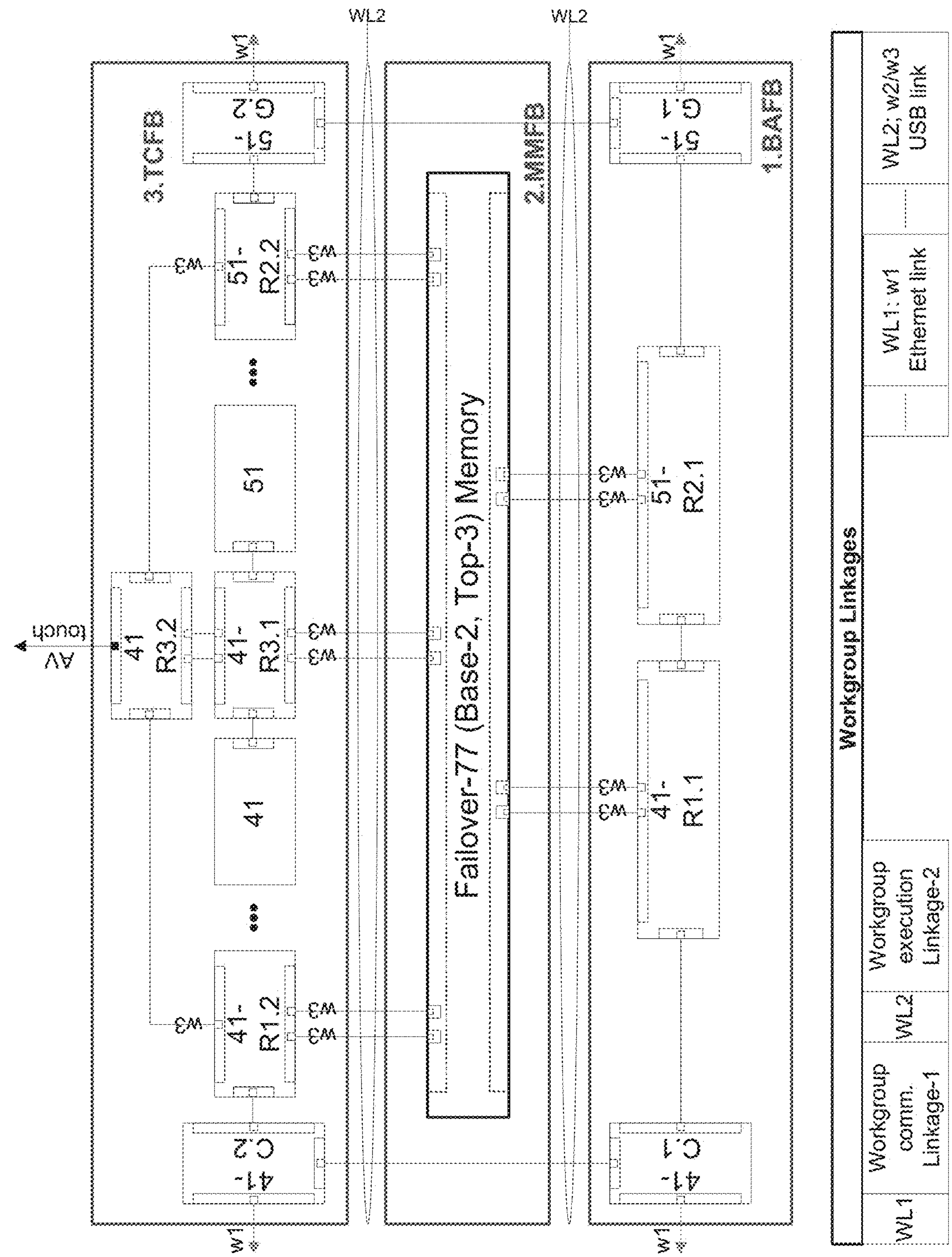

FIG. 61 is a block diagram illustrating an exemplary embodiment of the current disclosure of G7.4: PDA-based Miniature Strategy-wEntity-based Hierarchical Core Structure (rt-innate intelligent PDA-Widget).

Figure 62:
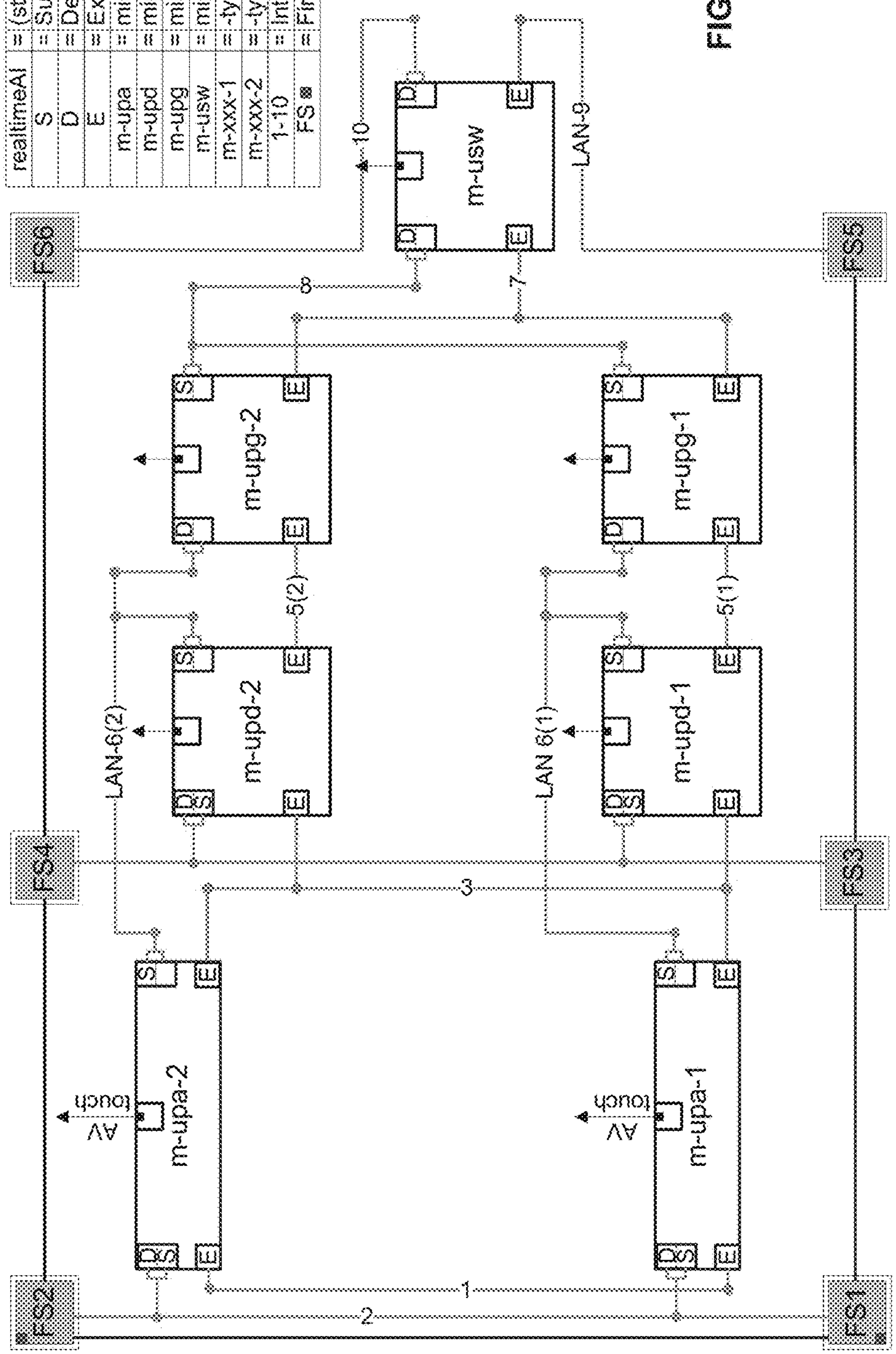

FIG. 62 is a block diagram showing an exemplary embodiment of the current disclosure of G7.5: Real-time-AI-agent-based PDA-zone virtual Hierarchical Core Structure (vHCS).

Figure 63:
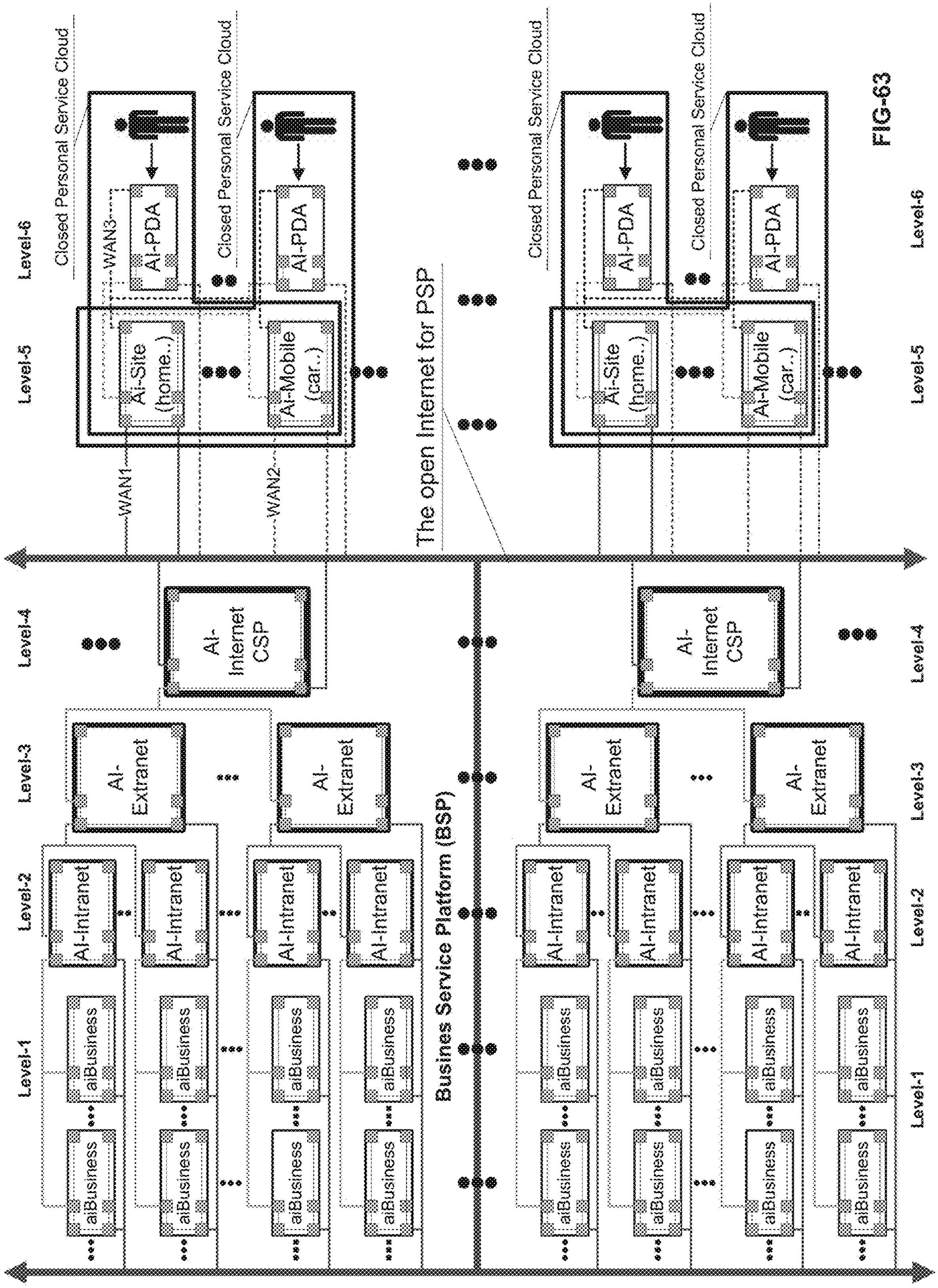

FIG. 63 is a block diagram illustrating an exemplary embodiment of the current disclosure of G7.6: Real-time SI-agent-based 6-level PDA-cloud (virtual hierarchical) Core Structure (vHCS)-based wSystems and 6-level-lattice "open and competitive" Public Internet-Service Platform (PSP), (including G6.6 apparatus 5-level cloud wSystems)

Figure 64:
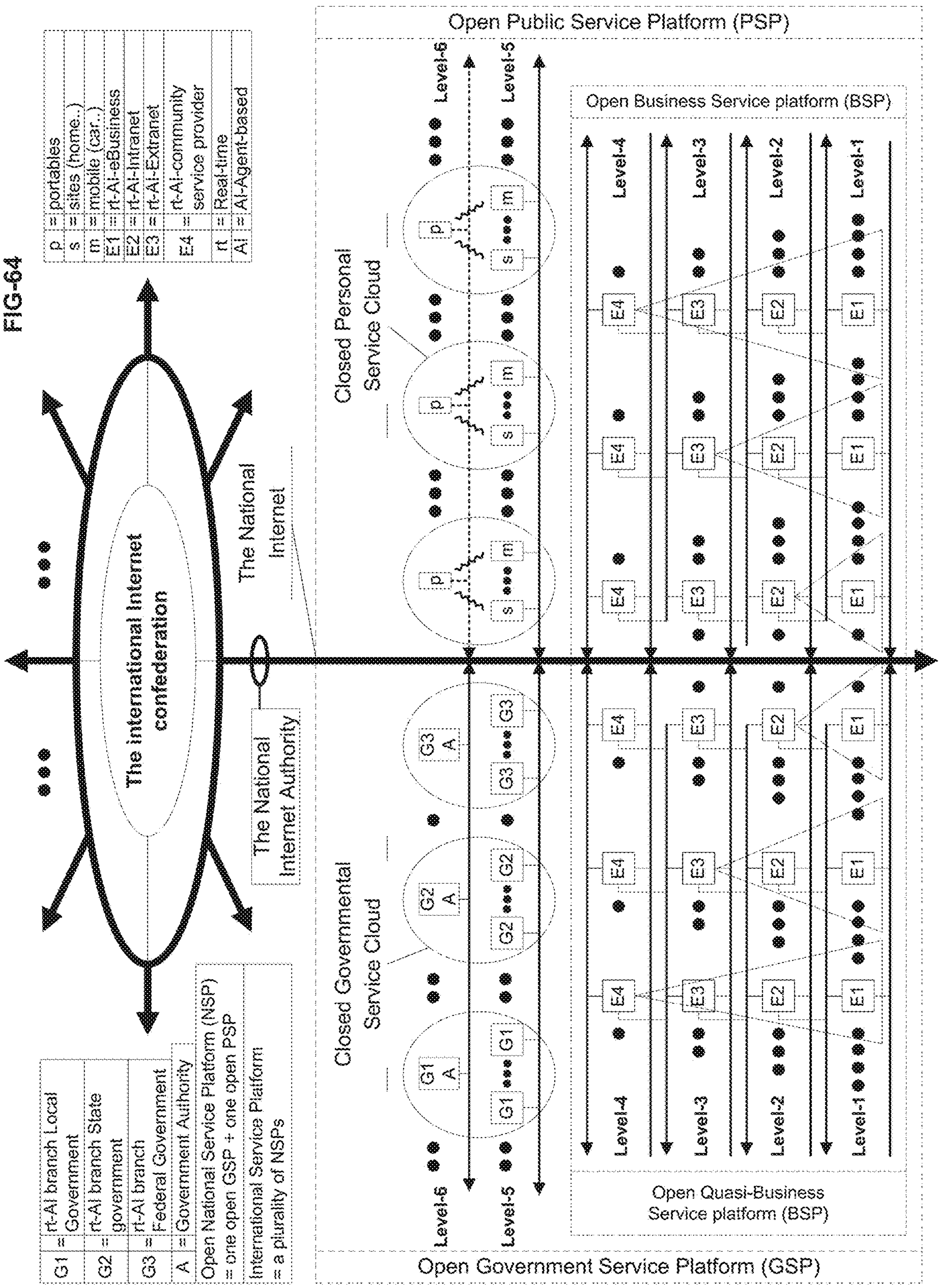

FIG. 64 is a block diagram depicting an exemplary embodiment of the current disclosure of G7.6: The "open" National Service Platform (NSP) and International "open" Public Service Platforms (PSPs).

DETAILED DESCRIPTION OF THE INVENTION

1.0 the Discovery of 5 Computing Facts Via the History of Computing

After reviewing the history of computing from the hardware architecture point of view, it can be concluded that node-computing did evolve from less sophisticated 3-nBBB architected nG1.1 node-core structures to more complex hierarchical 3-nBBB-architected nG1.2 node-core structures and then stopped at generation1 stage3 with multi-CPU node-hub structures. Before understanding why node-computing stopped evolving, it is imperative to analyze some underlying facts about the evolution of node computing, which can be summarized as follows.

1.1 the First Set of Facts: Duality-Based Computing Entities

A first set of facts can be concluded based on the historical material to support the existence of the "function-core innate-duality principle" on the creation of all the basic functional machineries.

1.1.1 Fins and FMs

The historical material shows that the "basic/atomic" digital electronic logical-gate-based functional machines (fin), i.e., AND, OR, NAND, NOR, etc. were created by using Boolean-Algebra. Then the ensuing multi-digital gate-based bigger electronic Functional Machineries (FM) were integrated, comprising 1) combinational logic-gate circuits for decoders, encoders, multiplexers and demultiplexers, etc., 2) sequential logic-gate circuits for flip-flops, shift-registers, etc., and 3) control logic-gate circuits for synchronous and asynchronous transfers, etc.

Most importantly, every atomic functional machine (fin) has its "functional hardware core-structure with innate truth-table-based multiple-in/single-out (MISO) and single-in/single-out (SISO) software core capabilities", dubbed "the Function core innate-Duality Principle (FC-DP)".

1.1.2 Functional-Core "Innate Duality"

That is the reason why multiple atomic function machines can be "logically switched" and integrated into bigger and more complicated Functional Machines (FMs), which are still intrinsically equipped with a bigger core structure with innate truth-table capabilities. Moreover, every integrated FM can be readily used as an integrable component to build even bigger FMs.

Furthermore, when a smaller FM became one of the integrable components for constructing a bigger FM core-structure, then its functional core capability was innately integrated as a vital part of that bigger FM's core capabilities. That is also implying that "the halting problem" is never going to happen in a bigger FM, unless these smaller FMs are not functionally-integrated, only randomly-aggregated into "non-functional core-based" multiple-in-multiple-out (MIMO) "cluster-like" structure without innate truth-table capabilities, totally disobeying the function-core innate-duality principle and thereby causing the halting problems, i.e., no determinable resulting effect can be detected in existence. Therefore, cluster-like non-functional-core structures that don't have innate duality cannot be used as integrable components, due to they don't have truth tables and they cannot be well controlled.

1.2 the Second Facts: Node-Computing Entity Duality-Evolutionary Principles and Theories A second set of facts can be concluded based on the historical material to support the existence of three (3) fundamental principles on the 3 periods of evolutionary node-computing, dubbed the "node Evolutionary Principles" (nEP1-3) for establishing evolutionary architectures (EAs) based on duality-(structure/capability)-mandates and derived Theoretic-Foundations (nTF1-3) of a plurality of Hardware Architecture Theories (nHAT1-3) and Software Architecture Theorems (nSAT1-3) to create hardware node-core structures with software node-core capabilities along the node-computing evolutionary timeline over 3 periods.

1.2.1 nEP1-EA/nTF1-HAT-wCCs+wCMs, Illustrated by FIG. 1

The first nEP1 begins with the rational mandate-1 in creating "the early-stage node-Computing Components (nCCs) by using all the potential switching circuit-based readily-integrable Functional Machineries (FMs) and the rational mandate-2 in creating multi-nCC aggregated node Computing-Modules (nCMs) by using various inter-links based on various aspects of concern regarding node computing-centric attributes for multiple functionalities, memories for data-exchanges, controls for efficient/effective deliverables, etc.

Furthermore, based on the above 2 rationales of nEP1, the derived nTF1 comprises Switching-Logic-based Hardware Construction Methods (nHCMs) in creating node-computing early stages (nG0.stages)-based node-computing components (nCCs), i.e., computing-oriented combinational, sequential and control switching circuits by using various FMs and Aspect-Linkage-based Hardware Aggregation Methods (nHAMs) in generating various aspect-oriented node-computing Computing Modules (nCMs), i.e., Input/output modules, various memory modules and CPU modules, by aggregating multiple nCCs via aspect-oriented directional inter-linkages. Moreover, nHCMs and nHAMs together constitute an architecture-type-based theory, which involves 1) components (mandate-1), 2) aggregate-architecture methods and 3) architected module-structures (mandate-2), thereby dubbed as "Hardware Architecture Theory" (nHAT1) of nTF1, which can be regarded as the rational mandate-3 of the nEP1. These 3 rational mandates of nEP1 constitute the node-computing-based first-period evolutionary architecture (EA), which can be dubbed as 3-mandate nEA1.

The historical material about categorically defined fms, FMs, nCCs and nCMs were discussed in the aforementioned "the first-period" of computing history and the underlying fact based on the existence of categorically defined nCCs and nCMs and the categorical relationship among nEP1, nEA1, nTF1, nHAT1, nHCMs and nHAMs are illustrated by FIG. 1.

1.2.2 nEP2-(3-nBBB)-EA/nTF2-(HAT-nHCS/SAT-nCEs+nCEDs), Illustrated in FIG. 2

A second nEP2 dictates a number of rational mandates in first creating the electronic node-computing-based three Basic Building Block (3-nBBB, mandate-1), where the first nBBB is built by using IO-nCMs as the base-nBBB, the second BBB is built by using Memory-nCMs as the mid-nBBB and the third nBBB is built by using CPU-nCMs as the top-nBBB. In addition, all these 3 nBBBs must be bottom-up aggregated by block-to-block inter-links, creating a node-based Hierarchical (base/mid/top) Core-Structure (nHCS, mandate-2), which can be further equipped with one active entity-oriented hierarchical control program with innate core capabilities, creating an "Core Entity" (nCE, mandate-4). This innate core-entity software program is run "in an active self-control mode", dubbed "node core entity innate-duality principle", which conforms to the "functional-core innate-duality principle".

Furthermore, based on the rationales of nEP2, the derived nTF2 comprises not only the Hardware Architecture Theory (nHAT2, mandate-3), which consists of 1) the Hardware Construction Methods (nHCMs) in constructing all the 3 nBBBs by using IO, memory and CPU nCMs and 2) the Hardware Aggregation Methods (nHAMs) in aggregating these 3 nBBB into a hierarchical core structure (HCS), but also the Software Architecture Theorem (nSAT2, mandate-5), which consists of the core Entity Programming Methods (nEPMs) in building active core entity core control programs to equip nHCS into a Core-Entity (nCE-mandate-4). Moreover, all these 5 rational mandates of nEP2 constitute the node-computing-based second-period evolutionary architecture (EA), which can be dubbed as 5-mandate nEA2.

The material on the first nCE, such as von Neumann machinery, was discussed in the aforementioned "the second-period" of computing history and the underlying facts about the existence of categorically defined 3-nBBBs, nHCSs, nCEs and the categorical relationship among nEP2, nEA2, nTF2, nHAT2, nHCMs, nHAMs, nSAT2, nEPM are illustrated in FIG. 2.

1.2.3 nEP3/nTF3.G1.s-(HAT/SAT)=nCEs/CEDs, Illustrated in FIG. 3

The third nEP3 dictates a number of rational mandates in first creating the ensuing bigger and better three Basic Building Block (3-nBBB, mandate-1) by using the second-period 3-nBBB-architected node Core Entity (nCEs) as bigger and better nCCs, which can further be aggregated into bigger aspect-oriented nCMs to construct the base-nBBB. In addition, by using the DMA-Memory-nCMs to construct the mid-nBBB and the CPU-nCMs to construct the top-nBBB, a new bigger bottom-up 3-(base/mid/top)-nBBB hierarchical core structure (nHCS, mandate-2) can be created and further be equipped with an entity control program, creating a bigger-domain node Core-Entity (nCE, mandate-4). Moreover, by equipping core-entity-domain programs, an nCE can be enhanced into a node Core Entity-Domain (nCED-mandate-5) with all the potential entity-domain capabilities, which can then again readily become an even bigger nCC for building up even bigger base-BBBs.

This iterative bottom-up progressive processes will keep on going, so that more bigger and better nCEDs can be created along the timeline. This type of iterative progressive processes on core entities can be defined as the "evolutionary processes" and the hierarchical-b/m/t 3-nBBB architecture can also be again defined as an "evolutionary architecture" (EA), which solidifies the concept of "bigger and better node core-entities are created by bottom-up hierarchically-encapsulating smaller node core entities with entity-oriented integration control.

Furthermore, based on the rationales of nEP3, the derived nTF3 comprises not only the iterative Hardware Architecture Theories (nHAT3, mandate-3) that use the above-mentioned nHCMs to build 3-nBBBs and nHAMs to aggregate 3-nBBB into nHCSs, but also the iterative Entity Software Architecture Theorems (nSAT3, mandate-6) that use DOS-based Entity Integration Methods (nEIMs) in enhancing nHCSs into node Core-Entities (nCEs) and use real-time "node-core Entity Programming Methods (nEPMs) in equipping nCEs into node-Core Entity Domains (nCEDs) with many "function-like" core-entity domain programs. Moreover, all these 6 rational mandates of nEP3 constitute the node-computing-based third-period evolutionary architecture (nEA3), which can be dubbed as 6-mandate nEA3.

The material on the nG1.1 to nG1.2 node-computing evolution was discussed in the aforementioned "the third period" of computing history and the underlying facts about the existence of categorically defined nHCS, nCEs, nCEDs and the categorical relationship among nEP3, nEA3, nTF3, nHAT3, nHCMs, nHAMs, nSAT3, nEIMs and nEPMs are illustrated in FIG. 3.

1.3 the Third Facts: Node Core Entity Systems (STE SD)

A third set of facts can be reached based on the historical material to support the existence of nTF3-derived "3 node-Core Entity System-Disciplines" (SD1-3).

1.3.1 Node-Core-Entity SD1: (Parallel-Computing)

The first node-Core-Entity SD1 is to design the ideal logical node-Core Entity problem-solving Systems (nCESs) based on nG1.1-nG1.2 nCEDs for accommodating various real-world problem solving. It involves hardware logical design on all the 3-BBB-based node Computing Components (nCCs) and node Computing Modules (nCMs) to create nHCS and software logic design to equip nHCS with Entity-oriented OS and Entity-domain programs. For example, CPU modules can be designed into RISC or CISC-based. Memory modules can be designed into 8/16/32 bit-based. Input and output modules can be designed based on various connecting buses/ports, etc.

1.3.2 Node-Core-Entity dd-T SD2, Creating Physical

The second node-Core-Entity SD2 is to develop the logical science-based node core-Entity Systems into physical technology-based node Core-Entity Systems. It involves the physical hardware and software technological development of all the logical 3-nBBB-based nCCs/nCMs into physical 3-BBB nCCs/nCMs and the production of the physical node core-Entity Systems.

1.3.3 Node-Core Entity (nCE)-(Dd)-Engineering-SD3: (Aspect-Oriented Problem-Solving Systems)

The third deploy-engineering node-Core-Entity SD3 is to deploy and configure from all the physical technology-based node Core entity systems into a real-time problem solving engineering-based node core entity systems, i.e., node-core computer, controlled and operated by the stakeholders for innate-problem solving, such as productivity.

The material on the nG1.1 to nG1.2 nESs, i.e., the IBM earlier mainframes and PCs, was discussed in the aforementioned "the third period" of computing history and the underlying facts about the existence of categorically defined node-based logical, physical and real-world (innate)-problem-solving node-core-Entity Systems (nCESs).

1.4 the Fourth Facts: Non-Evolvable Node Unitary-Hub/Zone-Infrastructure/Cloud-Infrastructure Systems:

A fourth set of facts that can be established based on the material to support the weakness of the hierarchical 3-nBBB evolutionary architecture and the usage of "non-evolutionary methods" of generating object-oriented facility-control Operating systems and object-oriented application programs.

1.4.1 the 3-nBBB Cannot Evolve Further (Due to Architectural Weakness)

As in the nG1.3, when multiple hp-CPU-based nCMs are used to construct the top-nBBB, it will turn a node-based 3-nBBB (MISO/SISO-functional) Hierarchical Core Structure (nHCS) into a multiple-in/multiple-out (MIMO-non-functional) Spokes-Aggregated Hub-Structure (AHS). Multiple core Entity-oriented control programs cannot be equipped on a Hub-structure Entity, due to the fact that there is only one data-processing-based main memory and multiple independent core-entity-oriented control programs will generate data corruption and a total failure in computing.

1.4.2 the Creation of Object-OS and Object-Application Programs Based Node-Hub Entity (Via Non-Evolutionary Methods) with Innate Problem Solving Capabilities.

Then came the "non-evolutionary" Object-oriented Aggregation Methods (nOAMs) in generating facility-(main-memory)-sharing traffic control programs on the MIMO spokes-aggregated node hub-structure, dubbed the object-oriented Operating-Systems (OS), which enhance nG1.3-nAHSs into node-hub Entities (nHEs). Furthermore, Object-oriented Programming Methods (nOPMs) generated application programs to reside on nHEs and enhance them into node-Hub Entity Domain (nHEDs).

Such "facility-sharing control based" object-oriented Operating Systems as WIN95, WinNT and the like are prone to become bloated with unnecessary complications due to the increments of hp-CPUs. These object-OSs control over multiple "pre-defined" fixated-functional-pipe-flow-based application programs, rendering only cookie-cutting problem solving capability, dubbed "node hub-entity non-innate duality" phenomenon.

1.4.3 Material and the "Non-Evolutionary" Application-Based Dead-End Pathway: Illustrated in FIG. 5

The material on the object-oriented OSs, such as WIN95, WinNT and the likes, and the object-oriented application programs was discussed in the aforementioned "the third period" of computing history and the underlying facts about the existence of categorically-defined nHEs and nHEDs and the categorical relationship among nhSAT3, nOAMs-(object-OSes), nOPMs-(application programs) are illustrated by FIG. 5.

1.4.4 Node-Application Systems

Once nG1.3 nHEDs are created, the logical node-application unitary-hub systems can be generated based on node-hub entity design-Science System Discipline-1 (nHE-SD1). Then the physical node-application unitary-hub systems can be generated based on nHE development-technology SD2 and the real-world "class-1 innate-problem-solving" node-application unitary-hub systems can be generated based on nHE deployment-Engineering-SD3.

Once node-application unitary-hub systems are generated, multi-node application zone-infrastructure systems can be generated for "class-2 collaborative problem solving" based on artificial-logic-based application engineering disciplines, dubbed weak-Artificial-Intelligence-(AI)-based application engineering disciplines.

Once nodes-application zone-infrastructure systems are generated, multi-zone application cloud-infrastructure systems can be generated for "class-3 Internet service-oriented cooperative problem solving" based on swarm-logic-based application engineering disciplines, dubbed weak-Swarm-Intelligence-(SI)-based application engineering disciplines.

1.5 the Fifth Facts: The Existence of NCP with CP Nomenclature

A fifth set of facts via computing history can be concluded based on the already-concluded facts to support the existence of nECP and its cessation to evolve further.

1.5.1 nECP Nomenclature Illustrated by FIG. 6

Based on the existence of nEP1-nTF1-nSD1, nEP2-nTF2-nSD2, nEP3-nTF3, node unitary-System Disciplines (uSD1, 2,3), (i.e., duality-design science discipline, duality-development technology discipline and duality-deployment engineering discipline), multi-node zone-infrastructure system application-Engineering discipline (dubbed zSD) and multi-zone cloud-infrastructure system application Engineering discipline (dubbed cSD), it can be concluded what the node-based Evolutionary Computing Paradigm (nECP) is comprised of and nECP's basic nomenclature is illustrated in FIG. 6.

In short-form expression, nECP=Period-1 {nEP1-nTF1 (nHAT1)-nSD1s}+Period-2 {nEP2-nTF2 (HAT2+SAT2)-nSD2s}+Period-3 {nEP3-nTF3.generation1.stages (HAT3+SAT3)-uSDs-zSDs-cSDs}.

1.5.2 Conclusion

The nG1.2 evolutionary processing on the evolutionary pathway along the node-computing evolutionary timeline has "come to an end", meaning that more complex node core entities cannot be created by hierarchically-(Base, mid, top)-integrating smaller NCEs as the base components.

The beginning of nG1.3 shows that based on "non-evolutionary" software-centric methods in creating object-oriented Operating-System (OS) and object-oriented application programs, only more complicated object-cluster/hub structures are generated by "loosely-aggregating" cluster/hub structures together, which cannot be used as integrable nCCs/nCMs to fit into the evolutionary processes.

This type of Class-1 object-oriented application systems are designed to solve one type of pre-defined problems via client-server coarse-grained reactive Feed (input) and Fetch (output) methods. Therefore, more and more application systems are network-aggregated into application infrastructure systems to solve real-world class-2-collaborative-problem solving and class-3 cooperative Internet-service-oriented problem solving. However they are laden with drawbacks and unresolvable security and privacy issues, as discussed earlier.

2.0 the Reasons why Node-Computing Cannot Evolve Further.

After considering all the facts, there is a series of dependent cause-effect causalities that contribute to the reason why nECP cannot evolve further. The first, which concerns "the current usage of Application-infrastructure Systems (AISs), which generate aforementioned unresolvable security and privacy issues, is caused by the weaknesses of zSDs and cSDs that cannot produce bigger problem solving systems for accommodating collaborative and cooperative problem domains. The second, which concerns "the weaknesses of uSDs" is caused by the weaknesses of nEP3-nTF3". The third, which concerns "the weaknesses of nEP3-TF3" is caused by the limitations of nEP2-nTF2-created "evolutionary architecture". The fourth, which concerns "the limitations of nEP2-nTF2 evolutionary architecture" is caused by the limitations of nEP1-nTF1-created nCCs and nCMs.

Based on the rationale derived from the nomenclature of node-based evolutionary computing paradigm (nECP), It is imperative to determine the "limitations" about nEP2-TF2 and nEP1-TF1 and based on the knowledge about all these limitations, the new and better EP1-TF1-based hardware architectures can be achieved to create new and better "CCs/CMs", a new and better EP2-TF2-based "evolutionary architecture" can be achieved to create new and better "core-entities" and then new and better EP3-TF3-uSD(1-3) can be obtained to create bigger and better "core Entity Systems". That is to say that a new and better ECP can be established to create bigger and better problem solving systems to accommodate collaborative and cooperative problem domains for resolving security/privacy issues and propelling the current nECP to shift.

2.1 Limitations of nEP2-EA/nTF2 (HAT, SAT)

The limitations of nEP2-TF2 are hinged on its lack of a proper "computing evolutionary" concept, on the need for a "solid evolutionary architecture", which can continue its "iterative progressive processes" without stoppage and create bigger and better "hierarchical core structures", starting from the very bottom with one memory-encapsulated evolutionary process at a time along the evolutionary timeline.

2.1.1 Limitation-1: 3-nBBB

The nEP2-TF2-based "3-nBBB evolutionary architecture" did have evolutionary processes, as shown in nG1.2 HCSs. However, how long can this 3-nBBB evolutionary processes be sustaining? It really depends on the solidity of the 3-nBBB core entity. If new "must-achieve" aspect-oriented nCMs are formed to construct a new set of 3-nBBBs, as illustrated by adding multiple hp-CPU modules to construct top-BBB in nG1.3, the newly formed 3-nBBB hierarchically-aggregated structure cannot become a solid-(MISO/SISO)-core structure but a porous-(MIMO)-cluster hub-structure without "innate duality" capabilities, then the 3-nBBB evolutionary architecture has inherited flaws, which cannot be overcome by any modifications.

2.1.2 Limitation-2: Object-Oriented OS and Application Programs

This is why hub-structure based object-oriented application programs, which tend to build a big "logical hammer" in solving problems that must be treated like nails, i.e., the "hammer/nail" paradox with the incompleteness and incompactness that can never be overcome. It is because object-oriented OSes and application programs are generated based on multiple logic-pipes scaffolding methods and they are not generated by the bottom-up evolutionary architectural methods. Furthermore, this is the reason why no matter how many revisions of the application programs are developed, the security issues will never be resolved.

2.1.3 Ill-Effects

In summary, nEP2-nTF2 cannot create a "solid" "evolutionary architecture" that can maintain its entity-oriented hierarchical core structure (HCS) and keep its "bottom-up" evolutionary processes (i.e., the iterative progressive processes) on going without stoppage. Once the hierarchical core structure cannot be maintained, then a school of non-evolutionary object-oriented "non-bottom-up scaffolding-like" software architecture methods must generate "application programs for solving real-world problems", based on programmer's skill of scaffolding patterns and practices to achieve "hammer/nail paradox-like" cookie-cutting goals.

2.2 Limitations of nEP1-EA/nTF1 (HAT/SAT)

The limitations of nEP1-nTF1 is its lack of a proper "computing evolutionary" concept on the creation of a must-have "fail-over" architecture" in creating "multiple bi-directional data-packet-based exchange-links" equipped fail-over-capable computing components (CCs) and multiple fail-over-capable CCs aggregated "fail-over" computing modules (CMs), each of which should be equipped with 1) multiple bi-directional packet-data exchange fail-over links, together with 2) real-time self-replacement and self-expansion fail-over capabilities and 3) real-time self-management fail-over, dubbed three must-have fail-over characteristics as "fail-over-3 capabilities".

2.2.1 Limitation-1: No Multi Data-Packet-Based Communication Links

A "fail-over-capable" CC should be equipped with at least two bi-directional "data-packet" (msg)-exchange links in addition to many other functional-processing-based directional data-bus links, due to the fact that it should send out requested health-based msg via the bi-directional msg-exchange link, so that the fail-over control-manager can react right away, based on the returned health-msg or the non-returned void-exchange, to either send in counter measure-msg into the faulty CC or just totally replace it.

When multiple "fail-over-capable" CCs are aggregated into a "multiple bi-directional links equipped CM, the multi-bi-directional-link effect will contribute to the overall CM fail-over capability, e.g., if one bi-directional msg-exchange link should go down, the other bi-directional msg-exchange link can still keep the fail-over msg as well as the processed data-packaged flow-msg going among related CCs.

2.2.2 Limitation-2: No Self-Managing

Moreover, the real-time self-management effect will also contribute to the overall CM fail-over capability, e.g., if any CC is faulty, the must-have paired-managing CC unit in the CM can self-manage to take over the faulty one and continue the data-flow-processing via the existing as well as the alternative fail-over multi-link.

2.2.3 Limitation-3: No Self-Expanding

Most importantly, the real-time self-expansion effect will again contribute to the overall CM fail-over capability, e.g., if any CC is faulty, then it can be real-time hot-swapped, even hot-swapped with multiple new and better-attribute CCs for more sophisticated expansions.

2.2.4 Ill-Effects

In summary, the nEP1-TF1 did have the aspect-oriented hardware architectures to create the base attribute-aspect-oriented, mid memory aspect-oriented and top-control aspect-oriented nCCs and nCMs, so that base-nBBB, mid-nBBB and top-nBBB can be constructed. However, without the fundamental fail-over-3 capability in all these aspect-oriented nCMs, the 3-nBBB-architected duality-core's hardware structures can never be "fail-safe-capable" to generate any "fail-safe" software capability to guard against any external attacks and internal malfunctions, diminishing the possibility of furthering evolution of node-computing.

2.3 the Inevitable Node-Computing Paradigm (nECP) Shift 2.3.1 the New and Better EP(1-2)-TF(1-2) and EP3-TF3-SD3

The limitations of nEP1-EA/TF1 and nEP2-EA/TF2, make it imperative that new and better EP1-TF1 and EP2-TF2 be established.

The new and better EP1-TF1, elevated from nEP1-TF1, should be mandated on having a "fail-over architecture" in creating fail-over-capable computing components (CCs) and "fail-over-3"-based computing modules (CMs). In addition, the new and better EP2-EA/TF2, elevated from nEP2-TF2, should be mandated on having a "concurrent control-capable top-BBB-based "solid evolutionary architecture" in creating hierarchical core structures (HCS) with long-lasting bottom-up iterative progressive evolutionary processes. In so doing, the new and better EP3-TF3-uSD can be established to continuously evolve into all the bigger and better "Core" Entity Systems to accommodate real-world collaborative problem domains from the smallest to the largest without stoppage. The new and better ECP, comprising EP1-TF1, EP2-TF2 and EP3-TF3 is illustrated by FIG. 7.

2.3.2 the Must-have nECP Shift, Issues can then be Resolved.

Therefore, the best action to continue computing-based evolutionary processes is to shift the current nECP to a new and better ECP. The nECP shift is critical, since all the current multiple object-oriented application systems as well as network-aggregated AISs have incurred a series of drawbacks and unsolvable dilemmas, which must be resolved.

Since nECP cannot evolve further and all the current non-evolutionary object-oriented application engineering methods in generating application-based systems as well as network-aggregated AISs, which have incurred a series of drawbacks and have even aggravated the security and privacy issues. The only way to resolve these issues is by continuing computing-based evolutionary processes, which is a must to shift the current nECP to a new and better ECP.

3.0 wEP1-(wfo)-EA1 (6-Mandates)/TF1-(HAT/SAT)

3.1 EA1-Mandates

Based on the aforementioned 3 fail-over limitations of nEP1 and the must-achieve fail-over criteria for enabling computing evolution, the first workgroup evolutionary principle (wEP1) is thus established to bring forth the workgroup "fail-over-3" evolutionary architecture, which involves the following more sophisticated 3 mandates.

Mandate-1: The must-have fail-over-capable wCCs, which can be constructed by using the aforementioned node-computing based nCCs, nCMs and nCEs as well as FMs.

Mandate-2: the must-have the "fail-over-3"-based wCMs for constructing 3 hierarchical (base/mid/top) workgroup-based Basic-Building-Block (wBBB), just like by using nCMs to construct 3 nBBBs as stated in nECP.

Mandate-3: the must-have iterative (i.e., iterations under the same fail-over EA principle) "Hardware Architecture Theory" (HAT) in creating fail-over-capable wCCs and "fail-over-3-based" wCMs for constructing wBBBs along the evolutionary stages in the first period of workgroup computing evolution.

3.2 wTF1-HATs

Based on the "third mandate" of wEP1 "fail-over" evolutionary architecture, the new and better workgroup Theoretic Foundation (wTF1.stages) can be derived in the early stages of workgroup computing evolution. The wTF1.stages will contain a number of staged fail-over Hardware Architecture Theories (HAT), each of which comprises Hardware components Construction Methods (HCMs) in creating the fail-over-capable "basic wCCs" and Hardware Aggregation Methods (HAMs) in creating the standard "fail-over-3 based" wCMs in the early stages of workgroup computing, as illustrated in FIG. 8.

3.3 Generic WSA

The first "fail-over-3 based" workgroup computing module (wCM), i.e., "workgroup server array" (WSA) was invented in year 1999, as described in U.S. patent application Ser. No. 09/744,194, entitled "SYSTEM AND METHOD FOR IMPLEMEMTING WORKGROUP SERVER ARRAY", by Ivan Chung-Shung Hwang, filed in May 17, 2000, U.S. Pat. No. 6,715,100, Date of Patent: Mar. 30, 2004.

3.3.1 HCM

As shown in FIG. 11, the wTF1.stage1-based WSA was created based on first-stage HAT, which comprises the first-stage Hardware Construction Methods (HCMs) in creating "3 Basic" wCCs, which can be described as follows:

1) HCM-1 is to implement TeamProcessors (TP)-wCC by using node-core entities/systems (nCEs/nCESs), and is equipped with workgroup execution and fail-over linkages, i.e., W1 (workgroup Ethernet), W2 (directional workgroup server link using SCSI), W3 (bi-directional workgroup peer-to-peer link using SCSI), RAP (Remote Access Port, a 25-pin connection that includes two 8-pin-serial ports, a keyboard port and a reset button), AV (audio/video connection) and USB (for workgroup device sharing).

2) HCM-2 is to implement TeamServer (TS)-wCC by using SCSI-disk devices.

3) HCM-3 is to construct TeampaneL (TL)-wCC by a functional fail-over-based circuit as shown and is equipped with workgroup fail-over linkages, i.e., RAP, AV and USB. All of the first-stage HCMs can be best illustrated by the HCM3-Table as follows.

| Abbr. Name | Description |
|---|---|
| 1. TP(1-12) | Team Processor(1-12), |
| 2. DAS TS | Direct Access SCSI-based Team Servers, with workgroup SCSI link |
| 3. TL(1-3) | TeampaneL(1-3) with workgroup links |

3.3.2 HAM

Furthermore, by using the first-stage HAM, all the above 3 wCCs can be aggregated via multiple workgroup links, creating the first generic WSA as follows.

1) HAM-1 is to aggregate TP (1-12) and TS(1-4) via w2-SCSI, w3-SCSI for workgroup execution operations.

2) HAM-2 is to aggregate TP(1-12) and TL(1-4) via RAP, AV and USB for workgroup fail-over operations.

Therefore, by aggregating all these 3 basic wCCs, a fail-over-3 wCM, which is the first generic WSA is created.

All of the first-stage HAMs can be best illustrated by the HAM2-Table as follows.

| HAM: wCM( ) | wCM = wCCs | Description |
|---|---|---|
| WSA(12) | | |
| | TP x (12) | Agg via w2-SCSI, w3-SCSI, RAP, AV, USB |
| | TS x (4) | Agg via w2-SCSI and w3-SCSI |
| | TL x (3) | Agg via RAP, AV and USB |

3.3.3 Fail-Over-3 Generic WSA (for Small Environment, it is Ideal)

In summing up, the first-stage workgroup fail-over EA and its derived wTF1.stage1 HAT, creating the first generic WSA with the following fail-over-3 operations.

Fail-over-1: the Generic WSA is equipped with multiple workgroup links and can enable link-to-link fail-over operation, e.g. RAP can be the fail-over alternative for W1 and USB.

Fail-over-2: the generic WSA can assign a pair of TeamProcessors as the TeamManagers, which can real-time self-managing the fail-over operations, due to their control over the main-TeamPanel.

Fail-over-3: the generic WSA can real-time self-expand by adding TeamProcessors and then reassign TeamManagers for real-time managing fail-over operations.

The significance of generic WSA is that it creates the first and must-have categorical wCCs, i.e., TeamProcessors, TeamServers, TeamPanels and multi-workgroup linkages, to fulfill workgroup fail-over-3 operations. Most importantly, these categorical wCCs have become the most fundamental workgroup computing components for building standard wCM-based WSAs that are equipped with workgroup fail-over-3 operational capabilities.

Moreover, the importance of "fail-over-3" workgroup server arrays (WSA) is that they are the "basic" standard "wCM" units for building any bigger workgroup core structures, just like the standard (NAND, NOR) gate arrays, e.g., Field-Programmable Gate Arrays (FPGA), can be used for building any functional core structures.

3.4 Scalable WSA 3.4.1 New Improvement (Scalable Stages of wCCs and wCMs.

Therefore, the wTF1 will contain a new scalable iterative HAT, comprising scalable HCMs to construct new and better fail-over scalable basic wCCs by modifying generic WSA's 4-member-in-1 TeamPanels into 4 singular-member TeamPanels, together with scalable HAMs to aggregate basic wCCs into new and better scalable fail-over-3 wCMs, i.e., scalable WSAs. Furthermore, in order to accommodate base/mid/top 3-aspect-oriented BBBs, there are various ensuing-staged scalable HATs to create scalable WSAs for base-attribute BBBs, i.e., scalable aWSAs, for mid-memory BBBs, i.e., scalable mWSAs and for top-control BBBs, i.e., scalable cWSAs.

3.4.3 3 Must-have Additional Scalable HATs, Creating Scalable Fail-Over-3 WSAs.

Since the first generic WSA was created based on wTF1.stage1-HAT, it is only natural to assign wTF1.stage2-HAT in creating scalable aWSAs, wTF1.stage3-HAT in creating scalable mWSAs and wTF1.stage4-HAT in creating scalable cWSAs.

3.5 Scalable aWSAs 3.5.1 the Must have Attribute-WSAs

In order to create scalable aWSAs, it is imperative to analyze how many workgroup attribute-aggregation oriented operations can be generated based on the basic wCCs. As stated earlier, there are two types of "workgroup data-packet operational links", i.e., directional W2-(SCSI) and bi-directional W3-(SCSI), thereby two different characteristics of workgroup base-attribute operations can be achieved.

The first one is for W2-directional sequential-dependent "workgroup internal sequential data-packet operations", such as automatic workgroup "conveyer-like" operations. The second one is for W3-bi-directional inter-dependent data-packet operations, such as discrete workgroup "library-like" operations. Therefore, there are two types of aWSAs, i.e., 1) (w2-only type1)-aWSA1 and (w2/w3 hybrid-type2)-aWSA2 that need to be created to accommodate 2 different workgroup base-attribute aggregation operations.

3.5.2 HCMs

Based on the third mandate of wEP1 fail-over evolutionary architecture and its derived wTF1.stage2 Hardware Architecture Theory (HAT), which comprising Hardware construction methods (HCMs) in creating the basic wCCs and Hardware Aggregation methods (HAMs) in creating standard wCMs and fail-over-3 aWSAs.

Here are the second-stage Hardware Construction Methods (HCMs) in creating the base-attribute-based "fail-over capable" wCCs, which can be described as follows:

1) HCM-1 is to implement 2 types of attribute-based TeamProcessors (w2)-TaP1, dubbed wCC(1) and (w3)-TaP2, dubbed wCC(11) by using existing node-core entities/systems (nCEs/nCESs) and equipping them with W1(Ethernet) workgroup execution communication link, W2/W3 (preferred USB or serial SCSI) workgroup execution links and RAP/aV/USB (RVU) workgroup fail-over links, where RAP stands for remote access port, aV stands for audio-and-video and USB stands for universal serial bus.

2) HCM-2 is to implement Workgroup Ethernet Control (WEC), dubbed wCC(5) by using routers, switches as well as hubs with wireless connections, based on the environmental needs for local operators.

3) HCM-3 is to construct type1-TeampaneL TaL1, dubbed wCC(7) and type2-TeampaneL TaL2, dubbed wCC(17) by remodifying 4-in-1 TeampaneL (TL) and equipping them with RVU workgroup fail-over links.

4) HCM-4 is to implement designated type1-based paired-TaP1 managers TaP1m(1&2), dubbed wCC(9) and type2-based TaP2m(1&2), dubbed wCC(19) by using the common sharing TeamServer (TS) with SCSI disk (as patented TeamManager in generic WSA) and equipping them with RVU workgroup fail-over links and F1/F2 (Ethernet) workgroup fail-over communication links. Basically, wCC(9) has the same hardware configuration as wCC(19).

In summary, there are 4 kinds of standard Workgroup Linkages (WL), i.e., 1) workgroup communication links, dubbed Workgroup-Linkage1 (WL1: W1), 2) workgroup execution links, dubbed Workgroup-Linkage2 (WL2: W2/W3), 3) workgroup fail-over links, dubbed Workgroup Linkage3 (WL-3: RVU) and workgroup fail-over communication links, dubbed Workgroup Linkage4 (WL4: F1/F2).

In summary, there are 4 kinds of standard Workgroup Linkages (WL), i.e., 1) workgroup communication links, dubbed Workgroup-Linkage1 (WL1: W1), 2) workgroup execution links, dubbed Workgroup-Linkage2 (WL2: W2 or W3 using USB), 3) workgroup fail-over links, dubbed Workgroup Linkage3 (WL-3: RVU), which can be packaged in one "fail-over" port-socket connector, and workgroup fail-over communication links, dubbed Workgroup Linkage4 (WL4: F1/F2).

3.5.3 2-type HAMs

Figure 12A:
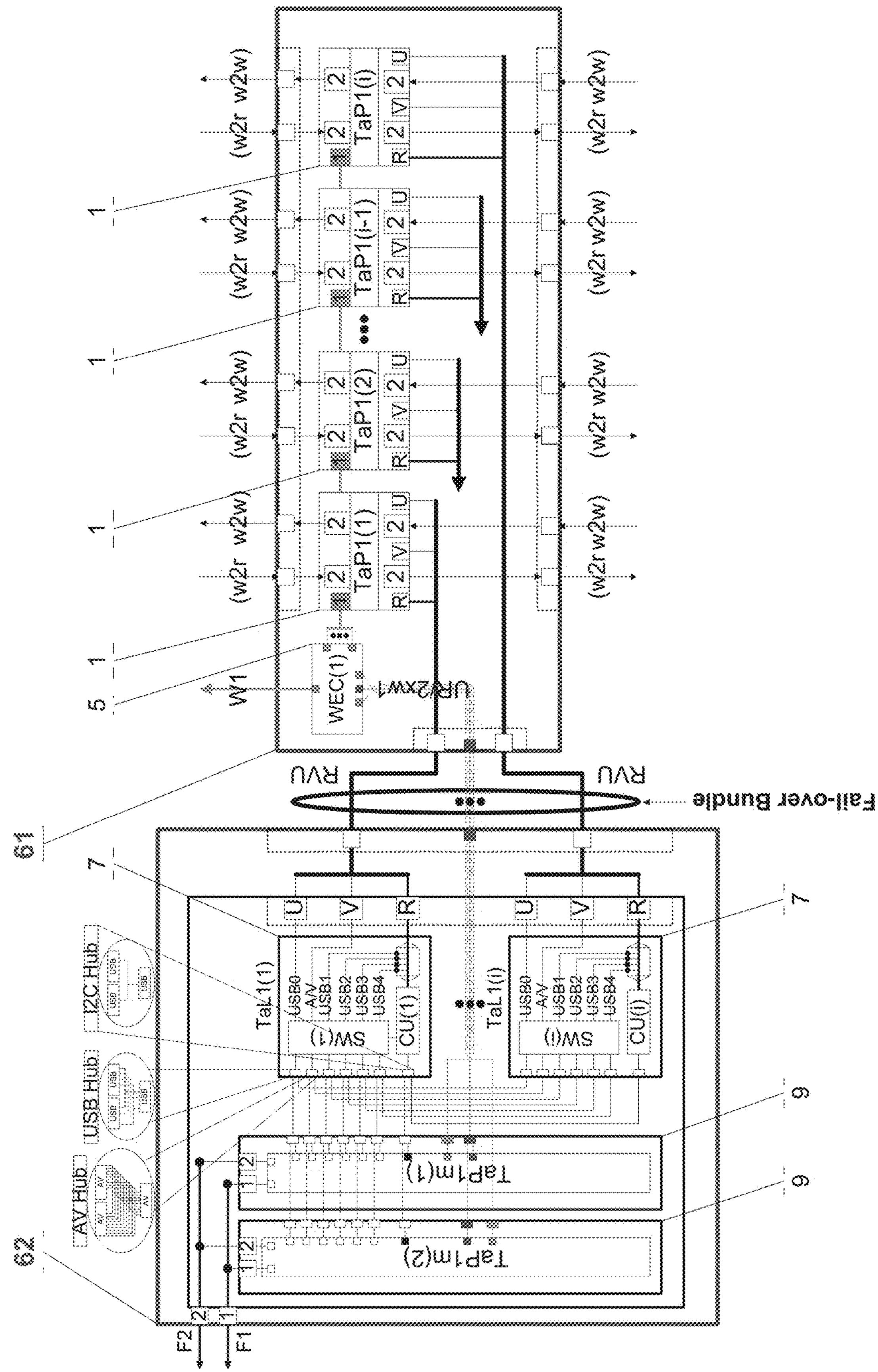
Figure 12B:
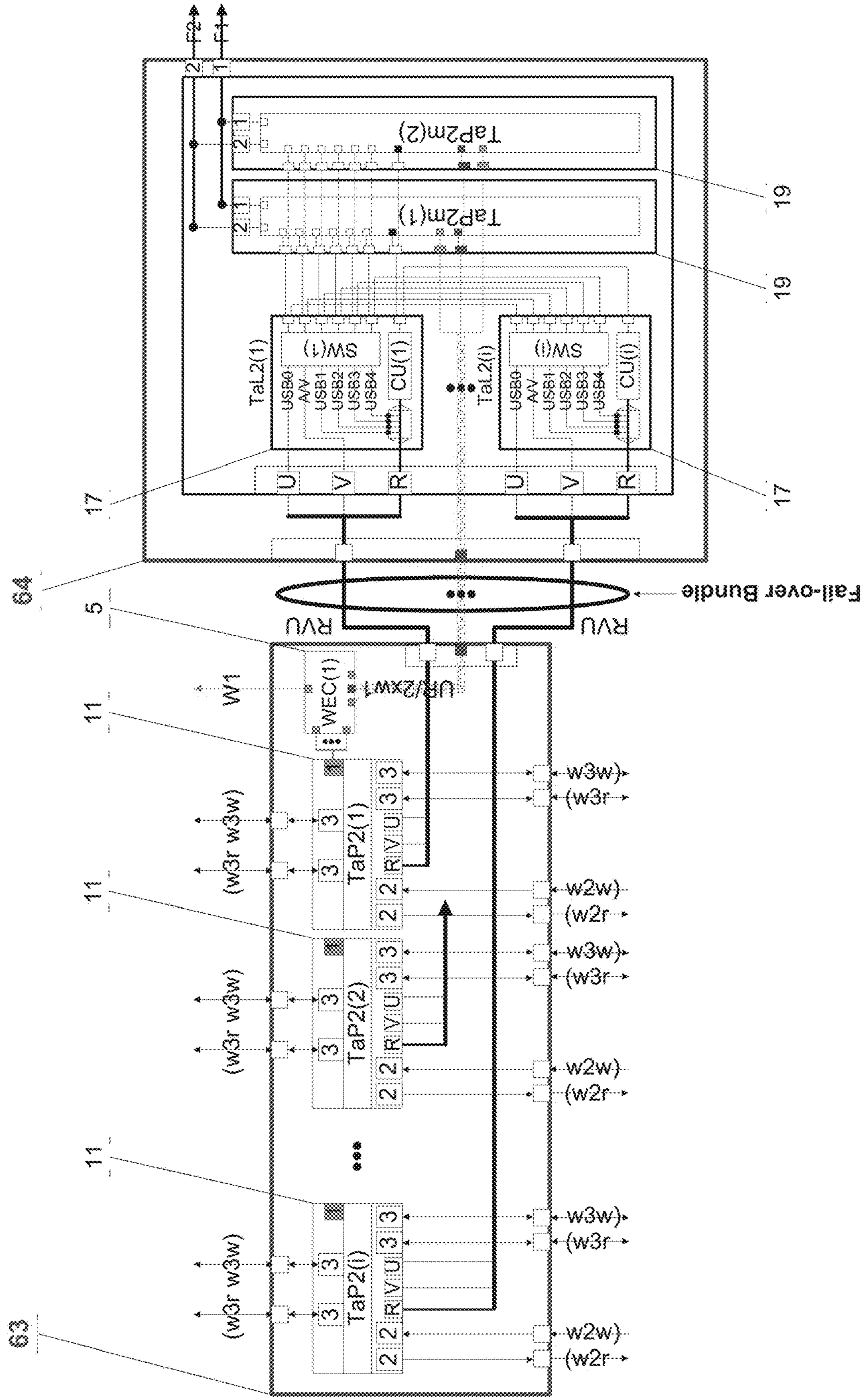

Based on these second-stage wCCs and the number of them being used for building type1 and type2 mWSAs, there are second-stage type1-HAMs that can build type1-based fail-over-3 (w2)-aWSAs, as illustrated in FIG. 12*a* and second-stage type2-HAMs that can build type2-based fail-over-3 (w2/w3-hybrid)-aWSAs, as illustrated in FIG. 12*b*.

FIG. 12*a* w2-aWSA1

As shown in FIG. 12*a*, all of the necessary second-stage wCCs for building up type1-based (w2)-aWSA1 can be best illustrated by the wCC-usage Table as follows.

| wCC( ) | Abbr. Name | Description |
|---|---|---|
| 1 | TaP1(1-i) | Team attribute Processor type 1(1-i) |
| 5 | WEC(1) | Workgroup Ethernet Controller(1) |
| 7 | TaL1(1-i) | Team attribute paneL type1(1-i) |
| 9 | TaP1m(1-2) | Team attribute Processor manager type1 (1-2) |

Based on all the selected second-stage wCCs for type-(w2) aWSA1, the second-stage type1-based HAMs can aggregate them via workgroup communication linkage1 (WL1:W1) and workgroup execution linkage2 (WL2:W2) for workgroup execution aggregation and workgroup fail-over linkage3 (WL3:RVU) and fail-over communication linkage4 (WL4: F1/F2) for workgroup-fail-over aggregation, creating the type1 (w2)-aWSA1=wCM(61+62), which can be best illustrated by the HAM-Table as follows.

| HAM: wCM( ) | wCM=wCCs | Abbr. Name | Description |
|---|---|---|---|
| 61 | wCM(61)= | (w2)-aWSA1p1 | (w2)-attribute Workgroup Server Array-type 1/part1 |
| | wCC(1)x(i) | TaP1(1-i) | Agg via WL1, WL2, WL3 |
| | wCC(5)x(l) | WEC(1) | Agg via WL1: w1 |
| 62 | wCM(62)= | (w2)-aWSA1p2 | (w2)-attribute Workgroup Server Array-type 1/part2 |
| | wCC(7)x(i) | TaL1(1-i) | Agg via WL3: RAP, aV, USB |
| | wCC(9)x(2) | TaP1m(1-2) | Agg via WL3, WL4: F1, F2 |
| 61 + 62 | wCM(61 + 62) | (w2)-aWSA1 | (w2)-attribute Workgroup Server Array type1 |

FIG. 12*b* (w2/w3)-aWSA2

As shown in FIG. 12*b*, all of the necessary second-stage wCCs for building up type2-based (w2/w3-hybrid)-aWSA2 can be best illustrated by the wCC-usage Table as follows.

| wCC( ) | Abbr. Name | Description |
|---|---|---|
| 5 | WEC(1) | Workgroup Ethernet Controller(1) |
| 11 | TaP2(1-i) | Team attribute Processor type2(1-i) |
| 17 | TaL2(1-i) | Team attribute paneL type2(1-i) |
| 19 | TaP2m(1-2) | Team attribute Processor manager type2(1-2) |

Based on all the selected second-stage wCCs for type2-(w3) aWSA2, the second-stage type2-based HAMs can aggregate them via WL1, WL2, WL3 and WL4, creating the type2 (w3)-aWSA2=wCM(63+64), which can be best illustrated by the HAM-Table as follows.

| HAM: wCM( ) | wCM=wCCs | Abbr. Name | Description |
|---|---|---|---|
| 63 | wCM(63)= | (w3)-aWSA2p1 | (w3)-attribute Workgroup Server Array-type2/part1 |
| | wCC(5)x(1) | WEC(1) | Agg via WL1:w1 |
| | wCC(11)x(i) | TaP2(1-i) | Agg via WL1, WL2: w3, WL3 |
| 64 | wCM(64)= | (w3)-aWSA2p2 | (w3)-attribute Workgroup Server Array-type2/part2 |
| | wCC(17)x(i) | TaL2(1-i) | Agg via WL3: R, V, U |
| | wCC(19)x(2) | TaP2m(1-2) | Agg via WL3, WL4: F1 and F2 |
| 63+64 | wCM(63+64) | (w3)-aWSA2 | (w3)-attribute Workgroup Server Array type2 |

3.6 Scalable mWSAs 3.6.1 the Must have Memory-WSAs

In order to create scalable mWSAs, it is imperative to analyze how many workgroup memory encapsulation-oriented operations can be generated based on the base-attribute aWSAs.

Since there are two types of aWSAs, it is only proper to create two corresponding types of mWSAs, i.e., 1) (w2-type1)-mWSA1 and (w3-type2)-mWSA2 to accommodate 2 different must-have workgroup mid-memory encapsulation operations.

3.6.2 HCMs, Creating the Basic wCCs

Based on the third mandate of wEP1 fail-over evolutionary architecture and its derived wTF1.stage3 Hardware Architecture Theory (HAT), which comprising Hardware construction methods (HCMs) in creating the basic wCCs and Hardware Aggregation methods (HAMs) in creating standard wCMs and fail-over-3 aWSAs.

The third-stage Hardware Construction Methods (HCMs) in creating the mid-memory-based "fail-over capable" wCCs, are described as follows:

1) HCM-1 is to implement 2 types of memory-based TeamProcessors (w2)-TmP1, dubbed wCC(21) and (w3)-TmP2, dubbed wCC(31) by using existing node-Core Entities/Systems (nCEs/nCESs) and equipping them with workgroup execution linkage2 (WL2:W2/W3) and workgroup fail-over linkage3 (WL3:RVU).

2) HCM-2 is to implement designated type1-based paired-TmP managers TmP1m(1&2), dubbed wCC(29) and type2-based TmP2m(1&2), dubbed wCC(39) by using the common sharing TeamServer (TS) with SCSI disk (as patented TeamManager in generic WSA) and equipping them with workgroup fail-over linkage3 (WL3:RVU) and workgroup fail-over communication linkage4 (WL4: F1/F2). Basically, wCC(29) has the same hardware configuration as wCC(39).

3) HCM-3 is to implement concurrent packet exchange (up, down, left, right) side-members read/write fail-over control Relay, dubbed wCC(22:u,d,L,r) by using SPDT relays with normal link to TmP and abnormal link and control link via RAP to TmPm(1&2).

4) HCM-4 is to implement USB-Read port and Write port fail-over control Relays, dubbed wCC(23:R,W) by using DPDT relays with normal 2-data links to TmP and abnormal 2-data links and control link via RAP to TmPm(1&2).

5) HCM-5 is to implement USB-Read and USB-Write common connection Bus, dubbed wCC(24:R,W) by using electronic bread-board-like devices for extending USB port data-links to all USB-Disks.

6) HCM-6 is to implement type1-based TeamMemory Tm, dubbed wCC(25) and type2-based Tm, dubbed wCC (35) by using USB disks with partitions for accommodating side-members' read/write and Read/Write-Bus to access and equipping them with workgroup execution linkage2 (WL2: W2/W3).

7) HCM-7 is to implement (up, down, left, right) side-member's USB-Read port and Write port control Relays, dubbed wCC(26:u,d,L,r) by using DPDT relays controlled by side-member control relay wCC(22).

8) HCM-8 is to construct type1-TeampaneL TmL1, dubbed wCC(27) and type2-TeampaneL TmL2, dubbed wCC(37) by remodifying 4-in-1 TeampaneL (TL) and equipping them with workgroup fail-over linkage3 (WL3: RVU).

3.6.3 Type1-HAM 2 Versions and Type2-HAM 6-Versions

Based on these third-stage wCCs and the number of them being used for building type1 and type2 mWSAs, there are third-stage type1-HAMs that can build to achieve the full scalability by creating 2 versions of type1-mWSAs, as illustrated in FIG. 13*a* and FIG. 13*b*. There are third-stage type2-HAMs that can build to achieve the full scalability by creating 6 additional versions of type2-mWSAs, as illustrated from FIG. 13*c* to FIG. 13*h*.

FIG. 13*a* (w2)-mWSA1

As shown in FIG. 13*a*, all of the necessary third-stage wCCs for building type1-based (w2)-mWSA1 (version1) can be best illustrated by the wCC-usage Table as follows.

| wCC( ) | Abbr. Name | Description |
|---|---|---|
| 21 | TmP1 | Team memory Processor type1 |
| 22u | uSPDT | up Single Port Double Throw relay |
| 22d | dSPDT | down Single Port Double Throw relay |
| 23R | DPDT-Read | Double Port Double Throw-Read Relay |
| 23W | DPDT-Write | Double Port Double Throw-Write Relay |
| 24W | w2-Wbus | w2-Write bus |
| 24R | w2-Rbus | w2-Read bus |
| 25 | Tm(1-i) | Team memory(1 to i) |
| 26u | uDPST | up Double Port Single Throw relay |
| 26d | dDPST | down Double Port Single Throw relay |
| 27 | TmL1(1-2) | Team memory paneL type1(1-2) |
| 29 | TmP1m(1-2) | Team memory Processor manager type1(1-2) |

Based on the above selected third-stage wCCs for type1-(w2) mWSA1-(version1), third-stage type1-based HAMs can aggregate them via WL1, WL2, WL3 and WL4, creating the type1-(w2) mWSA1=wCM(71+72), which can be best illustrated by the HAM-Table as follows.

| HAM: wCM( ) | wCM=wCCs | Abbr. Name | Description |
|---|---|---|---|
| 71 | wCM(71)= | (w2)-mWSA1p1 | (w2)-memory Workgroup Server Array-type1 version1/part1 |
| | wCC(21)x(1) | TmP1 | Agg via WL1, WL2: w2, WL3 |
| | wCC(22:u,d)x(2) | (u,d)SPDT | Agg via WL2: w2 control lines |
| | wCC(23R)x(1) | DPDT-Read | Agg via WL2: w2 control lines |
| | wCC(23W)x(1) | DPDT-Write | Agg via WL2: w2 control lines |
| | wCC(24R)x(1) | w2-bus-Read | Agg via WL2: w2 |
| | wCC(24W)x(1) | w2-bus-Write | Agg via WL2: w2 |
| | wCC(25)x(i) | Tm(1-i) | Agg via WL2: w2 |
| | wCC(26:u,d)x(2i+2i) | (u,d)DPST | Agg via WL2: w2 control line |
| 72 | wCM(72)= | (w2)-mWSA1p2 | (w2)-memory Workgroup Server Array-type1-version1/part2 |
| | wCC(27)x(2) | TmL1(1-2) | Agg via WL3: R, V, U |
| | wCC(29)x(2) | TmP1m(1-2) | Agg via WL3, WL4: F1, F2 |
| 71+72 | wCM(71+72) | (w2)-mWSA1 | (w2)-memory Workgroup Server Array type version 1 |

FIG. 13*b* (w2)-mWSA2

As shown in FIG. 13*b*, all of the necessary third-stage wCCs for building type1-based (w2)-mWSA2 (version2) can be best illustrated by the wCC-usage Table as follows.

| wCC( ) | Abbr. Name | Description |
|---|---|---|
| 21 | TmP1 | Team memory Processor type1 |
| 22u | uSPDT | up Single Port Double Throw relay |
| 22d | dSPDT | down Single Port Double Throw relay |
| 22r | rSPDT | right Single Port Double Throw relay |
| 23R | DPDT-Read | Double Port Double Throw-Read Relay |
| 23W | DPDT-Write | Double Port Double Throw-Write Relay |
| 24W | w2-Wbus | w2-Write bus |
| 24R | w2-Rbus | w2-Read bus |
| 25 | Tm(1-i) | Team memory(1-i) |
| 26u | uDPST | up Double Port Single Throw relay |
| 26d | dDPST | down Double Port Single Throw relay |
| 26r | rDPST | right Double Port Single Throw relay |
| 27 | TmL1(1-2) | Team memory paneL type1(1-2) |
| 29 | TmP1m(1-2) | Team memory Processor manager type1(1-2) |

Based on the above selected third-stage wCCs for type1-(w2) mWSA2-(version2), third-stage type1-based HAMs can aggregate them via WL1, WL2, WL3 and WL4, creating the type1(w2)-mWSA2=wCM(73+74), which can be best illustrated by the HAM-Table as follows.

| HAM: wCM( ) | wCM=wCCs | Abbr. Name | Description |
|---|---|---|---|
| 73 | wCM(73)= | (w2)-mWSA2p1 | (w2)-memory Workgroup Server Array-type2 version2/part1 |
| | wCC(21)x(1) | TmP1 | Agg via WL1, WL2, WL3 |
| | wCC(22:u,d,r)X(3) | (u,d,r)SPDT | Agg via WL2: w2 control line |
| | wCC(23R)x(1) | DPDT-Read | Agg via WL2: w2 control line |
| | wCC(23W)x(1) | DPDT-Write | Agg via WL2: w2 control line |
| | wCC(24R)x(2) | w2-bus-Read | Agg via WL2: w2 |
| | wCC(24W)x(2) | w2-bus-Write | Agg via WL2: w2 |
| | wCC(25)x(i) | Tm(1-i) | Agg via WL2: w2 |
| | wCC(26:u,d)x(2i+2i) | (u,d)DPST | Agg via WL2: w2 control line |
| | wCC(26r)x(2) | (r)DPST | Agg via WL2: w2 control line |
| 74 | wCM(74)= | (w2)-mWSA2p2 | (w2)-memory Workgroup Server Array-type2 version2/part2 |
| | wCC(27)x(2) | TmL1(1-2) | Agg via WL3: R, V, U |
| | wCC(29)(2) | TmP1m(1-2) | Agg via WL3, WL4: F1, F2 |
| 73+74 | wCM(73+74) | (w2)-mWSA2 | (w2)-memory Workgroup Server Array type1 version2 |

FIG. 13*c* (w3)-mWSA3

As shown in FIG. 13*c*, all of the necessary third-stage wCCs for building type2-based (w3)-mWSA3 (version3) can be best illustrated by the wCC-usage Table as follows.

| wCC( ) | Abbr. Name | Description |
|---|---|---|
| 22L | LSPDT | Left Single Port Double Throw relay |
| 23R | DPDT-Read | Double Port Double Throw-Read Relay |
| 23W | DPDT-Write | Double Port Double Throw-Write Relay |
| 24W | w2-Wbus | w2-Write bus |
| 24R | w2-Rbus | w2-Read bus |
| 26u | uDPST | up Double Port Single Throw relay |
| 26d | dDPST | down Double Port Single Throw relay |
| 26L | LDPST | Left Double Port Single Throw relay |
| 26r | rDPST | right Double Port Single Throw relay |
| 31 | TmP2 | Team memory Processor type2 |
| 35u | uTm(1-2) | up Team memory(1-2) |

-continued

| wCC( ) | Abbr. Name | Description |
|---|---|---|
| 35d | dTm(1-2) | down Team memory(1-2) |
| 35L | LTm(1-2) | Left Team memory(1-2) |
| 35r | rTm(1-2) | right Team memory(1-2) |
| 37 | TmL2(1-2) | Team memory paneL type2(1-2) |
| 39 | TmP2m(1-2) | Team memory Processor manager type2(1-2) |

Based on the above selected third-stage wCCs for type2-(w3) mWSA3-(version3), third-stage type1-based HAMs can aggregate them via WL1, WL2, WL3 and WL4, creating the type2 (w3)-mWSA3=wCM(75+76), which can be best illustrated by the HAM-Table as follows.

| HAM: wCM( ) | wCM=wCCs | Abbr. Name | Description |
|---|---|---|---|
| 75 | wCM(75)= | (w2)-mWSA3p1 | (w2)-memory Workgroup Server Array-type2 version3/part1 |
| | wCC(22)x(1) | LSPDT | Agg via WL2: w3 control line |
| | wCC(23R)x(1) | DPDT-Read | Agg via WL2: w3 control line |
| | wCC(23W)x(1) | DPDT-Write | Agg via WL2: w3 control line |
| | wCC(24R)x(1) | w3-bus-Read | Agg via WL2: w3 |
| | wCC(24W)x(1) | w3-bus-Write | Agg via WL2: w3 |
| | wCC(26:u,d,L,r) x(8) | (u,d,L,r) DPST | Agg via WL2: w3 control line |
| | wCC(31)x(1) | TmP2 | Agg via WL1, WL2, WL3 |
| | wCC(35:u,d,L,r) x(4) | (u,d,L,r)Tm | Agg via WL2: w3 |
| 76 | wCM(76) | (w2)-mWSA3p2 | (w2)-memory Workgroup Server Array-type2 version3/part2 |
| | wCC(37)x(2) | TmL2(1-2) | Agg via WL3: R, V, U |
| | wCC(39)x(2) | TmP2m(1-2) | Agg via WL3, WL4: F1, F2 |
| 75+76 | wCM(75+76) | (w3)-mWSA3 | (w3)-memory Workgroup Server Array type2 version3 |

FIG. 13*d* (w3)-mWSA4

As shown in FIG. 13*d*, all of the necessary third-stage wCCs for building type2-based (w3)-mWSA4 (version4) can be best illustrated by the wCC-usage Table as follows.

| wCC( ) | Abbr. Name | Description |
|---|---|---|
| 22u | uSPDT | up Single Port Double Throw relay |
| 22d | dSPDT | down Single Port Double Throw relay |
| 23R | DPDT-Read | Double Port Double Throw-Read Relay |
| 23W | DPDT-Write | Double Port Double Throw-Write Relay |
| 24W | w2-Wbus | w2-Write bus |
| 24R | w2-Rbus | w2-Read bus |
| 26u | uDPST(1-2i) | up Double Port Single Throw relay(1-2i) |
| 26d | dDPST(1-2i) | down Double Port Single Throw relay(1-2i) |
| 31 | TmP2 | Team memory Processor type2 |
| 35u | uTm(1-i) | up Team memory(1 to i) |
| 35d | dTm(1-i) | down Team memory(1 to i) |
| 37 | TmL2(1-2) | Team memory paneL type2 (1-2) |
| 39 | TmP2m(1-2) | Team memory Processor manager type2 (1 to 2) |

Based on the above selected third-stage wCCs for type2-(w3) mWSA4-(version4), third-stage type1-based HAMs can aggregate them via WL1, WL2, WL3 and WL4, creating the type2 (w3)-mWSA4=wCM(77+78), which can be best illustrated by the HAM-Table as follows.

| HAM: wCM( ) | wCM=wCCs | Abbr. Name | Description |
|---|---|---|---|
| 77 | wCM(77)= | (w3)-mWSA4p1 | (w3)-memory Workgroup Server Array-type-2 version4/part1 |
| | wCC(22:u,d,)x(2) | (u,d,)SPDT | Agg via WL2: w3 control line |
| | wCC(23R)x(1) | DPDT-Read | Agg via WL2: w3 control line |
| | wCC(23W)x(1) | DPDT-Write | Agg via WL2: w3 control line |
| | wCC(24R)x(1) | w3-bus-Read | Agg via WL2: w3 |
| | wCC(24W)x(1) | w3-bus-Write | Agg via WL2: w3 |
| | wCC(26:u,d,)x(2i+2i) | (u,d,)DPST | Agg via WL2: w3 control line |
| | wCC(31)x(1) | TmP2 | Agg via WL1, WL2, WL3 |
| | wCC(35:u,d,)x(i+i) | (u,d,)Tm | Agg via WL2: w3 |
| 78 | wCM(78)= | (w3)-mWSA4p2 | (w3)-memory Workgroup Server Array type2-version4/part2 |
| | wCC(37)x(2) | TmL2(1-2) | Agg via WL3: R, V, U |
| | wCC(39)x(2) | TmP2m(1-2) | Agg via WL3, WL4: F1, F2 |
| 77+78 | wCM(77+78) | (w3)-mWSA4 | (w3)-memory Workgroup Server Array type2-version4 |

FIG. 13*e* (w3)-mWSA5

As shown in FIG. 13*e*, all of the necessary third-stage wCCs for building type2-based (w3)-mWSA5 (version5) can be best illustrated by the wCC-usage Table as follows.

| wCC( ) | Abbr. Name | Description |
|---|---|---|
| 22u | uSPDT | up Single Port Double Throw relay |
| 22L | LSPDT | Left Single Port Double Throw relay |
| 22d | dSPDT | down Single Port Double Throw relay |
| 23R | DPDT-Read | Double Port Double Throw-Read Relay |
| 23W | DPDT-Write | Double Port Double Throw-Write Relay |
| 24W | w2-Wbus | w2-Write bus |
| 24R | w2-Rbus | w2-Read bus |
| 26u | uDPST(1-i) | up Double Port Single Throw relay(1-i) |
| 26d | dDPST(1-i) | down Double Port Single Throw relay(1-i) |
| 26L | LDPST(1-2) | Left Double Port Single Throw relay(1-2) |
| 31 | TmP2 | Team memory Processor type2 |
| 35u | uTm(1-i) | up Team memory(1 to i) |
| 35d | dTm(1-i) | down Team memory(1 to i) |
| 35L | LTm | Left Team memory |
| 37 | TmL2(1-2) | Team memory paneL type2(1-2) |
| 39 | TmP2m(1-2) | Team memory Processor manager type2 (1-2) |

Based on the above selected third-stage wCCs for type2-(w3) mWSA5-(version5), third-stage type1-based HAMs can aggregate them via WL1, WL2, WL3 and WL4, creating the type2-(w3) mWSA5=wCM(79+80), which can be best illustrated by the HAM-Table as follows.

| HAM: wCM( ) | wCM=wCCs | Abbr. Name | Description |
|---|---|---|---|
| 79 | wCM(79)= | (w3)-mWSA5p1 | (w2)-memory Workgroup Server Array-type2-verion5/part 1 |
| | wCC (22:u,d,L)x(3) | (u,d,,L)SPDT | Agg via WL2: w3 control line |
| | wCC(23R)x(1) | DPDT-Read | Agg via WL2: w3 control line |
| | wCC(23W)x(1) | DPDT-Write | Agg via WL2: w3 control line |
| | wCC(24R)x(1) | w3-bus-Read | Agg via WL2: w3 |
| | wCC(24W)x(1) | w3-bus-Write | Agg via WL2: w3 |

-continued

| HAM: wCM( ) | wCM=wCCs | Abbr. Name | Description |
|---|---|---|---|
| | wCC(26:u,d,)x (2i+2i) | (u,d,)DPST | Agg via WL2: w3 control line |
| | wCC(26L)x(2) | LDPST | Agg via WL2: w3 control line |
| | wCC(31)x(1) | TmP2 | Agg via WL1, WL2, WL3 |
| | wCC(35:u,d,)x (i+i) | (u,d,)Tm | Agg via WL2: w3 |
| | wCC(35L)x(1) | LTm | Agg via WL2: w3 |
| 80 | wCM(80)= | (w3)-mWSA5p2 | (w2)-memory Workgroup Server Array-type2 version5/part 2 |
| | wCC(37)x(2) | TmL2(1-2) | Agg via WL3: R, V, U |
| | wCC(39)x(2) | TmP2m(1-2) | Agg via WL3, WL4: F1, F2 |
| 79+80 | wCM(79+80) | (w3)-mWSA5 | (w3)-memory Workgroup Server Array type2 version5 |

FIG. **13*f*** (w3)-mWSA6

As shown in FIG. **13*f***, all of the necessary third-stage wCCs for building type2-based (w3)-mWSA6 (version6) can be best illustrated by the wCC-usage Table as follows.

| WCC( ) | Abbr. Name | Description |
|---|---|---|
| 22u | uSPDT | up Single Port Double Throw relay |
| 22L | LSPDT | Left Single Port Double Throw relay |
| 22d | dSPDT | down Single Port Double Throw relay |
| 22r | rSPDT | right Single Port Double Throw relay |
| 23R | DPDT-Read | Double Port Double Throw-Read Relay |
| 23W | DPDT-Write | Double Port Double Throw-Write Relay |
| 24W | w2-Wbus | w2-Write bus |
| 24R | w2-Rbus | w2-Read bus |
| 26u | uDPST(1-2i) | up Double Port Single Throw relay(1 to 2i) |
| 26d | dDPST(1-2i) | down Double Port Single Throw relay(1 to 2i) |
| 26L | LDPST(1-2) | Left Double Port Single Throw relay(1-2) |
| 26r | rDPST(1-2) | Right Double Port Single Throw relay(1-2) |
| 31 | TmP2 | Team memory Processor type2 |
| 35u | uTm(1-i) | up Team memory(1 to i) |
| 35d | dTm(1-i) | down Team memory(1 to i) |
| 35L | LTm | Left Team memory |
| 35r | rTM | right Team memory( |
| 37 | TmL2(1-2) | Team memory paneL type2(1-2) |
| 39 | TmP2m(1-2) | Team memory Processor manager type2(1-2) |

Based on the above selected third-stage wCCs for type2-(w3) mWSA6-(version6), third-stage type1-based HAMs can aggregate them via WL1, WL2, WL3 and WL4, creating the type2-(w3) mWSA6=wCM(81+82), which can be best illustrated by the HAM-Table as follows.

| HAM: wCM( ) | wCM= wCCs | Abbr. Name | Description |
|---|---|---|---|
| 81 | wCM(81) | (w3)-mWSA6p1 | (w3)-memory Workgroup Server Array-type2-version6/part 1 |
| | wCC(22:u,d,L,r)x(4) | (u,d,L,r)SPDT | Agg via WL2: w3 control line |
| | wCC(23R)x(1) | DPDT-Read | Agg via WL2: w3 control line |
| | wCC(23W)x(1) | DPDT-Write | Agg via WL2: w3 control line |
| | wCC(24R)x(1) | w3-bus-Read | Agg via WL2: w3 |
| | wCC(24W)x(1) | w3-bus-Write | Agg via WL2: w3 |
| | wCC(26:u,d)x(2i+2i) | (u,d)DPST | Agg via WL2: w3 control line |
| | wCC(26:L,r)x(2+2) | (L,r)DPST | Agg via WL2: w3 control line |
| | wCC(31)x(1) | TmP2 | Agg via WL1, WL2, WL3 |
| | wCC(35:u,d)x(i+i) | (u,d)Tm | Agg via WL2: w3 |
| | wCC(35:L,r)x(1+1) | (L,r)Tm | Agg via WL2: w3 |

-continued

| HAM: wCM( ) | wCM= wCCs | Abbr. Name | Description |
|---|---|---|---|
| 82 | wCM(82) | (w3)-mWSA6p2 | (w3)-memory Workgroup Server Array-type2-version6/part 2 |
| | wCC(37)x(2) | TmL2(1-2) | Agg via WL3: R, V, U |
| | wCC(39)x(2) | TmP2m(1-2) | Agg via WL3, WL4: F1, F2 |
| 81+82 | wCM(81+82) | (w3)-mWSA6 | (w3)-memory Workgroup Server Array type2-version6 |

FIG. **13*g*** (w3)-mWSA7

As shown in FIG. **13*g***, all of the necessary third-stage wCCs for building type2-based (w3)-mWSA7 (version7) can be best illustrated by the wCC-usage Table as follows.

| wCC( ) | Abbr. Name | Description |
|---|---|---|
| 22 | SPDT | Single Port Double Throw relay |
| 23R | DPDT-Read | Double Port Double Throw-Read Relay |
| 23W | DPDT-Write | Double Port Double Throw-Write Relay |
| 23R/W | DPDT-R/W | Double Port Double Throw-Read/Write Relay |
| 24R/W | W3-R/W | bus W3-Read / Write bus |
| 26d | dDPST(1-2i) | down Double Port Single Throw relay(1 to 2i) |
| 31 | TmP2 | Team memory Processor type2 |
| 35 | Tm(1-i) | Team memory (1 to i) |
| 37 | TmL2(1-2) | Team memory paneL type2(1-2) |
| 39 | TmP2m(1-2) | Team memory Processor manager type2(1-2) |

Based on the above selected third-stage wCCs for type2-(w3) mWSA7-(version7), third-stage type1-based HAMs can aggregate them via workgroup execution linkage2 (WL2:W2) for workgroup execution aggregation and workgroup linkage3 (WL3:RVU) for workgroup-fail-over aggregation, creating the type2-(w3) mWSA7=wCM(83+84), which can be best illustrated by the HAM-Table as follows.

| HAM: wCM( ) | wCM= wCCs | Abbr. Name | Description |
|---|---|---|---|
| 83 | wCM(83)= | (w3)-mWSA7p1= | (w3)-memory-expanding Workgroup Server Array-type2-version7/part1 |
| | wCC(22:d)x(1) | dSPDT | Agg via WL2: w3 control line |
| | wCC(23R)x(1) | DPDT-read | Agg via WL2: w3 control line |
| | wCC(23W)x(1) | DPDT-write | Agg via WL2: w3 control line |
| | wCC(23R/W)x(1) | DPDT | Agg via WL2: w3 control line |
| | wCC(24R)x(1) | w3-bus-Read | Agg via WL2: w3 |
| | wCC(24W)x(1) | w3-bus-Write | Agg via WL2: w3 |
| | wCC(26)x(2i) | DPST | Agg via WL2: w3 control line |
| | wCC(31)x(1) | TmP2 | Agg via WL1, WL2, WL3 |
| | wCC(35)x(i) | Tm | Agg via WL2: w3 |
| 84 | wCM(84)= | (w3)-mWSA7p2 | (w3)-memory-expanding Workgroup Server Array-type2-version7/part2 |
| | wCC(37)x(2) | TmL2(1-2) | Agg via WL3: R, V, U |
| | wCC(39)x(2) | TmP2m(1-2) | Agg via WL3, WL4: F1, F2 |
| 83+84 | wCM(83+84) | (w3)-mWSA7 | (w3)-memory Workgroup Server Array type2-version7 |

FIG. 13*h* (w3)-mWSA8

As shown in FIG. 13*h*, all of the necessary third-stage wCCs for building type2-based (w3)-mWSA8 (version8) can be best illustrated by the wCC-usage Table as follows.

| wCC( ) | Abbr. Name | Description |
|---|---|---|
| 22u | uSPDT | up Single Port Double Throw relay |
| 22r | rSPDT | up Single Port Double Throw relay |
| 22d | dSPDT | down Single Port Double Throw relay |
| 23R | DPDT-Read | Double Port Double Throw-Read relay |
| 23W | DPDT-Write | Double Port Double Throw-Write relay |
| 24W | W3-Wbus | W3-Write bus |
| 24R | W3-Rbus | W3-Read bus |
| 26u | uDPST(2+2) | up Double Port Single Throw relay(2+2) |
| 26d | dDPST(1−2i) | down Double Port Single Throw relay(1 to 2i) |
| 31 | TmP2 | Team memory Processor type2 |
| 35u | uTm(1+1) | Up Team memory(1+1) |
| 35d | dTm(1 to i) | down Team memory(1 to i) |
| 35r | rTm(1) | right Team memory |
| 37 | TmL2(1-2) | Team memory paneL type2(1-2) |
| 39 | TmP2m(1-2) | Team memory Processor manager type2(1-2) |

Based on the above selected third-stage wCCs for type2-(w3) mWSA8-(version8), third-stage type1-based HAMs can aggregate them via workgroup execution linkage2 (WL2:W2) for workgroup execution aggregation and workgroup linkage3 (WL3:RVU) for workgroup-fail-over aggregation, creating the type2-(w3) mWSA8=wCM(85+86), which can be best illustrated by the HAM-Table as follows.

| HAM: wCM( ) | wCM= wCCs | Abbr. Name | Description |
|---|---|---|---|
| 85 | wCM(85)= | (w3)-mWSA8p1 | (w3)-memory-bonding Workgroup Server Array-type2-version8/part 1 |
| | wCC(22:u,d,r)x(3) | (u,d,r)SPDT | Agg via WL2: w3 control line |
| | wCC(23R)x(2) | DPDT-Read | Agg via WL2: w3 control line |
| | wCC(23W)x(3) | DPDT-Write | Agg via WL2: w3 control line |
| | wCC(24R)x(1) | w3-bus-Read | Agg via WL2: w3 |
| | wCC(24W)x(1) | w3-bus-Write | Agg via WL2: w3 |
| | wCC(26:u,d)x(4+2i) | (u,d)DPST | Agg via WL2: w3 control line |
| | wCC(31)x(1) | TmP2 | Agg via WL1, WL2, WL3 |
| | wCC(35:u,d)x(2+i) | (u,d)Tm | Agg via WL2: w3 |
| 86 | wCM(86)= | (w3)-mWSA8p2 | (w3)-memory-bonding Workgroup Server Array type2-version8/part 2 |
| | wCC(37)x(2) | TmL2(1-2) | Agg via WL3: R, V, U |
| | wCC(39)x(2) | TmP2m(1-2) | Agg via WL3, WL4: F1, F2 |
| 85+86 | wCM(85+86) | (w3)-mWSA8 | (w3)-memory Workgroup Server Array type2-version8 |

3.7 Scalable cWSAs 3.7.1 the Must have Control-WSAs

In order to create scalable cWSA, it is imperative to analyze how many concurrent workgroup top-control operations can be generated based on mid-memory mWSAs.

Since there are two types of mWSAs, it is only proper to create two corresponding types of cWSAs, i.e., 1) (w2/w3-hybrid type1)-cWSA1 and (w3-only type2)-cWSA2 to accommodate 2 different workgroup top-control manipulation operations.

3.7.2 HCMs

Based on the third mandate of wEP1 fail-over evolutionary architecture and its derived wTF1.stage4 Hardware Architecture Theory (HAT), which comprising Hardware construction methods (HCMs) in creating the basic wCCs and Hardware Aggregation methods (HAMs) in creating standard wCMs and fail-over-3 cWSAs.

Here are the fourth-stage Hardware Construction Methods (HCMs) in creating the top-control-based "fail-over capable" wCCs, which can be described as follows:

1) HCM-1 is to implement 2 types of control-based TeamProcessors (w2/w3 hybrid-type1)-TcP1, dubbed wCC (41) and (w3-type2)-TcP2, dubbed wCC(51) by using existing node-Core Entities/Systems (nCEs/nCESs) and equipping them with workgroup communication linkage1 (WL1: W1), workgroup execution linkage2 (WL2:W2/W3) and workgroup fail-over linkage3 (WL3:RVU).

2) HCM-2 is to construct type1-TeampaneL TcL1, dubbed wCC(47) and type2-TeampaneL TcL2, dubbed wCC(57) by remodifying 4-in-1 TeampaneL (TL) and equipping them with workgroup fail-over linkage3 (WL3:RVU).

3) HCM-3 is to implement designated type1-based paired-TcP1 managers TcP1m(1&2), dubbed wCC(49) and type2-based TcP2m(1&2), dubbed wCC(59) by using the common sharing TeamServer (TS) with SCSI disk (as patented Team-Manager in generic WSA) and equipping them with workgroup fail-over linkage3 (WL3:RVU) and workgroup fail-over communication linkage4 (WL4: F1/F2). Basically, wCC(49) has the same hardware configuration as wCC(59).

3.7.3 2 Type-HAMs

Based on these fourth-stage wCCs as well as previous-staged wCCs and the number of them being used for building type1 and type2 cWSAs, there are fourth-stage type1-HAMs that can build type1-based fail-over-3 (w2/w3-hybrid)-cWSAs, as illustrated in FIG. 14*a* and fourth-stage type2-HAMs that can build type2-based fail-over-3 (w3)-cWSAs, as illustrated in FIG. 14*b*.

FIG. 14*a* (w2/w3)-cWSA1

As shown in FIG. 14*a*, all of the necessary fourth-stage wCCs for building up type1-based (w2/w3-hybrid)-cWSA1 can be best illustrated by the wCC-usage Table as follows.

| wCC( ) | Abbr. Name | Description |
|---|---|---|
| 5 | WEC | Workgroup Ethernet Controller |
| 23u | uDPDT(1-i) | up Double Port Double Throw relay(1 to i) |
| 23d | dDPDT(1-i) | down Double Port Double Throw relay(1-i) |
| 41 | TcP1(1-i) | Team control Processor type 1(1-i) |
| 47 | TcL1(1-i) | Team control paneL typel(1-i) |
| 49 | TcP1m(1-2) | Team control Processor manager type1(1-2) with a Front-Panel and a keyboard/video/mouse switching (KVM) Device |

Based on all the selected fourth-stage wCCs for type1-(hybrid) cWSAs, the fourth-stage type1-based HAMs can aggregate them via WL1, WL2, WL3 and WL4, creating the type1(w2/w3-hybrid type1)-cWSA1=wCM(91+92), which can be best illustrated by the HAM-Table as follows.

| HAM: wCM( ) | wCM= wCCs | Abbr. Name | Description |
|---|---|---|---|
| 91 | wCM(91)= | (hybrid)-cWSA1p1 | (hybrid)-control Workgroup Server Array type1/part1 |
| | wCC(5)x(1) | WEC | Agg via WL1; W1 |
| | wCC(26:u,d)x(i+i) | (u,d)DPDT | Agg via WL2: control line |
| | wCC(41)x(i) | TcP1 | Agg via WL1, WL2, WL3 |

-continued

| HAM: wCM( ) | wCM= wCCs | Abbr. Name | Description |
|---|---|---|---|
| 92 | wCM(92)= | (hybrid)-cWSA1p2 | (hybrid)-control Workgroup Server Array type1/part2 |
| | wCC(47)x(i) | TcL1 | Agg via WL3: R, V, U |
| | wCC(49)x(2) | TcP1m(1-2) | Agg via WL3, WL4: F1, F2 |
| 91+92 | wCM(91+92) | (hybrid)-cWSA1 | (hybrid)-control Workgroup Server Array type1 |

FIG. 14*b* (w3)-cWSA2

As shown in FIG. 14*b*, all of the necessary fourth-stage wCCs for building up type2-based (w3)-cWSA2 can be best illustrated by the wCC-usage Table as follows.

| HCM: wCC( ) | Abbr. Name | Description |
|---|---|---|
| 5 | WEC | Workgroup Ethernet Controller |
| 23u | uDPDT(1-i) | up Double Port Double Throw relay(1-i) |
| 23d | dDPDT(1-i) | down Double Port Double Throw relay(1-i) |
| 51 | TcP2(1-i) | Team control Processor type2(1-i) |
| 57 | TcL2(1-i) | Team control paneL type2(1-i) |
| 59 | TcP2m(1-2) | Team control Processor manager type2(1-2) with a Front-Panel and a keyboard/video/mouse switching (KVM) Device |

Based on all the selected fourth-stage wCCs for type2-(w3) cWSA2, the fourth-stage type1-based HAMs can aggregate them via WL1, WL2, WL3 and WL4, creating the type2 (w3)-cWSA2=wCM(93+94), which can be best illustrated by the HAM-Table as follows.

| HAM: wCM( ) | wCM= wCCs | Abbr. Name | Description |
|---|---|---|---|
| 93 | wCM(93)= | (w2/w3)-cWSA2p1 | (w2/w3)-control Workgroup Server Array type2/part1 |
| | wCC(5)x(1) | WEC | Agg via WL1: W1 |
| | wCC(26:u,d)x (i + i) | (u,d)DPDT | Agg via WL2: w3 control line |
| | wCC(51)x(i) | TcP2 | Agg via WL1, WL2, WL3 |
| 94 | wCM(94)= | (w3)-cWSA2p2 | (w3)-control Workgroup Server Array type2/part2 |
| | wCC(57)x(i) | TcL2 | Agg via WL3: R, V, U |
| | wCC(59)x(2) | TcP2m(1-2) | Agg via WL3, WL4: F1, F2 |
| 93+94 | wCM(93+94) | (w3)-cWSA2 | (w3)-control Workgroup Server Array type2 |

4.0 wEP2-(fail-safe)-EA2/TF2-(HAT)

4.1 Workgroup Server Array Upgrades 4.2.1 Upgrade1: 6 wBBB.

As stated in the nECP, the first limitation of nEP2-EA is that it uses non-fail-over nCMs to construct 3-nBBBs, which cannot evolve further, due to the fact the evolved nEntities cannot survive in the real world environment. Therefore, these 3-nBBB must be upgraded to equip "fail-over-3" capabilities. Since the fundamental principle of evolutionary architecture is that it must have the bottom-up base-mid-top hierarchy, as illustrated by the node-computing (base/mid/top hierarchical) 3-nBBB evolutionary architecture, the new and better workgroup evolutionary architecture should maintain the same hierarchy but with each BBB equipped with "scalable fail-over-3" capability.

Therefore, the first workgroup base-BBB should be constructed by using the scalable attribute-based WSA (aWSA) part1-scalable execution modules and part2-scalable fail-over modules as shown in FIG. 12*a* and 12*b*, for creating two base-level basic building blocks (BBB), i.e., 1) Base Attribute-Block (BAB, i.e. wBBB1) and 2) Base-attribute Fail-over Block (BFB, i.e., wBBB2).

By the same consideration, the second workgroup mid-BBB should be constructed by using memory-based WSA (mWSA) part1-execution modules and part2-fail-over modules as shown in FIG. 13*a*-13*i*, for creating two mid-level basic building blocks, i.e., 1) Mid Memory Block (MMB, i.e., wBBB3) and 2) Mid-memory Fail-over Block (MFB, i.e., wBBB4).

Again, the third workgroup top-BBB should be constructed by using control WSA (cWSA) part1-execution module and part2-fail-over module as shown in FIG. 14*a*, 14*b*, for creating two top-level basic building blocks, i.e., 1) Top Control Block (TCB, i.e., wBBB5) and 2) Top-control Fail-over Block (TFB, i.e., wBBB6).

Therefore, a new and better "workgroup evolutionary architecture" can be established by having six (6) workgroup Basic Building Blocks (6-wBBB), i.e., base-level BAB, BFB, mid-level MMB, MFB and top-level TCB and TFB.

4.2.2 Upgrade2: Workgroup Data-Packet Operation

As stated in the nECP, the second limitation of nEP2-EA is that it only allows data-processing via its mid-memory nBBB via directional memory-buses, which will eliminate the possibility of concurrency of multiple data-processing on one directional data-processing, only allowing time-sharing-based parallel data-processing and eliminating the possibility of bottom-up further integration due to mid-memory nBBB is not scalable.

Since the 6-wBBBs will allow concurrent top-control BBB workgroup data-packet down-ward flows thru the mid-memory BBB to the base-attribute BBB, which also can concurrent return the result data-packet flows upward thru the mid-memory BBB to the top-control BBB, enabling "closed-looped" internal workgroup packet-based operation by the top-control managers. Therefore, the hierarchical and fail-over 6-wBBBs can be integrated into a bigger "core-entities", which can become a fail-over-3 wCM to be used to construct the base-attribute BBB, initiating the next iteration for evolving further down without stoppage.

4.2 the Must have wEP2 6-wBBB "Workgroup Hierarchical Integration-Based EA2-Mandates Therefore, based on the above must-have upgrades of nEP2-EA's limitations, the second workgroup evolutionary principle (wEP2) is thus established to bring forth the "workgroup-hierarchical-integration-based" Evolutionary Architecture (whi-EA) that comprises the following 6 mandates.

Mandate-1: the must-have 6 workgroup Basic Building Blocks (6 wBBBs), which can be constructed by using the standard WSAs, as illustrated from FIG. 12.*x* to FIG. 14.*x*;

Mandate-2: the must-have workgroup Hierarchical Core Structure (HCS), which can be built by aggregating 6-wBBBs with workgroup four linkages from WL1 to WL4;

Mandate-3: the must-have iterative workgroup-based Hardware Architecture Theory (HAT) with related methods in constructing 6 wBBBs and in aggregating 6 wBBBs into HCS;

Mandate-4: the must-have workgroup entity-oriented OSs to equip HCS into workgroup Core-Entity hardware-structure (CE);

Mandate-5: the must-have workgroup entity domain programs to equip ECS into workgroup Core-Entity Domain (CED) hardware-structure and Mandate-6: the must-have iterative workgroup Software Architecture Theorem (SAT) with related software methods in generating the workgroup core entity-oriented OSs and workgroup core entity domain programs.

4.3 Workgroup HAT for the First Workgroup HCS

Therefore, based on the third mandate of wEP2 evolutionary architecture, the new and better workgroup Theoretic Foundation (wTF2) can be derived, which contains the Hardware Architecture Theory (HAT), comprising Hardware Construction Methods (HCMs) in creating the 6-wBBBs and Hardware Aggregation methods (HAMs) in creating the workgroup-based Hierarchical Core Structure (HCS).

4.4 Workgroup SAT for Workgroup Entity (Cores and Domains)

Furthermore, based on the "sixth mandate" of wEP2 evolutionary architecture, the new and better workgroup Theoretic Foundation (wTF2) can be derived to contain the Software Architecture Theorem (SAT), which comprises "core-Entity Integration Methods" (EIMs) in creating the entity-oriented (integrated)-OSs and core-Entity domain Programming Methods (EPMs) in creating the core-entity domain programs via natural languages.

4.5 the First Evolved Workgroup Entities=(XP+FP) (FIG. 15)

As illustrated in FIG. 15, the first 6-BBB architected generic workgroup Entity (wEntity) can be created, due to the "6-workgroup BBB-based" evolutionary architecture EA and its derived wTF2-(HAT/SAT). Moreover, the internal XP integrated-OSs and FP-integrated OSs can real-time interact with one another, empowering the first generic wEntity with the following entity-oriented fail-safe capabilities, i.e., 1) real-time self-healing, 2) self-growing and 3) self-protecting capabilities, dubbed as the "fail-safe-3" entity-oriented capabilities.

Therefore, a new and better "workgroup-computing-based Evolutionary Principle-two wEP2 can be established based on the creation of a "6-workgroup BBB-based" evolutionary architecture, which not only can maintain long-lasting evolutionary processes and cultivate continuous evolutionary pathway along the evolutionary timeline, but also can enable the architected workgroup entities to have "fail-safe-3" entity-innate capabilities.

4.6 Ensuing Never Ending Workgroup Evolutionary Processes: (FIG. 16)

Most importantly, the wEP2-generic Evolutionary Architecture with its workgroup evolutionary processing can be continued without stoppage. It means that any newly-created wEntity can readily become one of the base-attribute wEntities for starting the next "hierarchical-bottom-up-base/mid/top 6-wBBBs integration-based" iterative "progressive" processes, i.e., workgroup evolutionary processes, continuously creating bigger wEntities with better "entity-innate core-domain" capabilities.

Moreover, workgroup evolutionary processes will never cease due to the fact that the newly-created core-entities are "innate-duality compliant", allowing them to be aggregated, encapsulated and manipulated to complete the bottom-up-hierarchical internal integration, as long as the aggregated symbiotic entity-relationship can be formed without any difficulties. That is when an entity becomes too bigger and powerful and there is no symbiotic relationship can be formed to further create an even bigger and more powerful entity. As illustrated in FIG. 16, based on 6-wBBB evolutionary architecture, numerous iterations of workgroup evolutionary processes create bigger 6-wBBB with WL1, WL2, WL3 and WL4-architected wEntities until the nth iteration, Generating n-stages of bigger wEntities with innate capabilities that are encapsulated by the same mid-memory-block (MMB) and mid-fail-over block (MFB) and manipulated by the same top-control block (TCB) and top fail-over block (TFB) in the first generation along the workgroup evolutionary timeline. Furthermore, all the multi-stage wEntities of the first generation can be used to construct more sophisticated base-attribute-block (BAB) and base fail-over block (BFB) of a new and better evolvable 6-wBBB with new encapsulation-based mid-memory-block (MMB)/mid-fail-over-block (MFB) and new manipulation-control-based top-control-block (TCB)/top-fail-over block (TFB), generating multi-stage wEntities of the second generation with more sophisticated capabilities. By the aforementioned workgroup generation-based evolution, the multi-stage wEntities of the third, fourth, fifth, sixth and seventh generations with various gradient capabilities can all be generated accordingly along the workgroup evolutionary timeline.

As illustrated in FIGS. 8, 9 and 10, there are Generation-1 multi-stage workgroup production entities with multiple degrees of real-time complex production capabilities, Generation-2 multi-stage workgroup assembly entities with multiple degrees of real-time diverse assembly capabilities by integrating a plurality of workgroup production entities, Generation-3 multi-stage workgroup fabrication entities with multiple degrees of real-time dynamic fabrication capabilities by integrating a plurality of workgroup assembly-entities, Generation-4 multi-stage workgroup transaction entities with multiple degrees of real-time cognitive-interactive transaction capabilities by integrating a plurality of workgroup fabrication entities, Generation-5 multi-stage workgroup organization entities with multiple degrees of real-time 3-level intelligent organization capabilities (i.e., innate-duality intelligence, collaborative-artificial-intelligence and cooperative-swarm-intelligence) by integrating a plurality of "standard" workgroup transaction entities, Generation-6 multi-stage workgroup apparatus entities with multiple degrees of real-time 3-level intelligent apparatus capabilities by integrating a plurality of "compact" workgroup transaction entities and workgroup organization entities, and Generation-7 multi-stage workgroup PDA (personal-digital-assistant) entities with multiple degrees of real-time 3-level intelligent PDA capabilities by integrating a plurality of "miniature" workgroup transaction entities and workgroup apparatus entities. These 7 workgroup-generation-based capabilities are 7-level gradient, meaning real-time intelligence for organization (e.g., smart-businesses), apparatuses (e.g., smart-homes and smart-cars) and PDA (e.g., smart-PDAs and smart wearables) can never be realized unless the real-time production complexity, real-time assembly diversity, real-time fabrication dynamism and real-time transaction cognitive-interactivity are fulfilled. This also means that the current node-computing application system's computational/computability theories, dealing with how much the time required and how big the memory-space needed to solve a particular "complicated-application" problem, can only lead to weak artificial-intelligence based on pre-set logics, never achieving real-time strong innate-intelligence, strong artificial-intelligence and strong swarm intelligence, which are based upon real-time complexity, diversity, dynamism and cognitive-interactivity.

4.7 Summary:

The present disclosure with diagrams and illustrations defines the nomenclature of a generic Evolvable Computing Paradigm (ECP), covering computing-entity-based duality-(structure with capabilities) Evolutionary-Principles (EPs) in 3 evolutionary periods, derived 3-period hardware and software Theoretic Foundations (TFs) and 3-period logical-design-science/physical-development-technology/problem-solving deployment-engineering System Disciplines (SDs), which can be applied to both unicellular-node-based evolvable computing paradigm (nECP) and multicellular-workgroup-based Evolvable Computing Paradigm (wECP).

Furthermore, the present disclosure classifies Prokaryotic organism-like node-computing systems, Archaea-organism-like fail-over array-computing systems and Eukaryotic-organism-like fail-safe workgroup-computing systems, establishing a 10-level gradient-capability-based "computing taxonomy". They are 1) duality vs bio-domain, 2) complexity vs bio-kingdom, 3) diversity vs bio-phylum, 4) dynamism vs bio-class, 5) cognitive interactivity vs bio-order, 6) innate-operational intelligence vs bio-family, 7) innate-managerial intelligence vs bio-genus, 8) artificial intelligence zones vs bio-species, 9) swarm intelligence clouds vs bio-ecosystems and 10) competitive-service platforms vs bio-ecology, similar to the "10-level biological taxonomy".

All the real-time fail-over aWSAs, mWSAs and cWSAs are created by aggregating multiple node-core entities/systems that can be classified into a unique "3-nBBB unicellular-core domain", similar to Bacteria/prokaryote bio-domain. These fail-over WSAs can be classified into a unique "2-part wBBB multicellular-array" domain, similar to Archaea in the bio-domain. The first time fail-safe workgroup core entities/systems created by aggregating aWSAs, mWSAs and cWSAs, can be classified into a unique "6-wBBB multicellular-core" domain. These three different domain-belonging computing entities/systems based on 3 different in duality-based characteristics, i.e., non-fail-safe 3-nBBB, fail-over 2-part wBBBs and fail-safe 6-wBBB structures with different capabilities. The claimed novelties in each different domain-belong computing entities are different from one another. For example, all the node hub application-based systems' novelties are useless for workgroup-computing entities, unless the node-hub application systems can be broken down into the simple node-cores as well as functional-cores that are innate-duality compliant. Then these innate-duality compliant node-cores/functional-cores can be integrated into the basic workgroup-computing components (wCCs) as well as wCMs for further building workgroup core entities with bigger and better innate-duality characteristics. And the whole breakdown/reuse process applied to node-hub application systems is similar to the "bio-autophagy" process.

5.0 wEP3-wG.s-EA3/TF3/SD, vEA/vTF/vSD and vSystem-Based Open Service Platforms

As stated earlier, wEP2 is focused on a "six workgroup basic building block (6-wBBB) based evolutionary architecture" and its derived wTF2 comprises not only the first-time workgroup hardware architecture theory (HAT) with methods for constructing these 6 wBBBs with wCCs and wCMs and for aggregating them into a "fail-over" hierarchical (base-mid-top) core structure (HCS) via workgroup linkages, but also the first-time workgroup software architecture theorem (SAT) with methods in creating workgroup entity-oriented Operating Systems (wOSs), including base-attribute aggregation/fail-over-OSs, mid-memory encapsulation/fail-over-OSs, top-control manipulation/fail-over-OSs), to bottom-up-integrate HCS into a "fail-safe" workgroup Entity Core Structure (ECS) and for generating workgroup entity domain programs to equip ECS into an workgroup Entity Domain Structure (EDS) with all the potential innate workgroup software capabilities.

Furthermore, the workgroup 6-wBBB-based evolutionary architecture can enable long-lasting iterative progressive processes, meaning that any newly-created entity core structures can readily become fail-over wCMs to construct the next 6 wBBBs for the next iteration, i.e., a new set of HAT and SAT to create even bigger entity cores. This iterative progressive process will never stop, which can be dubbed as "workgroup evolutionary process."

The wEP3 is thus focused on the long-lasting workgroup evolutionary processes to accommodate all the "real-world collaborative problem domains", such as in disciplines of Physics, Biology and Economics. But the most important collaborative problem domain is about the service-oriented Internet, where it involves from the smallest 1) collaborative production domains, to the 2) multi-production assembly domains, to the 3) multi-assembly solution domains, to the 4) multi-solution transaction domains, to the 5) multi-transaction enterprise service domains, and to the largest 6) multi-enterprise interconnected service-oriented Internet to accommodate individual personal services.

Consequently, the service-oriented problem domain-based workgroup Entity Architecture (pd-wEA) of wEP3 will cultivate a continuous service-oriented workgroup evolutionary pathway that can be divided into "6 workgroup evolutionary generations" and create 6 real-world workgroup collaborative wEntities to accommodate the real-world collaborative service-oriented problem domains. Furthermore, based on service-oriented workgroup-based design-Science, develop-Technology and deploy-Engineering (STE) System Disciplines (SD), all the 6-generation collaborative wEntity Systems can all be generated together with control gadgets (PDAs) for stakeholders in each of 6 service-oriented problem domains.

5.1 Production wEntities/wSystems: Rt-Complex Task Production (Tp)wEA/wSD 5.1.1 Rationale In a real world multi-function collaborative production environment, an ideal production facility comprising multiple production workgroups and production equipments must achieve its ultimate objective; that is "to real-time produce a series of complex products with production efficiency for satisfying quick turnaround and with production effectiveness for meeting "real-time requirements". The whole scenario can be best illustrated as similar as "building collaborative conveyers in a production environment".

In order to achieve the ultimate objective, it is imperative that the following 4 sequential courses of action be carried out.

The first course of action is to establish a production execution workgroup and equip it with the first and basic production execution equipment that is integrated with a production conveyer and multiple node-workstations for achieving the production efficiency.

The top-level leader of the execution workgroup will first receive the descriptive product request (i.e., order form with specs/conditions about the product) from an external requestor and then the leader equipped with a control-node-workstation will issue a work-order-based data-item package, containing data command-messages together with itemized raw materials (even data-based materials) that can then be sent via the mid-level "workgroup executional conveyer" to all the designated base-level node-workstation members for functional-processing. When each designated node-workstation member finishes up its own functional-processing either with the finished data-item package that can go back to the top leader or with the semi-finished data-item packages to the next-in-line node-workstation member via the workgroup conveyer. Eventually, the top-level leader will receive all the finished data-item packages from base-level members and then repackage them into data-product packages together with fulfilled order-form to return to the requestor, so that the requestor can immediate receive the product that met all the required specs/conditions according to the fulfilled order form. The overall Request&Reply (R&R) workgroup production execution operations on the workgroup execution conveyer can be dubbed as "Task1" operations. Therefore, the quick turnaround of Task1 R&/R executional operation will be considered as efficient. However, in order to achieve the best R&R, there should be more than one leader at the top-level, forming top-level concurrent control members, then the base efficiency can be raised and the overall R&R efficiency can be raised up based on concurrent Task1 operations.

After the R&R, all the timely-based "data-only-packets" for every step of the product-producing and the fulfilled order-form will be duplicated by Task1 members and the Task1 leader, all of which can be sent to the buffer-stations of the "workgroup execution conveyer" and ready to be accessed for supervision purposes.

Then, the second course of action is to establish a production supervision workgroup and to equip it with the first fundamental basic unit of collaborative production supervision equipment that is integrated by using the ideal "workgroup server arrays" for achieving production effectiveness.

The buffer-stations can be accessed by the base-level node-workstation members of the workgroup supervision conveyer, which will process the real-time data and the order form into vouchers that can be further processed by at least 3 higher-level node-workstation members. The linkage between two workgroup production conveyers, i.e., workgroup execution conveyer and workgroup supervision conveyer can be dubbed as "production coupling", which can be illustrated by mWSA2 in FIG. 3*b*.

The first higher-level members will real-time process the production vouchers into the product-based routine/program documents, send them out via the workgroup supervision conveyer and maintain a real-time well-formatted routine-document based library for various products. The second higher-level members will process the production vouchers and the routine docs into product results/Inventory documents, send them out via the workgroup supervision conveyer and maintain a real-time well-formatted result-document-based library for various products. The third also the top-level control members will process the production vouchers, routines and results into production reports and maintain a well-formatted report-based library for various current statuses/performances. The top-level supervision control members can accept any inquiry from the internal execution control members as well as any external top-tiered supervision crew for status/performance reports. This Question and Answer (Q&A) workgroup production supervision operations can be dubbed as "Task2" operations.

Then real-time interactions between the two top-level control members will be vital to ensure that the real-time complex production operations can be fulfilled with efficiency and effectiveness. Each of the execution control crew members can issue an Q&A inquiry to anyone of the supervision control crew members and get a good answer back before work-order data-packages is issued, so that the work-order will be selected with the current best-performed route of the data-package flow based on the current best routine for carrying out the order form and for obtaining the best reliable results, and then issue the commands accordingly. Once the finished product is produced, the whole data set will be sent from the execution crew to the supervision crew via the real-time coupling-processing and the supervision crew can again analyze the product-producing with Routine/Result/Report supervision operations and then real-time update the libraries based on the most current events with the best-performance routines for the next coming order-forms with the best possible results. Therefore, the real-time information library with Q&A capabilities can ensure the next order-form-based R&R can be carried out effectively.

The third course of action is to evolve the first basic production execution equipment unit into more complex units to produce more complex product-lines with efficiency, which can be greatly achieved by not having to increase the size of the production execution workgroup too much, due to the fact that the more complex production execution equipment coupled with human-machine-interface-based (HMI) robotics as well as data-sensory devices, can take over many manual operations and eliminate unnecessary human involvement.

The fourth course of action is to evolve the first basic production supervision equipment unit into more complex units to support and supervise complex production executions with effectiveness. The size of the production supervision workgroup will not increase too much, due to the fact that more complex production supervision equipment coupled with data-sensory devices can handle more complex production information-based real-time Q&A library operations digitally without human involvement.

5.1.2 wEA: 6-wBBB (HCS/EDS) Task-wEntity

Based on the aforementioned rational course of actions for creating Task1 (i.e., workgroup-production execution) based and Task2 (i.e., workgroup-production supervision) based workgroup Systems (wSystems) to equip an ideal collaborative production facility with automation and together with the usage of wEP1-workgroup fail-over Evolutionary Architecture created WSAs and wEP2-workgroup fail-safe Evolutionary Architecture, the third workgroup evolutionary principle (wEP3) is thus established to bring forth the first-generation "production-facility-based" workgroup-Entity Architecture (wG1-wEA) that comprises the following 6 mandates for creating all the potential workgroup-production-based "Task-wEntities".

Mandate-1: the must-have Task-wEntity-based 6 workgroup Basic Building Blocks (Task-6BBBs), which can be constructed by using the standard WSA-based wCCs and wCMs, as illustrated from FIG. 2.*x* to FIG. 4.*x;*

Mandate-2: the must-have Task-wEntity-based Hierarchical Core Structure (Task-HCS), which can be built by aggregating Task-6BBBs with workgroup four linkages, i.e., WL1 to WL4, as illustrated in WSAs;

Mandate-3: the must-have iterative Task-wEntity-based Hardware Architecture Theory (Task-HAT) with related methods in constructing Task-6BBBs and in aggregating them into Task-HCSs;

Mandate-4: the must-have Task-wEntity-oriented OS (Task-OS) to equip Task-HCS into Task-wEntity Core Structure (Task-ECS);

Mandate-5: the must-have Task-wEntity-oriented domain programs (Task-DPs) to equip Task-ECS into Task-wEntity Domain Structure (Task-EDS); and Mandate-6: the must-have iterative Task-wEntity-oriented Software Architecture Theory (Task-SAT) with related software methods in generating Task-OSs and Task-DPs.

5.1.3 wTF3-HATs

Therefore, by abiding the third mandate of wG1-wEA, the first generation Theoretic Foundation (wTF3.wG1.stages) can be derived, which contains a number of Task-wEntity-based stage-iterative Hardware Architecture Theories (Task-HATs). Each HAT comprises multiple Hardware Construction Methods (HCMs) in creating Task-6BBBs and multiple Hardware Aggregation Methods (HAMs) in creating Task-HCSs in each stage.

5.1.4 wTF3-SATs

In addition, by abiding the sixth mandate of wG1-wEA, the first generation workgroup Theoretic Foundation (wTF3.wG1.stages) can be extended to include the Task-wEntity-oriented stage-iterative Software Architecture Theories (Task-SATs). Each SAT comprises multiple Task-wEntity OS-oriented software Integration Methods (EIMs) in generating Task-OSs and multiple Task-wEntity domain-oriented software Programming Methods (EPMs) in real-time generating Task-DPs in each stage.

5.1.5 Preferred 8 Standard Task-wEntities

It can be concluded that by fulfilling the first-generation Task-wEntity-based Architecture (i.e., wG1-wEA) and carrying out wTF3.wG1.stages-(HATs/SATs), a series of stage-evolved "fail-safe" Task-wEntities with various degrees of real-time complex workgroup production can be created. In addition, based on the aforementioned standard directional w2-WSAs and bi-directional w3-WSAs as the basic components to warrant the solidity and completeness of wG1-wEA, there are 8 standard stages in creating wG1.1 to wG1.8 "fail-safe" Task1-wEntities and Task2-wEntities with 8 different levels of real-time workgroup production complexity, due to 8 standard workgroup production-unit based Hierarchical Core Structures (HCSs) from 1D, 2D, 3D to Fractals, as illustrated from FIG. 7 to FIG. 14.

5.1.6 Preferred 8 Real-Time-Complex Task-Production wSystems

Furthermore, all these 8 standard production-unit-based Task-wEntities can further be built into real-world "standardized real-time complex Task-Production wSystems" based on wG1 (task-production) System Disciplines (wG1-tpSD), which will populate the first generation of real-world service-oriented workgroup evolutionary pathway and eventually achieve the ideal real-world production facility's ultimate objective, as defined earlier.

FIG. 17 Array (1D Task1-Production Unit)-HCS

As shown in FIG. 17, a preferred 6-wBBB-architected 1D-Array Task1-production unit based HCS is created, where 1.BAB, 2.BFB, 3.MMB, 4.MFB, 5.TCB and 6.TFB are constructed by using standard WSA-based wCMs, as illustrated by the following HCM-6 Table.

| HCM-6: 6BBB | wCM( ) | Abbr. Name | Description |
|---|---|---|---|
| 1.BAB= | | | Base Attribute Block |
| | wCM(61) | aWSA1p1 | attribute Workgroup Server Array type1/part1 |
| 2.BFB= | | | Base Failover Block |
| | wCM(62) | aWSA1p2 | attribute Workgroup Server Array type1/part2 |
| 3.MMB= | | | Mid Memory Block |
| | wCM(71) | mWSA1p1 | memory Workgroup Server Array type1-version1/part1 |
| 4.MFB= | | | Mid Failover Block |
| | wCM(72) | mWSA1p2 | memory Workgroup Server Array type1-version1/part2 |
| 5.TCB= | | | Top Control Block |
| | wCM(91) | cWSA1p1 | control Workgroup Server Array type1/part1 |
| 6.TFB= | | | Top Failover Block |
| | wCM(92) | cWSA1p2 | control Workgroup Server Array type1/part2 |

In addition, there are 5 wCMs, i.e., 1. BF, 2.MF, 3.TF, 4.XP and 5.FP, are aggregated by using 6 wBBBs via WL1, WL2, WL3-bundle (as defined in FIG. 6) and WL4, creating the preferred Array(i) production unit's HCS=wCM(150+160), as illustrated by the following HAM-5 Table.

| HAM-5 Module: wCM( ) | Names | Description |
|---|---|---|
| BF: wCM(61+62) (1.BAB+2.BFB) | Base Framework | Agg via base WL3-Bundle |
| MF: wCM(71+72) (3.MMB+4.MFB) | Mid-Framework | Agg via mid WL3-Bundle |
| TF: wCM(91+92) (5.TCB+6.TFB) | Top-Framework | Agg via top WL3-Bundle |
| XP: wCM(150) (1.BAB+3.MMB+5.TCB) | Array-XP | Array-Execution Pylon Agg via WL1, WL2: (hybrid) internal W2 and external W3 |
| FP: wCM(160) (2.BFB+4.MFB+6.TFB) | Array-FP | Array-Failover Pylon Agg via WL4 |
| XP+FP: wCM(150+160) | Array-HCS | Array(i) Hierarchical Core Structure |

From a hardware configuration point of view, the preferred Array(i)-HCS is basically equipped with the base-level aWSA1(i), mid-level mWSA1(i) and top-level cWSA1(i), which are hierarchically aggregated via standard workgroup linkages from WL1 to WL4. The i-parameter for aWSA1 and mWSA1 should be equal and i-parameter for cWSA1 should have the flexibility from more than 1 to i, depending on the situational requirement for concurrent controls.

In conclusion, the Array(i)-HCS is created based on the Hardware architecture theory of the workgroup first-generation first stage-based Task Production Entity architecture, i.e., HAT of wG1.1-EA.

FIG. 18 Seg (1D Task2-Production-Unit)-HCS

As shown in FIG. 18, a preferred 6-wBBB-architected 1D-Seg Task2-production unit based HCS is created, where BAB, 2.BFB, 3.MMB, 4.MFB, 5.TCB and 6.TFB are constructed by using standard WSA-based wCMs, as illustrated by the following HCM-6 Table.

| HCM-6: 6BBB | wCMs | Abbr. Name | Description |
|---|---|---|---|
| 1.BAB= | | | Base Attribute Block |
| | wCM(63) | aWSA2p1 | attribute Workgroup Server Array type2/part1 |
| 2.BFB= | | | Base Failover Block |
| | wCM(64) | aWSA2p2 | attribute Workgroup Server Array type2/part2 |
| 3.MMB= | | | Mid Memory Block |
| | wCM(77) | mWSA4p1 | memory Workgroup Server Array type2-version4/part1 |
| 4.MFB= | | | Mid Failover Block |
| | wCM(78) | mWSA4p2 | memory Workgroup Server Array type2-version4/part2 |
| 5.TCB= | | | Top Control Block |
| | wCM(93) | cWSA2p1 | control Workgroup Server Array type2/part1 |
| 6.TFB= | | | Top Failover Block |
| | wCM(94) | cWSA2p2 | control Workgroup Server Array type2/part2 |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Seg(i)-HCS=wCM(170+180), as illustrated by the following HAM-5 Table.

| HAM-5 Module: wCM( ) | Names | Description |
|---|---|---|
| BF: wCM(63+64) (1.BAB+2.BFB) | Base Framework | Agg via base WL3-Bundle |
| MF: wCM(77+78) (3.MMB+4.MFB) | Mid-Framework | Agg via mid WL3-Bundle |
| TF: wCM(93+94) (5.TCB+6.TFB) | Top-Framework | Agg via top WL3-Bundle |
| XP: wCM(170) (1.BAB+3.MMB+5.TCB) | Seg-XP | Seg-Execution Pylon: Agg via WL1, WL2:W3 |
| FP: wCM(180) (2.BFB+4.MFB+6.TFB) | Seg-FP | Seg-Failover Pylon: Agg via WL4 |
| XP+FP: wCM(170+180) | Seg-HCS | Seg(i) Hierarchical Core Structure |

From a hardware configuration point of view, the preferred Seg(i)-HCS is basically equipped with the base-level aWSA2(i), mid-level mWSA4(i) and top-level cWSA2(i), which are hierarchically aggregated via workgroup linkages from WL1 to WL4. The i-parameter for aWSA2 and mWSA4 should be equal and i-parameter for cWSA2 should have the flexibility from more than 1 to i, depending on the situational requirement for concurrent controls.

In conclusion, the Seg(i)-HCS is created based on the Hardware architecture theory of the workgroup first-generation second stage-based Task2 Production Entity architecture, i.e., HAT of wG1.2-EA.

FIG. 19 Matrix (2D Task1-Production-Unit)-HCS

As shown in FIG. 19, a preferred 6-wBBB-architected 2D-Matrix Task1-production unit based HCS is created, where 1.BAB, 2.BFB, 3.MMB, 4.MFB, 5.TCB and 6.TFB are constructed by using standard WSA-based wCCs and wCMs, as illustrated by the following HCM-6 Table.

| HCM-6: 6BBB | wCCs+ wCMs | Abbr. Name | Description |
|---|---|---|---|
| 1.BAB= | | | Base Attribute Block |
| | wCM(61)x(j-1) | aWSA1p1 | attribute Workgroup Server Array type1/part1 |
| | wCM(63)x(1) | aWSA2p1 | attribute Workgroup Server Array type2/part1 |
| | wCM(73)x(j-1) | mWSA2p1 | memory Workgroup Server Array type2 version2/part1 |
| 2.BFB= | | | Base Failover Block |
| | wCC(9) | TaP1m(1-2) | Team attribute Processor manager(1-2) |
| | wCM(62)x(j-1) | aWSA1p2 | attribute Workgroup Server Array type1/part2 |
| | wCM(64)x(1) | aWSA2p2 | attribute Workgroup Server Array type2/part2 |
| | wCM(74)x(j-1) | mWSA2p2 | memory Workgroup Server Array type2-vesion2/part2 |
| 3.MMB= | | | Mid Memory Block |
| | wCM(77) | mWSA4p1 | memory Workgroup Server Array type2 version4/part1 |
| 4.MFB= | | | Mid Failover Block |
| | wCM(78) | mWSA4p2 | memory Workgroup Server Array type2 version4/part2 |
| 5.TCB= | | | Top Control Block |
| | wCM(93) | cWSA2p1 | control Workgroup Server Array type2/part1 |
| 6.TFB= | | | Top Failover Block |
| | wCM(94) | cWSA2p2 | control Workgroup Server Array type2/part2 |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Matrix (i,j)-HCS=wCM(190+200), as illustrated by the following HAM-5 Table.

| HAM-5 Module: wCM( ) | Abbr. Name | Description |
|---|---|---|
| BF: wCM( ) (1.BAB+2.BFB) | Base Framework | Agg via base WL3-Bundle |
| MF: wCM(77+78) (3.MMB+4.MFB) | Mid-Framework | Agg via mid WL3-Bundle |
| TF: wCM(93+94) (5.TCB+6.TFB) | Top-Framework | Agg via top WL3-Bundle |
| XP: wCM(190) (1.BAB+3.MMB+5.TCB) | Matrix-XP | Matrix-Execution Pylon: Agg via WL1, WL2: (hybrid) internal W2 and external W3 |
| FP: wCM(200) (2.BFB+4.MFB+6.TFB) | Matrix-FP | Matrix-Failover Pylon: Agg via WL4 |
| XP+FP: wCM(190+200) | Matrix-HCS | Matrix(ij) Hierarchical Core Structure |

From a hardware configuration point of view, the preferred Matrix(i,j)-HCS is basically equipped with multiple base-level 1D aWSA(i)s, together with mid-level 1D mWSA4(i) and top-level 1D cWSA2(i), which are bottom-up hierarchically aggregated via standard workgroup linkages from WL1 to WL4. The newly-defined j-parameter is to denote that there are j-number of aWSA(i)-based rows are included in the Matrix-HCS, which is 2D scalable.

In conclusion, the Matrix(i,j)-HCS is created based on the Hardware architecture theory of the workgroup first-generation third stage-based Task1 Production Entity architecture, i.e., HAT of wG1.3-EA.

FIG. 20 Polygon (2D Task2-Production Unit)-HCS

As shown in FIG. 20, a 6-wBBB-architected 2D-Polygon Task2-production unit based HCS is created, where 1.BAB, 2.BFB, 3.MMB, 4.MFB, 5.TCB and 6.TFB are constructed by using standard WSA-based wCCs and wCMs, as illustrated by the following HCM-6 Table.

| HCM-6: 6BBB | wCCs+ wCMs | Abbr. Name | Description |
|---|---|---|---|
| 1.BAB= | | | Base Attribute Block |
| | wCM(63) | (u/d/L/r)-aWSA2p1 | (Up/down/Left/right)-attribute Workgroup Server Array type2/part1 |
| | wCM(75) | mWSA3p1 | memory Workgroup Server Array type2 version3/part1 |
| | wCM(83) | (u/d/L/r)-mWSA7p1 | (Up/down/Left/right) memory Workgroup Server Array version7/part1 |
| 2.BFB= | | | Base Failover Block |
| | wCC(9) | TaP1m(1-2) | Team attribute Processor manager(1-2) |
| | wCM(64) | (u/d/L/r)-aWSA2p2 | (Up/down/Left/right)-attribute Workgroup Server Array type2/part2 |
| | wCM(76) | mWSA3p2 | memory Workgroup Server Array type2 version3/part2 |
| | wCM(84) | (u/d/L/r)-mWSA7p2 | (Up/down/Left/right)-memory Workgroup Server Array version7/part2 |
| 3.MMB= | | | Mid Memory Block |
| | wCM(77) | mWSA4p1 | memory Workgroup Server Array type2 version4/part1 |

-continued

| HCM-6: 6BBB | wCCs+ wCMs | Abbr. Name | Description |
|---|---|---|---|
| 4.MFB= | | | Mid Failover Block |
| | wCM(78) | mWSA4p2 | memory Workgroup Server Array type2 version4/part2 |
| 5.TCB= | | | Top Control Block |
| | wCM(93) | cWSA2p1 | control Workgroup Server Array type2/part1 |
| 6.TFB= | | | Top Failover Block |
| | wCM(94) | cWSA2p2 | control Workgroup Server Array type2/part2 |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Polygon (i,4-side)-HCS=wCM(210+220), as illustrated by the following HAM-5 Table.

| HAM-5 Module: wCM( ) | Names | Description |
|---|---|---|
| BF: wCM( ) (1.BAB+2.BFB) | Base Framework | Agg via base WL3-Bundle |
| MF: wCM(77+78) (3.MMB+4.MFB) | Mid-Framework | Agg via mid WL3-Bundle |
| TF: wCM(93+94) (5.TCB+6.TFB) | Top-Framework | Agg via top WL3-Bundle |
| XP: wCM(210) (1.BAB+3.MMB+5.TCB) | Polygon-XP | Polygon-Execution Pylon: Agg via WL1, WL2 |
| FP: wCM(220) (2.BFB+4.MFB+6.TFB) | Polygon-FP | Polygon-Failover Pylon: Agg via WL4 |
| XP+FP: wCM(210+220) | Polygon-HCS | Polygon(i,j=4-side) Hierarchical Core Structure |

From a hardware configuration point of view, the preferred Polygon(i,j=4)-HCS is basically equipped with multiple base-level aWSAs(i), together with mid-level mWSA4 (i) and top-level cWSA2(i), all of which are bottom-up hierarchically aggregated via standard workgroup linkages from WL1 to WL4. The newly-defined j-parameter is to denote that there are j-number of aWSA2(i)-based sides included in the Polygon-HCS, which is 2D3-scalable.

In conclusion, the Polygon(i,j=4)-HCS is created based on the Hardware architecture theory of the workgroup first-generation fourth stage-based Task2 Production Entity architecture, i.e., HAT of wG1.4-EA.

FIG. 21 Tie (3D Task1-Production Unit)-HCS

As shown in FIG. 21, a preferred 6-wBBB-architected 3D-Tie Task1-production unit based HCS is created, where 1.BAB, 2.BFB, 3.MMB, 4.MFB, 5.TCB and 6.TFB are constructed by using standard WSA-based wCCs, wCMs and 2D-wCMs(190,200), as illustrated by the following HCM-6 Table.

| HCM-6: | wCCs+ wCMs | Abbr. Name | Description |
|---|---|---|---|
| 1.BAB= | | | Base Attribute Block |
| | wCM(190) | Matrix-XP(1-k) | Matrix-Execution Pylon(1-k) |
| | {wCM(93)} | {cWSA2p1(1-k)} | {including control Workgroup Server Array type2/part1(1-k)} |
| 2.BFB= | | | Base Failover Block |
| | wCC(9) | TaP1m(1-2) | Team attribute Processor manager(1-2) |
| | wCM(200) | Matrix-FP(1-k) | Matrix-Failover Pylon(1-k) |
| 3.MMB= | | | Mid Memory Block |
| | wCM(77) | mWSA4p1 | memory Workgroup Server Array type2 version4/part1 |
| 4.MFB= | | | Mid Failover Block |
| | wCM(78) | mWSA4p2 | memory Workgroup Server Array type2 version4/part2 |
| 5.TCB= | | | Top Control Block |
| | wCM(93) | cWSA2p1 | control Workgroup Server Array type2/part1 |
| 6.TFB= | | | Top Failover Block |
| | wCM(94) | cWSA2p2 | control Workgroup Server Array type2/part2 |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Tie(i,j,k)-HCS=wCM(230+240), as illustrated by the following HAM-5 Table.

| HAM-5 Module: wCM( ) | Abbr. Name | Description |
|---|---|---|
| BF: wCM( ) (1.BAB+2.BFB) | Base Framework | Agg via base WL3-Bundle |
| MF: wCM(77+78) (3.MMB+4.MFB) | Mid-Framework | Agg via mid WL3-Bundle |

-continued

| HAM-5 Module: wCM( ) | Abbr. Name | Description |
|---|---|---|
| TF: wCM(93+94) (5.TCB+6.TFB) | Top-Framework | Agg via top WL3-Bundle |
| XP: wCM(230) (1.BAB+3.MMB+5.TCB) | Tie-XP | Tie-Execution Pylon: Agg via WL1, WL2 |
| FP: wCM(240) (2.BFB+4.MFB+6.TFB) | Tie-FP | Tie-Failover Pylon: Agg via WL4 |
| XP+FP: wCM(230+240) | Tie-HCS | Tie(i,j,k) Hierarchical Core Structure |

From a hardware configuration point of view, the preferred Tie(i,j,k)-HCS is basically equipped with multiple 2D Matrixes(i,j), together with mid-level mWSA4s and top-level cWSA2s, all of which are bottom-up hierarchically aggregated via standard workgroup linkages from WL1 to WL4. The newly-defined k-parameter is to denote that there are k number of 2D Matrix(i,j) in the Tie-HCS, which is 3D scalable.

In conclusion, the Tie(i,j,k)-HCS is created based on the Hardware architecture theory of the workgroup first-generation fifth stage-based Contract Transaction Entity architecture, i.e., HAT of wG1.5-EA.

FIG. 22 Align (3D Task2-Production Unit)-HCS

As shown in FIG. 22, a 6-wBBB-architected 3D-Align Task2-production unit based HCS is created, where 1.BAB, 2.BFB, 3.MMB, 4.MFB, 5.TCB and 6.TFB are constructed by using standard WSA-based wCCs, wCMs and 2D-wCMs (210,220), as illustrated by the following HCM-6 Table.

| HCM-6: 6BBB | wCCs+ wCMs | Abbr. Name | Description |
|---|---|---|---|
| 1.BAB= | | | Base Attribute Block |
| | wCM(210) | Polygon-XP(1-k) | Polygon-Execution Pylon(1-k) |
| | {wCM(93)} | {cWSA2p1(1-k)} | {including control Workgroup Server Array type2/part1(1-k)} |
| 2.BFB= | | | Base Failover Block |
| | wCC(9) | TaP1m(1-2) | Team attribute Processor manager(1-2) |
| | wCM(220) | Polygon-FP(1-k) | Polygon-Failover Pylon(1-k) |
| 3.MMB= | | | Mid Memory Block |
| | wCM(77) | mWSA4p1 | memory Workgroup Server Array type2 version4/part1 |
| 4.MFB= | | | Mid Failover Block |
| | wCM(78) | mWSA4p2 | memory Workgroup Server Array type2 version4/part2 |
| 5.TCB= | | | Top Control Block |
| | wCM(93) | cWSA2p1(1-k) | control Workgroup Server Array type2/part1(1-k) |
| 6.TFB= | | | Top Failover Block |
| | wCM(94) | cWSA2p2 | control Workgroup Server Array type2/part2 |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Align (i,j=4-side,k)-HCS=wCM(250+260), as illustrated by the following HAM-5 Table.

| HAM-5 Module: wCM( ) | Abbr. Name | Description |
|---|---|---|
| BF: (1.BAB+2.BFB) | Base Framework | Agg via base WL3-Bundle |
| MF: wCM(77+78) (3.MMB+4.MFB) | Mid-Framework | Agg via mid WL3-Bundle |

-continued

| HAM-5 Module: wCM( ) | Abbr. Name | Description |
|---|---|---|
| TF: wCM(93+94) (5.TCB+6.TFB) | Top-Framework | Agg via top WL3-Bundle |
| XP: wCM(250) (1.BAB+3.MMB+5.TCB) | Align-XP | Align-Execution Pylon: Agg via WL1, WL2 |
| FP: wCM(260) (2.BFB+4.MFB+6.TFB) | Align-FP | Align-Failover Pylon: Agg via WL4 |
| XP+FP: wCM(250+260) | Align-HCS | Align(i,4,k) Hierarchical Core Structure |

From a hardware configuration point of view, the preferred Align(i,j,k)-HCS is basically equipped with multiple base-level 2D Polygon(i,j), together with mid-level mWSA4s and top-level cWSA2s, all of which are bottom-up hierarchically aggregated via standard workgroup linkages from WL1 to WL4. The k-parameter is for denoting that there are k number of 2D Polygon(i,j) in the Align-HCS, which is 3D scalable.

In conclusion, the Align(i,j,k)-HCS is created based on the Hardware architecture theory of the workgroup first-generation sixth stage-based Task2 Production Entity architecture, i.e., HAT of wG1.6-EA.

FIG. 23 Fractal1 (poly3D Task1 Production Unit)-HCS

As shown in FIG. 23, a preferred 6-wBBB-architected poly3D-Fractal1 Task1-production unit based HCS is created, where 1.BAB, 2.BFB, 3.MMB, 4.MFB, 5.TCB and 6.TFB are constructed by using standard WSA-based wCCs, wCMs and 1D/2D/3D-wCMs, as illustrated by the following HCM-6 Table.

| HCM-6: 6BBB | wCCs+ wCMs | Abbr. Name | Description |
|---|---|---|---|
| 1.BAB= | | | Base Attribute Block |
| | wCM(150) x m1 | Array-XP | M1 units of Array-Execution Pylon |
| | wCM(190) x m2 | Matrix-XP | M2 units of Matrix-Execution Pylon |
| | wCM(230) x m3 | Tie-XP | M3 units of Tie-Execution Pylon |
| 2.BFB= | | | Base Failover Block |
| | wCM(160) x m1 | Array-FP | M1 units of Array-Failover Pylon |
| | wCM(200) x m2 | Matrix-FP | M2 units of Matrix-Failover Pylon |
| | wCM(240) x m3 | Tie-FP | M3 units of Tie-Failover Pylon |
| | wCC(9) | TaP1m(1-2) | Team attribute Processor manager(1-2) |
| 3.MMB= | | | Mid Memory Block |
| | wCM(85) | mWSA8p1 | Memory-bonding Workgroup Server Array type2-version8/part1 |
| 4.MFB= | | | Mid Failover Block |
| | wCM(86) | mWSA8p2 | Memory-bonding Workgroup Server Array type2-version8/part2 |
| 5.TCB= | | | Top Control Block |
| | wCM(93) | cWSA2p1 | control Workgroup Server Array type2/part1 |
| 6.TFB= | | | Top Failover Block |
| | wCM(94) | cWSA2p2 | control Workgroup Server Array type2/part2 |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Fractal1-HCS=wCM(270+280), as illustrated by the following HAM-5 Table.

| HAM-5 Module: wCM( ) | Abbr. Name | Description |
|---|---|---|
| BF: wCM( ) (1.BAB+2.BFB) | Base Framework | Agg via base WL3-Bundle |
| MF: wCM(85+86) (3.MMB+4.MFB) | Mid-Framework | Agg via mid WL3-Bundle |
| TF: wCM(93+94) (5.TCB+6.TFB) | Top-Framework | Agg via top WL3-Bundle |
| XP: wCM(270) (1.BAB+3.MMB+5.TCB) | Fractal1-XP | Fractal1-Execution Pylon: Agg via WL1, WL2 |
| FP: wCM(280) (2.BFB+4.MFB+6.TFB) | Fractal1-FP | Fractal1-Failover Pylon: Agg via WL4 |
| XP+FP: wCM(270+280) | Fractal1-HCS | Fractal1 Hierarchical Core Structure |

From a hardware configuration point of view, the preferred Fractal1-HCS is basically equipped with multiple 1D-Arrays, 2D-Matrixes, 3D-Ties, together with mid-level mWSA8(i) and top-level cWSA2(i), all of which are bottom-up hierarchically aggregated via standard workgroup linkages from WL1 to WL4. The newly-defined m1, m2, m3 parameters are to denote that there are m1 number of 1D Arrays, m2-number of 2D Matrixes and m3-number of 3D-Ties in the Fractal1-HCS, which can be expandable in numbers for real-time duplications of 1D/2D/3D HCSs and also can be reduced in numbers when the duplications are done one at a time and ready for aggregation into building other Task1-based HCSs.

In conclusion, the Fractal1-HCS is created based on the Hardware architecture theory of the workgroup first-generation seventh stage-based Task1 Production Entity architecture, i.e., HAT of wG1.7-EA.

FIG. 24 Fractal2 (poly3D Task2 Production Unit)-HCS

As shown in FIG. 24, a 6-wBBB-architected poly3D Fractal2 Task2-production unit based HCS is created, where 1.BAB, 2.BFB, 3.MMB, 4.MFB, 5.TCB and 6.TFB are constructed by using standard WSA-based wCCs, wCMs and 1D/2D/3D wCMs, as illustrated by the following HCM-6 Table.

| HCM-6: 6BBB | wCCs+ wCMs | Abbr. Name | Description |
|---|---|---|---|
| 1.BAB= | | | Base Attribute Block |
| | wCM(170) x m1 | Seg-XP | M1 units of Seg-Execution Pylon |
| | wCM(210) x m2 | Polygon-XP | M2 units of Polygon-Execution Pylon |
| | wCM(250)x m3 | Align-XP | M3 units of Align-Execution Pylon |
| 2.BFB= | | | Base Failover Block |
| | wCM(180) x m1 | Seg-FP | M1 units of Seg-Failover Pylon |
| | wCM(220) x m2 | Polygon-FP | M2 units of Polygon-Failover Pylon |
| | wCM(260) x m3 | Align-FP | M3 units of Align-Failover Pylon |
| | wCC(9) | TaP1m(1-2) | Team attribute Processor manager(1-2) |
| 3.MMB= | | | Mid Memory Block |
| | wCM(85) | mWSA8p1 | Memory-bonding Workgroup Server Array type2 version8/part1 |
| 4.MFB= | | | Mid Failover Block |
| | wCM(86) | mWSA8p2 | Memory-bonding Workgroup Server Array type2 version8/part2 |
| 5.TCB= | | | Top Control Block |
| | wCM(93) | cWSA2p1 | control Workgroup Server Array type2/part1 |
| 6.TFB= | | | Top Failover Block |
| | wCM(94) | cWSA2p2 | control Workgroup Server Array type2/part2 |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Fractal2-HCS=wCM(290+300), as illustrated by the following HAM-5 Table.

| HAM-5 Module: wCM( ) | Abbr. Name | Description |
|---|---|---|
| BF: wCM( ) (1.BAB+2.BFB) | Base Framework | Agg via base WL3-Bundle |
| MF: wCM(85+86) (3.MMB+4.MFB) | Mid-Framework | Agg via mid WL3-Bundle |
| TF: wCM(93+94) (5.TCB+6.TFB) | Top-Framework | Agg via top WL3-Bundle |
| XP: wCM(290) (1.BAB+3.MMB+5.TCB) | Fractal2-XP | Fractal2-Execution Pylon: Agg via WL1, WL2 |
| FP: wCM(300) (2.BFB+4.MFB+6.TFB) | Fractal2-FP | Fractal2-Failover Pylon: Agg via WL4 |
| XP+FP: wCM(290+300) | Fractal2-HCS | Fractal2 Hierarchical Core Structure |

From a hardware configuration point of view, the preferred Fractal2-HCS is basically equipped with multiple 1D-Segs, 2D-Polygons, 3D-Aligns, together with mid-level mWSA8(i) and top-level cWSA2(i), all of which are bottom-up hierarchically aggregated via standard workgroup linkages from WL1 to WL4. The newly-defined m1, m2, m3 parameters are to denote that there are m1-number of 1D-Segs, m2-number of 2D-Polygons and m3-number of 3D-Aligns in the Fractal2-HCS, which can be expandable in numbers for real-time duplications of 1D/2D/3D HCSs and also can be real-time reduced in numbers when the duplications are done one at a time and ready for aggregation into building other Task2-based HCSs.

In conclusion, the Fractal2-HCS is created based on the Hardware architecture theory of the workgroup first-generation eighth stage-based Task2 Production Entity architecture, i.e., HAT of wG1.8-EA.

5.2 Assembly wEntities/wSystems: Rt-Diverse Job Assembly (Ja)wEA/wSD 5.2.1 Rationale In a real world multi-production collaborative assembly environment, an ideal assembly facility comprising multiple assembly workgroups and assembly equipments must achieve its ultimate objective; that is "to real-time assemble a series of "diverse" multi-product packages with efficiency and effectiveness". In order to achieve that ultimate objective, it is imperative that the following 6 sequential courses of action be carried out.

The first course of action is to establish an execution-based assembly-unit workgroup and equip it with the first basic assembly execution equipment that is integrated by using the ideal "production execution units" for achieving the assembly efficiency.

Since the assembly-unit execution workgroup is set up to "control" multiple production-execution units with assembly efficiency, it is advisable to abide by the bottom-up hierarchical control principle. Multiple different-complex-level Task1-production-execution-units can first be lined up as the "base-side", which can then be encapsulated by mid-level "data-item packages exchange conveyer" and further be controlled by top-level multiple production execution units lined-up as the "top-side", thereby creating the first hierarchical "2-sided" basic assembly execution unit equipment.

This basic "assembly execution unit" will be efficient in generating the most diverse data-product packages based on the multiplication factor of each involved base-side production-unit's product-line complex variety for each top-side production-unit to generate an even more complex new product-line with more complex variety.

Moreover, the assembly-unit execution workgroup is thus well-organized and well-equipped by combining all the involved production workgroups in the Task1-based production execution units and the top-side top-level controllers will become the overall assembly-unit controllers for external Request&Reply (R&R) workgroup "assembly execution operations, which can be dubbed as Job1 operations.

The second course of action is to establish a supervision-based assembly-unit workgroup and equip it with the first basic supervision equipment that is integrated by using the ideal "production supervision units" for achieving the assembly effectiveness. (Glue2)

Based on the same bottom-up hierarchical control principle, the first hierarchical "2-sided" basic "assembly supervision unit" can be created with assembly effectiveness by using multiple Task2 production-supervision-units.

Moreover, the assembly-unit supervision workgroup is thus well-organized and well-equipped by combining all the involved production workgroups in the Task2-based production supervision units and the top-side top-level controllers will become the overall assembly-unit controllers for external Question&Answer (Q&A) workgroup assembly supervision operations, which can be dubbed as Job2 operations.

The third course of action is to establish a multi-assembly-execution-unit-integrated assembly-line workgroup for achieving the assembly-line efficiency.

Based on the bottom-up hierarchical control principle, the bottom-tier Job1-assembly-unit can be vertically multi-linked with the top-tier Job1-assembly-unit by combining top-side production units' conveyers of the base-tier assembly unit with the base-side production units' conveyers of the top-tier assembly-unit. Each vertical linkage can be dubbed as the "vertical bonding" process, which can be illustrated by mWSA8 in FIG. 3. Consequently, multiple "vertical bonding" processes will strengthen the overall "2-tier" assembly-line structure, speed up the interface between the bottom-tier and the top-tier via the prolonged conveyer and most importantly, generate more diverse data-product packages from the top-tier assembly-unit. This 2-tier Job1-assembly-line can further be expanded into "multi-tier Job1-assembly-line" via vertical bonding with multiple Job1-assembly-units and generate even more diverse data-product packages with efficiency.

The fourth course of action is to establish a multi-assembly-supervision-unit-integrated assembly-line workgroup for achieving the assembly-line effectiveness.

Based on the bottom-up hierarchical control principle, the bottom-tier Job2-assembly-unit can be vertically bonded with the top-tier Job2-assembly-unit, creating the 2-tier Job2-assembly-line. Furthermore, this 2-tier Job2-assembly-line can be expanded into "multi-tier Job2-assembly-line" via vertical bonding with multiple Job2-assembly-units, generating more sophisticated support and supervision information libraries for even more diverse data-product packages with effectiveness.

The fifth course of action is to horizontally combine two multi-tier assembly-execution lines into an "assembly-execution block" and further consolidate the on-going extending block into one assembly-tree workgroup for achieve assembly-tree efficiency.

In order to combine two multi-tier Job1-assembly-lines, the basic "2-sided" Job1 assembly units need to evolve into "3-sided" ones, which is equipped with another Task1-production-units lined up as the "left-side" or the "right-side". This third side will provide the base-side with more materials and the top-side with more semi-products via the mid-level data-item package exchange conveyer. When a "3-sided" multi-tier Job1 assembly-line on the left and a "3-sided" multi-tier job1-assembly-line are aligned together with the same number of tiers, the right-sided Task1-conveyers of the assembly-units on the left can be horizontally bonded with the left-sided Task1-conveyers of the assembly-units on the right. Each horizontal linkage can be dubbed as the "horizontal bonding" process, which can be illustrated by mWSA8 in FIG. 3. Consequently, multiple "horizontal bonding" processes will strengthen two same-tiered assembly-line structures into an "assembly-block of 2-lines" structure with faster interfaces between these two assembly-lines via the prolonged conveyer and most importantly, generate more diverse data-product packages from the top-tier assembly-units.

In order to combine more than two multi-tier Job1 assembly-lines, a "4-sided" Job1-assembly unit needs to be created with both "Task1 left-side" and "Task1 right-side" added via mid-level conveyer to the "2-sided" Job1-assembly unit. When multiple m-tiered "4-sided" assembly-lines with the same height are horizontally bonded, a "Job1-assembly-block of n-assembly lines, i.e., Job1-(m-tiers/n-lines) Assembly-Block can be formed.

Furthermore, for top-tier control purpose, it is imperative that single or multiple m-tiered assembly lines and a Job1-(m/n) Assembly Block be consolidated into one tree-top-tier assembly unit, so that external R&Rs can be carried out for all the involved assembly lines, thereby creating a X-tiered (X=m+x additional-tiers, m>=1) Job1-assembly-tree, i.e., Job1-(X-tiers/Y-lines>n) assembly-tree.

The sixth course of action is to create Job2-(m/n) Assembly-Blocks and Job2-(X/n) Assembly-Trees, based on the same Job1's procedures in creating Assembly-Blocks and Assembly-Trees.

5.2.2 wEA: 6-wBBB (HCS/EDS) Job-wEntities

Based on the aforementioned rational courses of action for creating Job1 (i.e., workgroup-assembly execution) based and Job2 (i.e., workgroup assembly supervision) based workgroup systems to equip an ideal collaborative assembly facility with automation and together with the usage of workgroup task-based wG1-(tp)wEAs, the third workgroup evolutionary principle (wEP3) is thus established to bring forth the second-generation "assembly facility-based" workgroup-Entity Architecture (wG2-wEA) that comprises the following 6 mandates for creating all the potential workgroup-assembly-based Job-wEntities.

Mandate-1: the must-have 6 Job-wEntity-based workgroup Basic Building Blocks (Job-6BBBs), which can be constructed by using the standard Task-HCSs, as illustrated from FIG. 7 to FIG. 14;

Mandate-2: the must-have Job-wEntity-based Hierarchical Core Structure (Job-HCS) by aggregating Job-6BBBs with workgroup four linkages, i.e., WL1 to WL4;

Mandate-3: the must-have iterative Job-wEntity-based Hardware Architecture Theory (Job-HAT) with related methods in constructing Job-6BBBs and in aggregating them into Job-HCSs;

Mandate-4: the must-have Job-wEntity-oriented OSs (Job-OS) to equip Job-HCS into Job-wEntity Core Structure (Job-ECS);

Mandate-5: the must-have Job-wEntity-oriented domain programs (Job-DPs) to equip Job-ECS into Job-wEntity Domain Structure (Job-EDS); and Mandate-6: the must-have iterative Job-wEntity-based Software Architecture Theory (Job-SAT) with related software methods in generating the Job-OS and Job-DPs.

5.2.3 wTF-HATs

Therefore, by abiding the third mandate of wG2-(ja)wEA, the second generation Theoretic Foundation (wTF3.wG2.stages) can be derived, which contains a number of Job-wEntity-based stage-iterative Hardware Architecture Theories (Job-HATs). Each HAT comprises multiple Hardware Construction Methods (HCMs) in creating Job-6BBBs and multiple Hardware Aggregation Methods (HAMs) in creating Job-HCSs in each stage.

5.2.4 wTF-SATs

In addition, by abiding the sixth mandate, the second generation workgroup Theoretic Foundation (wTF3.wG2.stages) can be extended to include a number of Job-wEntity-oriented stage-iterative Software Architecture Theories (Job-SATs). Each SAT comprises multiple Job-wEntity OS-oriented software Integration Methods (EIMs) in generating Job-OSs and Job-wEntity domain-oriented software Programming Methods (EPMs) in real-time generating Job-DPs in each stage.

5.2.5 Preferred 8 Standard Job-wEntities

It can be concluded that by fulfilling the second-generation Job-wEntity-based Architecture (i.e., wG2-wEA) and carrying out wTF3.wG2.stages-(HATs/SATs), a series of stage-evolved "fail-safe" Job-wEntities with various degrees of real-time diverse workgroup assembly can be created. In addition, based on the aforementioned standard Task1-wEntities and Task2-wEntities as the basic components to warrant the solidity and completeness of wG2-wEA, there are 8 standard stages in creating wG2.1 to wG2.8 "fail-safe" Job1-wEntities and Job2-wEntities with different levels of real-time workgroup assembly diversity, due to 3 standard workgroup assembly-based Hierarchical Core Structures (HCSs) from assembly units, assembly-lines to assembly trees, as illustrated from FIG. 15 to FIG. 22.

5.2.6 Preferred 8 Real-Time Diverse Job-Assembly wSystems

Furthermore, all these 8 standard Job-wEntities can further be built into real-world "standardized real-time diverse Job-Assembly wSystems" based on wG2 job-assembly System Disciplines (wG2-jaSD), which will populate the second generation of real-world service-oriented workgroup evolutionary pathway and eventually achieve the ideal real-world assembly facility's ultimate objective, as defined earlier.

FIG. 25 Chain2 (Job1-Assembly-Unit)-HCS

As shown in FIG. 25, a preferred 6-wBBB-architected 2Side Chain2 Job1-assembly-unit based HCS is created, where 1.BAB, 2.BFB, 3.MMB, 4.MFB, 5.TCB and 6.TFB are constructed by using Task1-based wCCs and wCMs, from Array to preferred Fractal1, as illustrated by the following HCM-6 Table.

| HCM-6: 6BBB | wCCs+ wCMs | Abbr. Name | Description |
|---|---|---|---|
| 1.BAB= | | | Base Attribute Block |
| | wCM(270) | Fractal1-XP(1-i) | Fractal1-Execution Pylon(1-i) |
| 2.BFB= | | | Base Failover Block |
| | wCM(280) | Fractal1-FP(1-i) | Fractal1-Failover Pylon(1-i) |
| | wCC(9) | TaP1m(1-2) | Team attribute Processor manager(1-2) |
| 3.MMB= | | | Mid Memory Block |
| | wCM(83) | (u/d)-mWSA7p1 | (up/down)-memory Workgroup Server Array version7/part1 |
| | wCM(75) | mW SA3 pl | memory Workgroup Server Array type2 version3/part1 |
| 4.MFB= | | | Mid Failover Block |
| | wCM(84) | (u/d)-mWSA7p2 | (up/down)-memory Workgroup Server Array version7/part2 |
| | wCM(76) | mWSA3p2 | memory Workgroup Server Array type2 version3/part2 |
| | wCC(29) | TmP1m(1-2) | Team memory Processor manager type1 (1-2) |
| 5.TCB= | | | Top Control Block |
| | wCM(270) | Fractal1-XP(1-i) | Fractal1-Execution Pylon(1-i) |
| | wCC(5) | WEC | Workgroup Ethernet Controller |
| 6.TFB= | | | Top Failover Block |
| | wCM(280) | Fractal1-FP(1-i) | Fractal1-Failover Pylon(1-i) |
| | wCC(49) | TcP1m(1-2) | Team control Processor manager(1-2) |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Chain2-HCS=wCM(310+320), as illustrated by the following HAM-5 Table.

| HAM-5 Module: wCM( ) | Abbr. Name | Description |
|---|---|---|
| BF: wCM( ) (1.BAB+2.BFB) | Base Framework | Agg via base WL3-Bundle |
| MF: wCM( ) (3.MMB+4.MFB) | Mid-Framework | Agg via mid WL3-Bundle |
| TF: wCM() (5.TCB+6.TFB) | Top-Framework | Agg via top WL3-Bundle |
| XP: wCM(310) (1.BAB+3.MMB+5.TCB) | Chain2-XP | Chain2-Execution Pylon: Agg via WL1, WL2 |
| FP: wCM(320) (2.BFB+4.MFB+6.TFB) | Chain2-FP | Chain2-Failover Pylon: Agg via WL4 |
| XP+FP: wCM(310+320) | Chain2-HCS | Chain2 Hierarchical Core Structure |

For real-time hardware "expansion" purposes, the preferred Chain2-HCS is equipped with Fractal1 wEntities, i.e., wCMs(270/280). However, any Task1-wEntities can be used as the basic wCMs, (i.e., 150/160, 190/200, 230/240) to construct new sets of BABs and TCBs, generating various Chain2-HCSs from the small to the large for different real-time accommodation purposes.

In conclusion, the Chain2-HCS is created based on the Hardware architecture theory of the workgroup second-generation first stage-based Job Assembly Entity architecture, i.e., HAT of wG2.1-EA.

FIG. 26 Glue2 (Job2-Assembly-Unit)-HCS

As shown in FIG. 26, a preferred 6-wBBB-architected 2Side Glue2 Job2-assembly unit based HCS is created, where BAB, 2.BFB, 3.MMB, 4.MFB, 5.TCB and 6.TFB are constructed by using Task2-based wCCs and wCMs, from Seg to preferred Fractal2, as illustrated by the following HCM-6 Table.

| HCM-6: 6BBB | wCCs+ wCMs | Abbr. Name | Description |
|---|---|---|---|
| 1.BAB= | | | Base Attribute Block |
| | wCM(290) | Fractal2-XP(1-i) | Fractal2-Execution Pylon(1-i) |
| 2.BFB= | | | Base Failover Block |
| | wCM(300) | Fractal2-FP(1-i) | Fractal2-Failover Pylon(1-i) |
| | wCC(9) | TaP1m(1-2) | Team attribute Processor manager(1-2) |
| 3.MMB= | | | Mid Memory Block |
| | wCM(83) | (u/d)-mWSA7p1 | (up/down)-memory Workgroup Server Array version7/part1 |
| | wCM(75) | mWSA3p1 | memory Workgroup Server Array version3/part1 |
| 4.MFB= | | | Mid Failover Block |
| | wCM(84) | (u/d)-mWSA7p2 | (up/down)-memory Workgroup Server Array version7/part2 |
| | wCC(29) | TmP1m(1-2) | Team memory Processor manager type1 (1-2) |
| | wCM(76) | mWSA3p2 | memory Workgroup Server Array version3/part2 |
| 5.TCB= | | | Top Control Block |
| | wCM(290) | Fractal2-XP(1-i) | Fractal2-Execution Pylon(1-i) |
| | wCC(5) | WEC | Workgroup Ethernet Controller |
| 6.TFB= | | | Top Failover Block |
| | wCM(300) | Fractal2-FP(14) | Fractal2-Failover Pylon(1-i) |
| | wCC(49) | TcP1m(1-2) | Team control Processor manager(1-2) |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Glue2-HCS=wCM(330+340), as illustrated by the following HAM-5 Table.

| HAM-5 Module: wCM( ) | Abbr. Name | Description |
|---|---|---|
| BF: wCM( ) (1.BAB+2.BFB) | Base Framework | Agg via base WL3-Bundle |
| MF: wCM( ) (3.MMB+4.MFB) | Mid-Framework | Agg via mid WL3-Bundle |
| TF: wCM( ) (5.TCB+6.TFB) | Top-Framework | Agg via top WL3-Bundle |
| XP: wCM(330 (1.BAB+3.MMB+5.TCB) | Glue2-XP | Glue2-Execution Pylon: Agg via WL1, WL2 |
| FP: wCM(340) (2.BFB+4.MFB+6.TFB) | Glue2-FP | Glue2-Failover Pylon: Agg via WL4 |
| XP+FP: wCM(330+340) | Glue2-HCS | Glue2 Hierarchical Core Structure |

For real-time hardware "expansion" purposes, the preferred Glue2-HCS is equipped with Fractal2 wEntities, i.e., wCMs(290/300). However, any Task2-wEntities can be used as the basic wCMs, (i.e., 170/180, 210/220, 250/260) to construct new sets of BABs and TCBs, generating various Glue2-HCSs from the small to the large for different real-time accommodation purposes.

In conclusion, the Glue2-HCS is created based on the Hardware architecture theory of the workgroup second-generation second stage-based Job2 Assembly Entity architecture, i.e., HAT of wG2.2-EA.

FIG. 27 Chain3 (Job1-HCS

As shown in FIG. 27, a preferred 6-wBBB-architected 3 Side Chain3 Job1-assembly unit based HCS is created, where 1.BAB, 2.BFB, 3.MMB, 4.MFB, 5.TCB and 6.TFB are constructed by using Task1-based wCCs and wCMs, from Array to preferred Fractal1, as illustrated by the following HCM-6 Table.

| HCM-6: 6BBB | wCCs+ wCMs | Abbr. Name | Description |
|---|---|---|---|
| 1.BAB= | | | Base Attribute Block |
| | wCM(270) | Fractal1-XP(1-i) x 2 sides | 2 sides of Fractal1-Execution Pylon(1-i) |
| 2.BFB= | | | Base Failover Block |
| | wCM(280) | Fractal1-FP(1-i) x 2 sides | 2 sides of Fractal1-Failover Pylon(1-i) |
| | wCC(9) | TaP1m(1-2) | Team attribute Processor manager(1-2) |
| 3.MMB= | | | Mid Memory Block |
| | wCM(83) | (u/d/L)-mWSA7p1 | (up/down/Left)- memory Workgroup Server Array type2 version7/part1 |
| | wCM(75) | mWSA3p1 | memory Workgroup Server Array version3/part1 |
| 4.MFB= | | | Mid Failover Block |
| | wCM(84) | (u/d/L)-mWSA7p2 | (up/down/Left)-memory Workgroup Server Array type2 version7/part2 |
| | wCM(76) | mWSA3p2 | memory Workgroup Server Array version3/part2 |
| | wCC(29) | TmP1m(1-2) | Team memory Processor manager type1(1-2) |
| 5.TCB= | | | Top Control Block |
| | wCM(270) | Fractal1-XP(1-i) | Fractal1-Execution Pylon(1-i) |
| | wCC(5) | WEC | Workgroup Ethernet Controller |
| 6.TFB= | | | Top Failover Block |
| | wCM(280) | Fractal1-FP(1-i) | Fractal1-Failover Pylon(1-i) |
| | wCC(49) | TcP1m(1-2) | Team control Processor manager(1-2) |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Chain3-HCS=wCM(350+360), as illustrated by the following HAM-5 Table.

| HAM-5 Module: wCM( ) | Abbr. Name | Description |
|---|---|---|
| BF: wCM( ) (1.BAB+2.BFB) | Base Framework | Agg via base WL3-bundle |
| MF: wCM( ) (3.MMB+4.MFB) | Mid-Framework | Agg via mid WL3-bundle |
| TF: wCM( ) (5.TCB+6.TFB) | Top-Framework | Agg via top WL3-bundle |
| XP: wCM(350) (1.BAB+3.MMB+5.TCB) | Chain3-XP | Chain3-Execution Pylon: Agg via WL1, WL2 |
| FP: wCM(360) (2.BFB+4.MFB+6.TFB) | Chain3-FP | Chain3-Failover Pylon: Agg via WL4 |
| XP+FP: wCM(350+360) | Chain3-HCS | Chain3 Hierarchical Core Structure |

For real-time hardware "expansion" purposes, the preferred Chain3-HCS is equipped with Fractal1 wEntities, i.e., wCMs(270/280). However, any Task1-wEntities can be used as the basic wCMs, (i.e., 150/160, 190/200, 230/240) to construct new sets of BABs and TCBs, generating various Chain2-HCSs from the small to the large for different real-time accommodation purposes.

In conclusion, the Chain3-HCS is created based on the Hardware architecture theory of the workgroup second-generation third stage-based Job1 Assembly Entity architecture, i.e., HAT of wG2.3-EA.

FIG. 28 Glue3 (Job2-Assembly-Unit)-HCS

As shown in FIG. 28, a preferred 6-wBBB-architected 3 Side-QA Glue3 Job2-assembly-unit based HCS is created, where 1.BAB, 2.BFB, 3.MMB, 4.MFB, 5.TCB and 6.TFB are constructed by using Task2-based wCCs and wCMs, from Seg to preferred Fractal2, as illustrated by the following HCM-6 Table.

| HCM-6 6BBB | wCCs + wCMs | Abbr. Name | Description |
|---|---|---|---|
| 1. BAB= | | | Base Attribute Block |
| | wCM (290) | Fractal2-XP (1-i) x 2 sides | 2 sides of Fractal2-Execution Pylon (1-i) |
| 2. BFB= | | | Base Failover Block |
| | wCM (300) | Fractal2-FP (1-i) x 2 sides | 2 sides of Fractal2-Failover Pylon (1-i) |
| | wCC (9) | TaP1m (1-2) | Team attribute Processor manager (1-2) |
| 3. MMB= | | | Mid Memory Block |
| | wCM (83) | (u/d/r)-mWSA7p1 | (up/down/right)-memory Workgroup Server Array version7/part1 |
| | wCM (75) | mWSA3p1 | memory Workgroup Server Array version3/part1 |
| 4. MFB= | | | Mid Failover Block |
| | wCM (84) | (u/d/r)-mWSA7p2 | (up/down/right)-memory Workgroup Server Array version7/part2 |
| | wCC (29) | TmP1m (1-2) | Team memory Processor manager type1 (1-2) |
| | wCM (76) | mWSA3p2 | memory Workgroup Server Array version3/part2 |

-continued

| HCM-6 6BBB | wCCs + wCMs | Abbr. Name | Description |
|---|---|---|---|
| 5. TCB= | | | Top Control Block |
| | wCM (290) | Fractal2-XP (1-i) | Fractal2-Execution Pylon (1-i) |
| | wCC (5) | WEC | Workgroup Ethernet Controller |
| 6. TFB= | | | Top Failover Block |
| | wCM (300) | Fractal2-FP (1-i) | Fractal2-Failover Pylon (1-i) |
| | wCC (49) | TcP1m (1-2) | Team control Processor manager type1 (1-2) |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Glue3-HCS=wCM(3 70+3 80), as illustrated by the following HAM-5 Table.

| HAM-5 Module: wCM ( ) | Abbr. Name | Description |
|---|---|---|
| BF: wCM ( ) (1. BAB + 2. BFB) | Base-Framework | Agg via base WL3-bundle |

-continued

| HAM-5 Module: wCM ( ) | Abbr. Name | Description |
|---|---|---|
| MF: wCM ( ) (3. MMB + 4. MFB) | Mid-Framework | Agg via mid WL3-bundle |
| TF: wCM ( ) (5. TCB + 6. TFB) | Top-Framework | Agg via top WL3-bundle |
| XP: wCM (370 (1. BAB + 3. MMB + 5. TCB) | Glue3-XP | Glue3-Execution Pylon: Agg via WL1, WL2 |
| FP: wCM (380) (2. BFB + 4. MFB + 6. TFB) | Glue3-FP | Glue3-Failover Pylon: Agg via WL4 |
| XP + FP: wCM (370 + 380) | Glue3-HCS | Glue3 Hierarchical Core Structure |

For real-time hardware "expansion" purposes, the preferred Glue3-HCS is equipped with Fractal2 wEntities, i.e., wCMs(290/300). However, any Task2-wEntities can be used as the basic wCMs, (i.e., 170/180, 210/220, 250/260) to construct new sets of BABs and TCBs, generating various Glue3-HCSs from the small to the large for different real-time accommodation purposes.

In conclusion, the Glue3-HCS is created based on the Hardware architecture theory of the workgroup second-generation fourth stage-based Job2 Assembly Entity architecture, i.e., HAT of wG2.4-EA.

FIG. 29 Chain4 (Job1-Assembly-Unit)-HCS

As shown in FIG. 29, a preferred 6-wBBB-architected 4Side Chain4 Job1-assembly-unit based HCS is created, where 1.BAB, 2.BFB, 3.MMB, 4.MFB, 5.TCB and 6.TFB are constructed by using Task1-based wCCs and wCMs, from Array to preferred Fractal1, as illustrated by the following HCM-6 Table.

| HCM-6: 6BBB | wCCs + wCMs | Abbr. Name | Description |
|---|---|---|---|
| 1. BAB= | | | Base Attribute Block |
| | wCM (270) | Fractal1-XP (1-i) | Fractal1-Execution Pylon (1-i) |
| 2. BFB= | | | Base Failover Block |
| | wCM (280) | Fractal1-FP (1-i) | Fractal1-Failover Pylon (1-i) |
| | wCC (9) | TaP1m (1-2) | Team attribute Processor manager (1-2) |
| 3. MMB= | | | Mid Memory Block |
| | wCM (83) | (u/d/L/r)-mWSA7p1 | (up/down/Left/right)-memory Workgroup Server Array version7/part1 |
| | wCM (75) | mWSA3p1 | memory Workgroup Server Array version3/part1 |
| 4. MFB= | | | Mid Failover Block |
| | wCM (84) | (u/d/L/r)-mWSA7p2 | (up/down/Left/right)-memory Workgroup Server Array version7/part2 |
| | wCC (29) | TmP1m (1-2) | Team memory Processor manager type1 (1-2) |
| | wCM (76) | mWSA3p2 | memory Workgroup Server Array version3/part2 |
| 5. TCB= | | | Top Control Block |
| | wCM (270) | Fractal1-XP (1-i) | Fractal1-Execution Pylon (1-i) |
| | wCC (5) | WEC | Workgroup Ethernet Controller |
| 6. TFB= | | | Top Failover Block |
| | wCM (280) | Fractal1-FP (1-i) | Fractal1-Failover Pylon (1-i) |
| | wCC (49) | TcP1m (1-2) | Team control Processor manager type1 (1-2) |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Chain4-HCS=wCM(390+400), as illustrated by the following HAM-5 Table.

| HAM-5 Module: wCM ( ) | Abbr. Name | Description |
|---|---|---|
| BF: wCM ( ) (1. BAB + 2. BFB) | Base Framework | Agg via base WL3-bundle |
| MF: wCM ( ) (3. MMB + 4. MFB) | Mid-Framework | Agg via mid WL3-bundle |
| TF: wCM ( ) (5. TCB + 6. TFB) | Top-Framework | Agg via top WL3-bundle |
| XP: wCM (390) (1. BAB + 3. MMB + 5. TCB) | Chain4-XP | Chain4-Execution Pylon: Agg via WL1, WL2 |
| FP: wCM (400) (2. BFB + 4. MFB + 6. TFB) | Chain4-FP | Chain4-Failover Pylon: Agg via WL4 |
| XP + FP: wCM (390 + 400) | Chain4-HCS | Chain4 Hierarchical Core Structure |

For real-time hardware "expansion" purposes, the preferred Chain4-HCS is equipped with Fractal1 wEntities, i.e., wCMs(270/280). However, any Task1-wEntities can be used as the basic wCMs, (i.e., 150/160, 190/200, 230/240) to construct new sets of BABs and TCBs, generating various Chain4-HCSs from the small to the large for different real-time accommodation purposes.

In conclusion, the Chain4-HCS is created based on the Hardware architecture theory of the workgroup second-generation fifth stage-based Job1 Assembly Entity architecture, i.e., HAT of wG2.5-EA.

FIG. 30 Glue4 (Job2-Assembly-Unit)-HCS

As shown in FIG. 30, a preferred 6-wBBB-architected 4Side Glue4 Job2-assembly-unit based HCS is created, where 1.BAB, 2.BFB, 3.MMB, 4.MFB, 5.TCB and 6.TFB are constructed by using Task2-based wCCs and wCMs, from Seg to preferred Fractal2, as illustrated by the following HCM-6 Table.

| HCM-6: 6BBB | wCCs + wCMs | Abbr. Name | Description |
|---|---|---|---|
| 1. BAB= | | | Base Attribute Block |
| | wCM (290) | 3 x Fractal2-XP (1-i) | 3-side x Fractal2-Execution Pylon (1-i) |
| 2. BFB= | | | Base Failover Block |
| | wCM (300) | 3 x Fractal2-FP (1-i) | 3-side x Fractal2-Failover Pylon (1-i) |
| | wCC (9) | TaP1m (1-2) | Team attribute Processor manager (1-2) |
| 3. MMB= | | | Mid Memory Block |
| | wCM (83) | (u/d/L/r)-mWSA7p1 | (up/down/Left/right)-4 side memory Workgroup Server Array version7/part1 |
| | wCM (75) | mWSA3p1 | Inner 4-side memory Workgroup Server Array version3/part1 |
| 4. MFB= | | | Mid Failover Block |
| | wCM (84) | (u/d/L/r)-mWSA7p2 | (up/down/Left/right)-memory Workgroup Server Array version7/part2 |
| | wCC (29) | TmP1m (1-2) | Team memory Processor manager type1 (1-2) |
| | wCM (76) | mWSA3p2 | memory Workgroup Server Array version3/part2 |
| 5. TCB= | | | Top Control Block |
| | wCM (290) | Fractal2-XP (1-i) | Fractal2-Execution Pylon (1-i) |
| | wCC (5) | WEC | Workgroup Ethernet Controller |
| 6. TFB= | | | Top Failover Block |
| | wCM (300) | Fractal2-FP (1-i) | Fractal2-Failover Pylon (1-i) |
| | wCC (49) | TcP1m (1-2) | Team control Processor manager type1 (1-2) |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Glue4-HCS=wCM(410+420), as illustrated by the following HAM-5 Table.

| HAM-5 Module: wCM ( ) | Abbr. Name | Description |
|---|---|---|
| BF: wCM ( ) (1. BAB + 2. BFB) | Base Framework | Agg via base WL3-bundle |
| MF: wCM ( ) (3. MMB + 4. MFB) | Mid-Framework | Agg via mid WL3-bundle |
| TF: wCM ( ) (5. TCB + 6. TFB-L&R) | Top-Framework | Agg via top WL3-bundle |
| XP: wCM (410) (1. BAB + 3. MMB + 5. TCB) | Glue4-XP | Glue4-Execution Pylon: Agg via WL1, WL2 |
| FP: wCM (420) (2. BFB + 4. MFB + 6. TFB) | Glue4-FP | Glue4-Failover Pylon: Agg via WL4 |
| XP + FP: wCM (410 + 420) | Glue4-HCS | Glue4 Hierarchical Core Structure |

For real-time hardware "expansion" purposes, the preferred Glue4-HCS is equipped with Fractal2 wEntities, i.e., wCMs(290/300). However, any Task2-wEntities can be used as the basic wCMs, (i.e., 170/180, 210/220, 250/260) to construct new sets of BABs and TCBs, generating various Glue4-HCSs from the small to the large for different real-time accommodation purposes.

In conclusion, the Glue4-HCS is created based on the Hardware architecture theory of the workgroup second-generation sixth stage-based Job2 Assembly Entity architecture, i.e., HAT of wG2.6-EA.

FIG. 31 Job1-Assembly-Line/Block/Tree HCSs

As shown in FIG. 31, a preferred 2-sided Job1-Assembly-line a part of Job1-Ribbon1 (R1) with m=3 tiers, a preferred Job1-Assembly-Block with m=3 tiers and n=5 assembly-lines (R2-R6) and a preferred Job1-assembly-tree with m=5 tiers and n=6 assembly-lines are illustrated. Moreover, the 6-wBBB architected Job1-Assembly-Tree (m=5 tiers, n=6 lines) based HCS is created, where 1.BAB, 2.BFB, 3.MMB, 4.MFB, 5.TCB and 6.TFB are constructed by Task1-production unit based wCCs and wCMs, from Array to preferred Fractal1, as illustrated by the following HCM-6 Table.

| HCM-6: 6BBB | wCCs + wCMs | Abbr. Name | Description |
|---|---|---|---|
| 1. BAB= | | | Base Attribute Block |
| | wCM (270) | Fractal1-XP (1-i) x 3 sides | 3 sides of Fractal1-Execution Pylon (1-i) |
| | wCM (310) | Chain2-XP x3 | 3 units of Chain2-Execution Pylon |
| | wCM (350) | Chain3-XP x8 | 8 units of Chain3-Execution Pylon |
| | wCM (390) | Chain4-XP x10 | 10 units of Chain4-Execution Pylon |
| 2. BFB= | | | Base Failover Block |
| | wCM (280) | Fractal1-FP (1-i) x 3 sides | 3 sides of Fractal1-Failover Pylon (1-i) |
| | wCM (320) | Chain2-FP x3 | 3 units of Chain2-Execution Pylon |
| | wCM (360) | Chain3-FP x8 | 8 units of Chain3-Failover Pylon |
| | wCM (400) | Chain4-FP x10 | 10 units of Chain4-Failover Pylon |
| | wCC (9) | TaP1m (1-2) | Team attribute Processor manager (1-2) |
| 3. MMB= | | | Mid Memory Block |
| | wCM (75) | mWSA3p1 | 4-sided memory Workgroup Server Array version3/part1 |
| | wCM (83) | mWSA7p1 (u, d, L, r) | Up/down/left/right memory Workgroup Server Array version7/part1 |
| 4. MFB= | | | Mid Failover Block |
| | wCM (76) | mWSA3p2 | 4-sided memory Workgroup Server Array version3/part2 |
| | wCM (84) | mWSA7p2 (u, d, L, r) | Up/down/left/right memory Workgroup Server Array version7/part2 |
| | wCC (29) | TmP1m (1-2) | Team memory Processor manager type1 (1-2) |
| 5. TCB= | | | Top Control Block |
| | wCM (270) | Fractal1-XP (1-i) | Fractal1-Execution Pylon (1-i) |
| | wCC (5) | WEC | W1-Workgroup Ethernet Controller |
| 6. TFB= | | | Top Failover Block |
| | wCM (280) | Fractal1-FP (1-i) | Fractal1-Failover Pylon (1-i) |
| | wCC (49) | TcP1m (1-2) | Team control Processor manager (1-2) |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Job1-Assembly-Tree HCS=wCM(430+440), as illustrated by the following HAM-5 Table.

| HAM-5 Module: wCM ( ) | Abbr. Name | Description |
|---|---|---|
| BF: wCM ( ) (1. BAB + 2. BFB) | Base Framework | Agg via base WL3-bundle |
| MF: wCM ( ) (3. MMB + 4. MFB) | Mid-Framework | Agg via mid WL3-bundle |
| TF: wCM ( ) (5. TCB + 6. TFB) | Top-Framework | Agg via top WL3-bundle |
| XP: wCM (430) (1. BAB + 3. MMB + 5. TCB) | Assembly1 XP | Job1-Assembly-Tree Execution Pylon: Agg via WL1, WL2 |
| FP: wCM (440) (2. BFB + 4. MFB + 6. TFB) | Assembly1 FP | Job1-Assembly-Tree Failover Pylon: Agg via WL4 |
| XP + FP: wCM (430 + 440) | Assembly1 HCS | Job1-Assembly-Tree Hierarchical Core Structure |

From the hardware configuration point of view, the Job1-Assembly-unit is composed of Task1 production units. Job1-assembly-line, i.e., the Job1-Ribbon1 is composed of Job1-assembly-units, i.e., Chain2, Chain3, etc. Job1-Assembly-Block is composed of Job1-assembly-lines with the same number of tiers. Job1-Assembly-Tree is composed of a base-level Job1-Assembly-Block and a top-level Job1 Assembly-unit with mid-level assembly-lines consolidating from n-line of base-level block to 1-line of top-level unit in additional tiers.

Any Job1-Assembly-line is a part of Job1-Ribbon, which can be extended with more hierarchical tiers, so that more top-level workgroup controllers can be involved in generating more diverse product-lines. This type of Job1-Ribbon extension via vertical bonding will still maintain the 6-BBB-architecture bottom-up Base-Mid-Top HAT methods, keeping the extended assembly-line with Job1 characteristics intact. Most importantly, any Job1-Assembly-Tree can also grow in tiers and lines and it is always conformed to the 6-BBB HAT methods, thereby keeping the Job1 characteristics intact.

In conclusion, the Job1-Assembly Line/Block/Tree HCSs are created based on the Hardware architecture theory of the workgroup second-generation seventh stage-based Job1 Assembly Entity architecture, i.e., HAT of wG2.7-EA.

FIG. 32 Job2-Assembly-Line/Block/Tree HCSs

As shown in FIG. 32, a preferred 2-sided Job2-Assembly-line is a part of Job2-Ribbon1(R1) with m=3 tiers, a preferred Job2-Assembly-Block with m=3 tiers and n=5 assembly-lines (R2-R6) and a preferred Job2-assembly-tree with m=5 tiers and n=6 assembly-lines) are illustrated. Moreover, the 6-wBBB-architected Job2-Assembly-Tree (m=5 tiers, n=6 lines) based HCS is created, where 1.BAB, 2.BFB, 3.MMB, 4.MFB, 5.TCB and 6.TFB are constructed by Task2-production unit based wCCs and wCMs, from Seg to Fractal2, as illustrated by the following HCM-6 Table.

| HCM-6: 6BBB | wCCs + wCMs | Abbr. Name | Description |
|---|---|---|---|
| 1. BAB= | | | Base Attribute Block |
| | wCM (290) | Fractal2-XP (1-i) x 3 sides | 3 sides of Fractal2-Execution Pylon (1-i) |
| | wCM (330) | Glue2-XP x3 | 3 units of Glue2-Execution Pylon |
| | wCM (370) | Glue3-XP x8 | 8 units of Glue3-Execution Pylon |
| | wCM (410) | Glue4-XP x10 | 10 units of Glue4-Execution Pylon |
| 2. BFB= | | | Base Failover Block |
| | wCM (300) | Fractal2-FP (1-i) x 3 sides | 3 sides of Fractal2-Failover Pylon (1-i) |
| | wCM (340) | Glue2-FP x3 | 3 units of Glue2-Execution Pylon |
| | wCM (380) | Glue3-FP x8 | 8 units of Glue3-Failover Pylon |
| | wCM (420) | Glue4-FP x10 | 10 units of Glue4-Failover Pylon |
| | wCC (9) | TaP1m (1-2) | Team attribute Processor manager (1-2) |
| 3. MMB= | | | Mid Memory Block |
| | wCM (75) | mWSA3p1 | 4-sided memory Workgroup Server Array version3/part1 |
| | wCM (83) | mWSA7p1 (u, d, L, r) | Up/down/left/right memory Workgroup Server Array version7/part1 |
| 4. MFB= | | | Mid Failover Block |
| | wCM (76) | mWSA3p2 | 4-sided memory Workgroup Server Array version3/part2 |
| | wCM (84) | mWSA7p2 (u, d, L, r) | Up/down/left/right memory Workgroup Server Array version7/part2 |
| | wCC (29) | TmP1m (1-2) | Team memory Processor manager type1 (1-2) |
| 5. TCB= | | | Top Control Block |
| | wCM (290) | Fractal2-XP (1-i) | Fractal2-Execution Pylon (1-i) |
| | wCC (5) | WEC | W1-Workgroup Ethernet Controller |
| 6. TFB= | | | Top Failover Block |
| | wCM (300) | Fractal2-FP (1-i) | Fractal2-Failover Pylon (1-i) |
| | wCC (49) | TcP1m (1-2) | Team control Processor manager (1-2) |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Job2-Assembly-Tree HCS=wCM(450+460), as illustrated by the following HAM-5 Table.

| HAM-5 Module: wCM ( ) | Abbr. Name | Description |
|---|---|---|
| BF: wCM ( ) (1. BAB + 2. BFB) | Base Framework | Agg via base WL3-bundle |
| MF: wCM ( ) (3. MMB + 4. MFB) | Mid-Framework | Agg via mid WL3-bundle |
| TF: wCM ( ) (5. TCB + 6. TFB) | Top-Framework | Agg via top WL3-bundle |
| XP: wCM (450) (1. BAB + 3. MMB + 5. TCB) | Assembly2-XP | Job2-Assembly-(Line/Block/Tree) Execution Pylon: Agg via WL1, WL2 |
| FP: wCM (460 (2. BFB + 4. MFB + 6. TFB) | Assembly2-FP | Job2-Assembly-(Line/Block/Tree) Failover Pylon: Agg via WL4 |
| XP + FP: wCM (450 + 460) | Assembly2-HCS | Job2-Assembly-(Line/Block/Tree) Hierarchical Core Structure |

From the hardware configuration point of view, the Job2-Assembly-unit is composed of Task2 production units. Job2-assembly-line is composed of Job2-assembly-units, i.e., Glue2, Glue3, etc. Job2-Assembly-Block is composed of Job2-assembly-lines with the same number of tiers. Job2-Assembly-Tree is composed of a Base-level Job2-Assembly-Block and a top-level Job2 Assembly-unit with mid-level assembly-lines consolidating from n-line of base Block to 1-line of top unit in additional tiers.

Any Job2-Assembly-line is a part of the Job2-Ribbon, which can be extended with more hierarchical tiers, so that more top-level workgroup controllers can be involved in generating more diverse product-lines. This type of Job2-Ribbon extension via vertical bonding will still maintain the 6-BBB-architecture bottom-up Base-Mid-Top HAT methods, keeping the extended assembly-line with Job2 characteristics intact. Most importantly, any Job2-Assembly-Tree can also grow in tiers and lines and it is always conformed to the 6-BBB HAT methods, thereby keeping the Job2 characteristics intact.

In conclusion, the Job2-Assembly Line/Block/Tree HCSs are created based on the Hardware architecture theory of the workgroup second-generation eighth stage-based Job2 Assembly Entity architecture, i.e., HAT of wG2.8-EA.

5.3 Fabrication wEntities/wSystems: rt-Dynamic Case Fabrication (cf)wEA/wSD 5.3.1 Rationale In a real world multi-assembly collaborative solution environment, an ideal solution facility comprising multiple solution workgroups and solution equipments must achieve its ultimate objective; that is “to real-time dynamically generate customized solutions with control-flow flexibility. In order to achieve this ultimate objective, it is imperative that the following 4 sequential courses of action be carried out.

The first course of action is to establish a solution workgroup and equip it with the first basic collaborative solution equipment that is integrated by using the simplest "assembly units" for achieving real-time dynamical generation of customized solutions by the solution controllers with closed-loop control-flow flexibility.

Since the first solution workgroup is set up to "control" both the assembly-execution units and assembly-supervision units, it is necessary to "horizontally bond" the simplest "4-sided" Job1 assembly-unit with the simplest "4-sided" job2 assembly-unit, together with "horizontally coupling" the only one internal Task1 production unit with the only one internal Task2 production unit. In so doing, a mixed-Job (m=1-tier/n=2-lines) assembly-block can be formed, which will be ideal as the base-level attribute portion for further mid-level conveyer to encapsulate and to allow the top-level control portion to manipulate.

The top control portion must have the following 3 job-assembly-lines. The first is the extension Job1-assembly-line, i.e., Job1-Ribbon to control the base-level job1-assembly-line, the second is the extension Job2-assembly-line, i.e., Job2-Ribbon to control the base-level Job2-assembly-line and the third is the solution assembly-line, i.e., Solution-Ribbon to control both the base-level Job1-assembly-line and Job2-assembly-line, forming a solution assembly-tree with y=3-assembly lines and x-tiers, where x>=2.

Then, the overall hierarchical solution-enabled structure comprises one base-level solution Job-(m=1, n=2) assembly-block, one top-level solution Job-(x>=2, y=3) assembly-tree and a mid-level conveyer with base-2 and top-3 data-item exchange flow-routes, i.e., solution conveyer.

This first basic solution structure can then be dubbed as having a "hierarchical skeleton", where the base-level is based on one (m,n)assembly-block, the mid-level is based on one (b,t)assembly-conveyer and the top-control is based on one (x,y)assembly-tree. The hierarchical skeleton can be generically denoted as B(m,n)M(b,t)T(x,y).

Based on the solution controller's command, the top-level solution Job1-assembly-execution unit of the assembly-tree can dynamically generate the concurrent control flows by advancing (walking) thru the assembly-tree via conveyer to the assembly-block and return with customized solutions, which can be dubbed as "Case-Fabrication". Most importantly, along each closed-loop control flow-route, the overall solution supervision Job2 information for routines/results/reports will be also generated in the related real-time libraries with the current best routine/result/performance will be readily available for Q&A by the controller for embarking the next customized Case-Fabrication with dynamism.

Most importantly, it can be concluded that any real-time dynamic generation of "Case Fabrication Solutions" can only be achieved on "a living skeleton" that comprises a base-assembly-block, a mid-assembly-conveyer and a top-Assembly-tree, due to the fact that closed-loop control flows can generate immediate solutions and multiple immediate solutions can also be combined into a bigger solution by "control-flow walking" along all the involved closed-loops and processing based on the inter-related intermediate control-message and data-packages stored in the horizontal-bonding interface buffers.

The second course of action is to evolve the basic solution skeleton B(1,2)M(2,3)T(2,3) with multiple Task1-production units and multiple Task2 production units, creating the basic complicated solution skeleton B(1,2)M(2,3)T(2,3).

The third course of action is to use the multiple basic complicated solution skeletons to form a (m tiers/n=2-lines) Assembly-block and further to use a mid-level solution conveyer and a top-level solution (x>=2 tiers/y=2-lines) Assembly-tree, together creating the first iterated complex solution, i.e., $1s^{t}$-complex B(m,2)M(2,3)T(x,3).

The fourth course of action is to use multiple first-iterated complex solution skeletons to form a (m-tier/n=2-lines) Assembly-block and further to use a mid-level solution (B2T3) conveyer and a top-level solution (x>=2 tiers/y=2-lines) Assembly-tree, together creating the second iterated complex solution ($2^{n}$d-complex B(m,2)M(2,3)T(x,3). Furthermore, by continuing the iteration process, an n-iterated complex solution skeleton (nth-complex B(m,2)M(2,3)T(x, 3) can be created.

5.3.2 wEA: 6-wBBB (HCS/EDS) Case-wEntities

Based on the aforementioned rational courses of action for creating Case-Fabrication based workgroup Systems (wSystems) to equip an ideal collaborative Fabrication facility with automation and together with the usage of workgroup job assembly-based wG2-wEAs, the third workgroup evolutionary principle (wEP3) is thus established to bring forth the third-generation "solution-facility-based" workgroup Entity Architecture (wG3-wEA) that comprises the following 6 mandates for creating all the potential workgroup-fabrication-based "Case-wEntities".

Mandate-1: the must-have 6 Case-wEntity-based workgroup Basic Building Blocks (Case-6BBBs), which can be constructed by using the standard Job1-HCSs and Job2-HCSs, as illustrated from FIG. 15 to FIG. 22, together with standard WSAs;

Mandate-2: the must-have Case-wEntity-based Hierarchical Core Structure (Case-HCS) by aggregating Case-6BBBs with workgroup four linkages and bundles;

Mandate-3: the must-have iterative Case-wEntity-based Hardware Architecture Theory (Case-HAT) with related methods in constructing Case-6BBBs and in aggregating them into Case-HCSs;

Mandate-4: the must-have Case-wEntity-oriented OSs (Case-OS) to equip Case-HCS into Case-wEntity Core Structure (Case-ECS);

Mandate-5: the must-have Case-wEntity-oriented domain programs (Case-DPs) to equip Case-ECS into Case-wEntity Domain Structure (Case-EDS); and Mandate-6: the must-have iterative Case-wEntity-based Software Architecture Theory (Case-SAT) with related software methods in generating Case-OSs and Case-DPs.

5.3.3 wTF-HATs

Therefore, by abiding the third mandate of wG3-wEA, the third generation Theoretic Foundation (wTF3.wG3.stages) can be derived, which contains a number of Case-wEntity-based stage-iterative Hardware Architecture Theories (HATs). Each HAT comprises multiple Hardware Construction Methods (HCMs) in creating Case-6BBBs and multiple Hardware Aggregation Methods (HAMs) in creating Case-HCSs in each stage.

5.3.4 wTF-SATs

In addition, by abiding the sixth mandate of wG3-wEA, the third generation workgroup Theoretic Foundation (wTF3.wG3.stages) can be extended to include a number of Case-wEntity-based stage-iterative Software Architecture Theories (SATs). Each SAT comprises multiple Case-wEntity OS-oriented software Integration Methods (EIMs) in generating Case-OSs and multiple Case-wEntity domain-oriented software Programming Methods (EPMs) in real-time generating Case-DPs in each stage.

5.3.5 Preferred 4 Standard Case-wEntities

It can be concluded that by fulfilling the third-generation Case-wEntity-based Architecture (i.e., wG3-wEA) and carrying out wTF3.wG3.stages-(HATs/SATs), a series of stage-evolved "fail-safe" Case-wEntities with various degrees of real-time dynamic workgroup fabrication can be created. In addition, based on the aforementioned standard Job1-wEntities and Job2-wEntities as the basic components to warrant the solidity and completeness of wG3-wEA, there are 4 standard stages in creating wG3.1 to wG3.4 "fail-safe" Case-wEntities with 4 different levels of real-time dynamic solution flexibility, due to 4 standard workgroup fabrication-unit based Hierarchical Core Structures (HCSs) from Layers to Membranes, as illustrated from FIG. 23.*a&b* to FIG. 26.*a&b*.

5.3.6 Preferred 4 Real-Time Dynamic Case-Fabrication wSystems

Furthermore, all these 4 standard workgroup fabrication-unit-based Case-wEntities can further be built into real-world "standardized real-time dynamic Case-fabrication wSystems" based on wG3 case-fabrication System Disciplines (wG3-csSD), which will populate the third generation of real-world service-oriented workgroup evolutionary pathway and eventually achieve the ideal real-world solution facility's ultimate objective, as defined earlier.

FIG. 33 Layer1 (Case-Fabrication-Unit)-HCS

As shown in FIG. 33*a&b*, a preferred 6-wBBB-architected standard solution unit-based Layer1 Case-HCS is created, where 1.BAB, 2.BFB, 3.MMB, 4.MFB, 5.TCB and 6.TFB are constructed by using Job-HCSs, Task-HCSs and WSA-based wCCs and wCMs, as illustrated by the following HCM-6 Table.

| HCM-6: 6BBB | wCMs | Abbr. Name | Description |
|---|---|---|---|
| 1. BAB= | | | Base Attribute Block |
| | wCM (230) | Tie-XP | Tie-Execution Pylon |
| | wCM (250) | Align-XP | Align-Execution Pylon |
| | wCM (390) | 390-R1.1 | Chain4-Ribbon1.1-XP |
| | wCM (410) | 410-R2.1 | Glue4-Ribbon2.1-XP |
| 3. MMB= | | | Mid Memory Block |
| | wCM (77) | mWSA4p1 | memory Workgroup Server Array version4/part1 |
| | wCM (83) | mWSA7p1 (a-e) | memory Workgroup Server Array version7/part1 (a-e) |
| 5. TCB= | | | Top Control Block |
| | wCM (390) | 390-R1.2 | Chain4-Ribbon1.2-XP |
| | wCM (390) | 390-R3.(1-2) | Chain4-Ribbon3.(1-2)-XP |
| | wCM (410) | 410-R2.2 | Glue4-Ribbon2.2-XP |

| HCM-6: 6BBB | wCMs | Abbr. Name | Description |
|---|---|---|---|
| 2. BFB-L= | | | Base Failover Block-Left |
| | wCC (9) | TaP1m (1-2)-L | Team attribute Processor manager (1-2)-Left |
| | wCM (240) | Tie-FP | Tie-Failover Pylon |
| | wCM (400) | 400-R1.1 | Chain4-Ribbon1.1-FP |
| 2. BFB-R= | | | Base Failover Block-Right |
| | wCC (9) | TaP1m (1-2)-R | Team attribute Processor manager (1-2)-Right |
| | wCM (260) | Align-FP | Align-Failover Pylon |
| | wCM (420) | 420-R2.1 | Glue4-Ribbon2.1-FP |
| 4. MFB-L= | | | Mid Failover Block-Left |
| | wCC (29) | TmP1m (1-2)-L | Team memory Processor manager type1 (1-2)-L |
| | wCM (84) | mWSA7p2 (a-c) | memory Workgroup Server Array version7/part2 (a-c) |
| | wCM (78) | mWSA4p2 | memory Workgroup Server Array version4/part2 |
| 4. MFB-R= | | | Mid Failover Block-Right |
| | wCC (29) | TmP1m (1-2)-R | Team memory Processor manager type1 (1-2)-R |
| | wCM (84) | mWSA7p2 (d-e) | memory Workgroup Server Array version7/part2 (d-e) |
| 6. TFB-L= | | | Top Failover Block-Left |
| | wCC (49) | TcP1m (1-2)-L | Team control Processor manager type1 (1-2)-Left |
| | wCM (400) | 400-R1.2 | Chain4-Ribbon1.2-FP |
| | wCM (400) | 400-R3.(1-2) | Chain4-Ribbon3.(1-2)-FP |
| 6. TFB-R= | | | Top Failover Block-Right |
| | wCC (49) | TcP1m (1-2)-R | Team control Processor manager type1 (1-2)-Right |
| | wCM (420) | 420-R2.2 | Glue4-Ribbon2.2-FP |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred solution unit-based Layer1-Case-HCS=wCM(470+480), as illustrated by the following HAM-5 Table.

| HAM-5 Module: wCM ( ) | Abbr. Name | Description |
|---|---|---|
| BF: wCM ( ) (1. BAB + 2. BFB-L&R) | Base Framework | Agg via base WL3-bundle |
| MF: wCM ( ) (3. MMB + 4. MFB-L&R) | Mid-Framework | Agg via mid WL3-bundle |
| TF: wCM ( ) (5. TCB + 6. TFB-L&R) | Top-Framework | Agg via top WL3-bundle |
| XP: wCM (470) (1. BAB + 3. MMB + 5. TCB) | Layer1-XP | Layer1-Execution Pylon: Agg via WL1, WL2 |
| FP-L: wCM (480) | Layer1-FP-L | Layer1-Failover Pylon-Left: Agg via WL4 |

-continued

| HAM-5 Module: wCM ( ) | Abbr. Name | Description |
|---|---|---|
| (2. BFB + 4. MFB + 6. TFB) FP-R: wCM (480) | Layer1-FP-R | Layer1-Failover Pylon-Right: Agg via WL4 |
| (2. BFB + 4. MFB + 6. TFB) XP + FP-L&R: wCM (470 + 480-L&R) | Layer1-HCS | Layer1 Hierarchical Core Structures |

From the hardware configuration point of view, the Layer1-Solution unit's XP is equipped with a Basic Fabrication skeleton, which comprises a base-level BAB=(m=1, n=2)-Assembly Block, a Mid-level MMB=(b=2, t=3)-Assembly Conveyer and a top-level TCB=(x=2, y=3)-Assembly Tree, enabling the real-time dynamic control-flow flexibility.

In conclusion, the Layer1-HCS is created based on the Hardware architecture theory of the workgroup third-generation first stage-based Case Fabrication Entity architecture, i.e., HAT of wG3.1-EA.

-continued

| HCM-6: 6BBB | wCMs | Abbr. Name | Description |
|---|---|---|---|
| 3. MMB= | | | Mid Memory Block |
| | wCM (77) | mWSA4p1 | memory Workgroup Server Array version4/part1 |
| | wCM (83) | mWSA7p1 (a-e) | memory Workgroup Server Array version7/part1 (a-e) |
| 5. TCB= | | | Top Control Block |
| | wCM (390) | 390-R1.2 | Chain4-XP-Ribbon1.2-XP |
| | wCM (390) | 390-R3.(1-2) | Chain4-XP-Ribbon3.(1-2)-XP |
| | wCM (410) | 410-R2.2 | Glue4-Ribbon2.2-XP |

| HCM-6: 6BBB | wCCs + wCMs | Abbr. Name | Description |
|---|---|---|---|
| 2. BFB-L= | | | Base Failover Block-Left |
| | wCM (240) | Tie-FP (a-d) | Tie-Failover Pylon (a-d) |
| | wCM (400) | 400-R1.1 | Chain4-Ribbon1.1-FP |
| | wCC (9) | TaP1m (1-2)-L | Team attribute Processor manager (1-2)-Left |
| 2. BFB-R= | | | Base Failover Block-Right |
| | wCM (260) | Align-FP (a-d) | Align-Failover Pylon (a-d) |
| | wCM (420) | 420-R2.1 | Glue4-Ribbon2.1-FP |
| | wCC (9) | TaP1m (1-2)-R | Team attribute Processor manager (1-2)-Right |
| 4. MFB-L= | | | Mid Failover Block-Left |
| | wCM (84) | mWSA7p2 (a-c) | memory Workgroup Server Array version7/part2 (a-c) |
| | wCM (78) | mWSA4p2 | memory Workgroup Server Array version4/part2 |
| | wCC (29) | TmP1m (1-2)-L | Team memory Processor manager type1 (1-2)-L |
| 4. MFB-R= | | | Mid Failover Block-Right |
| | wCM (84) | mWSA7p2 (d-e) | memory Workgroup Server Array version7/part2 (d-e) |
| | wCC (29) | TmP1m (1-2)-R | Team memory Processor manager type1 (1-2)-R |
| 6. TFB-L= | | | Top Failover Block-Left |
| | wCC (49) | TcP1m (1-2)-L | Team control Processor manager type1 (1-2)-Left |
| | wCM (400) | 400-R1.2 | Chain4-Ribbon1.2-FP |
| | wCM (400) | 400-R3.(1-2) | Chain4-Ribbon3.(1-2)-FP |
| 6. TFB-R= | | | Top Failover Block-Right |
| | wCC (49) | TcP1m (1-2)-R | Team control Processor manager type1 (1-2)-Right |
| | wCM (420) | 420-R2.2 | Glue4-Ribbon2.2-FP |

FIG. 34 LayerM (Case-Fabrication Unit)-HCS

As shown in FIG. 34*a&b*, a preferred 6-wBBB-architected LayerM (M>=2) Case-Fabrication unit-based HCS is created, where 1.BAB, 2.BFB, 3.MFB, 4.MFB, 5.TCB and 6.TFB are constructed by using Job-wEntity-based wCMs, Task-wEntity-based wCMs and WSA-based wCCs, as illustrated by the following HCM-6 Table.

| HCM-6: 6BBB | wCMs | Abbr. Name | Description |
|---|---|---|---|
| 1. BAB= | | | Base Attribute Block |
| | wCM (230) | Tie-XP (a-d) | Tie-Execution Pylon (a-d) |
| | wCM (250) | Align-XP (a-d) | Align-Execution Pylon (a-d) |
| | wCM (390) | 390-R1.1 | Chain4-Ribbon1.1-XP |
| | wCM (410) | 410-R2.1 | Glue4-Ribbon2.1-XP |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred LayerM fabrication-unit-based HCS=wCM(490+500), as illustrated by the following HAM-5 Table.

| HAM-5 Module: wCM( ) | Abbr. Name | Description |
|---|---|---|
| BF: wCM( ) (1.BAB+2.BFB-L&R) | Base Framework | Agg via base WL3-bundle |
| MF: wCM( ) (3.MMB+4.MFB-L&R) | Mid-Framework | Agg via mid WL3-bundle |
| TF: wCM( ) (5.TCB+6.TFB-L&R) | Top-Framework | Agg via top WL3-bundle |

| HAM-5 Module: wCM( ) | Abbr. Name | Description |
|---|---|---|
| XP: wCM(490) (1.BAB+3.MMB+5.TCB) | LayerM-XP | LayerM-Execution Pylon: Agg via WL1, WL2 |
| FP-L: wCM(500) (2.BFB+4.MFB+6.TFB) | LayerM-FP-L | LayerM-Failover Pylon-Left: Agg via WL4 |
| FP-R: wCM(500) (2.BFB+4.MFB+6.TFB) | LayerM-FP-R | LayerM-Failover Pylon-Right: Agg via WL4 |
| XP+FP-L&R: wCM(490+500-L&R) | LayerM | LayerM Hierarchical Core Structures |

From the hardware configuration point of view, the LayerM-Solution unit's XP is equipped with a Complicate Fabrication skeleton, which comprises a base-level BAB=(m=1, n=2)-Assembly Block, a Mid-level MMB=(b=2, t=3)-Assembly Conveyer and a top-level TCB=(x=2, y=3)-Assembly Tree, enabling the real-time dynamic control-flow flexibility.

In conclusion, the LayerM-HCS is created based on the Hardware architecture theory of the workgroup third-generation second stage-based Case Fabrication Entity architecture, i.e., HAT of wG3.2-EA.

FIG. 35 Membrane1 (Case-Fabrication-Unit)-HCS

As shown in FIG. 35*a&b*, a preferred 6-wBBB-architected Membrane1 Case-Fabrication unit-based HCS is created, where 1.BAB, 2.BFB, 3.MMB, 4.MFB, 5.TCB and 6.TFB are constructed by using Job-wEntity-based wCMs, Task-wEntity-based wCMs and WSA-based wCCs, as illustrated by the following HCM-6 Table.

| HCM-6: 6BBB | wCMs | Abbr. Name | Description |
|---|---|---|---|
| 1.BAB= | | | Base Attribute Block |
| | wCM(390) | 390-R1.(1-2) | Chain4-RIbbon1.(1-2)-XP |
| | wCM(410) | 410-R2.(1-2) | Glue4-Ribbon2.(1-2)-XP |
| | wCM(490) | LayerM-XP(a-h) | LayerM-ExecutionPylon(a-h) |
| 3.MMB= | | | Mid Memory Block |
| | wCM(77) | mWSA4p1 | memory Workgroup Server Array version4/part1 |
| | wCM(83) | mWSA7p1(a-e) | memory Workgroup Server Array version7/part1(a-e) |
| 5.TCB= | | | Top Control Block |
| | wCM(390) | 390-R1.(3-4) | Chain4-Ribbon1.(3-4)-XP |
| | wCM(390) | 390-R3.(1-3) | Chain4-Ribbon3.(1-3)-XP |
| | wCM(410) | 410-R2.(3-4) | Glue4-Ribbon2.(3-4)-XP |

| HCM-6: 6BBB | wCCs + wCMs | Abbr. Name | Description |
|---|---|---|---|
| 2.BFB-L= | | | Base Failover Block-Left |
| | wCM(500) | LayerM-FP(a-d) | LayerM-Failover Pylon(a-d) |
| | wCM(400) | 400-R1.(1-2) | Chain4-Ribbon1.(1-2)-FP |
| | wCC(9) | TaP1m(1-2)-L | Team attribute Processor manager(1-2)-Left |
| 2.BFB-R= | | | Base Failover Block-Right |
| | wCM(500) | LayerM-FP(e-h) | LayerM-Failover Pylon(e-h) |
| | wCM(420) | 420-R2(1-2) | Glue4-Ribbon2.(1-2)-FP |
| | wCC(9) | TaP1m(1-2)-R | Team attribute Processor manager(1-2)-Right |
| 4.MFB-L= | | | Mid Failover Block-Left |
| | wCM(84) | mWSA7p2(a-c) | memory Workgroup Server Array version7/part2 (a-c) |
| | wCM(78) | mWSA4p2 | memory Workgroup Server Array version4/part2 |
| | wCC(29) | TmP1m(1-2)-L | Team memory Processor manager type1 (1-2)-L |
| 4.MFB-R= | | | Mid Failover Block-Right |
| | wCM(84) | mWSA7p2(d-e) | memory Workgroup Server Array version7/part2 (d-e) |
| | wCC(29) | TmP1m(1-2)-R | Team memory Processor manager type1 (1-2)-R |
| 6.TFB-L= | | | Top Failover Block-Left |
| | wCC(49) | TcP1m(1-2)-L | Team control Processor manager type1 (1-2)-Left |
| | wCM(400) | 400-R1.(3-4) | Chain4-Ribbon1.(3-4)-FP |
| | wCM(400) | 400-R3.(1-3) | Chain4-Ribbon3.(1-3)-FP |
| 6.TFB-R= | | | Top Failover Block-Right |
| | wCC(49) | TcP1m(1-2)-R | Team control Processor manager type1 (1-2)-Right |
| | wCM(420) | 420-R2.(3-4) | Glue4-Ribbon2.(3-4)-FP |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Membrane1-solution unit based HCS=wCM(510+520), as illustrated by the following HAM-5 Table.

| HAM-5 Module: wCM( ) | Abbr. Name | Description |
|---|---|---|
| BF: wCM( ) (1.BAB+2.BFB-L&R) | Base Framework | Agg via base WL3-bundle |
| MF: wCM( ) (3.MMB+4.MFB-L&R) | Mid-Framework | Agg via mid WL3-bundle |
| TF: wCM( ) (5.TCB+6.TFB-L&R) | Top-Framework | Agg via top WL3-bundle |
| XP: wCM(510) (1.BAB+3.MMB+5.TCB) | Membrane1-XP | Membrane1-Execution Pylon: Agg via WL1, WL2 |
| FP-L: wCM(520) (2.BFB+4.MFB+6.TFB) | Membrane1-FP-L | Membrane1-Failover Pylon-Left: Agg via WL4 |
| FP-R: wCM(520) (2.BFB+4.MFB+6.TFB) | Membrane1-FP-R | Membrane1-Failover Pylon-Right: Agg via WL4 |
| XP+FP-L&R: wCM(510+520-L&R) | Membrane1 | Membrane1 Hierarchical Core Structures |

From the hardware configuration point of view, the Membrane1-Solution unit's XP is equipped with a $1^{st}$-complex Fabrication skeleton, which comprises a base-level BAB=(m=2, n=2)-Assembly Block, a Mid-level MMB=(b=2, t=3)-Assembly Conveyer and a top-level TCB=(x=3, y=3)-Assembly Tree, enabling the real-time dynamic control-flow flexibility.

In conclusion, the Membrane1-HCS is created based on the Hardware architecture theory of the workgroup third-generation third stage-based Case Fabrication Entity architecture, i.e., HAT of wG3.3-EA.

FIG. 36 MembraneM(Case-Fabrication-Unit)-HCS

As shown in FIG. 36*a&b*, a preferred 6-wBBB-architected MembraneM (M>=2) Case-Fabrication-unit based HCS is created, where 1.BAB, 2.BFB, 3.MMB, 4.MFB, 5.TCB and 6.TFB are constructed by using Job-wEntity-based wCMs, Task-wEntity-based wCMs and WSA-based wCCs, as illustrated by the following HCM-6 Table.

| HCM-6: 6BBB | wCMs | Abbr. Name | Description |
|---|---|---|---|
| 1.BAB= | | | Base Attribute Block |
| | wCM(390) | 390-R1.(1-2) | Chain4-RIbbon1.(1-2)-XP |
| | wCM(410) | 410-R2.(1-2) | Glue4-Ribbon2.(1-2)-XP |
| | wCM(510) | Membrane(M-1)-XP(a-h) | Membrane(M-1, M >= 2)-Execution Pylon(a-h) |

-continued

| HCM-6: 6BBB | wCMs | Abbr. Name | Description |
|---|---|---|---|
| 3.MMB= | | | Mid Memory Block |
| | wCM(77) | mWSA4p1 | memory Workgroup Server Array version4/part1 |
| | wCM(83) | mWSA7p1(a-e) | memory Workgroup Server Array version7/part1(a-e) |
| 5.TCB= | | | Top Control Block |
| | wCM(390) | 390-R1.(3-4) | Chain4-Ribbon1.(3-4)-XP |
| | wCM(390) | 390-R3.(1-3) | Chain4-Ribbon3.(1-3)-XP |
| | wCM(410) | 410-R2.(3-4) | Glue4-Ribbon2.(3-4)-XP |

| HCM-6: 6BBB | wCCs + wCMs | Abbr. Name | Description |
|---|---|---|---|
| 2.BFB-L= | | | Base Failover Block-Left |
| | wCM(520) | Membrane1-FP(a-d) | Membrane1-Failover Pylon(a-d) |
| | wCM(400) | 400-R1.(1-2) | Chain4-Ribbon1.(1-2)-FP |
| | wCC(9) | TaP1m(1-2)-L | Team attribute Processor manager(1-2)-Left |
| 2.BFB-R= | | | Base Failover Block-Right |
| | wCM(520) | Membrane1-FP(e-h) | Membrane1-Failover Pylon(e-h) |
| | wCM(420) | 420-R2.(1-2) | Glue4-Ribbon2.(1-2)-FP |
| | wCC(9) | TaP1m(1-2)-R | Team attribute Processor manager(1-2)-Right |
| 4.MFB-L= | | | Mid Failover Block-Left |
| | wCM(84) | mWSA7p2(a-c) | memory Workgroup Server Array version7/part2(a-c) |
| | wCM(78) | mWSA4p2 | memory Workgroup Server Array version4/part2 |
| | wCC(29) | TmP1m(1-2)-L | Team memory Processor manager type1 (1-2)-L |
| 4.MFB-R= | | | Mid Failover Block-Right |
| | wCM(84) | mWSA7p2(d-e) | memory Workgroup Server Array version7/part2(d-e) |
| | wCC(29) | TmP1m(1-2)-R | Team memory Processor manager type1 (1-2)-R |
| 6.TFB-L= | | | Top Failover Block-Left |
| | wCC(49) | TcP1m(1-2)-L | Team control Processor manager type1 (1-2)-Left |
| | wCM(400) | 400-R1(3-4) | Chain4-Ribbon1(3-4)-FP |
| | wCM(400) | 400-R3(1-3) | Chain4-Ribbon3(1-3)-FP |
| 6.TFB-R= | | | Top Failover Block-Right |
| | wCC(49) | TcP1m(1-2)-R | Team control Processor manager type1 (1-2)-Right |
| | wCM(420) | 420-R2(3-4) | Glue4-Ribbon2(3-4)-FP |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred MembraneM-solution unit-based HCS=wCM(530+540), as illustrated by the following HAM-5 Table.

| HAM-5 Module: wCM( ) | Abbr. Name | Description |
|---|---|---|
| BF: wCM( ) (1.BAB+2.BFB-L&R) | Base Framework | Agg via base WL3-bundle |
| MF: wCM( ) (3.MMB+4.MFB-L&R) | Mid-Framework | Agg via mid WL3-bundle |
| TF: wCM( ) (5.TCB+6.TFB-L&R) | Top-Framework | Agg via top WL3-bundle |
| XP: wCM(530) (1.BAB+3.MMB+5.TCB) | MembraneM-XP | MembraneM-Execution Pylon: Agg via WL1, WL2 |
| FP-L: wCM(540) (2.BFB+4.MFB+6.TFB) | MembraneM-FP-L | MembraneM-Failover Pylon-Left: Agg via WL4 |
| FP-R: wCM(540) (2.BFB+4.MFB+6.TFB) | MembraneM-FP-R | MembraneM-Failover Pylon-Right: Agg via WL4 |

-continued

| HAM-5 Module: wCM( ) | Abbr. Name | Description |
|---|---|---|
| XP+FP-L&R: wCM(530+540-L&R) | MembraneM-HCS | MembraneM Hierarchical Core Structures |

From the hardware configuration point of view, the MembraneM-Solution unit's XP is equipped with an mth-complex Fabrication skeleton, which comprises a base-level BAB=(m=2, n=2)-Assembly Block, a Mid-level MMB=(b=2, t=3)-Assembly Conveyer and a top-level TCB=(x=3, y=3)-Assembly Tree, enabling the real-time dynamic control-flow flexibility.

In conclusion, the MembraneM-HCS is created based on the Hardware architecture theory of the workgroup third-generation fourth stage-based Case Fabrication Entity architecture, i.e., HAT of wG3.4-EA.

5.4 Transaction wEntities/wSystems: rt-Interactive/Cognitive Fine-Grained Contract Transaction (ct)wEA/wSD 5.4.1 Rationale In a real world multi-fabrication collaborative transaction environment, an ideal transaction facility comprising multiple "internal real-time dynamic solutions enabled supply-side" transaction workgroups must achieve its ultimate objective; that is "to real-time interactively/cognitively conduct the "supply-side" contractual service-based" transactions according to the "demand-side" intentionality and for its own internal solution needs, it can also initiate "demand-side" contractual-service-based transactions" to external supply-side suppliers based on its own "supply-side" intentionality.

The ideal "supply-side contractual-services" are involved in the following 3 groups of transactions:

The first group is involved with the Contract-forming-service transactions, which can handle the demander's intentions via demander's Natural Language (NL) to interactively establish the contract and then prepare the contract for internal execution.

The second group is involved with the Contract-performing-service transactions, which can handle contractual-solution job-1-based executions and job2-based-supervisions, and during the execution, the demander can request intentional modification and the job2-supervision can change the job1-execution, due to the supply-side dynamic-solution capabilities.

The third group is involved with the Contract-performance-service transactions, which can handle the demander's degrees of acceptance of the contract-performance from redoing some modifications to even renew the whole contract and also handle the analyses and rankings about all the executed contracts in a real-time library, so that top-ranking contracts based on various demanders' intentions can be always available for the next contract-forming transactions.

Therefore, there are 3 types of supply-side Contracts, based on the capability of supply-side workgroups. If the supply-side is only functional-based, the functional solutions are to be contracted, then the demander cannot make any demand, only to accept the cookie-cutting services that are to be rendered for all. This type of contract can be classified as "Course-Grained Fixated" Contract, i.e., CGF-Contract.

The second type is that the supply-side can interact with the demander in the contract-forming but the demander cannot change during the execution, because, the contractual solutions need not to be modified, like specialized-monopolized solutions. This type of contract can be classified as "Fine-Grained Reactive" Contract, i.e., FGR-Contract.

The third type is that the supply-side can provide the aforementioned 3 proactive contractual services based on demander's intention and this type of contract can be classified as "Fine-Grained Proactive" Contract, i.e., FGP-Contract.

These three types of contractual-services-capable supply-side transaction facilities are prevalent in the real-world environment, such as in the restaurant business, there are CGF-service-based fast-foods, FGR-service-based family-restaurants and FGP-service-based butler-caterings. Even though FGR-service Contracts are less desirable, however, from monopolized specialty point of view, they are efficient and cost-effective, therefore FGR-Contract-capable transaction facilities are indispensable.

In order to achieve the ultimate objective of an ideal FGR-Contract-capable supply-side transaction facility, it is imperative that the following 2 courses of action be carried out.

The first course of action is to establish an "interactive" supply-side transaction workgroup and equip it with 2-interactive-channel transaction equipment to achieve real-time "FGR-contract" with demand-side interactive intentionality.

Since the transaction workgroup is set up to "control" multiple ideal "Case-fabrication" facilities, it is necessary to extend each existing "Case-fabrication-execution Job1 assembly-line from each "Case-fabrication workgroup and combined them into a transaction-execution-based job1-assembly-line, so that all the solution execution job1 operations can be controlled.

Similarly, a transaction-supervision-based Job2-assembly-line can be created by combining all the extended solution-supervision Job2 assembly-lines. The solution-control job3 assembly-line in each solution equipment can still be controlled directly by each solution control workgroup, which can also check into any control-flow via the bonded interfaces from the top transaction workgroup and facilitate the transaction execution and supervision to be carried out.

Then the most important job that the transaction workgroup has to accomplish is to real-time interact with the external demander and set up a FGR-contract via negotiation. Therefore, there must have a transaction-interpretation-based assembly-line, dubbed "pre-execution" Job3-assembly line, which needs to have the first-tier for enabling text-based interactivity and the second-tier for enabling real-time audio-voice-based interactivity, so that the requestor's intentions based on the language used via these two interactive channels, can be interpreted into the executional language, which can then be carried out by the transaction-execution Job1 assembly-line.

Since there are two channel interpretation operations, it is necessary that Job3 assembly-line be 2-tier height. Consequently, by bonding transaction-Job1, Job2 and Job3-assembly lines together, a base-level transaction (m=2 tier, n=3 lines) Assembly Block is formed, which can further be encapsulated by a mid-level transaction assembly-conveyer and controlled by a top-level transaction assembly-tree, creating an ideal real-time dynamically-interactive transaction-based skeleton structure.

The top-Assembly tree will have the extension of transaction-control Job1, job2, Job3 from the Assembly-Block and also the transaction-job1 and job2 assembly-lines merged transaction-control assembly-line, dubbed Job4-(control) assembly-line for the external transaction control workgroup, based on the same rationale of creating solution-job3 assembly-line by merging solution job1- and job2-assembly lines for solution control workgroup as described earlier.

Based on the same rationale for creating a job4-assembly-line for handling external transaction workgroup's commands, it is imperative that an additional Job-assembly-line for handling the external demanders' requests be created and horizontally bonded to transaction Job3-assembly-line, so that this external-demander-based transaction-control assembly-line can handle external concurrent demanders' intentions before the Job3-interpretation operations and this assembly line can be dubbed as Job5 transaction-control assembly-line. All these 5 transaction-control job assembly-lines can be horizontally bonded together, creating a top-level assembly-tree (m=tiers, n=5 lines) centered on Job4-assembly-line, which can be directly controlled by the transaction workgroup. In addition to the top-level assembly-tree, there must be a "front-end-left external network-input/output dispatch hub" that can receive the network packets of intentional messages from external demanders and analyze the network packets and dispatch them to the designated tier-handler of the job5-assembly-line.

Furthermore, by adopting a 3-sided mid-level data-item exchange extended conveyer, i.e., Transaction Mid-level Conveyer (base=3, top=4, left=1) for better and more efficient exchanges than 2-sided top-down conveyer, the Base Transaction-attribute Assembly Block (m=2, n=3), the Top Transaction-Control Assembly Tree of job-1 to job5 assembly-lines (x>3, n=5) can all be encapsulated into a "2-channel interactive FGR-Contract supply-side Transaction Expert-station based on a "Hierarchical Transaction Skeleton", which can be denoted as B(2,3)M(3,4,1)T(x>3,5).

This interactive-FGR Expert-station with its job4-assembly-line to control the top-assembly-tree allows the transaction-control workgroup to concurrently supervise the contract-forming transactions from the demanders' audio-text-interactivity via dispatch-hub and the contract-performing via the base assembly-block to generate related contractual services that can be flowed back to the dispatch-hub, which can further deliver the desired contractual services to the external demanders via external network links.

The second course of action is to establish a cognitive supply-side transaction control workgroup and equip it with 3-channel cognitive transaction equipment to achieve real-time "FGR contracts with demand-side cognitive intentionality.

Based on the aforementioned interactive channel-tier interpretation rationale, the additional interactive/cognitive channel, i.e., video-packet-based channel will be connected to the third-tier of Job1, job2 and job3 assembly-lines, thereby creating a (m=3 tier, n=3 lines) Base-level Transaction Assembly-Block. Furthermore, by integrating with a 3-sided Mid-level Transaction (base=3, top=4, left=1) Assembly-Conveyer and a Top-level Transaction (x>3, n=5) Assembly Tree, a "3-channel cognitive FGR-Contract supply-side Transaction Expert-station can be created based on a "Hierarchical Transaction Skeleton", which can be denoted as B(3,3)M(3,4,1)T(x>3,5).

Again, in order to achieve the ultimate objective of an ideal FGP-Contract supply-side transaction facility, it is imperative that the following 2 courses of action be carried out.

The first course of action is to establish an interactive supply-side transaction control workgroup and equip it with 2-channel interactive transaction equipment to achieve real-time "FGP contracts with demand-side interactive intentionality.

According to a (m=2 tiers, n=3 assembly-lines) base-level Assembly-Block, the first job1-assembly-line is for real-time transaction execution, the second job2-assembly-line is for real-time transaction supervision and the third job3-assembly-line is for real-time pre-transaction execution, so that external demanders' intentions can be handled. However, in order to provide FGP contract-services, it is imperative that a post-transaction supervision assembly-line be established, so that all the executed contracts' performance can be analyzed and ranked based on the demander's degrees of acceptance. In so doing, the top-ranking contracts in the real-time searchable library will facilitate proactively for the next demander to establish the contract-forming transactions. Therefore, the fourth-job4 assembly-line for real-time post-supervision transaction is needed, creating a (m=2 tiers, n=4 assembly-lines) Base-level Transaction Assembly-Block, which can further be encapsulated by a mid-level transaction Assembly-Conveyer and controlled by a top-level transaction assembly-tree, creating an ideal real-time dynamically-interactive transaction-based skeleton structure.

The top-Assembly tree will have the extension of transaction-control Job1, job2, Job3 and job4 from the Assembly-Block and also the transaction-job1 and job2 assembly-lines merged transaction-control assembly-line, dubbed Job5-(control) assembly-line for the external transaction control workgroup.

Based on the same rationale for creating a job5-assembly-line for handling external transaction workgroup's commands, it is imperative that an additional transaction Job-assembly-line for handling the external demanders' requests be created and horizontally bonded to transaction Job3-assembly-line, so that this external-demander-based transaction-control assembly-line can real-time handle the external concurrent demanders' intentions before the Job3-interpretation operations and this assembly-line can be dubbed as Job6 transaction-control assembly-line. Moreover, it is imperative that yet another additional transaction job assembly-line for handling the external collaborator's requests be created and bonded to the transaction job4-assembly-line, so that this external-collaborator-based transaction control assembly-line can handle the external concurrent collaborator's inquiries to the job4-contract-performance-knowledge-based real-time library and allow the external collaborators to initiate the desired top ranking executed contracts and obtain the desired services as the intermediate solutions for integrating into their own contractual services. This collaborator's assembly-line can be dubbed as Job7 transaction-control assembly-line.

All these 7 transaction-control job assembly-lines can be horizontally bonded together, creating a top-level assembly-tree (x>3 tiers, y=7 ribbons) centered on Job5-assembly-line, which can be directly controlled by the transaction workgroup. In addition to the top-level assembly-tree, there must be a "front-end-left external network-input/output dispatch hub" that can receive the network packets of intentional messages from external demanders and analyze the network packets and dispatch to the designated tier-handler of the job6-assembly-line. Moreover, there must be a "back-end-right external network input/output dispatch hub that can receive the network packets from the external collaborators and analyze the network packets and dispatch them to the designated tier-handler of the job7-assembly-line.

Furthermore, by adopting a 4-sided mid-level data-exchange Assembly conveyer (base=4 flows, top=5 flows, left=1 flow, right=1 flow) for better and more efficient exchanges than 2-sided top-down conveyer, the Base-level Transaction Assembly Block (m=2, n=4), the Top Transaction-Control Assembly Tree of job-1 to job7 assembly-lines (x>3, y=7) can all be encapsulated into a "2-channel interactive FGP-Contract supply-side Transaction Expert-station based on a "Hierarchical Transaction Skeleton", which can be denoted as B(2,4)M(4,5,1,1)T(x>3,7).

This interactive-FGP Expert-station with its job5-assembly-line to control the top-assembly-tree allows the transaction-control workgroup to concurrently supervise 1) the contract-forming transactions from the demanders' and collaborators' audio-text-interactivity via its own dispatch-hub respectively, 2) the contract-performing transactions via the base assembly-block to generate related contractual services that can be flowed back to its own dispatch-hub respectively, which can further deliver the desired contractual services to the external demanders and external collaborators via external network links and 3) the contract-performance transactions for establishing real-time contract knowledge libraries.

The second course of action is to establish a cognitive supply-side transaction control workgroup and equip it with 3-channel cognitive transaction equipment to achieve real-time "FGP-contracts with demand-side cognitive intentionality.

Based on the aforementioned interactive channel-tier interpretation rationale, the additional interactive/cognitive channel, i.e., video-packet-based channel will be connected to the third-tier of Job1, job2, job3 and job4 assembly-lines, thereby creating a (m=3 tier, n=4 lines) Base-level Transaction Assembly-Block. Furthermore, by integrating with a 4-sided Mid-level Transaction (base=4, top=5, left=1, right=1) Assembly-Conveyer and a Top-level Transaction (x>3, y=7) Assembly Tree, a "3-channel cognitive FGP-Contract supply-side Transaction Expert-station can be created based on a "Hierarchical Transaction Skeleton", which can be denoted as B(3,4)M(4,5,1,1)T(x>3,7).

Furthermore, there is an ensuing need that an Agent-based transaction facilities should be established. It is because when multiple contractual-service-based expert-transaction facilities are connected in the base-level structure, as in the Assembly-Block and they can build up multi-contract-aggregated services that need to be rendered out from the top-level transaction facility as in the Assembly-Tree. This type of transaction facility can be dubbed as Agent-based transaction facility. Just like a waiter in a restaurant, he can access to various supply-side kitchens and have the knowledge about the kitchens/chefs/dishes. On the other hand, he also has the knowledge about customers' traits and preference. Most importantly, the waiter can get the multi-dish contractual service-based "order" established between the chefs and the customer.

Therefore, in a real world multi-expert collaborative transaction environment, an ideal "Agent-based" transaction-facility comprising multiple "agent-based transaction workgroups" must achieve its ultimate objective; that is "to real-time cognitively conduct contractual-service transaction between the internal supply-side and the external demand-side with "knowledge-based" intelligence.

In order to achieve the ultimate objective of an ideal contractual-service-capable Agent-based transaction facility, it is imperative that the following 2 courses of action be carried out.

The first course of action is to establish a cognitive Agent-based transaction workgroup and equip it with a 3-channel-cognitive Agent-based transaction equipment to achieve real-time "cFGR contract-service agent-based transactions with knowledge-based intelligence.

Unlike a cFGR-contract expert-station-based transaction facility, an agent-based transaction facility doesn't have the internal solution-units in the base-level Assembly-Block, but it will have all the base-level transaction-job-based assembly-lines, the same mid-level assembly-conveyer and the same top-level assembly-tree. Basically, a cFGR-agent-station is having the same Hierarchical Transaction Skeleton as a cFGR expert-station, the only difference between them is that cFGR agent-station doesn't equip with any solution-units. Therefore, a cFGR agent-station can be established by equipping the cFGR Hierarchical Transaction Skeleton, i.e., B(3,3)M(3,4,1)T(x>3, 5).

The second course of action is to establish a cognitive "FGR-contractual-service" Agent-based transaction workgroup and equip it with 3-channel-cognitive transaction equipment to achieve real-time cognitive FGP-contract agent-based transactions with knowledge-based intelligence.

Basically, a cFGP-agent-station is having the same Hierarchical Transaction Skeleton as a cFGP expert-station, the only difference between them is that cFGR agent-station doesn't equip with any solution-units. Therefore, a cFGP agent-station can be established by equipping the cFGP Hierarchical Transaction Skeleton, i.e., B(3,4)M(4,5,1,1)T (x>3,7).

The Agent-station-based light-weight Hierarchical Transaction Skeleton has the internal, base-job1-interpretation dictionary/library, base-job2-execution-command manual library, base-job-3 real-time information-supervision library and base-Job-4 real-time knowledge-post-supervision library, which can be established based on all the past external cognitive/interactive contract-forming negotiation, contract-performing results and contract-performance reports.

When a new request from the external demander is received, the Agent-station will create an Agent to handle the incoming request. The Agent will cognitively transact the request from the demander and go thru its internal real-time knowledge library and access to the supply-side knowledge library and real-time dynamically negotiate a proactive contract for the external demander. Therefore, the agent is real-time intelligent due to its real-time dynamic programming can be achieved based on the real-time support of multiple real-time knowledge libraries, due to it is equipped with the Hierarchical Transaction Skeleton.

It can be predicted that the next workgroup evolutionary generations will be based on the integration of multiple-expert-stations and multiple agent-stations. A plurality of expert-stations aggregated in the base-level Assembly-Block can enhance supply-side collaboration, providing more sophisticated supply-side transaction-based services. The Agent-stations resided in many different-purpose transaction facilities can form multi-agent-aggregated networked-structures and generate a slew of new and more intelligent agent-to-agent transaction-based services, such as supply-side services, demand-side services and brokerage (i.e., both supply-side and demand-side) services.

5.4.2 wEA: 6-wBBB (HCS/EDS) Contract-wEntities

Based on the aforementioned rational courses of action for creating expert-contract and Agent-contract-based workgroup Systems (wSystems) to equip ideal collaborative supply-side and agent-based transaction facilities with automation and together with the usage of workgroup case fabrication-based wG3-wEAs, the third workgroup evolutionary principle (wEP3) is thus established to bring forth the fourth-generation "transaction-facility-based" workgroup Entity Architecture (wG4-wEA) that comprises the following 6 mandates for creating all the potential workgroup-transaction-based "Contract-wEntities".

Mandate-1: the must-have 6 Contract-wEntity-based workgroup Basic Building Blocks (Contract-6BBB), which can be constructed by using the standard Solution-HCSs, as illustrated from FIG. 23 to FIG. 26, together with standard Job-HCSs and standard WSAs;

Mandate-2: the must-have Contract-wEntity-based Hierarchical Core Structure (Contract-HCS) by aggregating Contract-6BBBs with workgroup four linkages and bundles;

Mandate-3: the must-have iterative Contract-wEntity-based Hardware Architecture Theory (Contract-HAT) with related methods in constructing Contract-6BBBs and in aggregating them into Contract-HCSs;

Mandate-4: the must-have Contract-wEntity-oriented OS (Contract-OS) to equip Contract-HCS into Contract-wEntity Core Structure (Contract-ECS);

Mandate-5: the must-have Contract-wEntity-oriented domain programs (Contract-DPs) to equip Contract-ECS into Contract-wEntity Domain Structure (Contract-EDS); and Mandate-6: the must-have iterative Contract-wEntity-oriented Software Architecture Theory (Contract-SAT) with related software methods in generating Contract-OSs and Contract-DPs.

5.4.3 wTF3-HATs

Therefore, by abiding the third mandate of wG4-wEA, the fourth generation Theoretic Foundation (wTF3.wG4.stages) can be derived, which contains a number of Contract-wEntity-based stage-iterative Hardware Architecture Theories (HATs). Each HAT comprises multiple Hardware Construction Methods (HCMs) in creating Contract-6BBBs and multiple Hardware Aggregation Methods (HAMs) in creating Contract-HCSs in each stage.

5.4.4 wTF3-SATs

In addition, by abiding the sixth mandate of wG4-wEA, the fourth generation workgroup Theoretic Foundation (wTF3.wG4.stages) can be extended to include a number of Contract-wEntity-based stage-iterative Software Architecture Theories (SATs). Each SAT comprises multiple Contract-wEntity OS-oriented software Integration Methods (EIms) in generating Contract-OSs and multiple Contract-wEntity domain-oriented software Programming Methods (EPMs) in real-time generating Contract-DPs for various Experts as well as for master-Agents and various-purposed sub-Agents in each stage.

5.4.5 Preferred 6 Standard Contract-wEntities

It can be concluded that by fulfilling the fourth-generation Contract-wEntity Architecture (i.e., wG4-wEA) and carrying out wTF3.wG4.stages-(HATs/SATs), a series of stage-evolved "fail-safe" Contract-wEntities with various degrees of real-time interactive/cognitive workgroup transaction can be created. In addition, based on the aforementioned standard Case-wEntities as the basic components to warrant the solidity and completeness of wG4-wEA, there are 6 standard stages in creating wG4.1 to wG4.6 "fail-safe" Contract-wEntities with 6 different levels of real-time interactive/cognitive workgroup-contractual service-based intelligence, due to 6 standard workgroup transaction-station-based Hierarchical Core Structures (HCSs) from expert-stations to agent-stations, as illustrated from FIG. 27*a&b* to FIG. 32*a&b*.

5.4.6 Preferred 6 Real-Time Interactive/Cognitive Contract Transaction wSystems

Furthermore, all these 6 standard Contract-wEntities can further be built into real-world "standardized real-time interactive/cognitive Contract Transaction wSystems" based on wG4 contract-transaction System Disciplines (wG3-ctSD), which will populate the fourth generation of real-world service-oriented workgroup evolutionary pathway and eventually achieve the ideal real-world transaction facility's ultimate objective, as defined earlier.

FIG. 37 iFGR (4-Corner-Entry Contract-Expert-Station)-HCS

As shown in FIG. 37*a*&*b*, a preferred 6-wBBB-architected 2Channel Fine-Grained Reactive Contract-Expert-station-based HCS is created, where 1.BAB, 2.BFB, 3.MMB, 4.MFB, 5.TCB and 6.TFB are constructed by Case-Fabrication-HCSs, Job-HCSs and WSAs, as illustrated by the following HCM-6 Table.

| HCM-6: 6BBB | wCMs | Abbr. Name | Description |
|---|---|---|---|
| 1.BAB= | | | Base Attribute Block |
| | wCM(390) | 390-C.1 | Chain4-XP1 (down-left corner-entry) |
| | wCM(410) | 410-G.1 | Glue4-XP1 (down-right corner-entry) |
| | wCM(390) | 390-R1.(1-2) | Chain4-Ribbon1.(1-2)-XP |
| | wCM(390) | 390-R3.(1-2) | Chain4-Ribbon3.(1-2)-XP |
| | wCM(410) | 410-R2.(1-2) | Glue4-Ribbon2.(1-2)-XP |
| | wCM(530) | MS-XP(a-h) | MembraneM-Solution Execution Pylon(a-h) |
| 3.MMB= | | | Mid Memory Block |
| | wCM(79) | mWSA5p1 | memory Workgroup Server Array version5/part1 |
| | wCM(83) | mWSA7p1 (a-h) | memory Workgroup Server Array version7/part1(a-h) |
| 5.TCB= | | | Top Control Block |
| | wCM(390) | 390-C.2 | Chain4-XP2 (top-left corner-entry) |
| | wCM(410) | 410-G.2 | Glue4-XP2 (top-right corner-entry) |
| | wCM(390) | 390-R1.3 | Chain4-Ribbon1.3-XP |
| | wCM(390) | 390-R3.(3-6) | Chain4-Ribbon3.(3-6)-XP |
| | wCM(390) | 390-R4.(1-5) | Chain4-Ribbon4.(1-5)-XP |
| | wCM(390) | 390-R5.(1-4) | Chain4-Ribbon5.(1-4)-XP |
| | wCM(410) | 410-R2.(3-6) | Glue-4-Ribbon2.(3-6)-XP |

| HCM-6: 6BBB | wCCs + wCMs | Abbr. Name | Description |
|---|---|---|---|
| 2.BFB-L= | | | Base Failover Block-Left |
| | wCM(540) | MembraneM-FP(a-d) | MembraneM-Failover Pylon(a-d) |
| | wCM(400) | 400-C.1 | Chain4-FP1 |
| | wCM(400) | 400-R1.(1-2) | Chain4-Ribbon1.(1-2)-FP |
| | wCM(400) | 400-R3.(1-2) | Chain4-Ribbon3.(1-2)-FP |
| | wCC(9) | TaP1m(1-2)-L | Team attribute Processor manager(1-2)-Left |
| 2.BFB-R= | | | Base Failover Block-Right |
| | wCM(540) | MembraneM-FP(e-h) | MembraneM-Failover Pylon(e-h) |
| | wCM(420) | 420-G.1 | Glue4-FP1 |
| | wCM(420) | 420-R2.(1-2) | Glue4-Ribbon2.(1-2)-FP |
| | wCC(9) | TaP1m(1-2)-R | Team attribute Processor manager(1-2)-Right |
| 4.MFB-L= | | | Mid Failover Block-Left |
| | wCM(84) | mWSA7p2(a-f) | memory Workgroup Server Array version7/part2(a-f) |
| | wCM(80) | mWSA5p2 | memory Workgroup Server Array version5/part2 |
| | wCC(29) | TmP1m(1-2)-L | Team memory Processor manager type1 (1-2)-L |
| 4.MFB-R= | | | Mid Failover Block-Right |
| | wCM(84) | mWSA7p2(g-h) | memory Workgroup Server Array version7/part2(g-h) |
| | wCC(29) | TmP1m(1-2)-R | Team memory Processor manager type1 (1-2)-R |
| 6.TFB-L= | | | Top Failover Block-Left |
| | wCC(49) | TcP1m(1-2)-L | Team control Processor manager type1 (1-2)-Left |
| | wCM(400) | 400-C.2 | Chain4-FP2 |
| | wCM(400) | 400-R1.3 | Chain4-Ribbon1.3-FP |

-continued

| HCM-6: 6BBB | wCCs + wCMs | Abbr. Name | Description |
|---|---|---|---|
| | wCM(400) | 400-R3.(3-6) | Chain4-Ribbon3.(3-6)-FP |
| | wCM(400) | 400-R4.(1-5) | Chain4-Ribbon4.(1-5)-FP |
| | wCM(400) | 400-R5.(1-4) | Chain4-Ribbon5.(1-4)-FP |
| 6.TFB-R= | | | Top Failover Block-Right |
| | wCC(49) | TcP1m(1-2)-R | Team control Processor manager type1 (1-2)-Right |
| | wCM(420) | 420-G.2 | Glue4-FP2 |
| | wCM(420) | 420-R2.(3-6) | Glue4-Ribbon2.(3-6)-FP |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred 2-channel Fine-Grained Reactive (FGR)-Contract Expert-station-based HCS=wCM(550+560), as illustrated by the following HAM-5 Table.

| HAM-5 Module: wCM( ) | Abbr. Name | Description |
|---|---|---|
| BF: wCM( ) (1.BAB+2.BFB-L&R) | Base Framework | Agg via base WL3-bundle |
| MF: wCM( ) (3.MMB+4.MFB-L&R) | Mid-Framework | Agg via mid WL3-bundle |
| TF: wCM( ) (5.TCB+6.TFB-L&R) | Top-Framework | Agg via top WL3-bundle |
| XP: wCM(550) (1.BAB+3.MMB+5.TCB) | iFGR-CES-XP | Interactive-Fine-Grained Reactive Contract Expert-Station Execution Pylon: Agg via WL1, WL2 |
| FP-L: wCM(560) (2.BFB+4.MFB+6.TFB) | iFGR-CES-FP-L | iFGR Contract Expert-Station Failover Pylon-Left: Agg via WL4 |
| FP-R: wCM(560) (2.BFB+4.MFB+6.TFB) | iFGR-CES-FP-R | iFGR Contract Expert-Station-Failover Pylon-Right: Agg via WL4 |
| XP+FP-L&R: wCM(550+560-L&R) | iFGR-CES HCS | iFGR Contract Expert-Station-Hierarchical Core Structure |

From the hardware configuration point of view, the iFGR-Contract wEntity-based HCS is "equipped" with an internal "iFGR Expert-Station Skeleton", which comprises a base-level BAB, i.e., a (m=2, n=3)-Assembly Block, a Mid-level MMB, i.e., a (base=3, top=4, left=1) Assembly Conveyer and a top-level TCB, i.e., a (x=3, y=5) Assembly Tree. Consequently, the fail-over complement BFB, MFB and TFB will evolve accordingly based on the fail-over evolutionary architecture.

In conclusion, the iFGR-Contract Expert-Station wEntity-based HCS is created based on the Hardware architecture theory of the workgroup fourth-generation first stage-based Contract Transaction Entity architecture, i.e., HAT of wG4.1-EA.

FIG. 38 cFGR (4-Corner-Entry Contract-Expert-Station)-HCS

As shown in FIG. 38*a*&*b*, a preferred 6-wBBB-architected 3Channel-Cognitive Fine-Grained Reactive-Contract Expert-Station-based HCS is created, where 1.BAB, 2.BFB, 3.MMB, 4.MFB, 5.TCB and 6.TFB are constructed by Solution-based wCMs, Job-wEntity-based wCMs and WSA-based wCCs, as illustrated by the following HCM-6 Table.

| HCM-6: 6BBB | wCMs | Abbr. Name | Description |
|---|---|---|---|
| 1.BAB= | | | Base Attribute Block |
| | wCM(390) | 390-C.1 | Chain4-XP1(down-left corner-entry) |
| | wCM(410) | 410-G.1 | Glue4-XP1 (down-right corner-entry) |
| | wCM(390) | 390-R1.(1-3) | Chain4-Ribbon1.(1-3)-XP |
| | wCM(390) | 390-R3.(1-3) | Chain4-Ribbon3.(1-3)-XP |
| | wCM(410) | 390-R2.(1-3) | Glue4-Ribbon2.(1-3)-XP |
| | wCM(530) | MS-XP(a-h) | MembraneM-Solution Execution Pylon(a-h) |
| 3.MMB= | | | Mid Memory Block |
| | wCM(79) | mWSA5p1 | memory Workgroup Server Array version5/part1 |
| | wCM(83) | mWSA7p1 (a-h) | memory Workgroup Server Array version7/part1(a-h) |
| 5.TCB= | | | Top Control Block |
| | wCM(390) | 390-C.2 | Chain4-XP2 (top-left corner-entry) |
| | wCM(410) | 410-G.2 | Glue4-XP2 (top-right corner-entry) |
| | wCM(390) | 390-R1.4 | Chain4-Ribbon1.4-XP |
| | wCM(390) | 390-R3.(4-7) | Chain4-Ribbon3.(4-7)-XP |
| | wCM(390) | 390-R4.(1-5) | Chain4-Ribbon4.(1-5)-XP |
| | wCM(390) | 390-R5.(1-4) | Chain4-Ribbon5.(1-4)-XP |
| | wCM(410) | 410-R2.(4-7) | Glue-4-Ribbon2.(4-7)-XP |

| HCM-6: 6BBB | wCCs + wCMs | Abbr. Name | Description |
|---|---|---|---|
| 2.BFB-L= | | | Base Failover Block-Left |
| | wCM(540) | MembraneM-FP(a-d) | MembraneM-Failover Pylon(a-d) |
| | wCM(400) | 400-C.1 | Chain4-FP1 |
| | wCM(400) | 400-R1.(1-3) | Chain4-Ribbon1.(1-3)-FP |
| | wCM(400) | 400-R3.(1-3) | Chain4-Ribbon3.(1-3)-FP |
| | wCC(9) | TaP1m(1-2)-L | Team attribute Processor manager(1-2)-Left |
| 2.BFB-R= | | | Base Failover Block-Right |
| | wCM(540) | MembraneM-FP(e-h) | MembraneM-Failover Pylon(e-h) |
| | wCM(420) | 420-G.1 | Glue4-FP1 |
| | wCM(420) | 420-R2. (1-3) | Glue4-Ribbon2.(1-3)-FP |
| | wCC(9) | TaP1m(1-2)-R | Team attribute Processor manager(1-2)-Right |
| 4.MFB-L= | | | Mid Failover Block-Left |
| | wCM(84) | mWSA7p2(a-f) | memory Workgroup Server Array version7/part2(a-f) |
| | wCM(80) | mWSA5p2 | memory Workgroup Server Array version5/part2 |
| | wCC(29) | TmP1m(1-2)-L | Team memory Processor manager type1 (1-2)-L |
| 4.MFB-R= | | | Mid Failover Block-Right |
| | wCM(84) | mWSA7p2(g-h) | memory Workgroup Server Array version7/part2(g-h) |
| | wCC(29) | TmP1m(1-2)-R | Team memory Processor manager type1 (1-2)-R |
| 6.TFB-L= | | | Top Failover Block-Left |
| | wCC(49) | TcP1m(1-2)-L | Team control Processor manager type1 (1-2)-Left |
| | wCM(400) | 400-C.2 | Chain4-FP2 |
| | wCM(400) | 400-R1.4 | Chain4-Ribbon1.4-FP |
| | wCM(400) | 400-R3.(4-7) | Chain4-Ribbon3.(4-7)-FP |
| | wCM(400) | 400-R4.(1-5) | Chain4-Ribbon4.(1-5)-FP |
| | wCM(400) | 400-R5.(1-4) | Chain4-Ribbon5.(1-4)-FP |
| 6.TFB-R= | | | Top Failover Block-Right |
| | wCC(49) | TcP1m(1-2)-R | Team control Processor manager type1 (1-2)-Right |
| | wCM(420) | 420-G.2 | Glue4-FP2 |
| | wCM(420) | 420-R2.(4-7) | Glue4-Ribbon2(4-7)-FP |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Cognitive Reactive Contract Expert-Station-based HCS=wCM (570+580), as illustrated by the following HAM-5 Table.

| HAM-5 Module: wCM( ) | Abbr. Name | Description |
|---|---|---|
| BF: wCM( ) (1.BAB+2.BFB-L&R) | Base Framework | Agg via base WL3-bundle |
| MF: wCM( ) (3.MMB+4.MFB-L&R) | Mid-Framework | Agg via mid WL3-bundle |
| TF: wCM( ) (5.TCB+6.TFB-L&R) | Top-Framework | Agg via top WL3-bundle |
| XP: wCM(570) (1.BAB+3.MMB +5.TCB) | cFGR-CES-XP | Cognitive Fine-Grained Reactive Contract-Expert-Station Execution Pylon: Agg via WL1, WL2 |
| FP-L: wCM(580) (2.BFB+4.MFB+6.TFB) | cFGR-CES-FP-L | cFGR Contract-Expert-Station Failover Pylon-Left: Agg via WL4 |
| FP-R: wCM(580) (2.BFB+4.MFB+6.TFB) | cFGR-CES-FP-R | cFGR-Contract Expert-Station Failover Pylon-Right: Agg via WL4 |
| XP+FP-L&R: wCM(570+580-L&R) | cFGR-CES HCS | cFGR-Contract Expert-Station Hierarchical Core Structure |

From the hardware configuration point of view, the cFGR-Contract wEntity-based HCS is "equipped" with an internal "cFGR Expert-Station Skeleton", which comprises a base-level BAB, i.e., a (m=3, n=3)-Assembly Block, a Mid-level MMB, i.e., a (base=3, top=4, left=1) Assembly Conveyer and a top-level TCB, i.e., a (x=3, y=5) Assembly Tree. Consequently, the fail-over complement BFB, MFB and TFB will evolve accordingly based on the fail-over evolutionary architecture.

In conclusion, the cFGR-Contract Expert-Station wEntity-based HCS is created based on the Hardware architecture theory of the workgroup fourth-generation second-stage-based Contract-Transaction Entity Architecture, i.e., HAT of wG4.2-EA.

FIG. 39 iFGP (4-Corner-Entry Contract-Expert-Station)-HCS

As shown in FIG. 39*a&b*, a preferred 6-wBBB-architected 2Channel-Interactive Fine-Grained-Proactive Contract Expert-Station-based HCS is created, where 1.BAB, 2.BFB, 3.MMB, 4.MFB, 5.TCB and 6.TFB are constructed by Solution-based wCMs, Job-wEntity-based wCMs and WSA-based wCCs, as illustrated by the following HCM-6 Table.

| HCM-6: 6BBB | wCMs | Abbr. Name | Description |
|---|---|---|---|
| 1.BAB= | | | Base Attribute Block |
| | wCM(390) | 390-C.1 | Chain4-XP1 (down-left corner-entry) |
| | wCM(410) | 410-G.1 | Glue4-XP1 (down-right corner-entry) |
| | wCM(390) | 390-R1.(1-2) | Chain4-Ribbon1.(1-2)-XP |
| | wCM(390) | 390-R3.(1-2) | Chain4-Ribbon3.(1-2)-XP |
| | wCM(410) | 410-R2.(1-2) | Glue4-Ribbon2.(1-2)-XP |
| | wCM(410) | 410-R4.(1-2) | Glue4-Ribbon4.(1-2)-XP |
| | wCM(530) | MS-XP(a-h) | MembraneM-Solution Execution Pylon(a-h) |
| 3.MMB= | | | Mid Memory Block |
| | wCM(81) | mWSA6p1 | memory Workgroup Server Array version6/part1 |
| | wCM(83) | mWSA7p1(a-k) | memory Workgroup Server Array version7/part1(a-k) |

-continued

| HCM-6: 6BBB | wCMs | Abbr. Name | Description |
|---|---|---|---|
| 5.TCB= | | | Top Control Block |
| | wCM(390) | 390-C.2 | Chain4-XP2 (top-left corner-entry) |
| | wCM(410) | 410-G.2 | Glue4-XP2 (top-right corner-entry) |
| | wCM(390) | 390-R1.3 | Chain4-Ribbon1.3-XP |
| | wCM(390) | 390-R3.(3-6) | Chain4-Ribbon3.(3-6)-XP |
| | wCM(390) | 390-R5.(1-5) | Chain4-Ribbon5.(1-5)-XP |
| | wCM(390) | 390-R6.(1-4) | Chain4-Ribbon6.(1-4)-XP |
| | wCM(410) | 410-R2.3 | Glue-4-Ribbon2.(4-7)-XP |
| | wCM(410) | 410-R4.(3-6) | Glue-4-Ribbon4.(3-6)-XP |
| | wCM(410) | 410-R7.(1-4) | Glue-4-Ribbon7.(1-4)-XP |

| HCM-6: 6BBB | wCCs + wCMs | Abbr. Name | Description |
|---|---|---|---|
| 2.BFB-L= | | | Base Failover Block-Left |
| | wCM(540) | MembraneM-FP(a-d) | MembraneM-Failover Pylon(a-d) |
| | wCM(400) | 400-C.1 | Chain4-FP1 |
| | wCM(400) | 400-R1.(1-2) | Chain4-Ribbon1.(1-3)-FP |
| | wCM(400) | 400-R3.(1-2) | Chain4-Ribbon3.(1-3)-FP |
| | wCC(9) | TaP1m(1-2)-L | Team attribute Processor manager(1-2)-Left |
| 2.BFB-R= | | | Base Failover Block-Right |
| | wCM(540) | MembraneM-FP(e-h) | MembraneM-Failover Pylon(e-h) |
| | wCM(420) | 420-G.1 | Glue4-FP1 |
| | wCM(420) | 420-R2.(1-2) | Glue4-Ribbon2.(1-2)-FP |
| | wCM(420) | 420-R4.(1-2) | Glue4-Ribbon4.(1-2)-FP |
| | wCC(9) | TaP1m(1-2)-R | Team attribute Processor manager(1-2)-Right |
| 4.MFB-L= | | | Mid Failover Block-Left |
| | wCM(84) | mWSA7p2(a-f) | memory Workgroup Server Array type2-version7/part2(a-f) |
| | wCM(82) | mWSA6p2 | memory Workgroup Server Array version6/part2 |
| | wCC(29) | TmP1m(1-2)-L | Team memory Processor manager type1 (1-2)-L |
| 4.MFB-R= | | | Mid Failover Block-Right |
| | wCM(84) | mWSA7p2(g-k) | memory Workgroup Server Array type2-version7/part2(g-k) |
| | wCC(29) | TmP1m(1-2)-R | Team memory Processor manager type1 (1-2)-R |
| 6.TFB-L= | | | Top Failover Block-Left |
| | wCC(49) | TcP1m(1-2)-L | Team control Processor manager type1 (1-2)-Left |
| | wCM(400) | 400-C.2 | Chain4-FP2 |
| | wCM(400) | 400-R1.3 | Chain4-Ribbon1.3-FP |
| | wCM(400) | 400-R3.(3-6) | Chain4-Ribbon3.(3-6)-FP |
| | wCM(400) | 400-R5.(1-5) | Chain4-Ribbon5.(1-5)-FP |
| | wCM(400) | 400-R6.(1-4) | Chain4-Ribbon6.(1-4)-FP |
| 6.TFB-R= | | | Top Failover Block-Right |
| | wCC(49) | TcP1m(1-2)-R | Team control Processor manager type1 (1-2)-Right |

-continued

| HCM-6: 6BBB | wCCs + wCMs | Abbr. Name | Description |
|---|---|---|---|
| | wCM(420) | 420-G.2 | Glue4-FP2 |
| | wCM(420) | 420-R2.4 | Glue4-Ribbon2.4-FP |
| | wCM(420) | 420-R4.(4-7) | Glue4-RIbbon4.(4-7)-FP |
| | wCM(420) | 420-R7.(1-4) | Glue4-RIbbon7.(1-4)-FP |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Interactive Proactive-Contract Expert-Station-based HCS=wCM (590+600), as illustrated by the following HAM-5 Table.

| HAM-5 Module: wCM( ) | Abbr. Name | Description |
|---|---|---|
| BF: wCM( ) (1.BAB + 2.BFB) | Base Framework | Agg via base WL3-bundle |
| MF: wCM() (3.MMB + 4.MFB) | Mid-Framework | Agg via mid WL3-bundle |
| TF: wCM( ) (5.TCB + 6.TFB-L&R) | Top-Framework | Agg via top WL3-bundle |
| XP: wCM(590) (1.BAB + 3.MMB + 5.TCB | iFGP-CES-XP | Interactive Fine-Grained Proactive Contract Expert-Station Execution Pylon: Agg via WL1, WL2 |
| FP-L: wCM(600) (2.BFB + 4.MFB + 6.TFB) | iFGP-CES-FP-L | iFGP Contract Expert-Station Failover Pylon-Left: Agg via WL4 |
| FP-R: wCM(600) (2.BFB + 4.MFB + 6.TFB) | iFGP-CES-FP-R | iFGP Contract Expert-Station Failover Pylon-Right: Agg via WL4 |
| XP + FP-L&R: wCM(590 + 600-L&R) | iFGP-CES HCS | iFGP Contract Expert-Station Hierarchical Core Structure |

From the hardware configuration point of view, the iFGP-Contract wEntity-based HCS is "equipped" with an internal "iFGP Expert-Station Skeleton", which comprises a base-level BAB, i.e., a (m=2, n=4)-Assembly Block, a Mid-level MMB, i.e., a (base=4, top=5, left=1, right=1) Assembly Conveyer and a top-level TCB, i.e., a (x>4=n, y=7) Assembly Tree. Consequently, the fail-over complement BFB, MFB and TFB will evolve accordingly based on the fail-over evolutionary architecture.

In conclusion, the iFGP-Contract Expert-Station wEntity-based HCS is created based on the Hardware architecture theory of the workgroup fourth-generation third-stage-based Contract-Transaction Entity Architecture, i.e., HAT of wG4.3-EA.

FIG. 40 cFGP Expert-Station-HCS

As shown in FIG. 40*a&b*, a preferred 6-wBBB-architected 3Channel-Cognitive Fine-Grained-Proactive-Contract Expert-Station based HCS is created, where 1.BAB, 2.BFB, 3.MMB, 4.MFB, 5.TCB and 6.TFB are constructed by Solution-based wCMs, Job-wEntity-based wCMs and WSA-based wCCs, as illustrated by the following HCM-6 Table.

| HCM-6: 6BBB | wCMs | Abbr. Name | Description |
|---|---|---|---|
| 1.BAB= | | | Base Attribute Block |
| | wCM(390) | 390-C.1 | Chain4-XP1 (down-left corner-entry) |
| | wCM(390) | 390-R1.(1-3) | Chain4-Ribbon1.(1-3)-XP |
| | wCM(390) | 390-R3.(1-3) | Chain4-Ribbon3.(1-3)-XP |
| | wCM(410) | 410-G.1 | Glue4-XP1 (down-right corner-entry) |
| | wCM(410) | 410-R2.(1-3) | Glue4-Ribbon2.(1-3)-XP |
| | wCM(410) | 410-R4.(1-3) | Glue4-Ribbon4.(1-3)-XP |
| | wCM(530) | MS-XP(a-h) | MembraneM-Solution Execution Pylon(a-h) |

-continued

| HCM-6: 6BBB | wCMs | Abbr. Name | Description |
|---|---|---|---|
| 3.MMB= | | | Mid Memory Block |
| | wCM(81) | mWSA6p1 | memory Workgroup Server Array type2-version6/part1 |
| | wCM(83) | mWSA7p1(a-k) | memory Workgroup Server Array type2-version7/part1(a-k) |
| 5.TCB= | | | Top Control Block |
| | wCM(390) | 390-C.2 | Chain4-XP2 (top-left corner-entry) |
| | wCM(390) | 390-R1.4 | Chain4-Ribbon1.3-XP |
| | wCM(390) | 390-R3.(4-7) | Chain4-Ribbon3.(4-7)-XP |
| | wCM(390) | 390-R5.(1-5) | Chain4-Ribbon5.(1-5)-XP |
| | wCM(390) | 390-R6.(1-4) | Chain4-Ribbon6.(1-4)-XP |
| | wCM(410) | 410-G.2 | Glue4-XP2 (top-right corner-entry) |
| | wCM(410) | 410-R2.4 | Glue-4-Ribbon2.(4-7)-XP |
| | wCM(410) | 410-R4.(4-7) | Glue-4-Ribbon4.(4-7)-XP |
| | wCM(410) | 410-R7.(1-4) | Glue-4-Ribbon7.(1-4)-XP |

| HCM-6: 6BBB | wCCs + wCMs | Abbr. Name | Description |
|---|---|---|---|
| 2.BFB-L= | | | Base Failover Block-Left |
| | wCM(540) | MembraneM-FP(a-d) | Interactive Transaction-Failover Pylon (a-d) |
| | wCM(400) | 400-C.1 | Chain4-FP1 |
| | wCM(400) | 400-R1.(1-3) | Chain4-Ribbon1.(1-3)-FP |
| | wCM(400) | 400-R3.(1-3) | Chain4-Ribbon3.(1-3)-FP |
| | wCC(9) | TaP1m(1-2)-L | Team attribute Processor manager(1-2)-Left |
| 2.BFB-R= | | | Base Failover Block-Right |
| | wCM(540) | MembraneM-FP(e-h) | MembraneM-Failover Pylon(e-h) |
| | wCM(420) | 420-G.1 | Glue4 × (1)-FP |
| | wCM(420) | 420-R2.(1-3) | Glue4-Ribbon2.(1-2)-FP |
| | wCM(420) | 420-R4.(1-3) | Glue4-Ribbon4.(1-2)-FP |
| | wCC(9) | TaP1m(1-2)-R | Team attribute Processor manager(1-2)-Right |
| 4.MFB-L= | | | Mid Failover Block-Left |
| | wCM(84) | mWSA7p2(a-f) | memory Workgroup Server Array type2-version7/part2(a-f) |
| | wCM(82) | mWSA6p2 | memory Workgroup Server Array type2-version6/part2 |
| | wCC(29) | TmP1m(1-2)-L | Team memory Processor manager type1 (1-2)-L |
| 4.MFB-R= | | | Mid Failover Block-Right |
| | wCM(84) | mWSA7p2(g-k) | memory Workgroup Server Array type2-version7/part2(g-k) |
| | wCC(29) | TmP1m(1-2)-R | Team memory Processor manager type1 (1-2)-R |
| 6.TFB-L= | | | Top Failover Block-Left |
| | wCC(49) | TcP1m(1-2)-L | Team control Processor manager type1 (1-2)-Left |
| | wCM(400) | 400-C.2 | Chain4 × (1)-FP |
| | wCM(400) | 400-R1.4 | Chain4-Ribbon1.4-FP |
| | wCM(400) | 400-R3.(4-7) | Chain4-Ribbon3.(4-7)-FP |
| | wCM(400) | 400-R5.(1-5) | Chain4-Ribbon5.(1-5)-FP |
| | wCM(400) | 400-R6.(1-4) | Chain4-Ribbon6.(1-4)-FP |
| 6.TFB-R= | | | Top Failover Block-Right |
| | wCC(49) | TcP1m(1-2)-R | Team control Processor manager type 1(1-2)-Right |
| | wCM(420) | 420-G.2 | Glue4 × (1)-FP |
| | wCM(420) | 420-R2.4 | Glue4-Ribbon2.4-FP |
| | wCM(420) | 420-R4.(4-7) | Glue4-RIbbon4.(4-7)-FP |
| | wCM(420) | 420-R7.(1-4) | Glue4-RIbbon7.(1-4)-FP |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred CPE Contract-HCS=wCM(610+620), as illustrated by the following HAM-5 Table.

| HAM-5 Module: wCM( ) | Abbr. Name | Description |
|---|---|---|
| BF: wCM( ) (1.BAB + 2.BFB-L&R) | Base Framework | Agg via base WL3-bundle |
| MF: wCM( ) (3.MMB + 4.MFB-L&R) | Mid-Framework | Agg via mid WL3-bundle |
| TF: wCM( ) (5.TCB + 6.TFB-L&R) | Top-Framework | Agg via top WL3-bundle |
| XP: wCM(610) (1.BAB + 3.MMB + 5.TCB) | cFGP-CES-XP | Cognitive Fine-Grained Proactive Contract Expert-Station Execution Pylon: Agg via WL1, WL2 |
| FP-L: wCM(620) (2.BFB + 4.MFB + 6.TFB) | cFGP-CES-FP-L | cFGP Contract Expert-Station Failover Pylon-Left: Agg via WL4 |
| FP-R: wCM(620) (2.BFB + 4.MFB + 6.TFB) | cFGP-CES-FP-R | cFGP Contract Expert-Station Failover Pylon-Right: Agg via WL4 |
| XP + FP-L&R: wCM(610 + 620-L&R) | cFGP-CES-HCS | cFGP Contract Expert-Station Hierarchical Core Structure |

-continued

From the hardware configuration point of view, the cFGP-Contract wEntity-based HCS is "equipped" with an internal "cFGP Expert-Station Skeleton", which comprises a base-level BAB, i.e., a (m=3, n=4)-Assembly Block, a Mid-level MMB, i.e., a (base=4, top=5, left=1, right=1) Assembly Conveyer and a top-level TCB, i.e., a (x>4=n, y=7) Assembly Tree. Consequently, the fail-over complement BFB, MFB and TFB will evolve accordingly based on the fail-over evolutionary architecture.

In conclusion, the cFGP-Contract Expert-Station wEntity-based HCS is created based on the Hardware architecture theory of the workgroup fourth-generation fourth-stage-based Contract-Transaction Entity Architecture, i.e., HAT of wG4.4-EA.

FIG. 41 cFGR Agent-Station-HCS

As shown in FIG. 41*a&b*, a preferred 6-wBBB-architected 3Channel-cognitive Fine-Grained-Reactive Contract Agent-Station based HCS is created, where 1.BAB, 2.BFB, 3b-MB, 4.MFB, 5.TCB and 6.TFB are constructed by Solution-based wCMs, Job-wEntity-based wCMs and WSA-based wCCs, as illustrated by the following HCM-6 Table.

| HCM-6: 6BBB | wCMs | Abbr. Name | Description |
|---|---|---|---|
| 1.BAB= | | | Base Attribute Block |
| | wCM(390) | 390-C.1 | Chain4-XP1 (down-left corner-entry) |
| | wCM(390) | 390-R1.(1-3) | Chain4-Ribbon1.(1-3)-XP |
| | wCM(390) | 390-R3.(1-3) | Chain4-Ribbon3.(1-3)-XP |
| | wCM(410) | 410-G.1 | Glue4-XP1 (down-right corner-entry) |
| | wCM(410) | 390-R2.(1-3) | Glue4-Ribbon2.(1-3)-XP |
| 3.MMB= | | | Mid Memory Block |
| | wCM(79) | mWSA5p1 | memory Workgroup Server Array type2-version5/part1 |
| | wCM(83) | mWSA7p1 (a-h) | memory Workgroup Server Array type2-version7/part1(a-h) |
| 5.TCB= | | | Top Control Block |
| | wCM(390) | 390-C.2 | Chain4-XP2 (top-left corner-entry) |
| | wCM(390) | 390-R1.4 | Chain4-Ribbon1.4-XP |
| | wCM(390) | 390-R3.(4-7) | Chain4-Ribbon3.(4-7)-XP |
| | wCM(390) | 390-R4.(1-5) | Chain4-Ribbon4.(1-5)-XP |
| | wCM(390) | 390-R5.(1-4) | Chain4-Ribbon5.(1-4)-XP |
| | wCM(410) | 410-G.2 | Glue4-XP2 (top-right corner-entry) |
| | wCM(410) | 410-R2.(4-7) | Glue-4-Ribbon2.(4-7)-XP |

| HCM-6: 6BBB | wCCs + wCMs | Abbr. Name | Description |
|---|---|---|---|
| 2.BFB-L= | | | Base Failover Block-Left |
| | wCM(400) | 400-C.1 | Chain4-FP1 |
| | wCM(400) | 400-R1.(1-3) | Chain4-Ribbon1.(1-3)-FP |
| | wCM(400) | 400-R3.(1-3) | Chain4-Ribbon3.(1-3)-FP |
| | wCC(9) | TaP1m(1-2)-L | Team attribute Processor manager (1-2)-Left |
| 2.BFB-R= | | | Base Failover Block-Right |
| | wCM(420) | 420-G.1 | Glue4-FP1 |
| | wCM(420) | 420-R2.(1-3) | Glue4-Ribbon2.(1-3)-FP |
| | wCC(9) | TaP1m(1-2)-R | Team attribute Processor manager (1-2)-Right |
| 4.MFB-L= | | | Mid Failover Block-Left |
| | wCM(84) | mWSA7p2(a-f) | memory Workgroup Server Array type2-version7/part2(a-f) |
| | wCM(80) | mWSA5p2 | memory Workgroup Server Array type2-version5/part2 |
| | wCC(29) | TmP1m(1-2)-L | Team memory Processor manager type1 (1-2)-L |

-continued

| HCM-6: 6BBB | wCCs + wCMs | Abbr. Name | Description |
|---|---|---|---|
| 4.MFB-R= | | | Mid Failover Block-Right |
| | wCM(84) | mWSA7p2(g-h) | memory Workgroup Server Array type2-version7/part2(g-h) |
| | wCC(29) | TmP1m(1-2)-R | Team memory Processor manager type1 (1-2)-R |
| 6.TFB-L= | | | Top Failover Block-Left |
| | wCC(49) | TcP1m(1-2)-L | Team control Processor manager (1-2)-Left |
| | wCM(400) | 400-C.2 | Chain4-FP2 |
| | wCM(400) | 400-R1.4 | Chain4-Ribbon1.4-FP |
| | wCM(400) | 400-R3.(4-7) | Chain4-Ribbon3.(4-7)-FP |
| | wCM(400) | 400-R4.(1-5) | Chain4-Ribbon4.(1-5)-FP |
| | wCM(400) | 400-R5.(1-4) | Chain4-Ribbon5.(1-4)-FP |
| 6.TFB-R= | | | Top Failover Block-Right |
| | wCC(49) | TcP1m(1-2)-R | Team control Processor manager (1-2)-Right |
| | wCM(420) | 420-G.2 | Glue4-FP2 |
| | wCM(420) | 420-R2.(4-7) | Glue4-Ribbon2.(4-7)-FP |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred CRA Contract-HCS=wCM(630+640), as illustrated by the following HAM-5 Table.

| HAM-5 Module: wCM( ) | Abbr. Name | Description |
|---|---|---|
| BF: wCM( ) (1.BAB + 2.BFB-L&R) | Base Framework | Agg via base WL3-bundle |
| MF: wCM( ) (3.MMB + 4.MFB-L&R) | Mid-Framework | Agg via mid WL3-bundle |
| TF: wCM( ) (5.TCB + 6.TFB-L&R) | Top-Framework | Agg via top WL3-bundle |
| XP: wCM(630) (1.BAB + 3.MMB + 5.TCB) | cFGR-CAS-XP | Cognitive Fine-Grained Reactive Contract Agent-Station Execution Pylon: Agg via WL1, WL2 |
| FP-L: wCM(640) (2.BFB + 4.MFB + 6.TFB) | cFGR-CAS-FP-L | cFGR Contract Agent-Station Failover Pylon-Left: Agg via WL4 |
| FP-R: wCM(640) (2.BFB + 4.MFB + 6.TFB) | cFGR-CAS-FP-R | cFGR Contract Agent-Station Failover Pylon-Right: Agg via WL4 |
| XP + FP-L&R: wCM(630 + 640-L&R) | cFGR-CAS-HCS | cFGR Contract Agent-Station Hierarchical Core Structure |

From the hardware configuration point of view, the cFGR-Contract wEntity-based HCS is "equipped" with an internal "cFGR Agent Station Skeleton", which comprises a base-level BAB, i.e., a (m=3, n=3)-Assembly Block, a Mid-level MMB, i.e., a (base=3, top=4, left=1) Assembly Conveyer and a top-level TCB, i.e., a (x=3, y=5) Assembly Tree. Consequently, the fail-over complement BFB, MFB and TFB will evolve accordingly based on the fail-over evolutionary architecture.

In conclusion, the cFGR-Contract Agent-station wEntity-based HCS is created based on the Hardware architecture theory of the workgroup fourth-generation fifth-stage-based Contract-Transaction Entity Architecture, i.e., HAT of wG4.5-EA.

FIG. 42 cFGP Agent-3Station-HCS

As shown in FIG. 42*a&b*, a preferred 6-wBBB-architected 3Channel-Cognitive Fine-Grained-Proactive-Contract Agent-Station based HCS is created, where 1.BAB, 2.BFB, 3.MMB, 4.MFB, 5.TCB and 6.TFB are constructed by Solution-based wCMs, Job-wEntity-based wCMs and WSA-based wCCs, as illustrated by the following HCM-6 Table.

| HCM-6: 6BBB | wCMs | Abbr. Name | Description |
|---|---|---|---|
| 1.BAB= | | | Base Attribute Block |
| | wCM(390) | 390-C.1 | Chain4-XP1 (down-left corner-entry) |
| | wCM(390) | 390-R1.(1-3) | Chain4-Ribbon1.(1-3)-XP |
| | wCM(390) | 390-R3.(1-3) | Chain4-Ribbon3.(1-3)-XP |
| | wCM(410) | 410-G.1 | Glue4-XP1 (down-right corner-entry) |
| | wCM(410) | 410-R2.(1-3) | Glue4-Ribbon2.(1-3)-XP |
| | wCM(410) | 410-R4.(1-3) | Glue4-Ribbon4.(1-3)-XP |
| 3.MMB= | | | Mid Memory Block |
| | wCM(81) | mWSA6p1 | memory Workgroup Server Array type2-version6/part1 |
| | wCM(83) | mWSA7p1(a-k) | memory Workgroup Server Array type2-version7/part1(a-k) |
| 5.TCB= | | | Top Control Block |
| | wCM(390) | 390-C.2 | Chain4-XP2 (top-left corner-entry) |
| | wCM(390) | 390-R1.4 | Chain4-Ribbon1.3-XP |
| | wCM(390) | 390-R3.(4-8) | Chain4-Ribbon3.(4-8)-XP |
| | wCM(390) | 390-R5.(1-6) | Chain4-Ribbon5.(1-6)-XP |
| | wCM(390) | 390-R6.(1-5) | Chain4-Ribbon6.(1-5)-XP |
| | wCM(410) | 410-G.2 | G1ue4 × (1)-XP (top-right corner-entry) |

-continued

| HCM-6: 6BBB | wCMs | Abbr. Name | Description |
|---|---|---|---|
| | wCM(410) | 410-R2.4 | Glue-4-Ribbon2.(4-7)-XP |
| | wCM(410) | 410-R4.(4-8) | Glue-4-Ribbon4.(4-8)-XP |
| | wCM(410) | 410-R7.(1-5) | Glue-4-Ribbon7.(1-5)-XP |

| HCM-6: 6BBB | wCCs + wCMs | Abbr. Name | Description |
|---|---|---|---|
| 2.BFB-L= | | | Base Failover Block-Left |
| | wCM(400) | 400-C.1 | Chain4-FP1 |
| | wCM(400) | 400-R1.(1-3) | Chain4-Ribbon1.(1-3)-FP |
| | wCM(400) | 400-R3.(1-3) | Chain4-Ribbon3.(1-3)-FP |
| | wCC(9) | TaP1m(1-2)-L | Team attribute Processor manager(1-2)-Left |
| 2.BFB-R= | | | Base Failover Block-Right |
| | wCM(420) | 420-G.1 | Glue4-FP1 |
| | wCM(420) | 420-R2.(1-3) | Glue4-Ribbon2.(1-3)-FP |
| | wCM(420) | 420-R4.(1-3) | Glue4-Ribbon4.(1-3)-FP |
| | wCC(9) | TaP1m(1-2)-R | Team attribute Processor manager(1-2)-Right |
| 4.MFB-L= | | | Mid Failover Block-Left |
| | wCM(84) | mWSA7p2(a-f) | memory Workgroup Server Array type2 version7/part2(a-f) |
| | wCM(82) | mWSA6p2 | memory Workgroup Server Array type2-version6/part2 |
| | wCC(29) | TmP1m(1-2)-L | Team memory Processor manager type1 (1-2)-L |
| 4.MFB-R= | | | Mid Failover Block-Right |
| | wCM(84) | mWSA7p2(g-k) | memory Workgroup Server Array version7/part2(g-k) |
| | wCC(29) | TmP1m(1-2)-R | Team memory Processor manager type1 (1-2)-R |
| 6.TFB-L= | | | Top Failover Block-Left |
| | wCC(49) | TcP1m(1-2)-L | Team control Processor manager type1 (1-2)-Left |
| | wCM(400) | 400-C.2 | Chain4-FP2 |
| | wCM(400) | 400-R1.4 | Chain4-Ribbon1.4-FP |
| | wCM(400) | 400-R3.(4-8) | Chain4-Ribbon3.(4-8)-FP |
| | wCM(400) | 400-R5.(1-6) | Chain4-Ribbon4.(1-6)-FP |
| | wCM(400) | 400-R6.(1-5) | Chain4-Ribbon5.(1-5)-FP |
| 6.TFB-R= | | | Top Failover Block-Right |
| | wCC(49) | TcP1m(1-2)-R | Team control Processor manager type1 (1-2)-Right |
| | wCM(420) | 420-G.2 | Glue4-FP2 |
| | wCM(420) | 420-R2.4 | Glue4-Ribbon2.4-FP |
| | wCM(420) | 420-R4.(4-8) | Glue4-RIbbon4.(4-8)-FP |
| | wCM(420) | 420-R7.(1-5) | Glue4-RIbbon7.(1-5)-FP |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred CPA Contract-HCS=wCM(650+660), as illustrated by the following HAM-5 Table.

| HAM-5 Module: wCM( ) | Abbr. Name | Description |
|---|---|---|
| BF: wCM( ) (1.BAB + 2.BFB-L&R) | Base Framework | Agg via base WL3-bundle |
| MF: wCM( ) (3.MMB + 4.MFB-L&R) | Mid-Framework | Agg via mid WL3-bundle |
| TF: wCM( ) (5.TCB + 6.TFB-L&R) | Top-Framework | Agg via top WL3-bundle |
| XP: wCM(650) (1.BAB + 3.MMB + 5.TCB) | cFGP-CAS-XP | Cognitive Fine-Grained Proactive Contract Agent-Station Execution Pylon: Agg via WL1, WL2 |
| FP-L: wCM(660) (2.BFB + 4.MFB + 6.TFB) | cFGP CAS-FP-L | cFGP Contract Agent-Station Failover Pylon-Left: Agg via WL4 |
| FP-R: wCM(660) (2.BFB + 4.MFB + 6.TFB) | cFGP CAS-FP-R | cFGP Contract Agent-Station Failover Pylon-Right: Agg via WL4 |

-continued

| HAM-5 Module: wCM( ) | Abbr. Name | Description |
|---|---|---|
| XP + FP-L&R: wCM(650 + 660-L&R) | cFGP CAS-HCS | cFGP Contract Agent-Station Hierarchical Core Structure |

From the hardware configuration point of view, the cFGP-Contract wEntity-based HCS is "equipped" with an internal "cFGP Agent-Station Skeleton", which comprises a base-level BAB, i.e., a (m=3, n=4)-Assembly Block, a Mid-level MMB, i.e., a (base=4, top=5, left=1, right=1) Assembly Conveyer and a top-level TCB, i.e., a (x>4=n, y=7) Assembly Tree. Consequently, the fail-over complement BFB, MFB and TFB will evolve accordingly based on the fail-over evolutionary architecture.

In conclusion, the cFGP-Contract Agent-station wEntity-based HCS is created based on the Hardware architecture theory of the workgroup fourth-generation sixth-stage-based Contract-Transaction Entity Architecture, i.e., HAT of wG4.6-EA.

5.5 Organization-Based Business-Service wEntities/wSystems, Enterprise vSystems and Business Service Platform 5.5.1 Real-Time Intelligent Business Operation Service Departments In a real world service-oriented enterprise environment, an ideal supply-side transaction-based department should comprise the following 3 types of specialty workgroup. They are 1) the base-level multiple supply-side expert workgroups to generate business operation-enabled services (BOS), 2) top-level front-end and back-end agent-workgroups to deliver business operational services (BOS) and 3) the top-level control workgroup to control expert-workgroups, agent-workgroups and all the base-level and top-level job-handling workgroups over the BOS-based activities to all the external service-oriented stakeholders.

In fact, there are 4 major external service-oriented stakeholders that are dependent on the department's services. They are 1) the front-end external Enterprise-customers for multi-contract-operation-based Portfolio services via the internal top-level Portfolio agents, 2) the back-end external divisional controllers for portfolio information and knowledge services via the internal top-level back-end Portfolio agents, 3) the front-end external other departmental experts via direct interaction with the internal base-level supply-side experts and 4) the back-end external divisional experts for directly accessing real-time contract- and portfolio-based information and knowledge library services generated by the base-level and top-level information and knowledge job-handlers.

Therefore, an ideal supply-side department facility, comprising multiple collaborative workgroups with automated equipments, must achieve its ultimate objective; that is "to real-time deliver fine-grained proactive supply-side "business operational services (BOS)" to its external stakeholders with multi-expert and multi-agent-combined intelligence, dubbed "real-time BOS-intelligence".

In order to achieve the ultimate objective, it is imperative that the following 3 sequential courses of action be carried out, involving mainly with how to formulate and utilize multi-expert-workgroup-based networks and multi-agent-workgroup-based networks.

The first course of action is to establish a department control workgroup and equip it with an aforementioned full-fledged cFGP-contract-based Agent-station HCS with internal XP-skeleton B(m,n=4)M(b=4, t=5, 1=1, r=1)T(x>4 and y=7).

The second course of action is to y-connect all the involved supply-side contract-expert-stations to the Job1 assembly-line in a 2D-matrix format, which is the best collaborative format for producing the best aggregate FGP-contractual services into the best FGP-Portfolio-services. In so doing, the new base-level Assembly-Block for generating portfolio services can be established. The new Job1 assembly-line together with Job2, job3 and job4 in the new assembly-block will generate contract-service-based language-dictionaries (via base-job3), contract command-manuals (via base-job1), routines/results/reports information libraries (via-base-job2) and demanders' contracts knowledge libraries (via-base-job4). Moreover, the top-level Assembly-tree will generate multi-contract-integrated portfolio-service-based language-dictionaries (via top-job3), command-manuals (via top-job1), information libraries (via top-job2) and demander's portfolio knowledge libraries (via top-job4).

In addition, local department control group can real-time exercise its manipulation over top-job1 to top-job4 via top-Job5 assembly-line.

The third course of action is to install with Agent-stations to replace the front-end and back-end dispatch-hubs. Consequently, a new top-level Assembly-Tree for delivering portfolio services can be established. These Portfolio-service Agent-stations can develop their own 4 transaction-based pre-execution, execution, supervision and post-supervision jobs, creating their own transaction-based language-dictionary, command-manual, routine-results-reports information libraries and demander-supplier knowledge libraries. Moreover, the front-end one or more paralleled Agent-station(s) can access all the Portfolio-service-based dictionaries, manuals, information libraries and knowledge libraries via Job6-assembly-line and the back-end one or more paralleled Agent-station(s) can also access all of them via Job7-assembly-line. For simplicity, there is only one representative front-end agent-station and one representative back-end Agent-station in all the following Agent-station-related implementations, besides two or more different-purposed agent-stations can be combined into one agent-station with different agents resided together and in some occasion, there are advantages due to sharing the same informations as well as knowledges.

Therefore, this type of business-operation-service (BOS)-capable "Department", equipped with 1) front-end top-corner multi-contract Portfolio-Agents, 2) back-end top-corner information/knowledge Portfolio-agents, 3) front-end base-corner multi-contract matrix-Experts and 4) back-end base-corner multi-library Jobbers based HCS to deliver all the real-time fine-grained-proactive (FGP) business-operation-services to its service-oriented stakeholders under the top-level control workgroup, can be considered "real-time 4-corner-entry BOS-intelligent".

Based on the aforementioned rational courses of actions for creating real-time intelligent Portfolio-Agent-based workgroup systems to equip an ideal collaborative Department facility and together with the usage of wG4-wEAs, the third workgroup evolutionary principle (wEP3) is thus established to bring forth the fifth-generation/first-stage "Department-facility-based" workgroup Entity Architecture (wG5.1-wEA) that comprises the following 6 mandates for creating all the potential "workgroup-business-operation-service-based" "Portfolio-wEntities".

Mandate-1: the must-have 6 Portfolio-wEntity-based workgroup Basic Building Blocks (Portfolio-6BBBs), which can be constructed by using the "standard Contract-HCSs", as illustrated from FIG. 27 to FIG. 32, together with standard Case-HCSs, Job1-HCSs, Job2-HCSs and WSAs;

Mandate-2: the must-have Portfolio-wEntity-based Hierarchical Core Structure (Portfolio-HCS) by aggregating Portfolio-6BBBs with workgroup four linkages and bundles;

Mandate-3: the must-have Portfolio-wEntity-based Hardware Architecture Theory (Portfolio-HAT) with related methods in constructing Portfolio-6BBBs and in aggregating them into Portfolio-HCSs;

Mandate-4: the must-have Portfolio-wEntity-oriented OS (Portfolio-OS) to equip Portfolio-HCS into Portfolio-wEntity-oriented Core Structure (Portfolio-ECS);

Mandate-5: the must-have Portfolio-wEntity domain programs (Portfolio-DPs) to equip Portfolio-ECS into Portfolio-wEntity-oriented Domain Structure (Portfolio-EDS); and Mandate-6: the must-have Portfolio-wEntity-based Software Architecture Theory (Portfolio-SAT) with related software methods in generating Portfolio-OSs and Portfolio-DPs.

By abiding the third mandate of wEP3.wG5.1 evolutionary architecture, the fifth generation/first-stage Theoretic Foundation (wTF3.wG5.1) can be derived, which contains a Portfolio-wEntity-based Hardware Architecture Theory (Portfolio-HAT) that comprises multiple Hardware Construction Methods (HCMs) in creating Portfolio-6BBBs and multiple Hardware Aggregation Methods (HAMs) in creating Portfolio-HCSs.

In addition, by abiding the sixth mandate of wEP3.wG5.1 evolutionary architecture, the fifth generation/first-stage workgroup Theoretic Foundation (wTF3.wG5.1) can be extended to include a Portfolio-wEntity-oriented Software Architecture Theory (Portfolio-SAT), which comprises multiple Portfolio-wEntity OS-oriented software Integration Methods (EIMs) in generating Portfolio-OSs and multiple Portfolio-wEntity domain-oriented software Programming Methods (EPMs) in real-time generating Portfolio-DPs.

It can be concluded that by fulfilling the fifth-generation first-stage Portfolio-wEntity based Architecture (i.e., wG5.1-wEA) and carrying out wTF3.wG5.1-(HAT/SAT), a series of "fail-safe" Portfolio-wEntities with various degrees of real-time workgroup business-operation-service-based intelligence can be created. However, based on the aforementioned standard Contract-wEntities as the basic components to warrant the solidity and completeness of wG5.1-wEA, there is only one standard "fail-safe" Portfolio-wEntity that is needed, due to one standard "4-corner-entry-full-fledged" Hierarchical Core Structure (HCS) by using only the most advanced cognitive FGP-Contract-HCSs, as illustrated by FIG. 33*a&b*.

Furthermore, the standard full-fledged Portfolio-wEntity can further be built into real-world "standardized real-time BOS-(business-operation-service) intelligent Portfolio-Agent-based Department wSystems" based on wG5.1 portfolio-operation-service-based System Disciplines (wG5.1-posSD), which will populate the fifth generation of real-world service-oriented workgroup evolutionary pathway and eventually achieve the ideal real-world department facility's ultimate objective, as defined earlier.

FIG. 43*a&b* Preferred Organization-Portfolio Department wEntity-Based Standard HCSs As shown in FIG. 43*a&b*, a standard 6-wBBB-architected 4-corner-entry full-fledged Portfolio-HCS is created, where 1.BAB, 2.BFB, 3.MMB, 4.MFB, 5.TCB and 6.TFB are constructed by using the Cognitive fine-grained-Proactive-Expert-stations (CPE) and Cognitive fine-grained Proactive Agent-stations (CPA), Contract-HCSs, Job-HCSs and WSAs, as illustrated by the following HCM-6 Table.

| HCM-6: 6BBB | wCMs | Abbr. Name | Description |
|---|---|---|---|
| 1.BAB= | | | Base Attribute Block |
| | wCM(390) | 390-C.1 | Chain4-XP1 (down-left corner-entry) |
| | wCM(390) | 390-R1.(1-3) | Chain4-Ribbon1.(1-3)-XP |
| | wCM(390) | 390-R3.(1-3) | Chain4-Ribbon3.(1-3)-XP |
| | wCM(410) | 410-G.1 | Glue4-XP1 (down-right corner-entry) |
| | wCM(410) | 410-R2.(1-3) | Glue4-Ribbon2.(1-3)-XP |
| | wCM(410) | 410-R4.(1-3) | Glue4-Ribbon4.(1-3)-XP |
| | wCM(610) | 610-CPE-XP expandable | Cognitive fine-grained Proactive contract Expert station eXecution Pylon (real-time expandable) |
| 3.MMB= | | | Mid Memory Block |
| | wCM(81) | mWSA6p1 | memory Workgroup Server Array version6/part1 |
| | wCM(83) | mWSA7p1(a-k) | memory Workgroup Server Array version7/part1(a-k) |
| 5.TCB= | | | Top Control Block |
| | wCM(390) | 390-R1.4 | Chain4-Ribbon1.4-XP |
| | wCM(390) | 390-R3.(4-6) | Chain4-Ribbon3.(4-6)-XP |
| | wCM(390) | 390-R5.(1-4) | Chain4-Ribbon5.(1-4)-XP |
| | wCM(390) | 390-R6.(1-3) | Chain4-Ribbon6.(1-3)-XP |
| | wCM(410) | 410-R2.4 | Glue-4-Ribbon2.4-XP |
| | wCM(410) | 410-R4.(4-6) | Glue-4-Ribbon4.(4-6)-XP |
| | wCM(410) | 410-R7.(1-3) | Glue-4-Ribbon7.(1-3)-XP |
| | wCM(650) | 650-CPA-XP-L | Cognitive fine-grained Proactive contract Agent station eXecution Pylon-Left (top-left corner-entry) |
| | wCM(650) | 650-CPA-XP-R | Cognitive fine-grained Proactive contract Agent station eXecution Pylon-Right (top-right corner-entry) |

| HCM-6: 6BBB | wCCs + wCMs | Abbr. Name | Description |
|---|---|---|---|
| 2.BFB-L= | | | Base Failover Block-Left |
| | wCM(400) | 400-C.1 | Chain4-FP1 |
| | wCM(400) | 400-R1.(1-3) | Chain4-Ribbon1.(1-3)-FP |
| | wCM(400) | 400-R3.(1-3) | Chain4-Ribbon3.(1-3)-FP |
| | wCC(9) | TaP1m(1-2)-L | Team attribute Processor manager(1-2)-Left |
| | wCM(620) | 620-CPE-FP-L | Cognitive fine-grained Proactive contract Expert station Failover-Pylon-Left |
| 2.BFB-R= | | | Base Failover Block-Right |
| | wCM(420) | 420-G.1 | Glue4-FP1 |
| | wCM(420) | 420-R2.(1-3) | Glue4-Ribbon2.(1-3)-FP |
| | wCM(420) | 420-R4.(1-3) | Glue4-Ribbon4.(1-3)-FP |
| | wCC(9) | TaP1m(1-2)-R | Team attribute Processor manager(1-2)-Right |
| 4.MFB-L= | | | Mid Failover Block-Left |
| | wCM(84) | mWSA7p2(a-f) | memory Workgroup Server Array version7/part2(a-f) |

-continued

| | | | |
|---|---|---|---|
| | wCM(82) | mWSA6p2 | memory Workgroup Server Array version6/part2 |
| | wCC(29) | TmP1m(1-2)-L | Team memory Processor manager type1 (1-2)-L |
| 4.MFB-R= | | | Mid Failover Block-Right |
| | wCM(84) | mWSA7p2(g-k) | memory Workgroup Server Array version7/part2(g-k) |
| | wCC(29) | TmP1m(1-2)-R | Team memory Processor manager type1 (1-2)-R |
| 6.TFB-L= | | | Top Failover Block-Left |
| | wCC(49) | TcP1m(1-2)-L | Team control Processor manager type1 (1-2)-Left |
| | wCM(400) | 400-R1.4 | Chain4-Ribbon1.4-FP |
| | wCM(400) | 400-R3.(4-6) | Chain4-Ribbon3.(4-6)-FP |
| | wCM(400) | 400-R5.(1-4) | Chain4-Ribbon4.(1-4)-FP |
| | wCM(400) | 400-R6.(1-3) | Chain4-Ribbon5.(1-3)-FP |
| | wCM(660) | 660-CPA-FP-L | Cognitive fine-grained Proactive contract Agent station Failover Pylon-Left |
| 6.TFB-R= | | | Top Failover Block-Right |
| | wCC(49) | TcP1m(1-2)-R | Team control Processor manager type1 (1-2)-Right |
| | wCM(420) | 420-R2.4 | Glue4-Ribbon2.4-FP |
| | wCM(420) | 420-R4.(4-6) | Glue4-RIbbon4.(4-6)-FP |
| | wCM(420) | 420-R7.(1-3) | Glue4-RIbbon7.(1-3)-FP |
| | wCM(660) | 660-CPA-FP-R | Cognitive fine-grained Proactive contract Agent station Failover Pylon-Right |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred full-fledged expandable-Department-based Portfolio-HCS=wCM(710+720), as illustrated by the following HAM-5 Table.

| HAM-5 Module: wCM( ) | Abbr. Name | Description |
|---|---|---|
| BF: wCM( ) (1.BAB + 2.BFB-L&R) | Base Framework | Agg via base WL3-bundle |
| MF: wCM( ) (3.MMB + 4.MFB-L&R) | Mid-Framework | Agg via mid WL3-bundle |
| TF: wCM( ) (5.TCB + 6.TFB-L&R) | Top-Framework | Agg via top WL3-bundle |
| XP: WCM(710) (1.BAB + 3.MMB + 5.TCB) | Portfolio-XP | Portfolio Execution Pylon: Agg via WL1, WL2 |
| FP-L: wCM(720) (2.BFB + 4.MFB + 6.TFB) | Portfolio-FP-L | Portfolio Failover Pylon-Left: Agg via WL4 |
| FP-R: wCM(720) (2.BFB + 4.MFB + 6.TFB) | Portfolio-FP-R | Portfolio Failover Pylon-Right: Agg via WL4 |
| XP + FP-L&R: wCM(710 + 720-L&R) | Standard Portfolio-HCS | Standard Portfolio-Hierarchical Core Structure |

From the hardware configuration point of view, the standard business-operation service-capable Portfolio-wEntity-based HCS is equipped with a "self-growable Department skeleton", which comprises a base-level BAB, i.e., (m=tiers, n=4 assembly-lines)-Assembly Block, a Mid-level MMB, i.e., (b=4, t=5, 1=1, r=1) Assembly Conveyer and a top-level TCB, i.e., (x>4=n, y=7)-Assembly Tree, where parameter base-level m-tier and top-level x-tier can be expandable. Consequently, the fail-over complement BFB, MFB and TFB will evolve accordingly based on the fail-over evolutionary architecture.

5.5.2 Real-Time Intelligent Business Composition Service Divisions

In a real world "service-oriented" enterprise, an ideal multi-department-controlled "division" should comprise 3 types of specialty workgroups. They are 1) the base-level multiple portfolio supply-side expert-workgroups to generate multi-business-operation-based business composition-enabled services (BCS), 2) the top-level multiple transaction-agent workgroups to deliver business composition services (BCS) and 3) the top-level control workgroup to control expert workgroups, agent workgroups and all the base-level and top-level job-handling workgroups over the BCS-based activities to all the external service-oriented stakeholders.

In fact, there are 4 major external service-oriented stakeholders that are dependent on the division's services. They are 1) the front-end external Enterprise-clients for multi-Portfolio composition-based "Project" services via interaction with the internal top-level front-end Project-agents, 2) the back-end external division-Office controllers for project information and knowledge services via interaction with the internal top-level back-end Project-agents, 3) the front-end external other division experts via direct interaction with the internal base-level experts and 4) the back-end external division-Office experts via directly accessing the real-time Portfolio- and Project-based information and knowledge library services generated by the internal base-level and top-level information and knowledge job-handlers.

Therefore, an ideal multi-department-controlled "division facility", comprising multiple divisional workgroups with automated equipments, must achieve its ultimate objective; that is "to real-time deliver supply-side "business compositional services (BCS)" to its external stakeholders with multi-expert and multi-agent combined intelligence, dubbed "real-time BCS-intelligent".

In order to achieve the ultimate objective, it is imperative that the following 3 sequential courses of action be carried out, involving mainly with how to formulate and utilize multi-expert-workgroup-based networks and multi-agent-workgroup-based networks.

The first course of action is to establish a division control workgroup and equip it with cognitive-proactive-contract Agent-station HCS with internal skeleton B(m,n=4)M(b=4, t=5, 1=1, r=1)T(x>4=n and y=7).

The second course of action is to y-connect all the involved supply-side portfolio-expert-stations to the Job-1 2-tiered assembly-line in a 2D-matrix format, where the top tier assembly-unit is populated with multiple x-numbered portfolio-expert-stations that handles all the internal x-numbered departments and the bottom-tier assembly-unit is populated with y-numbered portfolio-expert-stations that handle all the external y-numbered divisions, producing the best aggregate FGP-portfolio services into the best FGP-Project-services. In so doing, the new base-level Assembly-Block for generating portfolio services can be established based on the multi-expert-cluster network. The new Job1 assembly-line together with Job2, job3 and job4 in the new assembly-block will generate portfolio-service-based language-dictionaries (via base-job3), command-manuals (via base-job1), routines/results/reports information libraries (via-base-job2) and portfolio-demanders' knowledge libraries (via-base-job4). Moreover, the top-level Assembly-tree will generate multi-portfolio-integrated project-service-based language-dictionaries (via top-job3), command-manuals (via top-job1), information libraries (via top-job2) and project-demanders' knowledge libraries (via top-job4). In addition, local division control group can real-time exercise its manipulation over top-job1 to top-job4 via top-Job5 assembly-line.

The third course of action is to install with Agent-stations to replace the front-end and back-end dispatch-hubs. Consequently, a new top-level Assembly-Tree for delivering project services can be established. These Project-service Agent-stations can develop their own 4 transaction-based pre-execution, execution, supervision and post-supervision jobs, creating their own transaction-based language-dictionary, command-manual, routine-results-reports information libraries and demanders' (suppliers') knowledge libraries. Moreover, the front-end Agent-station can access all the Project-service-based dictionaries, manuals, information libraries and knowledge libraries via Job6-assembly-line and the back-end Agent-station can also access all of them via Job7-assembly-line.

Therefore, this type of business composition-service-(BCS)-capable "division", equipped with 1) front-end top-corner multi-portfolio Project-Agents, 2) back-end top-corner information/knowledge Project-agents, 3) front-end base-corner multi-portfolio matrix-Experts and 4) back-end base-corner multi-library Jobbers based HCS to deliver all the real-time fine-grained-proactive (FGP) business composition services to its service-oriented stakeholders under the top-level control workgroup, can be considered "real-time 4-corner-entry BCS-intelligent".

Based on the aforementioned rational courses of action for creating real-time intelligent Project-Agent-based workgroup systems to equip an ideal collaborative Division-facility and together with the usage of workgroup-transaction-based wG4-wEAs, the third workgroup evolutionary principle (wEP3) is thus established to bring forth the fifth-generation/second-stage "Division facility-based" wEntity Architecture (wG5.2-wEA) that comprises the following 6 mandates for creating all the potential "workgroup business-composition-service-based" "Project-wEntities".

Mandate-1: the must-have 6 Project-wEntity-based workgroup Basic Building Blocks (6 wBBBs), which can be constructed by using the standard Contract-HCSs, as illustrated from FIG. 27 to FIG. 32, together with standard Case-HCSs, Job1-HCSs, Job2 HCSs and WSAs;

Mandate-2: the must-have Project-wEntity-based Hierarchical Core Structure (HCS) by aggregating Project-6BBBs with workgroup four linkages and bundles;

Mandate-3: the must-have Project-wEntity-based Hardware Architecture Theory (HAT) with related methods in constructing Project-6BBBs and in aggregating them into Project-HCSs;

Mandate-4: the must-have Project-wEntity-oriented OS (Project-OS) to equip Project-HCS into Project-wEntity-based Entity Core Structure (ECS);

Mandate-5: the must-have Project-wEntity-oriented Domain Programs (Project-DPs) to equip Project-ECS into Project-wEntity Domain Structure (Project-EDS); and Mandate-6: the must-have Project-wEntity-based Software Architecture Theory (Project-SAT) with related software methods in generating Project-OSs and Project-DPs.

By abiding the third mandate of wEP3.wG5.2 evolutionary architecture, the fifth generation/second-stage Theoretic Foundation (wTF3.wG5.2) can be derived, which contains a Project-wEntity-based Hardware Architecture Theory (Project-HAT) that comprises multiple Hardware Construction Methods (HCMs) in creating the Project-6BBBs and multiple Hardware Aggregation Methods (HAMs) in creating Project-HCSs.

In addition, by abiding the sixth mandate of wEP3.wG5.2 evolutionary architecture, the fifth generation/second-stage workgroup Theoretic Foundation (wTF3.wG5.2) can be extended to include a Project-wEntity-based Software Architecture Theory (Project-SAT), which comprises multiple Project-wEntity OS-oriented software Integration Methods (EIMs) in generating Project-OSs and Project-wEntity domain-oriented software Programming Methods (EPMs) in real-time generating Project-DPs.

It can be concluded that by fulfilling the fifth-generation second-stage Project-wEntity-based Architecture (i.e., wG5.2-wEA) and carrying out wTF3.wG5.2-(HAT/SAT), a series of "fail-safe" Project-wEntities with various degrees of real-time workgroup business-composition-service-based intelligence can be created. However, based on the aforementioned standard Contract-wEntities as the basic components to warrant the solidity and completeness of wG5.2-wEA, there is only one standard "fail-safe" Project-wEntity that is needed, due to one preferred "4-corner-entry" full-fledged Division-based standard Hierarchical Core Structures (HCS), as illustrated by FIG. 34*a*&*b*.

Furthermore, the full-fledged standard Project-wEntity can further be built into real-world "standardized real-time BCS-(business-composition-service) intelligent Project-Agent-based Division wSystems" based on wG5.2 project-composition-service-based System Disciplines (wG5.2-pcsSD), which will populate the fifth generation of real-world service-oriented workgroup evolutionary pathway and eventually achieve the ideal real-world division facility's ultimate objective, as defined earlier.

FIG. 44*a*&*b* Preferred Organization-Project Division-wEntity-Based Standard HCS As shown in FIG. 44*a*&*b*, a preferred 6-wBBB-architected "4-corner-entry-full-fledged" Project-HCS is created, where 1.BAB, 2.BFB, 3.MMB, 4.MFB, 5.TCB and 6.TFB are constructed by using the most advanced CPE and CPA Contract-HCSs, Job-HCSs and WSAs, as illustrated by the following HCM-6 Table.

| HCM-6: 6BBB | wCMs | Abbr. Name | Description |
|---|---|---|---|
| 1.BAB= | | | Base Attribute Block |
| | wCM(390) | 390-C.1 | Chain4-XP1 (down-left corner-entry) |
| | wCM(390) | 390-R1.(1-2) | Chain4-Ribbon1.(1-2)-XP |
| | wCM(390) | 390-R3.(1-2) | Chain4-Ribbon3.(1-2)-XP |
| | wCM(410) | 410-G.1 | Glue4-XP1 (down-right corner-entry) |

-continued

| HCM-6: 6BBB | wCMs | Abbr. Name | Description |
|---|---|---|---|
| | wCM(410) | 410-R2.(1-2) | Glue4-Ribbon2.(1-2)-XP |
| | wCM(410) | 410-R4.(1-2) | Glue4-Ribbon4.(1-2)-XP |
| | wCM(610) | 610-CPE-XP | Cognitive fine-grained Proactive contract Expert station eXecution Pylon (real-time expandable in number) |
| 3.MMB= | | | Mid Memory Block |
| | wCM(81) | mWSA6p1 | memory Workgroup Server Array version6/part1 |
| | wCM(83) | mWSA7p1(a-k) | memory Workgroup Server Array version7/part1(a-k) |
| 5.TCB= | | | Top Control Block |
| | wCM(390) | 390-R1.3 | Chain4-Ribbon1.3-XP |
| | wCM(390) | 390-R3.(3-5) | Chain4-Ribbon3.(3-5)-XP |
| | wCM(390) | 390-R5.(1-4) | Chain4-Ribbon5.(1-4)-XP |
| | wCM(390) | 390-R6.(1-3) | Chain4-Ribbon6.(1-3)-XP |
| | wCM(410) | 410-R2.3 | Glue-4-Ribbon2.3-XP |
| | wCM(410) | 410-R4.(3-5) | Glue-4-Ribbon4.(3-5)-XP |
| | wCM(410) | 410-R7.(1-3) | Glue-4-Ribbon7.(1-3)-XP |
| | wCM(650) | 650-CPA-XP-L | Cognitive fine-grained Proactive contract Agent station eXecution Pylon-Left (top-left corner-entry) |
| | wCM(650) | 650-CPA-XP-R | Cognitive fine-grained Proactive contract Agent station eXecution Pylon-Right (top-right corner-entry) |

| HCM-6: 6BBB | wCCs + wCMs | Abbr. Name | Description |
|---|---|---|---|
| 2.BFB-L= | | | Base Failover Block-Left |
| | wCM(400) | 400-C.1 | Chain4-FP1 |
| | wCM(400) | 400-R1.(1-2) | Chain4-Ribbon1.(1-2)-FP |
| | wCM(400) | 400-R3.(1-2) | Chain4-Ribbon3.(1-2)-FP |
| | wCC(9) | TaP1m(1-2)-L | Team attribute Processor manager(1-2)-Left |
| | wCM(620) | 620-CPE-FP-L | Cognitive fine-grained Proactive contract Expert station Failover-Pylon-Left |
| 2.BFB-R= | | | Base Failover Block-Right |
| | wCM(420) | 420-G.1 | Glue4-FP1 |
| | wCM(420) | 420-R2.(1-2) | Glue4-Ribbon2.(1-2)-FP |
| | wCM(420) | 420-R4.(1-2) | Glue4-Ribbon4.(1-2)-FP |
| | wCC(9) | TaP1m(1-2)-R | Team attribute Processor manager(1-2)-Right |
| 4.MFB-L= | | | Mid Failover Block-Left |
| | wCM(84) | mWSA7p2(a-f) | memory Workgroup Server Array version7/part2(a-f) |
| | wCM(82) | mWSA6p2 | memory Workgroup Server Array version6/part2 |
| | wCC(29) | TmP1m(1-2)-L | Team memory Processor manager type1 (1-2)-L |
| 4.MFB-R= | | | Mid Failover Block-Right |
| | wCM(84) | mWSA7p2(g-k) | memory Workgroup Server Array version7/part2(g-k) |
| | wCC(29) | TmP1m(1-2)-R | Team memory Processor manager type1 (1-2)-R |
| 6.TFB-L= | | | Top Failover Block-Left |
| | wCC(49) | TcP1m(1-2)-L | Team control Processor manager type1 (1-2)-Left |
| | wCM(400) | 400-R1.3 | Chain4-Ribbon1.3-FP |
| | wCM(400) | 400-R3.(3-5) | Chain4-Ribbon3.(3-5)-FP |
| | wCM(400) | 400-R5.(1-4) | Chain4-Ribbon4.(1-4)-FP |
| | wCM(400) | 400-R6.(1-3) | Chain4-Ribbon5.(1-3)-FP |
| | wCM(660) | 660-CPA-FP-L | Cognitive fine-grained Proactive contract Agent station Failover Pylon-Left |
| 6.TFB-R= | | | Top Failover Block-Right |
| | wCC(49) | TcP1m(1-2)-R | Team control Processor manager type1 (1-2)-Right |
| | wCM(420) | 420-R2.3 | Glue4-Ribbon2.3-FP |
| | wCM(420) | 420-R4.(3-5) | Glue4-RIbbon4.(3-5)-FP |
| | wCM(420) | 420-R7.(1-3) | Glue4-RIbbon7.(1-3)-FP |
| | wCM(660) | 660-CPA-FP-R | Cognitive fine-grained Proactive contract Agent station Failover Pylon-Right |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred full-fledged expandable Division-based Project-HCS=wCM (730+740), as illustrated by the following HAM-5 Table.

| HAM-5 Module: wCM( ) | Abbr. Name | Description |
|---|---|---|
| BF: wCM( ) (1.BAB + 2.BFB-L&R) | Base Framework | Agg via base WL3-bundle |
| MF: wCM( ) (3.MMB + 4.MFB-L&R) | Mid-Framework | Agg via mid WL3-bundle |
| TF: wCM( ) (5.TCB + 6.TFB-L&R) | Top-Framework | Agg via top WL3-bundle |
| XP: WCM(730) (1.BAB + 3.MMB + 5.TCB) | Project-XP | Project-Execution Pylon: Agg via WL1, WL2 |
| FP-L: wCM(740) (2.BFB + 4.MFB + 6.TFB) | Project-FP-L | Project -Failover Pylon-Left: Agg via WL4 |
| FP-R: wCM(740) (2.BFB + 4.MFB + 6.TFB) | Project-FP-R | Project -Failover Pylon-Right: Agg via WL4 |
| XP + FP-L&R: wCM(730 + 740-L&R) | Standard Project-HCS | Standard Project Hierarchical Core Structure |

From the hardware configuration point of view, the standard business-composition service-capable Project-wEntity-based HCS is equipped with a "self-growable Division skeleton", which comprises a base-level BAB, i.e., (m=2 tiers, n=4 assembly-lines)-Assembly Block, a Mid-level MMB, i.e., (b=4, t=5, 1=1, r=1) Assembly Conveyer and a top-level TCB, i.e., (x>4=n, y=7)-Assembly Tree, where parameter top-level x-tier can be expandable. Consequently, the fail-over complement BFB, MFB and TFB will evolve accordingly based on the fail-over evolutionary architecture.

5.5.3 Real-Time Intelligent Business-Management Service Offices

In a real world "service-oriented" enterprise", an ideal management "division-office" should comprise the following 3 types of specialty workgroup. They are 1) the base-level multiple project-monitoring expert-workgroups to generate multi-business-composition-based business management services (BMS), 2) top-level front-end and back-end agent-workgroups to deliver business management services (BMS) and 3) the top-level control workgroup to control expert workgroups, agent workgroups and all the internal base-level and top-level job-handling workgroups over the BMS-based activities to all the external service-oriented stakeholders.

In fact, there are 4 major external service-oriented stakeholders that are dependent on the division-Office's services. They are 1) the front-end external captive departmental and divisional controllers for multiple Project-management-based "Policy" services via interaction with the internal top-level front-end Policy-agents, 2) the back-end external Central-office controllers for policy-based information and knowledge services via interaction with the internal top-level back-end Policy-agents, 3) the front-end external divisional experts via direct interaction with the internal base-level experts and 4) the back-end external Central-office experts for directly-accessing the real-time project- and policy-based information and knowledge library services generated by the base-level and top-level information and knowledge job-handlers.

Therefore, an ideal real-time management "division-Office facility", comprising multiple collaborative workgroups with automated equipments, must achieve its ultimate objective; that is "to real-time deliver "business-management services" (BMS) to its external stakeholders with real-time multi-expert and multi-agent combined intelligence, dubbed "real-time BMS-intelligent".

In order to achieve the ultimate objective, it is imperative that the following 3 sequential courses of action be carried out, involving mainly with how to formulate and utilize multi-expert-workgroup-based networks and multi-agent-workgroup-based networks.

The first course of action is to establish a division-Office control workgroup and equip it with cognitive-proactive-contract Agent-station HCS with internal skeleton B(m,n=2) M(b=2, t=3)T(x>2=n and y=3).

The second course of action is to y-connect all the involved project-variable-based expert-stations to the Job-1 2-tiered assembly-line in a 2D-matrix format, where the bottom tier assembly-unit is populated with multiple x-numbered project-equation-based expert-stations that handles all the internal x-numbered department-initiated divisional-projects with weighted-value-variables and the top-tier assembly-unit is populated with y-numbered multi-project-formula-based expert-stations that handle all the y-numbered project-equations. In so doing, the new base-level Assembly-Block for generating project variable services can be established based on the multi-expert-cluster network.

The new Job1 assembly-line together with Job2, in the new assembly-block will generate project variable service-based real-time current-monitoring-status-information libraries (via base-job1), routines/results/reports knowledge libraries (via-base-job2). Moreover, the top-level Assembly-tree will generate multi-project-formula integrated policy-management service-based real-time management-information-libraries (via top-job1) and real-time management-knowledge libraries (via top-job2). In addition, local division-Office control workgroup can real-time exercise its manipulation over top-job1 to top-job2 via top-Job3 assembly-line.

The third course of action is to install with Agent-stations to replace the front-end and back-end dispatch-hubs. Consequently, a new top-level Assembly-Tree for delivering policy-management services can be established. These policy-management service Agent-stations can develop their own 4 transaction-based pre-execution, execution, supervision and post-supervision jobs, creating their own transaction-based language-dictionary, command-manual, routine-results-reports information libraries and demanders' (suppliers') knowledge libraries. Moreover, the front-end Agent-station can real-time access all the Policy service-based manuals, information libraries and via Job1-assembly-line and the back-end Agent-station can also access all of them via Job2-assembly-line.

Therefore, this type of business-management-service (BMS)-capable division-Office, equipped with 1) front-end top-corner multi-project Policy-Agents, 2) back-end top-corner information/knowledge Policy-agents, 3) front-end base-corner multi-project matrix-Experts and 4) back-end base-corner multi-library Jobbers based HCS to deliver all the real-time fine-grained-proactive (FGP) business-management services to its service-oriented stakeholders under the top-level control workgroup, can be considered "real-time 4-corner-entry BMS-intelligent".

Based on the aforementioned rational courses of action for creating real-time intelligent business Policy-Agent-based workgroup systems to equip an ideal collaborative division-Office facility and together with the usage of wG4-wEAs, the third workgroup evolutionary principle (wEP3) is thus established to bring forth the fifth-generation/third-stage "division-Office facility based" wEntity Architecture (wG5.3-wEA) that comprises the following 6 mandates for creating all the potential "workgroup business-management-service"-based "Policy-wEntities".

Mandate-1: the must-have 6 Policy-wEntity-based workgroup Basic Building Blocks (Policy-6BBBs), which can be constructed by using the standard Contract HCSs, as illustrated from FIG. 27 to FIG. 32, together with standard Case-HCSs, Job1-HCSs, Job2-HCSs and WSAs;

Mandate-2: the must-have Policy-wEntity-based Hierarchical Core Structure (HCS) by aggregating Policy-6BBBs with workgroup four linkages and bundles;

Mandate-3: the must-have Policy-wEntity-based Hardware Architecture Theory (Policy-HAT) with related methods in constructing Policy-6BBBs and in aggregating them into Policy-HCSs;

Mandate-4: the must-have Policy-wEntity-oriented OS (Policy-OS) to equip Policy-HCS into Policy-wEntity Core Structure (Policy-ECS);

Mandate-5: the must-have Policy-wEntity-oriented Domain Programs (Policy-DPs) to equip Policy-ECS into Policy-wEntity Domain Structure (Policy-EDS); and Mandate-6: the must-have Policy-wEntity-based Software Architecture Theory (Policy-SAT) with related software methods in generating Policy-OSs and Policy-DPs.

By abiding the third mandate of wEP3.wG5.3 evolutionary architecture, the fifth generation/third-stage Theoretic Foundation (wTF3.wG5.3) can be derived, which contains a Policy-wEntity-based Hardware Architecture Theory (Policy-HAT) that comprises multiple Hardware Construction Methods (HCMs) in creating Policy-6BBBs and multiple Hardware Aggregation Methods (HAMs) in creating Policy-HCSs.

In addition, by abiding the sixth mandate of wEP3.wG5.3 evolutionary architecture, the fifth generation/third-stage workgroup Theoretic Foundation (wTF3.wG5.3) can be extended to include a Policy-wEntity-based Software Architecture Theory (Policy-SAT), which comprises Policy-wEntity OS-oriented software Integration Methods (EIMs) in generating Policy-OSs and multiple Policy-wEntity domain-oriented software Programming Methods (EPMs) in real-time generating Policy-DPs.

It can be concluded that by fulfilling the fifth-generation third-stage Policy-wEntity-based wEntity Architecture (i.e., wG5.3-wEA) and carrying out wTF3.wG5.3-(HAT/SAT), a series of stage-evolved "fail-safe" Policy-wEntities with various degrees of real-time workgroup business management-service-based intelligence can be created. However, based on the aforementioned standard Contract wEntities as the basic components to warrant the solidity and completeness of wG5.3-wEA, there is only one standard "fail-safe" Policy-wEntity that is needed, due to one preferred "4-corner-entry" full-fledged division-Office-based standard Hierarchical Core Structures (HCS), as illustrated by FIG. 35*a*&*b*.

Furthermore, the full-fledged standard Policy-wEntity can further be built into real-world "standardized real-time BMS-(business-management-service) intelligent Policy-Office wSystems" based on wG5.3 policy-management-service-based System Disciplines (wG5.3-pmsSD), which will populate the fifth generation of real-world service-oriented workgroup evolutionary pathway and eventually achieve the ideal real-world division-Office facility's ultimate objective, as defined earlier.

FIG. 45*a*&*b* Preferred Organization-Policy Office-wEntity-Based Standard CS As shown in FIG. 45*a*&*b*, a preferred 6-wBBB-architected "4-corner-entry-full-fledged" Policy-HCS is created, where 1.BAB, 2.BFB, 3.MMB, 4.MFB, 5.TCB and 6.TFB are constructed by using the most advanced CPE and CPA Contract HCSs, Job-HCSs and WSAs, as illustrated by the following HCM-6 Table.

| HCM-6: 6BBB | wCMs | Abbr. Name | Description |
|---|---|---|---|
| 1.BAB= | | | Base Attribute Block |
| | wCM(390) | 390-C.1 | Chain4-XP1 (down-left corner-entry) |
| | wCM(390) | 390-R1.(1-2) | Chain4-Ribbon1.(1-2)-XP |
| | wCM(410) | 410-G.1 | Glue4-XP1 (down-right corner-entry) |
| | wCM(410) | 410-R2.(1-2) | Glue4-Ribbon2.(1-2)-XP |
| | wCM(610) | 610-CPE-XP | Cognitive fine-grained Proactive contract Expert station eXecution Pylon |
| 3.MMB= | | | Mid Memory Block |
| | wCM(77) | mWSA4p1 | memory Workgroup Server Array version4/part1 |
| | wCM(83) | mWSA7p1(a-e) | memory Workgroup Server Array version7/part1(a-e) |
| 5.TCB= | | | Top Control Block |
| | wCM(390) | 390-R1.(3-5) | Chain4-Ribbon1.(3-5)-XP |
| | wCM(390) | 390-R3.(1-4) | Chain4-Ribbon3.(1-4)-XP |
| | wCM(410) | 410-R2.(3-5) | Glue-4-Ribbon2.(3-5)-XP |
| | wCM(650) | 650-CPA-XP-L | Cognitive fine-grained Proactive contract Agent station eXecution Pylon-Left (top-left corner-entry) |
| | wCM(650) | 650-CPA-XP-R | Cognitive fine-grained Proactive contract Agent station eXecution Pylon-Right (top-right corner-entry) |

| HCM-6: 6BBB | wCCs + wCMs | Abbr. Name | Description |
|---|---|---|---|
| 2.BFB-L= | | | Base Failover Block-Left |
| | wCM(400) | 400-C.1 | Chain4-FP1 |
| | wCM(400) | 400-R1.(1-2) | Chain4-Ribbon1.(1-2)-FP |
| | wCC(9) | TaP1m(1-2)-L | Team attribute Processor manager(1-2)-Left |
| | wCM(620) | 620-CPE-FP-L | Cognitive fine-grained Proactive contract Expert station Failover-Pylon-Left |
| 2.BFB-R= | | | Base Failover Block-Right |
| | wCM(420) | 420-G.1 | Glue4-FP1 |
| | wCM(420) | 420-R2.(1-2) | Glue4-Ribbon2.(1-2)-FP |
| | wCC(9) | TaP1m(1-2)-R | Team attribute Processor manager(1-2)-Right |
| 4.MFB-L= | | | Mid Failover Block-Left |
| | wCM(84) | mWSA7p2(a-c) | memory Workgroup Server Array version7/part2(a-c) |
| | wCM(78) | mWSA4p2 | memory Workgroup Server Array version4/part2 |
| | wCC(29) | TmP1m(1-2)-L | Team memory Processor manager type1 (1-2)-L |

-continued

| HCM-6: 6BBB | wCCs + wCMs | Abbr. Name | Description |
|---|---|---|---|
| 4.MFB-R= | | | Mid Failover Block-Right |
| | wCM(84) | mWSA7p2(d-e) | memory Workgroup Server Array version7/part2(g-k) |
| | wCC(29) | TmP1m(1-2)-R | Team memory Processor manager type1 (1-2)-R |
| 6.TFB-L= | | | Top Failover Block-Left |
| | wCC(49) | TcP1m(1-2)-L | Team control Processor manager type1(1-2)-Left |
| | wCM(400) | 400-R1.(3-5) | Chain4-Ribbon1.(3-5)-FP |
| | wCM(400) | 400-R3.(1-4) | Chain4-Ribbon3.(1-4)-FP |
| | wCM(660) | 660-CPA-FP-L | Cognitive fine-grained Proactive contract Agent station Failover Pylon-Left |
| 6.TFB-R= | | | Top Failover Block-Right |
| | wCC(49) | TcP1m(1-2)-R | Team control Processor manager type1(1-2)-Right |
| | wCM(420) | 420-R2.(3-5) | Glue4-Ribbon2.(3-5)-FP |
| | wCM(660) | 660-CPA-FP-R | Cognitive fine-grained Proactive contract Agent station Failover Pylon-Right |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred full-fledged expandable Office-based Policy-HCS=wCM(750+760), as illustrated by the following HAM-5 Table.

| HAM-5 Module: wCM( ) | Abbr. Name | Description |
|---|---|---|
| BF: wCM( ) (1.BAB + 2.BFB-L&R) | Base Framework | Agg via base WL3-bundle |
| MF: wCM( ) (3.MMB + 4.MFB-L&R) | Mid-Framework | Agg via mid WL3-bundle |
| TF: wCM( ) (5.TCB + 6.TFB-L&R) | Top-Framework | Agg via top WL3-bundle |
| XP: WCM(750) (1.BAB + 3.MMB + 5.TCB) | Policy-XP | Policy-Execution Pylon: Agg via WL1, WL2 |
| FP-L: wCM(760) (2.BFB + 4.MFB + 6.TFB) | Policy-FP-L | Policy-Failover Pylon-Left: Agg via WL4 |
| FP-R: wCM(760) (2.BFB + 4.MFB + 6.TFB) | Policy-FP-R | Policy-Failover Pylon-Right: Agg via WL4 |
| XP + FP-L&R: wCM(750 + 760-L&R) | Standard Policy-HCS | Standard Policy-Hierarchical Core Structure |

From the hardware configuration point of view, the standard business-management service-capable Policy-wEntity-based HCS is equipped with a "self-growable Office skeleton", which comprises a base-level BAB, i.e., (m=tiers, n=2 assembly-lines)-Assembly Block, a Mid-level MMB, i.e., (b=2, t=3) Assembly Conveyer and a top-level TCB, i.e., (x>2=n, y=3)-Assembly Tree, where parameter base-level m-tier and top-level x-tier can be expandable. Consequently, the fail-over complement BFB, MFB and TFB will evolve accordingly based on the fail-over evolutionary architecture.

5.5.4 Real-Time Intelligent Business-Administration-Service Central-Office

In a real world "service-oriented" enterprise", an ideal "Central-office" should comprise the following 3 types of specialty workgroup. They are 1) the base-level front-end and back-end expert-workgroups to generate multi-business-management-based business administration services (BAS), 2) top-level front-end and back-end agent-workgroups to deliver business administration services (BAS) and 3) the top-level control-workgroup to control expert-workgroups, agent-workgroups and all the base-level and top-level job-handling workgroups over the BAS-based activities to all the external service-oriented stakeholders.

In fact, there are 4 major external service-oriented stakeholders that are dependent on the Central-office's services. They are 1) the front-end external division-Office controllers for multi-Policy administration-based "Strategy" services via interaction with the top-level front-end Strategy-agents, 2) the front-end external division-Office experts via direct interaction with the base-level front-end supply-side experts, 3) the back-end external Enterprise-consultants for providing external strategy-related informations and knowledges via interaction with the top-level back-end Strategy-agents and 4) the back-end external division-Offices', divisions' and departments' experts and controllers for real-time policy/strategy-related information/knowledge library services via Q/A-interactions with base-level back-end multi-library experts.

Therefore, an ideal real-time administration "Central-office facility", comprising multiple collaborative work-groups with automated equipments must achieve its ultimate objective; that is "to real-time deliver "business administration services" (BAS) to its external stakeholders with real-time multi-expert and multi-agent combined intelligence, dubbed "real-time BAS-Intelligent".

In order to achieve the ultimate objective, it is imperative that the following 3 sequential courses of action be carried out, involving mainly with how to formulate and utilize multi-expert-workgroup-based networks and multi-agent-workgroup-based networks.

The first course of action is to establish a Central-office control workgroup and equip it with cFGP-contract Agent-station HCS with internal skeleton B(m,n=2)M(b=2, t=3)T (x>2=n and y>=3).

The second course of action is to y-connect all the involved policy-variable-based expert-stations to the Job-1 2-tiered assembly-line in a 2D-matrix format, where the bottom tier assembly-unit is populated with multiple x-numbered policy-equation-based expert-stations that handles all the internal x-numbered division policies with weighted-value-variables and the top-tier assembly-unit is populated with y-numbered multi-policy-formula-based expert-stations that handle all the y-numbered policy-equations. In so doing, the new base-level Assembly-Block for generating policy variable services can be established based on the multi-expert-cluster network.

The new Job1 assembly-line together with Job2, in the new assembly-block will generate policy variable service-based command-manuals (via base-job1), routines/results/reports information libraries (via-base-job2). Moreover, the top-level Assembly-tree will generate multi-policy-formula integrated strategy-service-based command-manuals (via top-job1), information libraries (via top-job2) as well as external-trends knowledge-libraries (via top-job-x). In addition, local Central-office control workgroup can real-time exercise its manipulation over top-job1, top-job2, to top-job-x via top-Job3 assembly-line.

The third course of action is to install with Agent-stations to replace the front-end and back-end dispatch-hubs. Consequently, a new top-level Assembly-Tree for delivering Strategy-administration services can be established. These strategy-administration service Agent-stations can develop their own 4 transaction-based pre-execution, execution, supervision and post-supervision jobs, creating their own transaction-based language-dictionary, command-manual, routine-results-reports information libraries and demanders' (suppliers') knowledge libraries. Moreover, the front-end Agent-station can real-time access all the strategy service-based manuals, information libraries and via Job1-assembly-line and the back-end Agent-station can also access all of them via Job2-assembly-line.

Therefore, this type of business administration service (BAS)-capable Central-office, equipped with 1) front-end top-corner multi-policy Strategy-Agents, 2) back-end top-corner information/knowledge Strategy-agents, 3) front-end base-corner multi-policy matrix-Experts and 4) back-end base-corner multi-library matrix Experts based HCS to deliver all the real-time fine-grained-proactive (FGP) business administration services to its service-oriented stakeholders under the top-level control workgroup, can be considered "real-time 4-corner-entry BAS-intelligent".

Based on the aforementioned rational courses of action for creating real-time intelligent business-Strategy-Agent-based workgroup systems to equip an ideal collaborative Central-office facility and together with the usage of workgroup-transaction-based wG4-wEAs, the third workgroup evolutionary principle (wEP3) is thus established to bring forth the fifth-generation/fourth-stage "Central-office facility-based" wEntity Architecture (wG5.4-wEA) that comprises the following 6 mandates for creating all the potential "workgroup business-administration-service"-based "Strategy-wEntities".

Mandate-1: the must-have 6 Strategy-wEntity-based workgroup Basic Building Blocks (Strategy-6BBBs), which can be constructed by using the standard Contract-HCSs, as illustrated from FIG. 37 to FIG. 42, together with standard Case-HCSs, Job1-HCSs, Job2-HCSs and WSAs;

Mandate-2: the must-have Strategy-wEntity-based Hierarchical Core Structure (Strategy-HCS) by aggregating Strategy-6BBBs with workgroup four linkages and bundles;

Mandate-3: the must-have Strategy-wEntity-based Hardware Architecture Theory (Strategy-HAT) with related methods in constructing Strategy-6BBBs and in aggregating them into Strategy-HCSs;

Mandate-4: the must-have Strategy-wEntity-oriented OS (Strategy-OS) to equip Strategy-HCS into Strategy-wEntity Core Structure (Strategy-ECS);

Mandate-5: the must-have Strategy-wEntity-oriented Domain Programs (Strategy-DPs) to equip Strategy-ECS into Strategy-wEntity Domain Structure (Strategy-EDS);

Mandate-6: the must-have Strategy-wEntity-based Software Architecture Theory (Strategy-SAT) with related software methods in generating Strategy-OSs and Strategy-DPs.

By abiding the third mandate of wEP3.wG5.4 evolutionary architecture, the fifth generation/fourth-stage Theoretic Foundation (wTF3.wG5.4) can be derived, which contains a Strategy-wEntity-based Hardware Architecture Theory (Strategy-HAT) that comprises multiple Hardware Construction Methods (HCMs) in creating the Strategy-6BBBs and multiple Hardware Aggregation Methods (HAMs) in creating Strategy-HCSs.

In addition, by abiding the sixth mandate of wEP3.wG5.4 evolutionary architecture, the fifth generation/fourth-stage workgroup Theoretic Foundation (wTF3.wG5.4) can be extended to include a Strategy-wEntity-based Software Architecture Theory (Strategy-SAT), which comprises Strategy-wEntity OS-oriented software Integration Methods (EIMs) in generating Strategy-OSs and Strategy-wEntity domain-oriented software Programming Methods (EPMs) in real-time generating Strategy-DPs.

It can be concluded that by fulfilling the fifth-generation fourth-stage Strategy-wEntity-based Architecture (i.e., wG5.4-wEA) and carrying out wTF3.wG5.4-(HAT/SAT), a series of "fail-safe" Strategy-wEntities with various degrees of real-time workgroup business administration-service-based intelligence can be created. However, based on the aforementioned standard Contract-wEntities as the basic components to warrant the solidity and completeness of wG5.4-wEA, there is only one standard "fail-safe" Strategy wEntity that is needed, due to one preferred "4-corner-entry" full-fledged Central-office-based standard Hierarchical Core Structure (HCS), as illustrated by FIG. 36*a&b*.

Furthermore, the full-fledged standard Strategy-wEntity can further be built into real-world "standardized real-time BAS-(business-administration-service)-intelligent Strategy-Agent-based Central wSystems" based on wG5.4 strategy-administration-service-based System Disciplines (wG5.4-sasSD), which will populate the fifth generation of real-world service-oriented workgroup evolutionary pathway and eventually achieve the ideal real-world Central-office facility's ultimate objective, as defined earlier.

FIG. 46*a&b* Preferred Organization-Strategy Central-wEntity-Based Standard HCS As shown in FIG. 46*a&b*, a preferred 6-wBBB-architected "4-corner-entry-full-fledged" Strategy-HCS is created, where 1.BAB, 2.BFB, 3.MMB, 4.MFB, 5.TCB and 6.TFB are constructed by using the most advanced CPE and CPA Contract-HCSs, Job-HCSs and WSAs, as illustrated by the following HCM-6 Table.

| HCM-6: 6BBB | wCMs | Abbr. Name | Description |
|---|---|---|---|
| 1.BAB= | | | Base Attribute Block |
| | wCM(390) | 390-C.1 | Chain4-XP1 (down-left corner-entry) |
| | wCM(390) | 390-R1.(1-2) | Chain4-Ribbon1.(1-2)-XP |
| | wCM(410) | 410-G.1 | Glue4-XP1 (down-right corner-entry) |
| | wCM(410) | 410-R2.(1-2) | Glue4-Ribbon2.(1-2)-XP |
| | wCM(610) | 610-CPE-XP-L | Cognitive fine-grained Proactive contract Expert station eXecution Pylon-Left |
| | wCM(610) | 610-CPE-XP-R | Cognitive fine-grained Proactive contract Expert station eXecution Pylon-Right |
| 3.MMB= | | | Mid Memory Block |
| | wCM(77) | mWSA4p1 | memory Workgroup Server Array version4/part1 |
| | wCM(83) | mWSA7p1(a-e) | memory Workgroup Server Array version7/part1(a-e) |
| 5.TCB= | | | Top Control Block |
| | wCM(390) | 390-R1.(3-(i-1)) | Chain4-Ribbon1.(3-(i-1))-XP |
| | wCM(390) | 390-R3.(1-i) | Chain4-Ribbon3.(1-i)-XP |
| | wCM(410) | 410-R2.(3-(i-1)) | Glue-4-Ribbon2.(3-(i-1))-XP |
| | wCM(650) | 650-CPA-XP-L | Cognitive-Proactive Agent eXecution Pylon |
| | wCM(650) | 650-CPA-XP-R | Cognitive-Proactive Agent eXecution Pylon |

| HCM-6: 6BBB | wCCs + wCMs | Abbr. Name | Description |
|---|---|---|---|
| 2.BFB-L= | | | Base Failover Block-Left |
| | wCM(400) | 400-C.1 | Chain4 × (1)-FP |
| | wCM(400) | 400-R1(1-2) | Chain4-Ribbon1(1-2)-FP |
| | wCC(9) | TaP1m(1-2)-L | Team attribute Processor manager(1-2)-Left |
| | wCM(620) | 620-CPE-FP-L | Cognitive fine-grained Proactive contract Expert station Failover-Pylon-Left |
| 2.BFB-R= | | | Base Failover Block-Right |
| | wCM(420) | 420-G.1 | Glue4 x (1)-FP |
| | wCM(420) | 420-R2(1-2) | Glue4-Ribbon2(1-2)-FP |
| | wCC(9) | TaP1m(1-2)-R | Team attribute Processor manager(1-2)-Right |
| | wCM(620) | 620-CPE-FP-R | Cognitive fine-grained Proactive contract Expert station Failover-Pylon-Right |
| 4.MFB-L= | | | Mid Failover Block-Left |
| | wCM(84) | mWSA7p2(a-c) | memory Workgroup Server Array version7/part2(a-c) |
| | wCM(78) | mWSA4p2 | memory Workgroup Server Array version4/part2 |
| | wCC(29) | TmP1m(1-2)-L | Team memory Processor manager type1 (1-2)-L |
| 4.MFB-R= | | | Mid Failover Block-Right |
| | wCM(84) | mWSA7p2(d-e) | memory Workgroup Server Array version7/part2(d-e) |
| | wCC(29) | TmP1m(1-2)-R | Team memory Processor manager type1 (1-2)-R |
| 6.TFB-L= | | | Top Failover Block-Left |
| | wCC(49) | TcP1m(1-2)-L | Team control Processor manager type1 (1-2)-Left |
| | wCM(400) | 400-R1(3-(i-1)) | Chain4-Ribbon1(3-(i-1))-FP |
| | wCM(400) | 400-R3(1-i) | Chain4-Ribbon3(1-i)-FP |
| | wCM(660) | 660-CPA-FP-L | Cognitive fine-grained Proactive contract Agent station Failover Pylon-Left |
| 6.TFB-R= | | | Top Failover Block-Right |
| | wCC(49) | TcP1m(1-2)-R | Team control Processor manager type1 (1-2)-Right |
| | wCM(420) | 420-R2.(3-(i-1)) | Glue4-Ribbon2.(3-(i-1))-FP |
| | wCM(660) | 660-CPA-FP-R | Cognitive fine-grained Proactive contract Agent station Failover Pylon-Right |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred full-fledged Strategy HCS=wCM(770+780), as illustrated by the following HAM-5 Table.

| HAM-5 Module: wCM( ) | Abbr. Name | Description |
|---|---|---|
| BF: wCM( ) (1.BAB + 2BFB) | Base Framework | Agg via base WL3-bundle |
| MF: wCM( ) (3.MMB + 4.MFB) | Mid-Framework | Agg via mid WL3-bundle |
| TF: wCM( ) (5.TCB + 6.TFB-L&R) | Top-Framework | Agg via top WL3-bundle |
| XP: WCM(770) (1.BAB + 3.MMB + 5.TCB) | Strategy-XP | Strategy-Execution Pylon: Agg via WL1, WL2 |
| FP-L: wCM(780) (2.BFB + 4.MFB + 6.TFB) | Strategy-FP-L | Strategy-Failover Pylon-Left: Agg via WL4 |
| FP-R: wCM(780) (2.BFB + 4.MFB + 6.TFB) | Strategy-FP-R | Strategy-Failover Pylon-Right: Agg via WL4 |
| XP + FP-L&R: wCM(770 + 780-L&R) | Standard Strategy-HCS | Standard Strategy-Hierarchical Core Structure |

From the hardware configuration point of view, the standard business-administration service-capable Strategy-wEntity-based HCS is equipped with a "self-growable Central skeleton", which comprises a base-level BAB, i.e., (m=tiers, n=2 assembly-lines)-Assembly Block, a Mid-level MMB, i.e., (b=2, t=3) Assembly Conveyer and a top-level TCB, i.e., (x>2=n, y>3)-Assembly Tree, where parameter base-level m-tier and top-level x-tier and y-assembly-line can be expandable. Consequently, the fail-over complement BFB, MFB and TFB will evolve accordingly based on the fail-over evolutionary architecture.

5.5.5 Real-Time AI-Agent-Based Business-Service Standard-Organizations

In a real world service-oriented environment, an ideal service-oriented enterprise, should comprise multiple real-time BOS-intelligent department facilities, real-time BCS-intelligent division facilities, real-time BMS-intelligent (division)-Office facilities and one real-time BAS-intelligent Central-(office) facility, must achieve its ultimate objective, that is to real-time deliver its fine-grained proactive (FGP) business-services to its external portfolio-customers and project-clients under its internal real-time policy-management and strategy-administration-based "artificial intelligence".

In order to achieve the ultimate objective, it is imperative that the following 5 sequential courses of action be carried out.

The first course of action is to establish all the necessary department facilities, so that they can work together and deliver the fine-grained-proactive (FGP)-portfolio services to the external customers. There must have the following 3 types of collaborative departments to achieve that goal.

The first type is the one that sends out external-demand contractual transactions from its front-end/top-level agents to the external suppliers for importing the packaged materials. After receiving them, the front-end/top-level agent will pass the packaged materials to the lower-level matrix-expert groups, which will handle the packaged materials and prepare them as internal supplies. This type of departments can be dubbed as "External Demand for Internal Supply" type1-(ED4IS) departments, such as "purchasing" departments for various packaged materials as well as equipments.

The second type is the one that sends out internal-demand contractual transactions from its front-end/top-level agents to type1-departments' front-end/top-level agents as well as base-level experts to receive packaged materials for its internal matrix expert groups to work on and produce the products/results ready for subsequent internal supply. This type of departments can be dubbed as "Internal Demand for Internal Supply" type2-(ID4IS) departments. They are manufacturing departments, accounting departments that demand accounting vouchers from all the departments and supply them with accounting information as well as various internal supporting departments, such as human resources and equipment maintenance.

The third type is the one that receives external demand contractual transactions from external customers via the front-end/top-level agents and then relay the negotiated contracts to the base-level matrix expert groups, which will send out internal demands to type2 departments' matrix-expert groups for receiving the products/results, packaging them and sending them to the external customers. This type of departments can be dubbed as "Internal Demand and External Supply" type3-(1D4ES) departments, such as Sales departments.

The above 3-types of departments are necessary for establishing a direct service-oriented Enterprise, which has the supply-side service flow route from the type1 departments to the type3 departments. However, there is another indirect service-oriented enterprise, which has the fourth type of departments that can issue external-demand to external suppliers for already-finished products/results and supply them with modifications to the external customers without going thru the type1-material-purchaing and type2-manufacturing collaborative departments. This type of departments can be dubbed as "External-demand for External supply" type4-(ED4ES) departments, such as Brokerage departments.

It can be concluded that the above four types of departments are classified based on Demand/Supply aspect of concern and Internal/External aspect of concern, e.g., from incoming (type1)-ED4IS to (type2)-ID4IS to (type3)-ID4ES-outgoing long-route supply-side services and incoming-(type4)-ED4ES-outgoing short-route supply-side services. However, there is another aspect of concern that needs to be included. That is the "present/future aspect of concern, which has to do with the future forecasting. Therefore, all 4 types of departments have their counterpart-departments. They are 1) type1-purchasing and typeA-Inventory departments, 2) type2-manufacturing and typeB-engineering departments, 3) type3-sales and typeC-marketing departments and 4) type4-brokerage and typeD-marketing departments.

Once all the required 8 types of 4-corner-entry full-fledged departments are established, (where each full-fledged department has 4-corner-entry connections, i.e., front-end/back-end top-level Agent-stations' 2 connections and front-end/back-end base-level matrix-expert-stations' 2 connections as described earlier), it is imperative that all the base-level matrix expert-stations' front-end and back-end dispatch-hubs should be connected together respectively via Ethernet and the likes, forming a front-end and a back-end inter-department multi-expert-based LANs (local-area-network). The front-end inter-department multi-expert-LAN1 can enable all the supply-side and demand-side contractual service-based collaborative operations among all-typed departments. The back-end inter-department multi-expert-LAN3 can enable all the contractual information- and knowledge-based sharing among all-typed departments.

In addition, all the front-end top-level department Agent-stations should be connected together with type1-department-adjacent Firewall-Router1 and type4-department-adjacent Firewall-Router2 via Ethernet and the likes, forming a front-end inter-department multi-Agent-LAN2, which can enable all the potential supply-side portfolio-service-based collaboration among all typed departments.

The second course of action is to establish all the necessary division facilities, so that they can work collaboratively and deliver the fine-grained-proactive (FGP)-project services to the external clients. There must have the following 4 types of collaborative divisions to achieve that goal.

Once all the 4 types of departments and their counterparts of departments are created, it is rational to establish 1) one or more type1-Divisions to control various type1-typeA-departments together, 2) one or more type2-Divisions to control various type2-typeB departments, 3) one or more type3-Divisions to control various type3-typeC departments and 4) one or more type4-Divisions to control various type4-typeD departments. But for simplicity, it is ideal to use singular type1-division to type4-division to represent the whole group with particular type-based characteristics and these 4 types of divisions are all built in with 4-corner-entry full-fledged characteristics.

By connecting the front-end base-level dispatch-hubs of all these 4 types of divisions, a front-end inter-divisional multi-expert-LAN will be formed. Furthermore, by connecting it to the back-end inter-departmental multi-expert-LAN3, this merged multi-expert-LAN3 can enable multiple-tier divisional expert-stations in each-typed division with all the portfolio-service-based real-time informations and real-time knowledges from its captive departments and from all the other typed-divisions' captive departments, so that each-typed division can carry out project-service-based 4-base-jobs in the Assembly-Block and 7-top-jobs in the Assembly-Tree, as described earlier in the division section.

This merged multi expert-LAN3 of both back-end inter-department multi-expert-LAN and front-end inter-divisional multi-expert-LAN is vital for composing all the business-portfolio services into all the potential business-project-services, reflecting the important fact that division-compositional Project services are dependent on multiple department-Portfolio services.

In addition, all the front-end top-level divisional Agent-stations should be connected together with type1-division-adjacent Firewall-Router-3 and type4-division-adjacent Firewall-Router-4 via Ethernet and the likes, forming an inter-divisional front-end multi-Agent-based LAN4, which can enable all the potential supply-side project service-based collaboration among all the divisions.

The third course of action is to establish all the necessary (division)-Office facilities, so that they can work collaboratively and control individually over their captive division and departments with real-time Business-Management-Service (BAS)-intelligence. There must have the following 4 types of collaborative division-Offices to achieve that goal.

Once all the 4 types of 4-corner-entry full-fledged divisions are created, it is rational to establish 1) type1-Office to directly control type1-division and its captive type1 & typeA departments, 2) type2-Office to directly control type2-division and its captive type2 & typeB departments, 3) type3-Office to directly control type3-division and its captive type3 & typeC departments, 4) type4-Office to directly control type4-division and its captive type4 & typeD departments. These 4 types of divisional-Offices are all built in with 4-corner-entry full-fledged characteristics.

By connecting the front-end base-level multi-expert-station-based dispatch-hub of each-typed division-Office to the back-end base-level multi-expert-station-based dispatch hub of its captive division, this direct linkage-LAN5 of each type can enable the multiple-tier divisional-Office expert-stations with all the project-service-based real-time informations and real-time knowledges from its captive division, so that each-typed division-Office can carry out policy-service-based 2-base-(management) jobs in the Assembly-Block and 3-top-(management) jobs in the Assembly-Tree, as described earlier in the division-Office section.

In addition, the front-end top-level Agent-station of each-typed division-Office should be connected to the back-end top-level Agent-station of its captive division and to the back-end top-level Agent-stations of its captive departments.

In so doing, this direct-linkage-LAN6 of each type enables office-Agents of each type to directly send the control commands to the back-end agents of its captive division and departments, so that the controllers of its captive division and departments will have to react to the division-Office-commands and send new commands to affect their internal 7-top-(operation and composition) jobs and 4-base-(operation and composition) jobs, so that the outcomes from its captive departments and division will meet the management requirements issued from each-typed Office.

Once all the required 4 types of 4-corner-entry full-fledged division-Offices are established, it is imperative that all the base-level back-end multi-expert-station-based dispatch-hubs should be connected together via Ethernet and the likes, forming a back-end inter-Office multi-expert-based LAN7, which can enable all the policy-information-and knowledge-based sharing among all-typed division-Offices.

In addition, all the back-end top-level division-Office Agent-stations should be connected together via Ethernet and the likes, forming a front-end inter-Office multi-Agent-based LAN8, which can enable all the potential policy-service-based collaboration among all the division-Offices.

The fourth course of action is to establish the one and only Central-office facility, so that it can control all the division-Offices with real-time business-administration-service (BAS)-intelligence.

Once all the 4 types of division-Offices are created, it is rational to establish only one type of Central-office to control all the 4-typed division-Offices.

By connecting the front-end base-level multi-expert-station-based dispatch-hub to the back-end base-level inter-Office multi-expert-LAN7, this linkage can enable the multiple-tier Central-office expert-stations with all the policy-service-based real-time informations and real-time knowledges from all the division-Offices, so that the Central-office can carry out strategy-service-based 2-base-(administration)-jobs in the Assembly-Block and 3-top-(administration)-jobs in the Assembly-Tree, as described earlier in the Central-office section.

In addition, the front-end top-level Agent-station of the Central-office should be connected to the back-end top-level inter-division-Office multi-Agent LAN8. In so doing, the Central-Agents can directly send the control commands to the back-end Agents of its captive division-Offices, so that the controllers of its captive division-Offices will have to react to the Central-office-commands and send new commands to affect their internal 3-top-(management) jobs and 2-base-(management)-jobs, so that the outcomes from its captive division-Offices will meet the administration requirements issued from the Central-office.

Once the 4-corner-entry full-fledged Central-office is established, it is imperative that the base-level back-end multi-expert-station-based dispatch-hub should be connected together with Firewall-Router-5 via Ethernet and the likes, forming a back-end Central-Office multi-expert-LAN9, which can enable to receive the strategy information-and knowledge-based from outside the Enterprise.

In addition, the back-end top-level Central-office Agent-station should be connected together with Firewall-Router-6 via Ethernet and the likes, forming a back-end Central-office multi-Agent-LAN10, which can enable potential strategy-service-based outside the Enterprise.

The fifth course of action is 1) to connect Firewall-Router-1, Firewall-Router-3 and Firewall-Router-5 together as the top-side border, 2) to connect Firewall-Router-2, Firewall-Router-4 and Firewall-Router-6 together as the bottom-side border and 3) to connect Firewall-Router-1 and Firewall-Router-2 together as the left-side border, a 3-sided tree-like border is established for an ideal "virtual Enterprise", which is conceptually defined to include all the 8-types of departments, 4-types of divisions, 4-types of divisional-Offices and one Central-office. Since all the "internal" multi-expert-LANs (1,3,5,7,9) and multi-agent-LANs (2,4,6,8,10) are sequentially and hierarchically connected together inside the 3-sided tree-like border, a (virtual)-Enterprise virtual-Entity-(vEntity)-based Hierarchical Core Structure (vHCS) is thus created and organized as a whole. Certainly, all the internal LANs can be established via Virtual-Private networks for connecting long-distance departments, divisions, Offices and Central and the bordered perimeter of the virtual Enterprise for the first-tier security protection can be maintained.

This type of business-service-capable vEnterprise-Entity, equipped with vHCS can deliver intelligent fine-grained-proactive (FGP) services to its external portfolio-customers and project-clients under its internal real-time policy-management and strategy administration intelligence, dubbed as "real-time Artificial Intelligent". It is because this business-service-oriented real-time "artificial intelligence" is a total integration of 4 kinds of real-time artificially-defined hierarchical-service protocol-based intelligent "internal agents", comprising from the bottom-fundamental business-service events/deeds-based portfolio-operational agents and project-compositional agents to the top-numerical business-service equations/formulas-based policy-management agents and strategy-administration agents. This real-time-AI vEnterprise-Entity achieves its ultimate internal objective via the real-time collaboration among all the enclosed real-time "internal" hierarchical-business-service "intelligent"-agents and most importantly, achieves its external objective via the real-time "external" enterprise portfolio-service and project-service and (enterprise strategy service) AI-agents.

Based on the aforementioned rational courses of action for creating real-time business-service "artificially-intelligent internal and external agents"-based virtual workgroup systems for accommodating an ideal an multi-business-facility organized Enterprise, the third workgroup evolutionary principle (wEP3) is thus established to bring forth the fifth-generation/fifth-stage "business-service-capable virtual Enterprise-Entity Architecture (wG5.5-vEEA) that comprises the following 5 workgroup mandates for creating all the potential "collaborative internal and external business-service-based Enterprise-vEntities.

Mandate-1: (components) the must-have 8 types of Department-wEntities, 4 types of Division-wEntities, 4 types of Office-wEntities and one type of Central-wEntity to construct the potential Enterprise-vEntities.

Mandate-2: the must-have Enterprise internal business-agent Aggregation-based virtual Hierarchical Core Structure (Enterprise-vHCS) by aggregating all the standard Portfolio/

Project/Policy/Strategy (PPPS)-wEntities hierarchically via multi-expert LANs (1,3,5,7,9), multi-agent LANs (2,4,6,8, 10) and 6 Firewall-Routers.

Mandate-3: the must-have Enterprise-vEntity-based virtual Hardware Architecture Theory (Enterprise-vHAT) with related methods in aggregating all the involved wEntities into an Enterprise-vHCS.

Mandate-4: the must-have Enterprise-vEntity-based hierarchical internal expert/agent-based domain programs (Enterprise-DPs) with msg-mailer and subagent capabilities to equip Enterprise-vHCS into Enterprise virtual-Entity Domain Structure (Enterprise-vEDS).

Mandate-5: the must-have Enterprise-vEntity-oriented virtual Software Architecture Theory (Enterprise-vSAT) with related software methods in generating internal expert/agent/subagent-based Enterprise domain programs (DPs) and also external Enterprise portfolio- and project-service-based agent/subagent-programs.

By abiding the third mandate of wEP3.wG5.5 evolutionary architecture, the fifth generation/fifth-stage Theoretic Foundation (wTF3.wG5.5) can be derived, which contains an Enterprise-vEntity-based Hardware Architecture Theory (Enterprise-vHAT), comprising multiple Hardware Aggregation Methods (HAMs) in creating the Enterprise-vHCS.

In addition, by abiding the fifth mandate of wEP3.wG5.5 evolutionary architecture, the fifth generation/fifth-stage workgroup Theoretic Foundation (wTF3.wG5.5) can be extended to include an Enterprise-vEntity-based Software Architecture Theory (Enterprise-vSAT), which comprises Enterprise-vEntity domain-oriented software programming Methods (vEPMs) in real-time generating internal-domain agent-based programs and external-transaction agent-based programs.

It can be concluded that by fulfilling the fifth-generation fifth-stage workgroup-vEnterprise-Entity based Architecture (i.e., wG5.5-vEA) and carrying out wTF3.wG5.5 (HAT/SAT), a series of "fail-safe-3" Enterprise-vEntities with various degrees of real-time artificial intelligence can be created. However, based on the aforementioned standard PPPS-wEntities as the basic components to warrant the solidity and completeness of wG5.5-vEA, there are four standard "fail-safe" Enterprise-vEntities, due to 4 preferred standard virtual Hierarchical Core Structures (vHCSs), as illustrated from FIG. 47 to FIG. 50.

Furthermore, these 4 standard Enterprise-vEntities can further be built into real-world "standardized real-time business-service-AI-agent-based Enterprise virtual Systems (vSystems)" based on wG5.5 Enterprise business-service-based virtual System Disciplines (wG5.5-vSD), which will populate the fifth generation of real-world service-oriented workgroup evolutionary pathway and eventually achieve the ideal real-world Enterprise facility's ultimate objectives, as defined earlier.

FIG. 47 Preferred Rt-AI eBusiness-Enterprise Organization-vEntity-Based Standard vHCS In the e-commerce environment, an ideal eBusiness Enterprise must utilize its type3 department's front-end agent-station to generate portfolio supply-agents to transact with external customers. Therefore, it doesn't comprise type4 brokerage departments and counterpart typeD departments, but it comprises type1 to type3 departments and their counterpart typeA, typeB and typeC departments. Consequently, it is bound to comprise type1 to type3 divisions, type1 to type3 division-Offices and one type Central-office in a hierarchical format.

As shown in FIG. 47, a preferred eBusiness vEnterprise-Entity-based vHCS comprises a plurality of 6 types of Department-based HCSs, 3 types of Division-based HCSs, 3 types of division-Office-based HCSs and one-type Central-office-based HCS. Details can be illustrated by the following table.

| Abbr. Name | wCMs | Description |
|---|---|---|
| DP-1&DP-A | wCM(710 + 720-L&R) | type1 and typeA Department-based HCSs |
| DP-2&DP-B | wCM(710 + 720-L&R) | type2 and typeB Department-based HCSs |
| DP-3&DP-C | wCM(710 + 720-L&R) | type3 and typeC Department-based HCSs |
| DV-1, DV-2, DV-3 | wCM(730 + 740-L&R) | type1, type2, type3 Division-based HCSs |
| Office-1, Office-2, Office-3 | wCM(750 + 760-L&R) | Type1, type2 and type3 division-Office-based HCSs |
| Central | wCM(770 + 780-L&R) | Central-office-based HCS |

In addition, based on all the above HCSs, there are 5 aforementioned internal multi-expert LANs (1,3,5,7,9) and 5 aforementioned internal multi-agent LANs (2,4,6,8,10) together with 6 Firewall-Routers, which can all be established via w1-Ethernet linkage as well as VPN, as shown in FIG. 47.

Furthermore, by connecting FR1+FR3+FR5 together as the top-side border, by connecting FR2+FR4+FR6 together as the bottom-side border and by connecting FR1+FR2 together as the left-side border, a 3-sided tree-like secure-bordered eBusiness-Enterprise-based virtual hierarchical Core Structure (vHCS) can be established.

FIG. 48 Preferred Rt-AI Intranet-Enterprise Organization-vEntity-Based Standard vHCS In the e-commerce environment, an ideal Intranet Enterprise must utilize its type3-department's front-end agent-station to generate external portfolio demand-agents to transact with the external sub-contractor eBusiness-enterprise's project supply-agents and also to generate external front-end portfolio supply-agents to transact with external customers. Therefore, it doesn't comprise type4 brokerage departments and counterpart typeD departments, but it comprises type1 to type3 departments and their counterpart typeA, typeB and typeC departments. Consequently, it is bound to comprise type1 to type3 divisions, type1 to type3 division-Offices and one type Central-office in a hierarchical format.

As shown in FIG. 48, a preferred Intranet vEnterprise-Entity-based vHCS comprises a plurality of 6 types of Department-based HCSs, 3 types of Division-based HCSs, 3 types of division-Office-based HCSs and one-type Central-office-based HCS. Details can be illustrated by the following table.

| Abbr. Name | wCMs | Description |
|---|---|---|
| DP-1&DP-A | wCM(710 + 720-L&R) | type1 and typeA Department-based HCSs |
| DP-2&DP-B | wCM(710 + 720-L&R) | type2 and typeB Department-based HCSs |
| DP-3&DP-C | wCM(710 + 720-L&R) | type3 and typeC Department-based HCSs, generating front-end portfolio demand and supply agents |
| DV-1, DV-2, DV-3 | wCM(730 + 740-L&R) | type1, type2, type3 Division-based HCSs |
| Office-1, | wCM(750 + | type1, type2 and type3 division- |

-continued

| Abbr. Name | wCMs | Description |
|---|---|---|
| Office-2, Office-3 | 760-L&R) | Office-based HCSs |
| Central | wCM(770 + 780-L&R) | Central-office-based HCS |

In addition, based on all the above HCSs, there are 5 aforementioned internal multi-expert LANs (1,3,5,7,9) and 5 aforementioned internal multi-agent LANs (2,4,6,8,10) together with 6 Firewall-Routers, which can all be established via w1-Ethernet linkage as well as VPN, as shown in FIG. 38.

Furthermore, by connecting FR1+FR3+FR5 together as the top-side border, by connecting FR2+FR4+FR6 together as the bottom-side border and by connecting FR1+FR2 together as the left-side border, a 3-sided tree-like secure-Bordered Intranet-Enterprise-based virtual hierarchical Core Structure (vHCS) can be established.

FIG. 49 Preferred Rt-AI Extranet-Enterprise Organization-vEntity-Based Standard vHCS In the e-commerce environment, an ideal Extranet Enterprise must utilize its type4-department's front-end brokerage-agent-station to generate external portfolio brokerage-demand-agents to transact with the external Intranet-enterprise's project supply-agents and also to generate external front-end portfolio brokerage supply-agents to transact with external customers. Therefore, it doesn't comprise type3-departments and counterpart typeC departments, but it comprises type1, type2 and type4 departments and their counterpart typeA, typeB and typeD departments. Consequently, it is bound to comprise type1/type2/type4 divisions, type1/type2/type4 division-Offices and one type Central-office in a hierarchical format.

As shown in FIG. 49, a preferred Extranet vEnterprise-Entity-based vHCS comprises a plurality of 6 types of Department-based HCSs, 3 types of Division-based HCSs, 3 types of division-Office-based HCSs and one-type Central-office-based HCS. Details can be illustrated by the following table.

| Abbr. Name | wCMs | Description |
|---|---|---|
| DP-1&DP-A | wCM(710 + 720-L&R) | type1 and typeA Department-based HCSs |
| DP-2&DP-B | wCM(710 + 720-L&R) | type2 and typeB Department-based HCSs |
| DP-4&DP-D | wCM(710 + 720-L&R) | type4 and typeD Department-based HCSs |
| DV-1, DV-2, DV-4 | wCM(730 + 740-L&R) | type1, type2, type4 Division-based HCSs |
| Office-1, Office-2, Office-4 | wCM(750 + 760-L&R) | type1, type2 and type4 division-Office-based HCSs |
| Central | wCM(770 + 780-L&R) | Central-office-based HCS |

In addition, based on all the above HCSs, there are 5 aforementioned internal multi-expert LANs (1,3,5,7,9) and 5 aforementioned internal multi-agent LANs (2,4,6,8,10) together with 6 Firewall-Routers, which can all be established via w1-Ethernet linkage as well as VPN, as shown in FIG. 49.

Furthermore, by connecting FR1+FR3+FR5 together as the top-side border, by connecting FR2+FR4+FR6 together as the bottom-side border and by connecting FR1+FR2 together as the left-side border, a 3-sided tree-like secure-Bordered virtual hierarchical Core Structure (vHCS) can be established.

FIG. 50 Preferred Rt-AI Internet-Community-Service Provider Organization vEntity-Based Standard vHCS In the e-commerce environment, an ideal Internet Community-service-provider (CSP) Enterprise, must utilize all its 4 types of departments, for providing both brokerage "e-commerce escrow" services (e.g., legality, payment and privacy) and business-oriented supply-side community services (e.g., real-time traffic, e-voting and privacy bylaws) to its external community residents under its internal real-time policy-management and strategy-administration-based "artificial intelligence". Therefore, it comprises type1, type2, type3 and type4 departments and their counterpart typeA, typeB, typeC and typeD departments. Consequently, it is bound to comprise type1/type2/type3/type4 divisions, type1/type2/type3/type4 division-Offices and one type Central-office in a hierarchical format.

As shown in FIG. 50, a preferred Internet-CSP-vEnterprise-Entity-based vHCS comprises a plurality of 8 types of Department-based HCSs, 4 types of Division-based HCSs, 4 types of division-Office-based HCSs and one-type Central-office-based HCS. Details can be illustrated by the following table.

| Abbr. Name | wCMs | Description |
|---|---|---|
| DP-1&DP-A | wCM(710 + 720-L&R) | type1 and typeA Department-based HCSs |
| DP-2&DP-B | wCM(710 + 720-L&R) | type2 and typeB Department-based HCSs |
| DP-3&DP-C | wCM(710 + 720-L&R) | type3 and typeC Department-based HCSs |
| DP-4&DP-D | wCM(710 + 720-L&R) | type4 and typeD Department-based HCSs |
| DV-1, DV-2, DV-3 DV-4 | wCM(730 + 740-L&R) | type1, type2, type3, type4 Division-based HCSs |
| Office-1, Office-2, Office-3 Office-4 | wCM(750 + 760-L&R) | type1, type2, type3, type4 division-Office-based HCSs |
| Central | wCM(770 + 780-L&R) | Central-office-based HCS |

In addition, based on all the above HCSs, there are 5 aforementioned internal multi-expert LANs (1,3,5,7,9) and 5 aforementioned internal multi-agent LANs (2,4,6,8,10) together with 6 Firewall-Routers, which can all be established via w1-Ethernet linkage as well as VPN, as shown in FIG. 40.

Furthermore, by connecting FR1+FR3+FR5 together as the top-side border, by connecting FR2+FR4+FR6 together as the bottom-side border and by connecting FR1+FR2 together as the left-side border, a 3-sided tree-like secure-bordered Internet-CSP-Enterprise-based virtual hierarchical Core Structure (vHCS) can be established.

5.5.6 Real-Time SI-Agent-Based Organization-Cloud Systems and Open Business Service Platform (BSP)

When real-time-AI eBusiness, Intranet, Extranet and Internet-Community Service provider vSystems are established, it is only rational to 1) interconnect these 3 types of enterprises together via wide-area networking (e.g. Ethernet Wimax and the likes) to form multiple symbiotic business "service clouds", starting from Intranet-service clouds, extranet-service clouds and community-service clouds, and 2) interconnect all the rt-AI community-service providers in a nation together via the open Internet communication protocol to form the one and only "open Business Service Platform". In so doing, all the eBusinesses, Intranets, Extranets and Community-Service-Providers (CSPs) can "cooperate" as well as "compete" via service clouds, providing the best negotiable business services with security and privacy protections for all the community residents in a nation.

In order to build the aforementioned symbiotic business service clouds and the open business service platform, it is imperative that the following 4 sequential courses of action be carried out.

The first course of action is to interconnect from any individual Intranet-vEnterprise's portfolio agent-station to all the project-agent-stations of its symbiotically associated eBusiness-vEnterprises via wide-area network1 (WAN1), creating a 2-level-depth tree-like Intranet Service Cloud (ISC), where all the involved real-time-AI agents can transact based on the hierarchical Intranet service protocols. The Intranet business service negotiations and executions between a supply-side eBusiness master-project agent and a demand-side Intranet master-portfolio-agent can be achieved via sending out various types of sub-agents to each other based on different criteria, e.g., time-based, trip-based, mission-based, etc. Any eBusiness-vEnterprise can join as well as disjoin multiple Intranet-enterprises based on its own business decisions.

The second course of action is to interconnect from any individual Extranet-vEnterprise's portfolio agent-station to all the project-agent-stations of its symbiotically-associated Intranet-vEnterprises via wide area network2 (WAN2), creating a 3-level-depth tree-like Extranet Service Cloud (ESC), where all the involved real-time-AI agents can transact based on hierarchical Extranet service-protocols. The Extranet-business service negotiations and executions between a supply-side Intranet master-project agent and a demand-side Extranet master-portfolio-agent can be achieved via sending out various types of sub-agents to each other based on different criteria, e.g., time-based, trip-based, mission-based, etc. Any Intranet-vEnterprise can join as well as disjoin multiple Extranet-vEnterprises based on its own business decisions.

The third course of action is to interconnect from any individual Internet-community-service-provider's (CSP) portfolio agent-station to all the project-agent-stations of its symbiotically associated Extranet-vEnterprises via wide-area-network3 (WAN3), creating a 4-level-depth tree-like Internet-Community Service Cloud (CSC), where all the involved real-time-AI agents can transact based on the hierarchical Community-service protocols. The Community business service negotiations and executions between a supply-side Extranet master-project agent and a demand-side Community master-portfolio-agent can be achieved via sending out various types of sub-agents to each other based on different criteria, e.g., time-based, trip-based, mission-based, etc. Any Extranet-vEnterprise can join as well as disjoin multiple Internet-Community-Service-Providers (CSPs) based on its own business decisions.

The fourth course of action is to interconnect all the Internet-CSP's "project" agent-stations together via Internet-communication-protocol-based networking, creating an open 4-level-depth lattice-like Internet business service-platform (BSP), which can further be linked to the demand-side agent-station via type1-department-adjacent FR1 of all the involved eBusiness-enterprises, Intranet-enterprises, Extranet-enterprises and Internet-CSPs, so that any one of them can access the open business-service platform (BSP) and demand supply-side services from any other cooperative enterprises for enriching its own supply-side services.

Based on the aforementioned rationales for setting up the real-time (Business-Server, BS)-AI-Agent-based "open Business Service Platform", the third workgroup evolutionary principle (wEP3) is thus established to bring forth the fifth-generation/sixth-stage "virtual-Enterprise System-based Interconnection-Organizational Architecture (wG5.6-vES-IOA) that comprises the following 4 hardware Hierarchical Interconnection Methods (HIMs) and 4 software Agent-Programming Methods (APMs) for creating the real-time (BS)-AI-Agent-based "open business service platform" (BSP).

Hardware Hierarchical Interconnection Method-1 (HIM1): To create an Intranet service cloud-1 (ISC) by interconnecting the FR2-entried portfolio agent-station of any individual Intranet-enterprise to all the FR4-entried project-agent-stations of its symbiotically associated eBusiness-enterprises via wide-area network1 (WAN1) using Wimax and the likes. This Intranet service cloud (ISC) is formed based on a 2-level-depth tree-like hierarchical structure, which has one parent-(the second-level) node (i.e., the said Intranet enterprise) and a number of sibling-(the first-level) nodes (i.e., a plurality of associated eBusiness-enterprises) that can grow in number.

Hardware Hierarchical Interconnection Method-2 (HIM2): To create an Extranet Service Cloud-2 (ESC2) by interconnecting the FR2-entried portfolio agent-station of any individual Extranet-enterprise to all the FR4-entried project-agent-stations of its symbiotically associated Intranet-enterprises via wide-area network2 (WAN2) using Wimax and the likes. This Extranet service cloud (ESC) is formed based on a 3-level-depth tree-like hierarchical structure, which has one grandparent-(the third-level)-node (i.e., the said Extranet enterprise), a plurality of parent/uncle-(the second-level) nodes (i.e., more associated Intranet-enterprises) and a plurality of sibling/cousin-(the first-level) nodes (i.e., more associated eBusiness-enterprises).

Hardware Hierarchical Interconnection Method-3 (HIM-3): To create an Internet-community Service Cloud (CSC) by interconnecting the FR2-entried portfolio agent-station of any individual Internet-community service provider (CSP) to all the FR4-entried project-agent-stations of its symbiotically associated Extranet-enterprises via wide-area network3 (WAN3) using Wimax and the likes. This Internet-Community Service Cloud (CSC) is formed based on a 4-level-depth tree-like hierarchical structure, which has one great-grandparent-(the fourth-level)-node (i.e., the said Internet CSP-enterprise), a plurality of grandparent/uncle-(the third-level) nodes (i.e., more associated Extranet-enterprises), a plurality of parent/uncle-(the second-level) nodes (i.e., more associated Intranet-enterprises) and a plurality of sibling/cousin-(the first-level) nodes (i.e., more associated eBusiness-enterprises).

Hardware hierarchical-interconnection Method-4 (HIM4): To create an Open business service platform (BSP) by interconnecting the Project agent-station of all the nation-wide community-service providers (CSP) via WANs with the Internet open communication protocols and extending that Internet WAN-based connection to the FR1-entried type1-department of all the involved real-time-AI Enterprises with the Internet access capabilities, which will allow the connected FR2-entried department-agents, FR3-entried division-agents, FR6-entried Central-agents to access the Internet for external supply-side as well as demand-side services. This Internet-based open business-service platform (BSP) is formed based on a 4-level-depth expansive-latticelike hierarchical structure, where four-level service groups of real-time-AI-agent-based enterprises, i.e., eBusinesses, Intranets, Extranets and Internet-communities are all interconnected together.

Software Angel-Programming Method-1 (APM-1): To set up the "Intranet Service-Agent Protocols" (IS-AP) with real-time dynamic tokens" on top of the preferred Wimax communication protocol" for any Intranet enterprise and its associated eBusiness-enterprises to conduct real-time dynamic symbiotic "Agent-to-Agent" interactive/cognitive transactions among themselves with security protections in its own Intranet service cloud (ISC).

Software Angel-Programming Method-2 (APM-2): To set up the "Extranet service-protocols with real-time dynamic tokens" on top of the preferred "Wimax-communication protocol" for any Extranet enterprise and its associated Intranet-enterprises to conduct real-time dynamic symbiotic "Agent-to-Agent" interactive/cognitive transactions among themselves with security protections inside the Extranet Service Cloud (ESC).

Software Angel-Programming Method-3 (APM-3): To set up the "Community service-protocols with real-time dynamic tokens" on top of the preferred "Wimax-communication protocol" for any Community-Service-Provider and its associated Extranet-enterprises to conduct real-time dynamic symbiotic "Agent-to-Agent" interactive/cognitive transactions among themselves with security protections inside the Community Service Cloud (CSC).

Software Agent Programming Method-4 (APM-4): To set up the "open Internet business-service-Agent Protocols (BSAP) to enhance (HTTP and RTP)" on top of the Internet communication protocols TCP/IP" to support the open business-service platform (BSP) for all the involved rt-AI CSPs to enable real-time dynamic best-negotiable proactive business service transactions with security and privacy protections to the general public via the Internet access devices.

It can be concluded that by carrying out all the hardware and software methods, the 4-level lattice-like CSP-interconnected open business service platform (BSP) can be created. It can enable vEnterprise-to-vEnterprise (vE2vE) business services to all the involved real-time-(BS)-AI-agent-based enterprises and enhances them with symbiotic and cooperative services. Most importantly, the general public can access to this business service platform (BSP) via the open Internet-protocol-based devices as consumers and consume all the real-time proactive business services from all the real-time-AI-agent-based vEnterprises and CSPs resided on this platform, which can be dubbed as the one and only "real-time-(BS)-AI-agent-based open business service platform (BSP)", achieving the objectives as described earlier.

FIG. 51 Rt-SI-Agent-Based Organization-Cloud Systems and Open BSP

As shown in FIG. 51, a preferred 4-Level-lattice real-time AI-(4-level-Enterprise)-Agent-based open business service platform (BSP) comprises a plurality of level-1 eBusiness vSystems, level-2 Intranet vSystems, level-3 Extranet vSystems and level-4 Internet-CSP vSystems.

In addition, based on all the above rt-AI vEnterprise-Systems, there are 3 aforementioned WANs (1,2,3) can all be established, as shown in FIG. 41.

Furthermore, by interconnecting among all the Internet-CSPs via the Internet communication protocols and further by extending linkages to all the involved real-time AI-enterprises, the one and only 4-level lattice-like real-time AI-based open business service platform is thus established.

A plurality of node-computing system-based enterprises can be interconnected together via the open Internet communication protocols, but they cannot create an open Internet business service platform, due to the fact that application-based business services are fixated and closed based on HTTP/RTP as well as OSI-7 protocols and it can only create private-service cloud on the Internet, let alone the one and only open E2E business service platform, where real-time symbiotic and cooperative business-to-business services and real-time competitive and proactive business-to-user services can be established. Only the open Interconnections of "real-time-AI-based enterprise vSystems", (i.e., vEnterprises) can create the one and only real-time open-AI vE2vE business service platform, in short open-BSP.

5.6 Apparatus-Based User-PS Unitary wEntities/wSystems, Apparatus-Zone vSystems and Open Internet Service Platforms 5.6.1 Real-Time Intelligent User Operation-Service Appliances As an ideal real-world user service-based appliance, it should be equipped with the following 3 types of specialized mechanism. They are 1) the base-level supply-side user-operation-based service-generation mechanism (appliance-SGM) to generate user operation-enabled services (UOS), 2) the top-level service-delivery-mechanism (a-SDM) to deliver user operational services (UOS) and 3) the internal service-control mechanism (a-SCM) to control service-generation and service-delivery mechanisms over the UOS-based activities to all the external service-oriented connections.

In fact, there are 4 major external service-oriented corner-connections. They are 1) the front-end top-level corner-connection to the external users/owners via the internal front-end SDM with Human-Machine-Interface (HMI), 2) the back-end top-level corner-connection to the external device's service control-mechanism (d-SCM) via the internal back-end SDM, 3) the front-end base-level corner-connection to other external appliances' service-generation mechanisms (a-SGM) via the internal SGM and 4) the back-end base-level corner-connection to the external device's service-generation-mechanism (d-SGM) via the internal SGM. In so doing, the aforementioned ideal user-appliance is fully networked with other user-appliances for collaboration and with the back-end control device that can further compose multiple appliances' services into a more sophisticated long-running user-services.

Therefore, an ideal user-operation-based appliance, comprising multiple collaborative service-oriented mechanisms, must achieve its ultimate objective; that is "to real-time deliver "user operational services (UOS)" to its users/owners with real-time 4-corner-entry collaborative intelligence.

Based on the same must-achieve ultimate objective, it can be concluded that the architectural construction of an ideal user appliance with the real-time 4-corner-entry collaborative intelligence is similar to the architectural construction of an ideal business department facility with the same 4-corner-entry collaborative intelligence. The only difference is that a user-appliance only has to serve few users/owners or just one owner/user, while a business-department has to serve as many customers as possible.

Therefore, it is only rational that the hardware methods for creating a standard department-wEntity's 4-corner-entry-skeleton-based Hierarchical Core structure (HCS) can be modified by using smaller workgroup computing modules (wCMs) to "construct" a new set of 6-wBBBs and then "aggregate" them into a small and "compact" 4-corner-entry-skeleton-based HCS for an ideal user-appliance wEntity, since the self-growth is not necessary.

To be more specific, a standard "Department" execution-pylon-(XP with execution 3wBBB) & failover pylon-(FP with fail-over 3BBB)-combined HCS comprises a base-level (m-tiers, 4-ribbons) assembly-block with matrix-expert-stations that y-connect to the Job1-ribbon assembly-line, together with a front-end and a back-end dispatch hubs, a mid-level (4,5,1,1)-assembly-conveyer and a top-level (x>4=n, y=7) assembly-tree together with a front-end agent-station and a back-end agent-station, as stated earlier.

Since an assembly-unit can be reduced into a cWSA (i.e., wCM 91 or 93), (m, 4) assembly-block can then be reduced into (mx4)-cWSA and (x, 7) Assembly-tree into {(x−1)×7}-cWSA plus one top-cWSA. In addition, an expert-station can be replaced by a fail-over-paired Team-control Processors TcP (i.e., wCC 41 or 51) for particular functional mechanism, a base-level dispatch hub can be replaced by a cWSA and an Agent-station can be replaced by a cWSA.

Therefore, a typical compact user-appliance XP+FP-based HCS comprises a base-level assembly-block of mx4-cWSA with matrix-Team-control Processors (TcP) that y-connect to the Job1-ribbon assembly-line, together with a front-end dispatch-cWSA and a back-end dispatch-cWSA, a mid-level (4,5,1,1)-assembly-conveyer and a top-level assembly-tree of {(x−1)×7}-cWSA+top-cWSA together with a front-end agent-cWSA and a back-end agent-cWSA.

Furthermore, by compressing the base-level m-tier×4-cWSA into 1-tier×4-paired TcP, merging matrix-TcP of Job1-ribbon assembly-line into the second pair-TcP and including 2× paired TcP to replace the front-end and back-end dispatch cWSAs, a new base-level assembly-block of 6× paired TcP-based WSA(i=12) is established. By replacing mid-level (4,5,1,1)-assembly-conveyer with a fail-over 4-sided mWSA, a new mid-level assembly-conveyer is established. By compressing the top-level {(x−1)×7}-cWSA into 1-tier×7-paired TcP, by replacing top-cWSA with a paired TcP and by replacing front-end and back-end agent-cWSA with 2× paired TcP, a new top-level assembly-tree of two-tier cWSAs can be formed, where first-tier cWSA(i=7×2=14) and the second tier cWSA (i=3×2=6).

Most importantly, it is only rational that the software methods for generating a standard department-based Portfolio-wEntity's integrated-operating-systems (OSs) and structured-domain programs (DPs) in the standard-HCS will remain the same and then converge those existed OSs and DPs into the Appliance-based Portfolio-wEntity-based compact-HCS, so that the real-time 4-corner-entry collaborative intelligence can be maintained. These appliance-equipped software programs (OSs and DPs) should be reliable and without debugging, due to the fact that the software components-to-structure architecture is proven working in its biggest self-growing department environment and by reducing the working environment for a few users/owners as well as for just one owner will only increase the software programs' integrity, which is totally different from chopping multiple solid master programs into multiple distributed programs and diverging them from a smaller environment to a larger environment, where the unforeseen results will arise.

Therefore, this type of user-operation-service (UOS)-capable "Appliance-based Portfolio-wEntity based on compact-HCS can all be equipped with 1) front-end top-corner multi-contract Portfolio-Agent software in the front-end service-delivery-mechanism (SDM), 2) back-end top-corner information/knowledge Portfolio-agent software in the back-end SDM, 3) front-end base-corner multi-contract matrix-Expert software in the service-generation-mechanism (SGM) and 4) back-end base-corner multi-library Jobber software in the service-control-mechanism (SCM). Just like a real-time 4-corner-entry business-operation service (BOS)-intelligent Department-based Portfolio-wEntity, this type of Appliance-based Portfolio-wEntity can deliver all the real-time fine-grained-proactive (FGP) services to its users/owners with real-time 4-corner-entry UOS-intelligence.

Based on the aforementioned rational courses of action for creating real-time-intelligent Appliance wSystems, together with the usage of workgroup transaction-based wG4-wEAs and business Portfolio-wEntity-based wG5.1-wEA, the third workgroup evolutionary principle (wEP3) is thus established to bring forth the sixth-generation/first-stage "real-time intelligent Appliance-based" workgroup Entity Architecture (wG6.1-wEA) that comprises the following 6 mandates for creating all the potential workgroup user-operation-service-based "Portfolio-wEntities", dubbed as "uPortfolio-wEntities".

Mandate-1: the must-have 6 uPortfolio-wEntity-based workgroup Basic Building Blocks (uPortfolio-6BBBs), which can be constructed by using the "compact" Contract-HCSs" and WSAs;

Mandate-2: the must-have uPortfolio-wEntity-based Hierarchical Core Structure (uPortfolio-HCS) by aggregating uPortfolio-6BBBs with workgroup four linkages and bundles;

Mandate-3: the must-have uPortfolio-wEntity-based Hardware Architecture Theory (uPortfolio-HAT) with related methods in constructing uPortfolio-6BBBs and in aggregating them into compact uPortfolio-HCSs;

Mandate-4: the must-have uPortfolio-wEntity-oriented OS (uPortfolio-OS) to equip uPortfolio-HCS into uPortfolio-wEntity-oriented Core Structure (uPortfolio-ECS);

Mandate-5: the must-have uPortfolio-wEntity domain programs (uPortfolio-DPs) to equip uPortfolio-ECS into uPortfolio-wEntity-oriented Domain Structure (uPortfolio-EDS); and Mandate-6: the must-have uPortfolio-wEntity-based Software Architecture Theory (uPortfolio-SAT) with related software methods in generating uPortfolio-OSs and uPortfolio-DPs.

By abiding the third mandate of wEP3.wG6.1 evolutionary architecture, the sixth generation/first-stage Theoretic Foundation (wTF3.wG6.1) can be derived, which contains a uPortfolio-wEntity-based Hardware Architecture Theory (uPortfolio-HAT) that comprises multiple Hardware Construction Methods (HCMs) in creating "compact" uPortfolio-6BBBs and multiple Hardware Aggregation Methods (HAMs) in creating "compact" uPortfolio-HCSs.

In addition, by abiding the sixth mandate of wEP3.wG6.1 evolutionary architecture, the sixth generation/first-stage workgroup Theoretic Foundation (wTF3.wG6.1) can be extended to include a uPortfolio-wEntity-oriented Software Architecture Theory (uPortfolio-SAT), which comprises multiple uPortfolio-wEntity OS-oriented software Integration Methods (EIMs) in generating uPortfolio-OSs and multiple uPortfolio-wEntity-domain-oriented software Programming Methods (EPMs) in real-time generating uPortfolio-DPs.

It can be concluded that by fulfilling the sixth-generation first-stage uPortfolio-wEntity based Architecture (i.e., wG6.1-wEA) and carrying out wTF3.wG6.1-(HAT/SAT), a series of "fail-safe" uPortfolio-wEntities with various degrees of real-time workgroup user operation-service-based intelligence can be created. However, based on the aforementioned standard compact Contract-wEntities as the basic components to warrant the solidity and completeness of wG6.1-wEA, there are only one standard "fail-safe" uPortfolio-wEntities that are needed, due to two preferred "4-corner-entry" workgroup-user-operation-based full-fledge workgroup-Appliance-based compact Hierarchical Core Structures (HCSs), as illustrated by FIG. 52*a&b*.

Furthermore, these compact uPortfolio-wEntities can further be built into real-world "standardized real-time UOS-intelligent uPortfolio-Agent-based compact Appliance wSystems" based on wG6.1 user-portfolio-operation-service-based System Disciplines (wG6.r-posSD), which will populate the sixth generation of real-world service-oriented workgroup evolutionary pathway and eventually achieve the ideal real-world user-appliance's ultimate objective, as defined earlier.

FIG. 52*a&b* Preferred Apparatus-Portfolio Appliance-wEntity-Based Compact HCS As shown in FIG. 52*a&b*, a standard 6-wBBB-architected Apparatus uPortfolio-HCS is created, where BAB, 2.BFB, 3.MMB, 4.MFB, 5.TCB and 6.TFB are constructed by using wCCs and wCMs, i.e., WSAs, as illustrated by the following HCM-6 Table.

| HCM-6: 6BBB | wCMs + wCCs | Abbr. Name | Description |
|---|---|---|---|
| 1.BAB= | | | Base Attribute Block |
| | wCM(91) | 91-C.1 | cWSA1p1-(down-left corner-entry) |
| | wCM(91) | 91-R1.(1-3) | cWSA1p1-Ribbon1.(1-3) |
| | wCM(91) | 91-R3.(1-3) | cWSA1p1-Ribbon3.(1-3) |
| | wCM(93) | 93-G.1 | cWSA2p1 (down-right corner-entry) |
| | wCM(93) | 93-R2.(1-3) | cWSA2p1-Ribbon2.(1-3) |
| | wCM(93) | 93-R4.(1-3) | cWSA2p1-Ribbon4.(1-3) |
| | wCC(41) | 41(1, 1)-41(i, j) | Team control Processor type1(1, 1) to (i, j) (real-time expandable) |
| 3.MMB= | | | Mid Memory Block |
| | wCM(81) | mWSA6p1 | memory Workgroup Server Array type2-version6/part1 |
| | wCM(83) | mWSA7p1(a-k) | memory Workgroup Server Array type2-version7/part1(a-k) |
| 5.TCB= | | | Top Control Block |
| | wCM(91) | 91-C.2 | cWSA1p1-(top-left corner-entry) |
| | wCM(91) | 91-R1.4 | cWSA1p1-Ribbon1.4 |
| | wCM(91) | 91-R3.(4-6) | cWSA1p1-Ribbon3.(4-6) |
| | wCM(91) | 91-R5.(1-4) | cWSA1p1-Ribbon5.(1-4) |
| | wCM(91) | 91-R6.(1-3) | cWSA1p1-Ribbon6.(1-3) |
| | wCM(93) | 93-G.2 | cWSA2p1-(top-right corner-entry) |
| | wCM(93) | 93-R2.4 | cWSA2p1-Ribbon2.4 |
| | wCM(93) | 93-R4.(4-6) | cWSA2p1-Ribbon4.(4-6) |
| | wCM(93) | 93-R7.(1-3) | cWSA2p1-Ribbon7.(1-3) |

| HCM-6: 6BBB | wCCs + wCMs | Abbr. Name | Description |
|---|---|---|---|
| 2.BFB-L= | | | Base Failover Block-Left |
| | wCM(92) | 92-C.1 | cWSA1p2-(down-left corner-entry) |
| | wCM(92) | 92-R1.(1-3) | cWSA1p2-Ribbon1.(1-3) |
| | wCM(92) | 92-R3.(1-3) | cWSA1p2-Ribbon3.(1-3) |
| | wCC(9) | TaP1m(1-2)-L | Team attribute Panel manager(1-2)-Left |
| 2.BFB-R= | | | Base Failover Block-Right |
| | wCM(94) | 94-G.1 | cWSA2p2-(down-right corner-entry) |
| | wCM(94) | 94-R2.(1-3) | cWSA2p2-Ribbon2.(1-3) |
| | wCM(94) | 94-R4.(1-3) | cWSA2p2-Ribbon4.(1-3) |
| | wCC(9) | TaP1m(1-2)-R | Team attribute Panel manager(1-2)-Right |
| 4.MFB-L= | | | Mid Failover Block-Left |
| | wCM(84) | mWSA7p2(a-f) | memory Workgroup Server Array type2-version7/part2(a-f) |
| | wCM(82) | mWSA6p2 | memory Workgroup Server Array type2-version6/part2 |
| | wCC(29) | TmP1m(1-2)-L | Team memory Processor manager type1 (1-2)-L |
| 4.MFB-R= | | | Mid Failover Block-Right |
| | wCM(84) | mWSA7p2(g-k) | memory Workgroup Server Array type2-version7/part2(g-k) |
| | wCC(29) | TmP1m(1-2)-R | Team memory Processor manager type1 (1-2)-R |
| 6.TFB-L= | | | Top Failover Block-Left |
| | wCC(49) | TcP1m(1-2)-L | Team control Processor manager type1 (1-2)-Left |
| | wCM(92) | 92-C.2 | cWSA1p2-(top-left corner entry) |
| | wCM(92) | 92-R1.4 | cWSA1p2-Ribbon1.4 |
| | wCM(92) | 92-R3.(4-6) | cWSA1p2-Ribbon3.(4-6) |
| | wCM(92) | 92-R5.(1-4) | cWSA1p2-Ribbon5.(1-4) |
| | wCM(92) | 92-R6.(1-3) | cWSA1p2-Ribbon6.(1-3) |
| 6.TFB-R= | | | Top Failover Block-Right |
| | wCC(49) | TcP1m(1-2)-R | Team control Processor manager type1 (1-2)-Right |
| | wCM(94) | 94-G.2 | cWSA2p2-(top-right corner entry) |
| | wCM(94) | 94-R2.4 | cWSA2p2-Ribbon2.4 |
| | wCM(94) | 94-R4.(4-6) | cWSA2p2-RIbbon4.(4-6) |
| | wCM(94) | 94-R7.(1-3) | cWSA2p2-RIbbon7.(1-3) |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Apparatus-Portfolio-HCS=wCM(810+820), as illustrated by the following HAM-5 Table.

| HAM-5 Module: wCM( ) | Abbr. Name | Description |
|---|---|---|
| BF: wCM( ) (1.BAB + 2.BFB-L&R) | Base Framework | Agg via base WL3-bundle |
| MF: wCM( ) (3.MMB + 4.MFB-L&R) | Mid-Framework | Agg via mid WL3-bundle |
| TF: wCM( ) (5.TCB + 6.TFB-L&R) | Top-Framework | Agg via top WL3-bundle |
| XP: wCM(810) (1.BAB + 3.MMB + 5.TCB) | uPortfolio-XP | User-Portfolio Execution Pylon: Agg via WL1, WL2 |
| FP-L: wCM(820) (2.BFB + 4.MFB + 6.TFB) | uPortfolio-FP-L | User-Portfolio Failover Pylon-Left: Agg via WL4 |
| FP-R: wCM(820) (2.BFB + 4.MFB + 6.TFB) | uPortfolio-FP-R | User-Portfolio Failover Pylon-Right: Agg via WL4 |
| XP + FP-L&R: wCM(810 + 820-L&R) | uPortfolio-HCS | Compact User-Portfolio Hierarchical Core Structure |

5.6.2 Real-Time Intelligent User Composition-Service Devices

As an ideal real-world user service-based device, it should be equipped with the following 3 types of specialized mechanism. They are 1) the base-level user-Apparatus composition-based service-generation-mechanism (SGM) to generate multi-user-Apparatus operation-based user composition-enabled services (UCS), 2) the top-level service-delivery-mechanism (SDM) to deliver user composition services (UCS) and 3) the internal service-control mechanism (SCM) to control service-generation and service-delivery mechanisms over the UCS-based activities to all the external service-oriented connections.

In fact, there are 4 major external service-oriented corner-connections. They are 1) the front-end top-level corner-connection to the external users/owners via the internal front-end SDM with Human-Machine-Interface (HMI), 2) the back-end top-level corner-connection to the external gadget's service control-mechanism (g-SCM) via the internal back-end SDM, 3) the front-end base-level corner-connection to other external devices' service-generation mechanisms (d-SGM) via the internal SGM and 4) the back-end base-level corner-connection to the external gadget's service-generation-mechanism (g-SGM) via the internal SGM. In so doing, the aforementioned ideal user-apparatus device is fully networked with the front-end appliances and other user-devices for collaboration and with the back-end gadget that can further manage multiple captive devices' compositional services.

Therefore, an ideal user-apparatus composition-service-based device, comprising multiple collaborative service-oriented mechanisms, must achieve its ultimate objective; that is "to real-time deliver "user compositional services (UCS)" to its users/owners with real-time 4-corner-entry collaborative intelligence.

Based on the same must-achieve ultimate objective, it can be concluded that the architectural construction of an ideal user device with the real-time 4-corner-entry UCS-intelligence is similar to the architectural construction of an ideal business division facility with the same 4-corner-entry BCS-intelligence. The only difference is that a user-device only has to serve few users/owners, while a business division has to serve as many clients as possible.

Therefore, it is only rational that the hardware methods for creating a standard division wEntity's 4-corner-entry-skeleton-based Hierarchical Core structure (HCS) can be modified by using smaller workgroup computing modules (wCMs) to "construct" a new set of 6-wBBBs and then "aggregate" them into a small and "compact" 4-corner-entry-skeleton-based HCS for an ideal user-device wEntity, since the self-growth is not necessary.

Based on the aforementioned modified hardware methods of reducing the standard-HCS into a compact-HCS, a typical compact user-device XP+FP-based HCS can be established. It comprises 1) a base-level assembly-block consisting of mx4-cWSA together with a front-end dispatch-cWSA and a back-end dispatch-cWSA, 2) a mid-level (4,5,1,1)-assembly-conveyer and 3) a top-level assembly-tree consisting of $\{(x-1)\times 7\}$-cWSA+top-cWSA together with a front-end agent-cWSA and a back-end agent-cWSA.

Most importantly, it is only rational that the software methods for generating a standard division-based Apparatus-Project-wEntity's integrated-operating-systems (OSs) and structured-domain programs (DPs) in the standard-HCS will remain the same and then converge those existed OSs and DPs into the user-apparatus Device-based Project-wEntity-based compact-HCS, so that the real-time 4-corner-entry collaborative intelligence can be maintained. These device-equipped software programs (OSs and DPs) should be reliable and without debugging, due to the fact that the software components-to-structure architecture is proven working in its biggest self-growing division environment and by reducing the working environment for a few users/owners will only increase the software programs' integrity.

Therefore, this type of user-composition-service (UCS)-capable "Apparatus Device-based Project-wEntity based on compact-HCS can all be equipped with 1) front-end top-corner multi-contract Project-Agent software in the front-end service-delivery-mechanism (SDM), 2) back-end top-corner information/knowledge Project-agent software in the back-end SDM, 3) front-end base-corner multi-portfolio matrix-Expert software in the service-generation-mechanism (SGM) and 4) back-end base-corner multi-library Jobber software in the service-control-mechanism (SCM). Just like a real-time 4-corner-entry business-composition-service (BOS)-intelligent Division-based Project-wEntity, this type of Apparatus Device-based Project-wEntity can deliver all the real-time fine-grained-proactive (FGP) services to its users/owners with real-time 4-corner-entry UCS-intelligence.

Based on the aforementioned rational courses of action for creating real-time intelligent user-apparatus Project Agent-based Device wSystems, together with the usage of workgroup-transaction-based wG4-wEAs and business Project-wEntity-based wG5.2-wEA, the third workgroup evolutionary principle (wEP3) is thus established to bring forth the sixth-generation/second-stage "real-time intelligent Device-based" workgroup wEntity Architecture (wG6.2-wEA) that comprises the following 6 mandates for creating all the potential "workgroup user-composition-service-based" "Apparatus-Project-wEntities".

Mandate-1: the must-have 6 Apparatus-Project-wEntity-based workgroup Basic Building Blocks, which can be constructed by using the "compact" Contract-HCSs" and WSAs;

Mandate-2: the must-have Apparatus-Project-wEntity-based Hierarchical Core Structure by aggregating Apparatus-Project-6BBBs with workgroup four linkages and bundles;

Mandate-3: the must-have Apparatus-Project-wEntity-based Hardware Architecture Theory with related methods in constructing Apparatus-Project-6BBBs and in aggregating them into Apparatus-Project-HCSs;

Mandate-4: the must-have Apparatus-Project-wEntity-oriented OS to equip Apparatus-Project-HCS into Apparatus-Project-wEntity-oriented Core Structure (ECS);

Mandate-5: the must-have Apparatus-Project-wEntity domain programs (DPs) to equip Apparatus-Project-ECS into Apparatus-Project-wEntity-oriented Domain Structure (EDS); and Mandate-6: the must-have Apparatus-Project-wEntity-based Software Architecture Theory with related software methods in generating Apparatus-Project-OSs and Apparatus-Project-DPs.

By abiding the third mandate of wEP3.wG6.2 evolutionary architecture, the sixth-generation/second-stage Theoretic Foundation (wTF3.wG6.2) can be derived, which contains an Apparatus-Project-wEntity-based Hardware Architecture Theory that comprises multiple Hardware Construction Methods (HCMs) in creating the Apparatus-Project-6BBBs and multiple Hardware Aggregation Methods (HAMs) in creating Apparatus-Project-HCSs.

In addition, by abiding the sixth mandate of wEP3.wG6.2 evolutionary architecture, the sixth-generation/second-stage workgroup Theoretic Foundation (wTF3.wG6.2) can be extended to include an Apparatus-Project-wEntity-based Software Architecture Theory, which comprises multiple Apparatus-Project-wEntity OS-oriented software Integration Methods (EIMs) in generating Apparatus-Project-OSs and Apparatus-Project-wEntity domain-oriented software Programming Methods (EPMs) in real-time generating Apparatus-Project-DPs.

It can be concluded that by fulfilling the sixth-generation second-stage Apparatus-Project-wEntity-based Architecture (i.e., wG6.2-wEA) and carrying out wTF3.wG6.2-(HAT/SAT), a series of "fail-safe" Apparatus-Project-wEntities with various degrees of real-time workgroup user-composition-service-based intelligence can be created. However, based on the aforementioned compact Contract-wEntities as the basic components to warrant the solidity and completeness of wG6.2-wEA, there are only one standard "fail-safe" Apparatus-Project-wEntities that are needed, due to two preferred "4-corner-entry" workgroup-user composition-based compact Hierarchical Core Structures (HCSs), as illustrated by FIG. 53*a&b*.

Furthermore, these compact Apparatus-Project-wEntities can further be built into real-world "standardized real-time UCS-intelligent Apparatus-Project-agent-based compact wDevice wSystems" based on wG6.2 user project-composition-service-based System Disciplines (wG6.2-pcsSD), which will populate the sixth generation of real-world service-oriented workgroup evolutionary pathway and eventually achieve the ideal real-world user-device's ultimate objective, as defined earlier.

FIG. 53*a&b* Preferred Apparatus-Project Device-wEntity-Based Compact tCS

As shown in FIG. 53*a&b*, a preferred 6-wBBB-architected Apparatus-Project-HCS is created, where 1.BAB, 2.BFB, 3.MMB, 4.MFB, 5.TCB and 6.TFB are constructed by using wCCs and wCMs, i.e., WSAs, as illustrated by the following HCM-6 Table.

| HCM-6: 6BBB | wCMs + wCCs | Abbr. Name | Description |
|---|---|---|---|
| 1.BAB= | | | Base Attribute Block |
| | wCM(91) | 91-C.1 | cWSA1p1-(down-left corner-entry) |
| | wCM(91) | 91-R1.(1-2) | cWSA1p1-Ribbon1.(1-2) |
| | wCM(91) | 91-R3.(1-2) | cWSA1p1-Ribbon3.(1-2) |
| | wCM(93) | 93-G.1 | cWSA2p1 (down-right corner-entry) |
| | wCM(93) | 93-R2.(1-2) | cWSA2p1-Ribbon2.(1-2) |
| | wCM(93) | 93-R4.(1-2) | cWSA2p1-Ribbon4.(1-2) |
| | wCC(41) | 41(1, 1)-41(2, j) | Team control Processor type1 (1, 1)-(2, j) |
| 3.MMB= | | | Mid Memory Block |
| | wCM(81) | mWSA6p1 | memory Workgroup Server Array type2 version6/part1 |
| | wCM(83) | mWSA7p1(a-g) | memory Workgroup Server Array type2 version7/part1(a-k) |
| 5.TCB= | | | Top Control Block |
| | wCM(91) | 91-C.2 | cWSA1p1-(top-left corner-entry) |
| | wCM(91) | 91-R1.3 | cWSA1p1-Ribbon1.3 |
| | wCM(91) | 91-R3.(3-5) | cWSA1p1-Ribbon3.(3-5) |
| | wCM(91) | 91-R5.(1-4) | cWSA1p1-Ribbon5.(1-4) |
| | wCM(91) | 91-R6.(1-3) | cWSA1p1-Ribbon6.(1-3) |
| | wCM(93) | 93-G.2 | cWSA2p1-(top-right corner-entry) |
| | wCM(93) | 93-R2.3 | cWSA2p1-Ribbon2.3 |
| | wCM(93) | 93-R4.(3-5) | cWSA2p1-Ribbon4.(3-5) |
| | wCM(93) | 93-R7.(1-3) | cWSA2p1-Ribbon7.(1-3) |

| HCM-6: 6BBB | wCCs + wCMs | Abbr. Name | Description |
|---|---|---|---|
| 2.BFB-L= | | | Base Failover Block-Left |
| | wCM(92) | 92-C.1 | cWSA1p2-(down-left corner-entry) |
| | wCM(92) | 92-R1.(1-2) | cWSA1p2-Ribbon1.(1-2) |
| | wCM(92) | 92-R3.(1-2) | cWSA1p2-Ribbon3.(1-2) |
| | wCC(9) | TaP1m(1-2)-L | Team attribute Panel manager(1-2)-Left |
| 2.BFB-R= | | | Base Failover Block-Right |
| | wCM(94) | 94-G.1 | cWSA2p2-(down-right corner-entry) |
| | wCM(94) | 94-R2(1-2) | cWSA2p2-Ribbon2.(1-2) |
| | wCM(94) | 94-R4(1-2) | cWSA2p2-Ribbon4.(1-2) |
| | wCC(9) | TaP1m(1-2)-R | Team attribute Panel manager (1-2)-Right |
| 4.MFB-L= | | | Mid Failover Block-Left |
| | wCM(84) | mWSA7p2(a-f) | memory Workgroup Server Array type2-version7/part2(a-f) |
| | wCM(82) | mWSA6p2 | memory Workgroup Server Array type2 version6/part2 |
| | wCC(29) | TmP1m(1-2)-L | Team memory Processor manager type1 (1-2)-Left |
| 4.MFB-R= | | | Mid Failover Block-Right |
| | wCM(84) | mWSA7p2(g-k) | memory Workgroup Server Array type2-version7/part2(g-k) |
| | wCC(29) | TmP1m(1-2)-R | Team memory Processor manager type1 (1-2)-Right |
| 6.TFB-L= | | | Top Failover Block-Left |
| | wCC(49) | TcP1m(1-2)-L | Team control Processor manager type1(1-2)-Left |
| | wCM(92) | 92-C.2 | cWSA1p2-(top-left corner entry) |
| | wCM(92) | 92-R1.3 | cWSA1p2-Ribbon1.3 |
| | wCM(92) | 92-R3.(3-5) | cWSA1p2-Ribbon3.(3-5) |
| | wCM(92) | 92-R5.(1-4) | cWSA1p2-Ribbon5.(1-4) |
| | wCM(92) | 92-R6.(1-3) | cWSA1p2-Ribbon6. (1-3) |
| 6.TFB-R= | | | Top Failover Block-Right |
| | wCC(49) | TcP1m(1-2)-R | Team control Processor manager type1(1-2)-Right |
| | wCM(94) | 94-G.2 | cWSA2p2-(top-right corner entry) |
| | wCM(94) | 94-R2.3 | cWSA2p2-Ribbon2.3 |
| | wCM(94) | 94-R4.(3-5) | cWSA2p2-RIbbon4.(3-5) |
| | wCM(94) | 94-R7.(1-3) | cWSA2p2-RIbbon7.(1-3) |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Apparatus-Project-HCS=wCM(830+840), as illustrated by the following HAM-5 Table.

| HAM-5 Module: wCM( ) | Abbr. Name | Description |
|---|---|---|
| BF: wCM( ) (1.BAB + 2.BFB-L&R) | Base Framework | Agg via base WL3-bundle |
| MF: wCM( ) (3.MMB + 4.MFB-L&R) | Mid-Framework | Agg via mid WL3-bundle |
| TF: wCM( ) (5.TCB + 6.TFB-L&R) | Top-Framework | Agg via top WL3-bundle |
| XP: wCM(830) (1.BAB + 3.MMB + 5.TCB) | Full Fledged uProject-XP | Full Fledged user-Project-Execution Pylon: Agg via WL1, WL2 |
| FP-L: CM(840) (2.BFB + 4.MFB + 6.TFB) | Full Fledged uProject-FP-L | Full Fledged user-Project-Failover Pylon-Left: Agg via WL4 |
| FP-L: wCM(840) (2.BFB + 4.MFB + 6.TFB) | Full Fledged uProject-FP-R | Full Fledged user-Project-Failover Pylon-Right: Agg via WL4 |

-continued

| HAM-5 Module: wCM( ) | Abbr. Name | Description |
|---|---|---|
| XP + FP-L&R: wCM(830 + 840-L&R) | Full Fledged uProject-HCS | Full Fledged user-Project Hierarchical Core Structure |

5.6.3 Real-Time Intelligent User Management Service Gadgets

As an ideal real-world user management service-based gadget, it should be equipped with the following 3 types of specialized mechanism. They are 1) the base-level user-management-based service-generation-mechanism (SGM) to generate multi-user-composition-based user management services (UMS), 2) the top-level service-delivery-mechanism (SDM) to deliver user management services (UMS) and 3) the internal service-control mechanism (SCM) to control base-level service-generation and top-level service-delivery mechanisms over the UMS-based activities to all the external service-oriented connections.

In fact, there are 4 major external service-oriented corner-connections. They are 1) the front-end top-level corner-connection to the external front-end users/owners, to the external front-end captive device's back-end SDM and captive appliances' back-end SDMs via the internal front-end SDM with Human-Machine-Interface (HMI), 2) the back-end top-level corner-connection to the external widget's service control-mechanism (g-SCM) via the internal back-end SDM, 3) the front-end base-level corner-connection to its captive external devices' service-generation mechanisms (d-SGM) via the internal SGM and 4) the back-end base-level corner-connection to the external widget's service-generation-mechanism (g-SGM) via the internal SGM. In so doing, the aforementioned user-gadget is directly networked with its captive device and captive appliances for collaboration and with the back-end widget that can further administrate all the captive gadgets' management services.

Therefore, an ideal user-management-service-based gadget, comprising multiple collaborative service-oriented mechanisms, must achieve its ultimate objective; that is "to real-time deliver "user management services (UMS)" to its users/owners with real-time 4-corner-entry collaborative intelligence.

Based on the same must-achieve ultimate objective, it can be concluded that the architectural construction of an ideal user gadget with the real-time 4-corner-entry UMS-intelligence is similar to the architectural construction of an ideal business division-Office facility with the same 4-corner-entry BMS-intelligence. The only difference is that a user-gadget only has to serve few users/owners or just one owner/user, while a business division-Office has to serve as many managers as possible.

Therefore, it is only rational that the hardware methods for creating a standard Office-wEntity's 4-corner-entry-skeleton-based Hierarchical Core structure (HCS) can be modified by using smaller workgroup computing modules (wCMs) to "construct" a new set of 6-wBBBs and then "aggregate" them into a small and "compact" 4-corner-entry-skeleton-based HCS for an ideal user-gadget wEntity, since the self-growth is not necessary.

Based on the aforementioned modified hardware methods of reducing the standard-HCS into a compact-HCS, a typical compact user-gadget XP+FP-based HCS can be established. It comprises 1) a base-level assembly-block consisting of mx2-cWSA together with a front-end dispatch-cWSA and a back-end dispatch-cWSA, 2) a mid-level (2,3)-assembly-conveyer and 3) a top-level assembly-tree consisting of $\{(x-1)\times3\}$-cWSA+top-cWSA together with a front-end agent-cWSA and a back-end agent-cWSA.

Most importantly, it is only rational that the software methods for generating a standard Office-based Policy-wEntity's integrated-operating-systems (OSs) and structured-domain programs (DPs) in the standard-HCS will remain the same and then converge those existed OSs and DPs into the Gadget-based Policy-wEntity-based compact-HCS, so that the real-time 4-corner-entry collaborative intelligence can be maintained. These gadget-equipped software programs (OSs and DPs) should be reliable and without debugging, due to the fact that the software components-to-structure architecture is proven working in its biggest self-growing division-Office environment and by reducing the working environment for a few users/owners as well as for just one owner will only increase the software programs' integrity.

Therefore, this type of user-management-service (UMS)-capable "Gadget-based Policy-wEntity based on compact-HCS can all be equipped with 1) front-end top-corner multi-contract Policy-Agent software in the front-end service-delivery-mechanism (SDM), 2) back-end top-corner information/knowledge Policy-agent software in the back-end SDM, 3) front-end base-corner multi-project matrix-Expert software in the service-generation-mechanism (SGM) and 4) back-end base-corner multi-library Jobber software in the service-control-mechanism (SCM). Just like a real-time 4-corner-entry business-management-service (BMS)-intelligent Office-based Policy-wEntity, this type of Gadget-based Policy-wEntity can deliver all the real-time fine-grained-proactive (FGP) services to its users/owners with real-time 4-corner-entry UMS-intelligence.

Based on the aforementioned rational courses of action for creating real-time intelligent user Policy-Agent-based gadgets, together with the usage of wG4-wEAs and business Policy-wEntity-based wG5.3-wEA, the third workgroup evolutionary principle (wEP3) is thus established to bring forth the sixth-generation/third-stage "real-time intelligent gadget-based" wEntity Architecture (wG6.3-wEA) that comprises the following 6 mandates for creating all the potential "workgroup user-management-service"-based "Policy-wEntities", dubbed as "uPolicy-wEntities".

Mandate-1: the must-have 6 uPolicy-wEntity-based workgroup Basic Building Blocks (uPolicy-6BBBs), which can be constructed by using the "compact" Contract-HCSs" and WSAs;

Mandate-2: the must-have uPolicy-wEntity-based Hierarchical Core Structure (uPolicy-HCS) by aggregating uPolicy-6BBBs with workgroup four linkages and bundles;

Mandate-3: the must-have uPolicy-wEntity-based Hardware Architecture Theory (uPolicy-HAT) with related methods in constructing uPolicy-6BBBs and in aggregating them into uPolicy-HCSs;

Mandate-4: the must-have uPolicy-wEntity-oriented OS (uPolicy-OS) to equip uPolicy-HCS into uPolicy-wEntity-oriented Core Structure (uPolicy-ECS);

Mandate-5: the must-have uPolicy-wEntity domain programs (uPolicy-DPs) to equip uPolicy-ECS into uPolicy-wEntity-oriented Domain Structure (uPolicy-EDS); and Mandate-6: the must-have uPolicy-wEntity-based Software Architecture Theory (uPolicy-SAT) with related software methods in generating uPolicy-OSs and uPolicy-DPs.

By abiding the third mandate of wEP3.wG6.3 evolutionary architecture, the sixth-generation/third-stage Theoretic Foundation (wTF3.wG6.3) can be derived, which contains an uPolicy-wEntity-based Hardware Architecture Theory (uPolicy-HAT) that comprises multiple Hardware Construction Methods (HCMs) in creating the uPolicy-6BBBs and multiple Hardware Aggregation Methods (HAMs) in creating uPolicy-HCSs.

In addition, by abiding the sixth mandate of wEP3.wG6.3 evolutionary architecture, the sixth-generation/third-stage workgroup Theoretic Foundation (wTF3.wG6.3) can be extended to include an uPolicy-wEntity-based Software Architecture Theory (uPolicy-SAT), which comprises multiple uPolicy-wEntity OS-oriented software Integration Methods (EIMs) in generating uPolicy-OSs and uPolicy-wEntity domain-oriented software Programming Methods (EPMs) in real-time generating uPolicy-DPs.

It can be concluded that by fulfilling the sixth-generation third-stage uPolicy-wEntity-based Architecture (i.e., wG6.3-wEA) and carrying out wTF3.wG6.3-(HAT/SAT), a series of "fail-safe" uPolicy-wEntities with various degrees of real-time workgroup user-management-service-based intelligence can be created. However, based on the aforementioned compact Contract-wEntities as the basic components to warrant the solidity and completeness of wG6.3-wEA, there are only one standard "fail-safe" uPolicy-wEntities that are needed, due to two preferred "4-corner-entry" workgroup-user-management service-based compact Hierarchical Core Structures (HCSs), as illustrated by FIG. 54*a&b*.

Furthermore, these compact uPolicy-wEntities can further be built into real-world "standardized real-time UMS-intelligent uPolicy-agent-based compact Gadget wSystems" based on wG6.3 user policy-management-service-based System Disciplines (wG6.3-pmsSD), which will populate the sixth generation of real-world service-oriented workgroup evolutionary pathway and eventually achieve the ideal real-world user-gadget's ultimate objective, as defined earlier.

FIG. 54*a&b* Preferred Apparatus-Policy Gadget-wEntity-Based Compact HCSs

As shown in FIG. 54*a&b*, a preferred 6-wBBB-architected Apparatus-Policy-HCS is created, where 1.BAB, 2.BFB, 3.MMB, 4.MFB, 5.TCB and 6.TFB are constructed by using wCCs and wCMs, i.e., WSAs, as illustrated by the following HCM-6 Table.

| HCM-6: 6BBB | wCMs | Abbr. Name | Description |
|---|---|---|---|
| 1.BAB= | | | Base Attribute Block |
| | wCM(91) | 91-C.1 | cWSA1p1-(down-left corner-entry) |
| | wCM(91) | 91-R1.(1-2) | cWSA1p1-Ribbon1.(1-2) |
| | wCC(41) | 41(1, 1)-41(2, j) | Team control Processor type1 (1, 1)-(2, j) |
| | wCM(93) | 93-G.1 | cWSA2p1 (down-right corner-entry) |
| | wCM(93) | 93-R2.(1-2) | cWSA2p1-Ribbon2.(1-2) |

-continued

| HCM-6: 6BBB | wCMs | Abbr. Name | Description |
|---|---|---|---|
| 3.MMB= | | | Mid Memory Block |
| | wCM(77) | mWSA4p1 | memory Workgroup Server Array type2-version4/part1 |
| | wCM(83) | mWSA7p1 (a-e) | memory Workgroup Server Array type2-version7/part1(a-e) |
| 5.TCB= | | | Top Control Block |
| | wCM(91) | 91-C.2 | cWSA1p1-(top-left corner-entry) |
| | wCM(91) | 91-R1.(3-5) | cWSA1p1-Ribbon1.(3-5) |
| | wCM(91) | 91-R3.(1-4) | cWSA1p1-Ribbon3.(1-4) |
| | wCM(93) | 93-G.2 | cWSA2p1-(top-right corner-entry) |
| | wCM(93) | 93-R2.(3-5) | cWSA2p1-Ribbon2.(3-5) |

| HCM-6: 6BBB | wCCs + wCMs | Abbr. Name | Description |
|---|---|---|---|
| 2.BFB-L= | | | Base Failover Block-Left |
| | wCM(92) | 92-C.1 | cWSA1p2-(down-left corner-entry) |
| | wCM(92) | 92-R1.(1-2) | cWSA1p2-Ribbon1.(1-2) |
| | wCC(9) | TaP1m (1-2)-L | Team attribute Panel manager(1-2)-Left |
| 2.BFB-R= | | | Base Failover Block-Right |
| | wCM(94) | 94-G.1 | cWSA2p2-(down-right corner-entry) |
| | wCM(94) | 94-R2.(1-2) | cWSA2p2-Ribbon2.(1-2) |
| | wCC(9) | TaP1m (1-2)-R | Team attribute Panel manager(1-2)- |
| 4.MFB-L= | | | Right Mid Failover Block-Left |
| | wCM(84) | mWSA7p2 (a-c) | memory Workgroup Server Array type2-version7/part2(a-c) |
| | wCM(78) | mWSA4p2 | memory Workgroup Server Array type2-version4/part2 |
| | wCC(29) | TmP1m (1-2)-L | Team memory Processor manager type1 (1-2)-L |
| 4.MFB-R= | | | Mid Failover Block-Right |
| | wCM(84) | mWSA7p2 (d-e) | memory Workgroup Server Array type2-version7/part2(g-k) |
| | wCC(29) | TmP1m (1-2)-R | Team memory Processor manager type1 (1-2)-R |
| 6.TFB-L= | | | Top Failover Block-Left |
| | wCC(49) | TcP1m (1-2)-L | Team control Processor manager type1 (1-2)-Left |
| | wCM(92) | 92-C.2 | cWSA1p2-(top-left corner entry) |
| | wCM(92) | 92-R1.(3-5) | cWSA1p2-Ribbon1.(3-5) |
| | wCM(92) | 92-R3.(1-4) | cWSA1p2-Ribbon3.(1-4) |
| 6.TFB-R= | | | Top Failover Block-Right |
| | wCC(49) | TcP1m (1-2)-R | Team control Processor manager type1 (1-2)-Right |
| | wCM(94) | 94-G.2 | cWSA2p2-(top-right corner entry) |
| | wCM(94) | 94-R2.(3-5) | cWSA2p2-Ribbon2.(3-5) |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Apparatus-Policy-HCS=wCM(850+860), as illustrated by the following HAM-5 Table.

| HAM 5 Modules | Abbr. Name | Description |
|---|---|---|
| BF: wCM( ) (1.BAB + 2.BFB-L&R) | Base Framework | Agg via base WL3-bundle |
| MF: wCM( ) (3.MMB + 4.MFB-L&R) | Mid-Framework | Agg via mid WL3-bundle |
| TF: wCM( ) (5.TCB + 6.TFB-L&R) | Top-Framework | Agg via top WL3-bundle |
| XP: wCM(850) (1.BAB + 3.MMB + 5.TCB) | Full Fledged uPolicy-XP | Full Fledged user Policy-Execution Pylon: Agg via WL1, WL2 |
| FP-L: wCM(860) (2.BFB + 4.MFB + 6.TFB) | Full Fledged uPolicy-FP-L | Full Fledged user Policy-Failover Pylon-Left: Agg via WL4 |
| FP-R: wCM(860) (2.BFB + 4.MFB + 6.TFB) | Full Fledged uPolicy-FP-R | Full Fledged user Policy-Failover Pylon-Right: Agg via WL4 |
| XP + FP-L&R: wCM(850 + 860-L&R) | Full Fledged uPolicy-HCS | Full Fledged user-Policy Hierarchical Core Structure |

5.6.4 Real-Time Intelligent User Administration-Service Widgets

As an ideal real-world user administration service-based widget, it should be equipped with the following 3 types of specialized mechanism. They are 1) the base-level user-administration-based service-generation-mechanism (SGM) to generate multi-user-management-based user-administration-services (UAS), 2) the top-level service-delivery-mechanism (SDM) to deliver user administration services (UAS) and 3) the internal service-control mechanism (SCM) to control base-level service-generation and top-level service-delivery mechanisms over the UAS-based activities to all the external service-oriented connections.

In fact, there are 4 major external service-oriented corner-connections. They are 1) the front-end top-level corner-connection to the external front-end captive gadgets' back-end SDM via the internal front-end SDM, 2) the back-end top-level corner-connection to the external back-end users/owners via internal back-end SDM with Human-Machine-Interface (HMI), 3) the front-end base-level corner-connection to its captive external gadgets' service-generation mechanisms (g-SGM) via the internal front-end SGM and 4) the back-end base-level corner-connection to the external gadgets', devices', appliances' service-generation-mechanisms (SGM) via the internal back-end SGM. In so doing, the aforementioned user-widget is directly networked with its captive gadgets for multi-management administration services and with all the front-end gadgets, devices and appliances for providing real-time library services.

Therefore, an ideal user-administration-service-based widget, comprising multiple collaborative service-oriented mechanisms, must achieve its ultimate objective; that is "to real-time deliver "user administration services (UAS)" to its users/owners with real-time 4-corner-entry collaborative intelligence.

Based on the same must-achieve ultimate objective, it can be concluded that the architectural construction of an ideal user widget with the real-time 4-corner-entry UAS-intelligence is similar to the architectural construction of an ideal business Central-office facility with the same 4-corner-entry BAS-intelligence. The only difference is that a user-widget only has to serve few users/owners or just one owner/user, while a business Central-office has to serve as many enterprise internal department/division/office controllers as possible.

Therefore, it is only rational that the hardware methods for creating a standard Central-wEntity's 4-corner-entry-skeleton-based Hierarchical Core structure (HCS) can be modified by using smaller workgroup computing modules (wCMs) to "construct" a new set of 6-wBBBs and then "aggregate" them into a small and "compact" 4-corner-entry-skeleton-based HCS for an ideal user-widget wEntity, since the self-growth is not necessary.

Based on the aforementioned modified hardware methods of reducing the standard-HCS into a compact-HCS, a typical compact user-widget XP+FP-based HCS can be established. It comprises 1) a base-level assembly-block consisting of mx2-cWSA together with a front-end dispatch-cWSA and a back-end dispatch-cWSA, 2) a mid-level (2,3)-assembly-conveyer and 3) a top-level assembly-tree consisting of $\{(x-1)\times(y)$ expandable$\}$-cWSA+top-cWSA together with a front-end agent-cWSA and a back-end agent-cWSA.

Most importantly, it is only rational that the software methods for generating a standard Central-office-based Strategy-wEntity's integrated-operating-systems (OSs) and structured-domain programs (DPs) in the standard-HCS will remain the same and then converge those existed OSs and DPs into a Widget-based Strategy-wEntity-based compact-HCS, so that the real-time 4-corner-entry collaborative intelligence can be maintained. These widget-equipped software programs (OSs and DPs) should be reliable and without debugging, due to the fact that the software components-to-structure architecture is proven working in its biggest self-growing Central-office environment and by reducing the working environment for a few users/owners as well as for just one owner will only increase the software programs' integrity.

Therefore, this type of user-administration-service (UAS)-capable "Widget-based Strategy-wEntity based on compact-HCS can all be equipped with 1) front-end top-corner multi-contract Strategy-Agent software in the front-end service-delivery-mechanism (SDM), 2) back-end top-corner information/knowledge Strategy-agent software in the back-end SDM, 3) front-end base-corner multi-policy matrix-Expert software in the service-generation-mechanism (SGM) and 4) back-end base-corner multi-library Jobber software in the service-control-mechanism (SCM). Just like a real-time 4-corner-entry business-administration-service (BAS)-intelligent Central-based Strategy-wEntity, this type of Widget-based Strategy-wEntity can deliver all the real-time fine-grained-proactive (FGP) services to its users/owners with real-time 4-corner-entry UAS-intelligence.

Based on the aforementioned rational courses of action for creating real-time intelligent user Strategy-Agent-based widgets, together with the usage of wG4-wEAs and business Strategy-wEntity-based wG5.4-wEA, the third workgroup evolutionary principle (wEP3) is thus established to bring forth the sixth-generation/fourth-stage "real-time intelligent widget-based" wEntity Architecture (wG6.4-wEA) that comprises the following 6 mandates for creating all the potential "workgroup user-administration-service"-based "Strategy-wEntities", dubbed as "uStrategy-wEntities".

Mandate-1: the must-have 6 uStrategy-wEntity-based workgroup Basic Building Blocks (uStrategy-6BBBs), which can be constructed by using the "compact" Contract-HCSs" and WSAs;

Mandate-2: the must-have uStrategy-wEntity-based Hierarchical Core Structure (uStrategy-HCS) by aggregating uStrategy-6BBBs with workgroup four linkages and bundles;

Mandate-3: the must-have uStrategy-wEntity-based Hardware Architecture Theory (uStrategy-HAT) with related methods in constructing uStrategy-6BBBs and in aggregating them into uStrategy-HCSs;

Mandate-4: the must-have uStrategy-wEntity-oriented OS (uStrategy-OS) to equip uStrategy-HCS into uStrategy-wEntity-oriented Core Structure (uStrategy-ECS);

Mandate-5: the must-have uStrategy-wEntity domain programs (uStrategy-DPs) to equip uStrategy-ECS into uStrategy-wEntity-oriented Domain Structure (uStrategy-EDS); and Mandate-6: the must-have uStrategy-wEntity-based Software Architecture Theory (uStrategy-SAT) with related software methods in generating uStrategy-OSs and uStrategy-DPs.

By abiding the third mandate of wEP3.wG6.4 evolutionary architecture, the sixth-generation/fourth-stage Theoretic Foundation (wTF3.wG6.4) can be derived, which contains an uStrategy-wEntity-based Hardware Architecture Theory (uStrategy-HAT) that comprises multiple Hardware Construction Methods (HCMs) in creating the uStrategy-6BBBs and multiple Hardware Aggregation Methods (HAMs) in creating uStrategy-HCSs.

In addition, by abiding the sixth mandate of wEP3.wG6.4 evolutionary architecture, the sixth-generation/fourth-stage workgroup Theoretic Foundation (wTF3.wG6.4) can be extended to include an uStrategy-wEntity-based Software Architecture Theory (uStrategy-SAT), which comprises multiple uStrategy-wEntity OS-oriented software Integration Methods (EIMs) in generating uStrategy-OSs and uStrategy-wEntity domain-oriented software Programming Methods (EPMs) in real-time generating uStrategy-DPs.

It can be concluded that by fulfilling the sixth-generation fourth-stage uStrategy-wEntity-based Architecture (i.e., wG6.4-wEA) and carrying out wTF3.wG6.4-(HAT/SAT), a series of "fail-safe" uStrategy-wEntities with various degrees of real-time workgroup user-administration-service-based intelligence can be created. However, based on the aforementioned compact Contract-wEntities as the basic components to warrant the solidity and completeness of wG6.4-wEA, there are only one standard "fail-safe" uStrategy-wEntities that are needed, due to two preferred "4-corner-entry" workgroup-user-administration service-based compact Hierarchical Core Structures (HCSs), as illustrated by FIG. 55*a&b*.

Furthermore, these compact and PDA-Strategy-wEntities can further be built into real-world "standardized real-time UAS-intelligent uStrategy-agent-based compact wWidget wSystems" based on wG6.4 user strategy-administration-service-based System Disciplines (wG6.4-sasSD), which will populate the sixth generation of real-world service-oriented workgroup evolutionary pathway and eventually achieve the ideal real-world user-widget's ultimate objective, as defined earlier.

FIG. 55*a&b* Preferred Apparatus-Strategy Widget-wEntities-Based Compact HCSs As shown in FIG. 55*a&b*, a preferred 6-wBBB-architected Apparatus-Strategy-HCS is created, where 1.BAB, 2.BFB, 3.MMB, 4.MFB, 5.TCB and 6.TFB are constructed by using wCCs and wCMs, i.e., WSAs, as illustrated by the following HCM-6 Table.

| HCM-6: 6BBB | wCMs | Abbr. Name | Description |
|---|---|---|---|
| 1.BAB= | | | Base Attribute Block |
| | wCM(91) | 91-C.1 | cWSA1p1-(down-left corner-entry) |
| | wCM(91) | 91-R1.(1-2) | cWSA1p1-Ribbon1.(1-2) |
| | wCC(41) | 41(1, 1)-41(2, j) | Team control Processor type1 (1,1)-(2, j) (real-time expandable) |
| | wCM(93) | 93-G.1 | cWSA2p1 (down-right corner-entry) |
| | wCM(93) | 93-R2.(1-2) | cWSA2p1-Ribbon2.(1-2) |
| | wCC(51) | 51(1, 1)-F(2, j) | Team control Processor type2 (1, 1)-(2, j) (real-time expandable) |
| 3.MMB= | | | Mid Memory Block |
| | wCM(77) | mWSA4p1 | memory Workgroup Server Array type2-version4/part1 |
| | wCM(83) | mWSA7p1 (a-e) | memory Workgroup Server Array type2-vesion7/part1(a-e) |
| 5.TCB= | | | Top Control Block |
| | wCM(91) | 91-C.2 | cWSA1p1-(top-left corner-entry) |
| | wCM(91) | 91-R1.(3-(i-1)) | cWSA1p1-Ribbon1.(3-(i-1)) |
| | wCM(91) | 91-R3.(1-i) | cWSA1p1-Ribbon3.(1-i) |
| | wCM(93) | 93-G.2 | cWSA2p1-(top-right corner-entry) |
| | wCM(93) | 93-R2.(3-(i-1)) | cWSA2p1-Ribbon2.(3-(i-1)) |

| HCM-6: 6BBB | wCCs + wCMs | Abbr. Name | Description |
|---|---|---|---|
| 2.BFB-L= | | | Base Failover Block-Left |
| | wCM(92) | 92-C.1 | cWSA1p2-(down-left corner-entry) |
| | wCM(92) | 92-R1.(1-2) | cWSA1p2-Ribbon1.(1-2) |
| | wCC(9) | TaP1m(1-2)-L | Team attribute Panel manager (1-2)-Left |
| 2.BFB-R= | | | Base Failover Block-Right |
| | wCM(94) | 94-G.1 | cWSA2p2-(down-right corner-entry) |
| | wCM(94) | 94-R2.(1-2) | cWSA2p2-Ribbon2.(1-2) |
| | wCC(9) | TaP1m(1-2)-R | Team attribute Panel manager (1-2)-Right |
| 4. MFB-L= | | | Mid Failover Block-Left |
| | wCM(84) | mWSA7p2 (a-c) | memory Workgroup Server Array type2-version7/part2(a-c) |
| | wCM(78) | mWSA4p2 | memory Workgroup Server Array type2-version4/part2 |
| | wCC(29) | TmP1m (1-2)-L | Team memory Processor manager type1 (1-2)-L |
| 4.MFB-R= | | | Mid Failover Block-Right |
| | wCM(84) | mWSA7p2 (d-e) | memory Workgroup Server Array type2-version7/part2(d-e) |
| | wCC(29) | TmP1m (1-2)-R | Team memory Processor manager type1 (1-2)-R |
| 6.TFB-L= | | | Top Failover Block-Left |
| | wCC(49) | TcP1m(1-2)-L | Team control Processor manager type1(1-2)-Left |
| | wCM(92) | 92-C.2 | cWSA1p2-(top-left corner entry) |
| | wCM(92) | 92-R1.(3-(i-1)) | cWSA1p2-Ribbon1.(3-(i-1)) |
| | wCM(92) | 92-R3.(1-i) | cWSA1p2-Ribbon3.(1-i) |
| 6.TFB-R= | | | Top Failover Block-Right |
| | wCC(49) | TcP1m(1-2)-R | Team control Processor manager type1(1-2)-Right |
| | wCM(94) | 94-G.2 | cWSA2p2-(top-right corner entry) |
| | wCM(94) | 94-R2.(3-(i-1)) | cWSA2p2-Ribbon2.(3-(i-1)) |

In addition, there are 5 wCMs, i.e., 1. BF, 2.MF, 3.TF, 4.XP and 5.FP, are aggregated by using 6 wBBBs via WL1, WL2, WL3-bundle and WL4, creating the preferred Apparatus-Strategy-HCS=wCM(870+880), as illustrated by the following HAM-5 Table.

| HAM-5 Module: wCM( ) | Abbr. Name | Description |
|---|---|---|
| BF: wCM( ) (1.BAB + 2.BFB-L&R) | Base Framework | Agg via base WL3-bundle |
| MF: wCM( ) (3.MMB + 4.MFB-L&R) | Mid-Framework | Agg via mid WL3-bundle |
| TF: wCM( ) (5.TCB + 6.TFB-L&R) | Top-Framework | Agg via top WL3-bundle |
| XP: wCM(870) (1.BAB + 3.MMB + 5.TCB) | Full Fledged uStrategy-XP | Full Fledged user-Strategy-Execution Pylon: Agg via WL1, WL2 |
| FP-L: wCM(880) (2.BFB + 4.MFB + 6.TFB) | Full Fledged uStrategy-FP-L | Full Fledged user-Strategy-Failover Pylon-Left: Agg via WL4 |
| FP-R: wCM(880) (2.BFB + 4.MFB + 6.TFB) | Full Fledged uStrategy-FP-R | Full Fledged user-Strategy-Failover Pylon-Right: Agg via WL4 |
| XP + FP-L&R: wCM(870 + 880-L&R) | Full Fledged uStrategy-HCS | Full Fledged user-Strategy Hierarchical Core Structure |

5.6.5 Real-Time AI-Agent-Based User-Service Compact Apparatuses

In a real world user-service-oriented environment, an ideal multi-user-service-instrument-integrated "apparatus" should comprise multiple real-time user-operation-service (UOS)-intelligent appliance-instruments, real-time user-compositional service-(UCS)-intelligent device-instruments, real-time user-management service-(UMS)-intelligent gadget-instruments and one real-time user-administration service-(UAS)-intelligent widget-instrument and achieve its ultimate objective, "that is to real-time deliver its direct and fast user-portfolio-services and user-project-services to its external users/owners with real-time user-policy-management and user-strategy administration-based "artificial intelligence". It is based on the same philosophy of creating a real-time AI Enterprise by virtually-integrating multiple real-time BOS-intelligent departments, multiple real-time BCS-intelligent divisions, multiple real-time BMS-intelligent divisional-Offices and one real-time BAS-intelligent Central-office all together via internal hierarchical business-agents, as described earlier.

In order to achieve the ultimate objective, it is imperative that the following 5 sequential courses of action be carried out.

The first course of action is to establish all the necessary real-time UOS-intelligent appliances, so that they can work together and deliver the fine-grained-proactive (FGP)-portfolio services to the external users. There must have the following 2 types of collaborative appliances to achieve that goal.

The first type is the one that sends out external-demand contractual transactions from its front-end/top-level agents to the external suppliers for importing the packaged materials as well as utilities. After receiving them, the front-end/top-level agent will pass the packaged materials to the lower-level matrix-expert groups, which will handle the packaged materials and prepare them as internal supplies. This type of appliances can be dubbed as the "External Demand for Internal Supply" type1-(ED4IS) appliances, such as "utility-based" appliances for various packaged materials as well as utilities.

The second type is the one that sends out internal-demand contractual transactions from its front-end/top-level agents to type1-appliances' front-end/top-level agents as well as base-level experts to receive packaged materials as well as utilities for its internal matrix expert functional-groups to work on and produce the products/result-services ready for external users. This type of appliances can be dubbed as the "Internal Demand for Internal Supply" type2-(ID4IS) appliances.

Once all the required 2 types of 4-corner-entry full-fledged appliances are established, it is imperative that all the base-level matrix functional-units' front-end and back-end dispatch-hubs should be connected together respectively via Ethernet and the likes, forming a front-end and a back-end inter-appliance multi-function-unit-based LANs (local-area-network). The front-end inter-appliance multi-function-LAN1 can enable all the supply-side and demand-side contractual service-based collaborative operations among these 2-typed appliances. The back-end inter-appliance multi-function-LAN can enable all the contractual information- and knowledge-based sharing among these 2-typed appliances.

In addition, all the front-end top-level appliance Agent-WSA as well as Agent-TcP should be connected together with type1-appliance-adjacent Firewall-Router/Switch1 and type2-appliance-adjacent Firewall-Router/Switch2 via Ethernet and the likes, forming a front-end inter-appliance multi-Agent-LAN2, which can enable all the potential supply-side portfolio-service-based collaboration among these 2-typed appliances.

The second course of action is to establish all the necessary real-time UCS-intelligent device instruments, so that they can work collaboratively and deliver the fine-grained-proactive (FGP)-project services to the external users. There must have the following two types of collaborative devices to achieve that goal.

Once all the 2 types of appliances are created, it is rational to establish 1) one or more type1-Devices to control various type1-appliances, 2) one or more type2-Devices to control various type2 appliances. But for simplicity, it is ideal to use singular type1-device to type2-device to represent the whole group with particular type-based characteristics and these 2 types of devices are all built in with 4-corner-entry full-fledged characteristics.

By connecting the front-end base-level dispatch-hubs of these 2 types of devices, a front-end inter-device multi-function-LAN will be formed. Furthermore, by connecting it to the back-end inter-appliance multi-function-LAN3, this merged multi-function-LAN3 can enable multiple-tier device function units in each-typed device with all the portfolio-service-based real-time informations and real-time knowledges from its captive appliances and from the other typed-device's captive appliances, so that each-typed device can carry out project-service-based 4-base-jobs in the Assembly-Block and 7-top-jobs in the Assembly-Tree, as described earlier in the device section.

This merged multi-function-LAN3 of both back-end inter-appliance multi-function-LAN and front-end inter-device multi-function-LAN is vital for composing all the user-portfolio services into all the potential user-project-services, reflecting the important fact that device-compositional Project services are dependent on multiple appliance-portfolio services.

In addition, all the front-end top-level device Agent-WSAs as well as Agent-TcPs should be connected together with type1-device-adjacent Firewall-Router/Switch-3 and type2-device-adjacent Firewall-Router/Switch-4 via Ethernet and the likes, forming an inter-device front-end multi-Agent-based LAN4, which can enable all the potential supply-side project service-based collaboration among all the devices.

The third course of action is to establish all the necessary Gadget-instruments, so that they can work collaboratively and control individually over their captive device and appliances with real-time User-Management-Service (UMS)-intelligence. There must have the following 2 types of collaborative gadgets to achieve that goal.

Once all the 2 types of 4-corner-entry full-fledged devices are created, it is rational to establish 1) type1-Gadget to directly control type1-device and its captive type1 appliances, 2) type2-Gadget to directly control type2-device and its captive type2 appliances. These 2 types of Gadgets are all built in with 4-corner-entry full-fledged characteristics.

By connecting the front-end base-level multi-function-unit-based dispatch-hub of each-typed Gadget to the back-end base-level multi-function-unit-based dispatch hub of its captive device, this direct linkage-LAN5 of each type can enable the multiple-tier gadget functional-units with all the project-service-based real-time informations and real-time knowledges from its captive device, so that each-typed gadget can carry out policy-service-based 2-base-(management) jobs in the Assembly-Block and 3-top-(management) jobs in the Assembly-Tree, as described earlier in the gadget section.

In addition, the front-end top-level Agent-WSA/TcP of each-typed gadget should be connected to the back-end top-level Agent-WSA/TcP of its captive device and to the back-end top-level Agent-WSAs/TcPs of its captive appliances.

In so doing, this direct-linkage-LAN6 of each type enables gadget agents of each type to directly send the control commands to the back-end agents of its captive device and appliances, so that the users/owners of its captive device and appliances will have to react to the gadget commands and send new commands to affect their internal 7-top-(operation and composition) jobs and 4-base-(operation and composition) jobs, so that the outcomes from its captive appliances and device will meet the management requirements issued from each-typed gadget.

Once all the required 2 types of 4-corner-entry full-fledged gadgets are established, it is imperative that all the base-level back-end multi-function-unit-based dispatch-hubs should be connected together via Ethernet and the likes, forming a back-end inter-gadget multi-function-based LAN7, which can enable all the policy-information- and knowledge-based sharing between these 2-type gadgets.

In addition, all the back-end top-level gadget Agent-WSAs/TcPs should be connected together via Ethernet and the likes, forming a front-end inter-gadget multi-Agent-based LAN8, which can enable all the potential policy-service-based collaboration between these 2-type gadgets.

The fourth course of action is to establish the one and only Widget instrument, so that it can control all the gadgets with real-time user-administration-service (UAS)-intelligence.

Once the 2 types of gadgets are created, it is rational to establish only one type of widget to control these 2-typed gadgets.

By connecting the front-end base-level multi-function-unit-based dispatch-hub to the back-end base-level inter-gadget multi-function-LAN7, this linkage can enable the multiple-tier widget function-units with all the policy-service-based real-time informations and real-time knowledges from all the gadgets, so that the widget can carry out strategy-service-based 2-base-(administration)-jobs in the Assembly-Block and 3-top-(administration)-jobs in the Assembly-Tree, as described earlier in the Widget section.

In addition, the front-end top-level Agent-WSA/TcP of the Widget should be connected to the back-end top-level inter-gadget multi-Agent LAN8. In so doing, the widget-agents can directly send the control commands to the back-end agents of its captive gadgets, so that the users/owners of its captive gadgets will have to react to the widget commands and send new commands to affect their internal 3-top-(management) jobs and 2-base-(management)-jobs, so that the outcomes from its captive gadget will meet the administration requirements issued from the widget.

Once the 4-corner-entry full-fledged widget is established, it is imperative that the base-level back-end multi-function-unit-based dispatch-hub should be connected together with Firewall-Router/Switch-5 via Ethernet and the likes, forming a back-end widget multi-function-LAN9, which can enable to receive the strategy information- and knowledge-based from outside the apparatus.

In addition, the back-end top-level widget agent-WSA/TcP should be connected together with Firewall-Router/Switch-6 via Ethernet and the likes, forming a back-end widget multi-Agent-LAN10, which can enable potential strategy-service-based outside the Apparatus.

The fifth course of action is 1) to connect Firewall-Router/Switch-1, Firewall-Router/Switch-3 and Firewall-Router/Switch-5 together as the top-side border, 2) to connect Firewall-Router/Switch-2, Firewall-Router/Switch-4 and Firewall-Router/Switch-6 together as the bottom-side border and 3) to connect Firewall-Router/Switch-1 and Firewall-Router/Switch-2 together as the left-side border, a 3-sided tree-like border is established for an ideal "virtual Apparatus", which is conceptually defined to include all the 2 types of appliances, 2 types of devices, 2 types of gadgets and one widget. Since all the "internal" multi-function-LANs (1,3,5,7,9) and multi-agent-LANs (2,4,6,8,10) are sequentially and hierarchically connected together inside the 3-sided tree-like border, a (virtual)-Apparatus virtual-Entity-(vEntity)-based Hierarchical Core Structure (vHCS) is thus created and organized as a whole.

This type of user-service-capable Apparatus-Entity, equipped with vHCS, can deliver intelligent fine-grained-proactive (FGP) services to its external portfolio-users and project-users under its internal real-time policy-management and strategy administration intelligence, dubbed as "real-time Artificial Intelligent". It is because this user-service-oriented real-time "artificial intelligence" is a total integration of 4 kinds of real-time artificially-defined hierarchical-service protocol-based intelligent "internal agents", comprising from the bottom-fundamental user-service events/deeds-based portfolio-operational agents and project-compositional agents to the top-numerical business-service equations/formulas-based policy-management agents and strategy-administration agents. This real-time-AI-(Agent)-based Apparatus-Entity achieves its ultimate internal objective via the real-time collaboration among all the enclosed real-time internal user service-AI-agents and most importantly, achieves its external objective via the real-time external apparatus portfolio-service and project-service AI-agents.

Based on the aforementioned rational courses of action for creating real-time artificially-intelligent user-service Agent-based virtual workgroup systems for accommodating an ideal an multi-user-instrument organized Apparatus, the third workgroup evolutionary principle (wEP3) is thus established to bring forth the sixth-generation/fifth-stage "user-service-capable virtual Apparatus-Entity Architecture (wG6.5-vAEA) that comprises the following 5 workgroup mandates for creating all the potential "workgroup user-service-based Apparatus-vEntities.

Mandate-1: (components) the must-have 2 types of Appliance-wEntities, 2 types of Device-wEntities, 2 types of Gadget-wEntities and one type of Widget-wEntity to construct the potential Apparatus-vEntities.

Mandate-2: the must-have Apparatus internal user-agent Aggregation-based virtual Hierarchical Core Structure (Apparatus-vHCS) by aggregating all the uPortfolio/uProject/uPolicy/uStrategy (uPPPS)-wEntities hierarchically via multi-function LANs (1,3,5,7,9), multi-agent LANs (2,4,6,8,10) and 6 Firewall-Routers as well as Firewall Switches.

Mandate-3: the must-have Apparatus-vEntity-based virtual Hardware Architecture Theory (Apparatus-vHAT) with related methods in aggregating all the involved wEntities into an Apparatus-vHCS.

Mandate-4: the must-have Apparatus-vEntity-based hierarchical internal expert/agent-based domain programs (Apparatus-DPs) with msg-mailer and subagent capabilities to equip Apparatus-vHCS into Apparatus virtual-Entity Domain Structure (Apparatus-vEDS).

Mandate-5: the must-have Apparatus-vEntity-oriented virtual Software Architecture Theory (Apparatus-vSAT) with related software methods in generating internal expert/agent/subagent-based Apparatus domain programs (DPs) and also external Apparatus portfolio- and project-service-based agent/subagent-programs.

By abiding the third mandate of wEP3.wG6.5 evolutionary architecture, the sixth generation/fifth-stage Theoretic Foundation (wTF3.wG6.5) can be derived, which contains an Apparatus-vEntity-based Hardware Architecture Theory (Apparatus-vHAT), comprising multiple Hardware Aggregation Methods (HAMs) in creating the Apparatus-vHCS.

In addition, by abiding the fifth mandate of wEP3.wG6.5 evolutionary architecture, the sixth generation/fifth-stage workgroup Theoretic Foundation (wTF3.wG6.5) can be extended to include an Apparatus-vEntity-based Software Architecture Theory (Apparatus-vSAT), which comprises multiple Apparatus-vEntity domain-oriented expert/agent-software Programming Methods (vEPMs) in real-time generating internal domain programs and external transaction programs.

It can be concluded that by fulfilling the sixth-generation fifth-stage workgroup-Apparatus-vEntity based Architecture (i.e., wG6.5-vEA) and carrying out wTF3.wG6.5 (HAT/SAT), a series of "fail-safe-3" real-time-AI Apparatus-vEntities can be created to accommodate the following 3 user-service environments. They are:

1) any site-based environment with stationary real-time-AI compact Apparatuses, such as an AI-home (with home appliances, devices, gadgets and one widget), an AI-store (with store appliances, devices, gadgets and one widget), an AI-hospital and an AI-station.

2) any mobile-based environment with moveable real-time-AI compact Apparatuses, such as an AI-car (with car appliances, devices, gadgets and one widget) and an AI-robot.

Furthermore, these 2 types of Apparatus-vEntities can further be built into real-world "standardized real-time user-service-AI-agent-based compact Apparatus virtual-Systems (vSystems)" based on wG6.5 Apparatus user-service-based virtual System Disciplines (wG5.5-vSD), which will populate the fifth generation of real-world service-oriented workgroup evolutionary pathway and eventually achieve the ideal real-world real-time-AI Apparatus's ultimate objective, as defined earlier.

Moreover, these 3 types of preferred real-time AI-apparatus systems can contribute to 1) every Enterprise with onsite-facilities by using real-time-AI-site compact apparatuses, which can be y-connected to its host department via VPN and the like and grouped them into the matrix-expert-stations, enabling the said enterprise to become online and onsite commingled e-commerce capable with interactive-advertising and e-databox services, as illustrated in the U.S. patent application entitled "SYSTEM AND METHODS FOR IMPLEMENTING E-COMMERCE SERVICES", by Ivan Chung-Shung Hwang, filed on September 2000.

FIG. 56 Rt-AI User-Service Site-Apparatuses Compact vHCS

As shown in FIG. 56, a preferred Site-apparatus-based vHCS comprises a plurality of 2 types of compact Appliance-HCSs, 2 types of compact Device-HCSs, 2 types of compact Gadget-HCSs and one-type compact Widget-HCS. Details can be illustrated by the following table.

| Abbr. Name | wCMs | Description |
|---|---|---|
| upa-1<br>upa-2 | wCM(810 + 820-L&R) | type1/type2 user-Portfolio Appliance-based HCS |
| upd-1<br>upd-2 | wCM(830 + 840-L&R) | type1/type2 user-Project Device-based HCS |
| upg-1<br>upg-2 | wCM(850 + 860-L&R) | type1/type2 user-Policy Gadget based HCS |
| usw | wCM(870 + 880-L&R) | use-Strategy Widget-based HCS |

In addition, based on all the above HCSs, there are 5 aforementioned internal multi-expert LANs (1,3,5,7,9) and 5 aforementioned internal multi-agent LANs (2,4,6,8,10) together with 6 Firewall-Routers, which can all be established via w1-Ethernet linkage as well as VPN, as shown in FIG. 46.

Furthermore, by connecting FR1+FR3+FR5 together as the top-side border, by connecting FR2+FR4+FR6 together as the bottom-side border and by connecting FR1+FR2 together as the left-side border, a 3-sided tree-like secure-bordered AI-Apparatus-based compact virtual hierarchical Core Structure (cvHCS) can be established.

FIG. 57 Rt-AI User-Service Mobile-Apparatus Compact vHCS

As shown in FIG. 57, a preferred mobile-apparatus-based vHCS comprises a plurality of 2 types of compact Appliance-HCSs, 2 types of compact Device-HCSs, 2 types of compact Gadget-HCSs and one-type compact Widget-HCS.

Details can be illustrated by the following table.

| Abbr. Name | wCMs | Description |
|---|---|---|
| upa-1 | wCM(810 + 820- | type1/type2 user-Portfolio |
| upa-2 | L&R) | Appliance-based HCS |
| upd-1 | wCM(830 + 840- | type1/type2 user-Project |
| upd-2 | L&R) | Device-based HCS |
| upg-1 | wCM(850 + 860- | type1/type2, user-Policy |
| upg-2 | L&R) | Gadget based HCS |
| usw | wCM(870 + 880-<br>L&R) | use-Strategy Widget-based<br>HCS |

In addition, based on all the above HCSs, there are 5 aforementioned internal multi-expert LANs (1,3,5,7,9) and 5 aforementioned internal multi-agent LANs (2,4,6,8,10) together with 6 Firewall-Routers, which can all be established via w1-Ethernet linkage as well as VPN, as shown in FIG. 47.

Furthermore, by connecting FR1+FR3+FR5 together as the top-side border, by connecting FR2+FR4+FR6 together as the bottom-side border and by connecting FR1+FR2 together as the left-side border, a 3-sided tree-like secure-bordered AI-Apparatus-based compact virtual hierarchical Core Structure (vHCS) can be established.

5.7 PDA-Based Individual-Problem Solving Unitary wEntities/wSystems, PDA-Zone-PS Systems, PDA Cloud-Service wSystems and Open Internet Service Platforms 5.7.1 Real-Time Intelligent Individual Operation-Service Appliances As an ideal real-world individual-service-based appliance, it should be equipped with the following 3 types of specialized mechanism. They are 1) the base-level supply-side individual-operation-based service-generation mechanism (appliance-SGM) to generate individual operation-enabled services (IOS), 2) the top-level service-delivery-mechanism (a-SDM) to deliver individual operational services (IOS) and 3) the internal service-control mechanism (a-SCM) to control service-generation and service-delivery mechanisms over the IOS-based activities to all the external service-oriented connections.

In fact, there are 4 major external service-oriented corner-connections. They are 1) the front-end top-level corner-connection to the external individuals/owners via the internal front-end SDM with Human-Machine-Interface (HMI), 2) the back-end top-level corner-connection to the external device's service control-mechanism (d-SCM) via the internal back-end SDM, 3) the front-end base-level corner-connection to other external appliances' service-generation mechanisms (a-SGM) via the internal SGM and 4) the back-end base-level corner-connection to the external device's service-generation-mechanism (d-SGM) via the internal SGM. In so doing, the aforementioned ideal individual-PDA appliance is fully networked with other individual-PDA appliances for collaboration and with the back-end control device that can further compose multiple appliances' services into a more sophisticated long-running individual-services.

Therefore, an ideal individual-operation-based appliance, comprising multiple collaborative service-oriented mechanisms, must achieve its ultimate objective; that is "to real-time deliver "individual operational services (IOS)" to its individuals/owners with real-time 4-corner-entry collaborative intelligence.

Based on the same must-achieve ultimate objective, it can be concluded that the architectural construction of an ideal individual-PDA appliance with the real-time 4-corner-entry collaborative intelligence is similar to the architectural construction of an ideal business department facility with the same 4-corner-entry collaborative intelligence. The only difference is that an individual-PDA appliance only has to serve just one owner, while a business-department has to serve as many customers as possible.

By compressing the base-level m-tier×4-cWSA into 1-tier×4-paired TcP, merging matrix-TcP of Job1-ribbon assembly-line into the second pair-TcP and including 2× paired TcP to replace the front-end and back-end dispatch cWSAs, a new base-level assembly-block of 6× paired TcP-based WSA(i=12) is established. By replacing mid-level (4,5,1,1)-assembly-conveyer with a fail-over 4-sided mWSA, a new mid-level assembly-conveyer is established. By compressing the top-level {(x−1)×7}-cWSA into 1-tier×7-paired TcP, by replacing top-cWSA with a paired TcP and by replacing front-end and back-end agent-cWSA with 2× paired TcP, a new top-level assembly-tree of two-tier cWSAs can be formed, where first-tier cWSA(i=7×2=14) and the second tier cWSA (i=3×2=6). Finally, by combining the new base-level assembly-block, the new mid-level assembly-conveyer and the new top-level assembly-tree, a typical "miniature" individual-PDA appliance only-XP-based HCS can thus be established.

Most importantly, it is only rational that the software methods for generating a standard department-based Portfolio-wEntity's integrated-operating-systems (OSs) and structured-domain programs (DPs) in the standard-HCS will remain the same and then converge those existed OSs and DPs into the Appliance-based Portfolio-wEntity-based compact-HCS as well as miniature-HCS, so that the real-time 4-corner-entry collaborative intelligence can be maintained. These appliance-equipped software programs (OSs and DPs) should be reliable and without debugging, due to the fact that the software components-to-structure architecture is proven working in its biggest self-growing department environment and by reducing the working environment for just one owner will only increase the software programs' integrity, which is totally different from chopping multiple solid master programs into multiple distributed programs and diverging them from a smaller environment to a larger environment, where the unforeseen results will arise.

Therefore, this type of individual operation-service (IOS)-capable "Appliance-based Portfolio-wEntity based on miniature-HCS can all be equipped with 1) front-end top-corner multi-contract Portfolio-Agent software in the front-end service-delivery-mechanism (SDM), 2) back-end top-corner information/knowledge Portfolio-agent software in the back-end SDM, 3) front-end base-corner multi-contract matrix-Expert software in the service-generation-mechanism (SGM) and 4) back-end base-corner multi-library Jobber software in the service-control-mechanism (SCM). Just like a real-time 4-corner-entry business-operation service (BOS)-intelligent Department-based Portfolio-wEntity, this type of Appliance-based Portfolio-wEntity can deliver all the real-time fine-grained-proactive (FGP) services to its owner with real-time 4-corner-entry IOS-intelligence.

Based on the aforementioned rational courses of action for creating real-time-intelligent Appliance wSystems, together with the usage of workgroup transaction-based wG4-wEAs, Portfolio-wEntity-based wG5.1-wEA and wG6.1-wEA, the third workgroup evolutionary principle (wEP3) is thus established to bring forth the seventh-generation/first-stage "real-time intelligent Appliance-based" workgroup Entity Architecture (wG7.1-wEA) that comprises the following 6 mandates for creating all the potential workgroup individual operation-service-based "PDA-Portfolio-wEntities".

Mandate-1: the must-have 6 PDA-Portfolio-wEntity-based workgroup Basic Building Blocks (uPortfolio-6BBBs), which can be constructed by using the miniature Contract-HCSs" and WSAs;

Mandate-2: the must-have PDA-Portfolio-wEntity-based Hierarchical Core Structure by aggregating PDA-Portfolio-6BBBs with workgroup four linkages and bundles;

Mandate-3: the must-have PDA-Portfolio-wEntity-based Hardware Architecture Theory with related methods in constructing PDA-Portfolio-6BBBs and in aggregating them into PDA-Portfolio-HCSs;

Mandate-4: the must-have PDA-Portfolio-wEntity-oriented OS to equip PDA-Portfolio-HCS into PA-Portfolio-wEntity-oriented Core Structure (ECS)

Mandate-5: the must-have PDA-Portfolio-wEntity domain programs (DPs) to equip PDA-Portfolio-ECS into PDA-Portfolio-wEntity-oriented Domain Structure (EDS); and Mandate-6: the must-have PDA-Portfolio-wEntity-based Software Architecture Theory with related software methods in generating PDA-Portfolio-OSs and PA-Portfolio-DPs.

By abiding the third mandate of wEP3.wG7.1 evolutionary architecture, the seventh generation/first-stage Theoretic Foundation (wTF3.wG7.1) can be derived, which contains a PDA-Portfolio-wEntity-based Hardware Architecture Theory that comprises multiple Hardware Construction Methods (HCMs) in creating "miniature" PDA-Portfolio-6BBBs and multiple Hardware Aggregation Methods (HAMs) in creating "miniature" uPortfolio-HCSs.

In addition, by abiding the sixth mandate of wEP3.wG7.1 evolutionary architecture, the seventh generation/first-stage workgroup Theoretic Foundation (wTF3.wG7.1) can be extended to include a PDA-Portfolio-wEntity-oriented Software Architecture Theory, which comprises multiple PDA-Portfolio-wEntity OS-oriented software Integration Methods (EIMs) in generating PDA-Portfolio-OSs and multiple PDA-Portfolio-wEntity-domain-oriented software Programming Methods (EPMs) in real-time generating PDA-Portfolio-DPs.

It can be concluded that by fulfilling the seventh-generation first-stage PDA-Portfolio-wEntity based Architecture (i.e., wG7.1-wEA) and carrying out wTF3.wG7.1-(HAT/SAT), a series of "fail-safe" PDA-Portfolio-wEntities with various degrees of real-time workgroup individual operation-service-based intelligence can be created. However, based on the aforementioned standard miniature Contract-wEntities as the basic components to warrant the solidity and completeness of wG7.1-wEA, there are only one standard "fail-safe" PDA-Portfolio-wEntities that are needed, due to one preferred "4-corner-entry" workgroup-individual operation-based full-fledge workgroup-Appliance-based miniature Hierarchical Core Structures (HCSs), as illustrated by FIG. 58.

Furthermore, these miniature PDA-Portfolio-wEntities can further be built into real-world "standardized real-time IOS-intelligent PDA-Portfolio-Agent-based miniature Appliance wSystems" based on wG7.1 individual-PDA portfolio-operation-service-based System Disciplines (wG7.1-posSD), which will populate the seventh generation of real-world service-oriented workgroup evolutionary pathway and eventually achieve the ideal real-world individual-PDA appliance's ultimate objective, as defined earlier.

FIG. 58 Preferred PDA-Portfolio Appliance-wEntity-Based Miniature HCS

As shown in FIG. 58, a modified 3-wBBB-architected PDA-Portfolio-HCS is created, where 1.BAFB, 2.MMFB, 3.TCFB are constructed by using wCCs, as illustrated by the following HCM-3 Table.

| HCM-3: 3 wBBB | wCCs + wCMs | Abbr. Name | Description |
|---|---|---|---|
| 1.BAFB= | | | Base Attribute-Failover Block |
| | wCC(41) | TcP1-C.1 | Team control Processor type1-(down-left corner-entry) |
| | wCC(41) | TcP1-R1.1 | Team control Processor type1-Ribbon1.1 |
| | wCC(41) | TcP1-R3.1 | Team control Processor type1-Ribbon3.1 |
| | wCC(51) | TcP2-G.1 | Team control Processor type2-(down-right corner-entry) |
| | wCC(51) | TcP2-R2.1 | Team control Processor type 2-Ribbon2.1 |
| | wCC(51) | TcP2-R4.1 | Team control Processor type 2-Ribbon4.1 |
| 2.MMFB= | | | Mid Memory-Failover Block |
| | wCM(81) | mWSA6p1 | memory Workgroup Server Array type2 version6/part1 |
| 3.TCFB= | | | Top Control-Failover Block |
| | wCC(41) | TcP1-C.2 | Team control Processor type1-(top-left corner-entry) |
| | wCC(41) | TcP1-R1.2 | Team control Processor type1-Ribbon1.2 |
| | wCC(41) | TcP1-R3.2 | Team control Processor type1-Ribbon3.2 |
| | wCC(41) | TcP1-R5 (1-2) | Team control Processor type1-Ribbon5 (1-2) |
| | wCC(41) | TcP1-R6.1 | Team control Processor type1-Ribbon6.1 |
| | wCC(51) | TcP2-G.2 | Team control Processor type2-(top-right corner-entry) |
| | wCC(51) | TcP2-R2.2 | Team control Processor type 2-Ribbon2.2 |
| | wCC(51) | TcP2-R4.2 | Team control Processor type 2-Ribbon4.2 |
| | wCC(51) | TcP2-R7.1 | Team control Processor type 2-Ribbon7.1 |

In addition, by aggregating BAFB, MMFB and TCFB via WL1 and WL2, the preferred PDA-Portfolio-HCS is created as illustrated by FIG. 58.

5.7.2 Real-Time Intelligent Individual Composition-Service Devices

As an ideal real-world individual-PDA service-based device, it should be equipped with the following 3 types of specialized mechanism. They are 1) the base-level individual-PDA composition-based service-generation-mechanism (SGM) to generate individual composition-enabled services (ICS), 2) the top-level service-delivery-mechanism (SDM) to deliver individual composition services (ICS) and 3) the internal service-control mechanism (SCM) to control service-generation and service-delivery mechanisms over the ICS-based activities to all the external service-oriented connections.

In fact, there are 4 major external service-oriented corner-connections. They are 1) the front-end top-level corner-connection to the external owner via the internal front-end SDM with Human-Machine-Interface (HMI), 2) the back-end top-level corner-connection to the external gadget's service control-mechanism (g-SCM) via the internal back-end SDM, 3) the front-end base-level corner-connection to other external devices' service-generation mechanisms (d-SGM) via the internal SGM and 4) the back-end base-level corner-connection to the external gadget's service-generation-mechanism (g-SGM) via the internal SGM. In so doing, the aforementioned ideal individual device is fully networked with the front-end appliances and other individual-devices for collaboration and with the back-end gadget that can further manage multiple captive devices' compositional services.

Therefore, an ideal individual-composition-service-based device, comprising multiple collaborative service-oriented mechanisms, must achieve its ultimate objective; that is "to real-time deliver "individual compositional services (ICS)" to its owner with real-time 4-corner-entry collaborative intelligence.

Based on the same must-achieve ultimate objective, it can be concluded that the architectural construction of an ideal individual device with the real-time 4-corner-entry ICS-intelligence is similar to the architectural construction of an ideal business division facility with the same 4-corner-entry BCS-intelligence. The only difference is that an individual-device only has to serve just one owner/user, while a business division has to serve as many clients as possible.

Therefore, it is only rational that the hardware methods for creating a standard division wEntity's 4-corner-entry-skeleton-based Hierarchical Core structure (HCS) can be modified by using smaller workgroup computing modules (wCMs) to "construct" a new set of 6-wBBBs and then "aggregate" them into a small and "compact" 4-corner-entry-skeleton-based HCS for an ideal individual device wEntity, since the self-growth is not necessary. Furthermore, by using even smaller workgroup computing components (wCCs) to "construct" a new set of 3-wBBBs and "aggregate" them into a smaller and miniature 4-corner-entry-skeleton-based HCS for an ideal portable individual appliance wEntity, since the fail-safe is not necessary.

Based on the aforementioned modified hardware methods of reducing the standard-HCS into a compact-HCS, a typical compact user-device XP+FP-based HCS can be established. It comprises 1) a base-level assembly-block consisting of mx4-cWSA together with a front-end dispatch-cWSA and a back-end dispatch-cWSA, 2) a mid-level (4,5,1,1)-assembly-conveyer and 3) a top-level assembly-tree consisting of $\{(x-1)\times 7\}$-cWSA+top-cWSA together with a front-end agent-cWSA and a back-end agent-cWSA.

Furthermore, based on the aforementioned modified hardware methods of reducing the compact-HCS into a miniature-HCS, a typical miniature individual-device only-XP-based HCS can be established. It comprises 1) a base-level assembly-block consisting of 6× paired TcP-based WSA (i=12), 2) a mid-level assembly-conveyer consisting of a fail-over 4-sided mWSA and 3) a new top-level assembly-tree consisting of two-tier cWSAs, where the first-tier cWSA ($i=7\times 2=14$) and the second tier cWSA($i=3\times 2=6$).

Most importantly, it is only rational that the software methods for generating a standard division-based Project-wEntity's integrated-operating-systems (OSs) and structured-domain programs (DPs) in the standard-HCS will remain the same and then converge those existed OSs and DPs into the Device-based Project-wEntity-based compact-HCS as well as miniature-HCS, so that the real-time 4-corner-entry collaborative intelligence can be maintained. These device-equipped software programs (OSs and DPs) should be reliable and without debugging, due to the fact that the software components-to-structure architecture is proven working in its biggest self-growing division environment and by reducing the working environment for just one owner will only increase the software programs' integrity.

Therefore, this type of individual composition-service (ICS)-capable "Device-based Project-wEntity based on miniature-HCS can all be equipped with 1) front-end top-corner multi-contract Project-Agent software in the front-end service-delivery-mechanism (SDM), 2) back-end top-corner information/knowledge Project-agent software in the back-end SDM, 3) front-end base-corner multi-portfolio matrix-Expert software in the service-generation-mechanism (SGM) and 4) back-end base-corner multi-library Jobber software in the service-control-mechanism (SCM). Just like a real-time 4-corner-entry business-composition-service (BOS)-intelligent Division-based Project-wEntity, this type of Device-based Project-wEntity can deliver all the real-time fine-grained-proactive (FGP) services to its owner with real-time 4-corner-entry ICS-intelligence.

Based on the aforementioned rational courses of action for creating real-time intelligent individual Project Agent-based Device wSystems, together with the usage of workgroup-transaction-based wG4-wEAs, Project-wEntity-based wG5.2-wEA and wG6.2-wEA, the third workgroup evolutionary principle (wEP3) is thus established to bring forth the seventh-generation/second-stage "real-time intelligent Device-based" workgroup wEntity Architecture (wG7.2-wEA) that comprises the following 6 mandates for creating all the potential "workgroup individual-composition-service-based" "PDA Project-wEntities".

Mandate-1: the must-have 6 PDA-Project-wEntity-based workgroup Basic Building Blocks, which can be constructed by using the miniature Contract-HCSs" and WSAs;

Mandate-2: the must-have PDA-Project-wEntity-based Hierarchical Core Structure by aggregating PDA-Project-6BBBs with workgroup four linkages and bundles;

Mandate-3: the must-have PDA-Project-wEntity-based Hardware Architecture Theory with related methods in constructing PDA-Project-6BBBs and in aggregating them into PDA-Project-HCSs;

Mandate-4: the must-have PDA-Project-wEntity-oriented OS (uProject-OS) to equip PDA-Project-HCS into PDA-Project-wEntity-oriented Core Structure (ECS);

Mandate-5: the must-have PDA-Project-wEntity domain programs (DPs) to equip PDA-Project-ECS into PDA-Project-wEntity-oriented Domain Structure (EDS); and Mandate-6: the must-have PDA-Project-wEntity-based Software Architecture Theory with related software methods in generating PDA-Project-OSs and PDA-Project-DPs.

By abiding the third mandate of wEP3.wG7.2 evolutionary architecture, the seventh-generation/second-stage Theoretic Foundation (wTF3.wG7.2) can be derived, which contains an PDA-Project-wEntity-based Hardware Architecture Theory that comprises multiple Hardware Construction Methods (HCMs) in creating the PDA-Project-6BBBs and multiple Hardware Aggregation Methods (HAMs) in creating PDA-Project-HCSs.

In addition, by abiding the sixth mandate of wEP3.wG7.2 evolutionary architecture, the seventh-generation/second-stage workgroup Theoretic Foundation (wTF3.wG7.2) can be extended to include an PDA-Project-wEntity-based Software Architecture Theory, which comprises multiple PDA-Project-wEntity OS-oriented software Integration Methods (EIMs) in generating PDA-Project-OSs and PDA-uProject-wEntity domain-oriented software Programming Methods (EPMs) in real-time generating PDA-Project-DPs.

It can be concluded that by fulfilling the seventh-generation second-stage PDA-Project-wEntity-based Architecture (i.e., wG7.2-wEA) and carrying out wTF3.wG7.2-(HAT/SAT), a series of "fail-safe" PDA-Project-wEntities with various degrees of real-time workgroup Individual composition-service-based intelligence can be created. However, based on the aforementioned miniature Contract-wEntities as the basic components to warrant the solidity and completeness of wG7.2-wEA, there are only one standard "fail-safe" PDA-Project-wEntities that are needed, due to two preferred "4-corner-entry" workgroup-individual composition-based miniature Hierarchical Core Structures (HCSs), as illustrated by FIG. 59.

Furthermore, these PDA-Project-wEntities can further be built into real-world "standardized real-time ICS-intelligent PDA-Project-agent-based miniature wDevice wSystems" based on wG7.2 individual project-composition-service-based System Disciplines (wG7.2-pcsSD), which will populate the seventh generation of real-world service-oriented workgroup evolutionary pathway and eventually achieve the ideal real-world individual device's ultimate objective, as defined earlier.

FIG. 59 Preferred PDA-Project Device-wEntity-Based Miniature HCS

As shown in FIG. 59, a modified 3-wBBB-architected PDA-Project-HCS is created, where 1.BAFB, 2.MMFB, 3.TCFB are constructed by using wCCs and wCMs, as illustrated by the following HCM-3 Table.

| HCM-3: 3 wBBB | wCCs + wCMs | Abbr. Name | Description |
|---|---|---|---|
| 1.BAFB= | | | Base Attribute-Failover Block |
| | wCC(41) | TcP1-C.1 | Team control Processor type1-(down-left corner-entry) |
| | wCC(41) | TcP1-R1.1 | Team control Processor type1-Ribbon1.1 |
| | wCC(41) | TcP1-R3.1 | Team control Processor type1-Ribbon3.1 |
| | wCC(51) | TcP1-G.1 | Team control Processor type2-(down-right corner-entry) |
| | wCC(51) | TcP2-R2.1 | Team control Processor type 2-Ribbon2.1 |
| | wCC(51) | TcP2-R4.1 | Team control Processor type 2-Ribbon4.1 |
| 2.MMFB= | | | Mid Memory-Failover Block |
| | wCM(81) | mWSA6p1 | memory Workgroup Server Array type2 version6/part1 |
| 3.TCFB= | | | Top Control-Failover Block |
| | wCC(41) | TcP1-C.2 | Team control Processor type1-(top-left corner-entry) |
| | wCC(41) | TcP1-R1.2 | Team control Processor type1-Ribbon1.2 |
| | wCC(41) | TcP1-R3.2 | Team control Processor type1-Ribbon3.1 |
| | wCC(41) | TcP1-R5 (1-2) | Team control Processor type1-Ribbon4.1 |
| | wCC(41) | TcP1-R6.1 | Team control Processor type1-Ribbon4.1 |
| | wCC(51) | TcP1-G.2 | Team control Processor type2-(top-right corner-entry) |
| | wCC(51) | TcP2-R2.2 | Team control Processor type 2-Ribbon2.2 |
| | wCC(51) | TcP2-R5.1 | Team control Processor type 2-Ribbon5.1 |

In addition, by aggregating BAFB, MMFB and TCFB via WL1 and WL2, the preferred PDA-Project-HCS is created as illustrated by FIG. 59.

5.7.3 Real-Time Intelligent Individual Management Service Gadgets

As an ideal real-world individual-management service-based gadget, it should be equipped with the following 3 types of specialized mechanism. They are 1) the base-level individual-management-based service-generation-mechanism (SGM) to generate individual management services (IMS), 2) the top-level service-delivery-mechanism (SDM) to deliver individual management services (UMS) and 3) the internal service-control mechanism (SCM) to control base-level service-generation and top-level service-delivery mechanisms over the UMS-based activities to all the external service-oriented connections.

In fact, there are 4 major external service-oriented corner-connections. They are 1) the front-end top-level corner-connection to the external front-end owner, to the external front-end captive device's back-end SDM and captive appliances' back-end SDMs via the internal front-end SDM with Human-Machine-Interface (HMI), 2) the back-end top-level corner-connection to the external widget's service control-mechanism (g-SCM) via the internal back-end SDM, 3) the front-end base-level corner-connection to its captive external devices' service-generation mechanisms (d-SGM) via the internal SGM and 4) the back-end base-level corner-connection to the external widget's service-generation-mechanism (g-SGM) via the internal SGM. In so doing, the aforementioned individual-gadget is directly networked with its captive device and captive appliances for collaboration and with the back-end widget that can further administrate all the captive gadgets' management services.

Therefore, an ideal individual-management-service-based gadget, comprising multiple collaborative service-oriented mechanisms, must achieve its ultimate objective; that is "to real-time deliver "individual management services (UMS)" to its owner with real-time 4-corner-entry collaborative intelligence.

Based on the same must-achieve ultimate objective, it can be concluded that the architectural construction of an ideal individual gadget with the real-time 4-corner-entry UMS-intelligence is similar to the architectural construction of an ideal business division-Office facility with the same 4-corner-entry BMS-intelligence. The only difference is that an individual-gadget only has to serve just one owner/user, while a business division-Office has to serve as many managers as possible.

Therefore, it is only rational that the hardware methods for creating a standard Office-wEntity's 4-corner-entry-skeleton-based Hierarchical Core structure (HCS) can be modified by using smaller workgroup computing modules (wCMs) to "construct" a new set of 6-wBBBs and then "aggregate" them into a small and "compact" 4-corner-entry-skeleton-based HCS for an ideal individual-gadget wEntity, since the self-growth is not necessary. Furthermore, by using even smaller workgroup computing components (wCCs) to "construct" a new set of 3-wBBBs and "aggregate" them into a smaller and miniature 4-corner-entry-skeleton-based HCS for an ideal portable individual-gadget wEntity, since the fail-safe is not necessary.

Based on the aforementioned modified hardware methods of reducing the standard-HCS into a compact-HCS, a typical compact individual-gadget XP+FP-based HCS can be established. It comprises 1) a base-level assembly-block consisting of mx2-cWSA together with a front-end dispatch-cWSA and a back-end dispatch-cWSA, 2) a mid-level (2,3)-assembly-conveyer and 3) a top-level assembly-tree consisting of $\{(x-1)\times 3\}$-cWSA+top-cWSA together with a front-end agent-cWSA and a back-end agent-cWSA.

Furthermore, based on the aforementioned modified hardware methods of reducing the compact-HCS into a miniature-HCS, a typical miniature individual-gadget only-XP-based HCS can be established. It comprises 1) a base-level assembly-block consisting of 4× paired TcP-based WSA (i=8), 2) a mid-level assembly-conveyer consisting of a failover 2-sided mWSA and 3) a new top-level assembly-tree consisting of two-tier cWSAs, where the first-tier cWSA ($i=3\times 2=6$) and the second tier cWSA($i=3\times 2=6$).

Most importantly, it is only rational that the software methods for generating a standard Office-based Policy-wEntity's integrated-operating-systems (OSs) and structured-domain programs (DPs) in the standard-HCS will remain the same and then converge those existed OSs and DPs into the Gadget-based Policy-wEntity-based compact-HCS as well as miniature-HCS, so that the real-time 4-corner-entry collaborative intelligence can be maintained. These gadget-equipped software programs (OSs and DPs) should be reliable and without debugging, due to the fact that the software components-to-structure architecture is proven working in its biggest self-growing division-Office environment and by reducing the working environment for just one owner will only increase the software programs' integrity.

Therefore, this type of individual-management-service (IMS)-capable "Gadget-based Policy-wEntity based on miniature-HCS can all be equipped with 1) front-end top-corner multi-contract Policy-Agent software in the front-end service-delivery-mechanism (SDM), 2) back-end top-corner information/knowledge Policy-agent software in the back-end SDM, 3) front-end base-corner multi-project matrix-Expert software in the service-generation-mechanism (SGM) and 4) back-end base-corner multi-library Jobber software in the service-control-mechanism (SCM). Just like a real-time 4-corner-entry business-management-service (BMS)-intelligent Office-based Policy-wEntity, this type of Gadget-based Policy-wEntity can deliver all the real-time fine-grained-proactive (FGP) services to its owner with real-time 4-corner-entry IMS-intelligence.

Based on the aforementioned rational courses of action for creating real-time intelligent individual Policy-Agent-based gadgets, together with the usage of wG4-wEAs, Policy-wEntity-based wG5.3-wEA and wG6.3-wEA, the third workgroup evolutionary principle (wEP3) is thus established to bring forth the seventh-generation/third-stage "real-time intelligent gadget-based" wEntity Architecture (wG7.3-wEA) that comprises the following 6 mandates for creating all the potential "workgroup individual-management-service"-based "PDA-Policy-wEntities".

Mandate-1: the must-have 6 PDA-Policy-wEntity-based workgroup Basic Building Blocks, which can be constructed by using the miniature Contract-HCSs" and WSAs;

Mandate-2: the must-have PDA-Policy-wEntity-based Hierarchical Core Structure by aggregating PDA-Policy-6BBBs with workgroup four linkages and bundles;

Mandate-3: the must-have PDA-Policy-wEntity-based Hardware Architecture Theory with related methods in constructing PDA-Policy-6BBBs and in aggregating them into PDA-Policy-HCSs;

Mandate-4: the must-have PDA-Policy-wEntity-oriented OS to equip PDA-Policy-HCS into PDA-Policy-wEntity-oriented Core Structure (ECS);

Mandate-5: the must-have PDA-Policy-wEntity domain programs (DPs) to equip PDA-Policy-ECS into PDA-Policy-wEntity-oriented Domain Structure (EDS); and Mandate-6: the must-have PDA-Policy-wEntity-based Software Architecture Theory with related software methods in generating PDA-Policy-OSs and PDA-Policy-DPs.

By abiding the third mandate of wEP3.wG7.3 evolutionary architecture, the seventh-generation/third-stage Theoretic Foundation (wTF3.wG7.3) can be derived, which contains a PDA-Policy-wEntity-based Hardware Architecture Theory that comprises multiple Hardware Construction Methods (HCMs) in creating the PDA-Policy-6BBBs and multiple Hardware Aggregation Methods (HAMs) in creating PDA-Policy-HCSs.

In addition, by abiding the sixth mandate of wEP3.wG7.3 evolutionary architecture, the seventh-generation/third-stage workgroup Theoretic Foundation (wTF3.wG7.3) can be extended to include a PDA-Policy-wEntity-based Software Architecture Theory, which comprises multiple PA-Policy-wEntity OS-oriented software Integration Methods (EIMs) in generating PDA-Policy-OSs and PDA-Policy-wEntity domain-oriented software Programming Methods (EPMs) in real-time generating PDA-Policy-DPs.

It can be concluded that by fulfilling the seventh-generation third-stage PDA-Policy-wEntity-based Architecture (i.e., wG7.3-wEA) and carrying out wTF3.wG7.3-(HAT/SAT), a series of "fail-safe" PDA-Policy-wEntities with various degrees of real-time workgroup individual-management-service-based intelligence can be created. However, based on the miniature Contract-wEntities as the basic components to warrant the solidity and completeness of wG7.3-wEA, there is only one standard "fail-safe" PDA-Policy-wEntities that is needed, due to two preferred "4-corner-entry" workgroup-individual management service-based miniature Hierarchical Core Structures (HCSs), as illustrated by FIG. 60.

Furthermore, these PDA-Policy-wEntities can further be built into real-world "standardized real-time IMS-intelligent PDA-Policy-agent-based miniature wGadget wSystems" based on wG7.3 individual policy-management-service-based System Disciplines (wG7.3-pmsSD), which will populate the seventh generation of real-world service-oriented workgroup evolutionary pathway and eventually achieve the ideal real-world individual-gadget's ultimate objective, as defined earlier.

FIG. 60 Preferred PDA-Policy Gadget-wEntity-Based Miniature HCSs:

As shown in FIG. 60, a modified 3-wBBB-architected PDA-Policy-HCS is created, where 1.BAFB, 2.MMFB, 3.TCFB are constructed by using wCCs and wCMs, as illustrated by the following HCM-3 Table.

| HCM-3: 3 wBBB | wCCs + wCMs | Abbr. Name | Description |
|---|---|---|---|
| 1.BAFB= | | | Base Attribute-Failover Block |
| | wCC(41) | TcP1-C.1 | Team control Processor type1-(down-left corner-entry) |
| | wCC(41) | TcP1-R1.1 | Team control Processor type1-Ribbon1.1 |
| | wCC(51) | TcP2-G.1 | Team control Processor type2-(down-right corner-entry) |
| | wCC(51) | TcP2-R2.1 | Team control Processor type 2-Ribbon2.1 |
| 2.MMFB= | | | Mid Memory-Failover Block |
| | wCM(77) | mWSA4p1 | memory Workgroup Server Array type2-version4/part1 |
| 3.TCFB= | | | Top Control-Failover Block |
| | wCC(41) | TcP1-C.2 | Team control Processor type1-(top-left corner-entry) |
| | wCC(41) | TcP1-R1.2 | Team control Processor type1-Ribbon1.2 |
| | wCC(41) | TcP1-R3.1 | Team control Processor type1-Ribbon3.1 |
| | wCC(51) | TcP2-G.2 | Team control Processor type2-(top-right corner-entry) |
| | wCC(51) | TcP2-R2.2 | Team control Processor type 2-Ribbon2.2 |

In addition, by aggregating BAFB, MMFB and TCFB via WL1 and WL2, the preferred PDA-Policy-HCS is created as illustrated by FIG. 60.

5.7.4 Real-Time Intelligent Individual Administration-Service Widgets

As an ideal real-world individual-administration service-based widget, it should be equipped with the following 3 types of specialized mechanism. They are 1) the base-level individual administration-based service-generation-mechanism (SGM) to generate individual management-based individual administration-services (IAS), 2) the top-level service-delivery-mechanism (SDM) to deliver individual administration services (IAS) and 3) the internal service-control mechanism (SCM) to control base-level service-generation and top-level service-delivery mechanisms over the IAS-based activities to all the external service-oriented connections.

In fact, there are 4 major external service-oriented corner-connections. They are 1) the front-end top-level corner-connection to the external front-end captive gadgets' back-end SDM via the internal front-end SDM, 2) the back-end top-level corner-connection to the external back-end owner via internal back-end SDM with Human-Machine-Interface (HMI), 3) the front-end base-level corner-connection to its captive external gadgets' service-generation mechanisms (g-SGM) via the internal front-end SGM and 4) the back-end base-level corner-connection to the external gadgets', devices', appliances' service-generation-mechanisms (SGM) via the internal back-end SGM. In so doing, the aforementioned individual widget is directly networked with its captive gadgets for multi-management administration services and with all the front-end gadgets, devices and appliances for providing real-time library services.

Therefore, an ideal individual administration-service-based widget, comprising multiple collaborative service-oriented mechanisms, must achieve its ultimate objective; that is "to real-time deliver "individual administration services (IAS)" to its owner with real-time 4-corner-entry collaborative intelligence.

Based on the same must-achieve ultimate objective, it can be concluded that the architectural construction of an ideal individual widget with the real-time 4-corner-entry IAS-intelligence is similar to the architectural construction of an ideal business Central-office facility with the same 4-corner-entry BAS-intelligence. The only difference is that an individual widget only has to serve just one owner/user, while a business Central-office has to serve as many enterprise internal department/division/office controllers as possible.

Therefore, it is only rational that the hardware methods for creating a standard Central-wEntity's 4-corner-entry-skeleton-based Hierarchical Core structure (HCS) can be modified by using smaller workgroup computing modules (wCMs) to "construct" a new set of 6-wBBBs and then "aggregate" them into a small and "compact" 4-corner-entry-skeleton-based HCS for an ideal individual widget wEntity, since the self-growth is not necessary. Furthermore, by using even smaller workgroup computing components (wCCs) to "construct" a new set of 3-wBBBs and "aggregate" them into a smaller and miniature 4-corner-entry-skeleton-based HCS for an ideal portable individual widget wEntity, since the fail-safe is not necessary.

Based on the aforementioned modified hardware methods of reducing the standard-HCS into a compact-HCS, a typical compact user-widget XP+FP-based HCS can be established. It comprises 1) a base-level assembly-block consisting of mx2-cWSA together with a front-end dispatch-cWSA and a back-end dispatch-cWSA, 2) a mid-level (2,3)-assembly-conveyer and 3) a top-level assembly-tree consisting of $\{(x-1)\times(y)$ expandable$\}$-cWSA+top-cWSA together with a front-end agent-cWSA and a back-end agent-cWSA.

Furthermore, Based on the aforementioned modified hardware methods of reducing the compact-HCS into a miniature-HCS, a typical miniature individual widget only-XP-based HCS can be established. It comprises 1) a base-level assembly-block consisting of 4× paired TcP-based WSA(i=8), 2) a mid-level assembly-conveyer consisting of a failover 2-sided mWSA and 3) a new top-level assembly-tree consisting of two-tier cWSAs, where the first-tier cWSA ($i>3\times2=6$ expandable) and the second tier cWSA($i=3\times2=6$).

Most importantly, it is only rational that the software methods for generating a standard Central-office-based Strategy-wEntity's integrated-operating-systems (OSs) and structured-domain programs (DPs) in the standard-HCS will remain the same and then converge those existed OSs and DPs into a Widget-based Strategy-wEntity-based compact-HCS as well as a miniature-HCS, so that the real-time 4-corner-entry collaborative intelligence can be maintained. These widget-equipped software programs (OSs and DPs) should be reliable and without debugging, due to the fact that the software components-to-structure architecture is proven working in its biggest self-growing Central-office environment and by reducing the working environment for just one owner will only increase the software programs' integrity.

Therefore, this type of individual-administration-service (IAS)-capable "Widget-based Strategy-wEntity based on miniature-HCS can all be equipped with 1) front-end top-corner multi-contract Strategy-Agent software in the front-end service-delivery-mechanism (SDM), 2) back-end top-corner information/knowledge Strategy-agent software in the back-end SDM, 3) front-end base-corner multi-policy matrix-Expert software in the service-generation-mechanism (SGM) and 4) back-end base-corner multi-library Jobber software in the service-control-mechanism (SCM). Just like a real-time 4-corner-entry business-administration-service (BAS)-intelligent Central-based Strategy-wEntity, this type of Widget-based Strategy-wEntity can deliver all the real-time fine-grained-proactive (FGP) services to its owner with real-time 4-corner-entry IAS-intelligence.

Based on the aforementioned rational courses of action for creating real-time intelligent individual Strategy-Agent-based widgets, together with the usage of wG4-wEAs, business Strategy-wEntity-based wG5.4-wEA and wG6.4-wEA, the third workgroup evolutionary principle (wEP3) is thus established to bring forth the seventh-generation/fourth-stage "real-time intelligent widget-based" wEntity Architecture (wG7.4-wEA) that comprises the following 6 mandates for creating all the potential "workgroup individual administration-service"-based "PDA Strategy-wEntities".

Mandate-1: the must-have 6 PDA-Strategy-wEntity-based workgroup Basic Building Blocks (uStrategy-6BBBs), which can be constructed by using the miniature Contract-HCSs" and WSAs;

Mandate-2: the must-have PDA-Strategy-wEntity-based Hierarchical Core Structure by aggregating PDA-Strategy-6wBBBs with workgroup four linkages and bundles;

Mandate-3: the must-have PDA-Strategy-wEntity-based Hardware Architecture Theory (uStrategy-HAT) with related methods in constructing PDA-Strategy-6BBBs and in aggregating them into PDA-Strategy-HCSs;

Mandate-4: the must-have PDA-Strategy-wEntity-oriented OS to equip PDA-Strategy-HCS into PDA-Strategy-wEntity-oriented Core Structure (ECS);

Mandate-5: the must-have PDA-Strategy-wEntity domain programs (DPs) to equip PDA-Strategy-ECS into PDA-Strategy-wEntity-oriented Domain Structure (EDS); and Mandate-6: the must-have PDA-Strategy-wEntity-based Software Architecture Theory with related software methods in generating PDA-Strategy-OSs and PDA-Strategy-DPs.

By abiding the third mandate of wEP3.wG7.4 evolutionary architecture, the seventh-generation/fourth-stage Theoretic Foundation (wTF3.wG7.4) can be derived, which contains a PDA-Strategy-wEntity-based Hardware Architecture Theory that comprises multiple Hardware Construction Methods (HCMs) in creating the PDA-Strategy-6wBBBs and multiple Hardware Aggregation Methods (HAMs) in creating PDA-Strategy-HCSs.

In addition, by abiding the sixth mandate of wEP3.wG7.4 evolutionary architecture, the seventh-generation/fourth-stage workgroup Theoretic Foundation (wTF3.wG7.4) can be extended to include a PDA-Strategy-wEntity-based Software Architecture Theory, which comprises multiple PDA-Strategy-wEntity OS-oriented software Integration Methods (EIMs) in generating PDA-Strategy-OSs and PDA-Strategy-wEntity domain-oriented software Programming Methods (EPMs) in real-time generating PDA-Strategy-DPs.

It can be concluded that by fulfilling the seventh-generation fourth-stage PDA-Strategy-wEntity-based Architecture (i.e., wG7.4-wEA) and carrying out wTF3.wG7.4-(HAT/SAT), a series of "fail-safe" PDA-Strategy-wEntities with various degrees of real-time workgroup individual-administration-service-based intelligence can be created. However, based on the aforementioned miniature Contract-wEntities as the basic components to warrant the solidity and completeness of wG7.4-wEA, there are only one standard "fail-safe" PDA-Strategy-wEntities that are needed, due to two preferred "4-corner-entry" workgroup-individual administration service-based miniature Hierarchical Core Structures (HCSs), as illustrated by FIG. 61.

Furthermore, these PDA-Strategy-wEntities can further be built into real-world "standardized real-time UAS-intelligent uStrategy-agent-based miniature wWidget wSystems" based on wG7.4 individual strategy-administration-service-based System Disciplines (wG7.4-sasSD), which will populate the seventh generation of real-world service-oriented workgroup evolutionary pathway and eventually achieve the ideal real-world individual widget's ultimate objective, as defined earlier.

FIG. 61 Preferred PDA-Strategy Widget-wEntities-Based Miniature HCSs

As shown in FIG. 61, a modified 3-wBBB-architected PDA-Strategy-HCS is created, where 1.BAFB, 2.MMFB, 3.TCFB are constructed by using wCCs and wCMs, as illustrated by the following HCM-3 Table.

| HCM-3: 6BBB | wCCs | Abbr. Name | Description |
|---|---|---|---|
| 1.BA-FB= | | | Base Attribute-Failover Block |
| | wCC(41) | TcP1-C.1 | Team control Processor type1-(down-left corner-entry) |
| | wCC(41) | TcP1-R1.1 | Team control Processor type1-Ribbon1.1 |
| | wCC(51) | TcP2-G.1 | Team control Processor type2-(down-right corner-entry) |
| | wCC(51) | TcP2-R2.1 | Team control Processor type2-Ribbon2.1 |
| 2.MM-FB= | | | Mid Memory-Failover Block |
| | wCM(77) | mWSA4p1 | memory Workgroup Server Array type2-version4/part1 |
| 3.TC-FB= | | | Top Control-Failover Block |
| | wCC(41) | TcP1-C.2 | Team control Processor type1-(top-left corner-entry) |
| | wCC(41) | TcP1-R1.2 | Team control Processor type1-Ribbon1.2 |
| | wCC(41) | TcP1-R3.1 | Team control Processor type1-Ribbon3.1 |
| | wCC(51) | TcP2-G.2 | Team control Processor type2-(top-right corner-entry) |
| | wCC(51) | TcP2-R2.2 | Team control Processor type2-Ribbon2.2 |

In addition, by aggregating BAFB, MMFB and TCFB via WL1 and WL2, the preferred PDA-Strategy-HCS is created as illustrated by FIG. 61.

5.7.5 Real-Time AI-Agent-Based Individual Service Miniature-PDAs

In a real world individual service-oriented environment, an ideal individual service-instrument-integrated "PDA" should comprise multiple real-time individual operation-service (IOS)-intelligent appliance-instruments, real-time individual compositional service-(ICS)-intelligent device-instruments, real-time individual management service-(IMS)-intelligent gadget-instruments and one real-time individual-administration service-(IAS)-intelligent widget-instrument and achieve its ultimate objective, "that is to real-time deliver its direct and fast individual portfolio-services and individual project-services to its owner with real-time individual policy-management and individual strategy administration-based "artificial intelligence". It is based on the same philosophy of creating a real-time AI Enterprise by virtually-integrating multiple real-time BOS-intelligent departments, multiple real-time BCS-intelligent divisions, multiple real-time BMS-intelligent divisional-Offices and one real-time BAS-intelligent Central-office all together via internal hierarchical business-agents, as described earlier.

FIG. 62 Rt-AI Individual-Service PDA Miniature vHCS

As shown in FIG. 62, a preferred Portable-apparatus-based vHCS comprises a plurality of 2 types of miniature Appliance-HCSs, 2 types of miniature Device-HCSs, 2 types of miniature Gadget-HCSs and one-type miniature Widget-HCS. Details can be illustrated by the following table.

| Abbr. Name | WSAs | Description |
|---|---|---|
| m-upa-1<br>m-upa-2 | Top: cWSA(41x6 + 51x4)<br>Mid: mWSA(81)<br>Base: cWSA(41x3 + 51x3) | type1/type2 miniature PDA-Portfolio Appliance-based HCS |
| m-upd-1<br>m-upd-2 | Top: cWSA(41x6 + 51x4)<br>Mid: mWSA(81)<br>Base: cWSA(41x3 + 51x3) | type1/type2 miniature PDA-Project Device-based HCS |
| m-upg-1<br>m-upg-2 | Top: cWSA(41x4 + 51x2)<br>Mid: mWSA(77)<br>Base: cWSA(41x2 + 51x2) | type1/type2, miniature PDA-Policy Gadget based HCS |

-continued

| Abbr. Name | WSAs | Description |
|---|---|---|
| m-usw | Top: cWSA(41x4up + 51x2up)<br>Mid: mWSA(77)<br>Base: cWSA(41x2 + 51x2) | Miniature PDA-Strategy Widget-based HCS |

In addition, based on all the above HCSs, there are 5 aforementioned internal multi-expert LANs (1,3,5,7,9) and 5 aforementioned internal multi-agent LANs (2,4,6,8,10) together with 6 Firewall-Routers, which can all be established via w1-Ethernet linkage as well as VPN, as shown in FIG. 62.

Furthermore, by connecting FS1+FS3+FS5 together as the top-side border, by connecting FS2+FS4+FS6 together as the bottom-side border and by connecting FS1+FS2 together as the left-side border, a 3-sided tree-like secure-bordered AI-Apparatus-based miniature virtual hierarchical Core Structure (miniature-vHCS) can be established.

5.7.6 Real-Time SI-Agent-Based PDA-Cloud Systems and Open Public-Service Platform (PSP)

When a plurality of real-time-AI Sites, AI-mobiles and AI-portable vSystems are established together with the well-established Business Service Platform, it is only rational to 1) interconnect any individual AI-site with its designated CSP via wide-area-network (WAN) to form a closed "Site-service cloud" (SSC), 2) interconnect any individual AI-mobile with its associated CSPs via wide-area-network (WAN) to form a closed mobile-service cloud (MSC), 3) interconnect any individual AI-Portable with its associated AI-sites and AI-mobiles via Wi-Fi as well as WAN to form a closed portable-service cloud (PSC), 4) interconnect all the rt-AI apparatuses with the BSP in the nation via the open Internet communication protocol to form the open Public Service Platform" (PSP). In so doing, all the rt-AI Apparatuses and rt-AI vEnterprises can transact with security and privacy protections, providing real-time intelligent "6-level problem solving" services for all the people in a nation.

In order to build the aforementioned symbiotic closed service clouds and the open Public service platform (PSP), it is imperative that the following 4 sequential courses of action be carried out.

The first course of action is to interconnect from any individual Site Apparatus-System's portfolio agent-station to the project-agent-station of its designated CSP via wide-area network1 (WAN1), creating a 5-level-depth tree-like Site Service Cloud (SSC), where all the involved real-time-AI agents can transact based on the hierarchical Site service protocols. The Site user-service negotiations and executions between a supply-side CSP master-project agent and a demand-side Site-Apparatus master-portfolio-agent can be achieved via sending out various types of sub-agents to each other based on different criteria, e.g., time-based, trip-based, mission-based, etc.

The second course of action is to interconnect from any individual Mobile-Apparatus System's portfolio agent-station to all the project-agent-stations of its symbiotically-associated CSPs via wide area network2 (WAN2), creating a 5-level-depth tree-like Mobile Service Cloud (MSC), where all the involved real-time-AI agents can transact based on hierarchical mobile service-protocols. The mobile user-service negotiations and executions between a supply-side CSP master-project agent and a demand-side Mobile-Apparatus master-portfolio-agent can be achieved via sending out various types of sub-agents to each other based on different criteria, e.g., time-based, trip-based, mission-based, etc. Any Mobile-Apparatus can dynamically join as well as disjoin multiple CSPs for different locale-based service purposes due to mobility.

The third course of action is to interconnect from any individual Portable-PDA System's portfolio agent-station to all the project-agent-stations of its designated Mobile-Apparatuses and Site-Apparatuses via Wi-Fi as well as wide-area-network3 (WAN3), creating a 6-level-depth tree-like Portable Service Cloud (PSC), where all the involved real-time-AI agents can transact based on the hierarchical Portable service protocols. The Portable user-service negotiations and executions between a supply-side Mobile/Site master-project agent and a demand-side Portable master-portfolio-agent can be achieved via sending out various types of sub-agents to each other based on different criteria, e.g., time-based, trip-based, mission-based, etc.

The fourth course of action is to interconnect all the rt-AI Apparatus-Systems via type1-appliance-adjacent FR1 with the Business-Service-Platform (BSP) by using the Internet-communication-protocol-based networking, creating a 6-level-depth lattice-like open Public Service Platform (PSP), where all the rt-AI Apparatuses and rt-AI vEnterprises can transact with security and privacy protections, providing real-time "6-level problem solving" services for all the people in a nation.

Based on the aforementioned rationales for setting up a collaborative workgroup "open public Service Platform", the third workgroup evolutionary principle (wEP3) is thus established to bring forth the seventh-generation/sixth-stage "virtual Apparatus-System" (vAS) Interconnection-Organizational Architecture (wG7.6-vAS-IOA) that comprises 4 hardware Hierarchical Interconnection Methods (HIMs) and 4 software Agent Programming Methods (APMs) for creating an open hierarchical-lattice Apparatuses and vEnterprises-based public service platform (PSP), where all the rt-(US)-AI Agents and rt-(BS)-AI-agents can real-time dynamically transact with one another.

Hardware Hierarchical-Interconnection Method-1 (HIM-1): To create a Site service cloud (SSC) by interconnecting the FR2-entried portfolio agent-station of any individual Site-Apparatus to all the FR4-entried project-agent-stations of its designated CSP-vEnterprises via wide-area network1 (WAN1) using community Wimax, Internet-carrier's networking and the likes. This Site service cloud (SSC) is formed based on a 5-level-depth tree-like hierarchical structure, which has one parent-(the fifth-level) node (i.e., the said Site-Apparatus) and a number of designated sibling-(the fourth-level) node (i.e., the designated CSP-vEnterprises).

Hardware Hierarchical-Interconnection Method-2 (HIM-2): To create a Mobile service cloud (MSC) by interconnecting the FR2-entried portfolio agent-station of any individual Mobile-Apparatus to all the FR4-entried project-agent-stations of its symbiotically associated CSP-vEnterprises via wide-area network2 (WAN2) using community Wimax, Internet-carrier's networking and the likes. This Mobile Service Cloud (MSC) is formed based on a 5-level-depth tree-like hierarchical structure, which has one parent (the fifth-level)-node (i.e., the said Mobile-Apparatus) and a plurality of sibling-(the fourth-level) nodes (i.e., the associated CSP-vEnterprises).

Hardware Hierarchical interconnection Method-3 (HIM-3): To create a Portable service cloud (PSC) by interconnecting the FR2-entried portfolio agent-station of any individual Portable-PDA to all the FR4-entried project-agent-stations of its symbiotically associated Site-Apparatuses and Mobile-Apparatuses via local Wi-Fi as well as wide-area network3 (WAN3) using community Wimax, Internet-carrier's networking and the likes. This Portable service cloud (PSC) is formed based on a 6-level-depth tree-like hierarchical structure, which has one grandparent-(the sixth-level)-node (i.e., the said Portable PDA), a plurality of parent/uncle-(the fifth-level) nodes (i.e., more associated Site/Mobile-Apparatuses) and a plurality of sibling/cousin-(the fourth-level) nodes (i.e., the associated CSP-vEnterprises).

Hardware Hierarchical Interconnection Method-4 (HIM-4): To create an open Public service platform (PSP) by interconnecting the existing BSP-formed Internet to the FR1-entried type1-appliance of all the involved real-time-AI Apparatuses with the Internet access capabilities, which will allow the connected FR2-entried appliance-agents, FR3-entried device-agents and FR6-entried widget-agents to access the Internet for external supply-side as well as demand-side services. This open Internet-based public service platform (PSP) is formed based on a 6-level-depth expansive-lattice-like hierarchical structure, where real-time AI-Agent-based vEnterprise and rt-AI Apparatuses are all interconnected together for online proactive services. Most importantly, all the vEnterprises' departments can further be y-connected with rt-AI site Apparatuses/workgroups and enhanced with wireless rt-AI-mobile Apparatuses/workgroups as additional expert-stations in the 2D-matrix workgroups, creating the commingled online and onsite proactive service for the general public with rt-AI portable Apparatuses.

Software Agent-(Natural Language-NL)-Programming Method-1 (APM-1): To set up the "Site Service-Agent Protocols (SS-AP) with real-time dynamic tokens" on top of the preferred Wimax communication protocol" for any Site-Apparatus and its designated CSP-vEnterprises to conduct real-time dynamic symbiotic "Agent-to-Agent" interactive/cognitive transactions among themselves with security protections inside its own Site service cloud (SSC).

Software Agent-Programming Method-2 (APM-2): To set up the "Mobile Service-Agent Protocols (MS-AP) with real-time dynamic tokens" on top of the preferred Wimax communication protocol" for any Mobile apparatus and its associated CSP-enterprises to conduct real-time dynamic symbiotic "Agent-to-Agent" interactive/cognitive transactions among themselves with security protections in its own Mobile service cloud (MSC).

Software Agent-Programming Method-3 (APM-3): To set up the "Portable Service-Agent Protocols (PS-AP) with real-time dynamic tokens" on top of the preferred Wimax communication protocol" for any Portable-PDA and its associated Site-Apparatuses and Mobile-Apparatuses to conduct real-time dynamic symbiotic "Agent-to-Agent" interactive/cognitive transactions among themselves with security protections in its own Portable service cloud (PSC).

Software Agent Programming Methods-4 (APM-4): To set up the "open Internet Public (US+BS)-Agent-Protocols (PAP) to enhance (HTTP and RTP)" on top of the Internet communication protocols TCP/IP" to support the open public-service platform (PSP) for all the involved rt-AI vEnterprises and rt-AI Apparatuses to enable real-time dynamic commingled online and onsite Agent-to-Agent proactive service transactions with security and privacy protections.

It can be concluded that by carrying out all the hardware and software methods, the 6-level lattice-like open public service platform (PSP) can be created. It enables all the inter-relational transaction services to all the involved real-time-(BS)-AI-agent-based vEnterprises and real-time-(US)-AI-Agent-based Apparatuses, enhancing one another with symbiotic and cooperative services. They are as many binary relational transaction-based combinations inside and between these two categorical groups, i.e., the first eBusiness/Intranet/Extranet/Community-based business-service categorical group and the second Site/Mobile/Portable-based user-service categorical groups. These binary relational AI-Agent to AI-Agent transactions, such as 1) any user to any user 2) any user to any business and 3) any business to any business, can be real-time dynamically generated. In addition, any long-running n-ary relational interactive AI-agent-to-AI-agent transaction on this PSP can also be dynamically generated by cascading all these binary-relational transactions together as long as the duration requires.

Most importantly, any individual in a society can access not only his/her own private service cloud via private PDAs to all personal sites/mobiles with all the "onsite" privacy and secure protected services, but also the open 6-level public service platform (PSP) via private PDAs as customers as well as clients, enjoying all the "real-time dynamic proactive problem solving services" to achieve the Maslow hierarchy of 5-tiered personal needs.

That is to say, the Tier-1 physical and physiological personal needs for any individual are accomplished by the real-time efficient delivery of the commingled online and onsite proactive e-commerce services that can be dynamically generated via real-time n-ary relational interactive AI-agent-based transactions between his/her rt-AI-Apparatuses and the open business-service platform (BSP).

The Tier-2 safety and security needs for any individual are accomplished by the real-time onsite protection of the daily eating, clothing, dwelling and commuting worry-free services that can be autonomously maintained via the real-time n-ary relational interactive AI-agent-based transactions among his/her rt-AI-Apparatuses (e.g., AI-homes and AI-cars), anyone else's rt-AI-Apparatuses (e.g., AI-homes and AI-cars) and all the related rt-AI Enterprises.

The Tier-3 social and privacy needs for any individual are accomplished by the real-time favorite group-formation based on the audio-video message and media publishing and distribution services that can be constantly monitored via the real-time n-ary relational interactive AI-Agent-based transactions between his/her AI-Portables and anyone else's AI-portables, all of which are equipped with the built-in intelligent security and privacy protections and there is no need for using any "third-party" closed service clouds that will just unnecessarily create the privacy dilemma.

The Tier-4 self-esteem and self-improving needs for any individual are accomplished by the real-time effective learning based on the real-time knowledge library services of past-event experiences and intentional educations, which can be constantly managed via the real-time n-ary relational interactive AI-agent-based transactions between his/her closed personal service cloud and the open public service platform.

The Tier-5 self-actualization and self-fulfillment needs for any individual are accomplished by the real-time intelligent decision-making of all his/her AI-Agent n-ary relational transaction-generated living-working-playing event services that can be dynamically generated via the "direct interaction" with his/her own rt-AI-Apparatuses, which are all built-in with past-event numerical-analyzing policy management and current-event-knowledge-formed suggestions-rating strategy administration.

Therefore, this ideal open-PSP empowers anyone in a society to conduct real-time intelligent problem solving services to achieve the Maslow hierarchy of 5 individual needs, anytime and anywhere, contributing to a more secure, intelligent and harmonized society with economic efficiency and effectiveness.

FIG. 63 Real-Time SI-Agent-Based PDA-Cloud Systems and Open Public Service Platform (PSP)

As shown in FIG. 63, a preferred 6-Level-lattice real-time open public service platform (PSP) comprises a plurality of level-5 Site-Apparatuses, Mobile-Apparatuses and level-6 Portable-PDAs, together with an open 4-level-lattice Business Service Platform.

In addition, based on all the above rt-(US)-AI Apparatuses, there are 3 aforementioned WANs (1,2,3) can all be established to construct a plurality of closed Personal service clouds (PSC), as shown in FIG. 63.

Furthermore, by interconnecting all the rt-AI Apparatuses with the 4-level lattice-based Business Service Platform (BSP) based on the open Internet communication protocols, the one and only 6-level lattice-like real-time (US+BS) AI-Agent-based open Public Service Platform (PSP) is thus established.

5.7.7 Real-Time AI/SI-Agent-Based National Service Platform (NSP)

When the 6-level public service platform is established and the general public can be empowered with real-time intelligent problem solving services, which can be construed as achieving the highest-level self-actualization needs from the Maslow hierarchy point of view, as described earlier. However, in order to enhance all these five-level hierarchical needs, it is imperative that an "open government service platform" be in existence and be combined with the open public service platform, so that all the people in a nation can be empowered with the real-time intelligent problem solving services for satisfying all the physical, safety, social, self-improving and self-fulfillment needs.

The government sector needs to have the open quasi-business-service platforms and the local-government, state-government and federal government authorities with branches in each communities. Therefore, the overall government service platform has the same 6-level lattice-structure as the public service platform.

Therefore, it is only rational to create an open government service platform based on the same 6-level-PSP-based Interconnection-Organizational Architecture (IOA) and then combine them together into the open National Service Platform (NSP), so that the full-fledged real-time Problem-Solving services for all the people in a nation can be achieved.

In order to build the open Government service platform (GSP) and the open national service platform (NSP), it is imperative that the following 4 sequential courses of action be carried out.

The first course of action is to enhance some of the rt-(BS)-AI vEnterprises into handling quasi-business services to the government sector, thereby creating an rt-(quasi-BS)-AI vEnterprise-based open Quasi-Business Service Platform.

The second course of action is to interconnect from any individual government-Branch vEnterprise-System's portfolio agent-station to the project-agent-station of its designated quasi-CSP via wide-area network, creating a 5-level-depth tree-structured Branch-service cloud (BSC), where all the involved real-time-AI agents can transact based on the hierarchical Branch service protocols. The Branch government-service negotiations and executions between a supply-side quasi-CSP master-project agent and a demand-side Branch-vEnterprise master-portfolio-agent can be achieved via sending out various types of sub-agents to each other based on different criteria, e.g., time-based, trip-based, mission-based, etc.

The third course of action is to interconnect from any individual government-Authority-vEnterprise-System's portfolio agent-station to all the project-agent-stations of its designated government-Branch-vEnterprises via wide-area-network, creating a 6-level-depth tree-like Authority-Service-Cloud (ASC), where all the involved real-time-AI agents can transact based on the hierarchical Authority-service protocols. The Authority government-service negotiations and executions between a supply-side Branch master-project agent and a demand-side Authority master-portfolio-agent can be achieved via sending out various types of sub-agents to each other based on different criteria, e.g., time-based, trip-based, mission-based, etc.

The fourth course of action is to interconnect all the rt-(Government-service)-AI vEnterprise-Systems via type1-appliance-adjacent FR1 with the existing quasi-Business-Service-Platform (BSP) by using the Internet-communication-protocol-based networking, creating a 6-level-depth lattice-like open Government Service Platform (GSP), where all the rt-(quasi-BS)-AI vEnterprises and rt-(GS)-AI vEnterprises can transact with security and privacy protections, providing real-time "6-level problem solving" services for the government sector.

The fifth course of action is to interconnect the open GSP-based Internet with the open PSP-based Internet, creating a 6-level-depth lattice-like open National Service Platform (NSP), where all the rt-(quasi-BS-online/onsite)-AI vEnterprises, rt-(GS)-AI vEnterprises, rt-(BS-online/onsite)-AI-vEnterprises and rt-(US)-AI Apparatuses can transact with security and privacy protections, providing real-time "6-level problem solving" services for all the people in a nation.

Based on the aforementioned rationales for setting up a collaborative workgroup "open National Service Platform", the third workgroup evolutionary principle (wEP3) is thus established to bring forth the seventh-generation/sixth-stage "virtual Enterprise-System and virtual Apparatus-System" (vES/vAS) Interconnection-Organizational Architecture (wG7.6-vES/vAS-IOA) that comprises 4 hardware Hierarchical Interconnection Methods (HIMs) and 4 software Agent Programming Methods (APMs).

Hardware Hierarchical-Interconnection Method-1 (HIM-1): To create a government-Branch service cloud (BSC) by interconnecting the FR2-entried portfolio agent-station of any individual Branch-Enterprise to all the FR4-entried project-agent-stations of its symbiotically associated CSP-enterprises via wide-area network1 (WAN1) using Wimax and the likes. This Branch service cloud is formed based on a 5-level-depth tree-like hierarchical structure, which has one parent-(the fifth-level) node (i.e., the said Branch-Enterprise) and a number of sibling-(the fourth-level) nodes (i.e., a plurality of associated CSP-enterprises).

Hardware Hierarchical-Interconnection Method-2 (HIM-2): To create a government-Authority service cloud (ASC) by interconnecting the FR2-entried portfolio agent-station of any individual Headquarter-Enterprise to all the FR4-entried project-agent-stations of its symbiotically associated Branch-Enterprises via wide-area network3 (WAN3) using Wimax and the likes. This Headquarter service cloud is formed based on a 6-level-depth tree-like hierarchical structure, which has one grandparent-(the sixth-level)-node (i.e., the said Headquarter-Enterprises), a plurality of parent/uncle-(the fifth-level) nodes (i.e., more associated Branch-Enterprises) and a plurality of sibling/cousin-(the fourth-level) nodes (i.e., associated CSP-enterprises).

Hardware Hierarchical-Interconnection Method-3 (HIM-3): To create an open Government service platform (GSP) by interconnecting the existing CSP-formed Internet to the FR1-entried type1-department of all the involved real-time-AI Branch and Headquarter Enterprises with the Internet access capabilities, which will allow the connected FR2-entried department-agents, FR3-entried division-agents, FR6-entried Central-agents to access the Internet for external supply-side as well as demand-side services. This Internet-based Government service platform (GSP) is formed based on a 6-level-depth expansive-lattice-like hierarchical structure, where six-level real-time AI-Agent-based Systems of eBusinesses, Intranets, Extranets, Internet-communities, branches and headquarters are all interconnected together.

Hardware Hierarchical-Interconnection Method-4 (HIM-4): To create an open National Service Platform (NSP) by interconnecting the existing GSP and PSP together via the common Internet connection. This National service platform (NSP) is formed based on a 6-level-depth expansive-lattice-like hierarchical structure, where six-level real-time AI-Agent-based Systems of eBusinesses, Intranets, Extranets, Internet-communities, branches, headquarters, sites, mobiles and portables are all interconnected together.

Software Angel-Programming Method-1 (APM-1): To set up the "government-Branch service-protocols with real-time dynamic tokens" on top of the preferred Wimax communication protocol" for any Branch-enterprise and its associated quasi-CSP-enterprises to conduct real-time dynamic symbiotic "Agent-to-Agent" interactive/cognitive transactions among themselves with security protections in its own Branch service cloud (BSC).

Software Angel-Programming Method-2 (APM-2): To set up the "Headquarter service-protocols with real-time dynamic tokens" on top of the preferred Wimax communication protocol" for any Headquarter-enterprise and its associated Branch-enterprise to conduct real-time dynamic symbiotic "Agent-to-Agent" interactive/cognitive transactions among themselves with security protections in its own Authority Service Cloud (ASC).

Software Agent programming methods-3 (APM-3): To set up the "open Government service-Agent Protocols (GSAP) to enhance (HTTP and RTP)" on top of the Internet communication protocols TCP/IP" to support the open government-service platform (GSP) for all the involved rt-AI CSPs and rt-AI governmental branches and headquarters to enable real-time dynamic Agent-to-Agent proactive service transactions with security and privacy protections.

Software Agent programming methods-4 (APM-4): To set up the "open National Service-(GS+US+BS)-Agent protocols (NSAP) to enhance (HTTP and RTP)" on top of the Internet communication protocols TCP/IP" to support the open Internet-service platform (ISP) for all the involved GSP-based 6-level rt-AI Enterprises and PSP-based 4-level rt-AI-Enterprises and 2-level rt-AI-Apparatuses to enable real-time dynamic Agent-to-Agent interactive/cognitive service transactions with security and privacy protections.

It can be concluded that by carrying out all the hardware and software methods, the ideal 6-level lattice-like open National Service Platform (NSP) can be created. It enables all the inter-relational transaction services to all the involved real-time-(BS)-AI-agent-based vEnterprises, real-time-(US)-AI-Agent-based Apparatuses and real-time-(GS)-AI-agent-based vGovernments, enhancing one another with symbiotic and cooperative services. There are as many binary relational transaction-based combinations inside and among these three categorical groups, i.e., the first eBusiness/Intranet/Extranet/Community-based business-service categorical group, the second Site/Mobile/Portable-based user-service categorical group and the third Local/State/Federal) government-service categorical group. These binary-relational interactive AI-Agent to AI-Agent transaction combinations, such as 1) any government to any business 2) any government to any user and 3) any user to any business, can be real-time dynamically generated. In addition, any long-running n-ary relational interactive transaction on this open NSP can also be dynamically generated by cascading all these binary-relational transactions together as long as the duration requires.

Most importantly, any individual in a nation can access not only his/her own private service cloud via private PDAs to all personal sites/mobiles with all the "onsite" security and privacy services, but also the open 6-level national service platform (NSP) via private PDAs, enjoying all the "real-time dynamic proactive problem solving services" to achieve the Maslow hierarchy of 5-tiered personal needs with the governmental support.

That is to say, the Tier-1 physical and physiological personal needs for any individual are accomplished by the real-time efficient delivery of the commingled online and onsite proactive e-commerce services that can be dynamically generated via real-time n-ary relational interactive AI-agent-based transactions between his/her rt-AI-Apparatuses, the open business-service platform and the open quasi-business service platform.

The Tier-2 safety and security needs for any individual are accomplished by the real-time around-the-clock protection of the daily eating, clothing, living and transportation worry-free services that can be autonomously maintained via the real-time n-ary relational interactive AI-agent-based transactions among his/her rt-AI-Apparatuses, anyone else's rt-AI-Apparatuses, all the related rt-AI Enterprises and the rt-AI-Governments.

The Tier-3 social and privacy needs for any individual are accomplished by the real-time symbiotic association based on the audio-video message and media publishing and distribution services that can be constantly monitored via the real-time n-ary relational interactive AI-agent-based transactions among his/her AI-Portables, anyone else's AI-portables, rt-(escrow)-AI-Enterprises and rt-(certification)-AI-Governments.

The Tier-4 self-esteem and self-improving needs for any individual are accomplished by the real-time effective learning based on the real-time knowledge library services of past event experience and intentional education, which can be constantly managed via the real-time n-ary relational interactive AI-agent-based transactions among his/her closed personal service cloud, the open public service platform (PSP) and the open government service platform (GSP).

The Tier-5 self-actualization and self-fulfillment needs for any individual are accomplished by the real-time intelligent decision-making of all his/her AI-Agent n-ary relational transaction-based living-working-playing event services that can be dynamically generated via the "direct interaction" with his/her own rt-AI-Apparatuses, which are all built-in with past-event numerical-analyzing policy management and current-situation suggestion-rating strategy administration.

Therefore, this ideal open-NSP empowers anyone in a nation to conduct real-time intelligent problem solving services to achieve the Maslow hierarchy of 5 individual needs, anytime and anywhere, contributing to a more secure, intelligent and harmonized nation with economic efficiency and effectiveness.

FIG. 64 the National Internet and the International Internet

As shown in FIG. 64, a preferred 6-Level-lattice real-time open National Service Platform (NSP) comprises a plurality of level-5 Local/State/Federal Branch-vGovernments and level-6 Local/State/Federal Authority-vGovernments, together with an open 4-level-lattice quasi-Business Service Platform. In addition, based on all the above rt-(GS)-AI vGovernments, there are 3 aforementioned WANs (1,2,3) can all be established to construct a plurality of closed Government service clouds (GSC), as shown in FIG. 64.

In addition, by interconnecting all the rt-AI vGovernments with the 4-level lattice-based quasi-Business Service Platform (BSP) based on the open Internet communication protocols, the one and only 6-level lattice-like real-time (GS+BS) AI-Agent-based open Government Service Platform (GSP) is established.

Furthermore, by interconnecting GSP and PSP via the common Internet linkage, the one and only 6-level lattice-like real-time (GS+US+BS)-AI-agent-based open National Service Platform (NSP) is thus established.

Hypothetically, by setting up an international Internet confederation authority and the national Internet authority in each nation, an international public-service platform can be formed by interconnecting all the nation-based public service platforms via the common Internet communication protocols for rt-(US+BS)-AI agents from all the nations to transact with one another. Any individual in the world can access the International Public service platform to fulfill his/her Maslow hierarchy of 5 personal needs, anytime and anywhere. Most importantly, the ultimate goal of creating the one and only ubiquitous Internet linkage can be achieved.

6.0 Summary: Advantages in 7-Generation wEntities 6.1 the Advantages: 10 Must-have Real-Time Computing-Architecture Categories The current disclosure has defined a new and better workgroup evolutionary-computing paradigm (wECP) in contrast to the current node evolutionary-computing paradigm (nECP), as stated earlier. Most importantly, the current disclosure has illustrated a number of sophisticated workgroup-computing hardware architectures and established 10 new "real-time workgroup computing" categories that are essential for advancing "the electronic computing" in tackling "real-world problems solving services to meet 5 Maslow needs with "real-time artificial intelligence".

These ten (10) must-have "real-time workgroup computing categories" are defined as follows:

I. rt-workgroup fail-over-based hardware architectures for creating fail-over wCCs and fail-over wCMs based on Functional-Machineries, functional-nCCs and all the nEntity-based HCSs/ECSs/EDSs as illustrated by FIG. H.

II. rt-workgroup fail-safe-based hardware architectures in creating fail-safe 6BBB-wHCS for building fail-safe wEntities from wCCs and wCMs.

III. rt-workgroup concurrent loop-(execution, supervision)-based hardware evolutionary architectures in creating concurrent 6BBB-wHCS for further building self-growth wEntities with workgroup concurrent software.

IV. rt-workgroup complex-production-based hardware evolutionary architectures in creating complex (multi-pathway/top-entry) 6BBB-wHCS for further building Task-wEntities with workgroup complexity software and real-time complex Task production wSystems via workgroup task-production STE-disciplines.

V. rt-workgroup diverse-assembly-based hardware evolutionary architectures in creating diverse (multi-strand/top-entry) 6BBB-wHCS for further building Job-wEntities with workgroup diversity software and real-time diverse job-assembly wSystems via workgroup job-assembly STE-disciplines.

VI. rt-workgroup dynamic-fabrication-based hardware evolutionary architectures in creating dynamic 6BBB-wHCS for further building (multi-strand/multi-top-entry) Case-wEntities with workgroup dynamism software and real-time dynamic Case-Fabrication wSystems via workgroup case-fabrication STE-disciplines.

VII. rt-workgroup cognitive/interactive transaction-based hardware evolutionary architectures in creating cognitive/interactive (multi-strand/2-corner/top-entry) 6BBB-wHCSs for further building Contract-wEntities with workgroup cognitive/interactivity software and real-time cognitive/interactive Contract-transaction wSystems via workgroup Contract-transaction STE-disciplines.

VIII. rt-workgroup intelligent operation/composition/management/administration-based hardware evolutionary architectures for creating intelligent standard/compact/miniature (4-corner-entry/top-entry) 6BBB-wHCSs for further building Portfolio/Project/Policy/Strategy wEntities with workgroup intelligent-Agent/expert software and real-time intelligent business-service(BS)/user-service(US) wSystems via workgroup BS/US-intelligent STE-disciplines.

IX. rt-workgroup AI-agent-based hardware evolutionary architectures in creating AI standard/compact/miniature (6-entry) virtual-HCSs for further building Enterprise/Apparatus virtual-Entity with workgroup AI-agent software and real-time (BS/US)-AI-agent-based Enterprise/Apparatus virtual-Systems via workgroup BS/US-AI STE-disciplines.

X. rt-workgroup-AI vSystem-based Hardware Interconnection-Organizational Architectures in creating the Internet-based open-BSP, open-PSP, open-NSP and internationally-confederated open-PSPs.

Therefore, in addition to "node functionality electronic-computing category", there are 10 must have electronic-computing categories, i.e., real-time workgroup fail-over, real-time workgroup fail-safe, real-time workgroup concurrency, real-time workgroup complexity, real-time workgroup diversity, real-time workgroup dynamism, real-time workgroup cognitive interactivity, real-time workgroup intelligence, real-time workgroup AI-agents and real-time workgroup AI-Agent-based closed clouds and open platforms.

6.2 The Comparison

The current nECP with its comprised hardware evolutionary architectures in creating only functional structures for further building Algorithm-nEntities and real-time functional systems. Since nECP cannot evolve further, there are no bigger and better node-based BBBs to be created by any additional node-computing-based hardware evolutionary architecture and therefore, there are no new bigger and better nHCSs can be created for building bigger and better nEntities, let alone bigger and better node-entity systems. In order to tackle bigger problem domain, it has to use multiple existed low-level functional systems and interconnect them together via single-link-based networking, i.e., Ethernet, creating multi-function-based application-infrastructure in the problem domain for further building problem-domain-based application infrastructure systems (AIS) via software application engineering discipline, so that a particular group of problems in a problem domain can be resolved by the pre-developed application software.

By comparing to the 10 workgroup-computing categories, 1) the node-components and node modules are not real-time fail-over, 2) the node-entities are not real-time fail-safe, 3) the node-entities can only be real-time open-end parallel-processing-based but they are not real-time closed-loop concurrent operation-based, 4) the production-Application-infrastructure Systems (AIS) are not real-time complex, 5) the assembly-AISs are not real-time diverse, 6) the solution-AISs are not real-time dynamic, 7) the transaction-AISs are not real-time cognitive-interactive, 8) the business-operation-AISs, business-operational-composition-AISs, business compositional management AIS and business managerial administration-AISs are not intelligent, 9) the Enterprise-service AISs are not real-time AI-capable, and 10) the Enterprise-AISs-based Internet is only comprised of closed service clouds and client-nodes, which are not closed AI-agent-based secure service clouds and definitely not the open AI-Agent-based service platform where every vSystem and Apparatus can interact with one another.

6.3 the Must-have Philosophical Thinking in Computing

Based on the evolutionary facts that node-computing-based Entity System can be used as the fundamental components to build the wCCs and wCMs, all of which can then further be used to construct the 6-wBBBs (workgroup Basic Building Blocks) and kick-start the evolution of workgroup computing as illustrated via FIGS. G, -H, -I and -J, there are 3 underlying "philosophical thinking in computing" that can be concluded as follows:

The first philosophical thinking is regarding to the fundamental evolutionary principle (EP), which comprises the following 3 doctrines.

EP-Doctrine1: the must-have creations of hierarchical core structures (HCSs) via Base Attribute-Block (BAB) for symbiotic-assortments, Mid Memory-Block (MMB) for message-exchanges and Top-Control-Block (TCB) for closed-loop operations. Based on this doctrine, the first node-computing-based nHCS is created by the first hardware architecture theory (nHAT1), as illustrated by FIG. 1 and the first workgroup-computing-based wHCS is created by the first wHAT1, as illustrated by FIG. 15.

EP-Doctrine2: the must-have evolutionary-process-based encapsulation of all the existing HCSs into bigger HCSs. Based on this doctrine, the smaller nHAT1-created nHCSs can be all encapsulated into nHAT2-created bigger nHCSs, as illustrated by FIG. 2 and the smaller wHAT1-created wHCSs can all be encapsulated into wHAT2-created bigger wHCSs, as illustrated by FIG. 16.

EP-Doctrine3: the must-have evolutionary-pathway-based iterations of encapsulation. Based on this doctrine, the node-computing nG1.stages iterations are evolved along the evolutionary timeline to create a plurality of nHCSs, such as von-Neumann's HCS and DOS-based HCSs and the workgroup-computing nG1.stages to nG7.stages iterations are evolved along the evolutionary timeline to create a plurality of wHCSs, as illustrated from FIG. 17 to FIG. 46*b* and from FIG. 58 to FIG. 61.

The second Philosophical thinking is regarding to the Theoretical Foundation of HATs and SATs, which comprises the following 2 doctrines:

TF-Doctrine-1: Hardware Hierarchical Architecture Theory (mandate-3 HAT) that creates HCSs dictates the ensuing Software Architecture Theory (mandate-6 SAT) that generates ECS (entity-core-structure) via hierarchical-Integration-based entity-oriented OS and EDS (entity-domain structure) via real-time entity-domain programs, as illustrated in each evolutionary architecture (EA) with 6-mandates.

TF-Doctrine-2: The SAT that generates the entity-integration-OSs and entity-domain programs on a standard HCS, can be directly applied to its compact HCS and miniature HCS without debugging, as illustrated from the generation of standard-skeleton-based Department/Division/Office/Central wEntities to the generation of compact-skeleton-based and miniature-skeleton-based Appliance/Device/Gadget/Widget wEntities. The reason is pretty obvious, it is because the software architecture that works in a standard hardware core structure with real-time expansive activities will certainly work in a smaller structure of the same skeleton with non-expansive and less activities.

The third Philosophical thinking is regarding to the System-disciplines, which comprise the following 3 doctrines:

SD-Doctrine1: The design-science discipline is based on the TF-created Entity-structures, designing ideal blue-prints that can be used for accommodating a categorical problem domain.

SD-Doctrine2: The development-technology disciplines based on designed blue-prints, developing evolution-centric fail-over hardware and software components and fail-safe entity structures.

SD-Doctrine3: The deployment-engineering disciplines based on developed fail-safe entities, deploying aspect-oriented problem solving systems in a real-time manner. 6.4 The wrong way Since the nECP has stopped evolving, there are no bigger and better node systems can be created to accommodate bigger problem domains. In order to accommodate bigger problem domains, the current prevalent endeavor didn't abide by the fundamental philosophical thinking to create new and better evolutionary principle, only to conveniently accept some low-effort perfunctory thinking in computing, which leads to the following 3 wrong endeavors, which are up against the natural computing evolution, as illustrated from FIGS. 3, 4, 5 and 6.

The first wrong endeavor is to focus on aggregation-oriented OS and object-oriented programming on a non-hierarchical core structure, which are against the EP-doctrines. By using one big memory to link all the one-linkage-port-to-bus-attached attribute-components, the 2-level memory-centric aggregation-OS can only control multi-port functional programs' aggregated traffic coming-in and going-out the memory-block. There is no top-level integration-OS to control the closed-loop programs that can enable multiple real-time concurrent operations. Therefore, the aggregation-OS can only enable multiple open-end multi-functional programs' parallel-processing with potential risks and difficulties.

The second wrong endeavor is to focus on distributed computing, which is against the TF-doctrines, due to the fact that existing software programs into bigger infrastructure for accommodating bigger problem domain will create many unforeseen problems that these software programs did not face before.

The third wrong endeavor is to focus on Software application engineering, which is against entity-oriented SD-doctrines. Application programs on a multi-node-Infrastructure need to be engineeringly-designed via scaffolding schematics to solve one type of problems in a problem domain, then engineeringly-develop schematics with scaffolding hardware/software components and lastly engineeringly-deploy developed components into an Application-Infrastructure System (AIS), which has many drawbacks with security/privacy dilemmas that cannot be resolved, as stated earlier.

The worst part is that the end results of the above 3 wrong endeavors cannot achieve the real-time problem solving services to accomplish the Maslow-hierarchy of 5 needs, due to the fact that 1) AISs cannot achieve proactive commingled online and onsite ecommerce-based Tier-1 physical services, 2) AIS-based Internet of Things (IoT) cannot achieve round-the-clock autonomous self-monitoring-based Tier-2 safety services, 3) AIS-based private-service clouds cannot achieve privacy-protected Tier-3 social services, 4) AIS-based big-data and deep learning cannot achieve real-time AI-knowledge library-based Tier-4 self-esteem services and 5) AIS-based logical decision-making cannot achieve real-time intelligent decision making-based Tier-5 self-fulfillment services.

According to the latest reports on the "Meltdown-Spectre security holes, the underlying vulnerability is caused by CPU architecture design flaws and the privileged-memory-control Aggregation-OSes that are equipped by WinTel chips since 1995. Both hardware and software endeavors on the node-computing took the wrong approaches in 1995, as illustrated by FIGS. 4, 5 and 6, yielding today's security dilemma affecting all the desktops, smartphones, servers and service clouds. The only way to eliminate this vulnerability is to redesign the node-computing-based CPU architecture and the operating systems, CPU micro-codes and related application-codes, which proves again that the current endeavors in non-evolutionary hardware and software architectures are wrong and futile, creating its own architectural-flawed security problems that cannot be resolved by itself.

6.5 Back to the Right Way: The Workgroup Computing Way

Since the node-computing evolved nEntities are not sophisticated in tackling the real-world problem solving services to satisfy Maslow-hierarchy of 5-needs, all the nEntities can however be used as the components for building 6-wBBBs and then based on wEA/wTF/wSD, bigger and better more sophisticated rt-AI wEntity/wSystems can be created, providing real-time problem solving services to satisfy Maslow hierarchy of 5-needs. Therefore, it is imperative that the current non-evolutionary endeavors on node-computing-based AISs and application-portables should be diverted to focus on workgroup computing-based rt-AI-agent-based Enterprise and Apparatus vSystems. The nECP shift to the wECP is inevitable and most importantly, shift from the wrong node-computing object-oriented non-evolutionary way to the right workgroup entity-oriented evolutionary way in advancing "electronic computing" with real-time intelligent problem solving capabilities and resolving the security and privacy issues based on more sophisticated workgroup hardware and software architectures.

The invention is claimed as follows:

1. A computer system comprising:

a first execution pylon; and a first fail-over pylon coupled to the first execution pylon through a first workgroup fail-over link, wherein the first fail-over pylon is configured to provide real time fail-over support to the first execution pylon, wherein the first fail-over pylon includes a first fail-over communication link, wherein the first execution pylon comprises:

a first top control block;

a first mid-memory block coupled to the first top control block through a first plurality of first workgroup execution links; and a first base attribute block coupled to the first mid-memory block through a first plurality of second workgroup execution links;

wherein the first base attribute block comprises:

a first-type base block coupled to the first mid-memory block through the first plurality of second workgroup execution links;

a first second-type base block coupled to the first-type base block through a first plurality of third workgroup execution links;

a first third-type base block coupled to the first second-type base block through a first plurality of fourth workgroup execution links.

2. The computer system of claim 1, wherein the first base attribute block further comprises:

a second second-type base block coupled to first third-type base block through a first plurality of fifth workgroup execution links; and a second third-type base block coupled to the second second-type base block through a first plurality of sixth workgroup execution links.

3. The computer system of claim 1, wherein the first base attribute block comprises a plurality of second-type base blocks and a plurality of third-type base blocks that are alternately coupled to each other, wherein the plurality of second-type base blocks include the first second-type base block and the plurality of third-type base blocks include the first third-type base block.

4. The computer system of claim 1, wherein the first second-type base block comprises:

a team memory processor;

a plurality of team memories;

a first read bus and a first write bus coupling the plurality of team memories to the first workgroup fail-over link;

a first switch coupled between the first workgroup fail-over link and the first read bus; and a second switch coupled between the first workgroup fail-over link and the first write bus, wherein the first switch and second switch are controlled by the team memory processor.

5. The computer system of claim 4, wherein the first second-type base block further comprises a plurality of third switches, wherein each of the third switches couples one of the team memories to one of the first plurality of the third workgroup execution links, the third switches being controlled by the team memory processor.

6. The computer system of claim 4, wherein the first second-type base block further comprises a second read bus and a second write bus for communicating with another block.

7. The computer system of claim 1, wherein the first workgroup fail-over link includes a plurality of communication channels.

8. The computer system of claim 7, wherein the first third-type base block comprises a plurality of team attribute processors each coupled to one of the plurality of the communication channels and one of the first plurality of fourth workgroup execution links.

9. The computer system of claim 8, wherein the first third-type base block further comprises a workgroup Ethernet control coupled to the plurality of the team attribute processors.

10. The computer system of claim 1, wherein the first fail-over pylon comprises:

a first top control fail-over block coupled to the first top control block through the first workgroup fail-over link;

a first mid-memory fail-over block coupled to the first mid-memory block through the first workgroup fail-over link; and a first base fail-over block coupled to the first base attribute block through the first workgroup fail-over link.

11. The computer system of claim 10, wherein the first base fail-over block comprises:

a first-type base fail-over block coupled to the first-type base block through the first workgroup fail-over link;

a first second-type base fail-over block coupled to the first second-type base block through the first workgroup fail-over link; and a first third-type base fail-over block coupled to the first third-type base block through the first workgroup fail-over link.

12. The computer system of claim 11, wherein each of the first-type base fail-over block, the first second-type base fail-over block, and the first third-type base fail-over block comprises a first team attribute panel manager coupled to a plurality of team attribute panels and the first fail-over communication link, each of the plurality of the team attribute panels serving as a switch between the first team attribute panel manager and the first fail-over communication link.

13. The computer system of claim 12, wherein each of the first-type base fail-over block, the first second-type base fail-over block, and the first third-type base fail-over block further comprises a second team attribute panel manager providing fail-over support to the first team attribute panel manager.

14. The computer system of claim 11, wherein the first base fail-over block further comprise a second team attribute panel manager coupled to the first-type base fail-over block, the first second-type base fail-over block, and the first third-type base fail-over block.

15. A computer system comprising:

a second execution pylon; and a second fail-over pylon coupled to the second execution pylon through a second workgroup fail-over link, wherein the second fail-over pylon is configured to provide real time fail-over support to the second execution pylon, wherein the second fail-over pylon includes a second fail-over communication link, wherein the second execution pylon comprises:

a second top control block;

a second mid-memory block coupled to the second top control block through a second plurality of first workgroup execution links; and a second base attribute block coupled to the second mid-memory block through a second plurality of second workgroup execution links;

wherein the second base attribute block comprises a plurality of matrix execution pylons, wherein each of the matrix execution pylons comprises the first execution pylon according to claim 1.

16. The computer system of claim 15, wherein the second mid-memory block is coupled to each of the matrix execution pylons by connecting the first top control block in each of the matrix execution pylons with the second mid-memory block through the second plurality of first workgroup execution links.

17. The computer system of claim 15, wherein the second fail-over pylon comprises:

a second top control fail-over block coupled to the second top control block through the second workgroup fail-over link;

a second mid-memory fail-over block coupled to the second mid-memory block through the second workgroup fail-over link; and a second base fail-over block coupled to the second base attribute block through the second workgroup fail-over link.

18. The computer system of claim 17, wherein the second base fail-over block comprises a plurality of matrix fail-over pylons, wherein each of the matrix fail-over pylons comprises the first fail-over pylon according to claim 1.

19. The computer system of claim 18, wherein the second base fail-over block further comprise a third team attribute panel manager coupled to the plurality of matrix fail-over pylons.

20. A computer system comprising:

a third execution pylon; and a third fail-over pylon coupled to the third execution pylon through a third workgroup fail-over link, wherein the third fail-over pylon is configured to provide real time fail-over support to the third execution pylon, wherein the third fail-over pylon includes a third fail-over communication link, wherein the third execution pylon comprises:

a third top control block;

a third mid-memory block coupled to the third top control block through a third plurality of first workgroup execution links; and a third base attribute block coupled to the third mid-memory block through a third plurality of third workgroup execution links;

wherein the third base attribute block comprises:

an array execution pylon;

a matrix execution pylon; and a tie execution pylon, wherein the matrix execution pylon comprises the first execution pylon according to claim 1, wherein the tie execution pylon comprises the second execution pylon according to claim 15.

21. The computer system of claim 20, wherein the third fail-over pylon comprises:

a third top control fail-over block coupled to the third top control block through the third workgroup fail-over link;

a third mid-memory fail-over block coupled to the third mid-memory block through the third workgroup fail-over link; and a third base fail-over block coupled to the third base attribute block through the third workgroup fail-over link.

22. The computer system of claim 21, wherein the third base fail-over block comprises:

an array fail-over pylon;

a matrix fail-over pylon; and a tie fail-over pylon, wherein the matrix fail-over pylon comprises the first fail-over pylon according to claim 1, wherein the tie fail-over pylon comprises the second fail-over pylon according to claim 15.

23. The computer system of claim 22, wherein the third base fail-over block further comprise a fourth team attribute panel manager coupled to the array fail-over pylon, the matrix fail-over pylon, and the tie fail-over pylon.

* * * * *